US006789054B1

(12) United States Patent
Makhlouf

(10) Patent No.: US 6,789,054 B1
(45) Date of Patent: Sep. 7, 2004

(54) GEOMETRIC DISPLAY TOOLS AND METHODS FOR THE VISUAL SPECIFICATION, DESIGN AUTOMATION, AND CONTROL OF ADAPTIVE REAL SYSTEMS

(76) Inventor: Mahmoud A. Makhlouf, 33 Whispering La., Weston, MA (US) 02493

( * ) Notice: Subject to any disclaimer, the term of this patent is extended or adjusted under 35 U.S.C. 154(b) by 0 days.

(21) Appl. No.: 09/299,235

(22) Filed: Apr. 25, 1999

(51) Int. Cl.[7] ............................. G06G 7/48; G06G 9/45

(52) U.S. Cl. ........................................... 703/6; 703/22

(58) Field of Search .............................. 703/1, 2, 22, 6; 717/1; 709/315, 316, 332; 706/919; 700/28, 29, 30, 31, 32, 33, 34, 35, 36, 37, 49, 51, 95, 96, 103, 104, 181, 182

(56) References Cited

U.S. PATENT DOCUMENTS

| | | | | | |
|---|---|---|---|---|---|
| 5,355,318 | A | * | 10/1994 | Dionnet et al. | 700/120 |
| 5,487,144 | A | * | 1/1996 | Takahashi et al. | 345/835 |
| 5,613,124 | A | * | 3/1997 | Atkinson et al. | 345/557 |
| 5,841,437 | A | * | 11/1998 | Fishkin et al. | 345/619 |
| 5,917,730 | A | * | 6/1999 | Rittie et al. | 703/6 |
| 5,961,599 | A | * | 10/1999 | Kalavade et al. | 709/224 |
| 5,963,447 | A | * | 10/1999 | Kohn et al. | 700/49 |
| 6,088,689 | A | * | 7/2000 | Kohn et al. | 706/10 |
| 6,097,212 | A | * | 8/2000 | Agrawal et al. | 326/41 |
| 6,219,440 | B1 | * | 4/2001 | Schaff et al. | 382/128 |

OTHER PUBLICATIONS

Nancy Miller, Beth Hetzler, Grant Nakamura, Paul Whitney "The Need For Metrics In Visual Information Analysis", ACM 1998, pp. 24–28.*
Eric Blough, Michael Eisenberg "Combining Programming Languages and Direct Manipulation in Environments for Computational Science", ACM 1995, pp. 123–130.*

(List continued on next page.)

Primary Examiner—Hugh Jones
Assistant Examiner—Dwin M. Craig
(74) Attorney, Agent, or Firm—Mark P. White

(57) ABSTRACT

This invention specifies physics-like computational models called M models. These models enable the specification and design automation of an integrated architecture of a real system. A new class of adaptive systems engineering tools called Adaptive Model-Reference (AMR) tools, supports the M computational model. AMR tools are used to visually specify the integrated architecture model of a real system, assess it's value, and automate the static and dynamic binding of it's model components into adaptive systems. These systems can be adapted during system development to compensate for requirement changes and design errors, and during run time operation to compensate for unanticipated operational system conditions. AMR tools enable the verification and validation of adaptive real system designs built in compliance with a declared enterprise wide technical architecture. Architecture components can be specified using AMR tools or can be imported into the AMR tool set. AMR tools are specified using an open system architecture built as extensions to open system development environments, such as Microsoft Foundation and OLE, and run time system environments such as Microsoft Windows or Java Object Request Brokers (ORB).

31 Claims, 214 Drawing Sheets

Folded Geometric Representation of an M Model

OTHER PUBLICATIONS

Joseph Gil, Stuart Kent, "Three Dimensional Software Modelling" IEEE 1998, pp. 105–114.*

Paul G. Bassett, "The Theory and Practice of Adapted Reuse", ACM 1997, pp. 2–9.*

J. Liang et al., Fast Neural Learning and Control of Discrete–Time Nonlinear Systems, IEEE Transactions on Systems, Man, and Cybernetics, vol. 25, No. 3, Mar. 1995, pp. 478–488.*

Albus, J. S., Quintero, R., 1990, "Toward a Reference Model Architecture for Real–Time Intelligent Control System", Proceeding of the Workshop on Software Tools for Distributed Intelligent Control Systems, Pacifica, California.

Anisaklis, P.J., Passinio, K.M., Wang, S.J. 1989, "Toward Intelligent Autonomous Control Systems:Architecture and Fundamental Issues", Journal of Intelligent and Robotic Systems, 1, 315–342.

Athans, M., Apr., 1987, "Command and Control Theory: A Challenge to Control Science", IEEE Transactions on Automatic Control, vol. 32, No. 4.

Brooks, F.P., 1987, "Essence and Accidents of Software Engineering", Computer.

Champeaux,D., Faure, P., 1992, "A Comparative study of Object–Oriented Analysis Methods", JOOP.

Clarke, D.W., 1969,"Generalized Least Square Estimation of the Parameters of a Dynamic Model", National Physics Laboratory Report AUTO 26.

Desmond, J.P., 1999, "Modeling for the Masses", Component Strategies.

Godfrey, K.R., 1969, "Dynamic Analysis of an Oil Refinery Unit under Nornal Operating Conditions", Proc. IEEE, 116, pp. 879–892.

Makhoul, J., Apr. 1975, "Linear Prediction, A Tutorial Review" Proc.IEEE, vol. 63, No. 4, pp. 561–580.

Makhoul, J., Oct. 1977,"Stable and Efficient Lattice Methods for Linear Prediction", IEEE Transactions on Accoustics, Speech and Signal Processing, vol. ASSP–26, pp. 423–428.

Makhoul, J.,Aug. 1978,"A Class of All Zero Lattice Digital Filters: Properties and Applications", IEEE Transactions on Accoustics, Speech and Signal Processing, vol. ASSP–26, No. 4, pp. 304–314.

Messershmitt, D.G., Apr. 1980, "A Class of Generalized Lattice Filters", IEEE Transactions on Accoustics, Speech and Signal Processing, vol. ASSP–28, No. 2, pp. 198–204.

Saridis, G.N., 1989 "Analytical Formulation of the Principle of Increasing Precision with Decreasing Intelligence for Intelligent Machines", Automaticsa vol. 25, No. 3, 461–467.

Singh, M.G., Hindi, K., 1991, "A Multilevel Multilayer Framework of Control", Journal of Intelligent and Robotic Systems, 4, 75–93.

Varaiya, P., Feb. 1993,"Smart Cars on Smart Roads: Problems of Control", IEEE Transactions on Automatic Control, vol. 38, No 2.

* cited by examiner

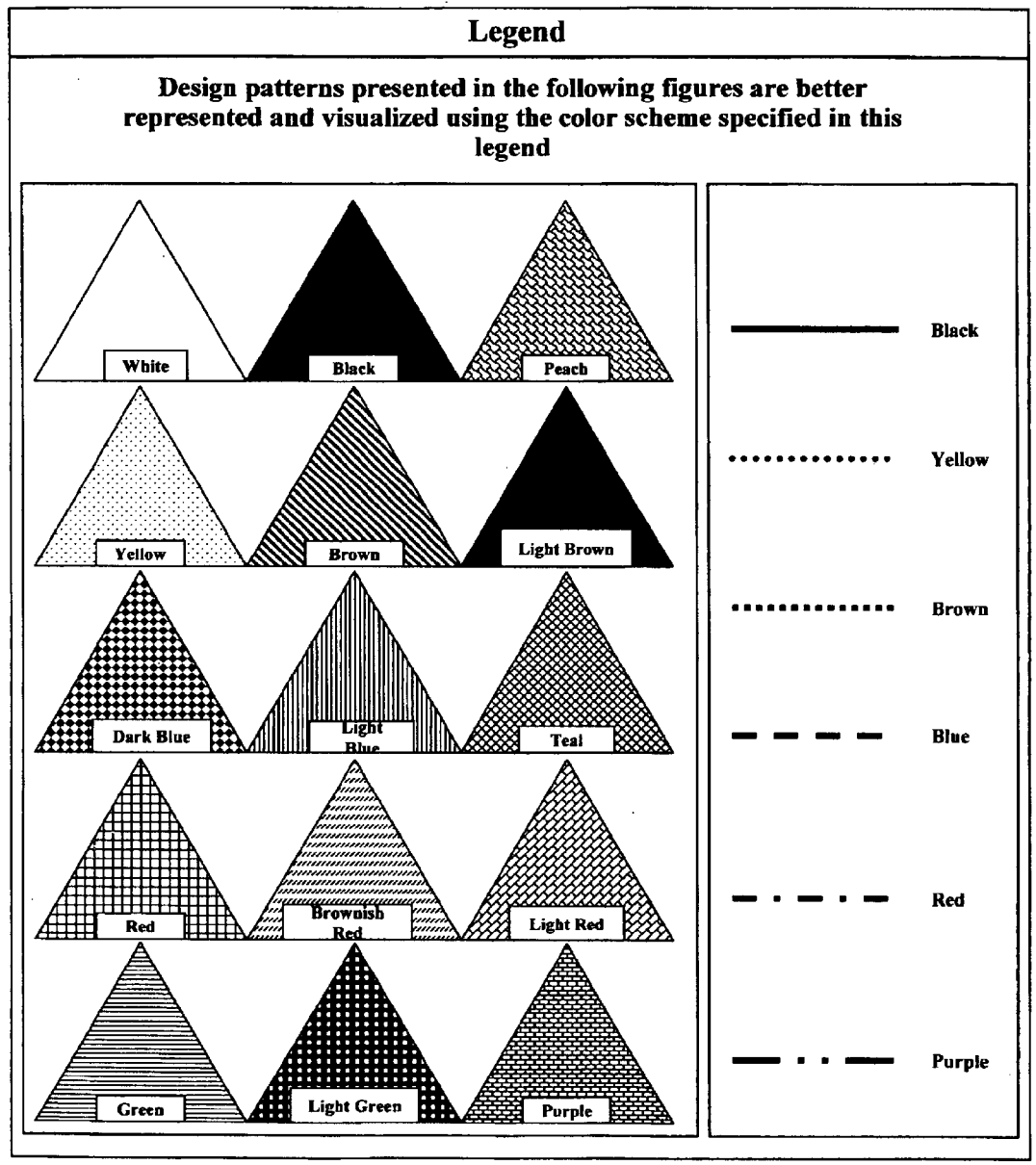
Figure 0: Coloring Scheme Legend

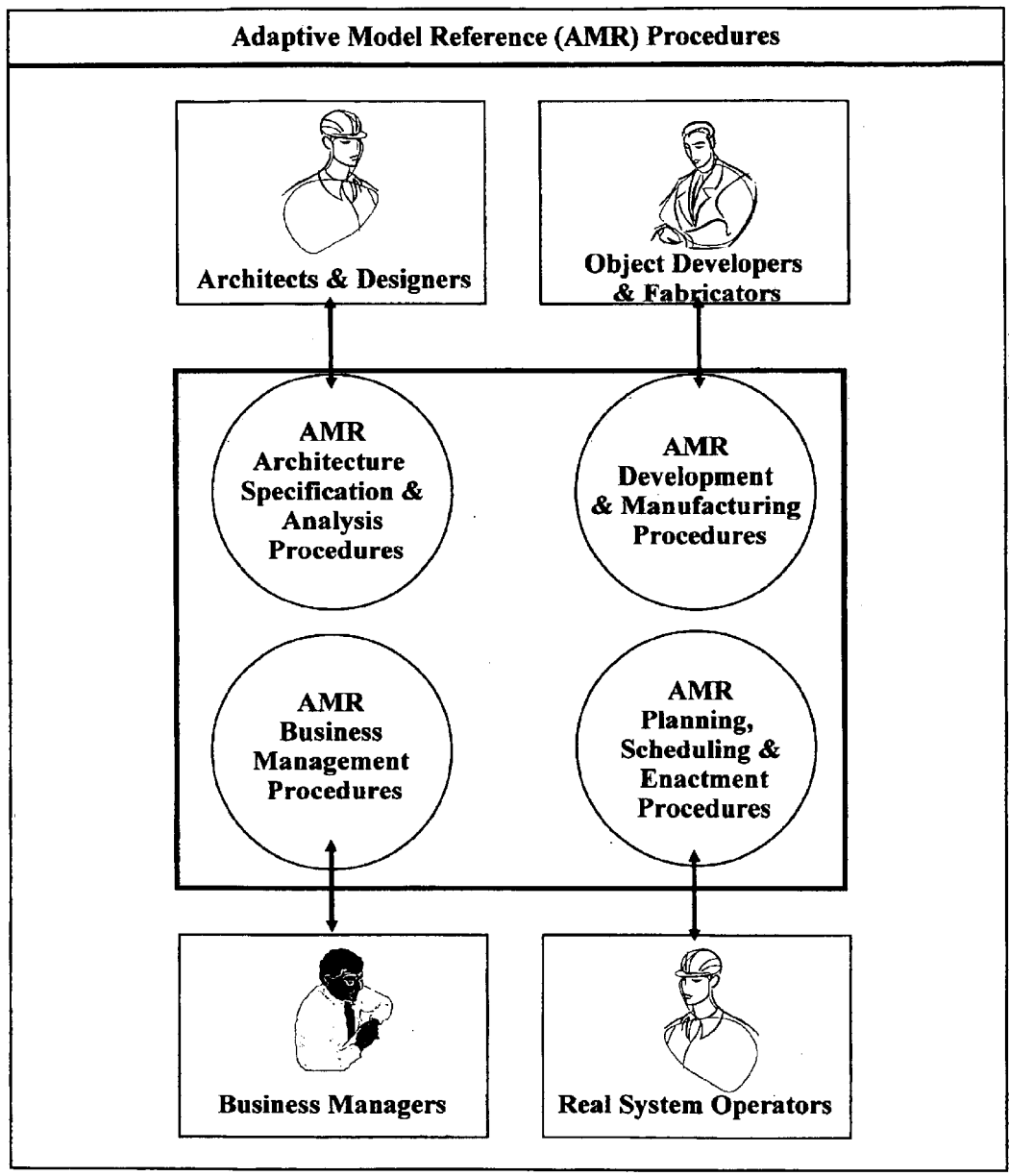
Figure 1: Adaptive Model Reference Procedures

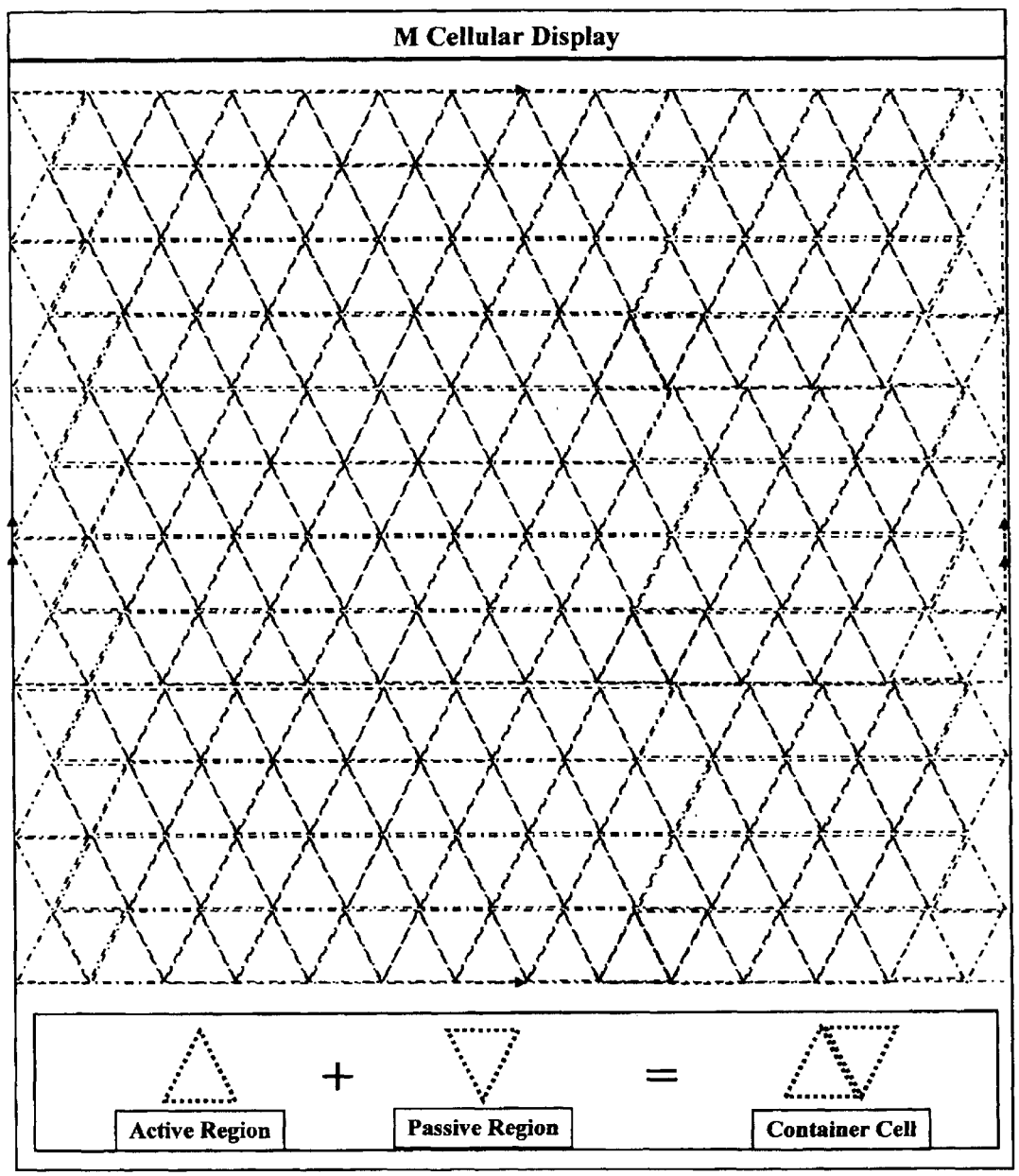
Figure 2: M Cellular Display

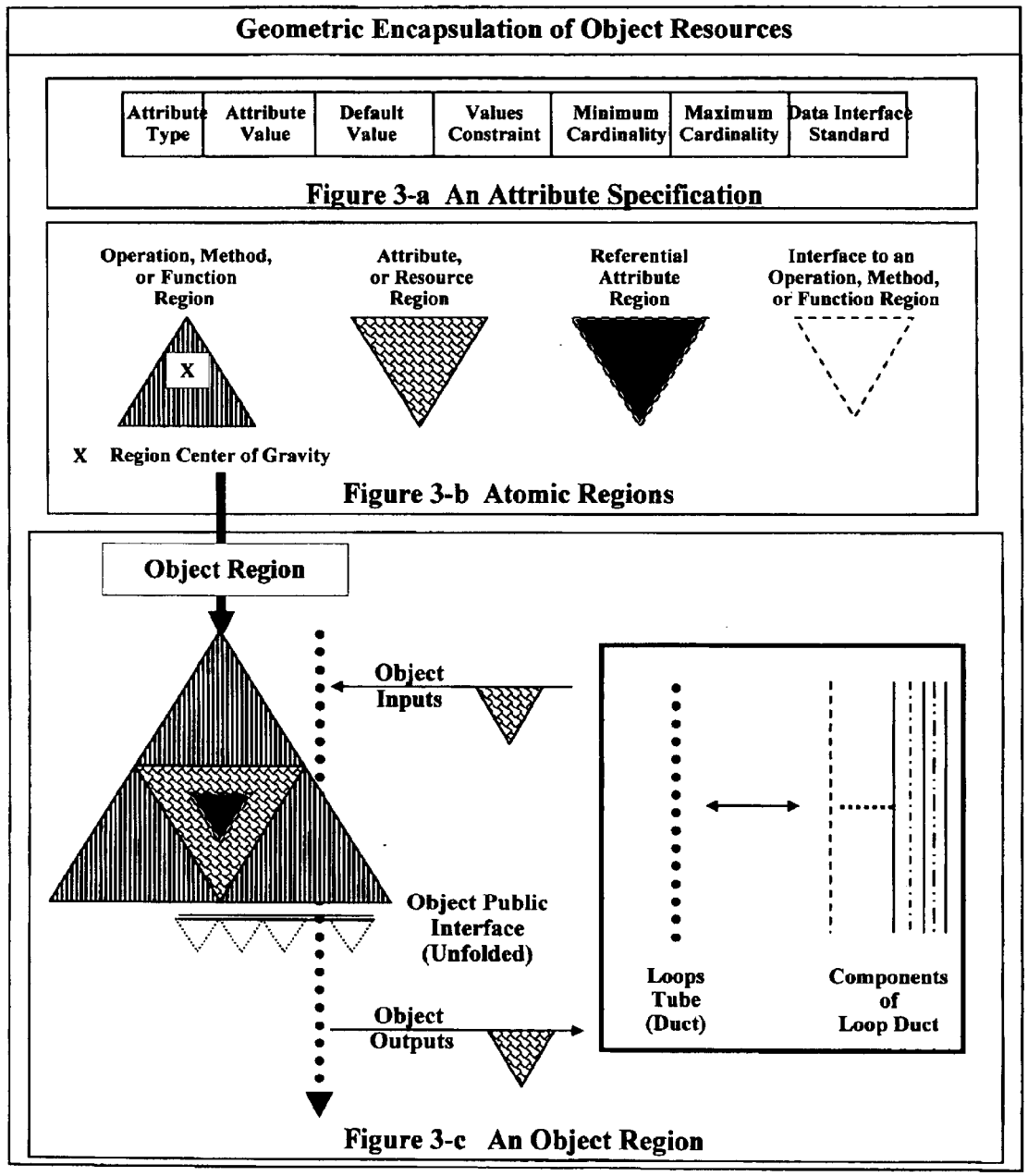
Figure 3: Geometric Encapsulation of Object Resources

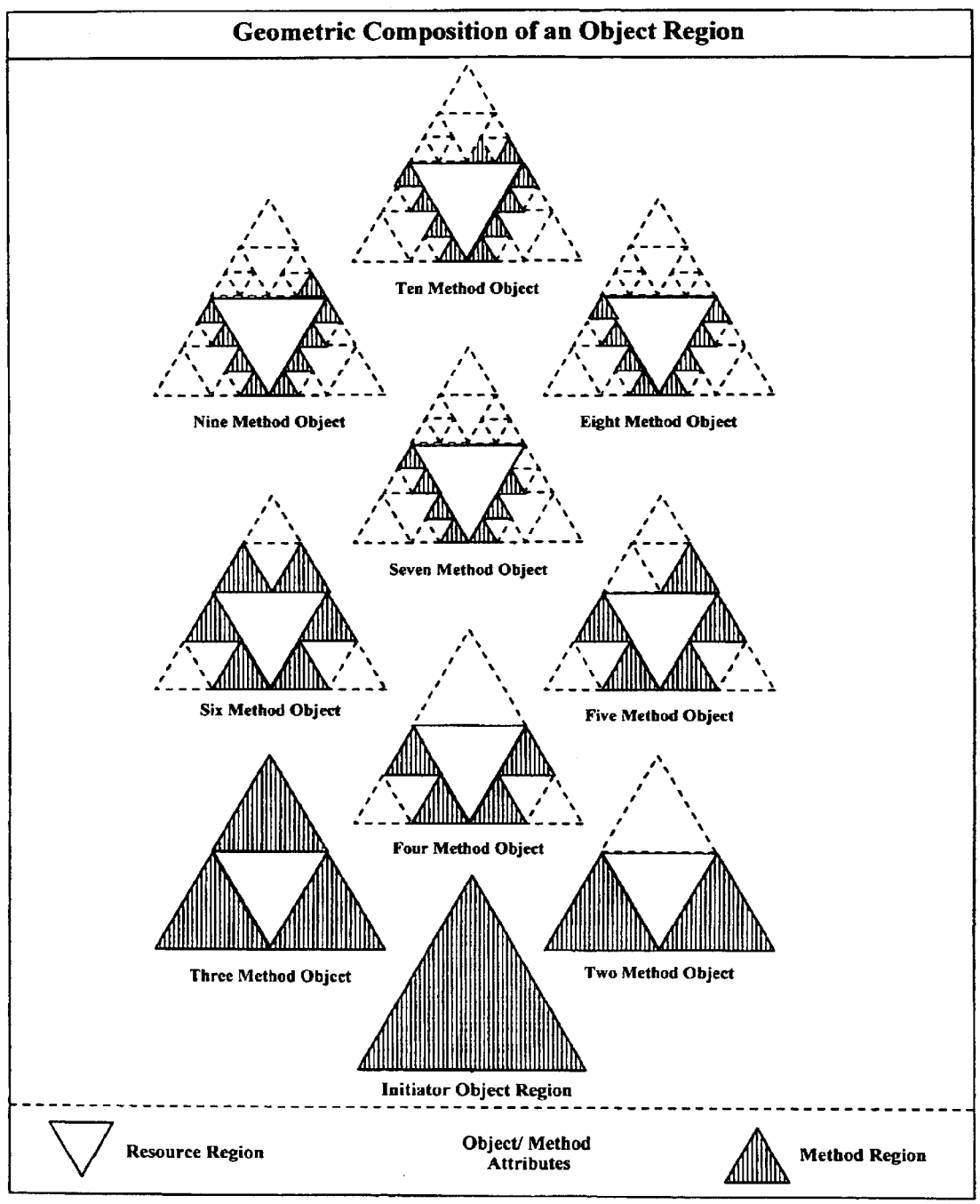
Figure 4: Geometric Composition of an Object Region

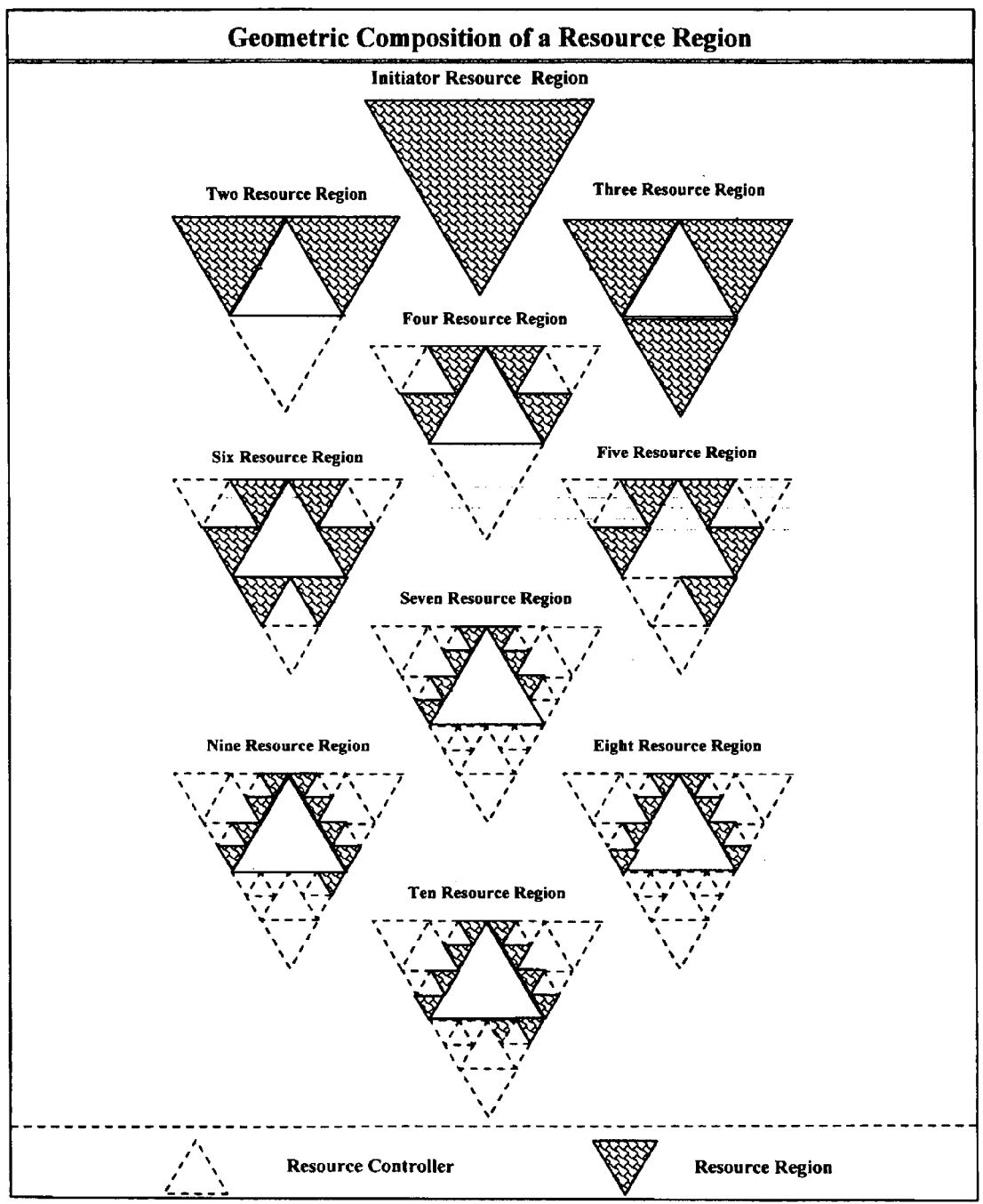
Figure 5: Geometric Composition of a Resource Region

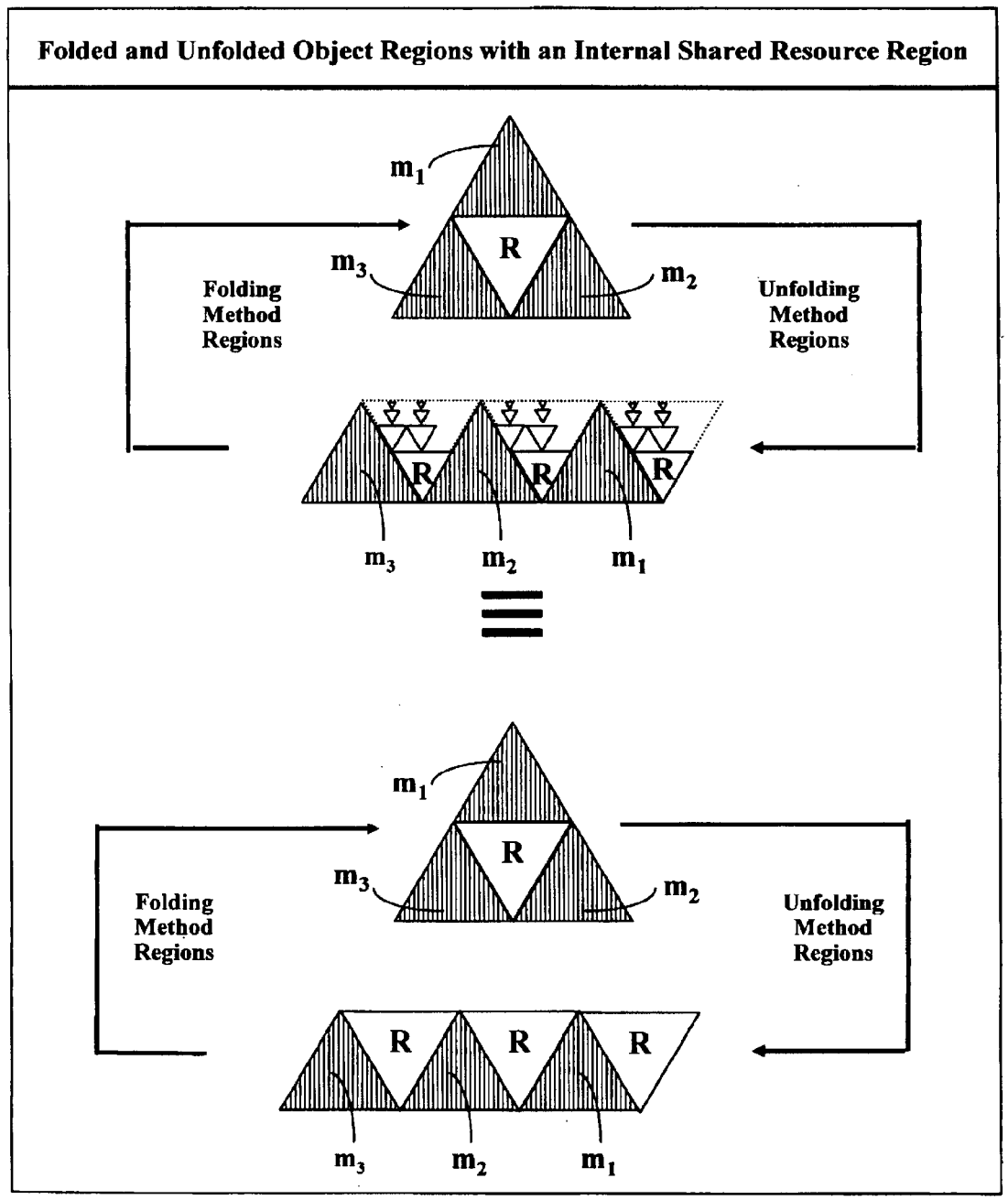
Figure 6: Folded and Unfolded Object Regions with an Internal Shared Resource Region

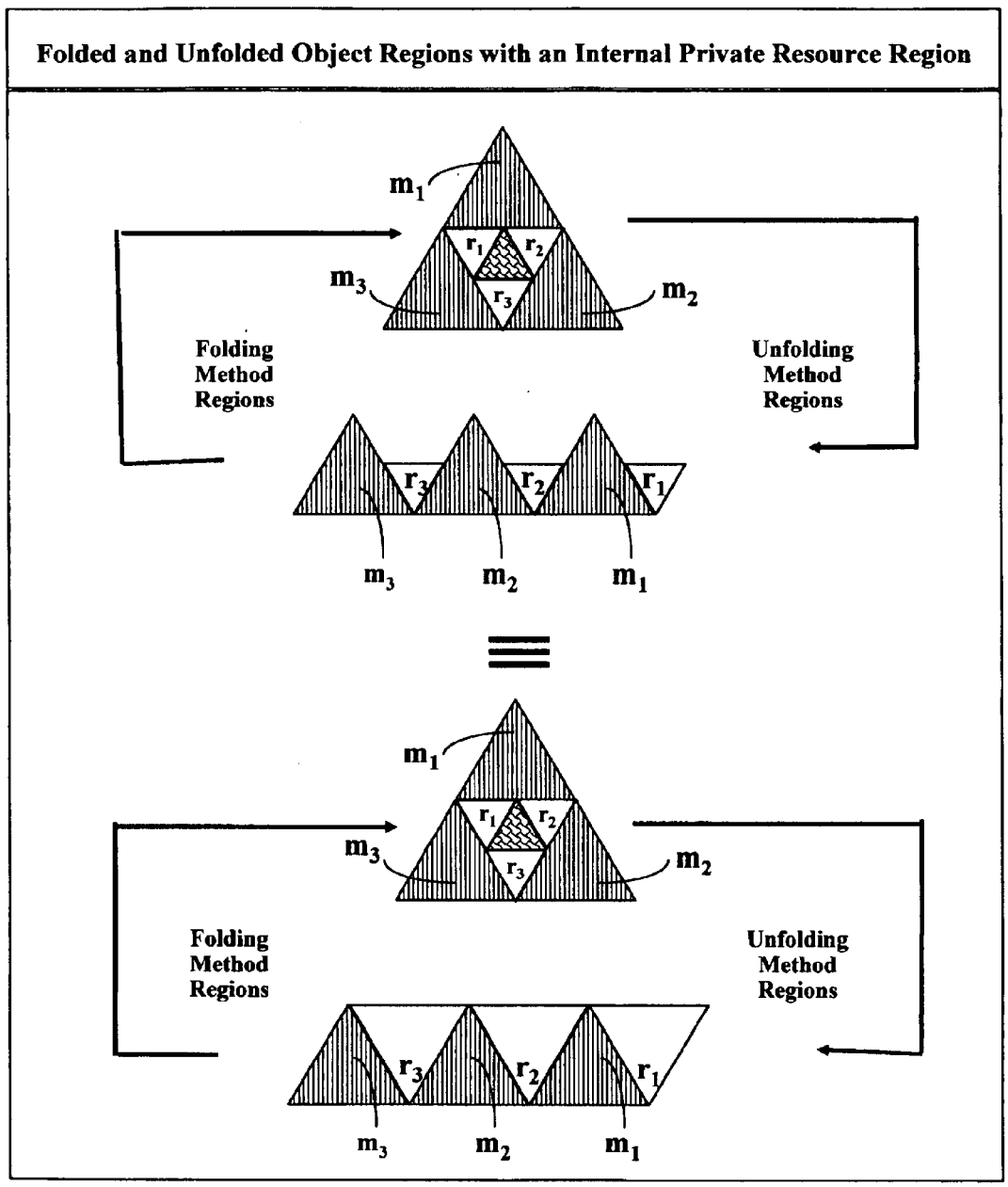
Figure 7: Folded and Unfolded Object Regions with an Internal Private Resource Region

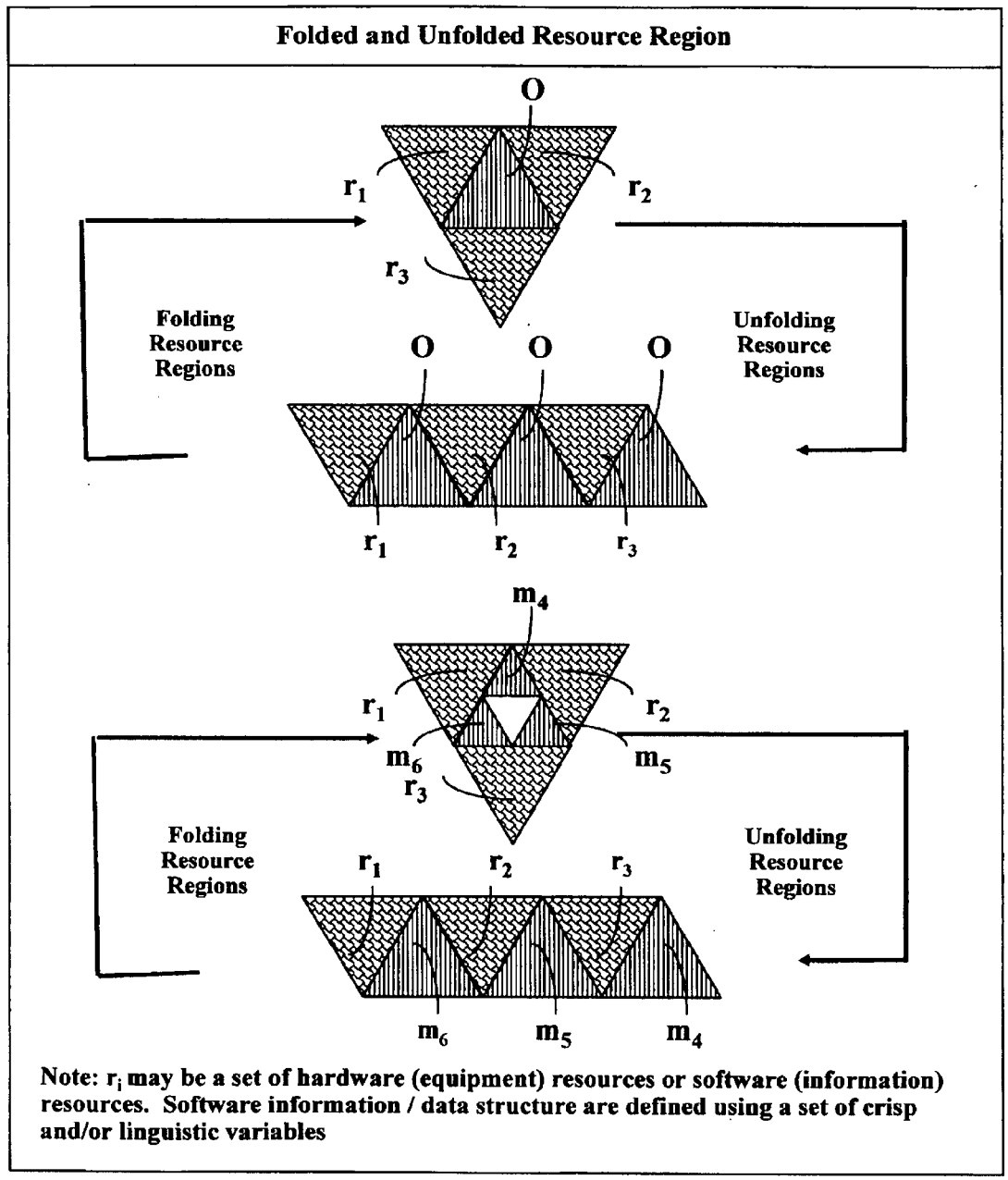
Figure 8: Folded and Unfolded Resource Region

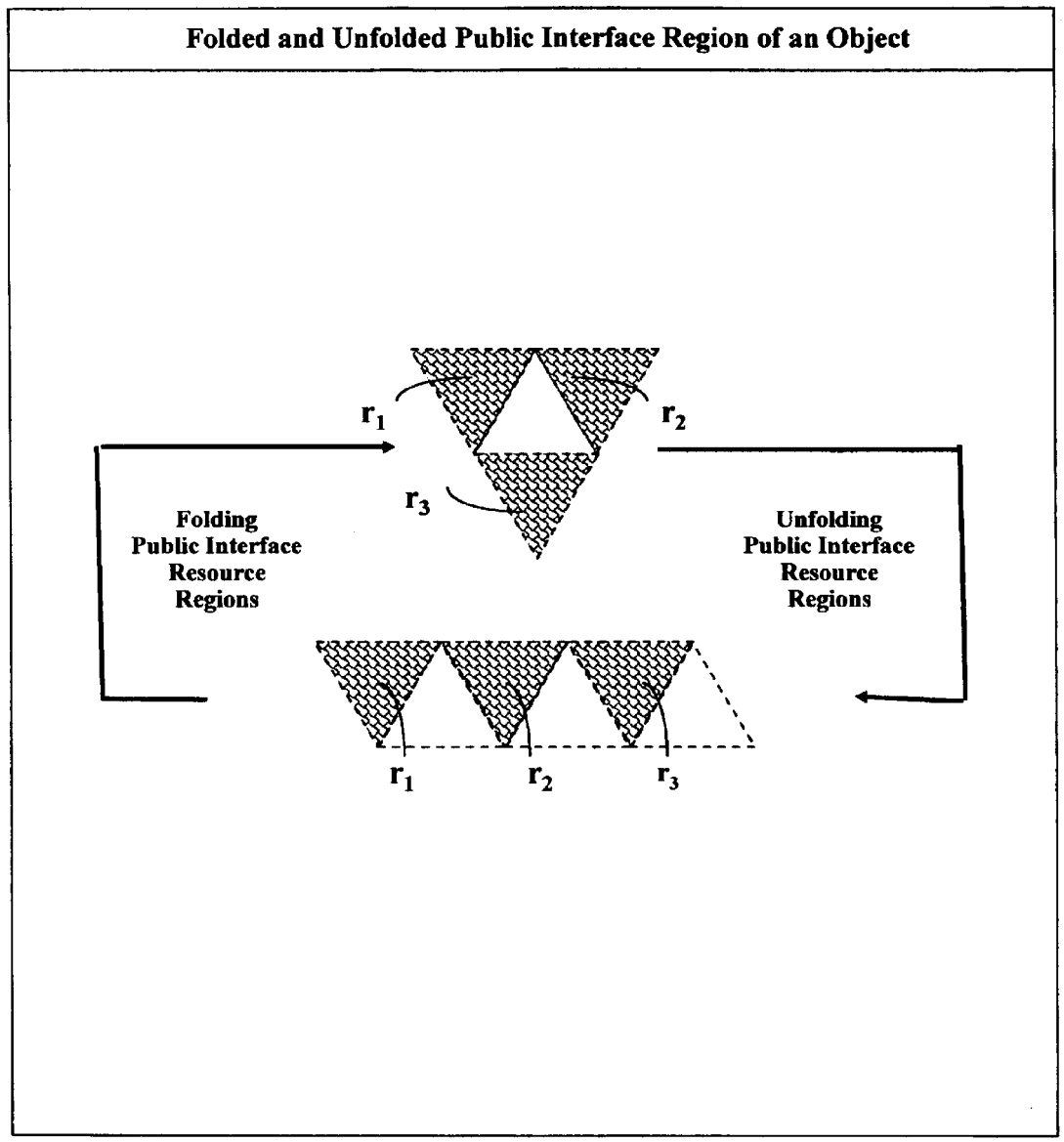
Figure 9: Folded and Unfolded Public Interface Region of an Object

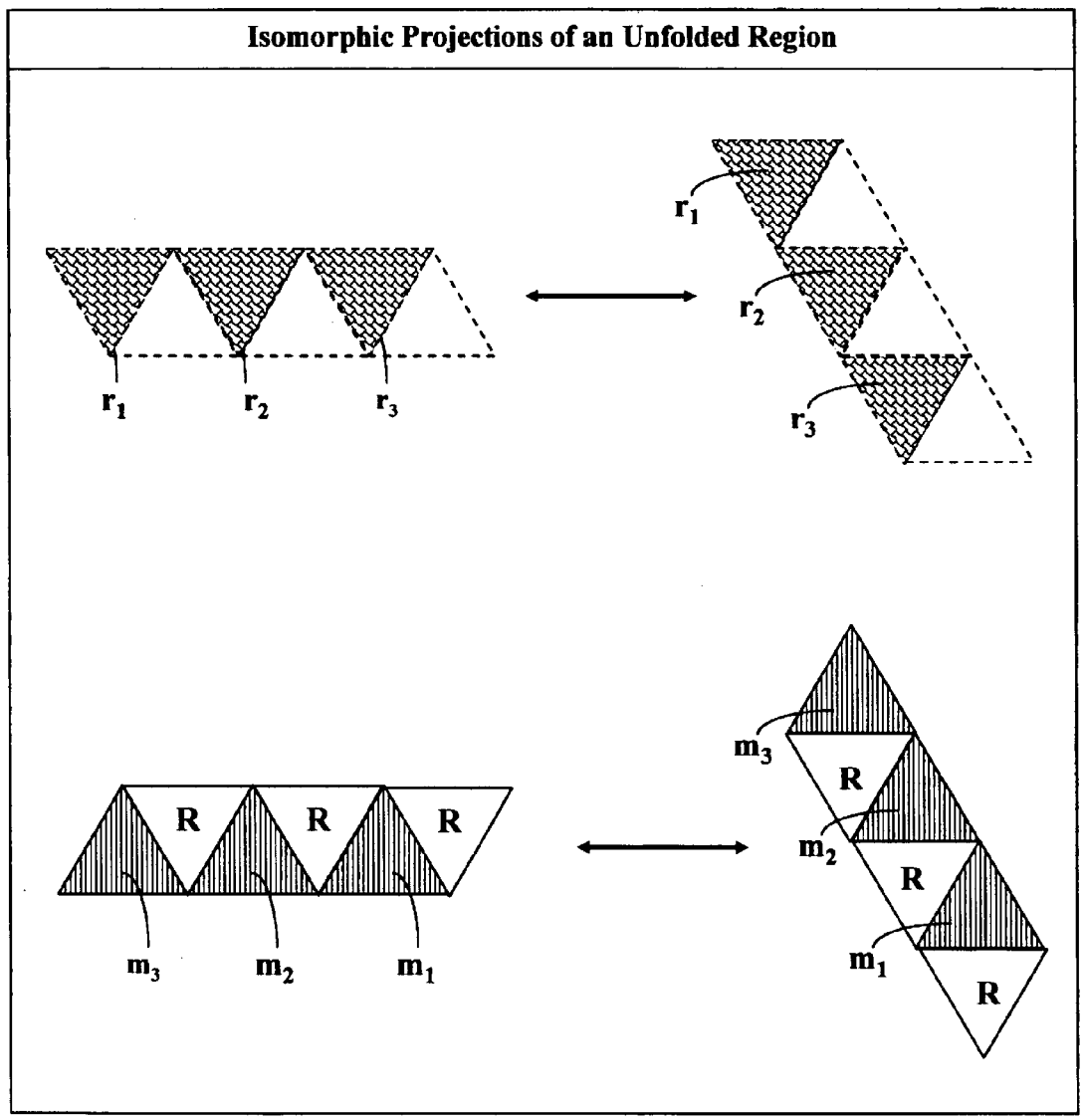
Figure 10: Isomorphic Projections of an Unfolded Region

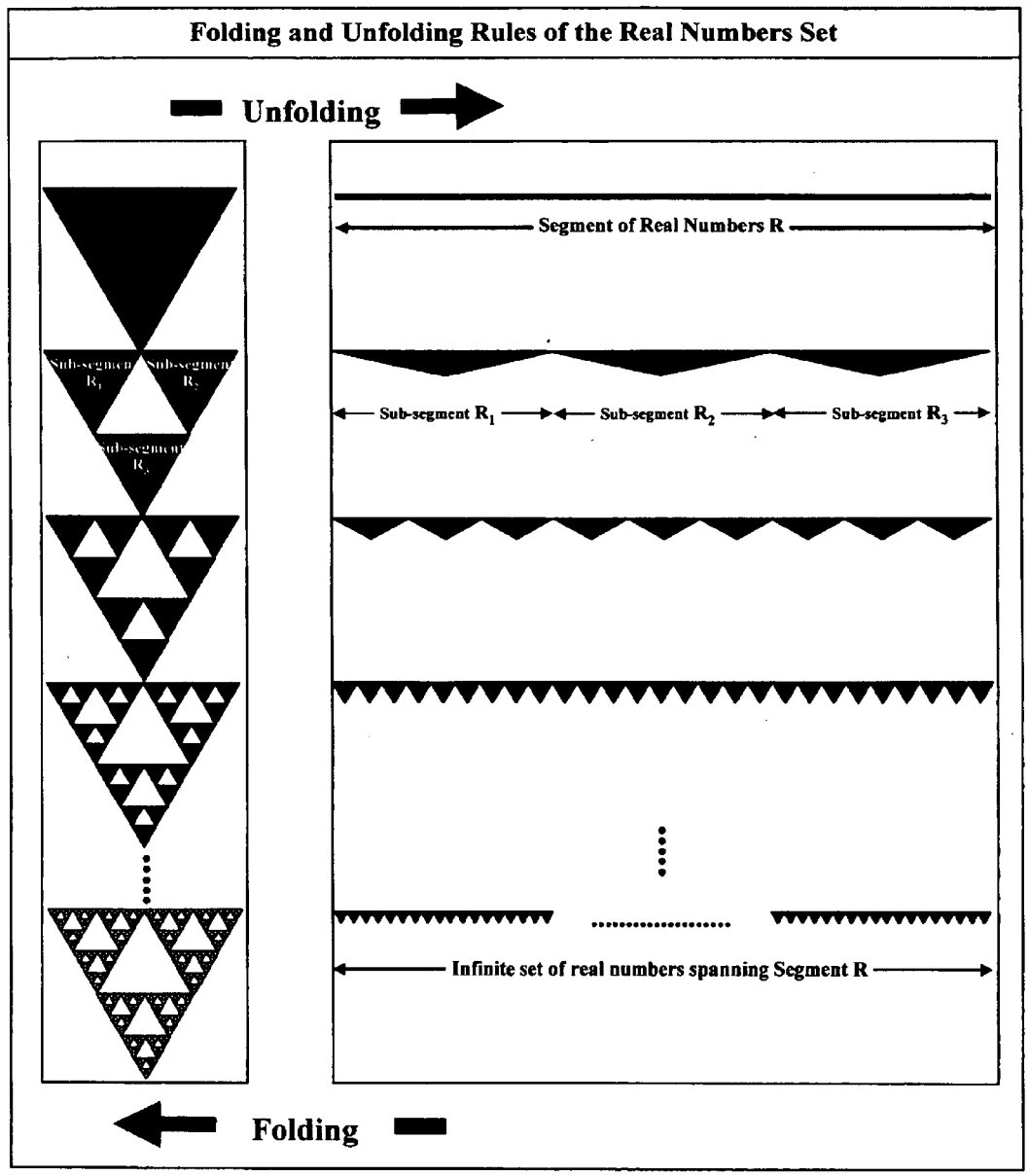
Figure 11: Folding and Unfolding Rules of the Real Numbers Set

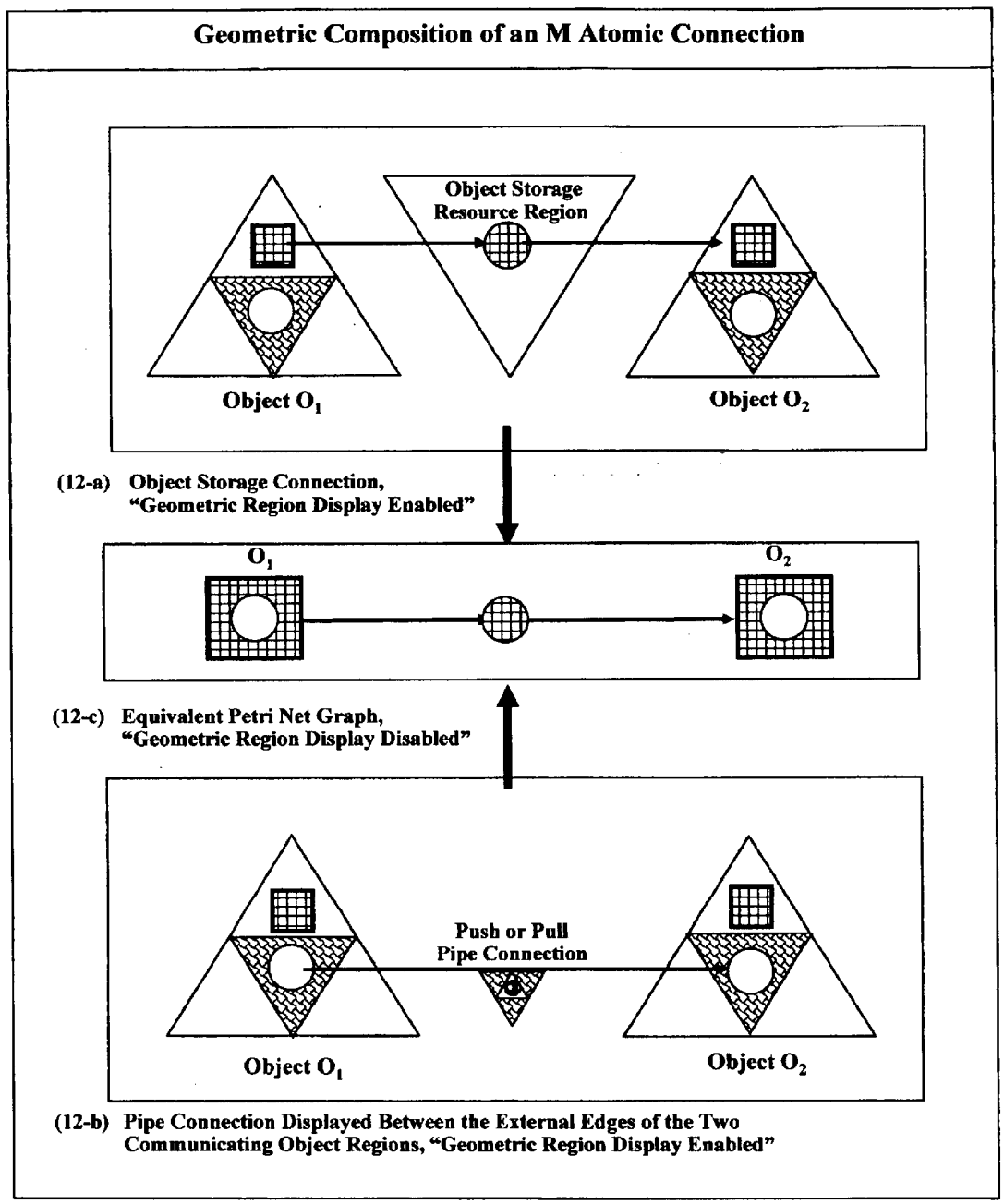
Figure 12: Geometric Composition of an M Atomic Connection

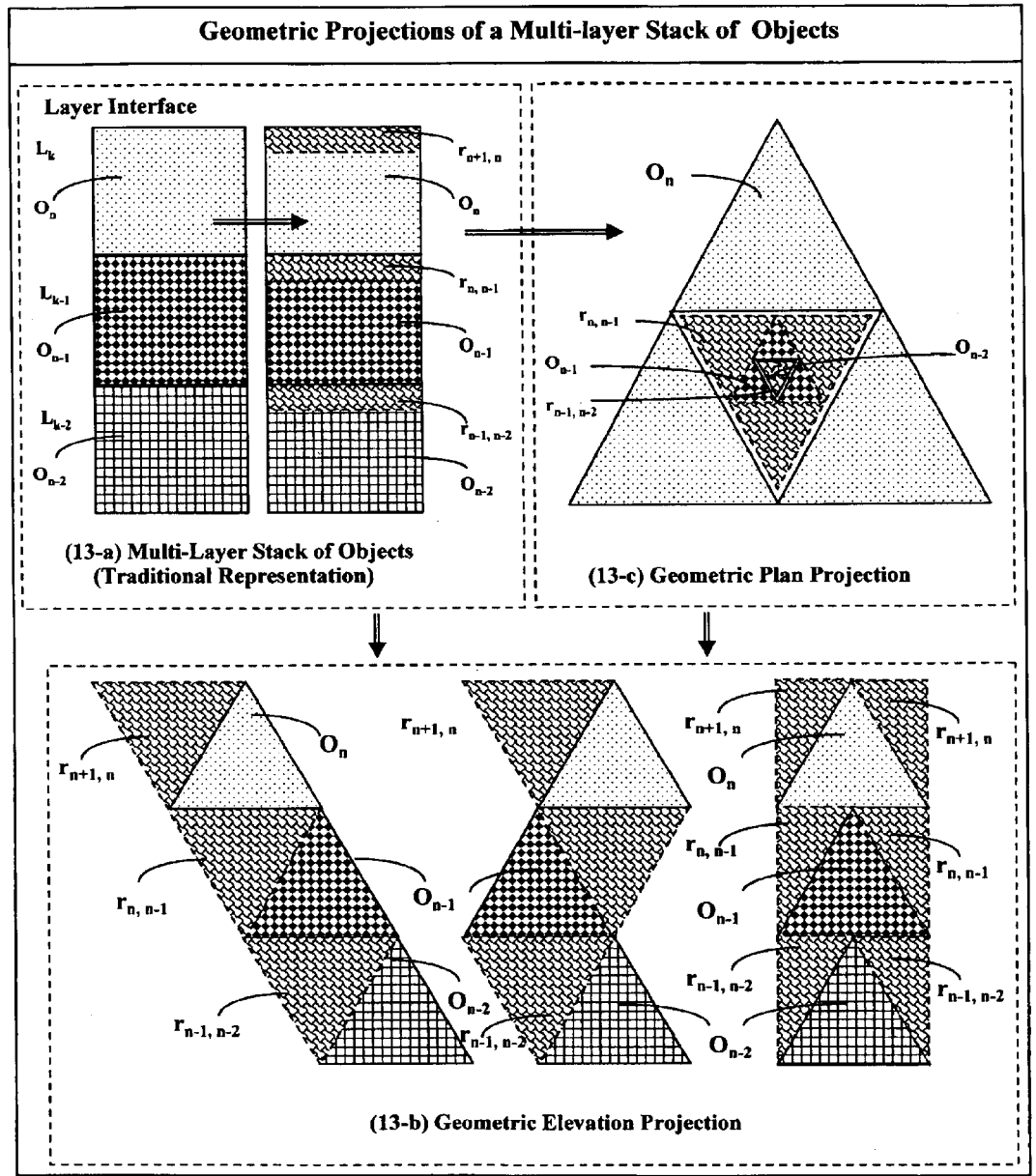
Figure 13: Geometric Projections of a Multi-layer Stack of Objects

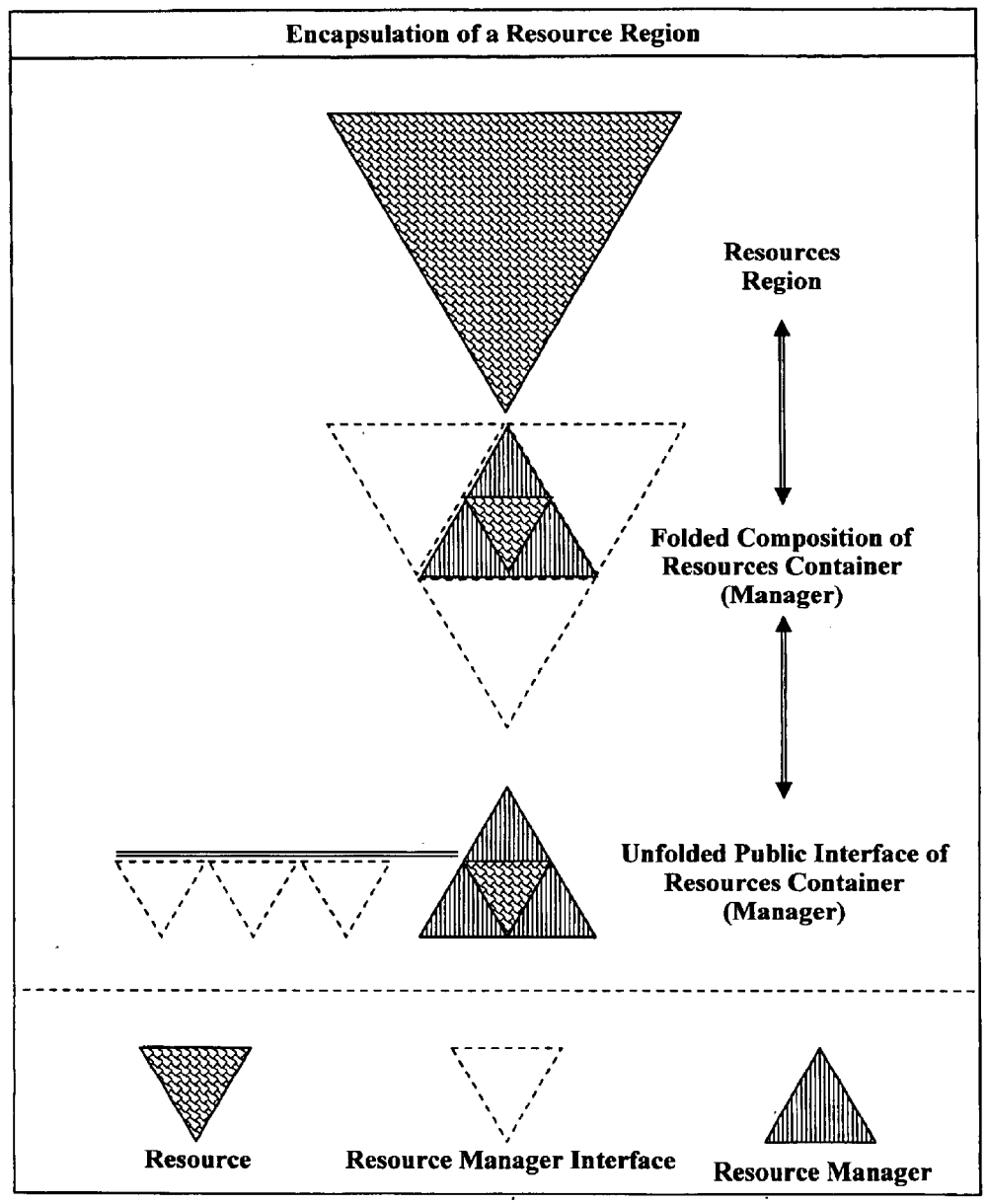
Figure 14: Encapsulation of a Resource Region

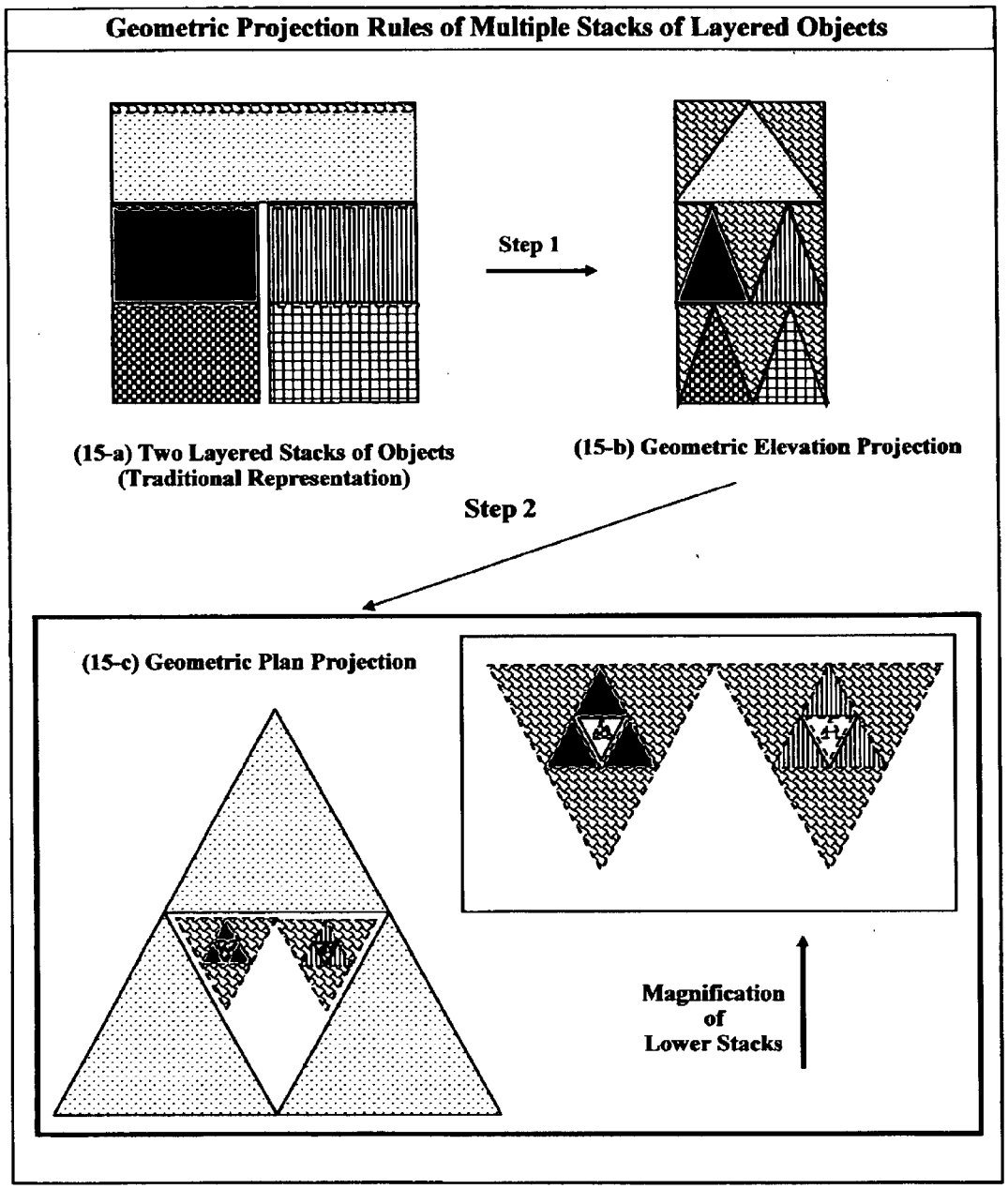
Figure 15: Geometric Projection Rules of Multiple Stacks of Layered Objects

| Features Table of Various Object Oriented Design Methods |||||||
|---|---|---|---|---|---|---|
| Author / Feature | Bailini | Coad | Jacobson | Odell | Rumbaugh | Shaler/ Mellor |
| Inheritance | N | Y | Y | Y | Y | Y |
| Multiple Inheritance | N | Y | Y | Y | Y | Y |
| Object Attributes | N | Y | Y | Y | Y | Y |
| Aggregation | Y | Y | N | Y | Y | N |
| Relation/Functions | Y | Y | Y | Y | Y | Y |
| State Transition | N | Y | Y | Y | Y | Y |
| Events | Y | Y | Y | Y | Y | Y |
| Event Traces Use Cases | Y | N | Y | Y | Y | Y |
| Triggers |  | N | N | Y | N | Y |
| Data Flow Diagrams | Y | Y | Y | Y | Y | Y |
| Global Parallelism |  | N |  | Y | Y | Y |
| Parallelism inside Object |  | N |  | Y | Y | N |

Figure 16: Features Table of Various Object Oriented Design Methods

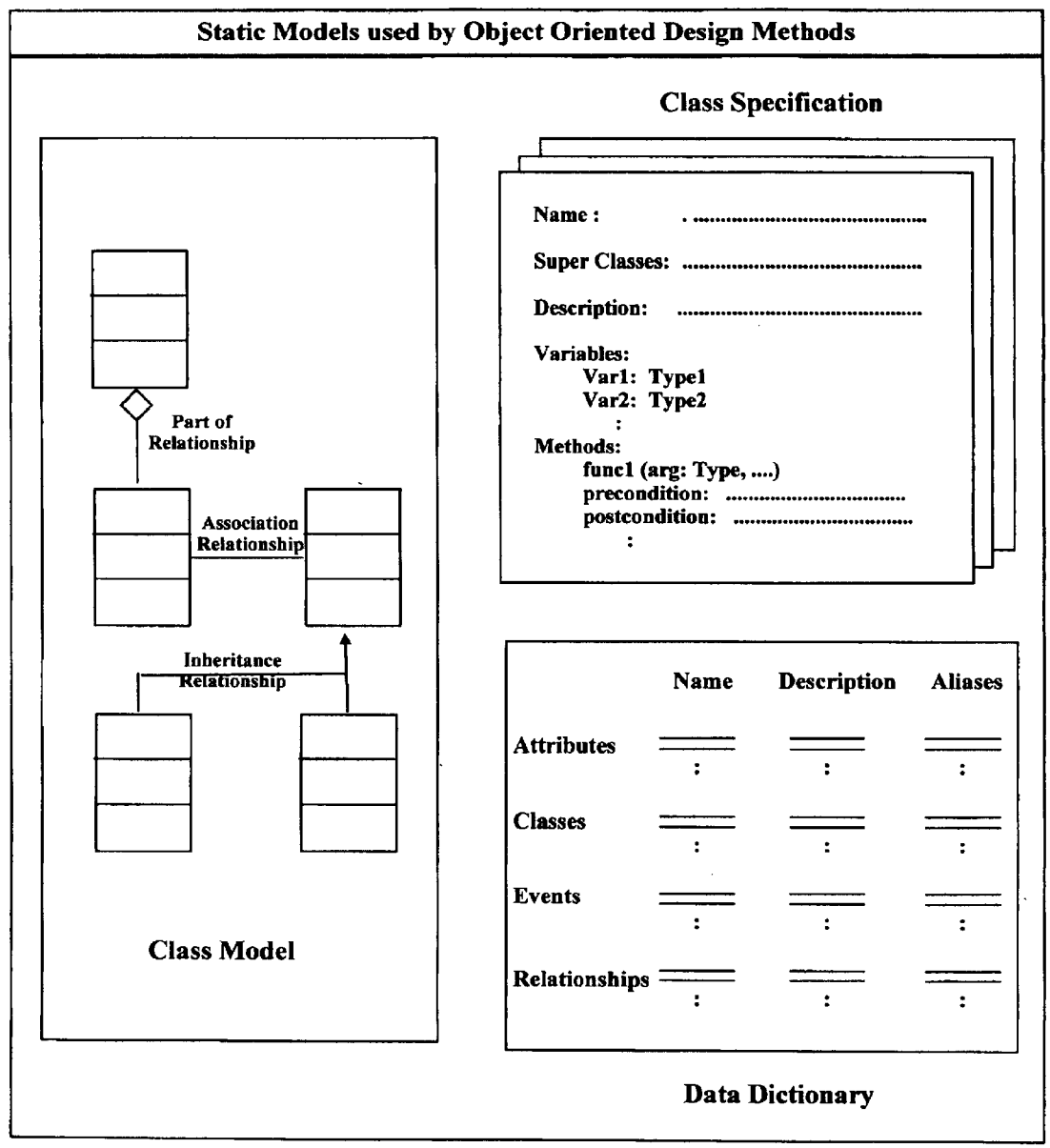
Figure 17: Static Models used by Object Oriented Design Methods

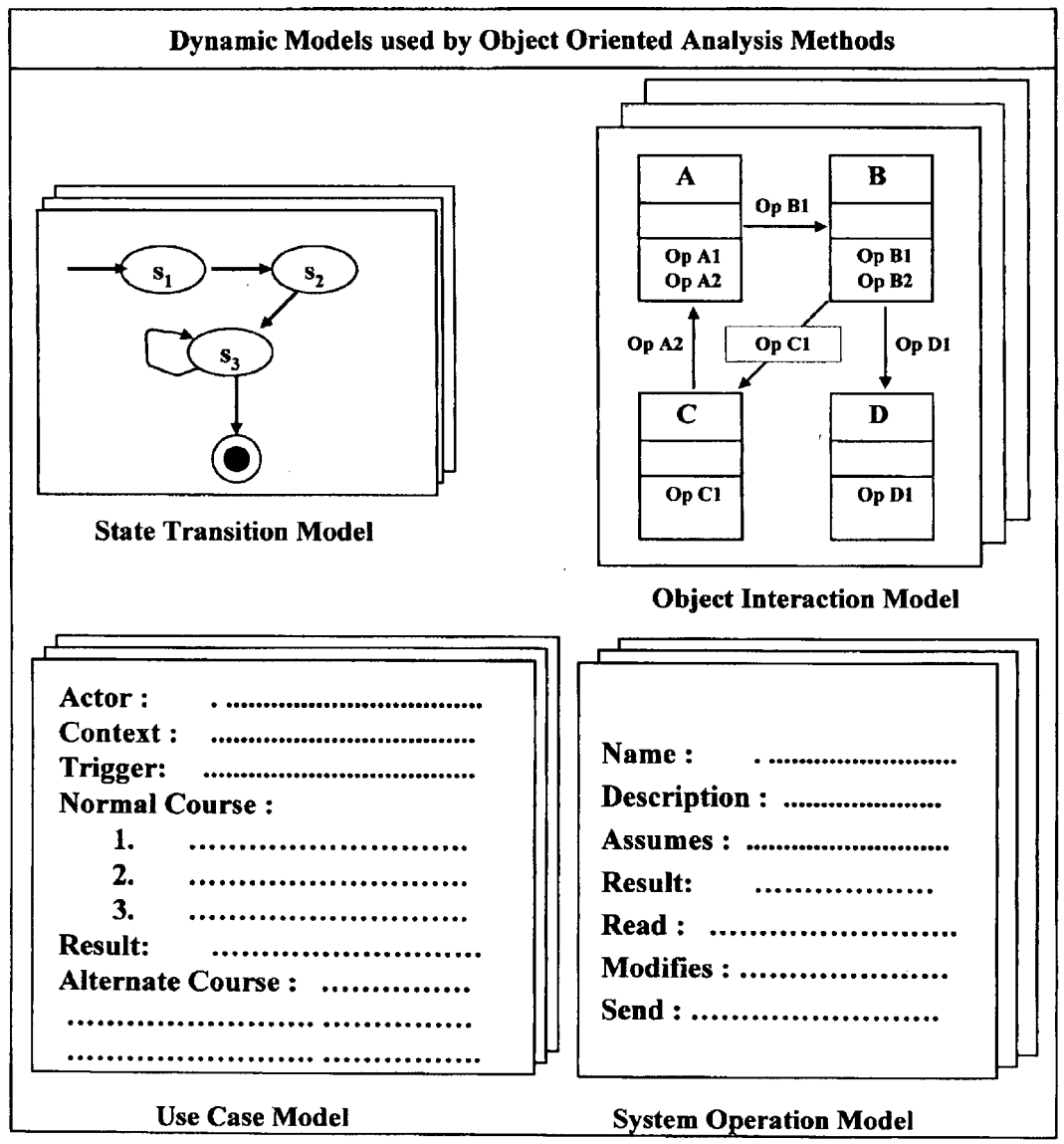
Figure 18: Dynamic Models used by Object Oriented Analysis Methods

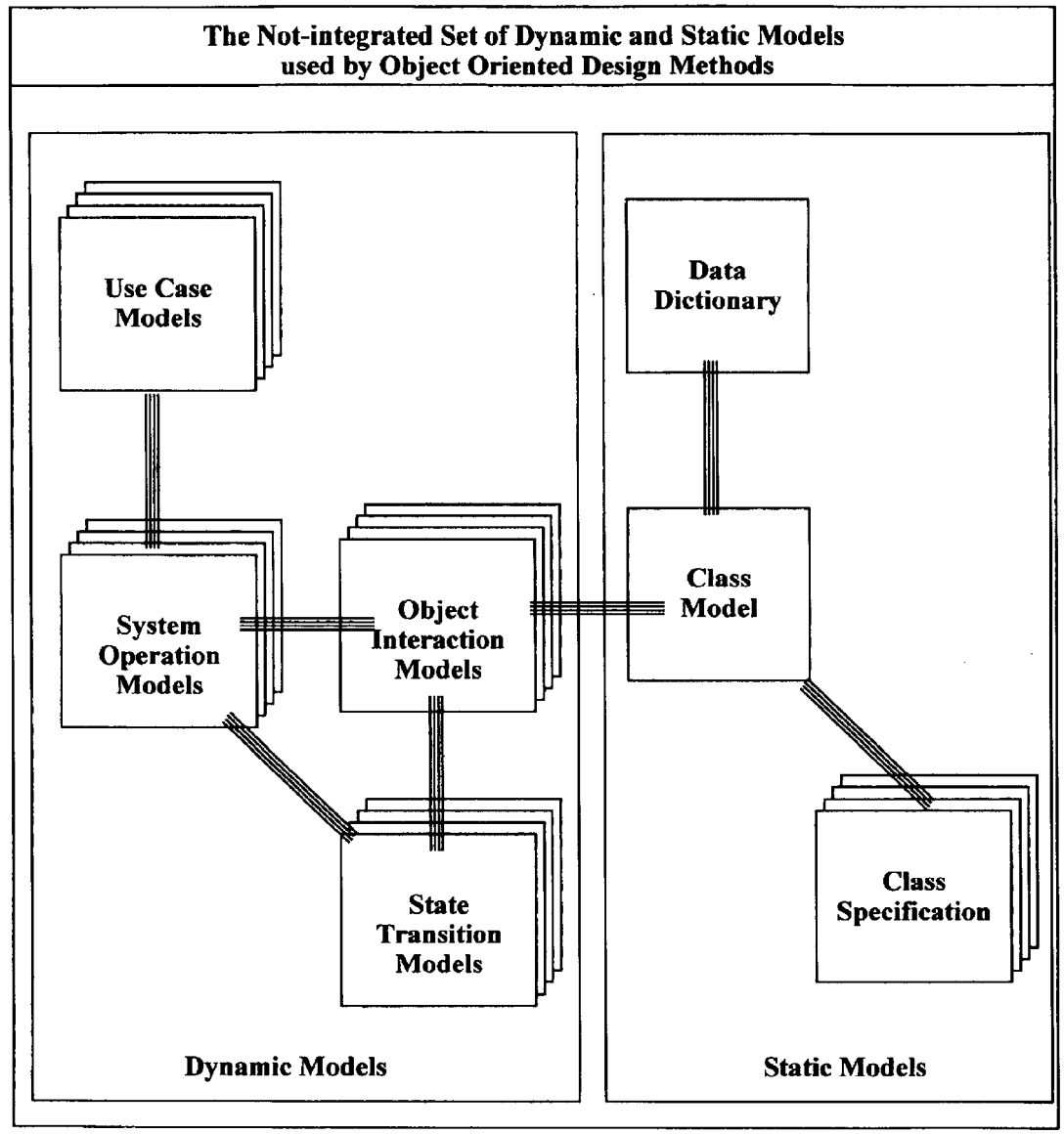
Figure 19: The Not-integrated Set of Dynamic and Static Models used by Object Oriented Design Methods

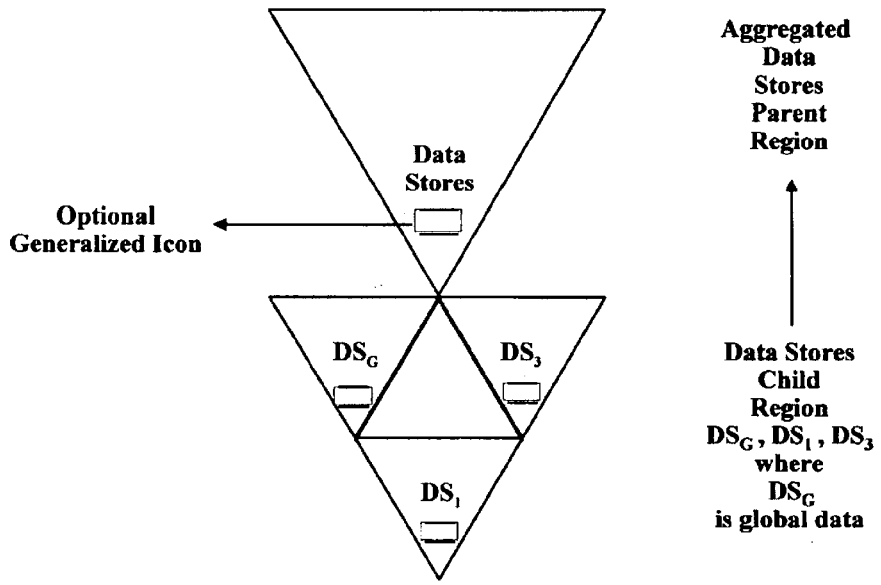
Figure 20: Geometric Representation Rules of Hierarchical Data Structures

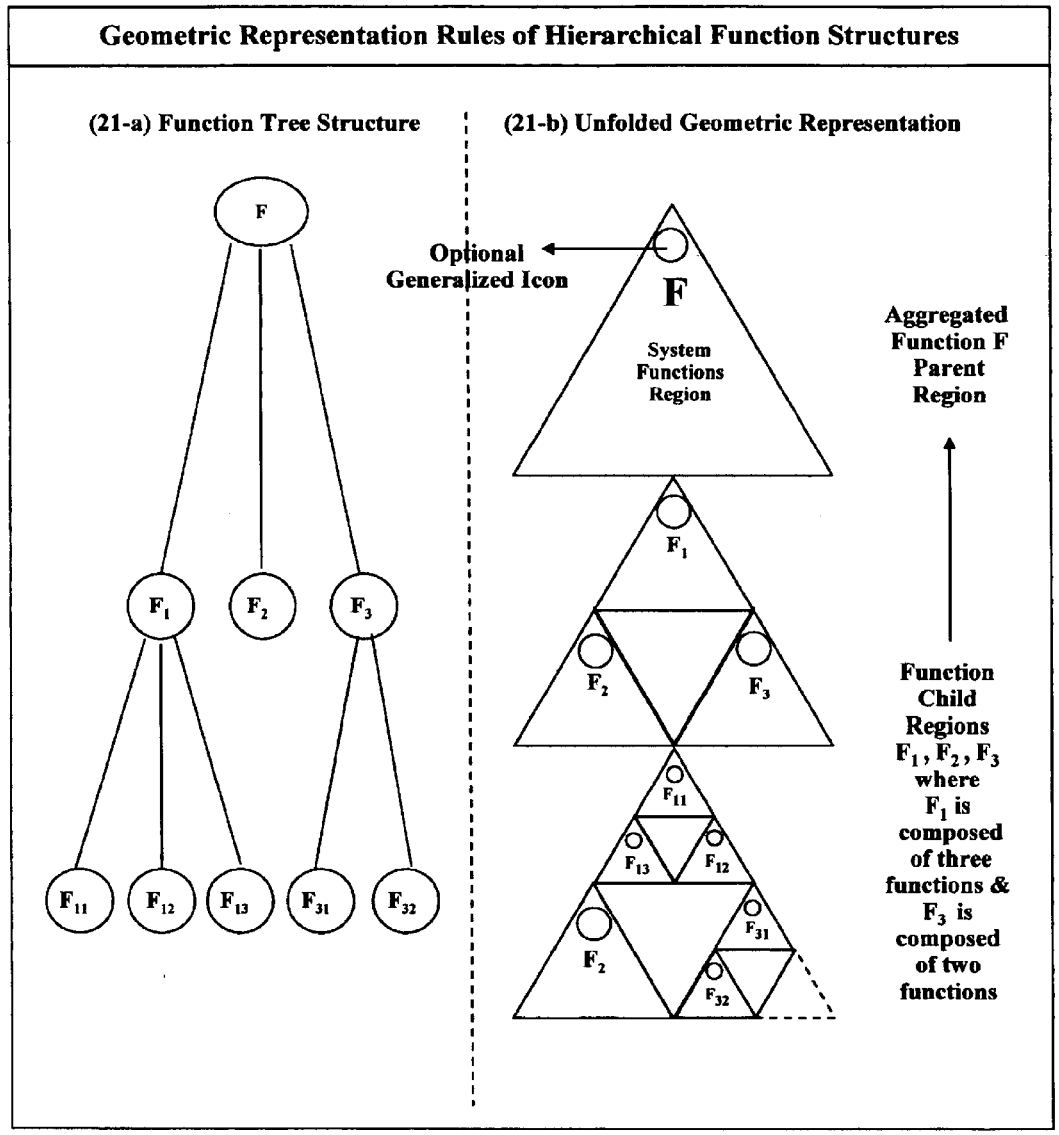
Figure 21: Geometric Representation Rules of Hierarchical Function Structures

Geometric Representation Rules of State Transition Graphs
(22-a) State Transition Graph
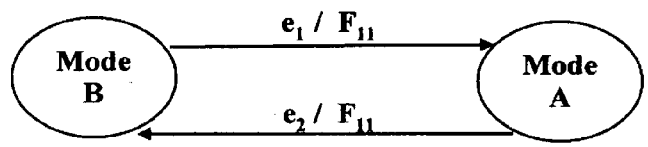
(22-b) Unfolded Geometric Representation
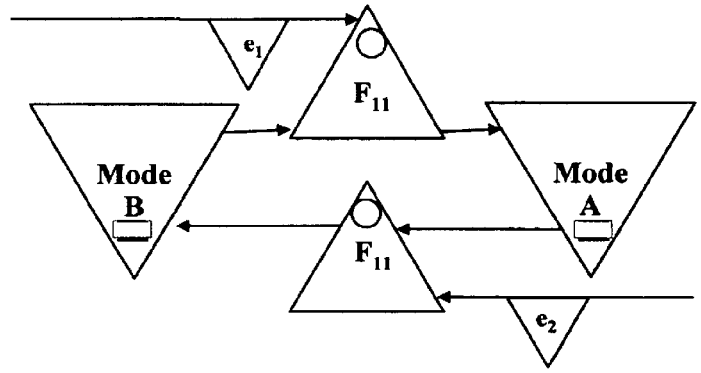
Figure 22: Geometric Representation Rules of State Transition Graphs

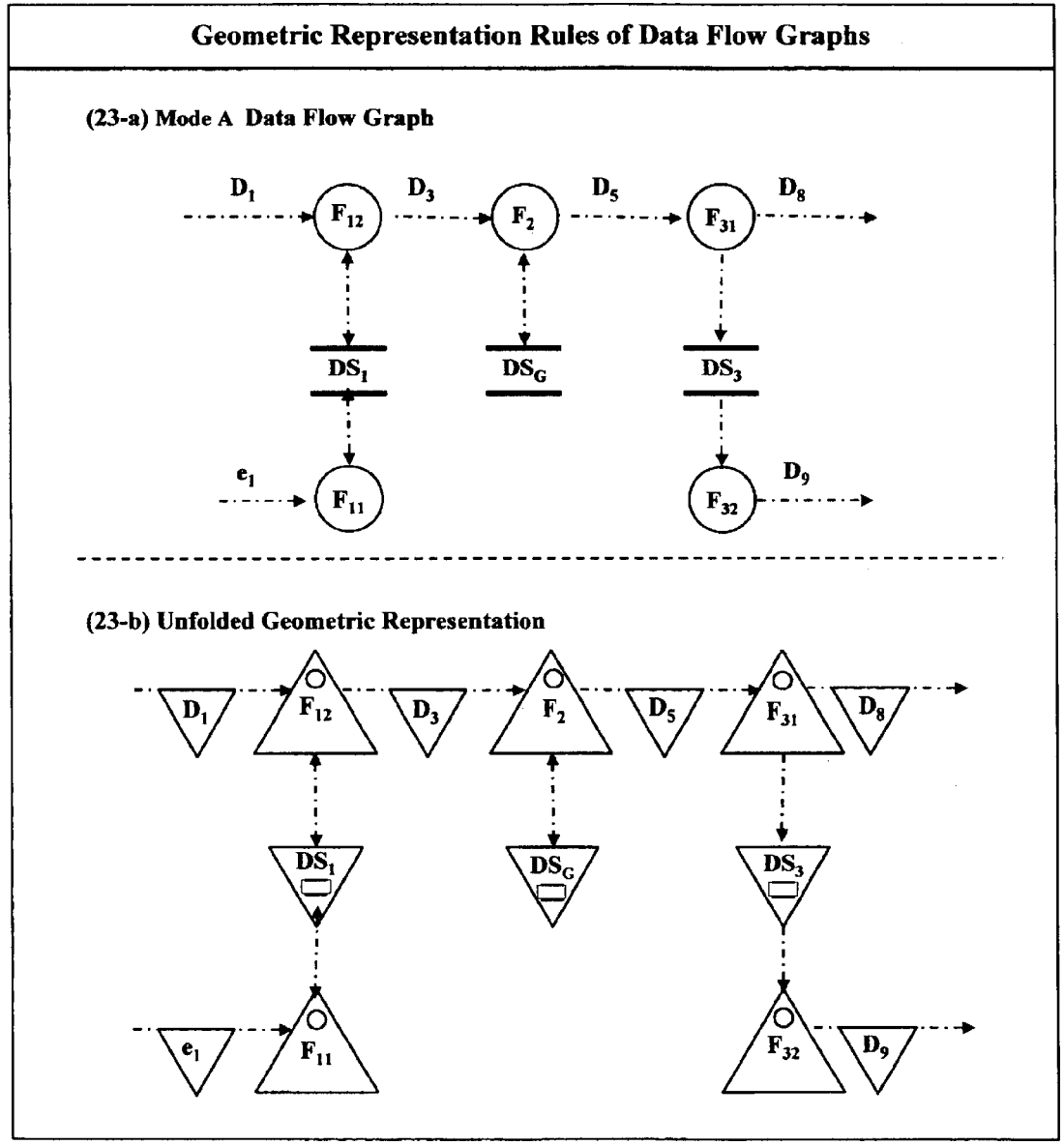
Figure 23: Geometric Representation Rules of Data Flow Graphs

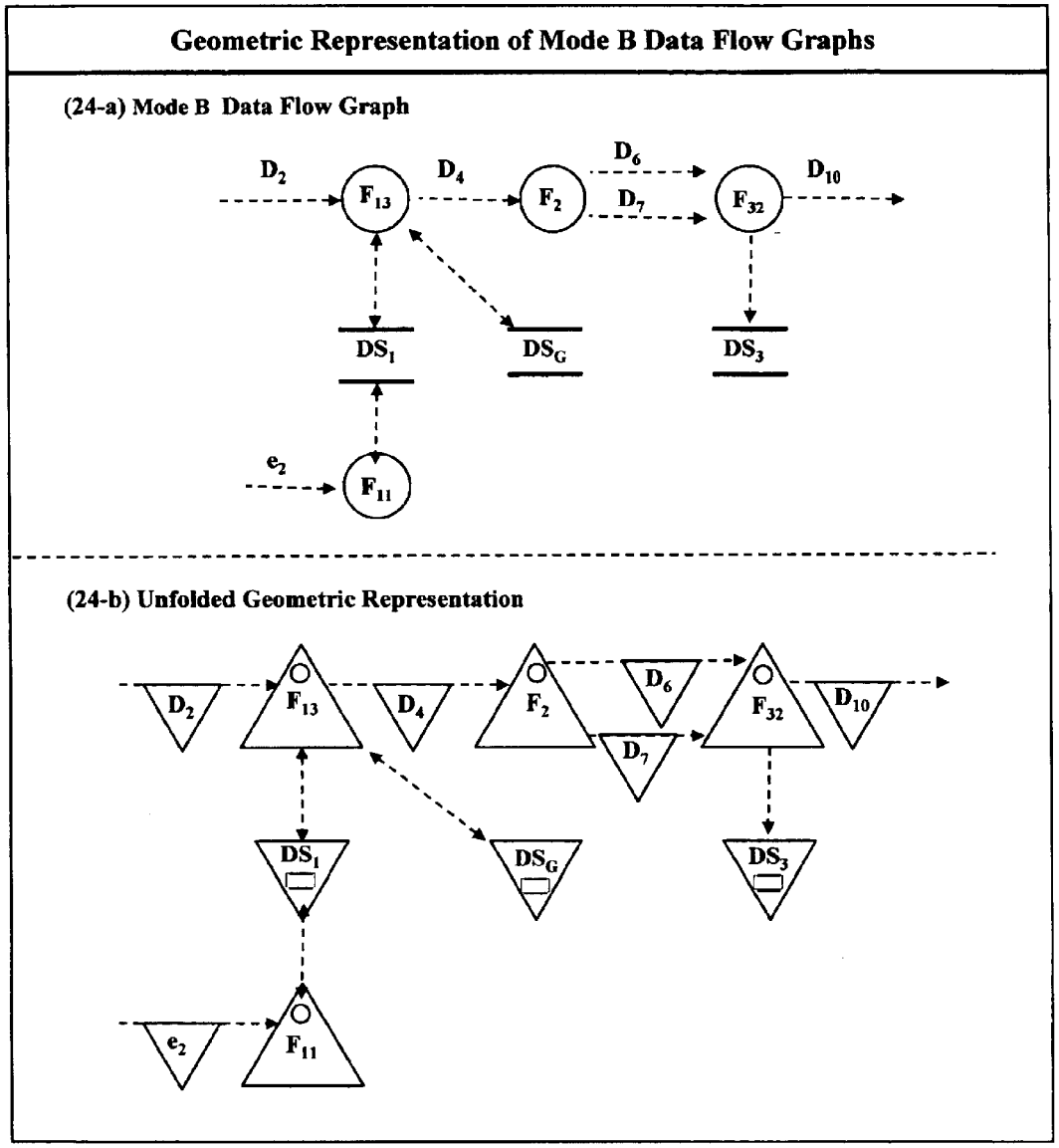
Figure 24: Geometric Representation of Mode B Data Flow Graphs

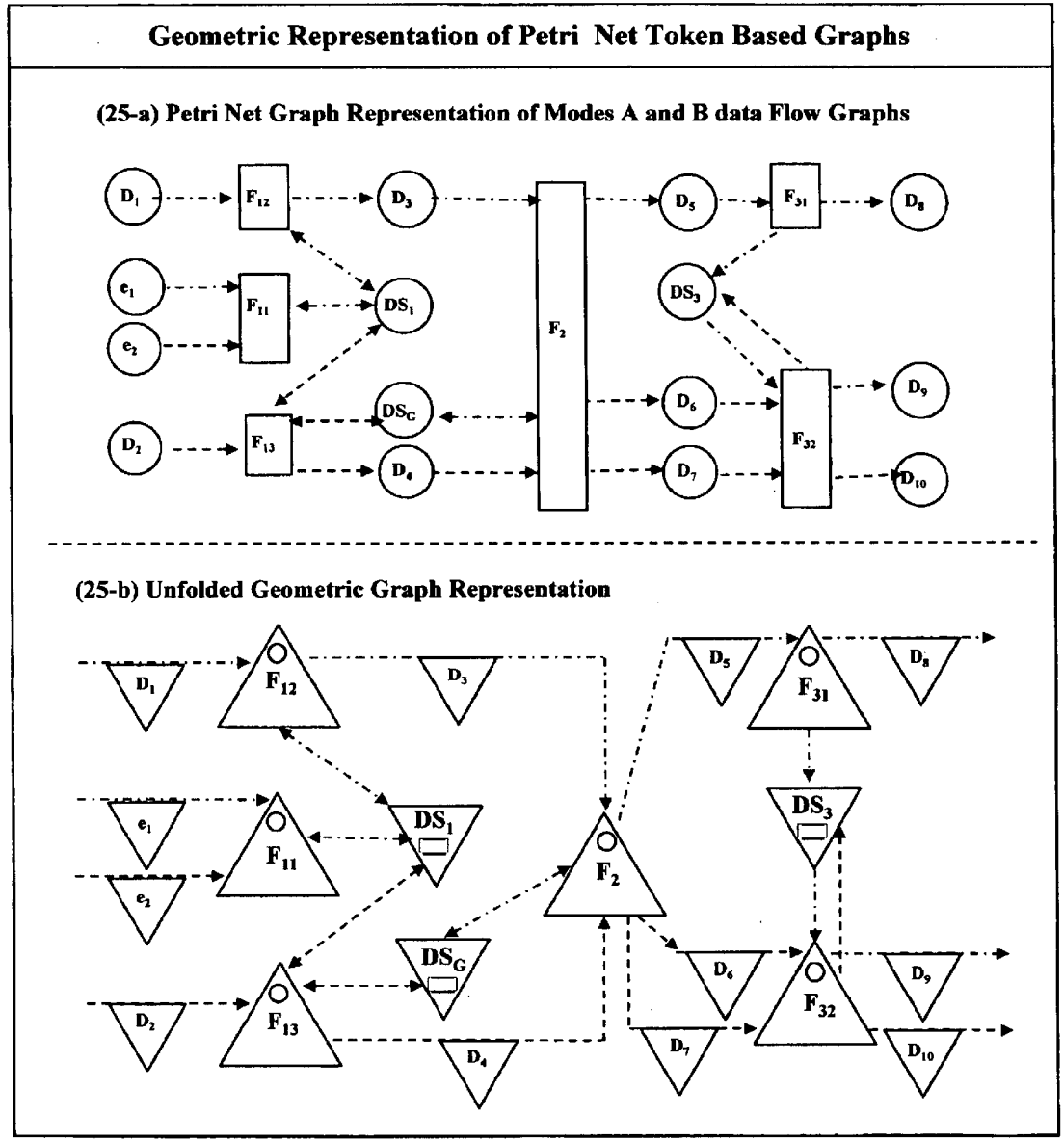
Figure 25: Geometric Representation of Petri Net Token Based Graphs

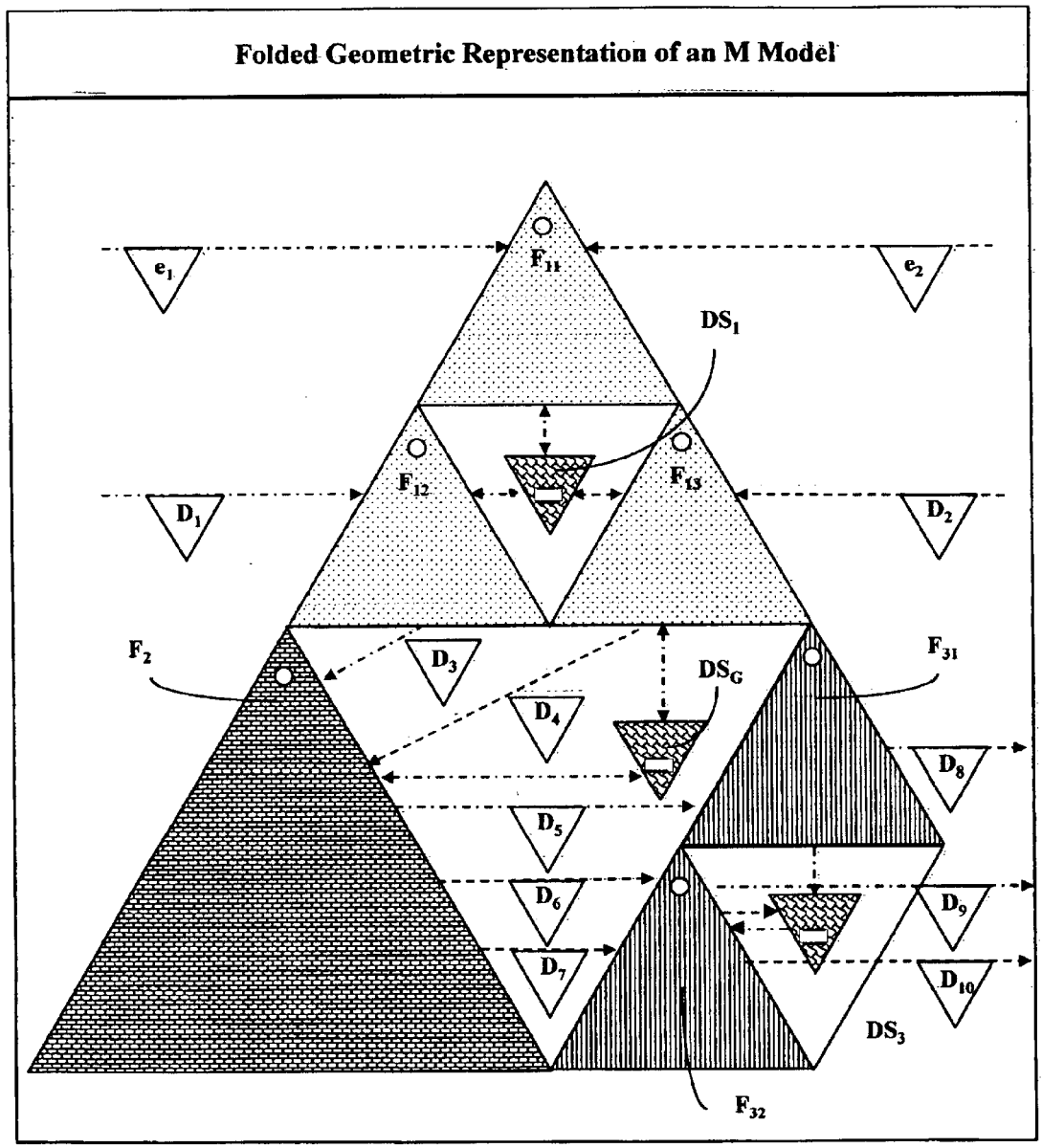
Figure 26: Folded Geometric Representation of an M Model

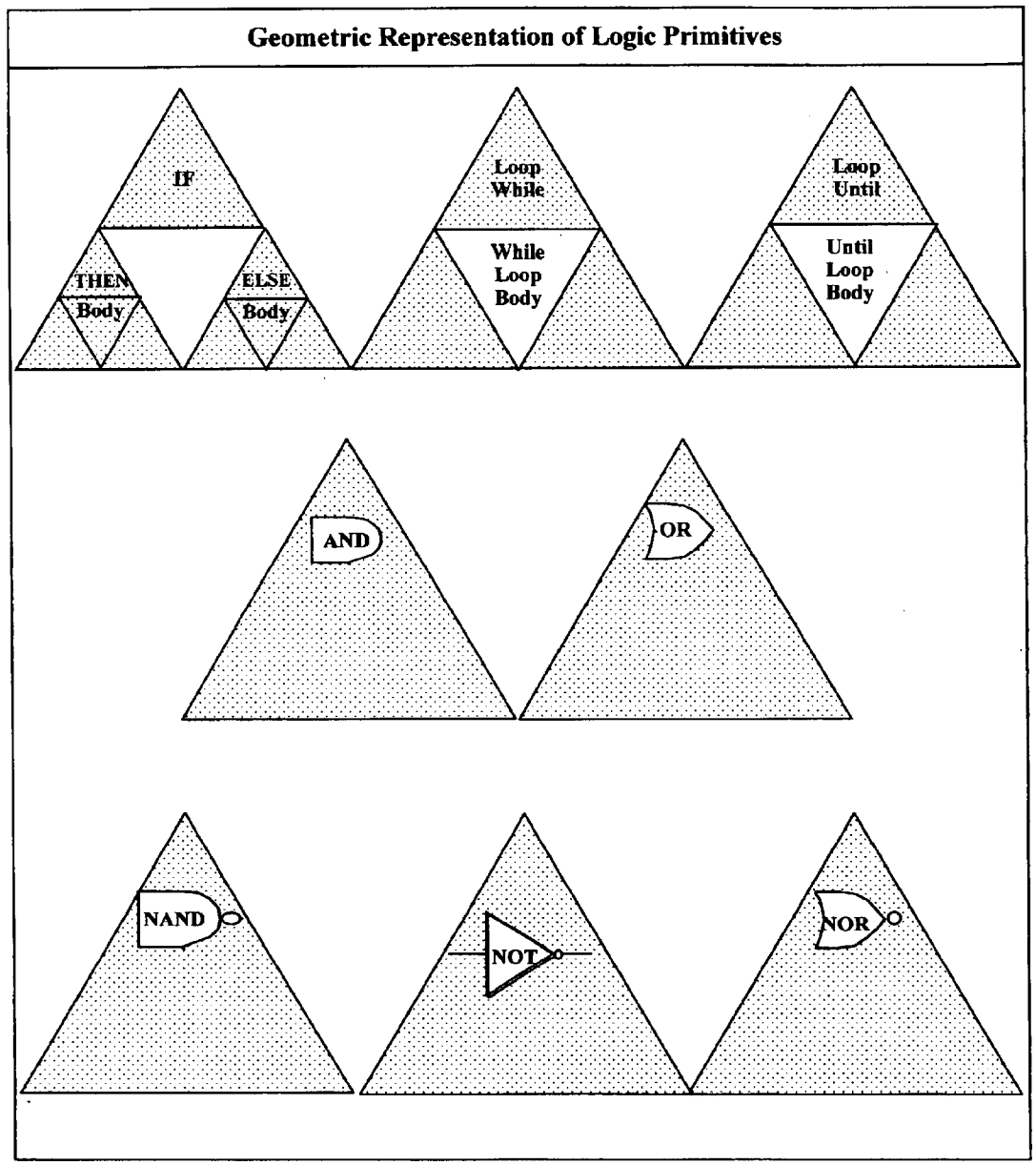
Figure 27: Geometric Representation of Logic Primitives

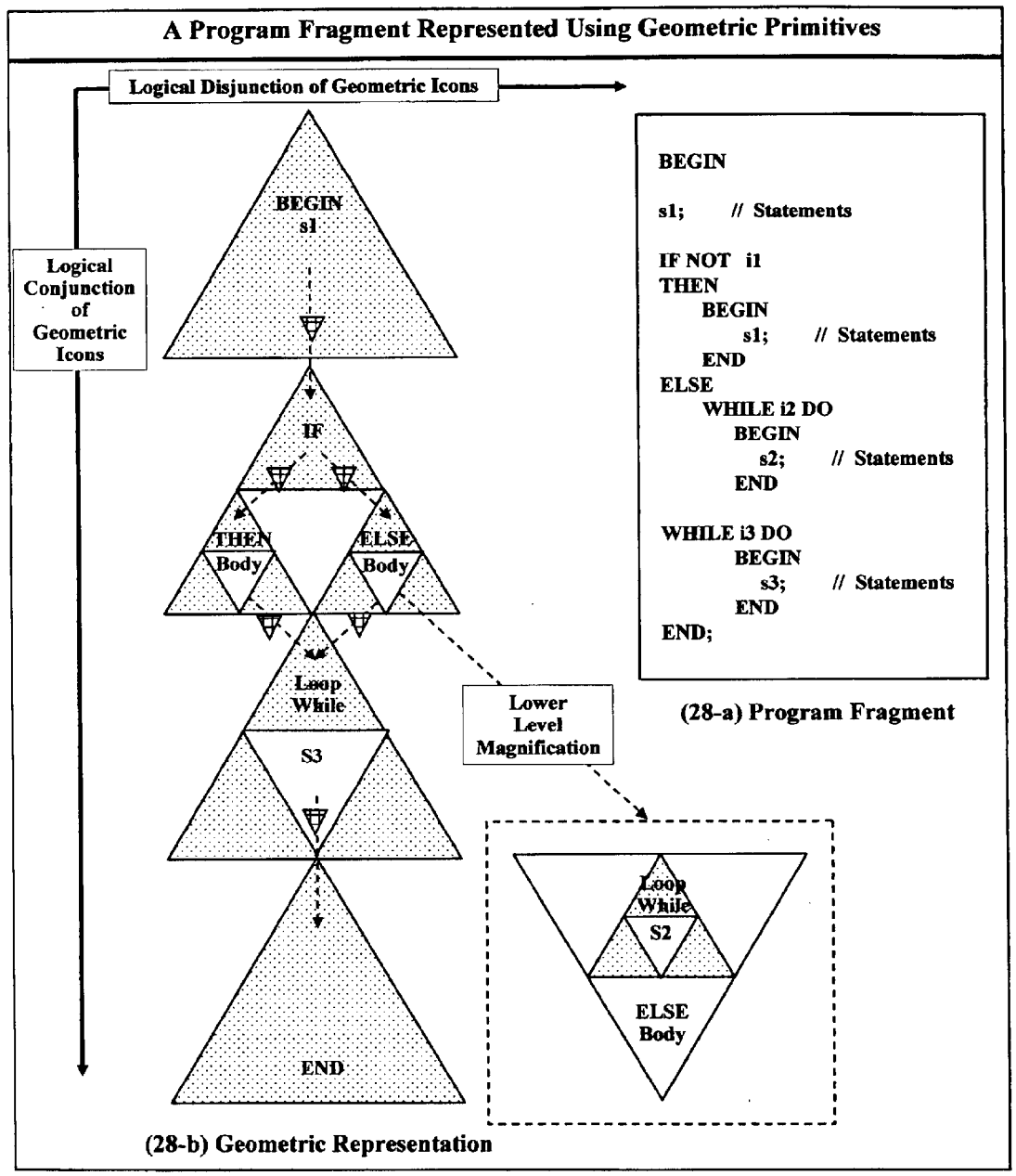
Figure 28: A Program Fragment Represented Using Geometric Primitives

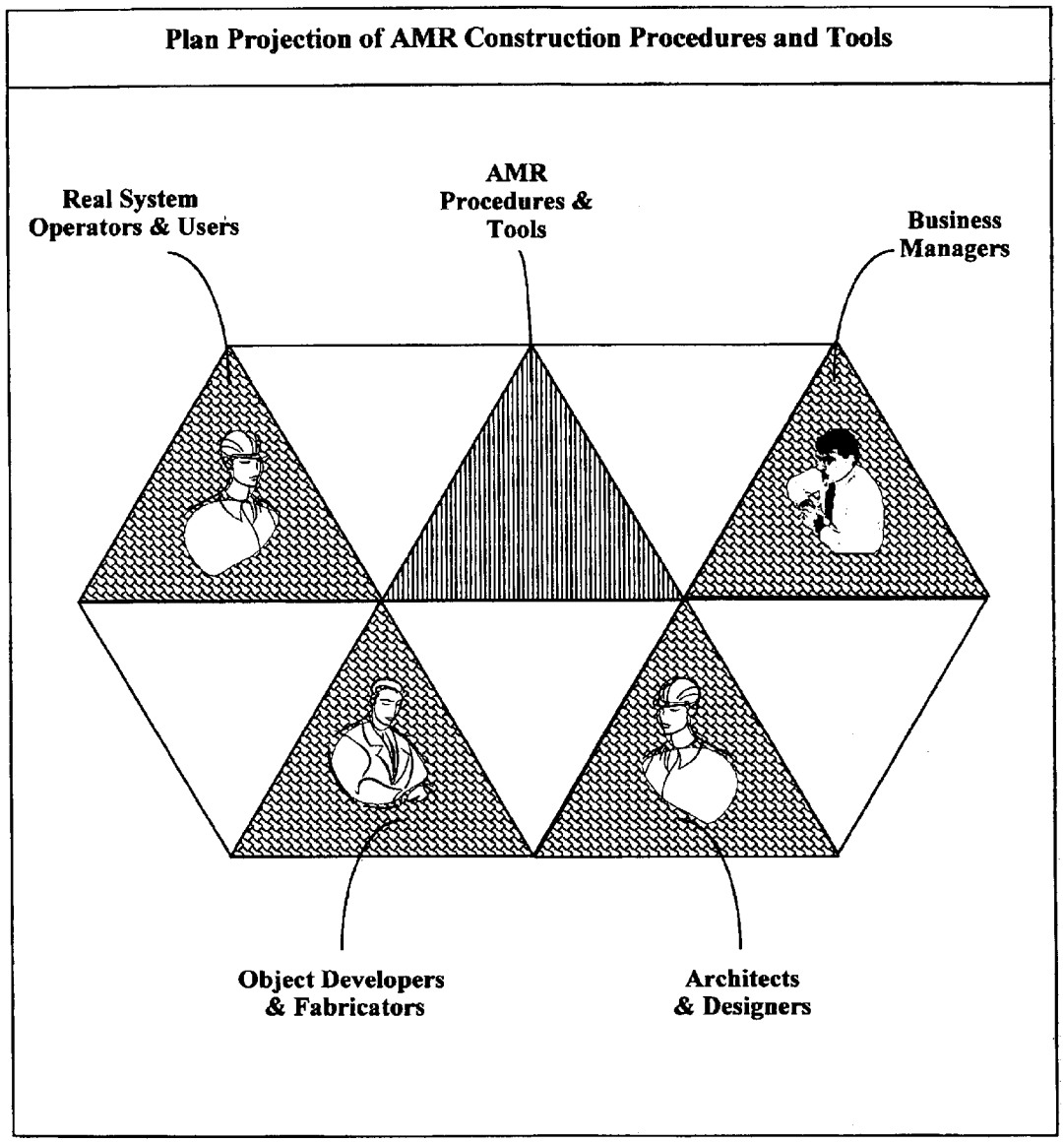
Figure 29: Plan Projection of AMR Construction Procedures and Tools

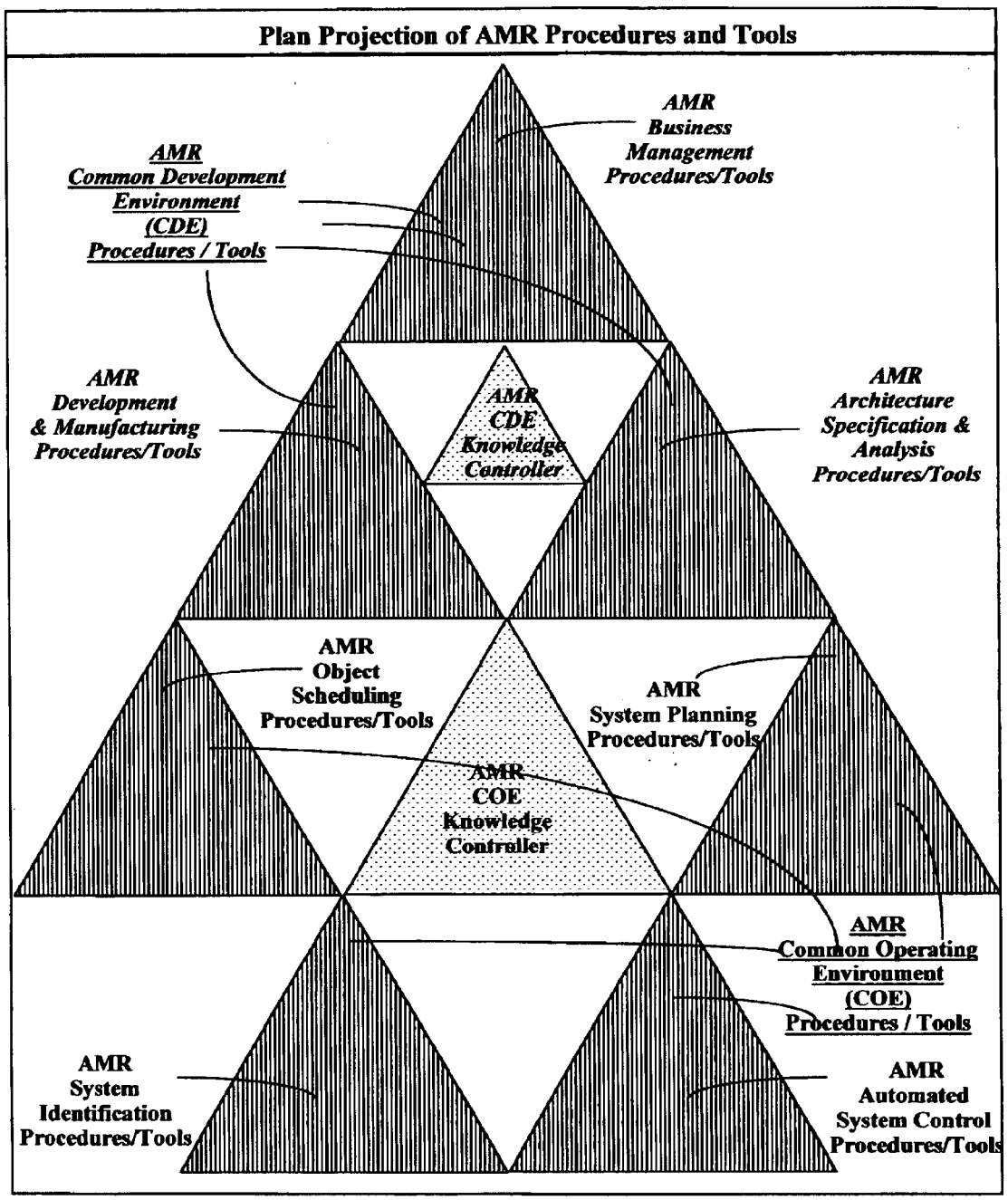
Figure 30: Plan Projection of AMR Procedures and Tools

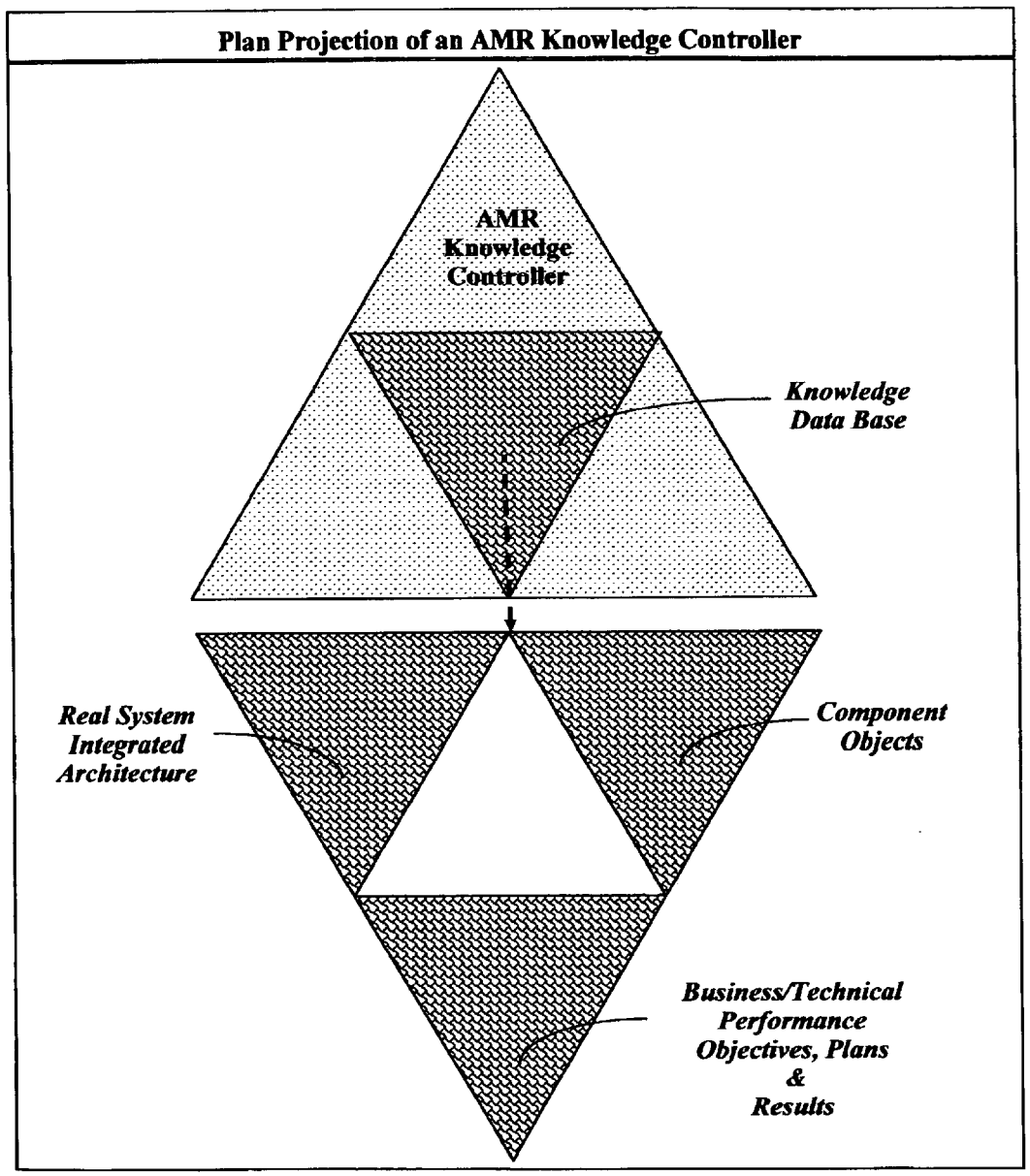
Figure 31: Plan Projection of AMR Knowledge Controller

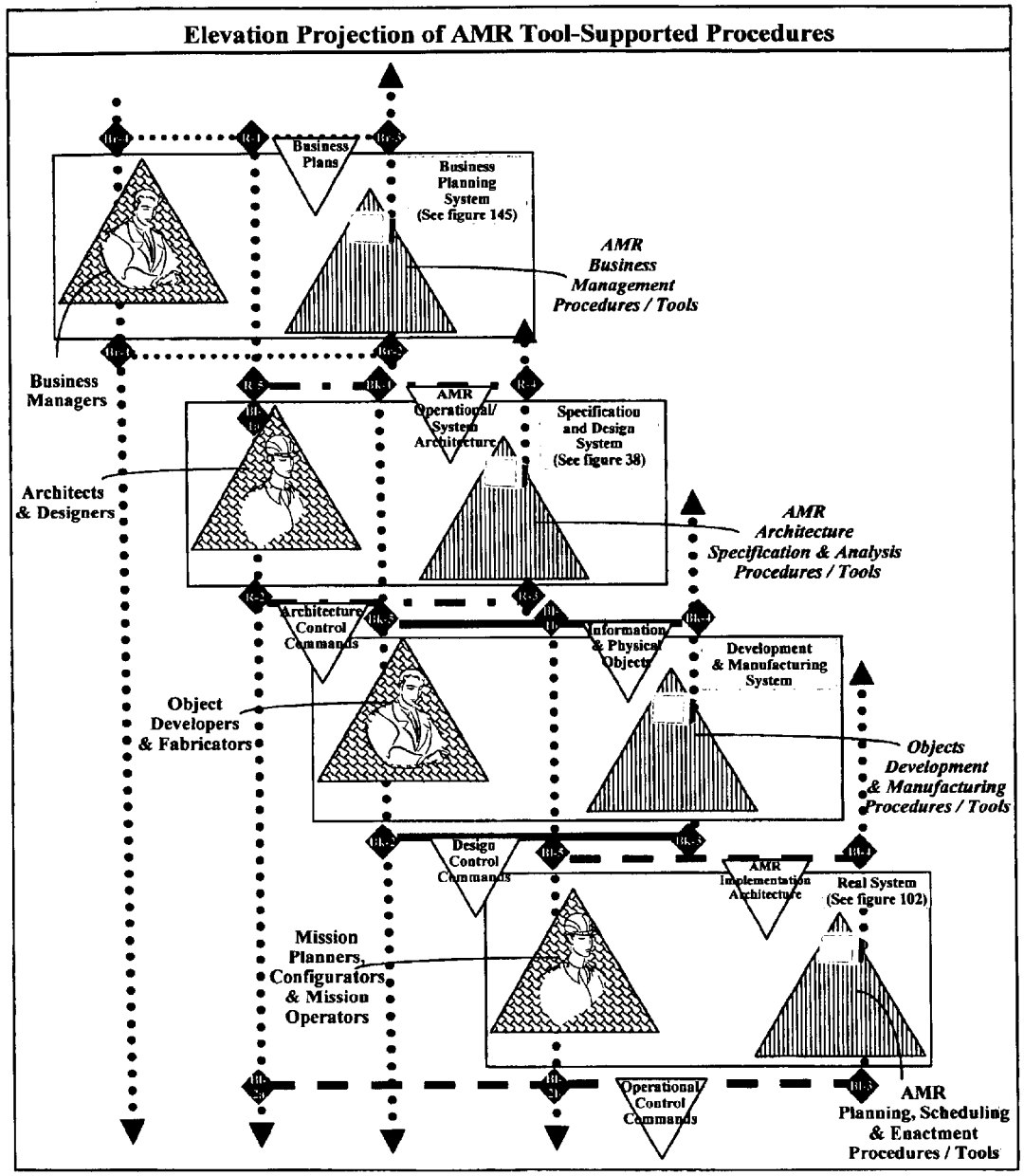
Figure 32: Elevation Projection of AMR Tool-Supported Procedures

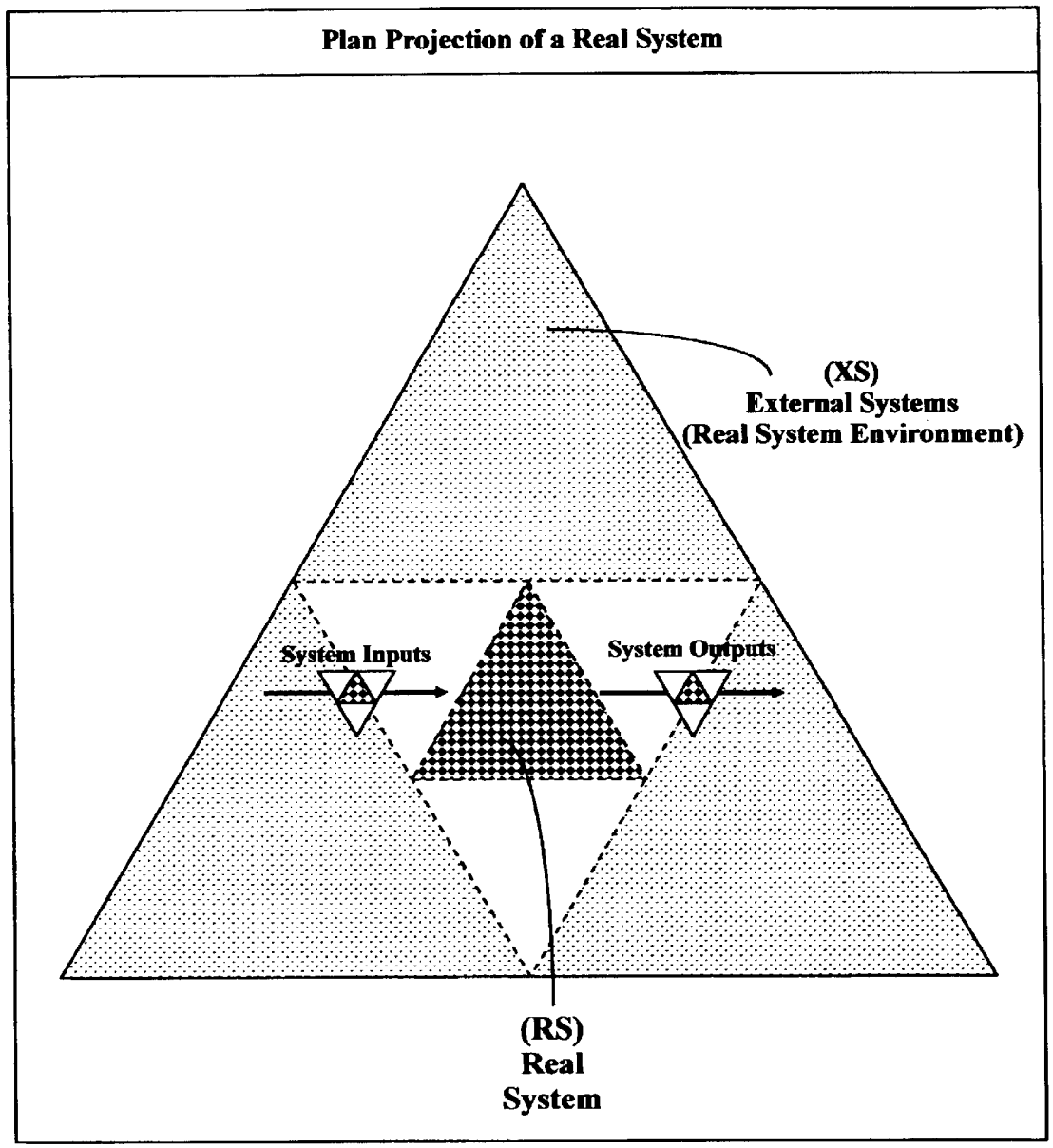
Figure 33: Plan Projection of a Real System

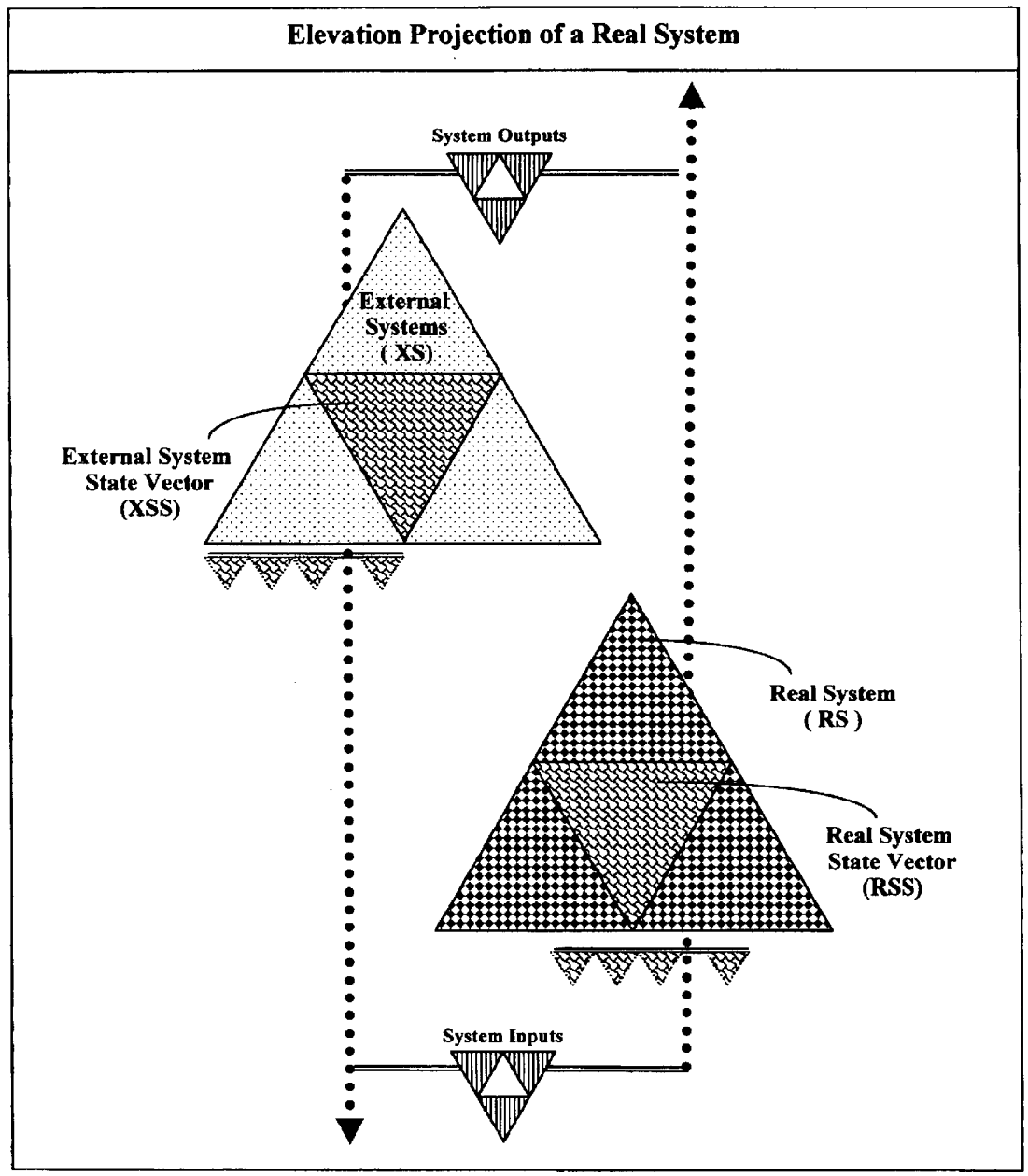
Figure 34: Elevation Projection of a Real System

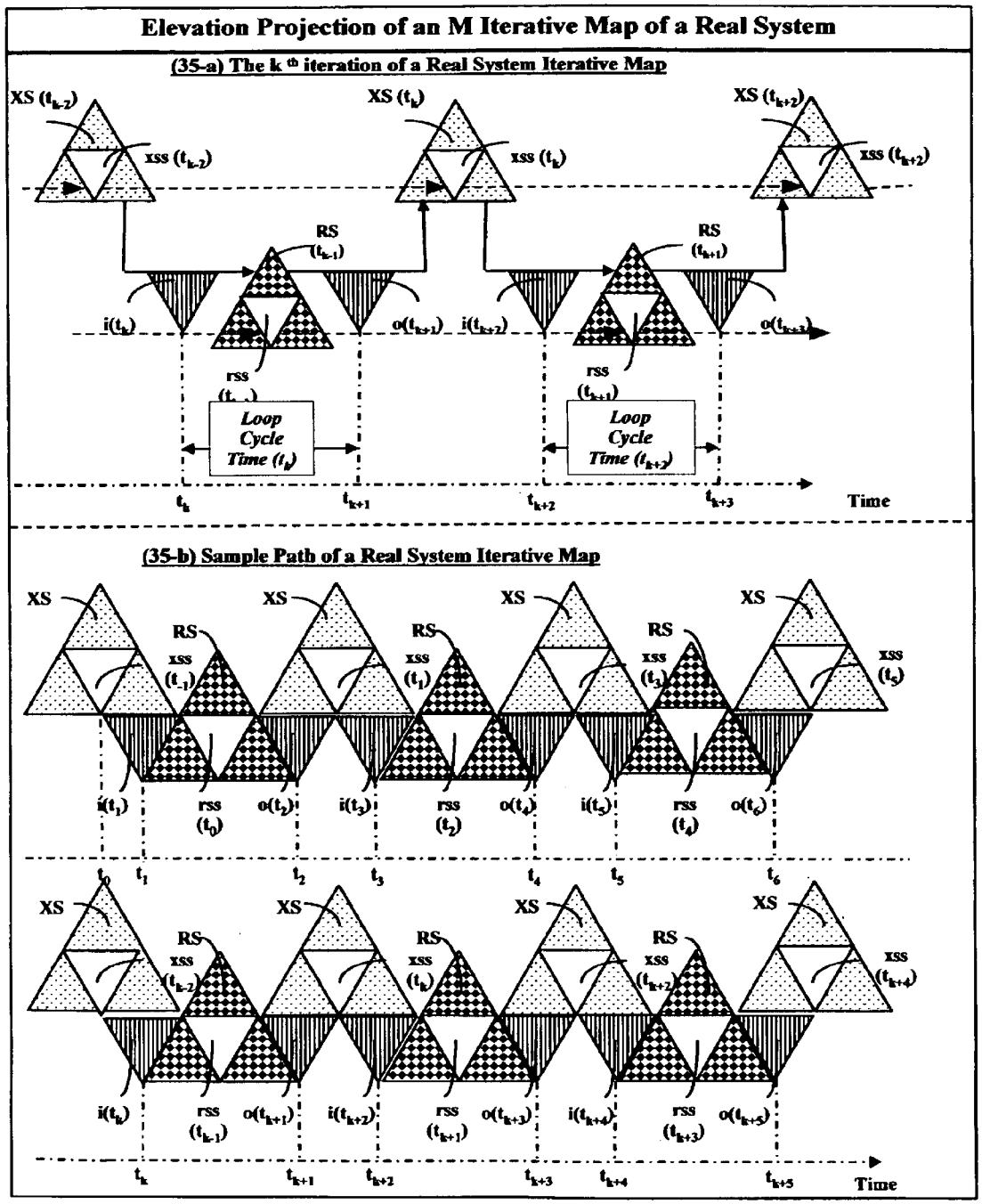
Figure 35: Elevation Projection of an M Iterative Map of a Real System

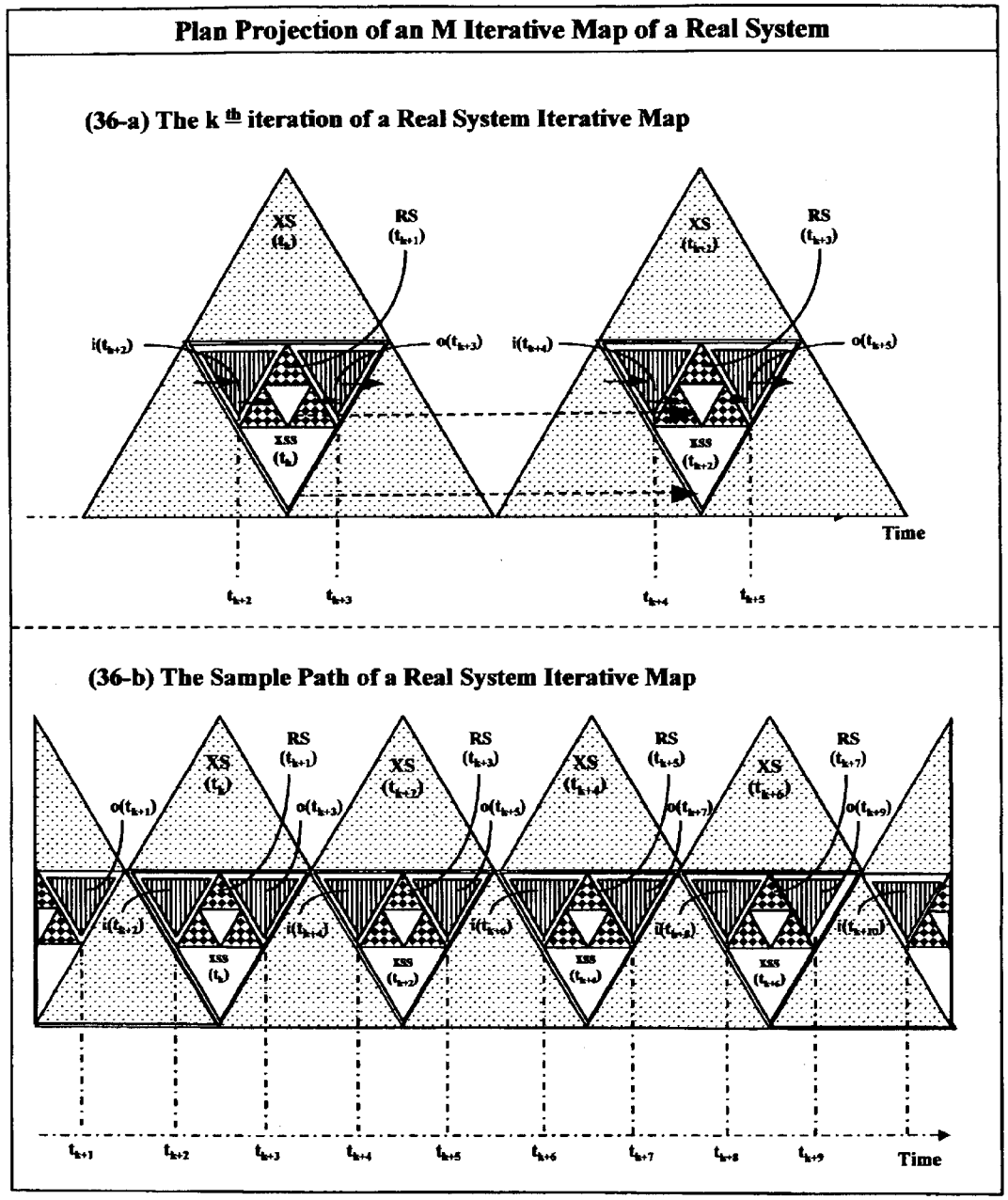
Figure 36: Plan Projection of an M Iterative Map of a Real System

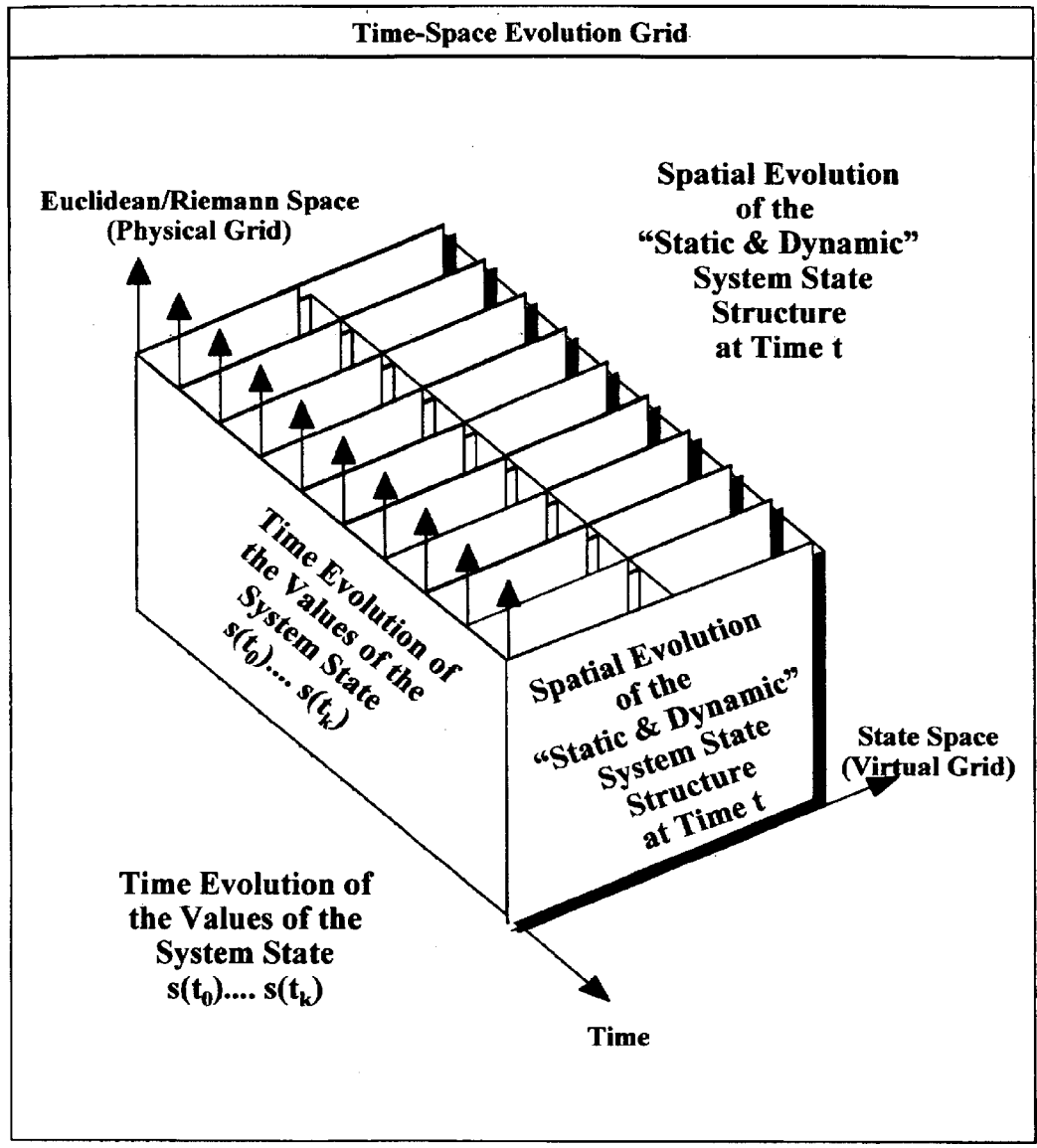
Figure 37: Time-Space Evolution Grid

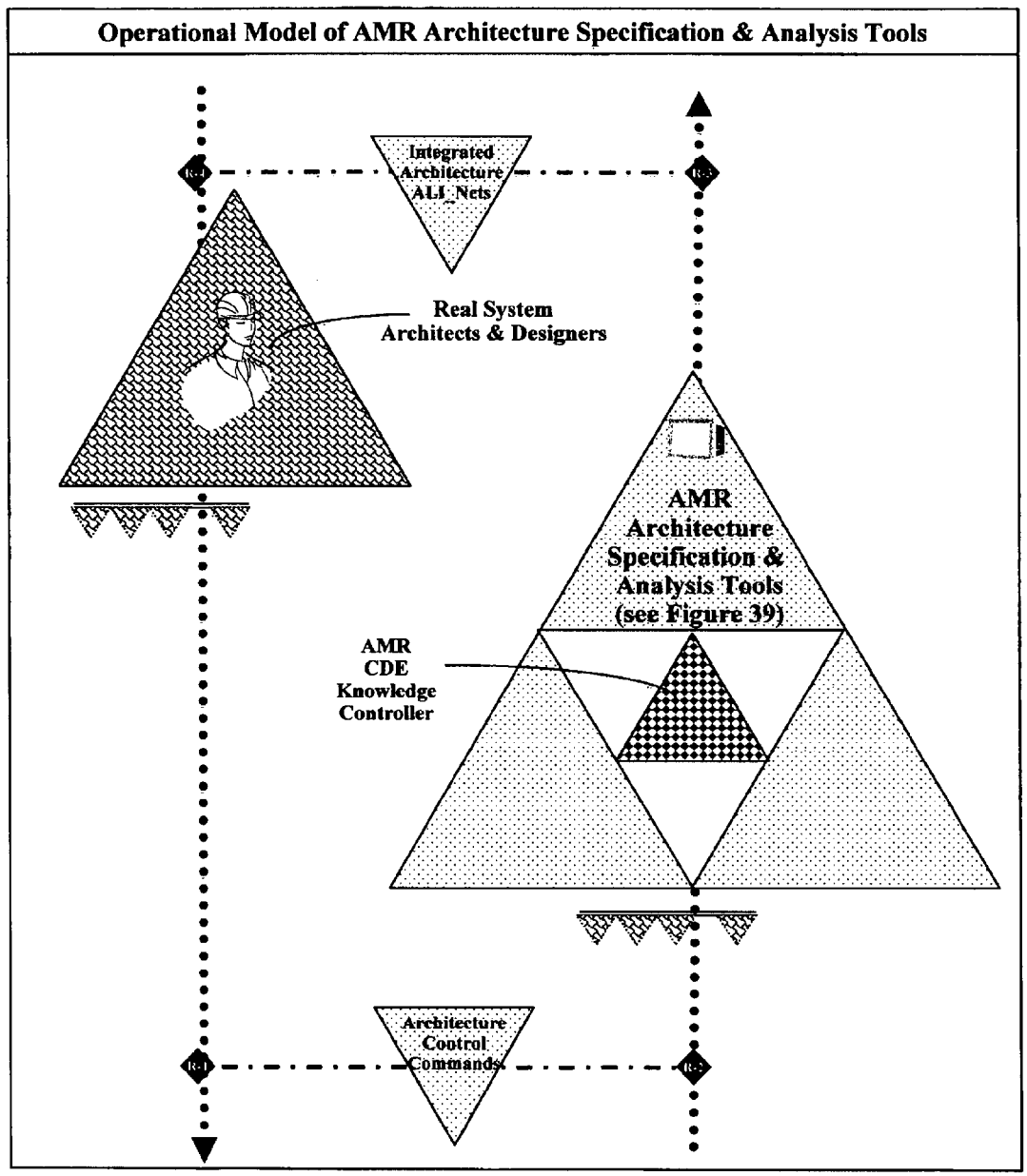
Figure 38: Operational Model of AMR Architecture Specification & Analysis Tools

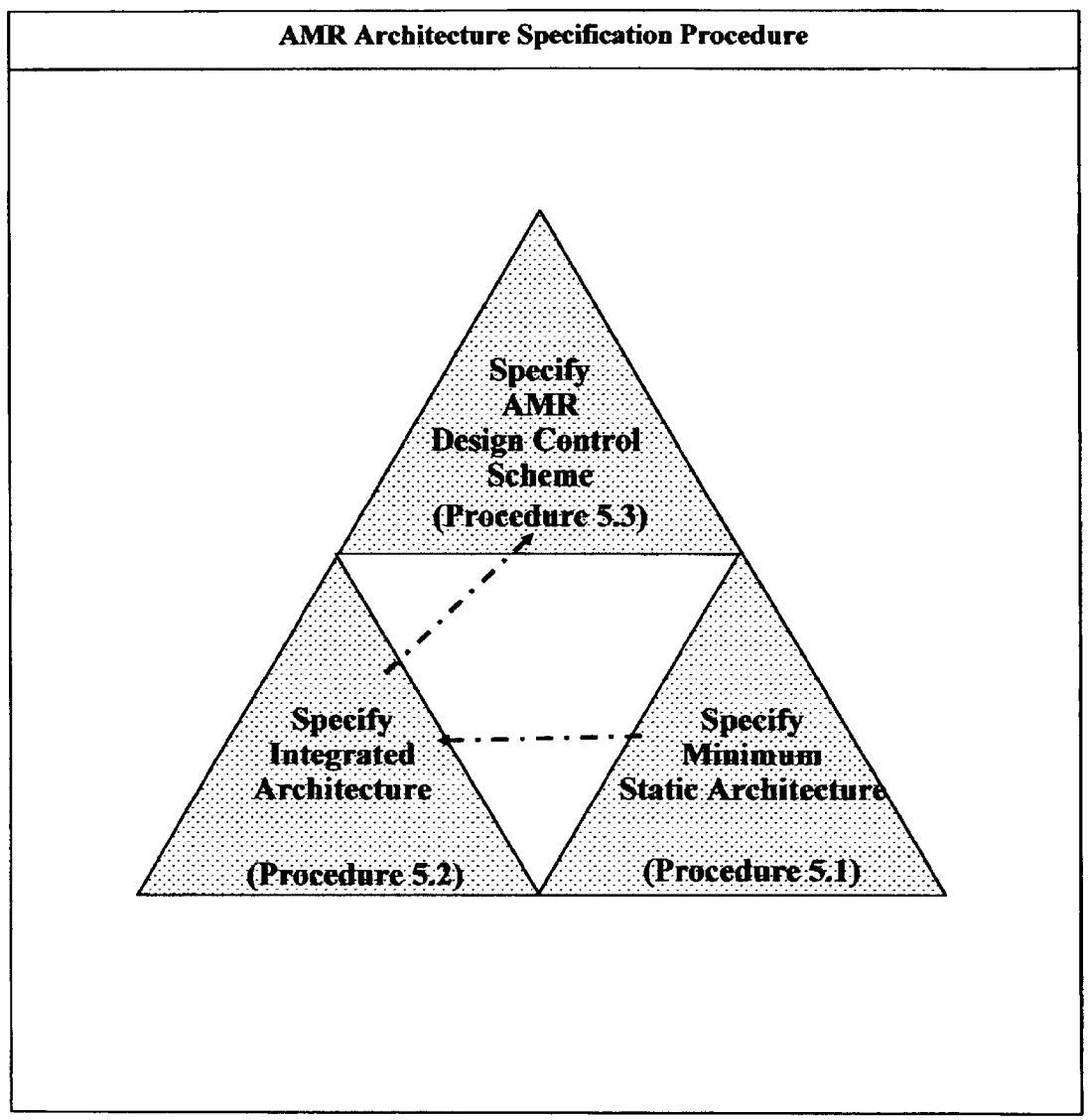
Figure 39: AMR Architecture Specification Procedure

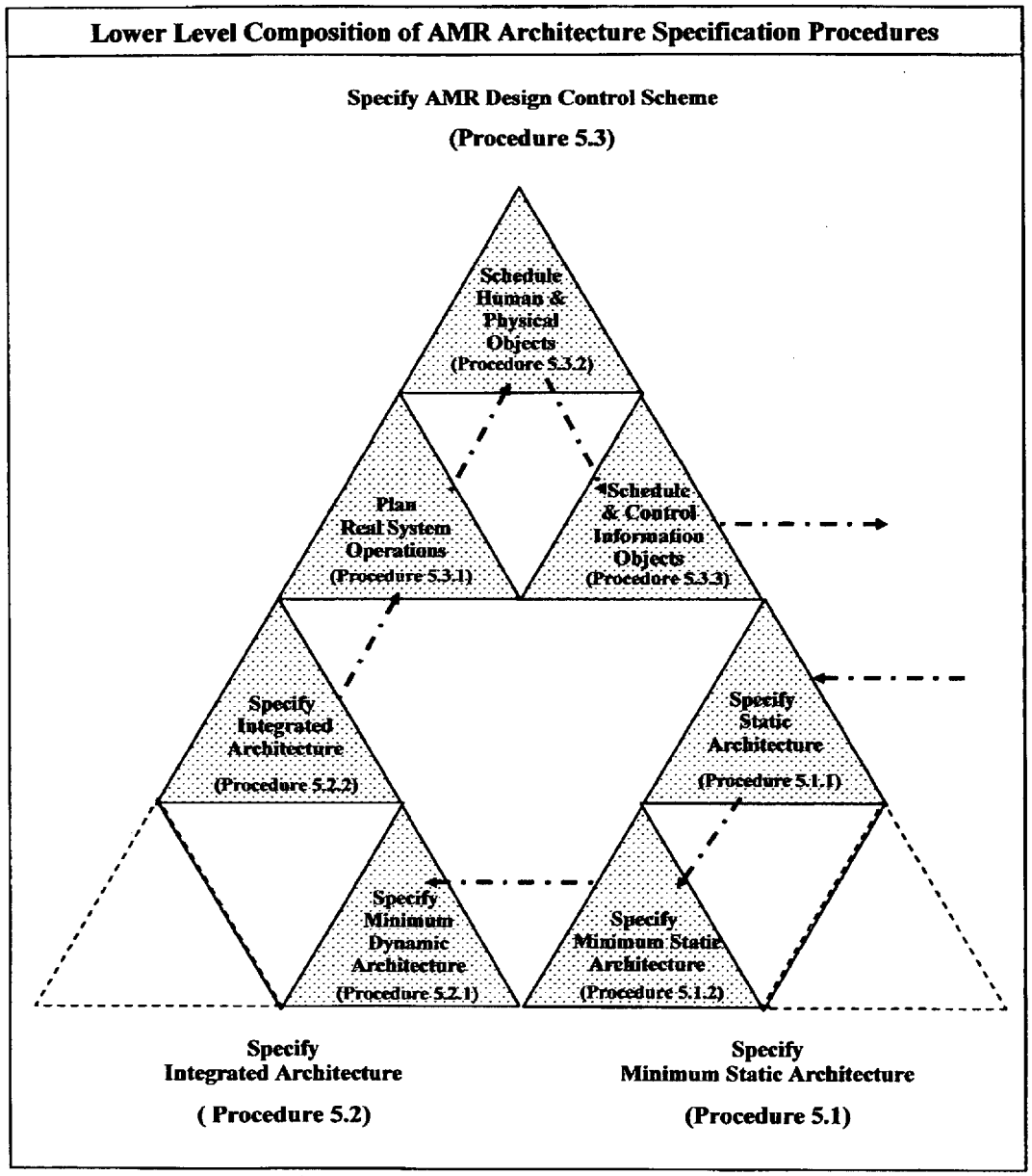
Figure 40: Lower Level Composition of AMR Architecture Specification Procedures

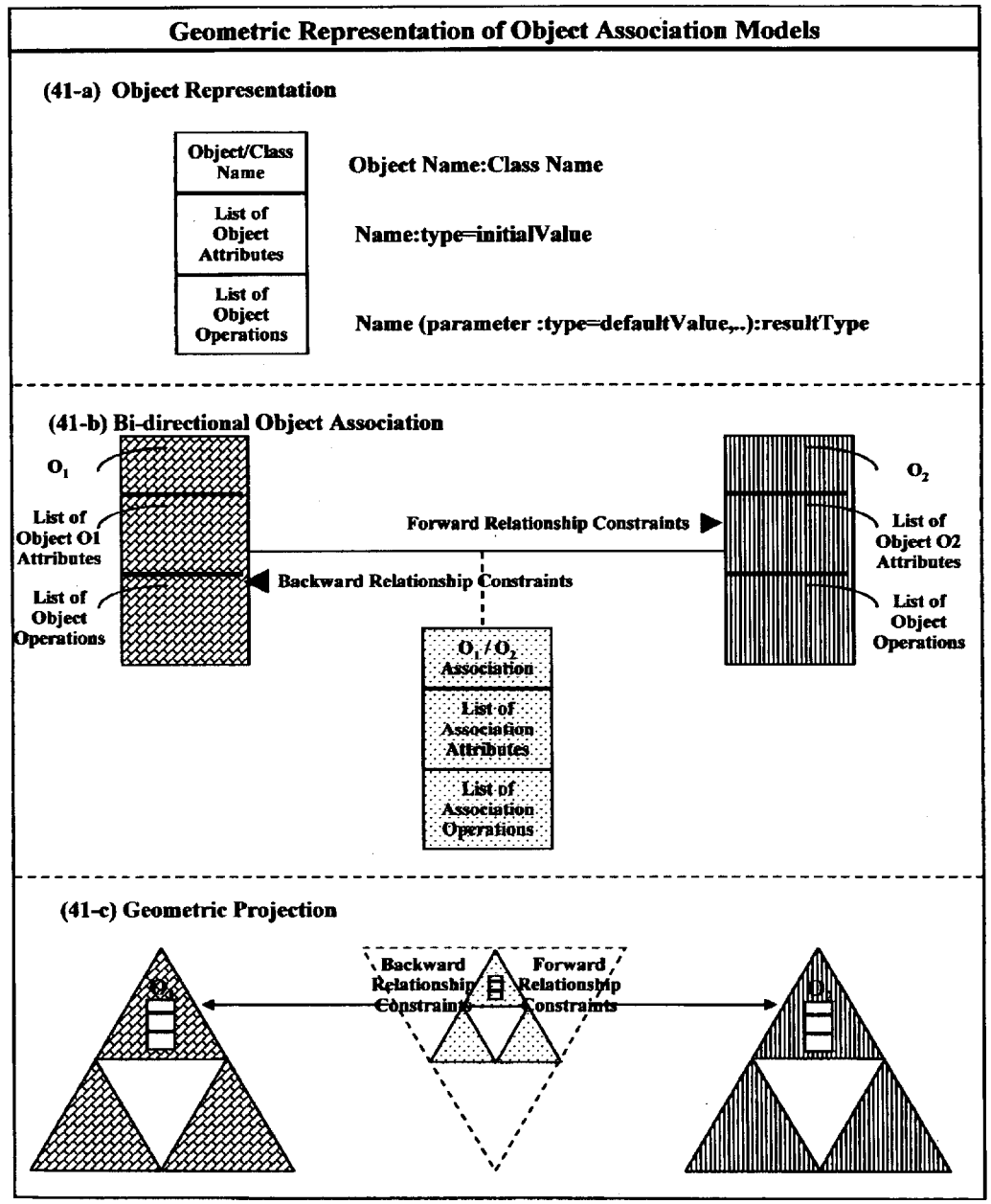
Figure 41: Geometric Representation of Object Association Models

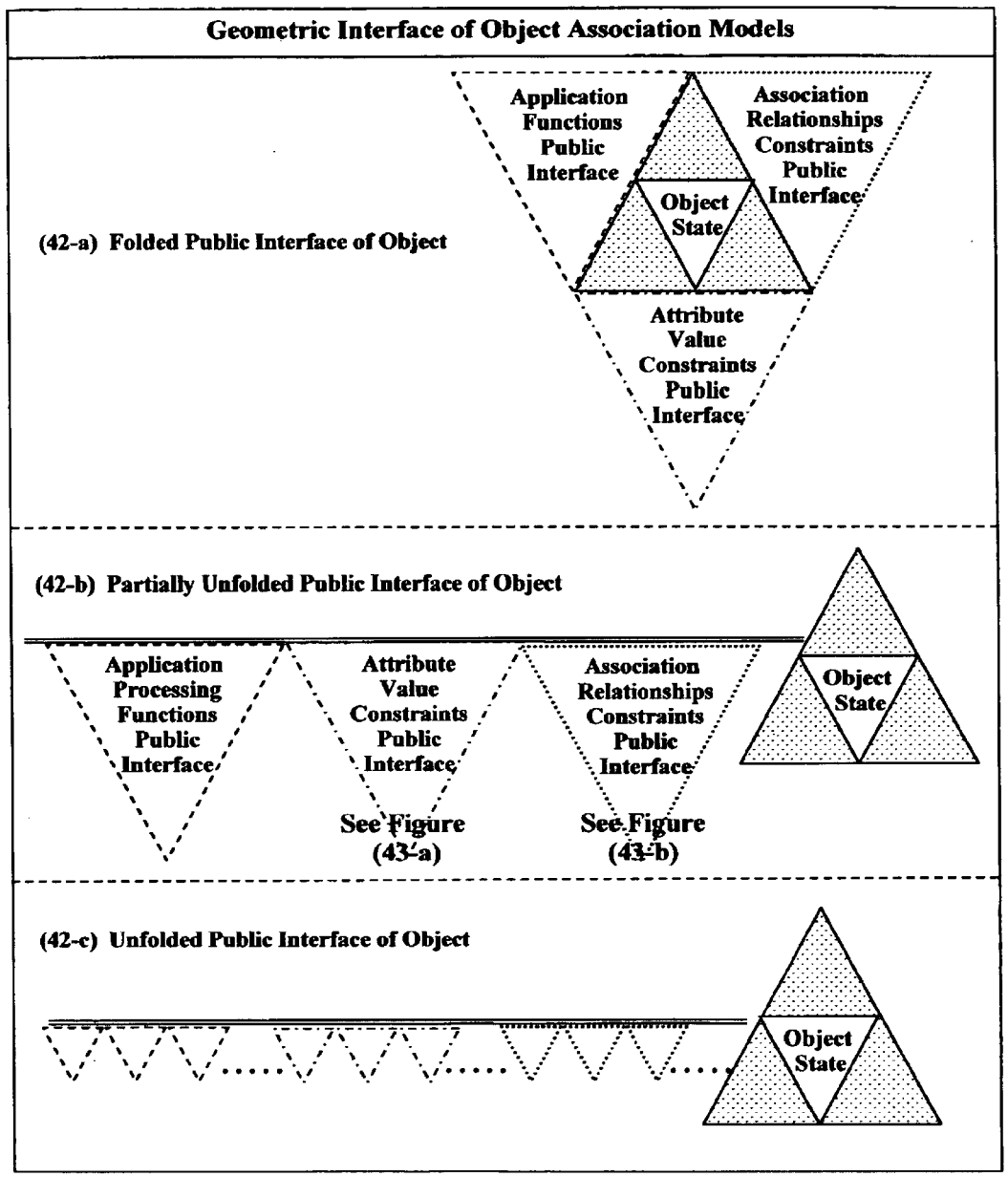
Figure 42: Geometric Interface of Object Association Models

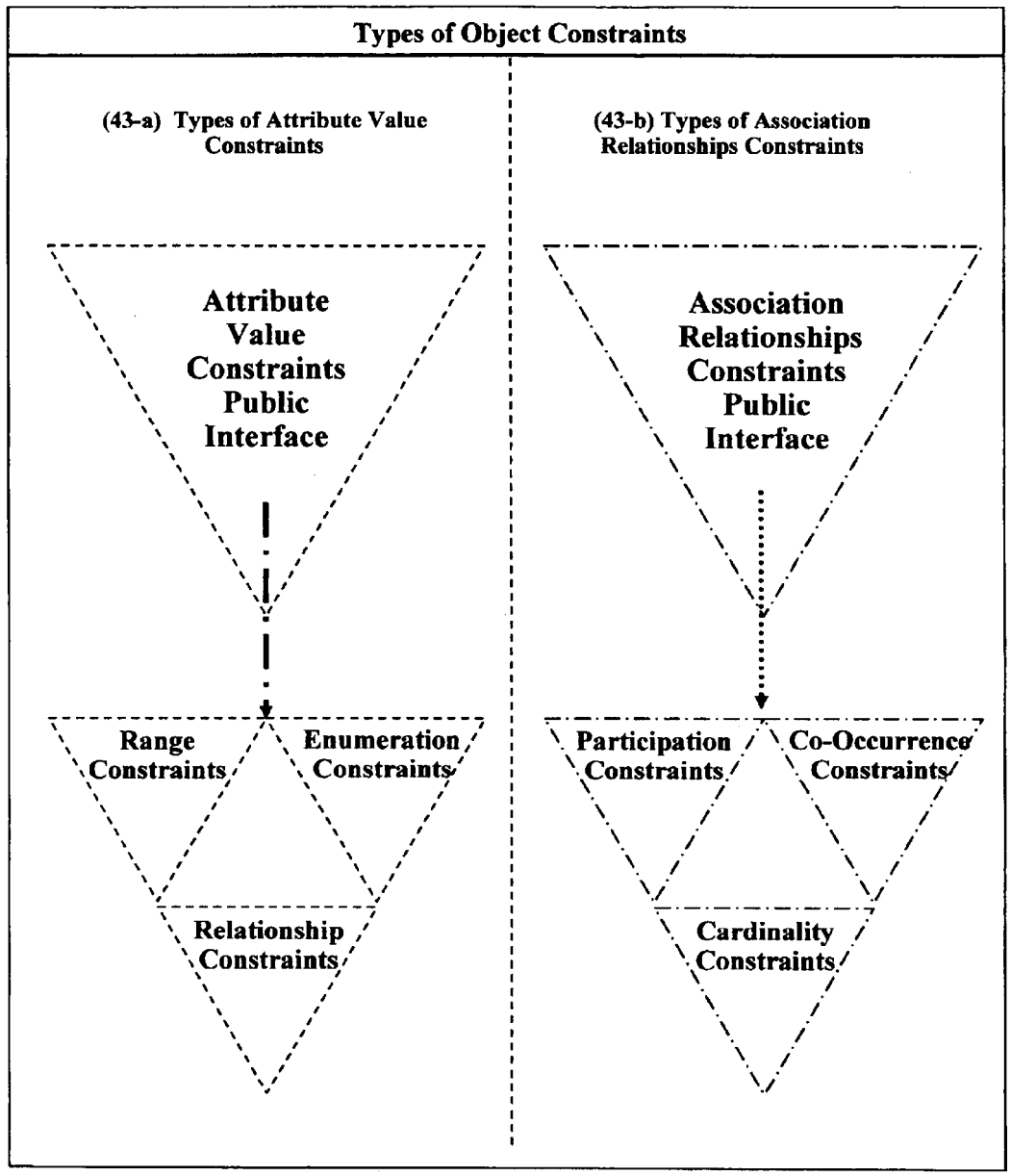
Figure 43: Types of Object Constraints

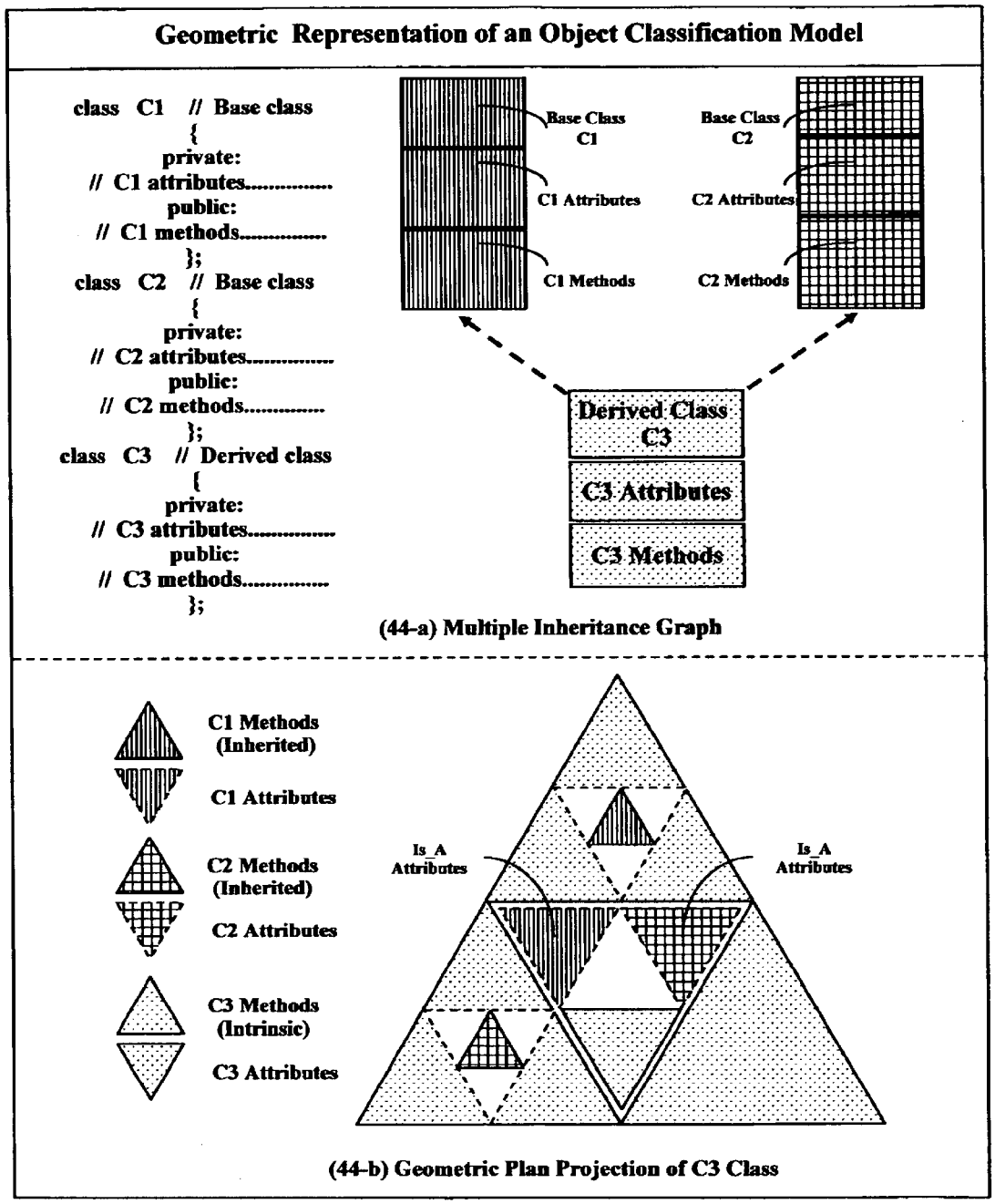
Figure 44: Geometric Representation of an Object Classification Model

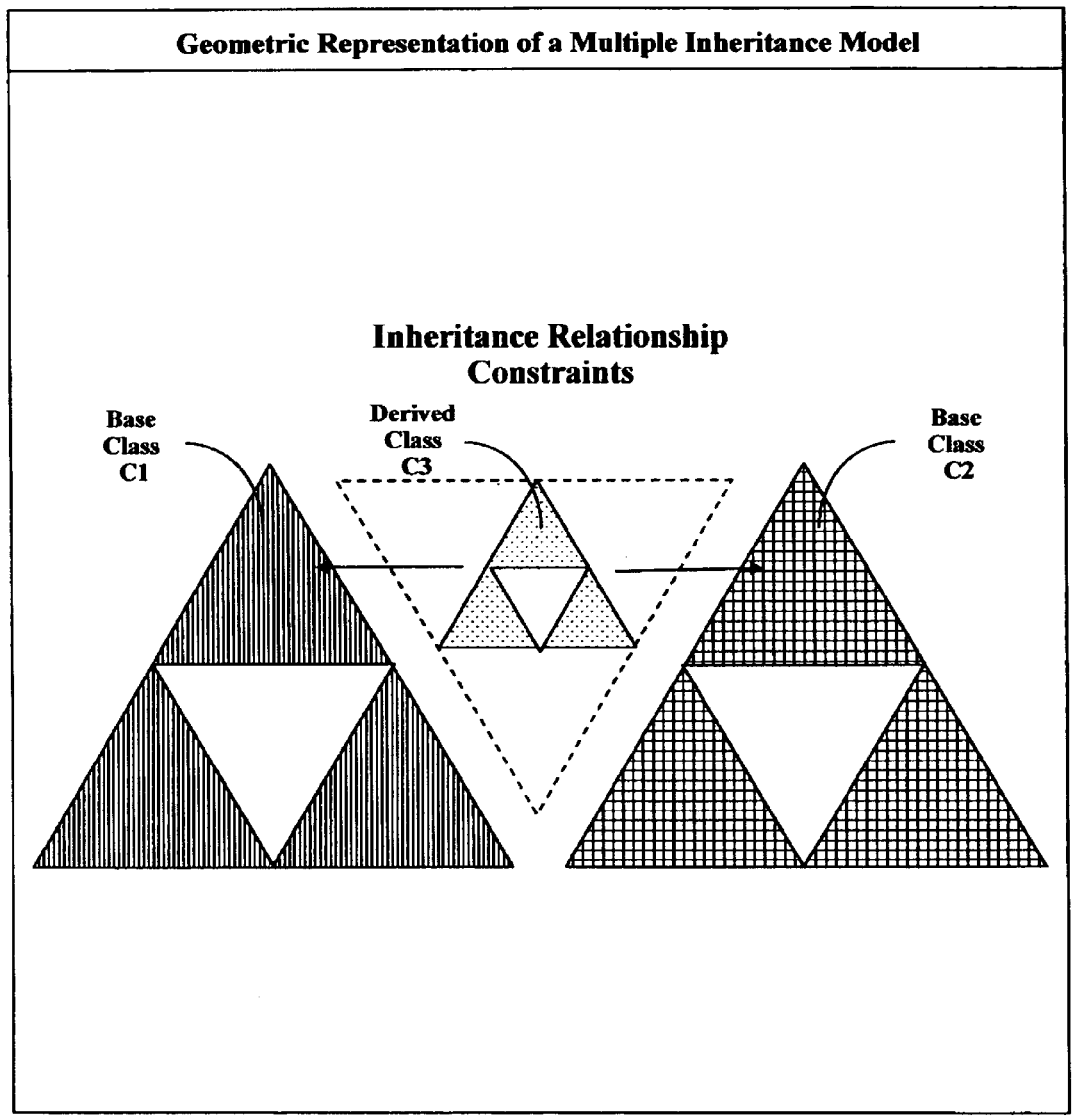
Figure 45: Geometric Representation of a Multiple Inheritance Model

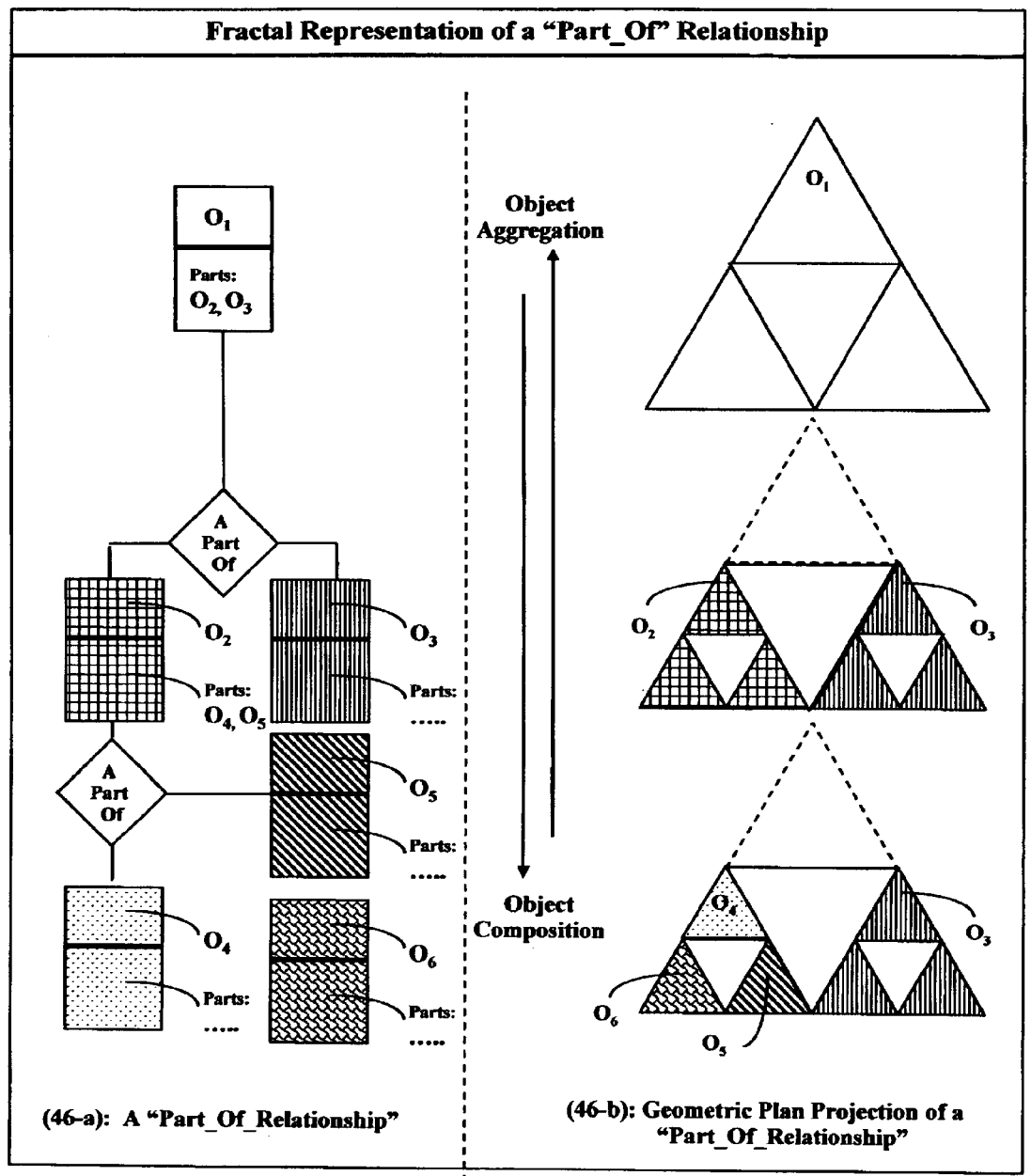
Figure 46: Fractal Representation of a "Part_Of" Relationship

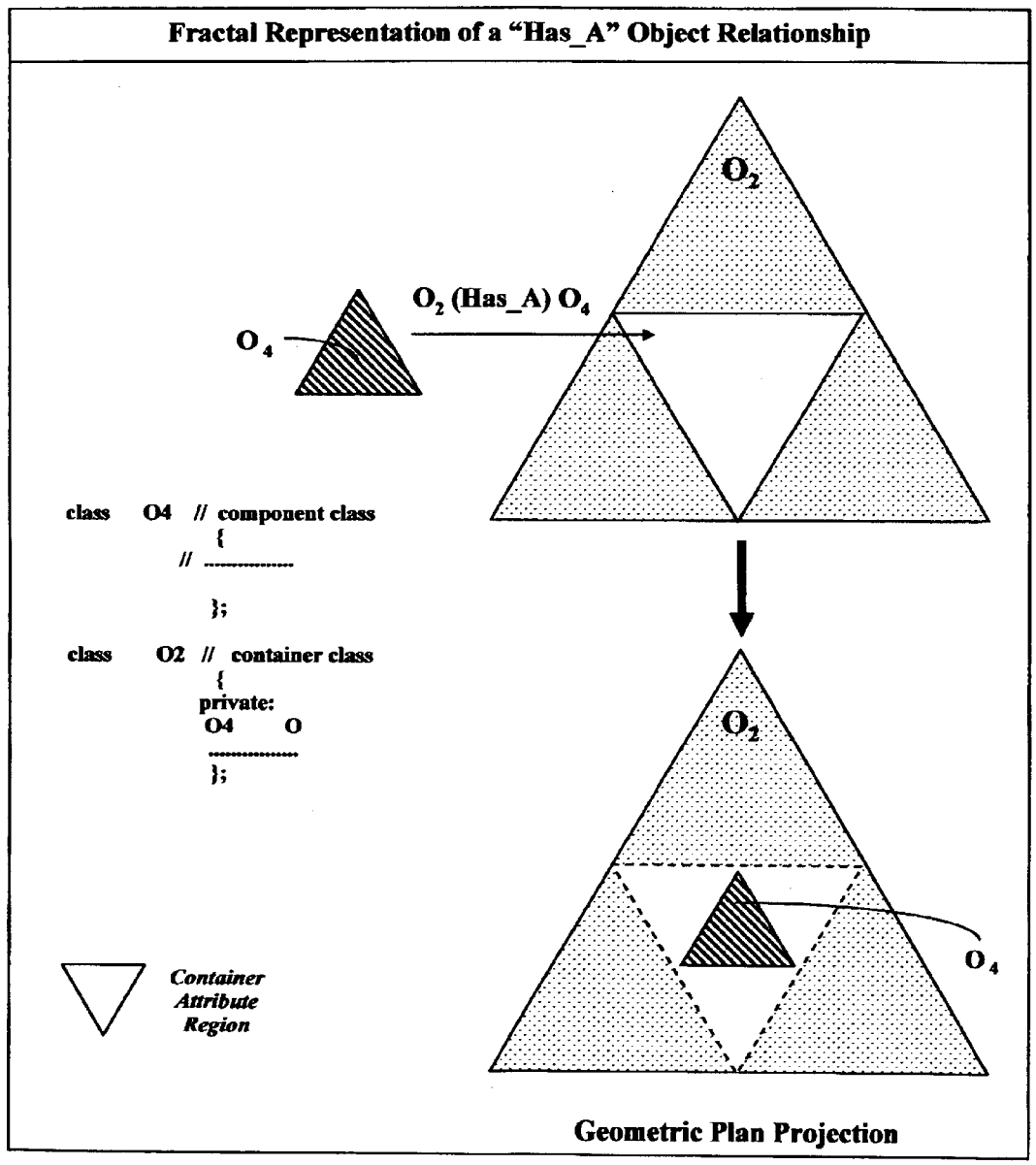
Figure 47: Fractal Representation of a "Has_A" Object Relationship

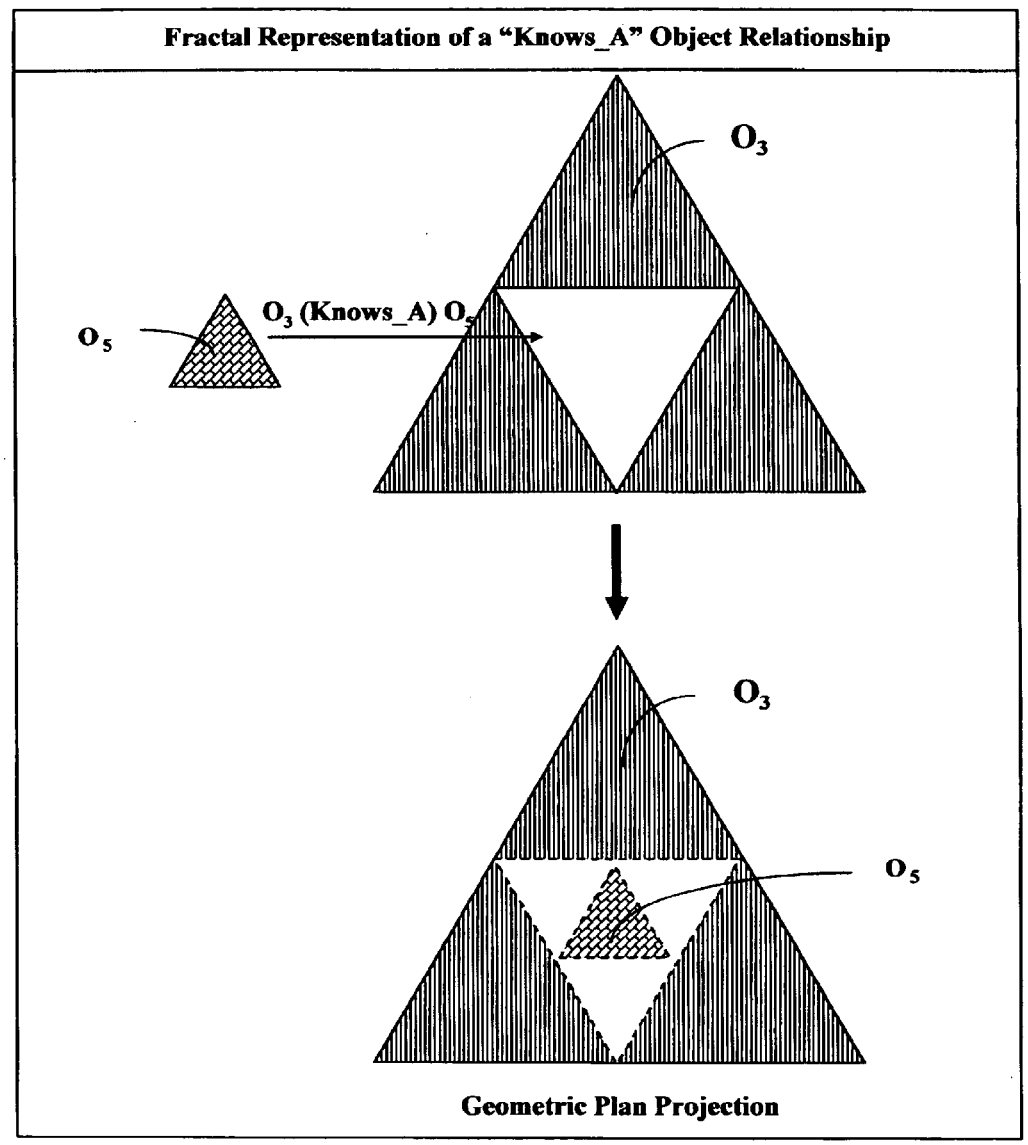
Figure 48: Fractal Representation of a "Knows_A" Object Relationship

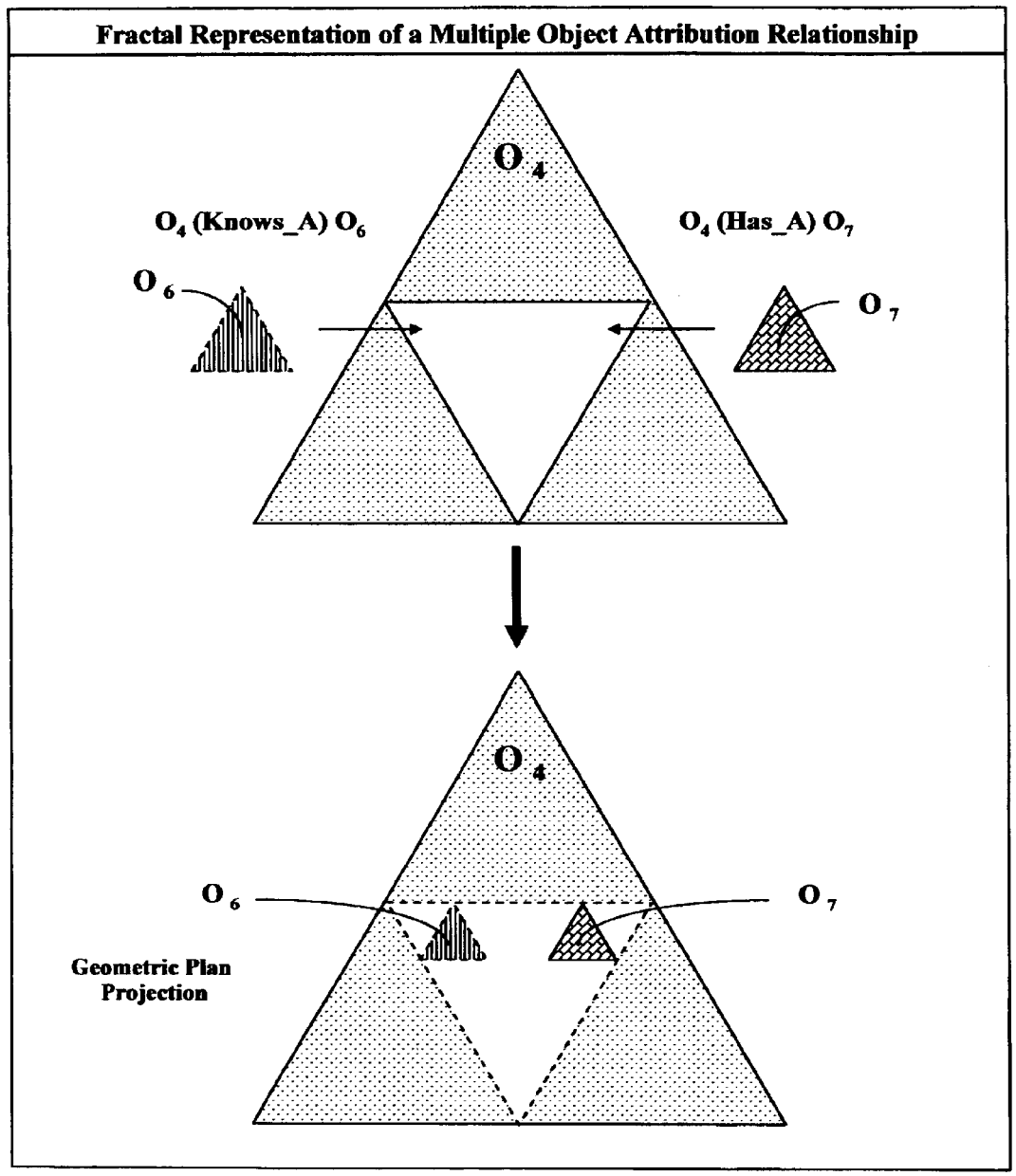
Figure 49: Fractal Representation of a Multiple Object Attribution Relationship

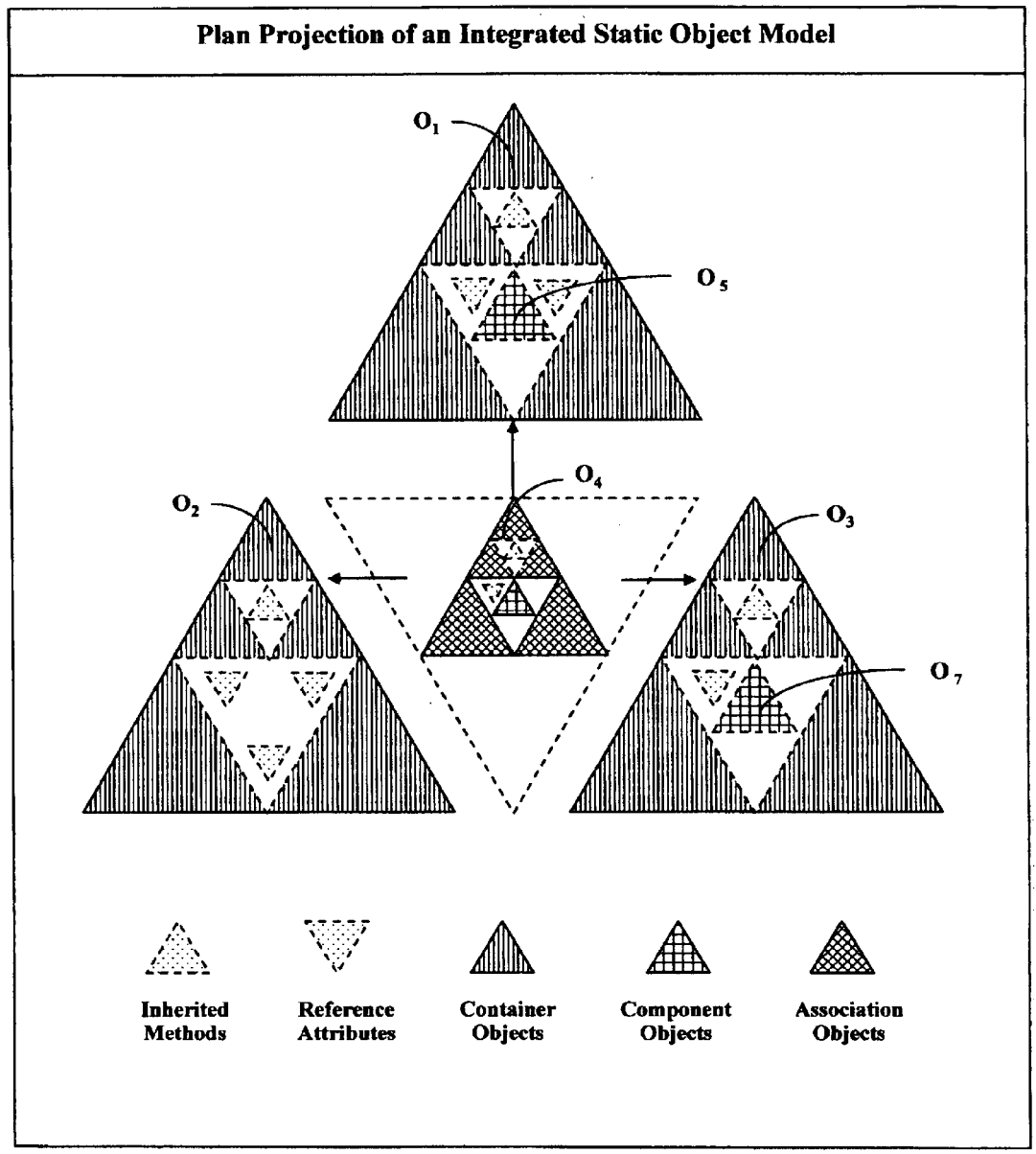
Figure 50: Plan Projection of an Integrated Static Object Model

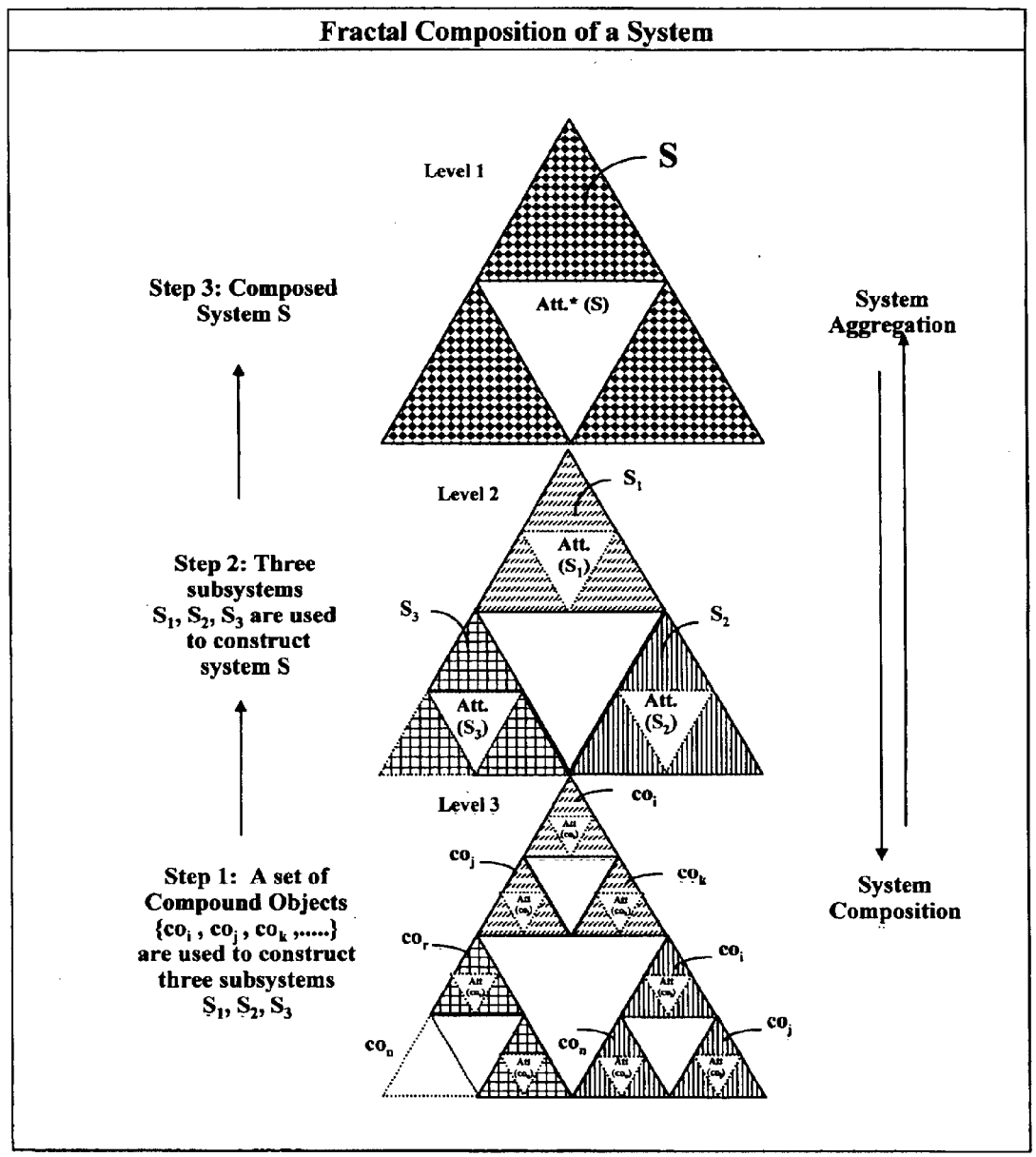
Figure 51: Fractal Composition of a System

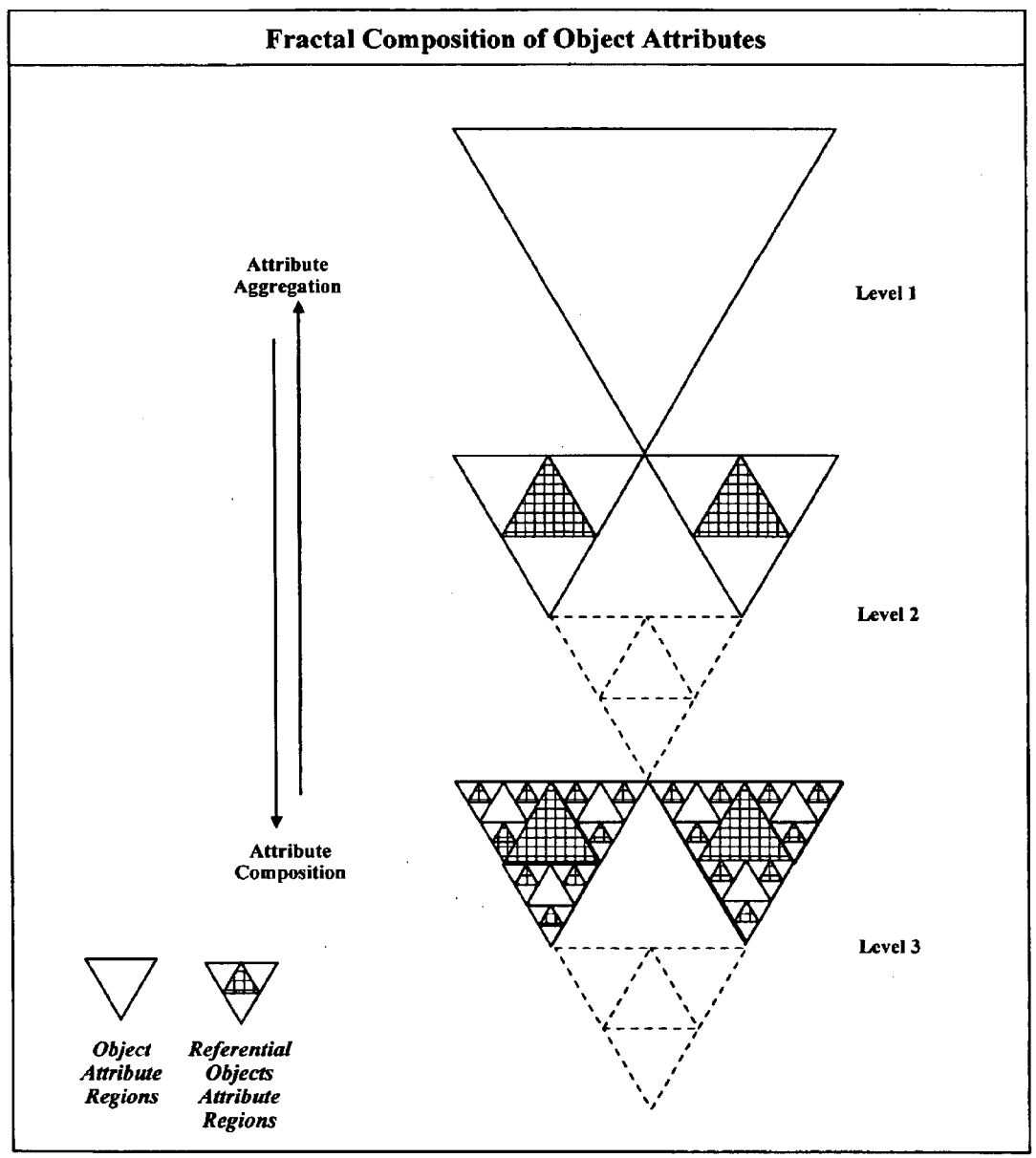
Figure 52: Fractal Composition of Object Attributes

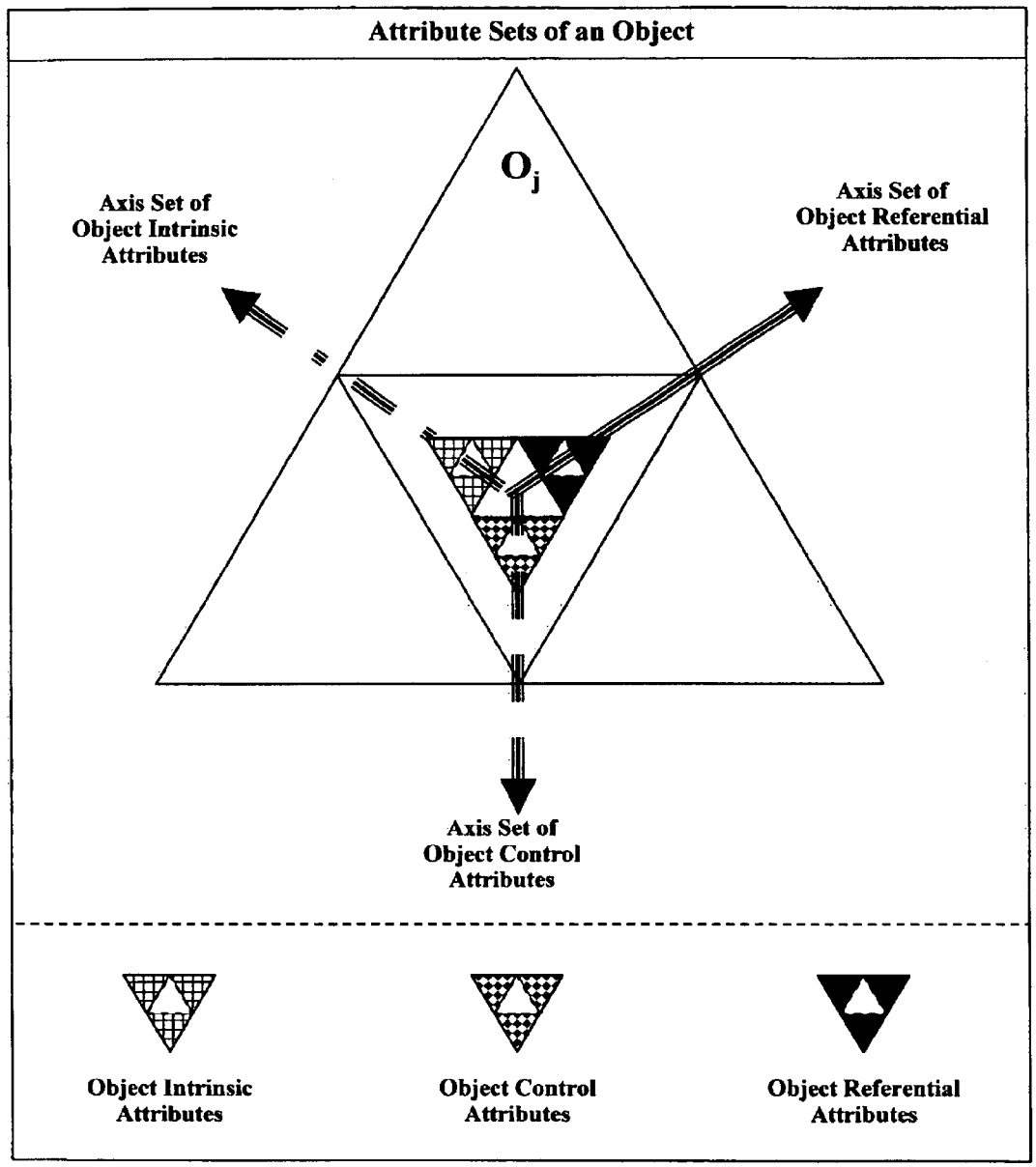
Figure 53: Attribute Sets of an Object

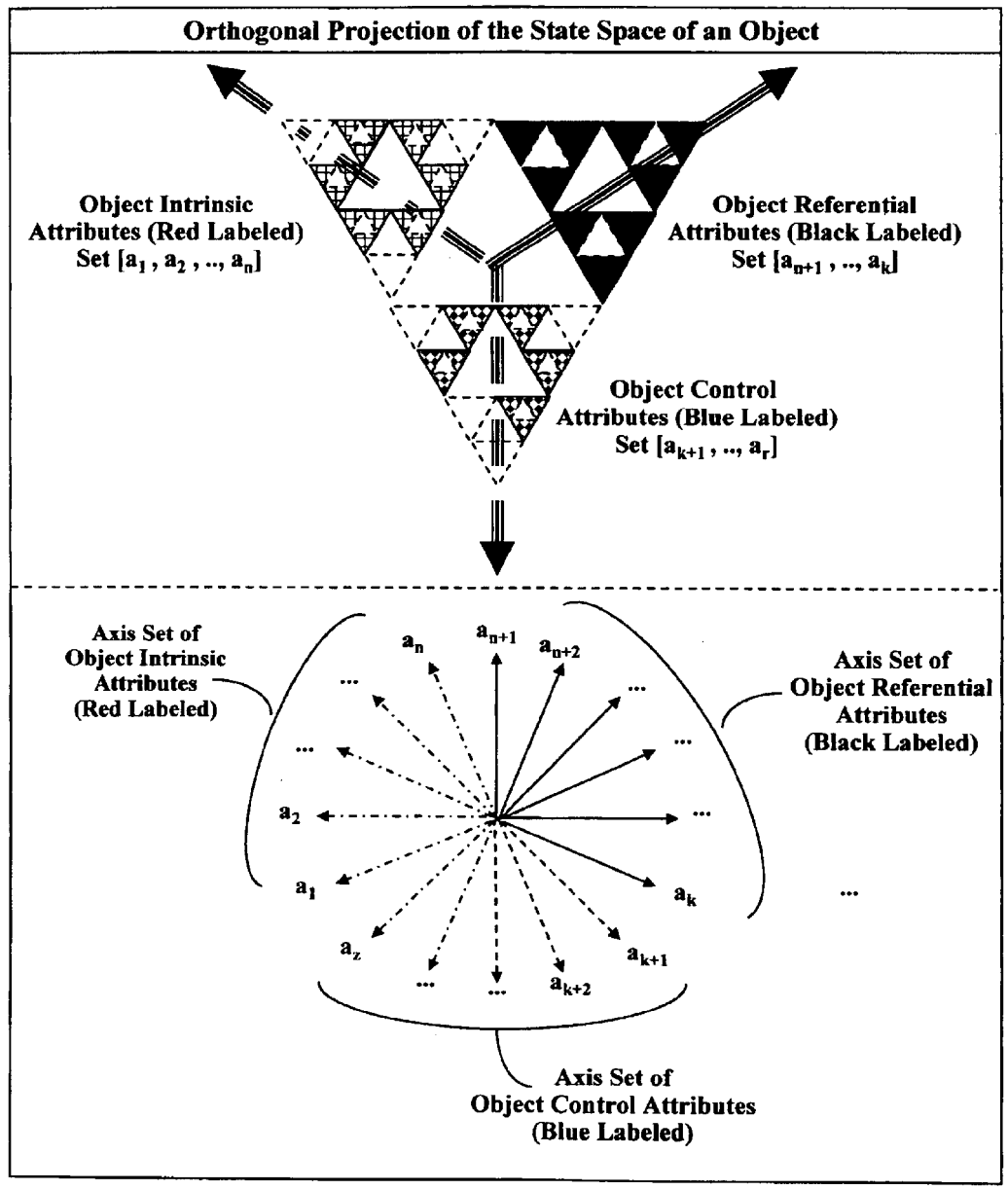
Figure 54: Orthogonal Projection of an Object

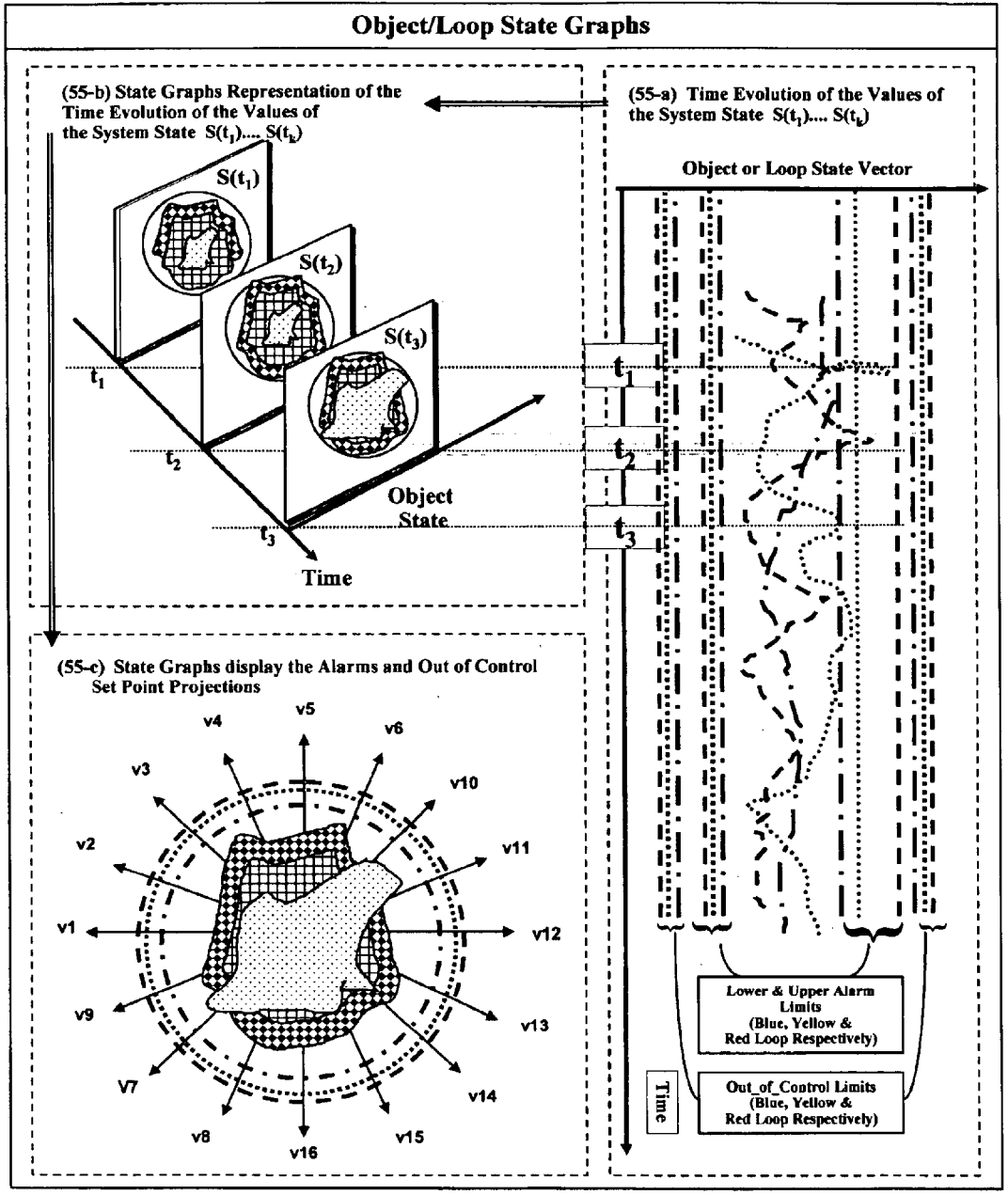
Figure 55: Object/Loop State Graphs

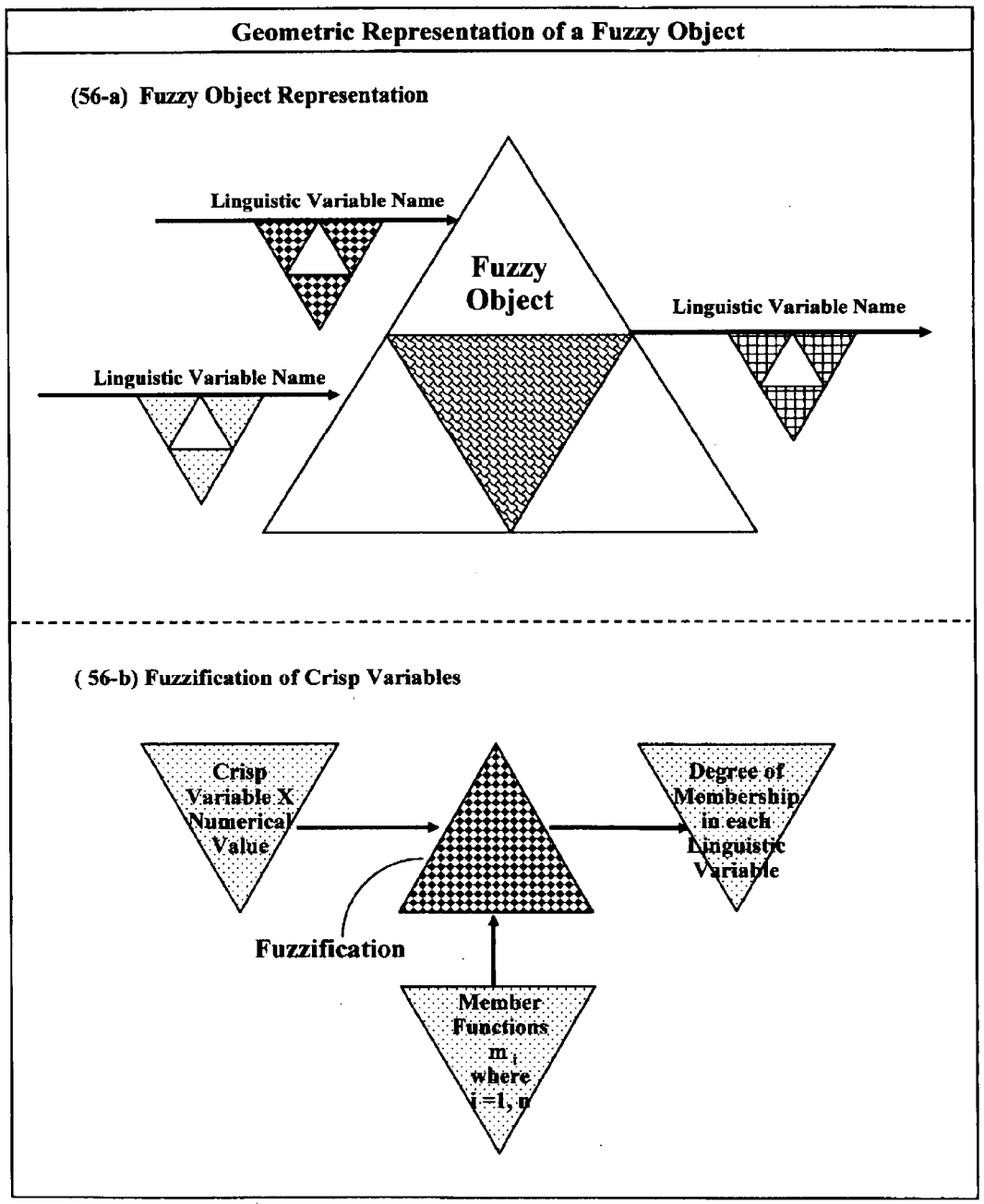
Figure 56: Geometric Representation of a Fuzzy Object

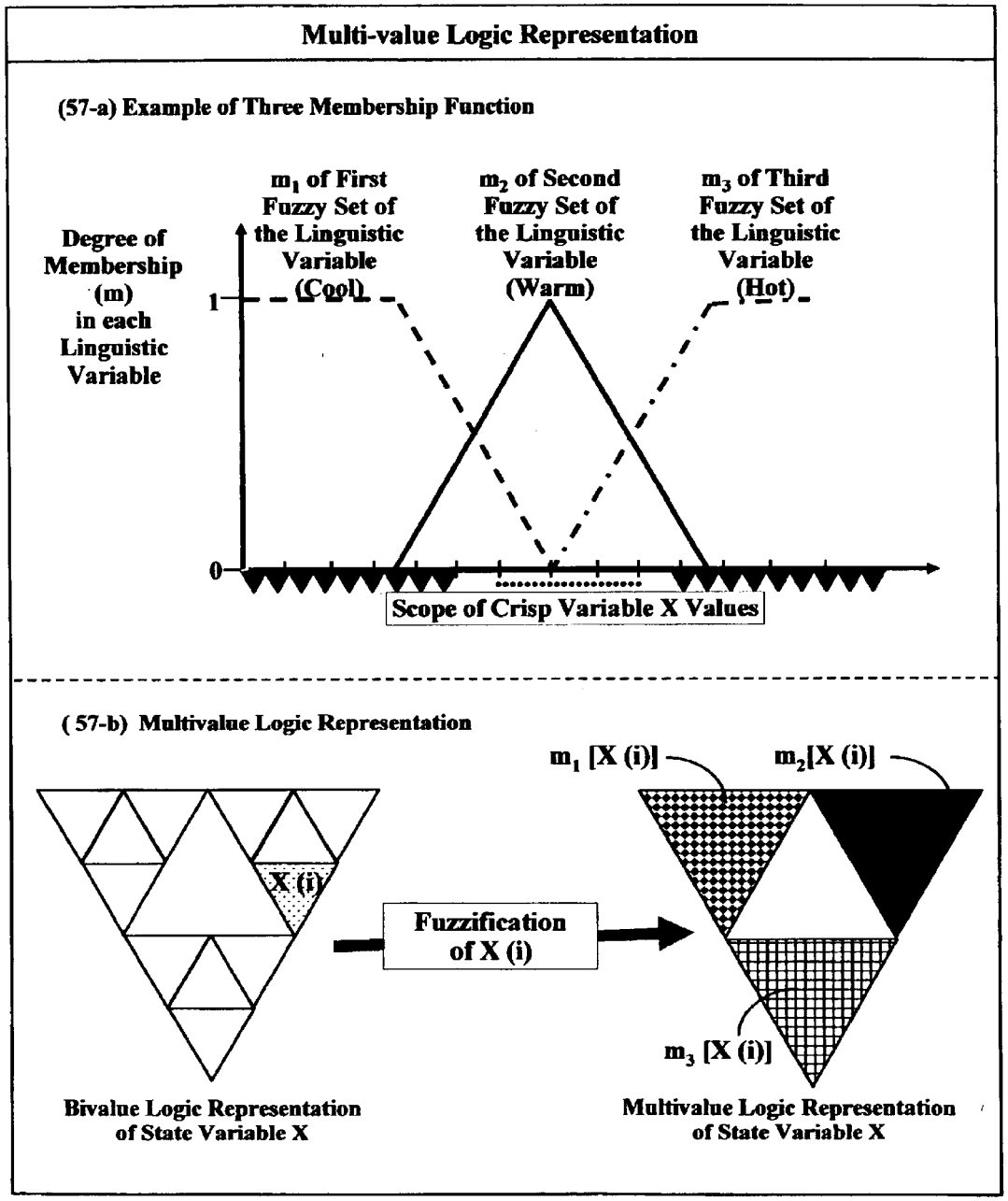
Figure 57: Multi-value Logic Representation

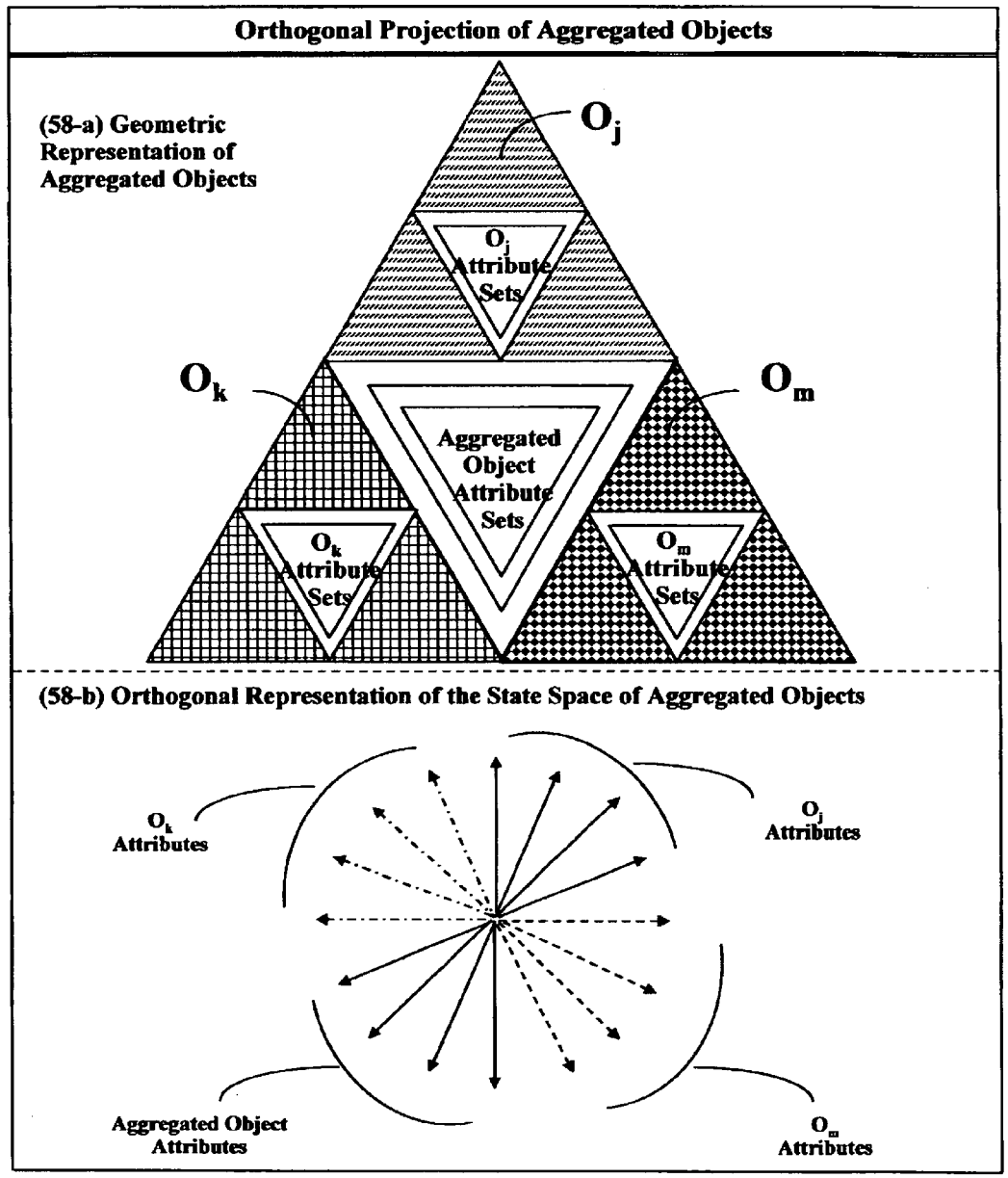
Figure 58: Orthogonal Projection of Aggregated Objects

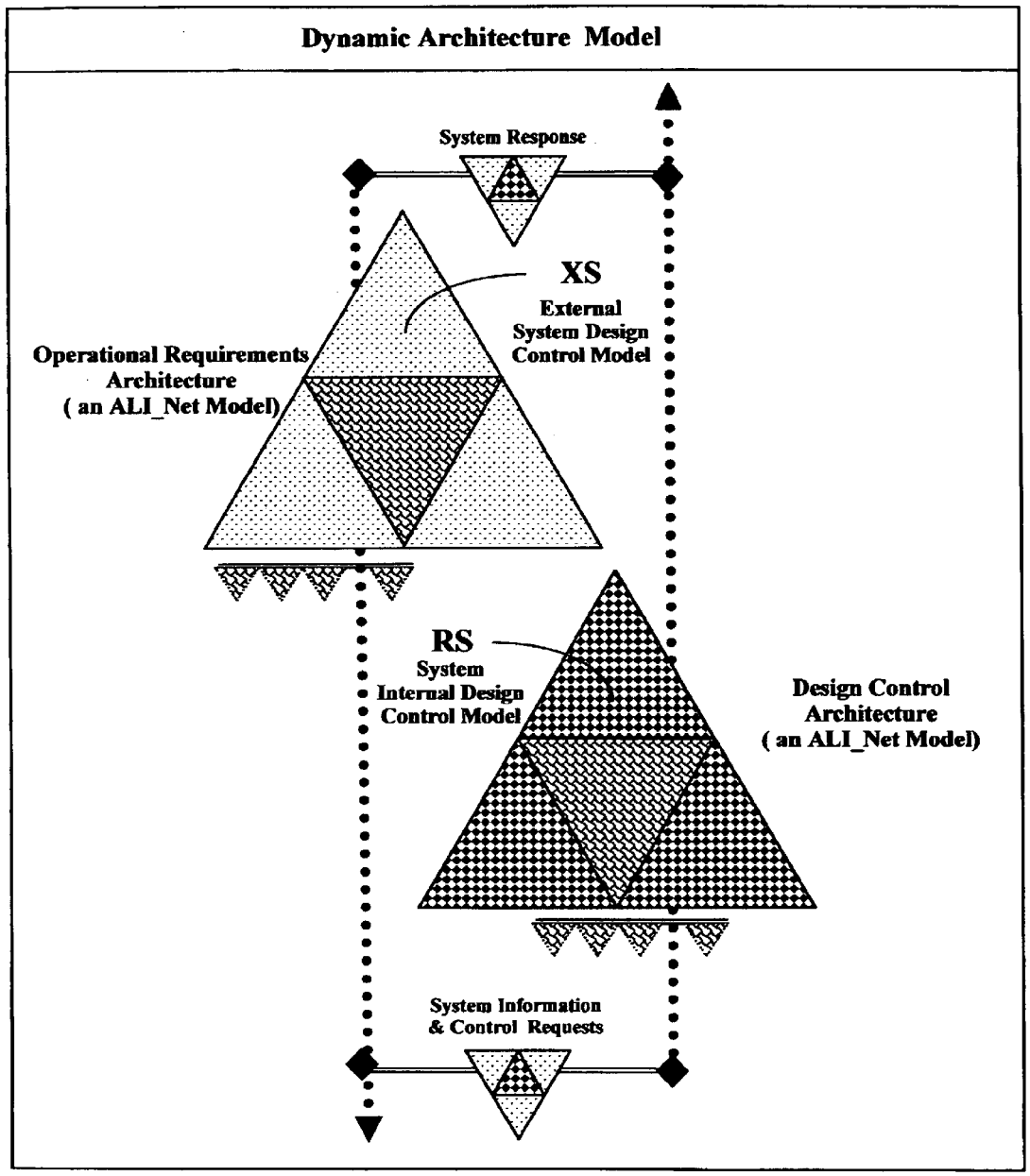
Figure 59: Dynamic Architecture Model

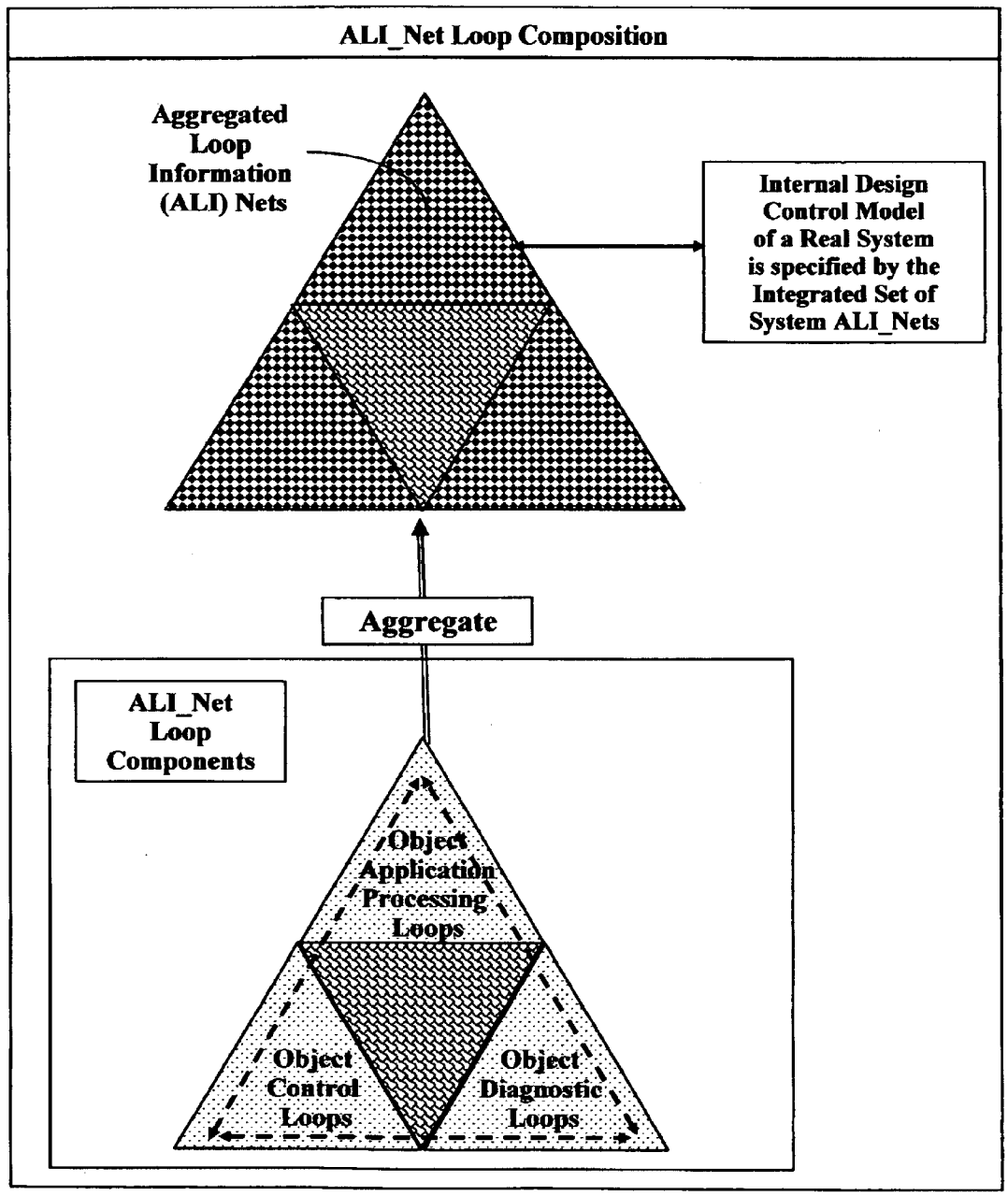
Figure 60: ALI_Net Loop Composition

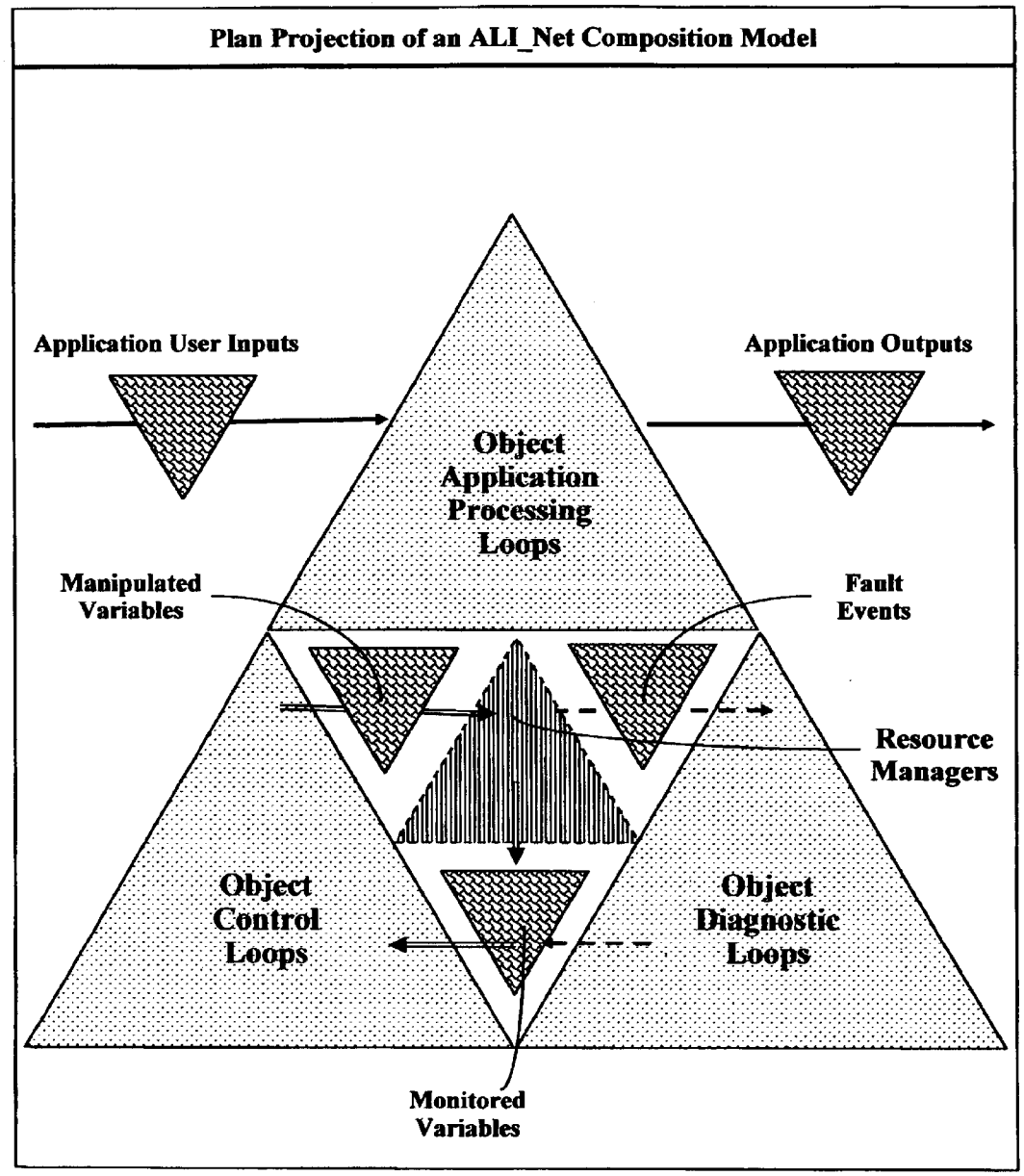
Figure 61: Plan Projection of an ALI_Net Composition Model

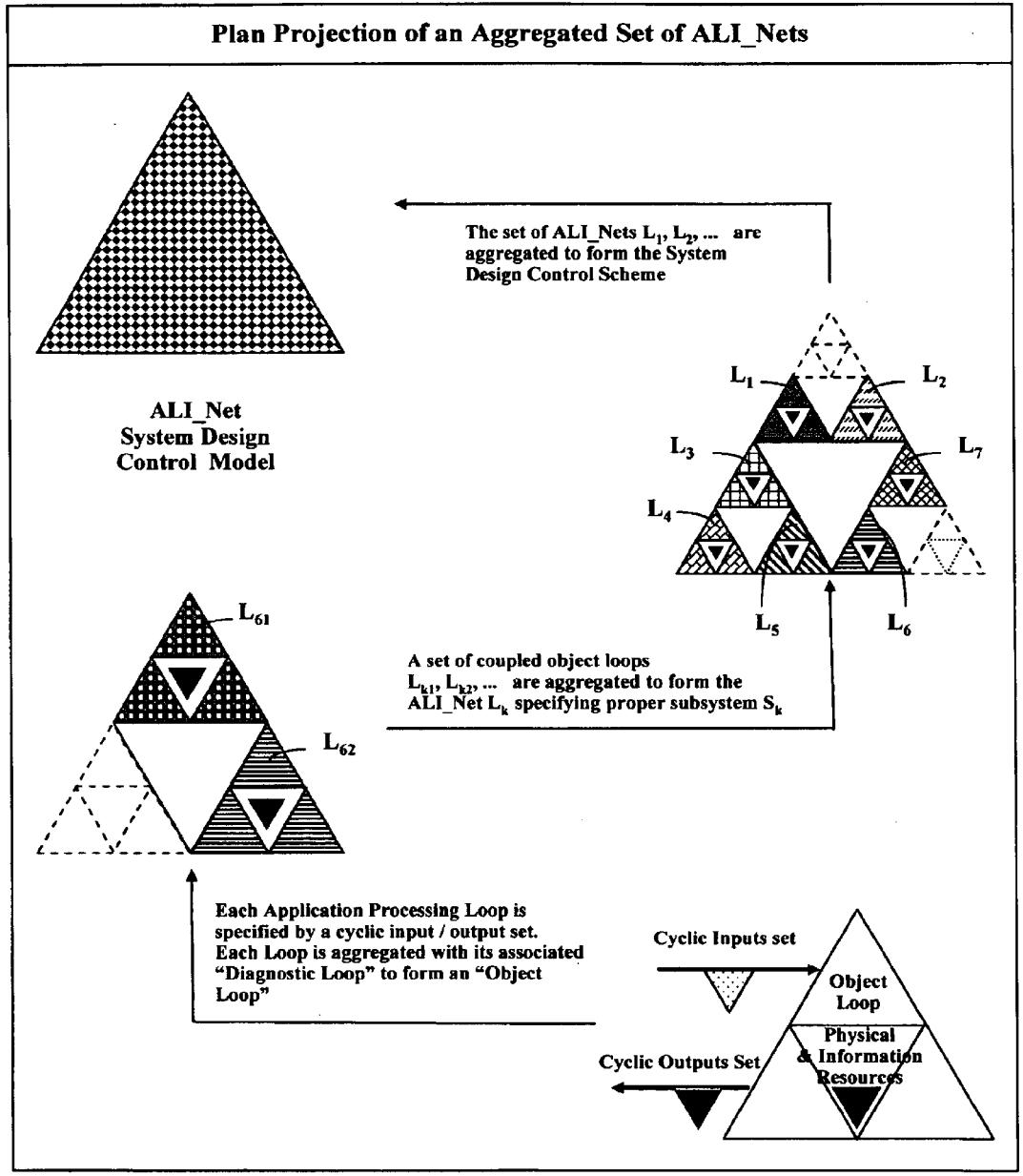
Figure 62: Plan Projection of an Aggregated Set of ALI_Nets

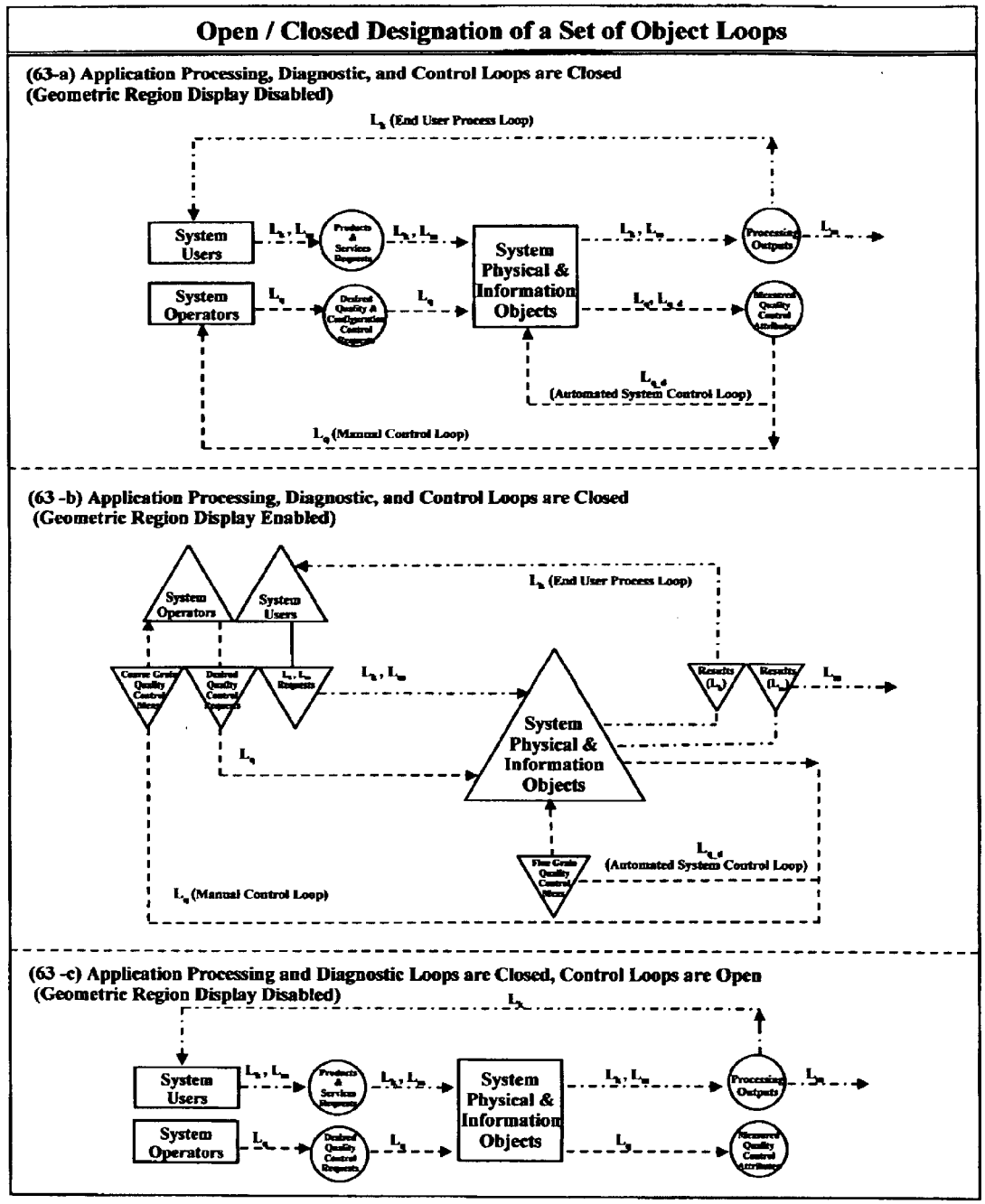
Figure 63: Open / Closed Designation of a Set of Object Loops

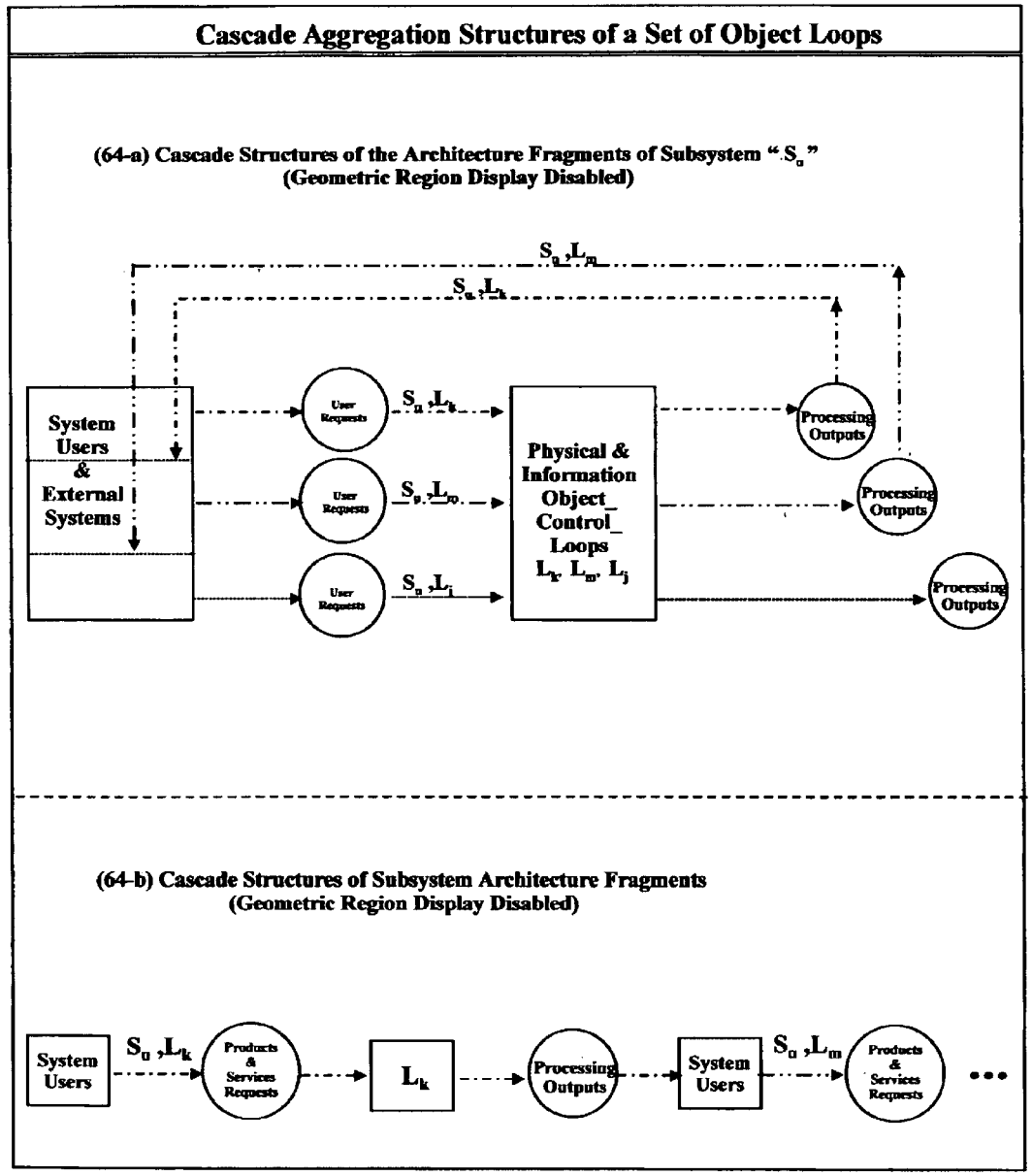
Figure 64: Cascade Aggregation Structures of a Set of Object Loops

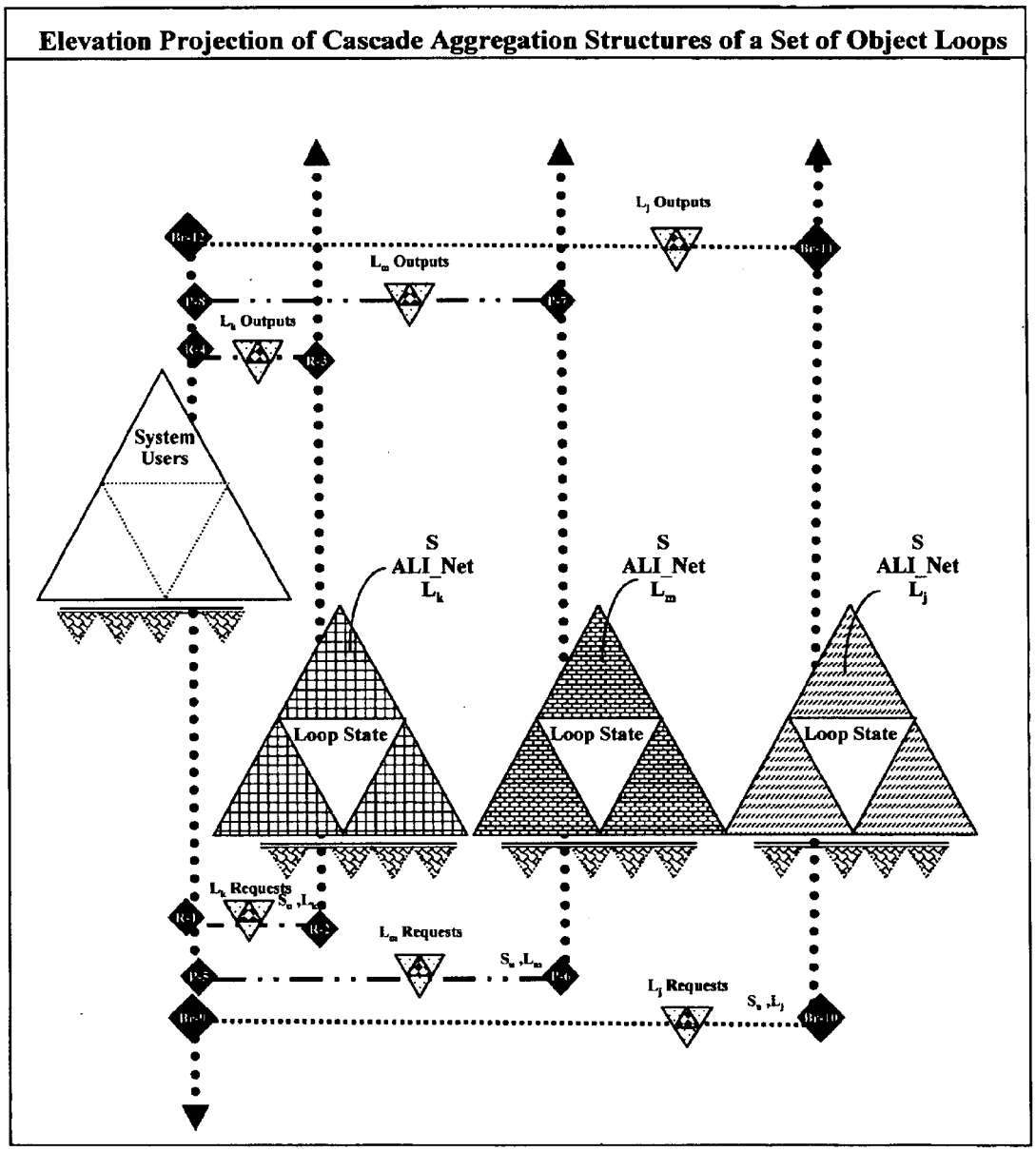
Figure 65: Elevation Projection of Cascade Aggregation Structures of a Set of Object Loops

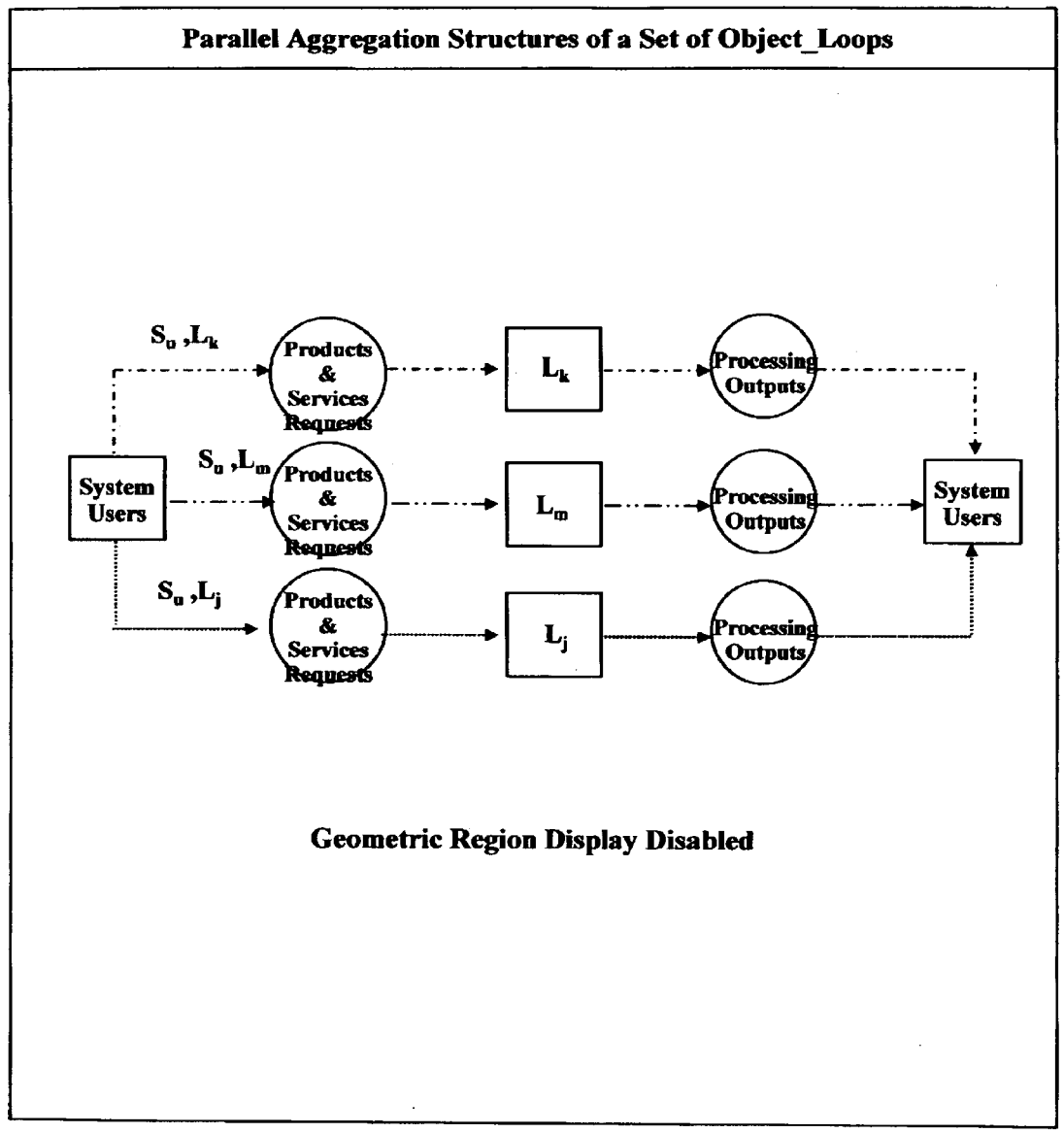
Figure 66: Parallel Aggregation Structures of a Set of Object_Loops

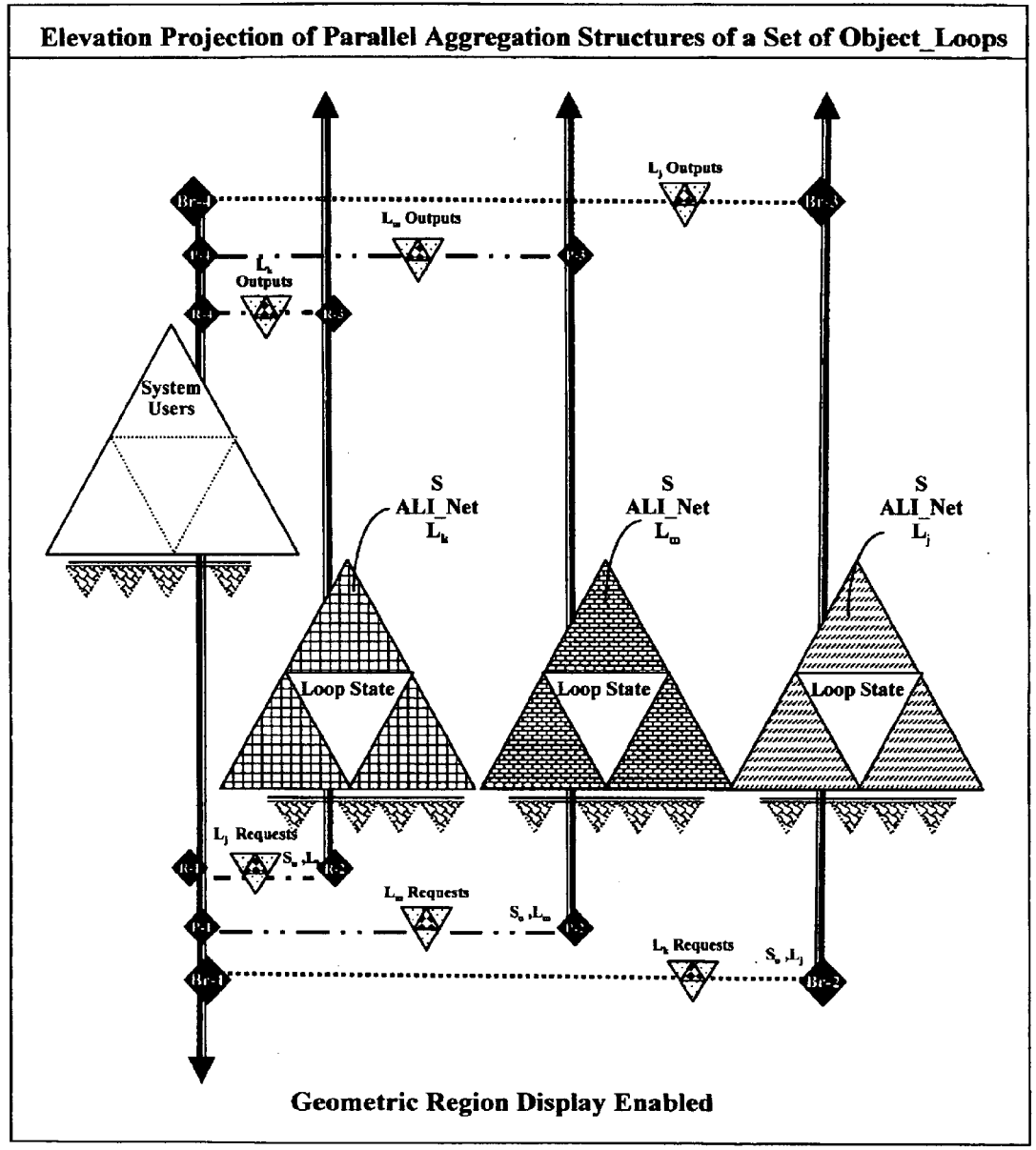
Figure 67: Elevation Projection of Parallel Aggregation Structures of a Set of Object_Loops Multi-layer ALI_Net Composition of an Integrated Architecture
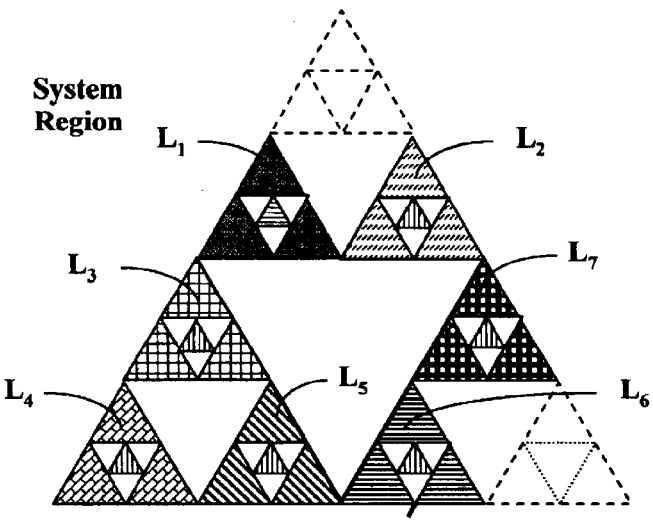
(a) Each ALI_Net $L_i$ has an associated set of object loops
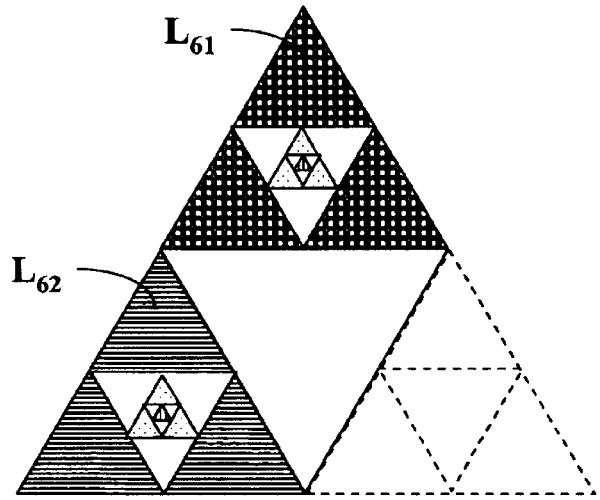
(b) Each of the object loops $L_{i1}$, $L_{i2}$, ... of the ALI_Net $L_i$ has a multi-layered set of object loops
Figure 68: Multi-layer ALI_Net Composition of an Integrated Architecture

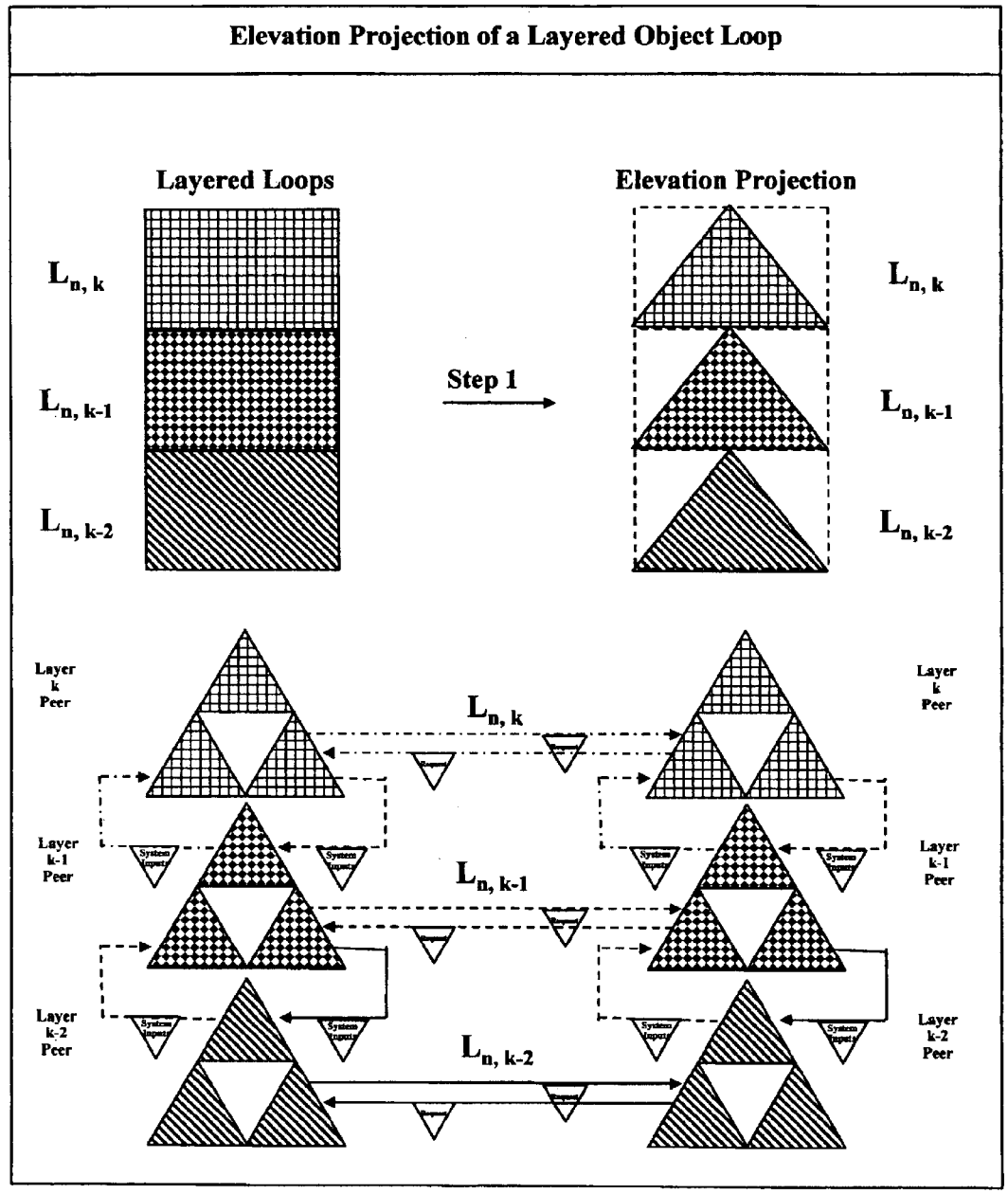
Figure 69: Elevation Projection of a Layered Object Loop

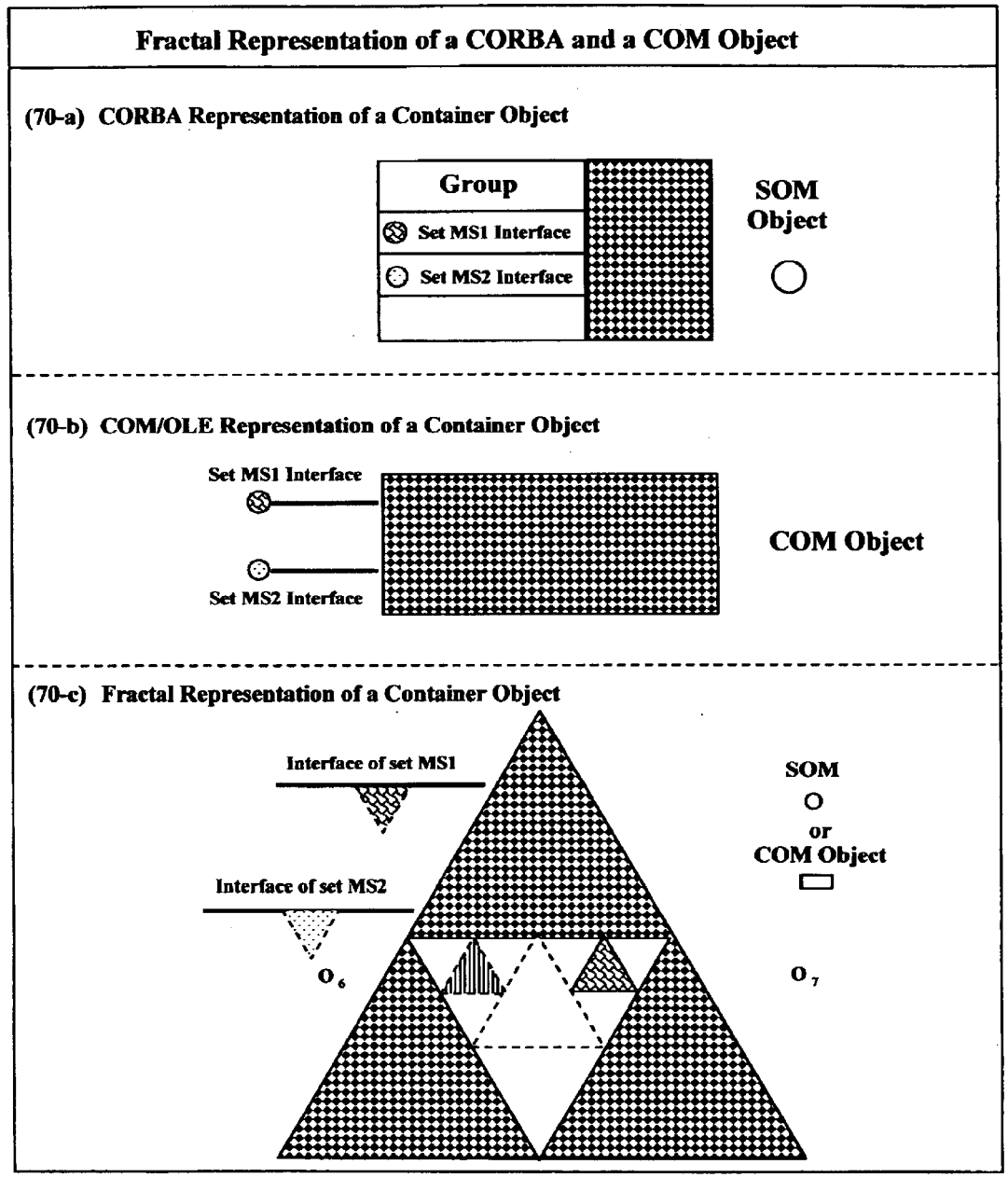
Figure 70: Fractal Representation of a CORBA and a COM Object

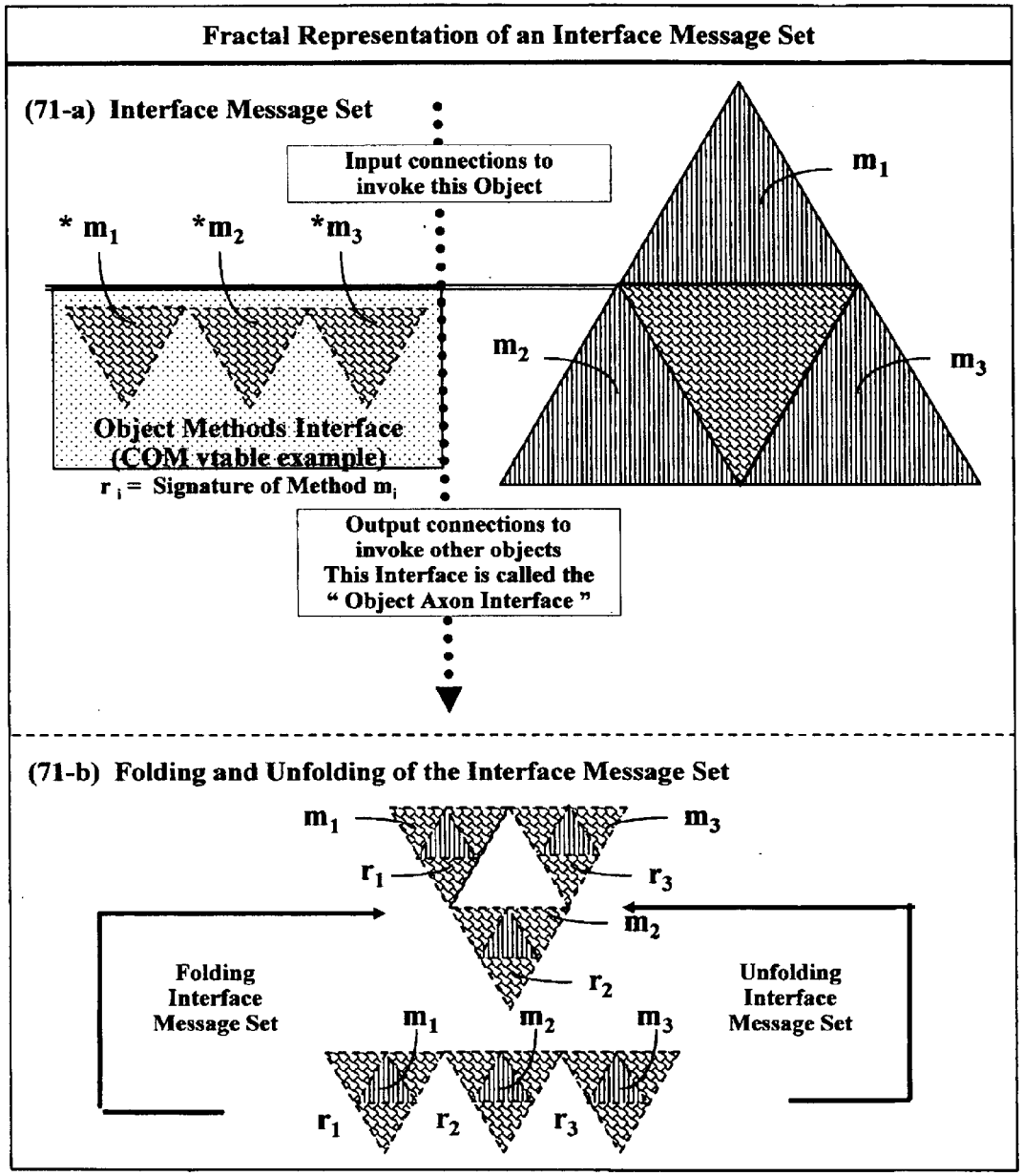
Figure 71: Fractal Representation of an Interface Message Set

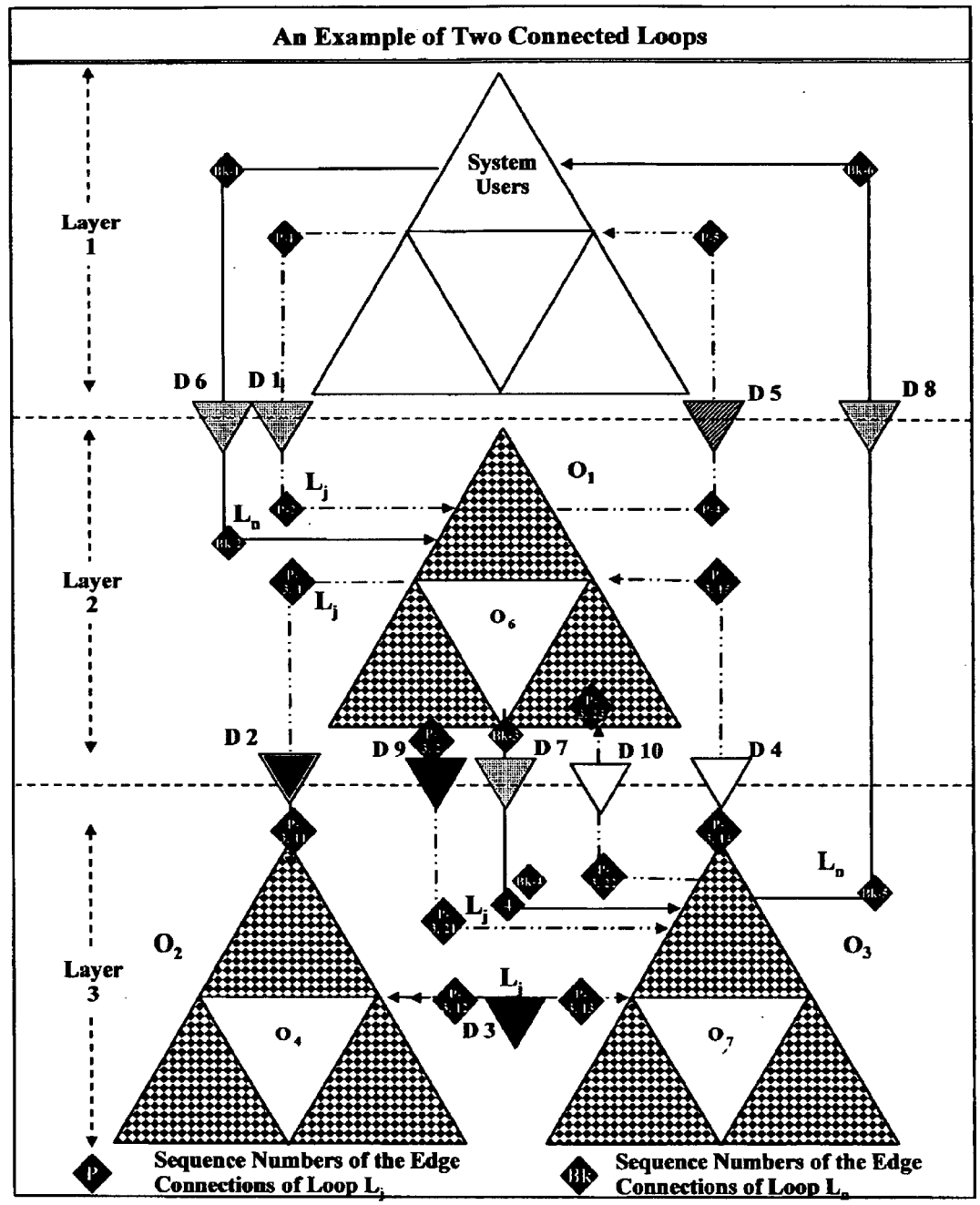
Figure 72: An Example of Two Connected Loops

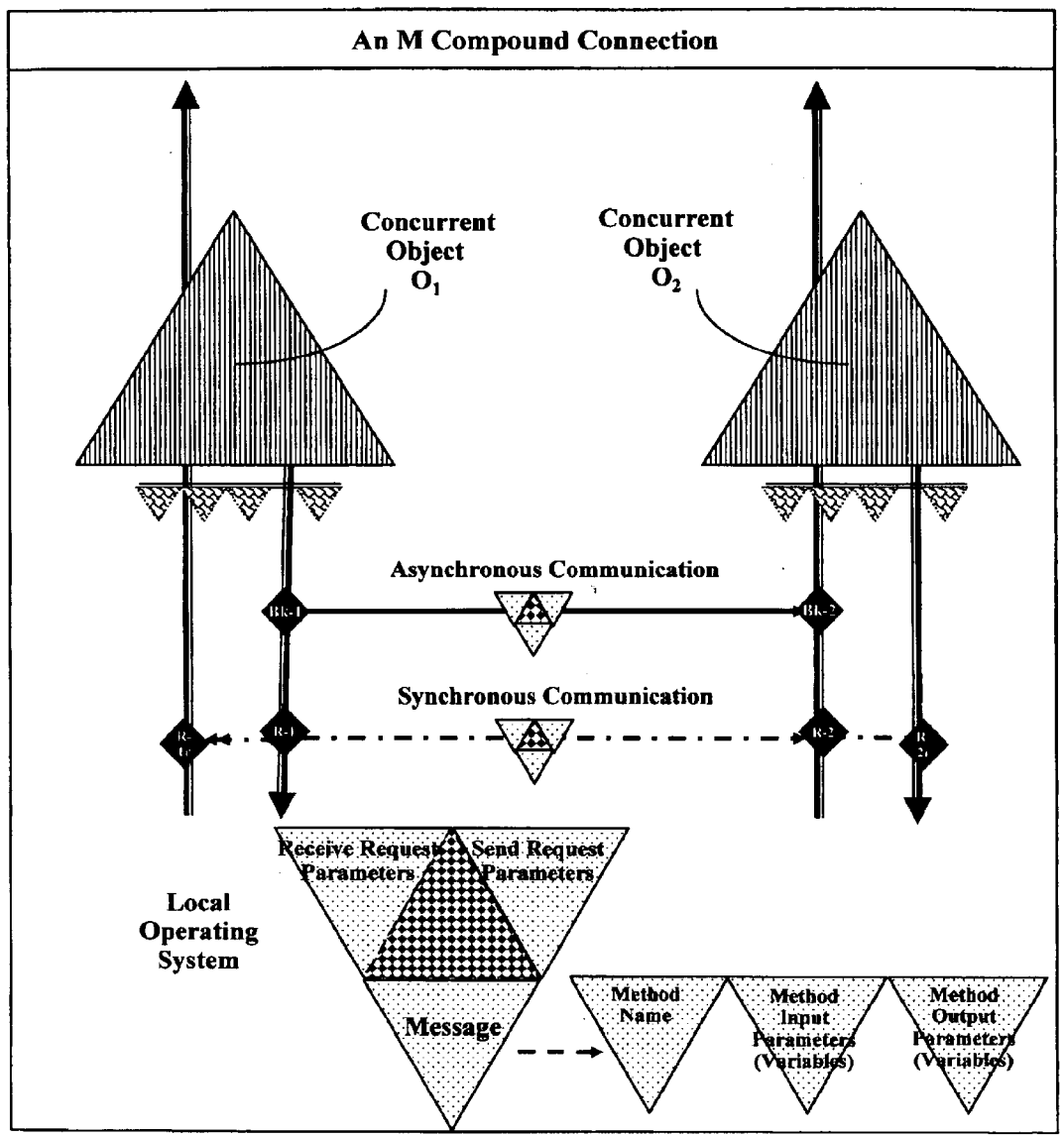
Figure 73: An M Compound Connection

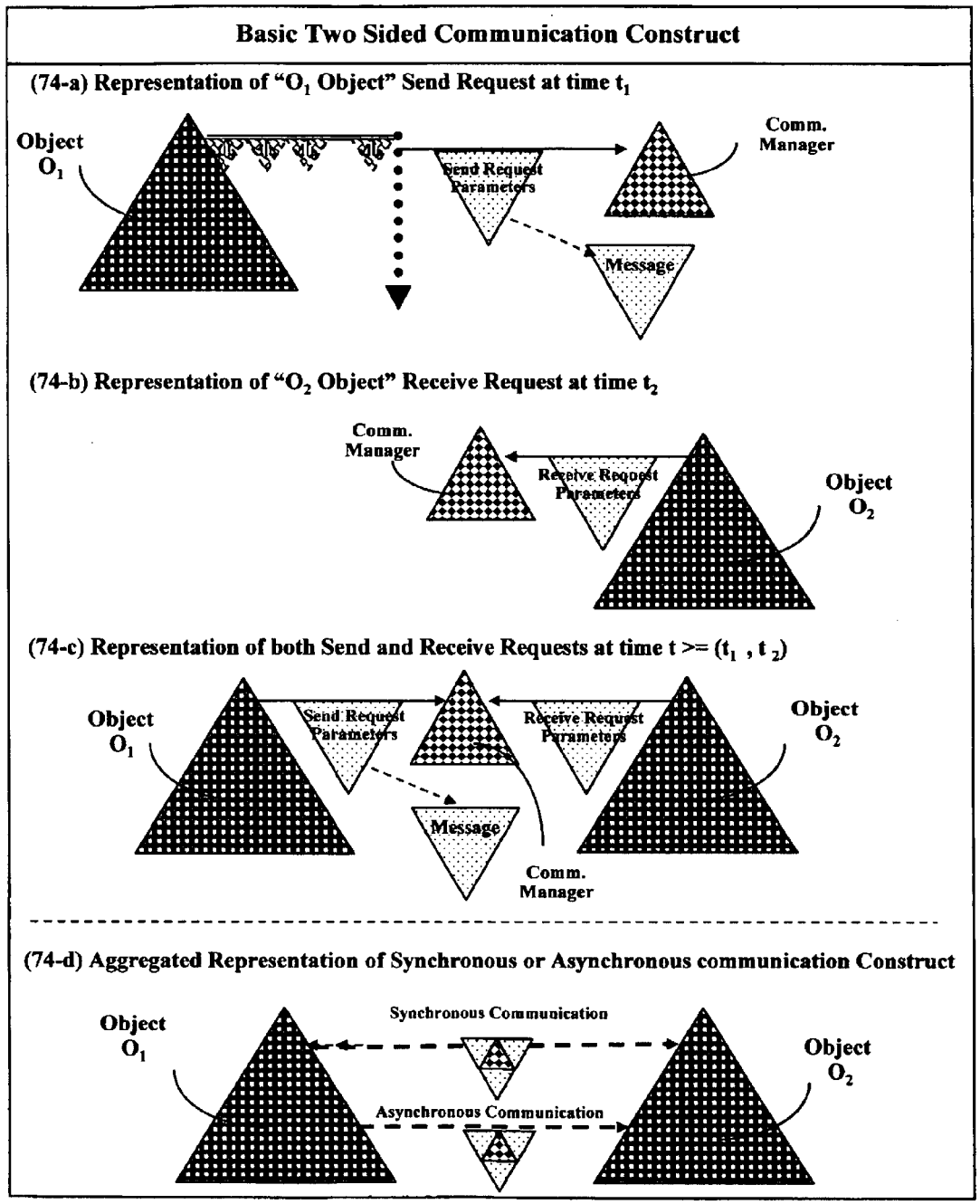
Figure 74: Basic Two Sided Communication Construct

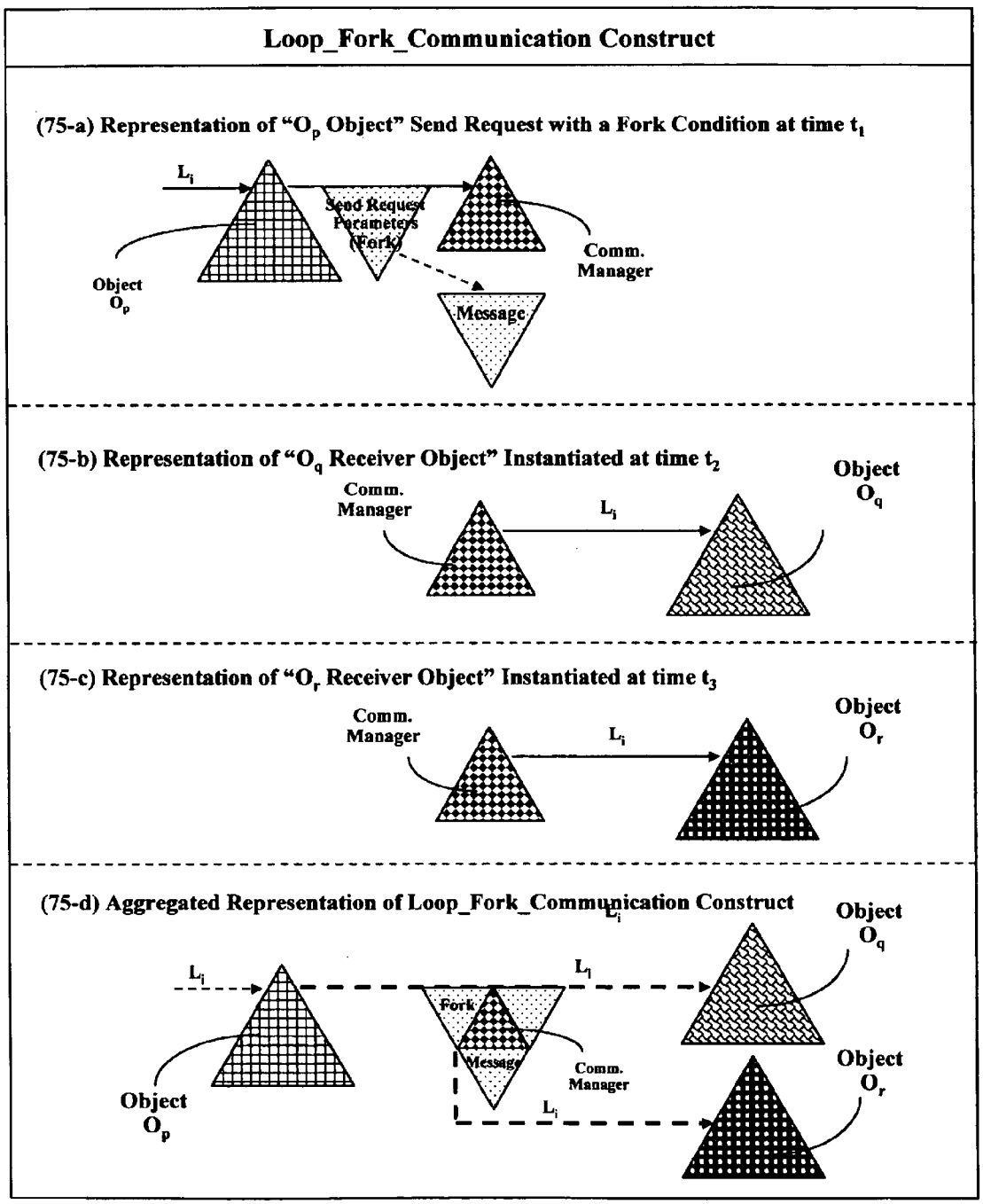
Figure 75: Loop_Fork_Communication Construct

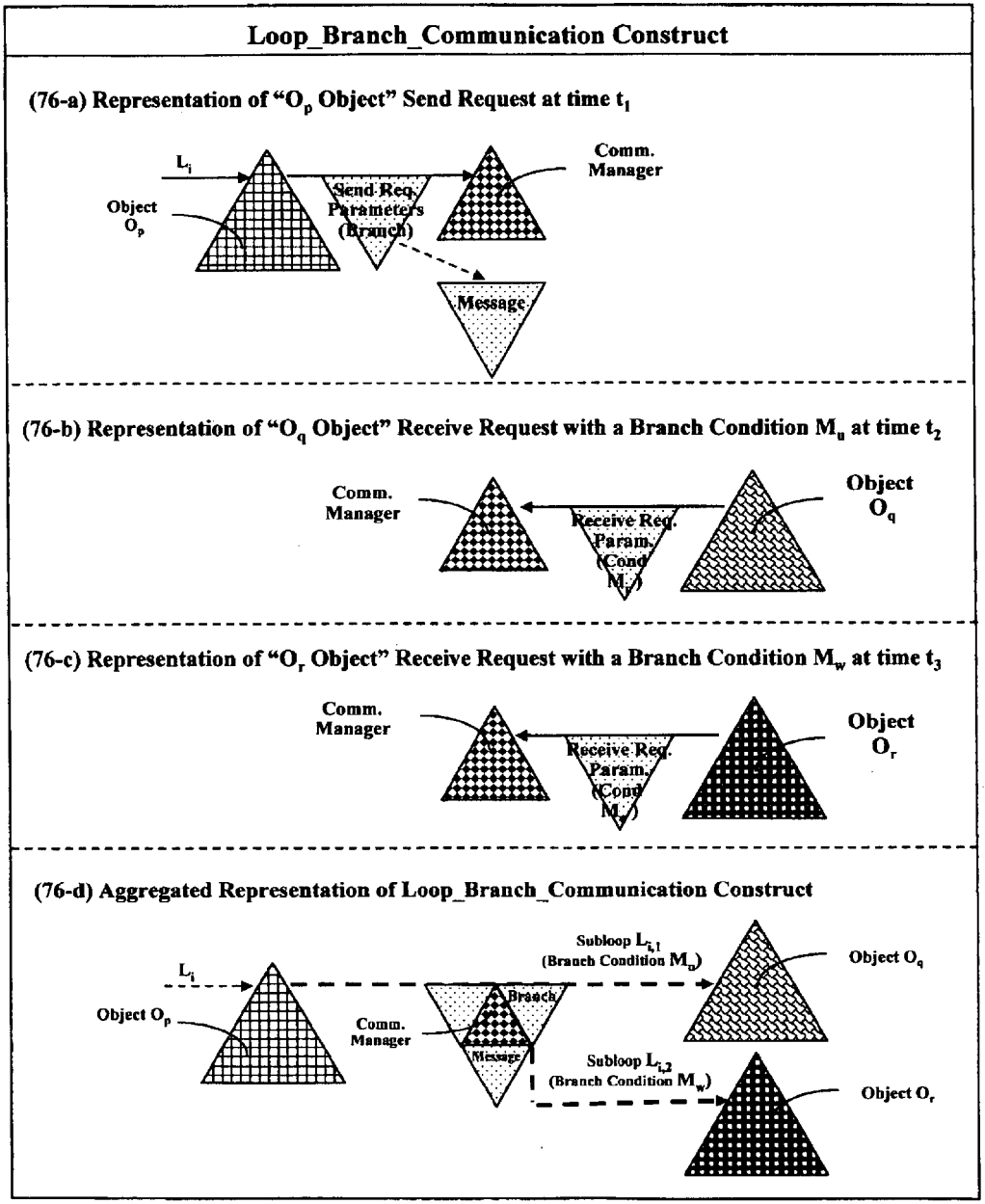
Figure 76: Loop_Branch_Communication Construct

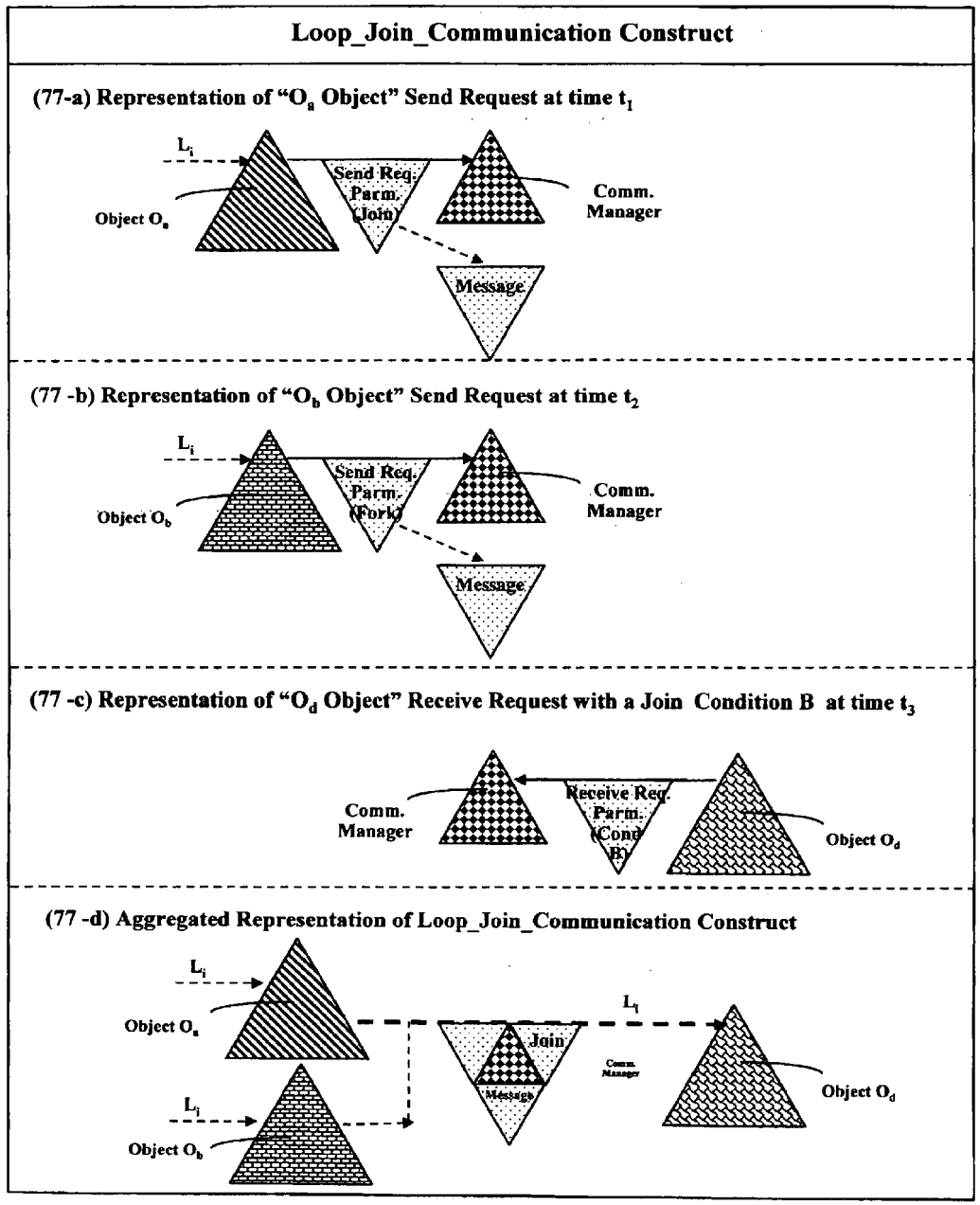
Figure 77: Loop_Join_Communication Construct

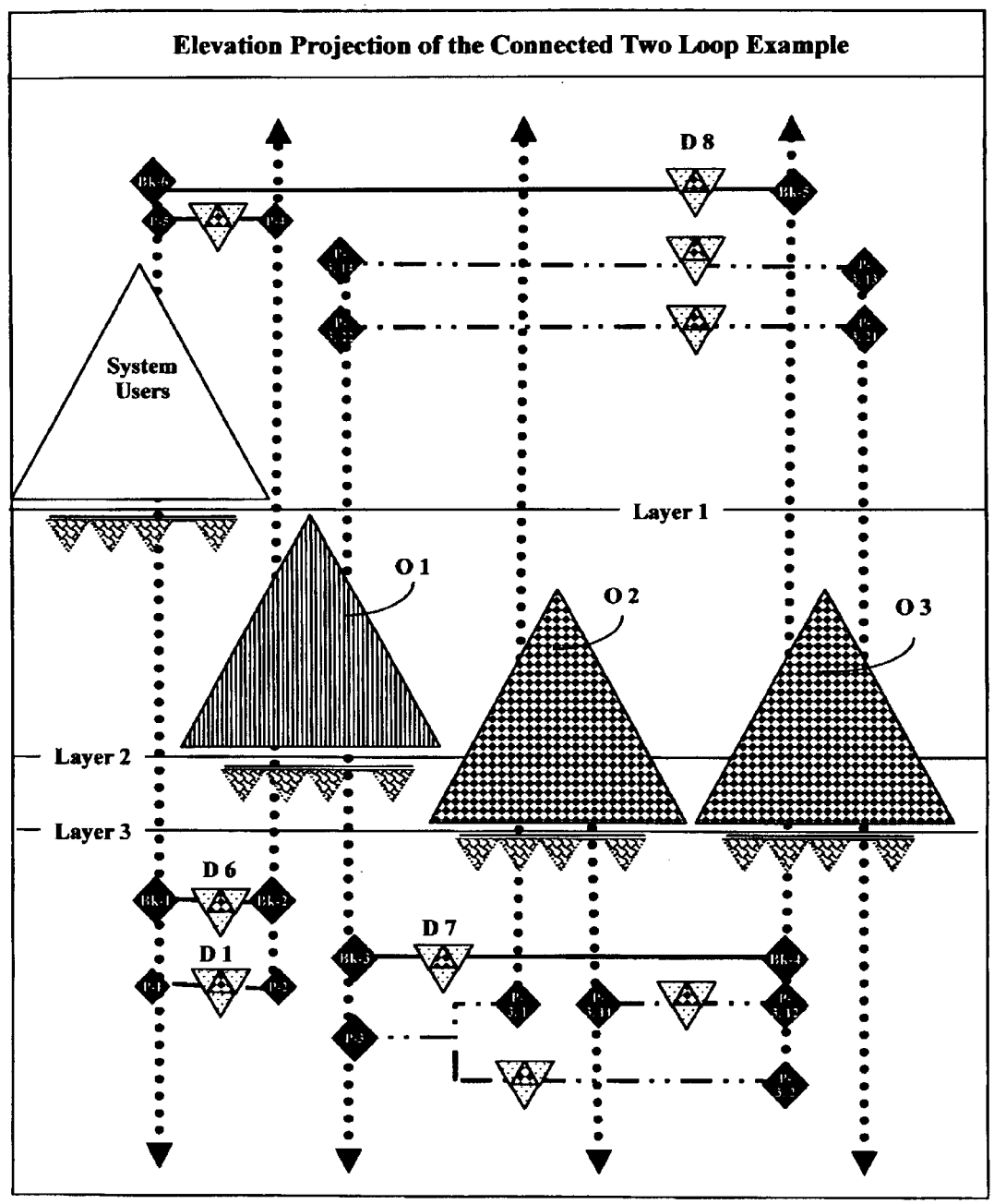
Figure 78: Elevation Projection of the Connected Two Loop Example

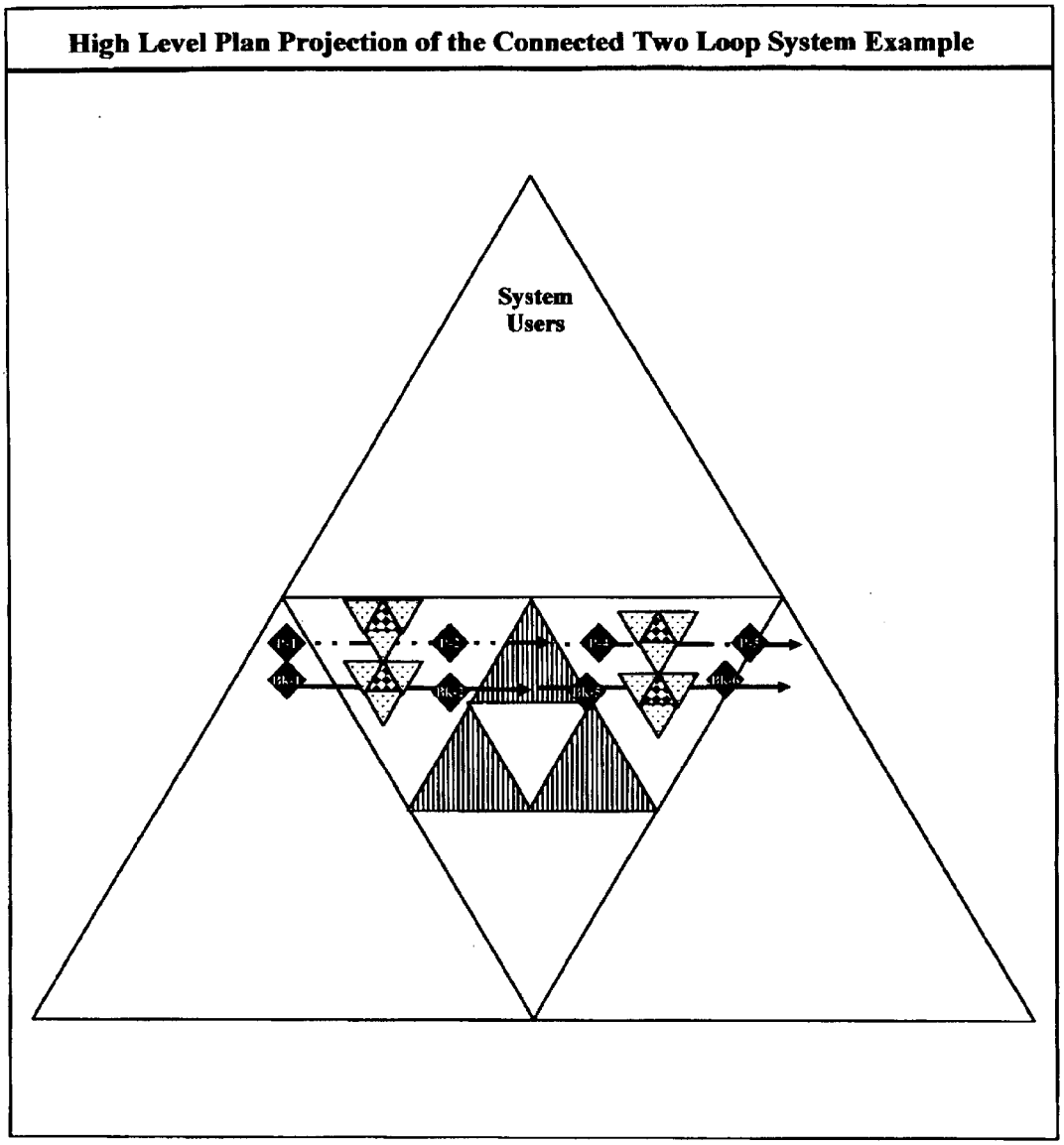
Figure 79: High Level Plan Projection of the Connected Two Loop System Example

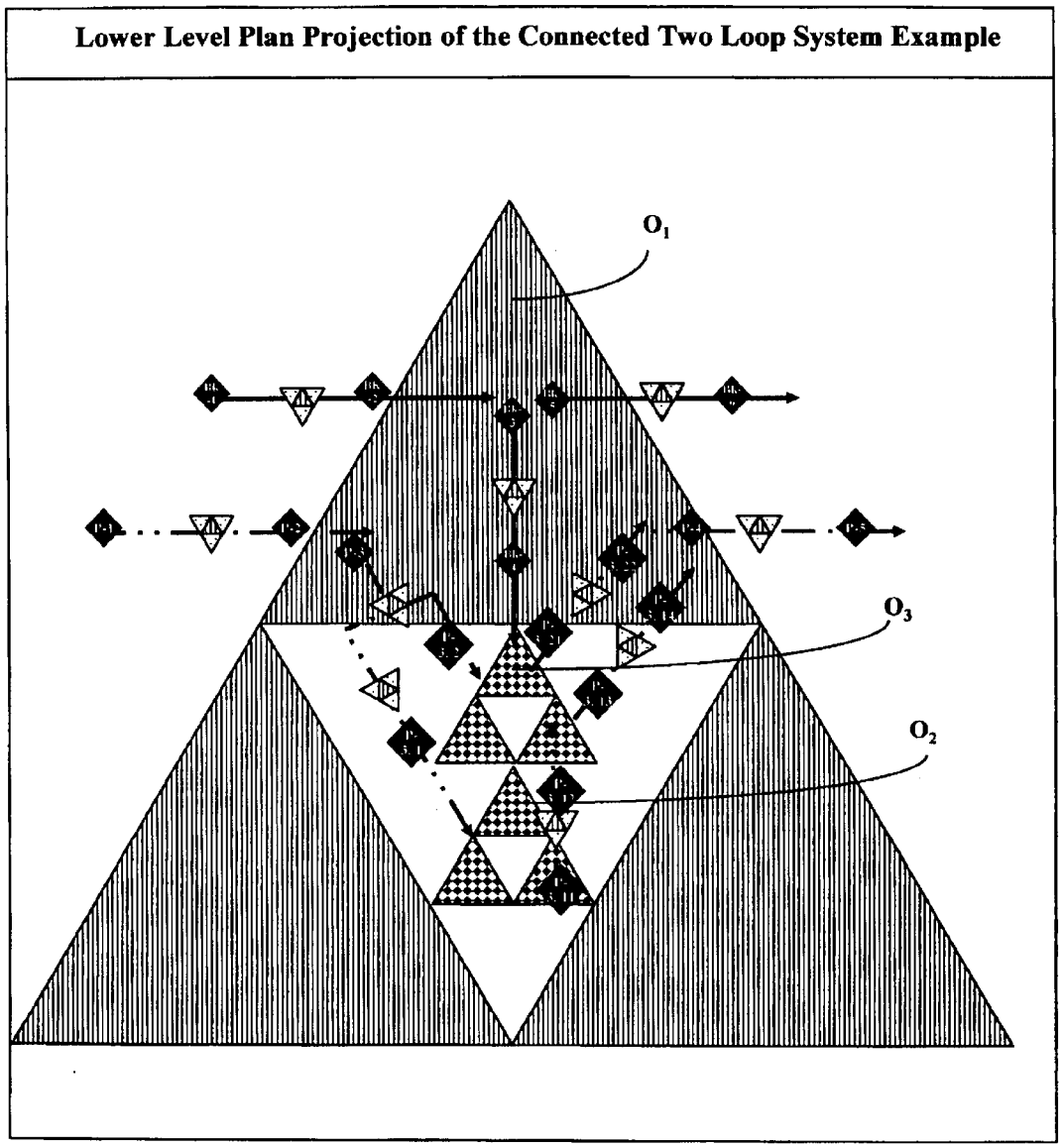
Figure 80: Lower Level Plan Projection of the Connected Two Loop System Example

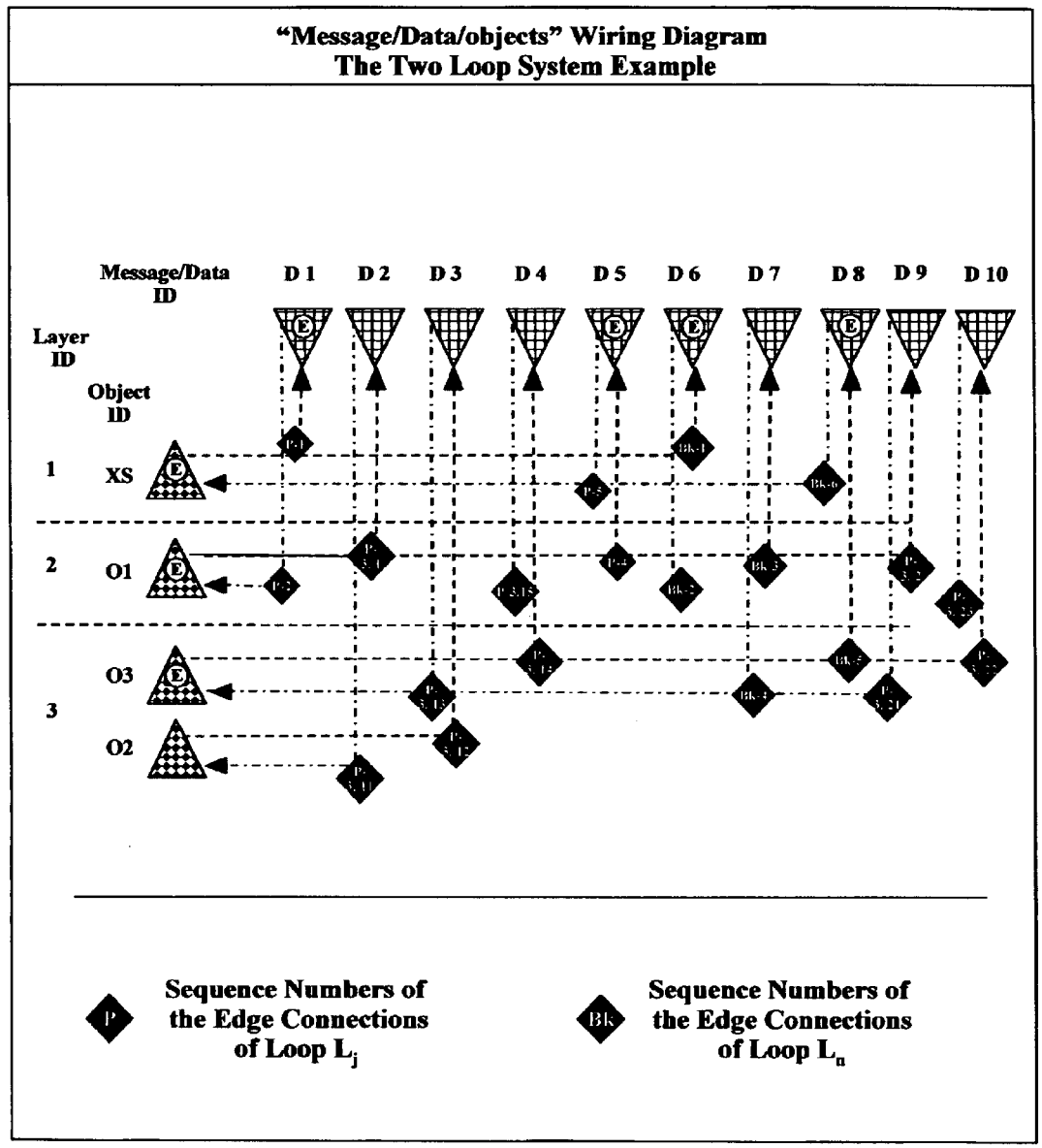
Figure 81: "Message/Data/objects" Wiring Diagram, The Two Loop System Example

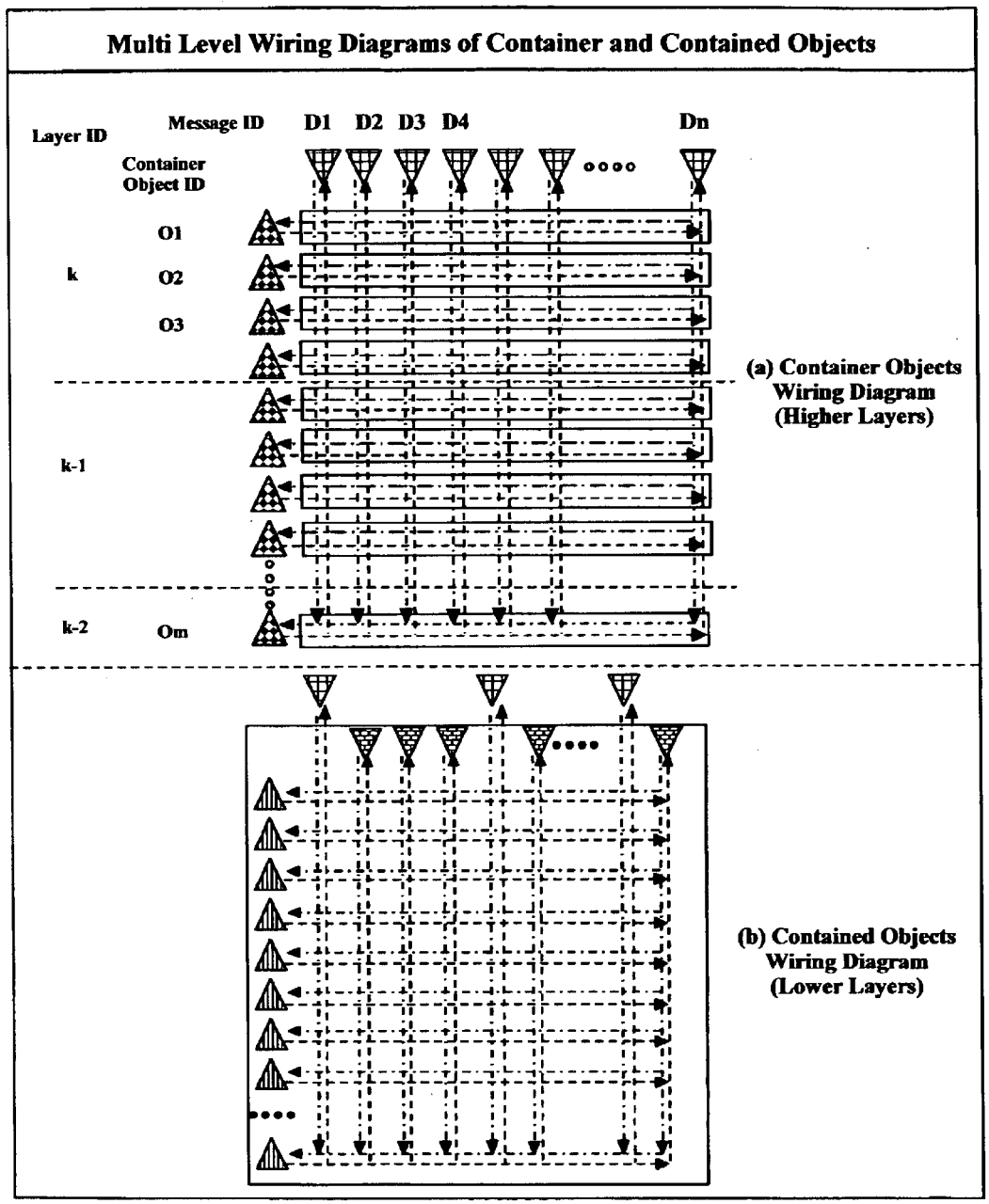
Figure 82: Multi Level Wiring Diagrams of Container and Contained Objects

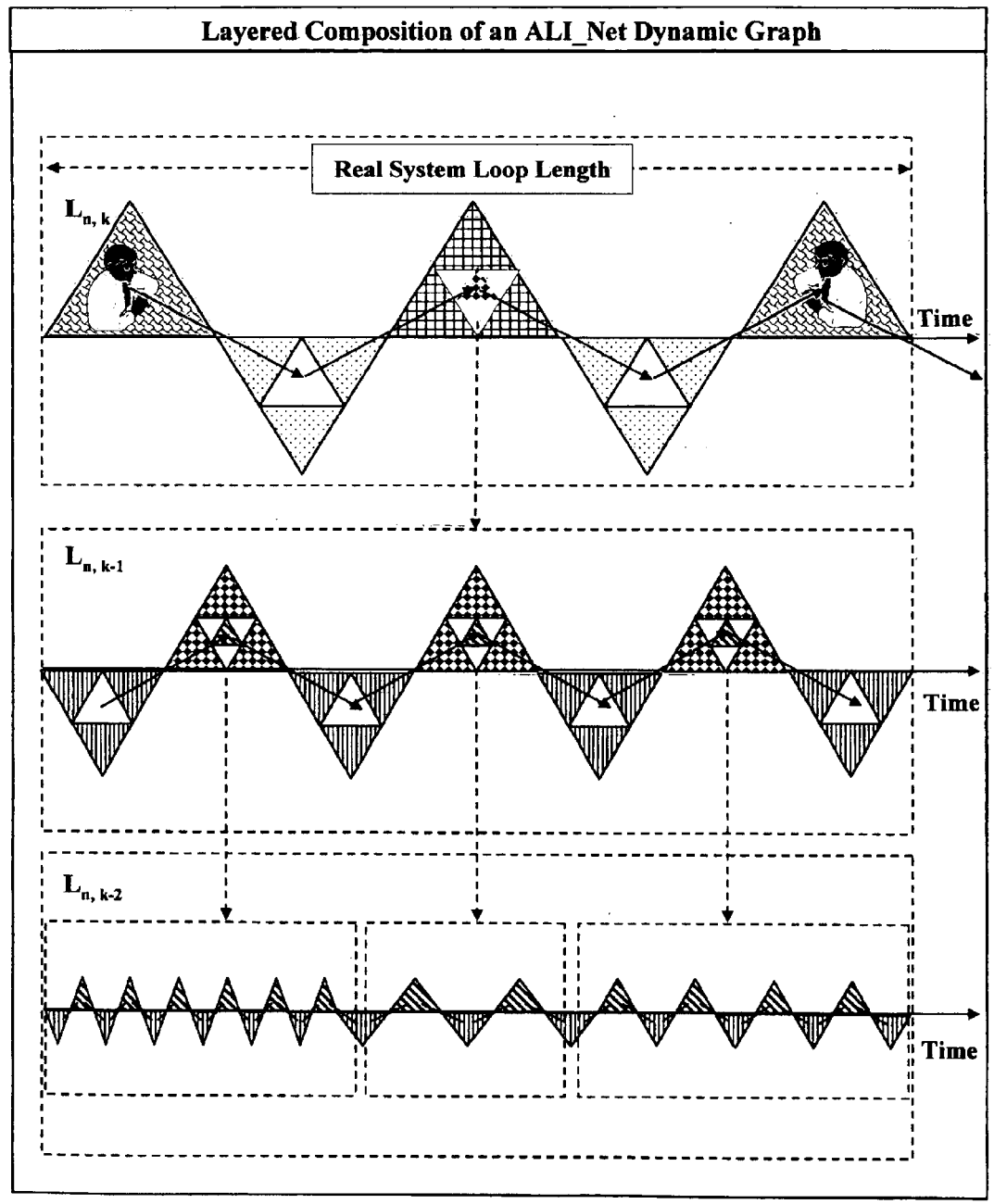
Figure 83: Layered Composition of an ALI_Net Dynamic Graph

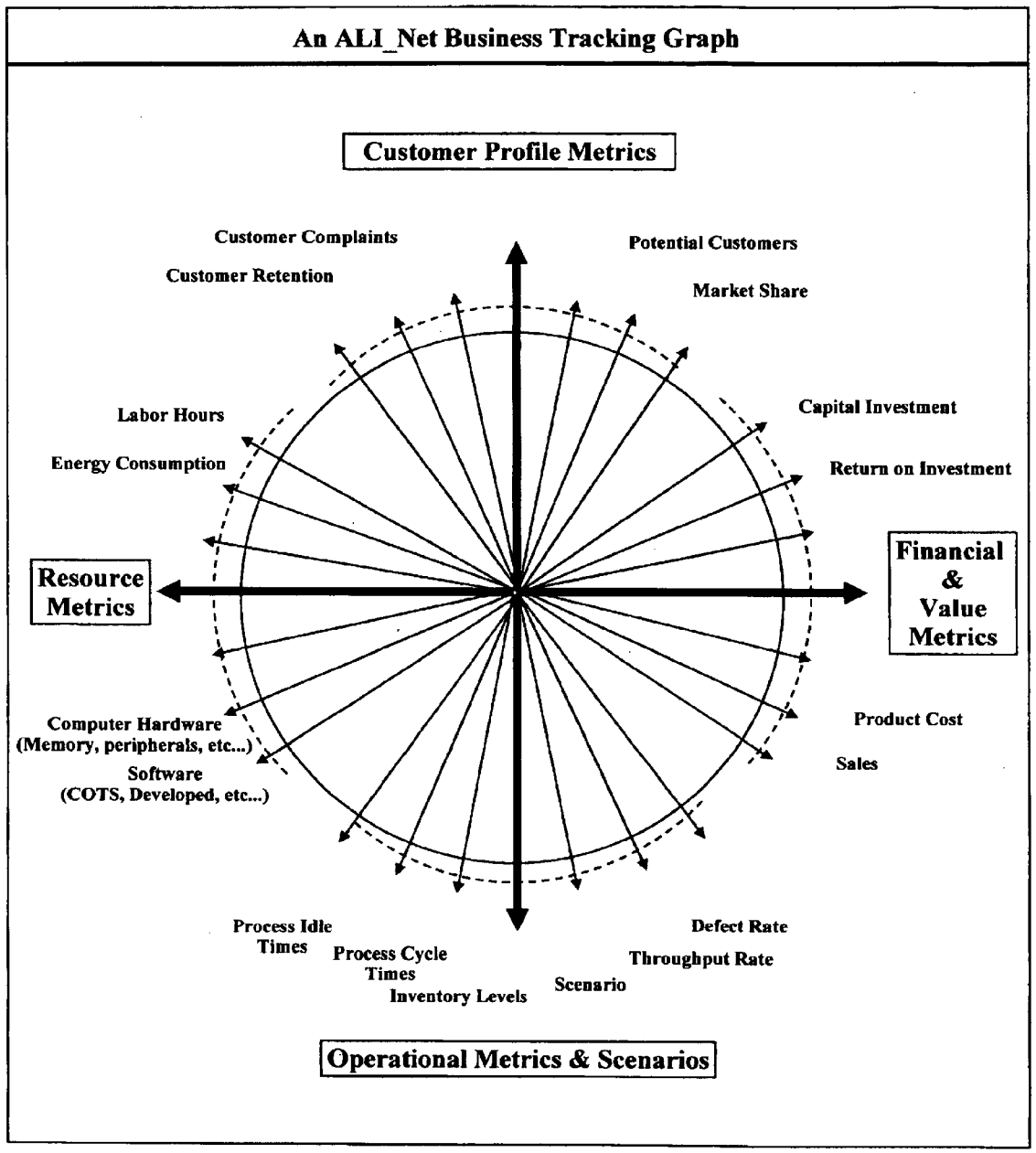
Figure 84: An ALI_Net Business Tracking Graph

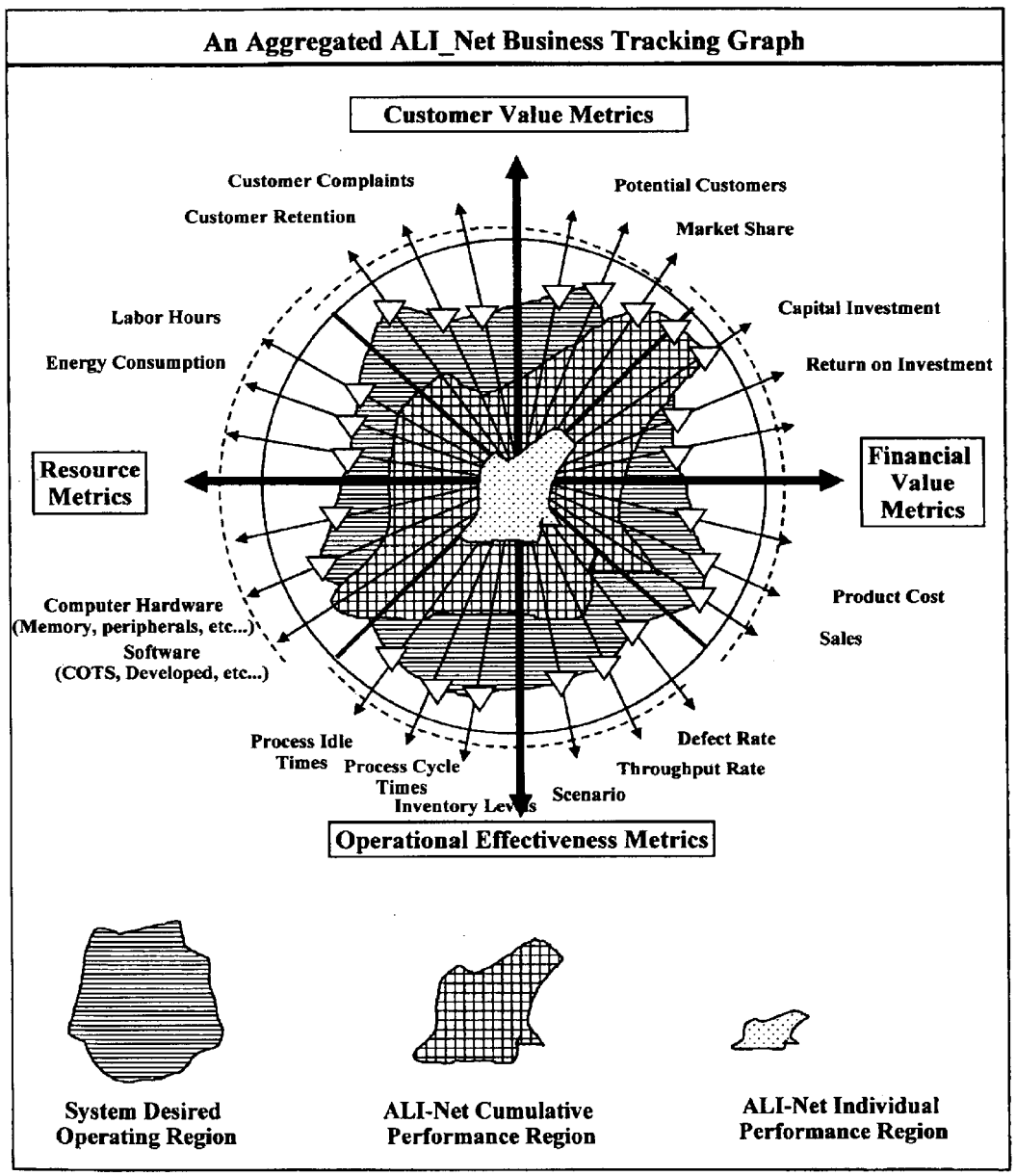
Figure 85: An Aggregated ALI_Net Business Tracking Graph

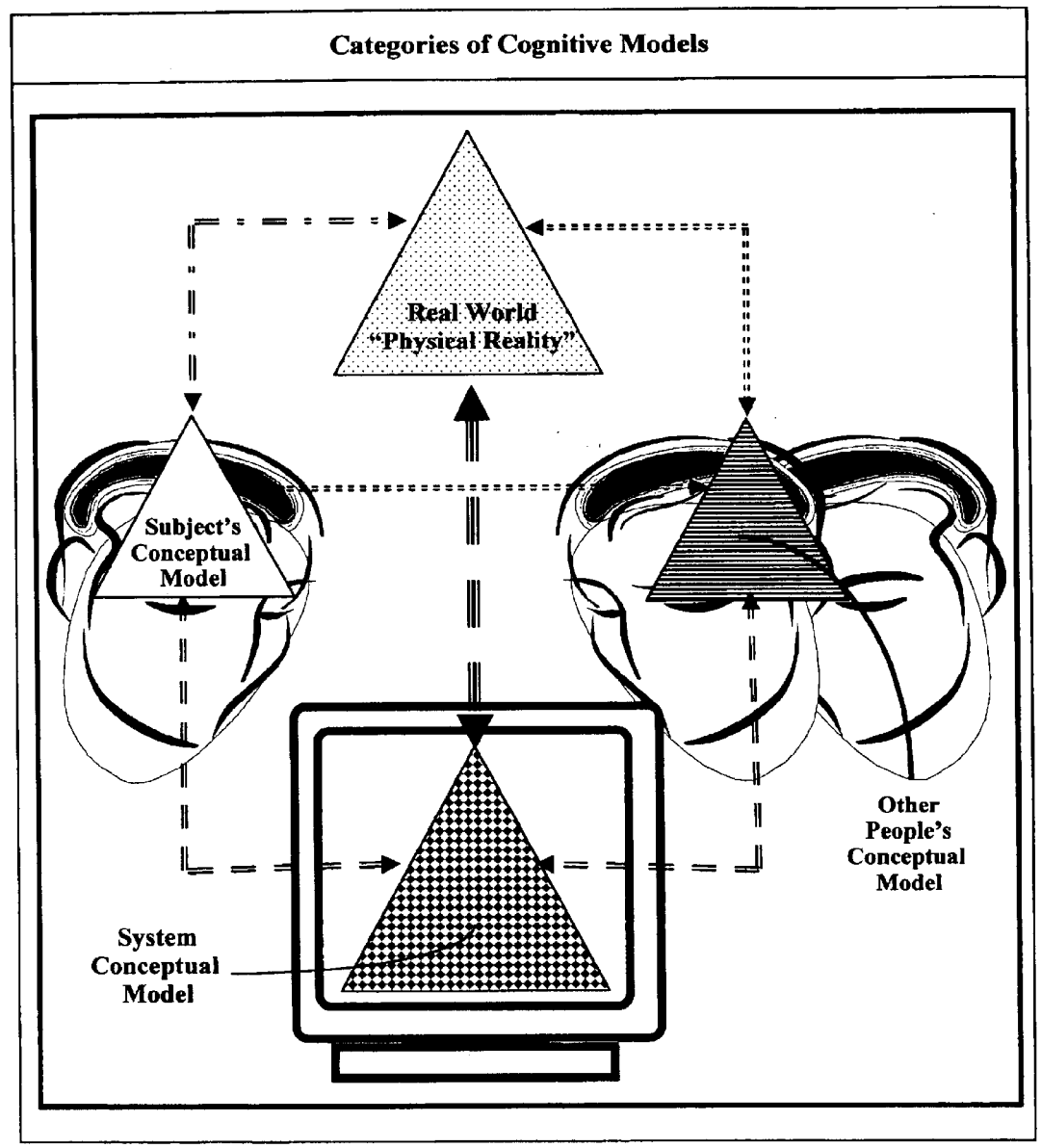
Figure 86: Categories of Cognitive Models

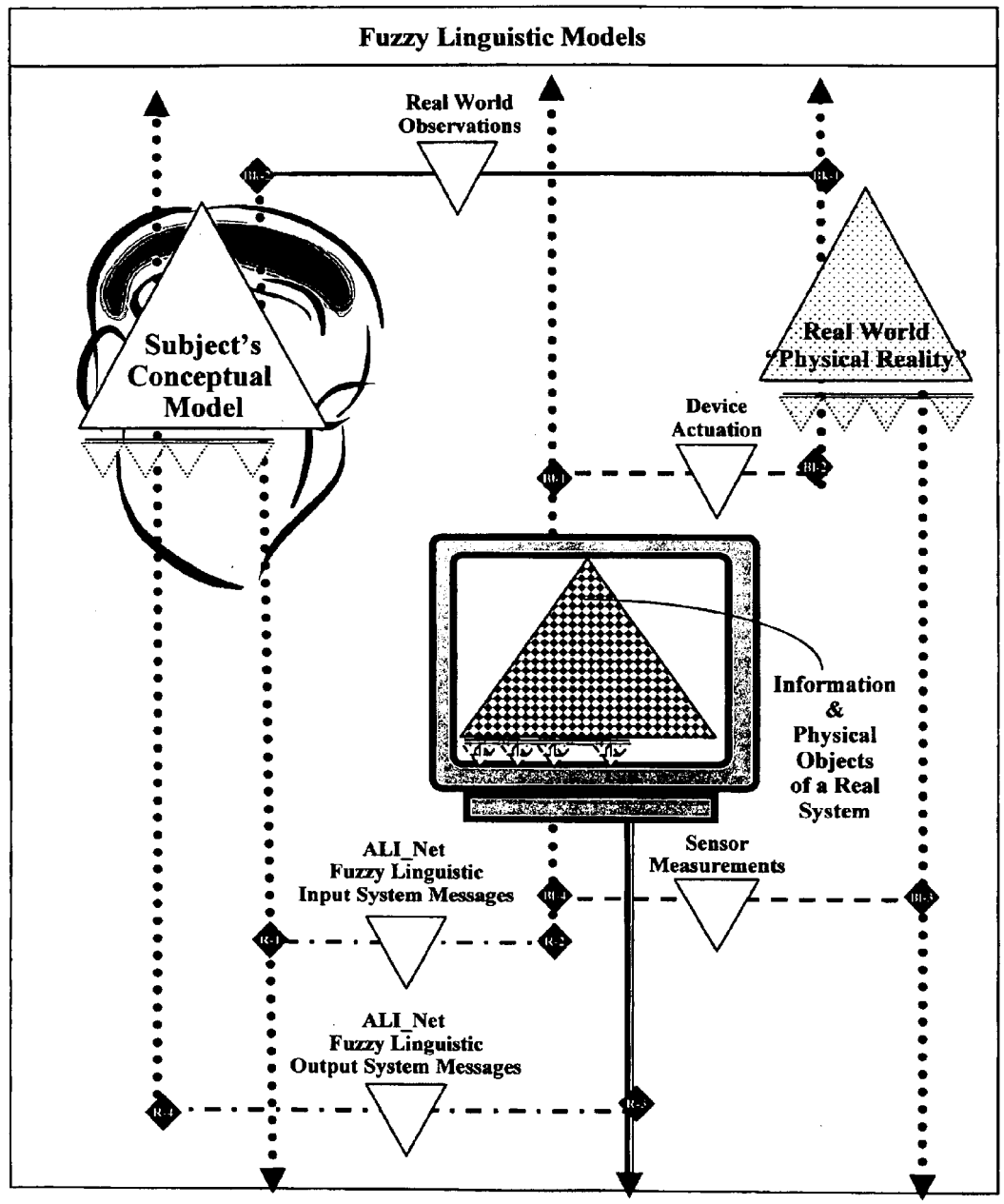
Figure 87: Fuzzy Linguistic Models

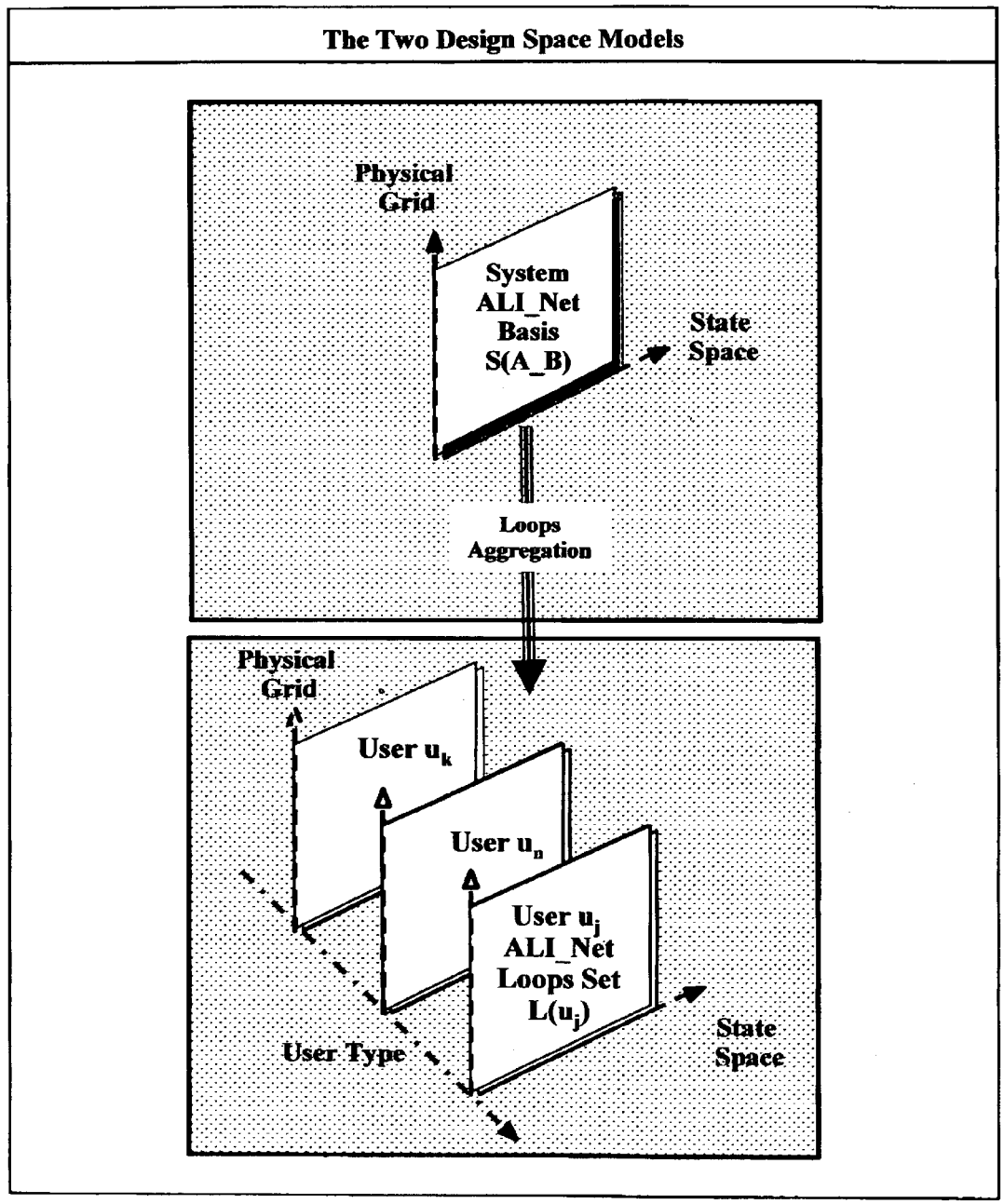
Figure 88: The Two Design Space Models

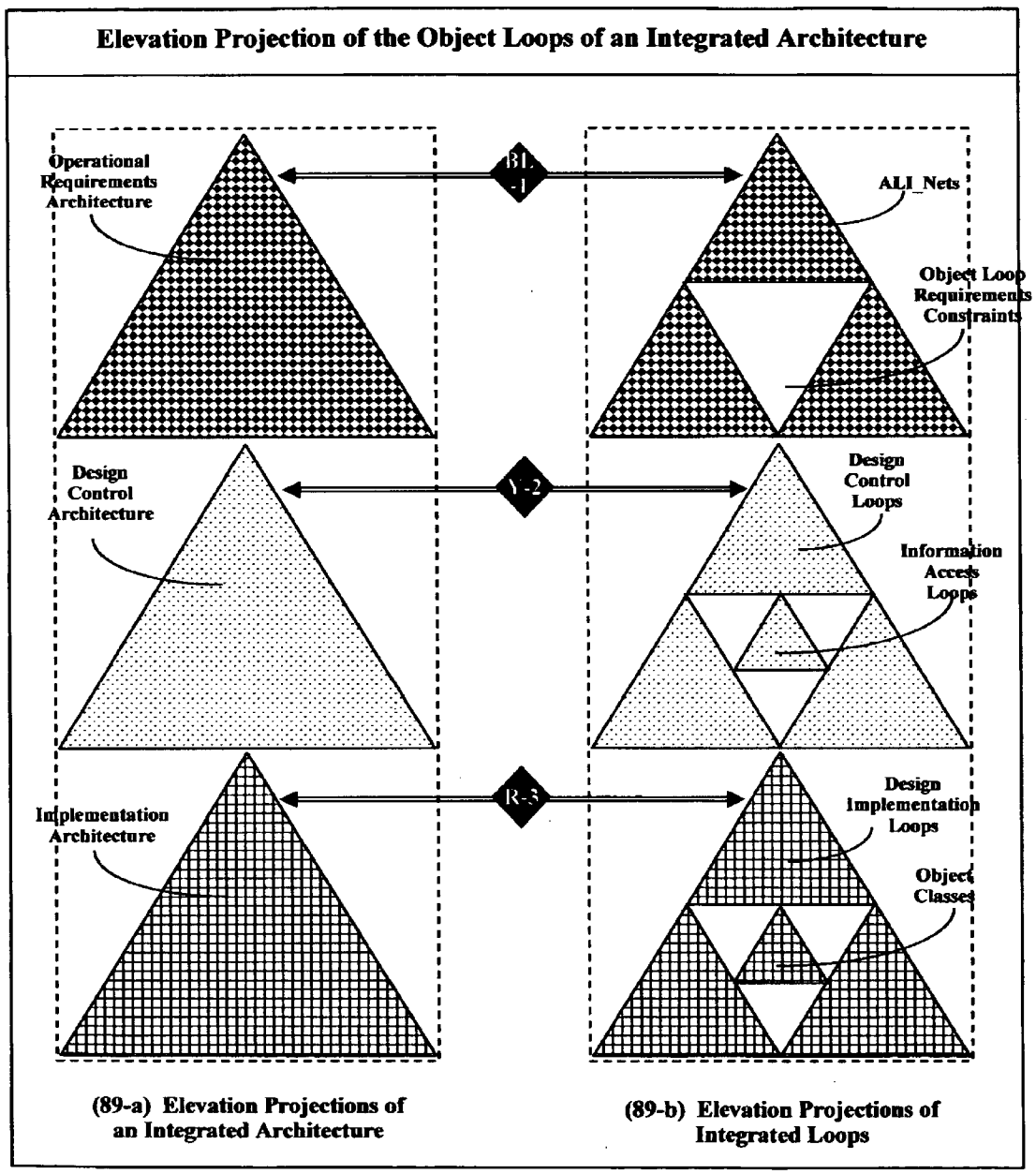
Figure 89: Elevation Projection of the Object Loops of an Integrated Architecture

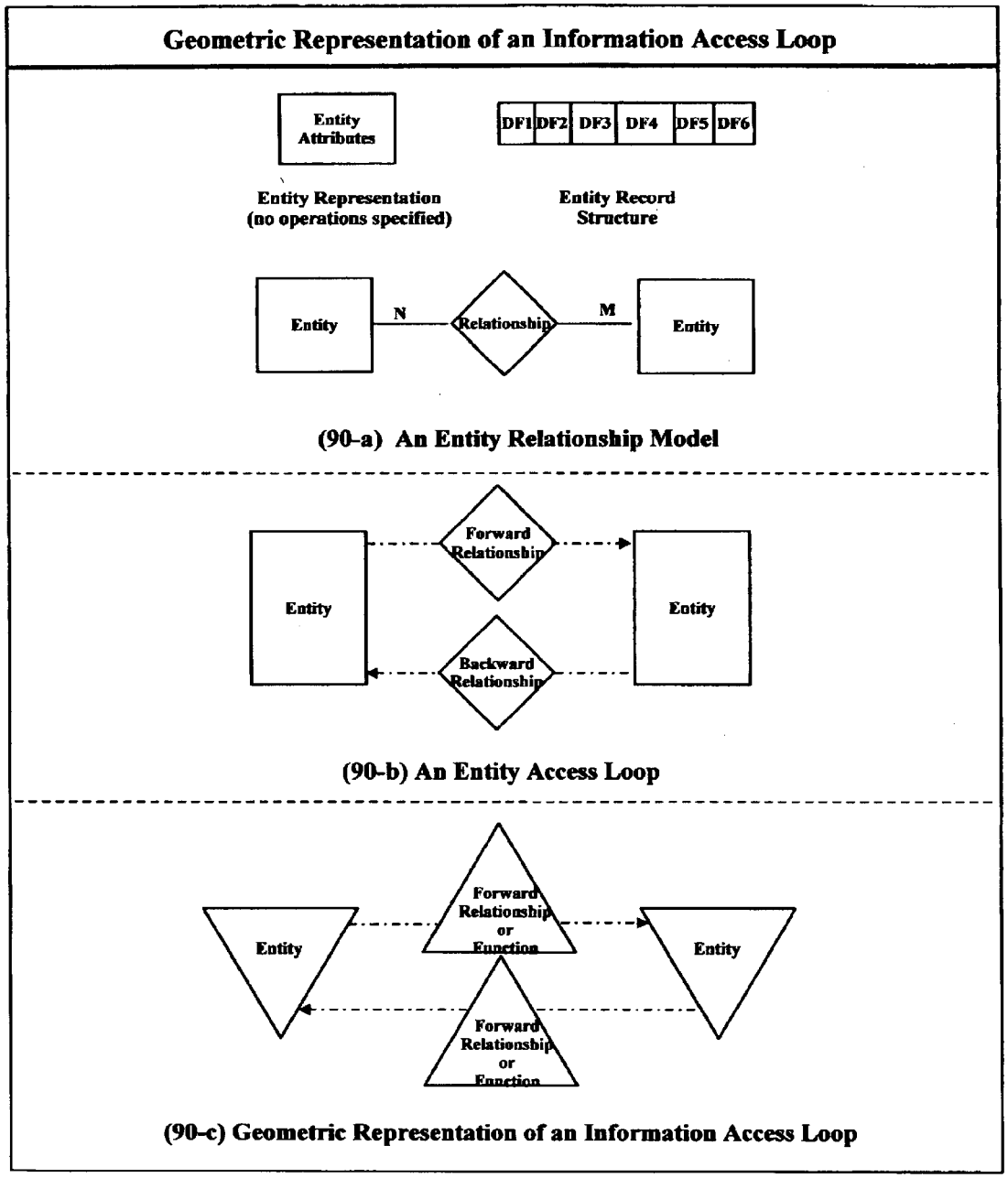
Figure 90: Geometric Representation of an Information Access Loop

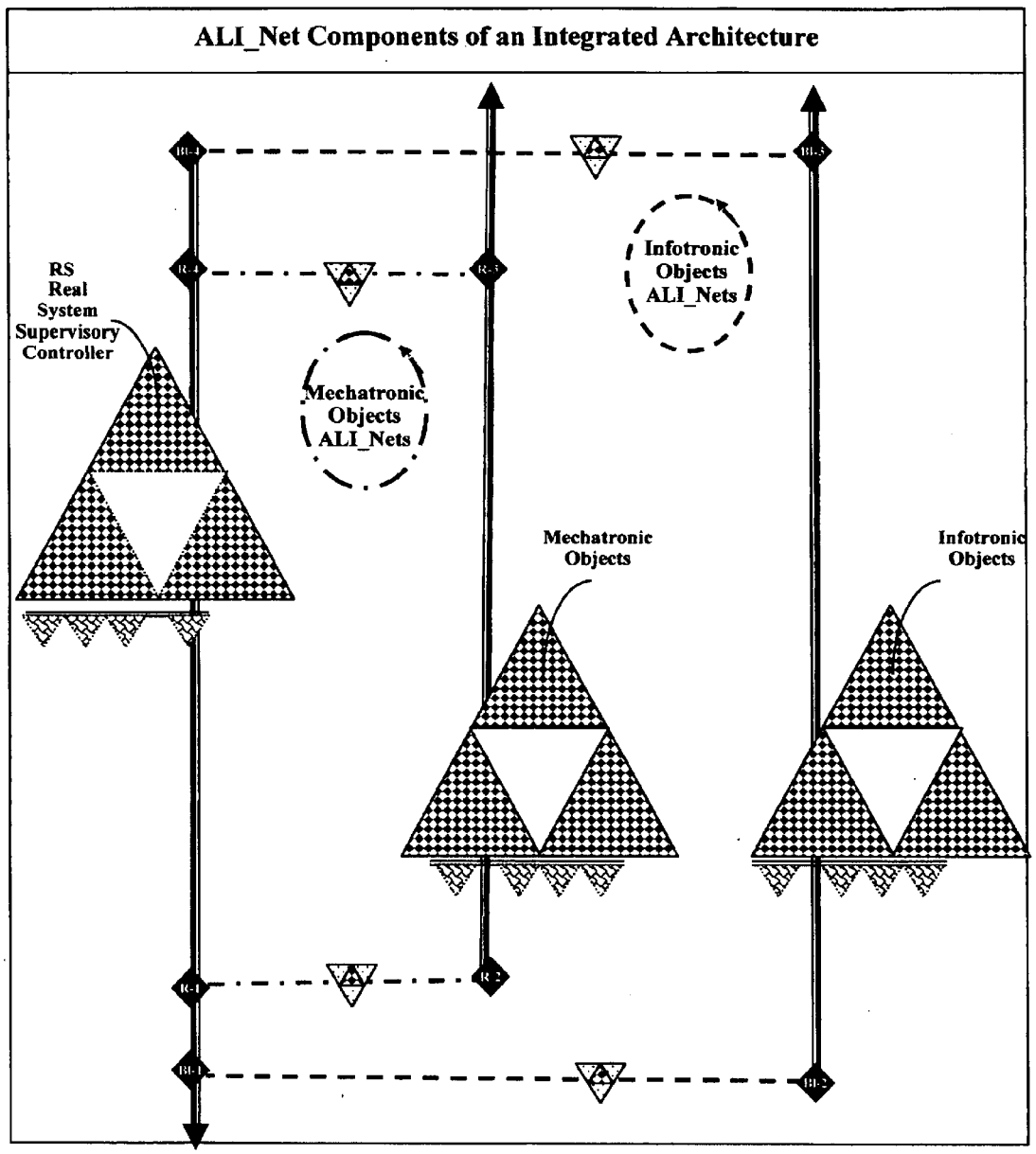
Figure 91: ALI_Net Components of an Integrated Architecture

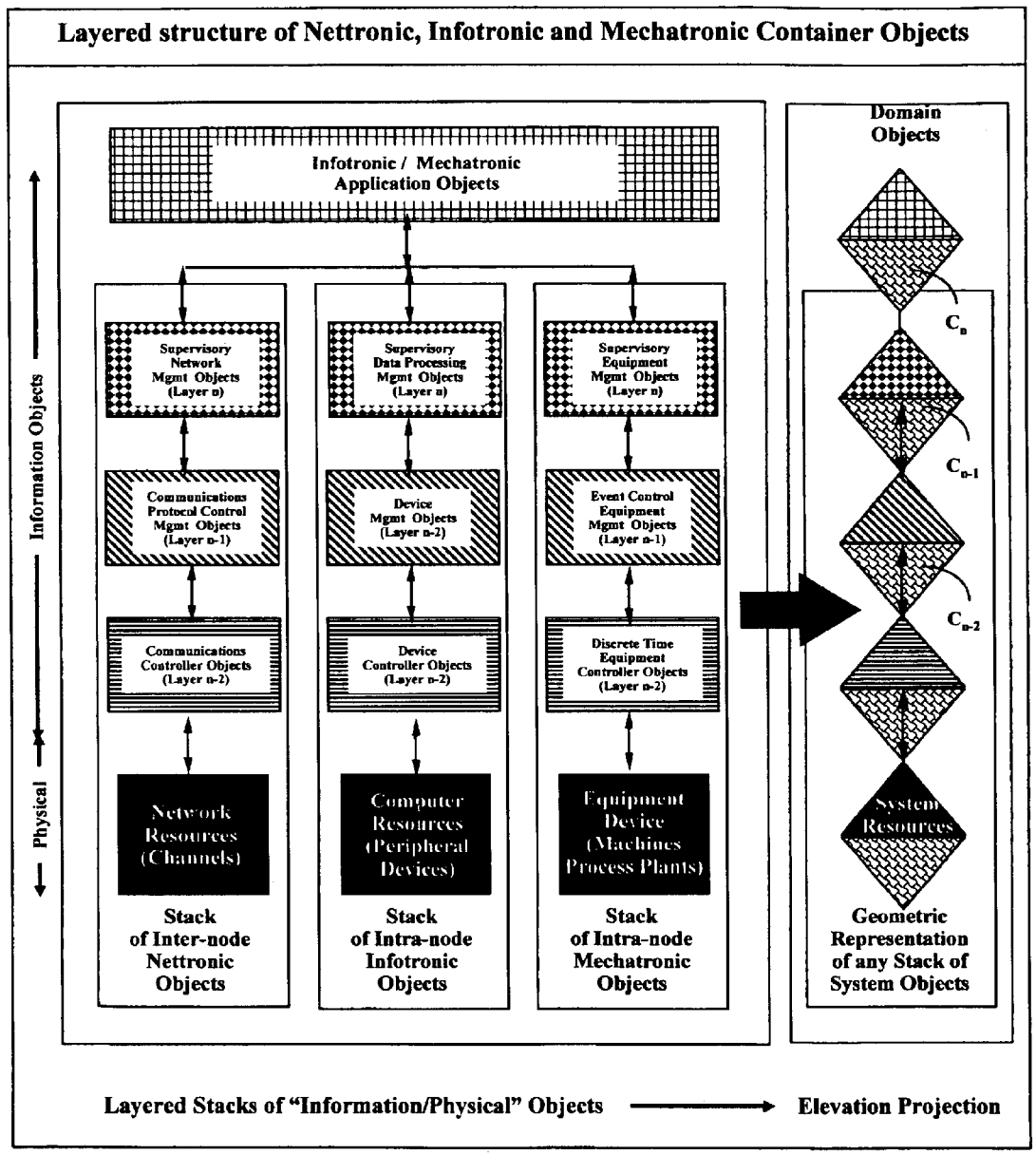
Figure 92: Layered structure of Nettronic, Infotronic and Mechatronic Container Objects

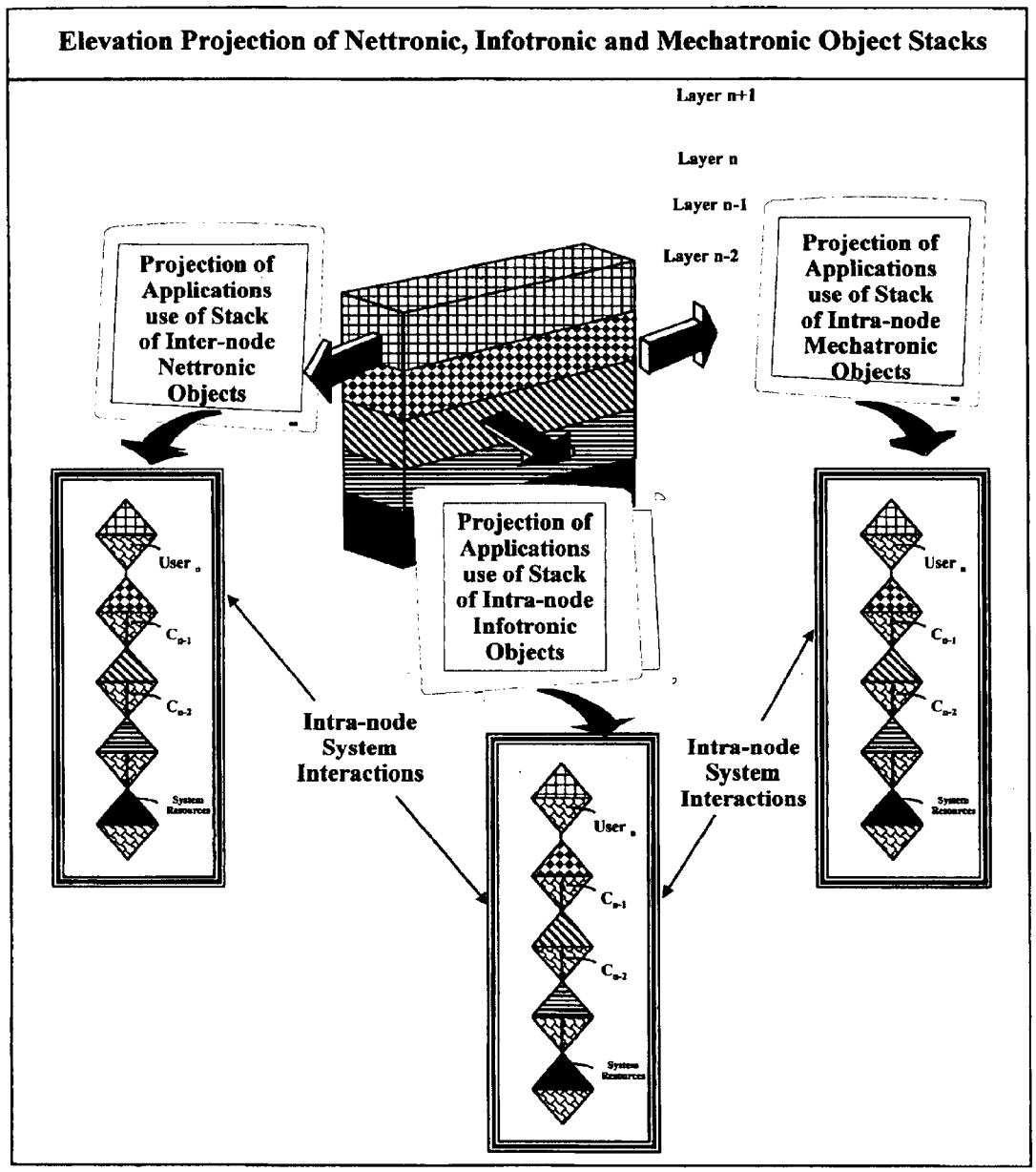
Figure 93: Elevation Projection of Nettronic, Infotronic and Mechatronic Object Stacks

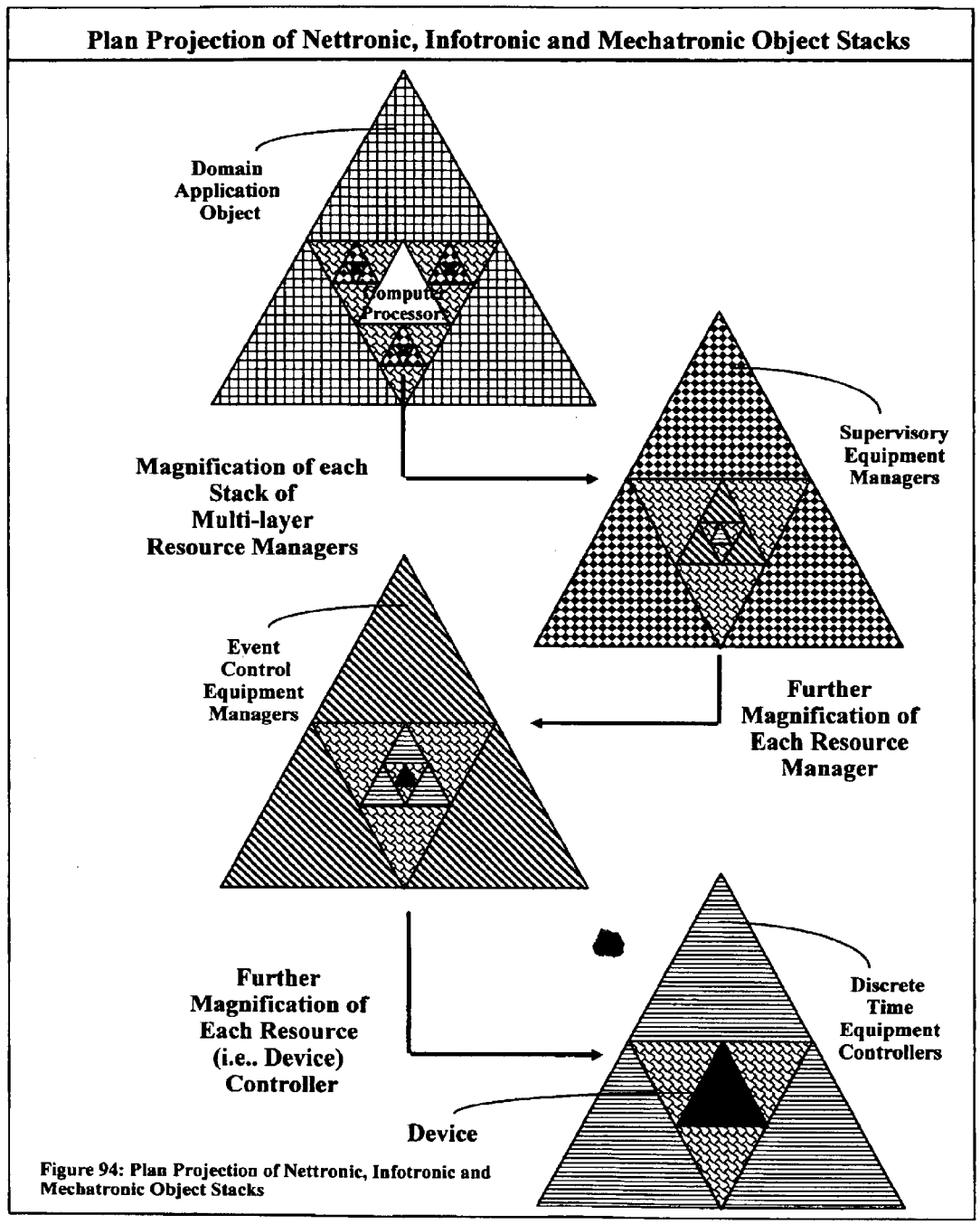
Figure 94: Plan Projection of Nettronic, Infotronic and Mechatronic Object Stacks

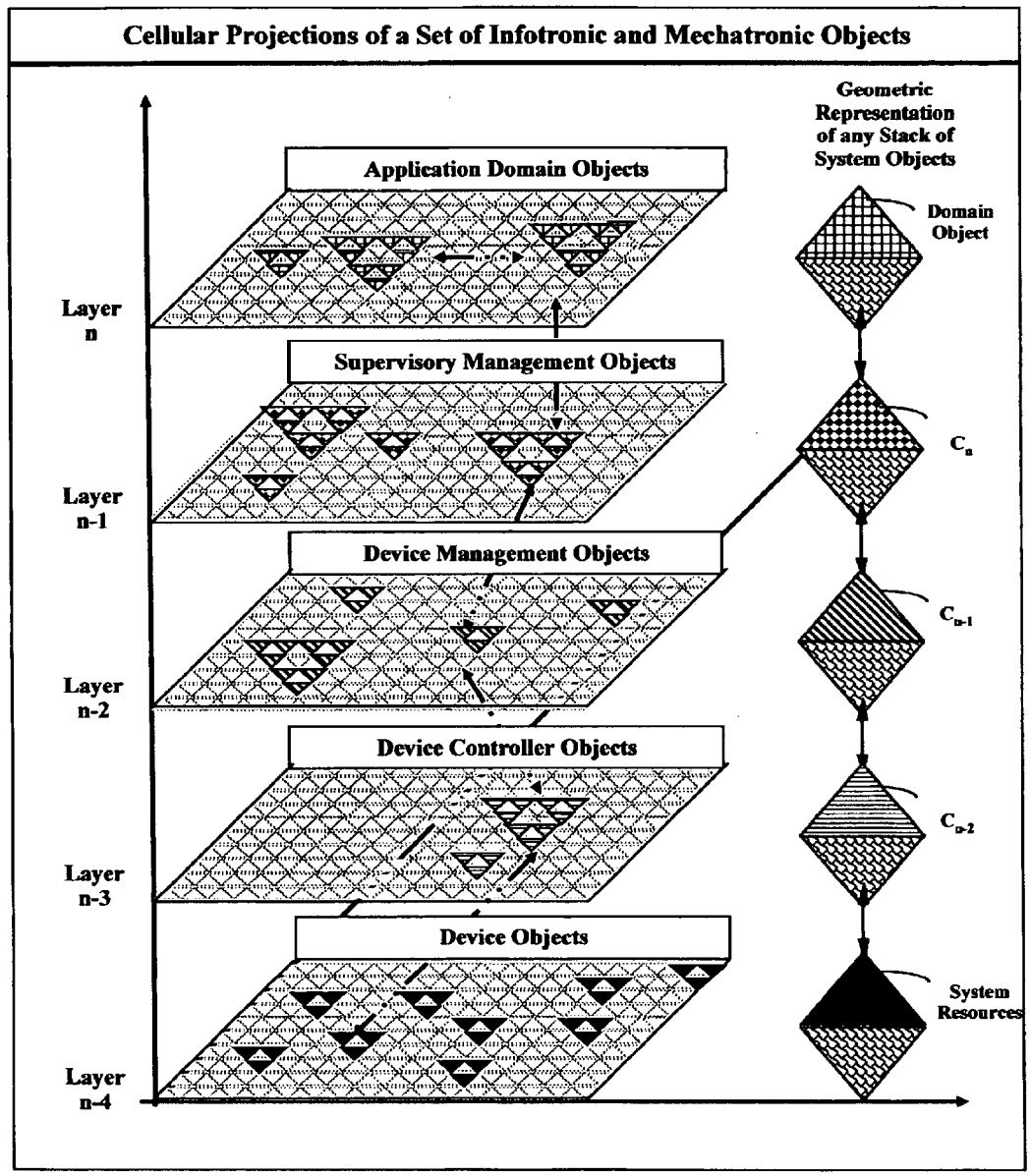
Figure 95: Cellular Projections of a Set of Infotronic and Mechatronic Objects

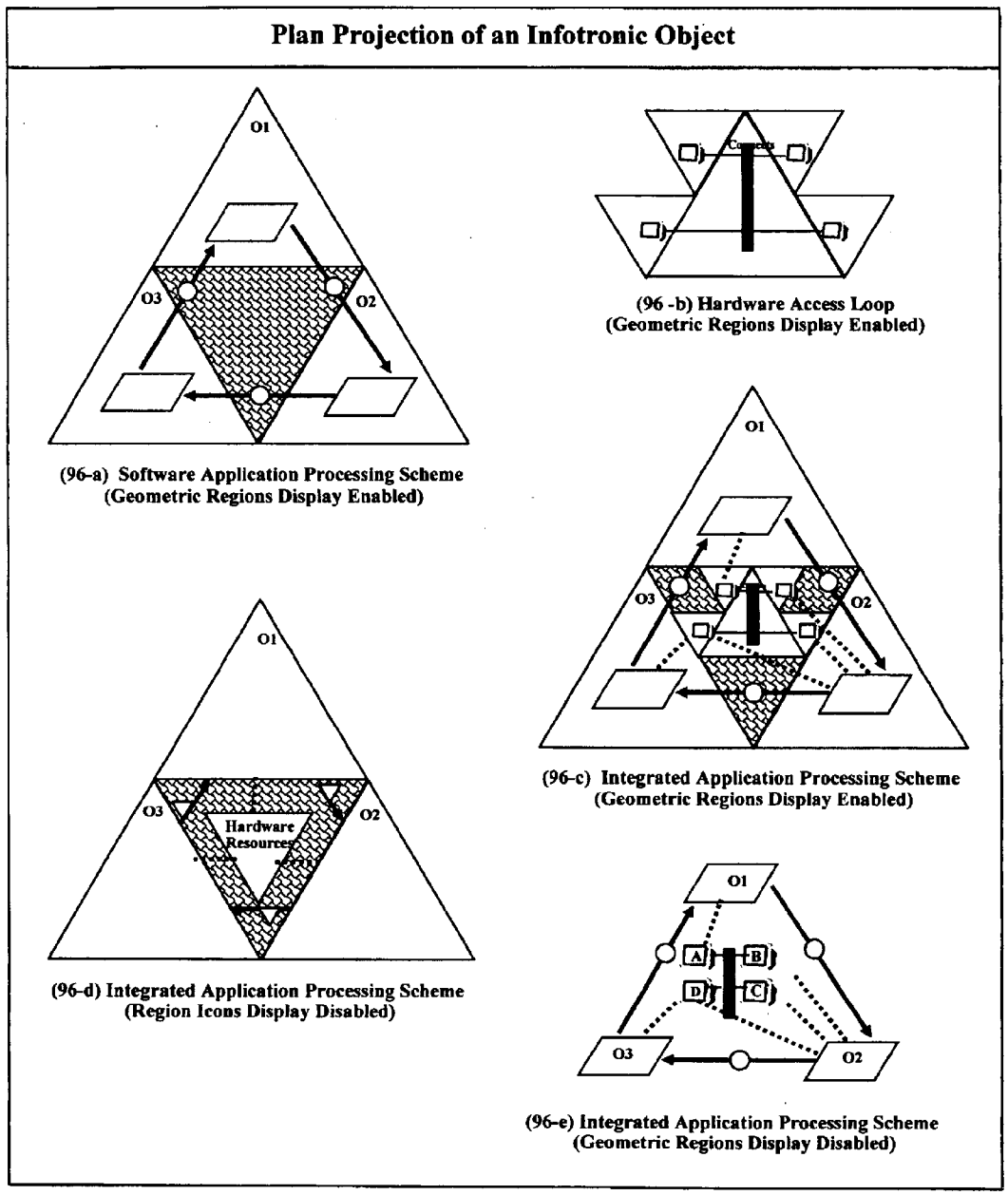
Figure 96: Plan Projection of an Infotronic Object

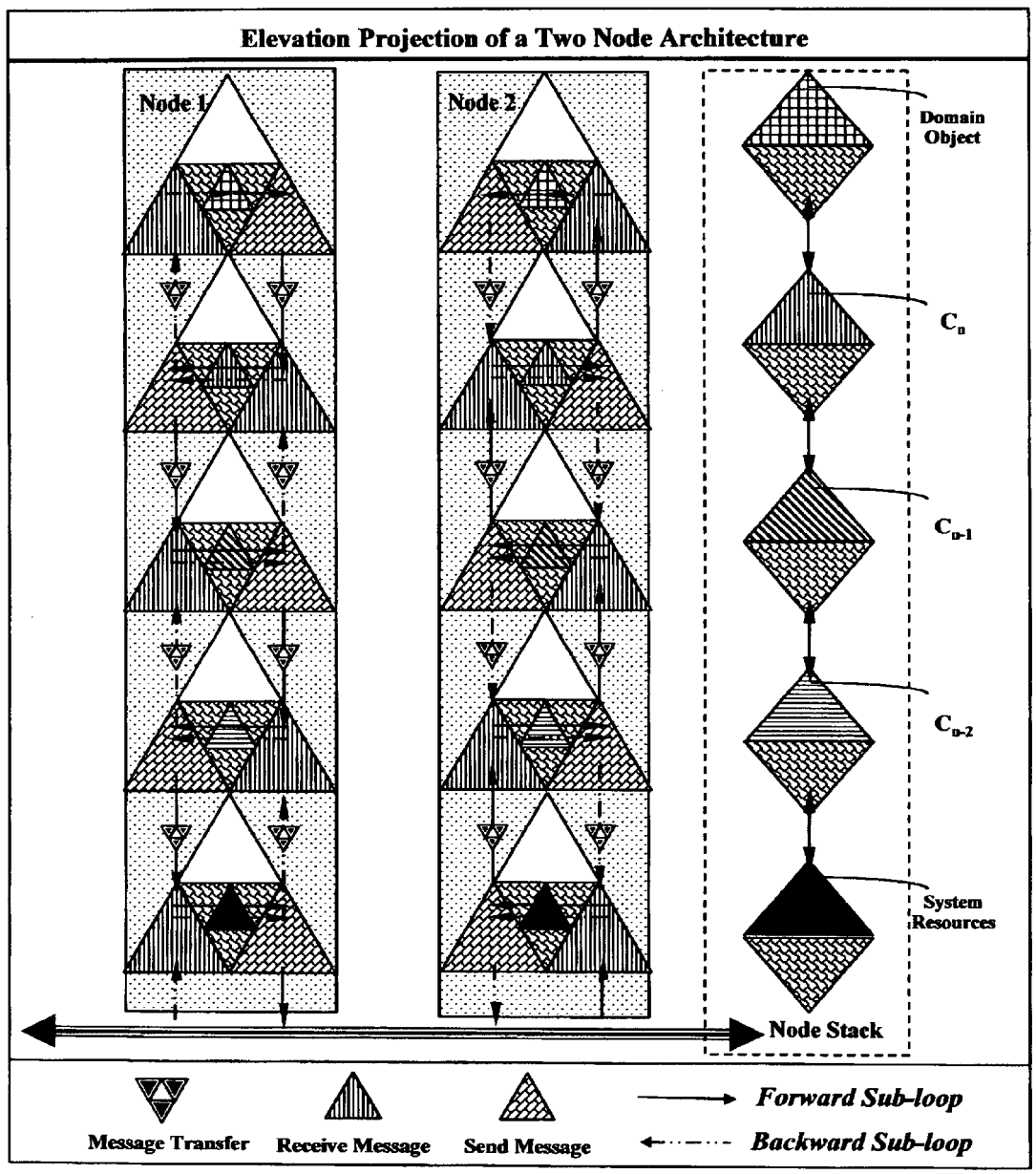
Figure 97: Elevation Projection of a Two Node Architecture

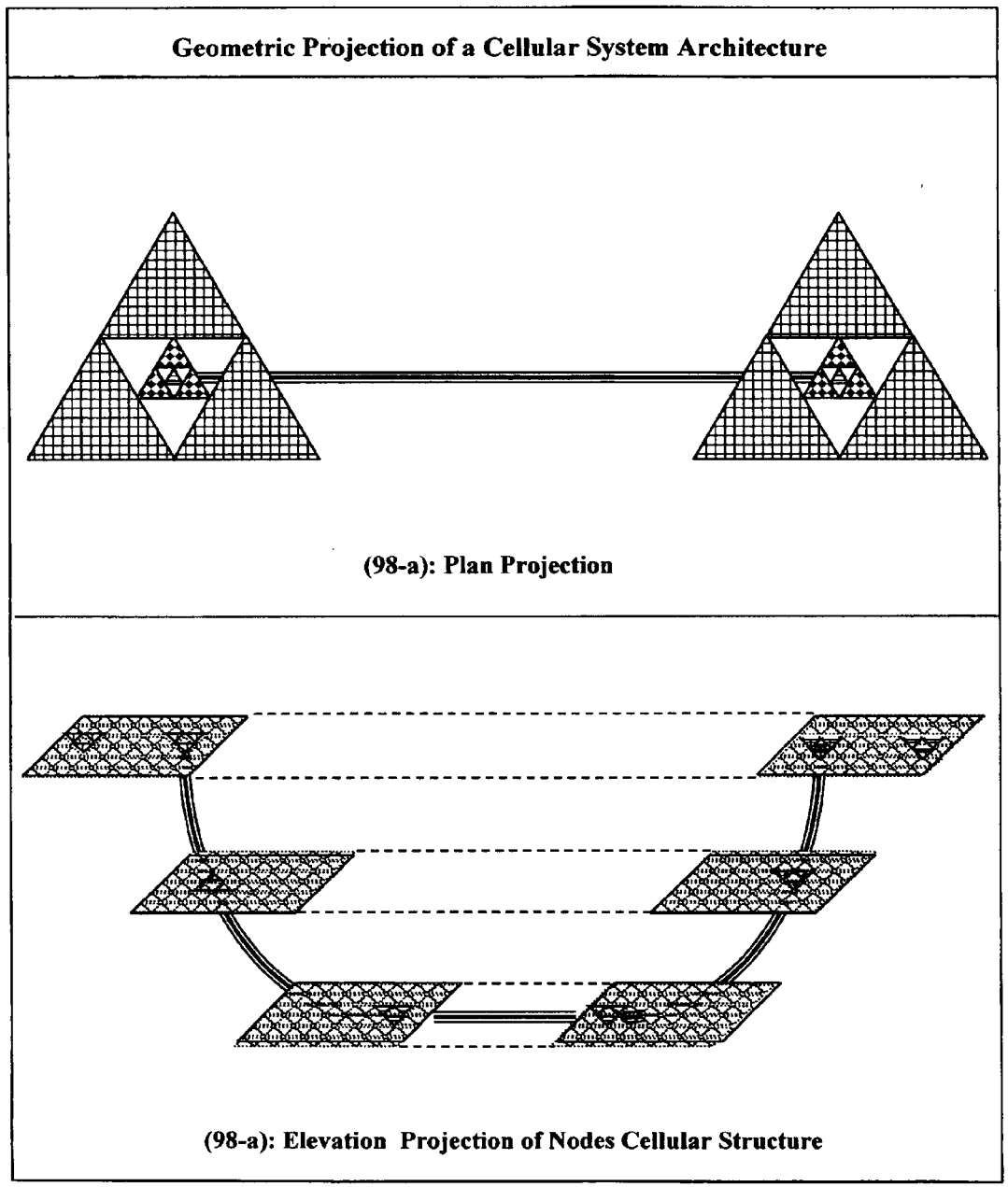
Figure 98: Geometric Projection of a Cellular System Architecture

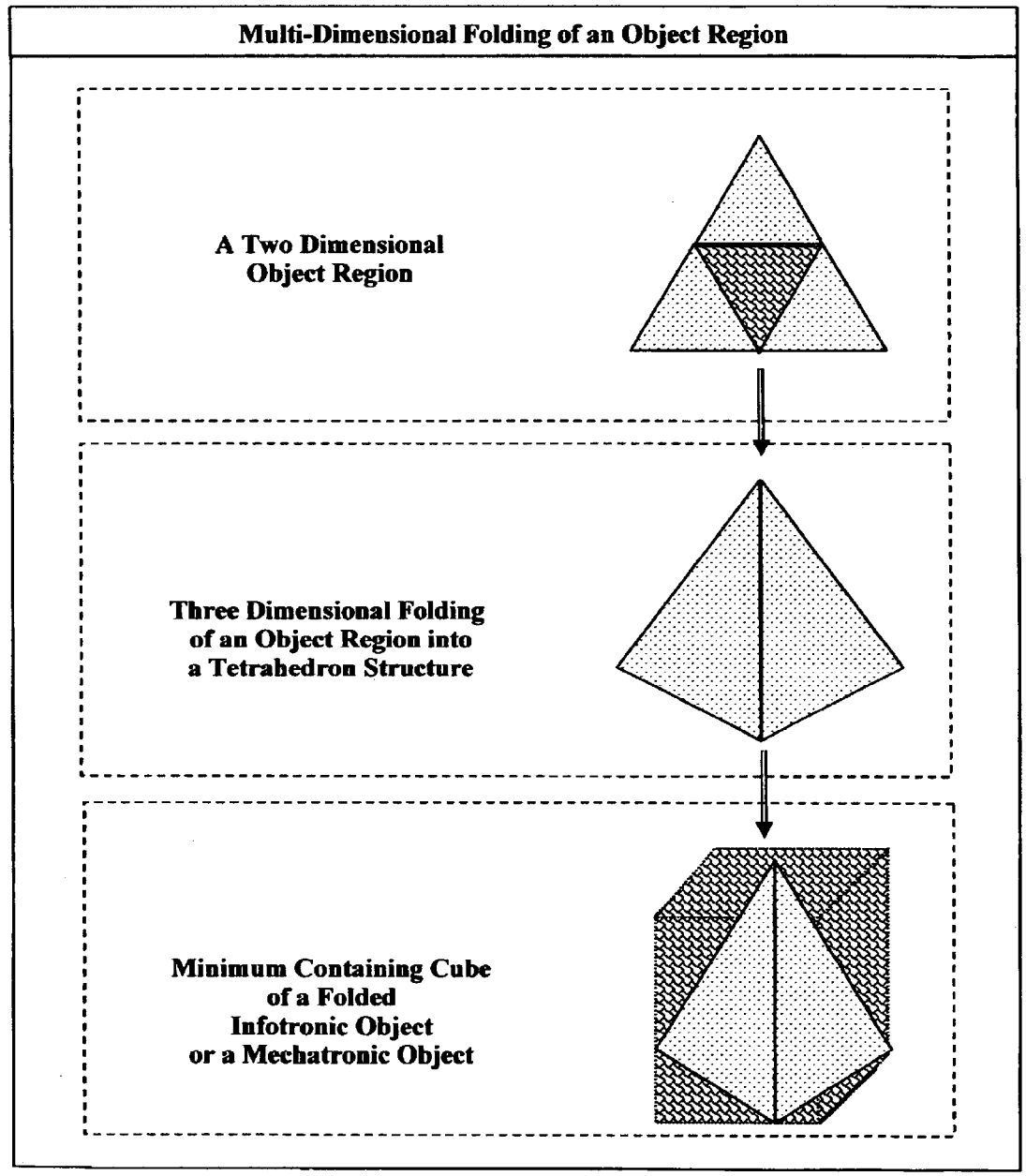
Figure 99: Multi-Dimensional Folding of an Object Region

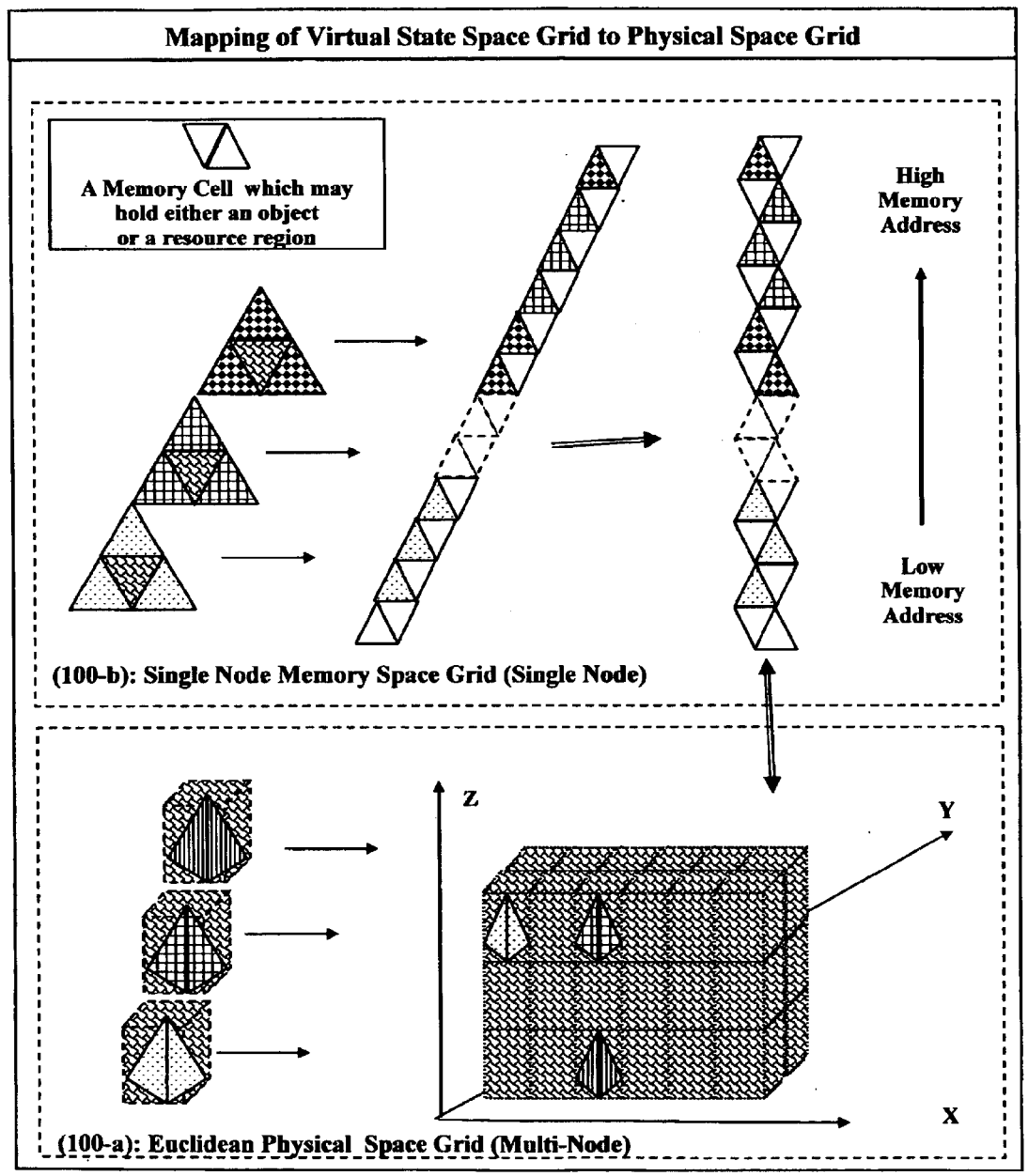
Figure 100: Mapping of Virtual State Space Grid to Physical Space Grid

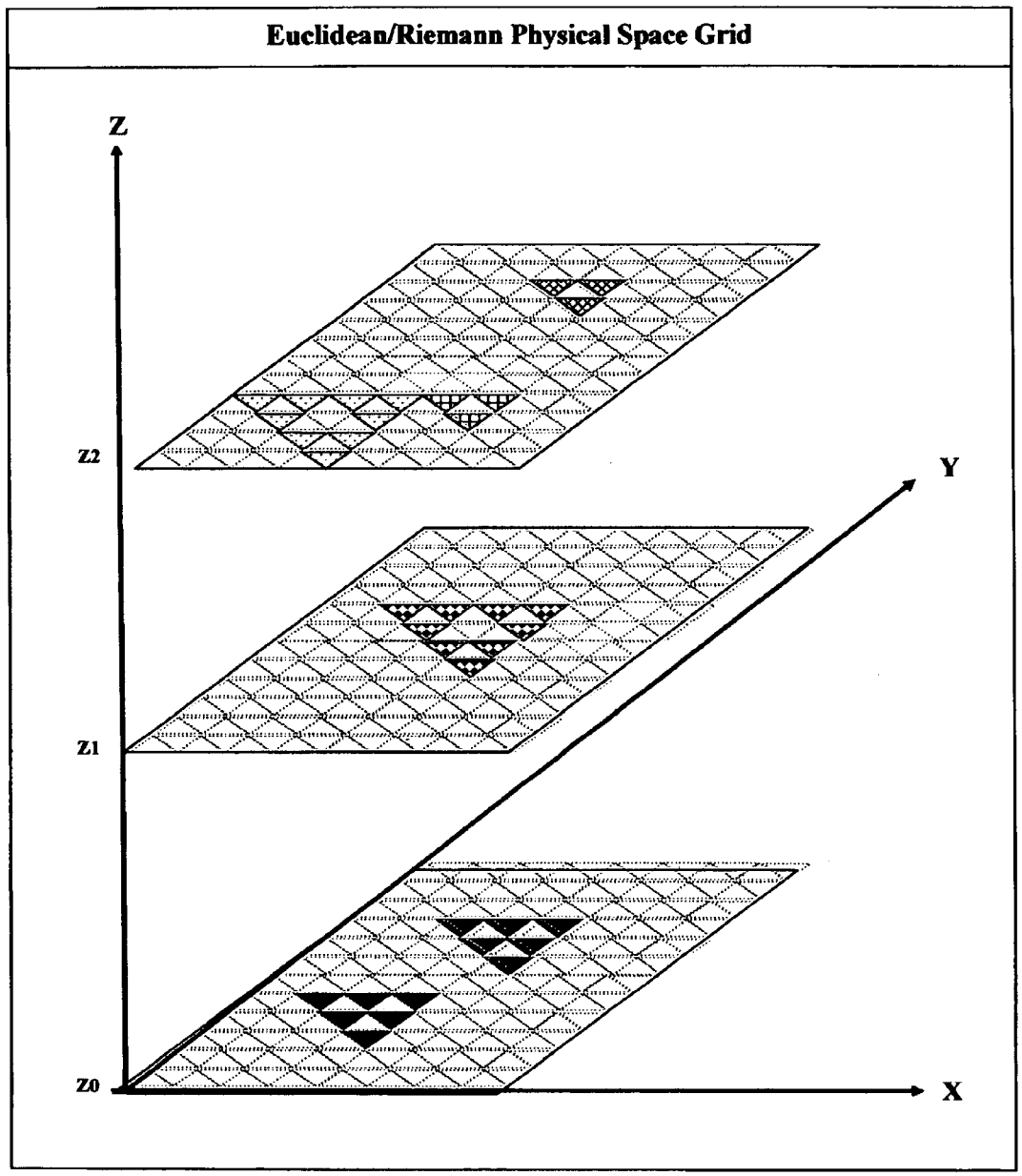
Figure 101: Euclidean Physical Space Grid

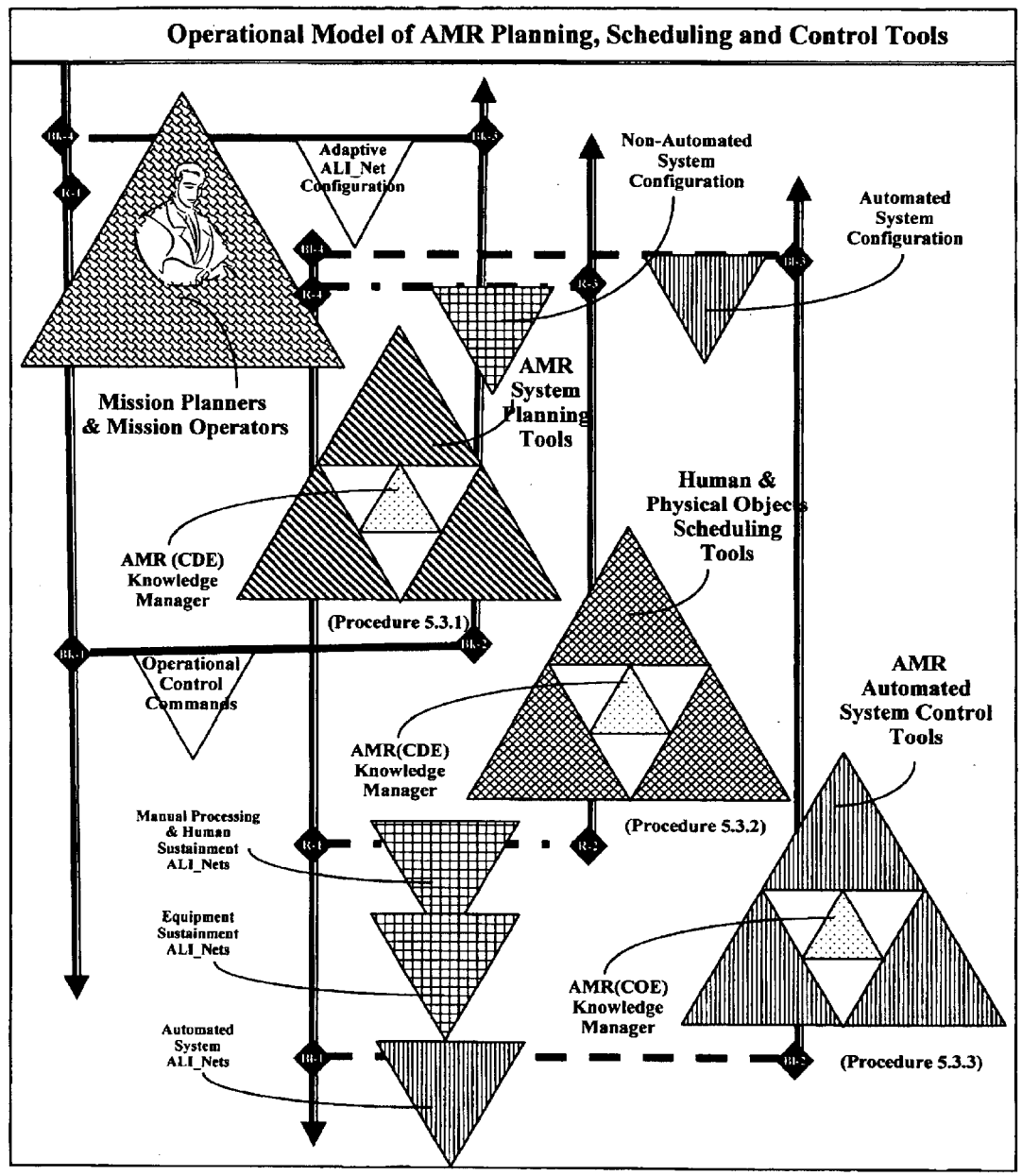
Figure 102: Operational Model of AMR Planning, Scheduling and Control Tools

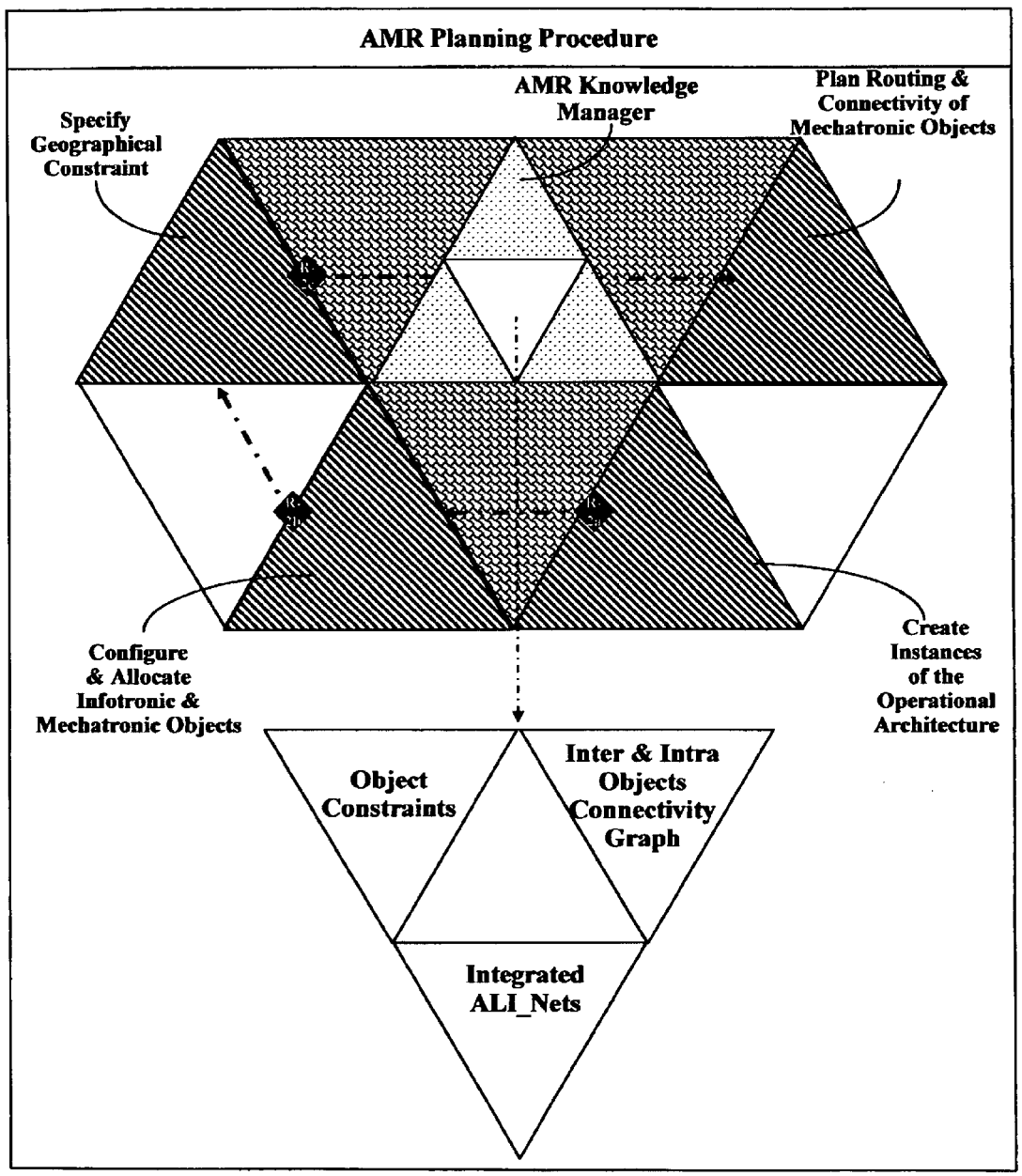
Figure 103: AMR Planning Procedure

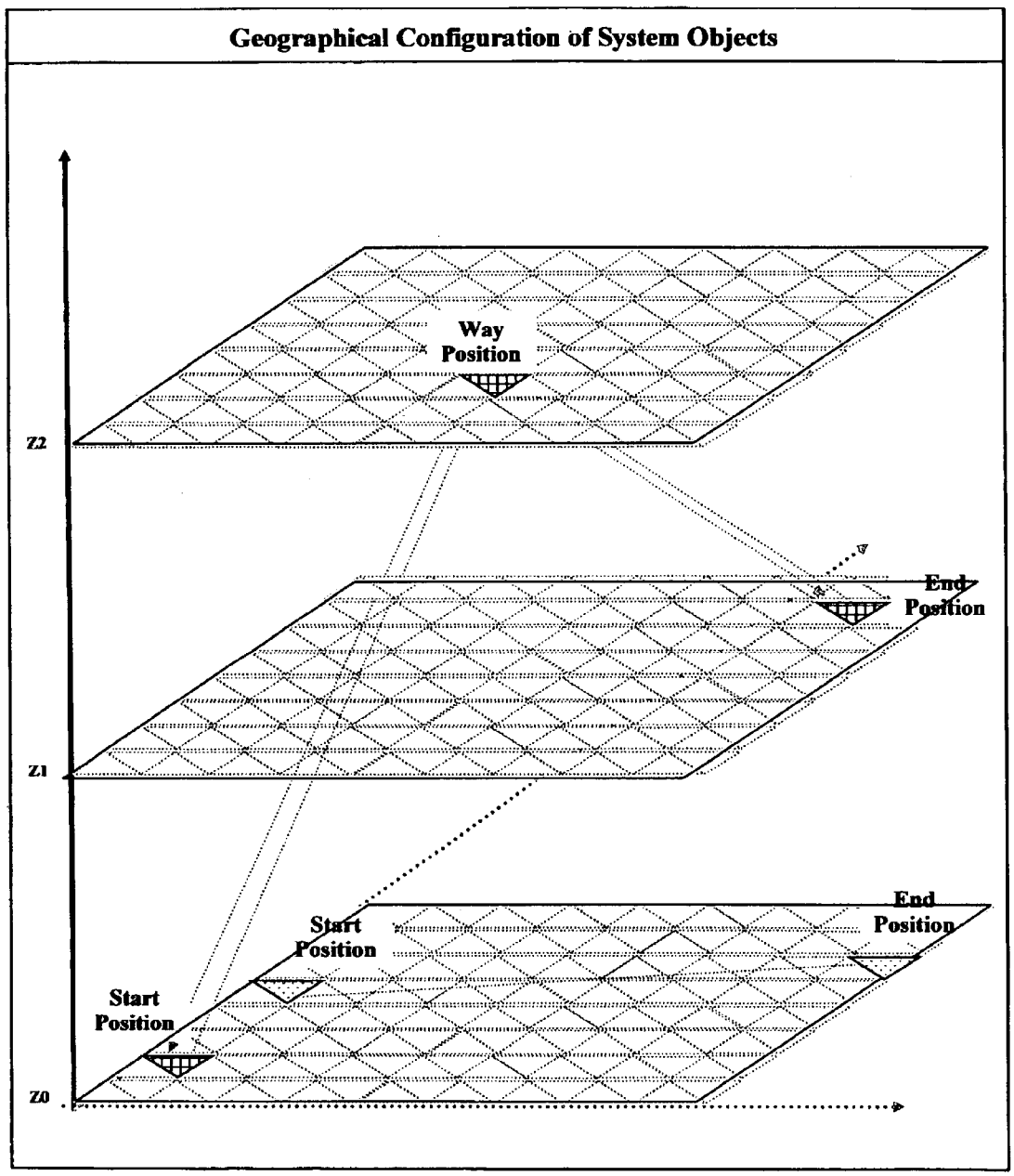
Figure 104: Geographical Configuration of System Objects

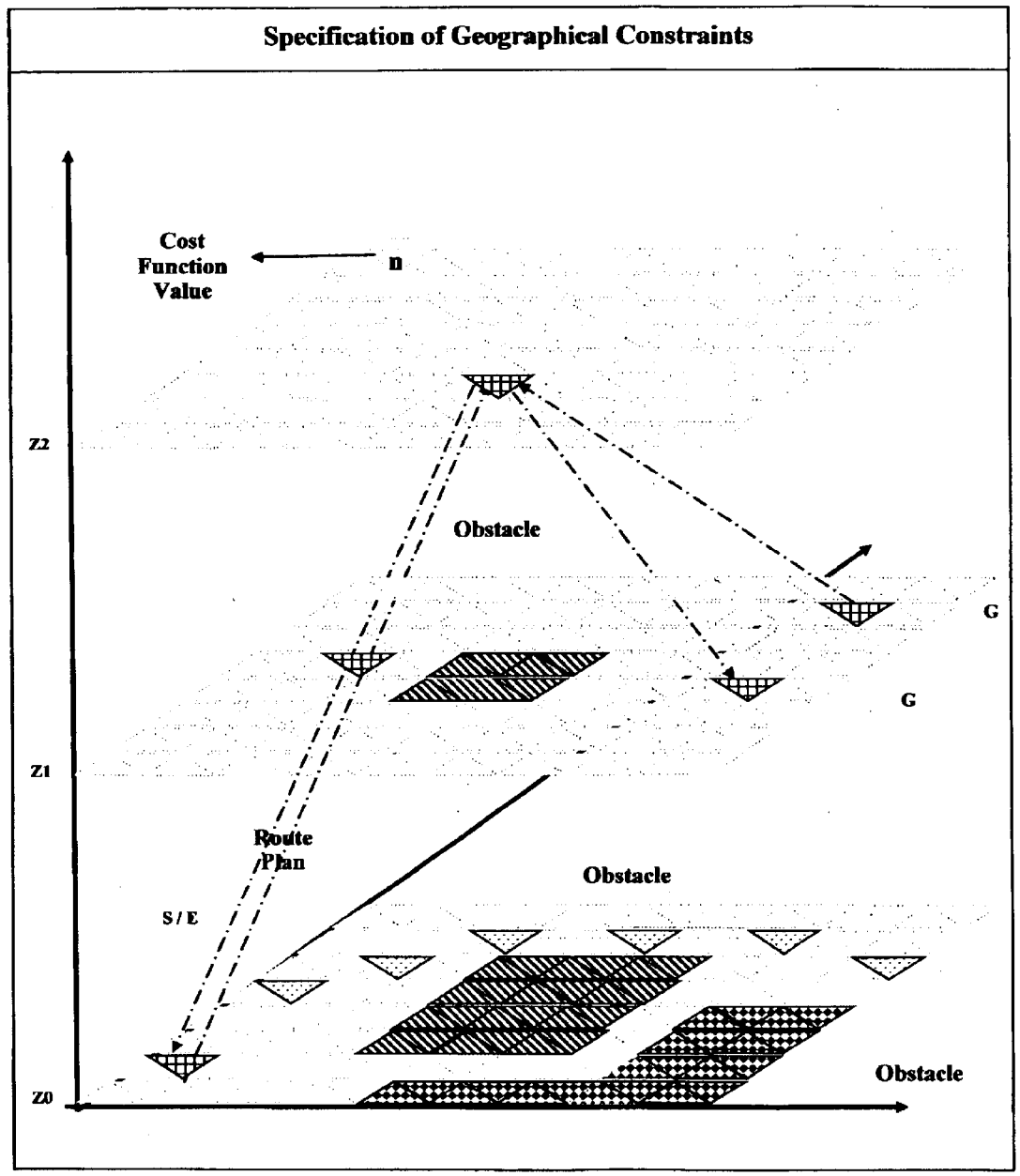
Figure 105: Specification of Geographical Constraints

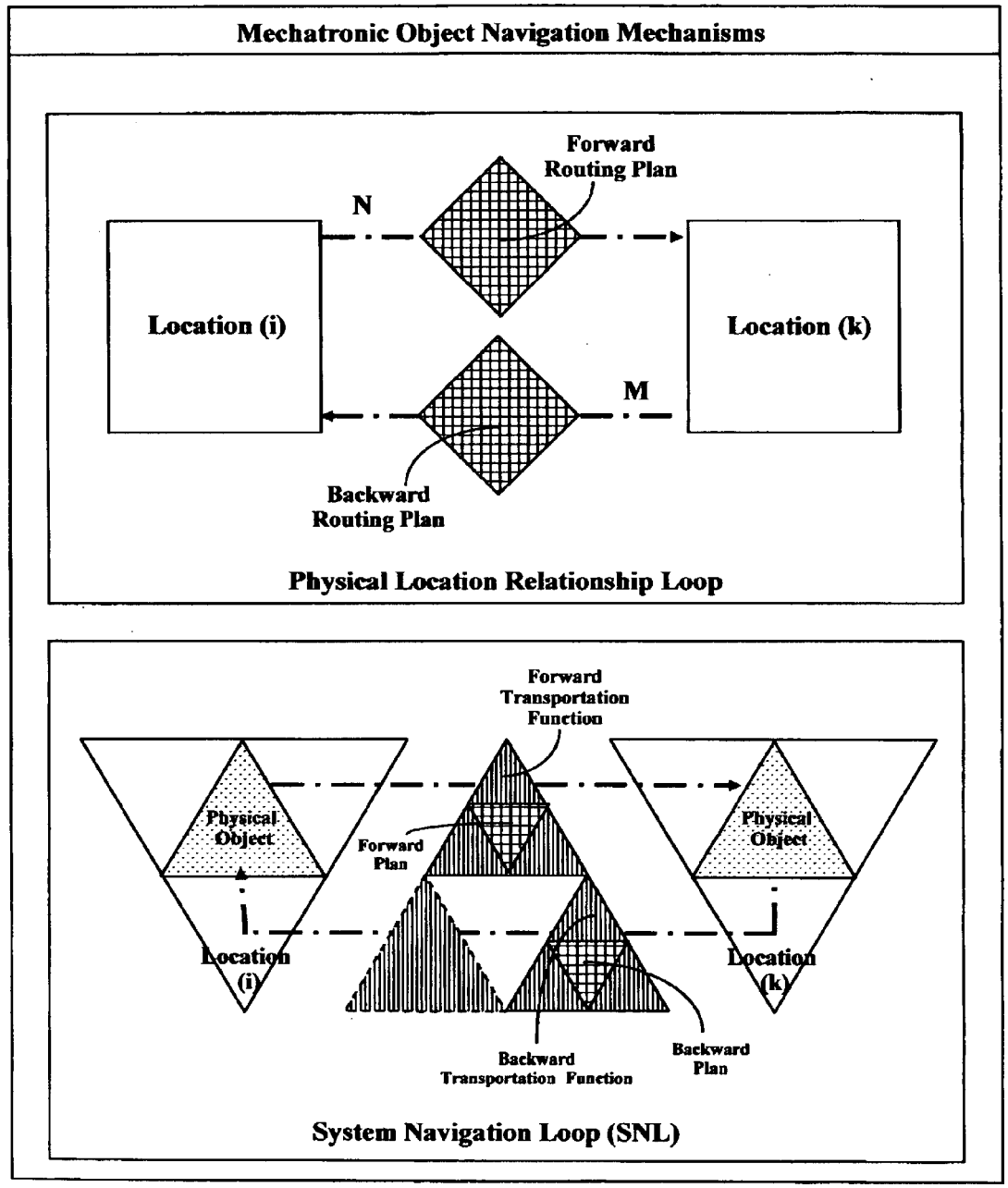
Figure 106: Mechatronic Object Navigation Mechanisms

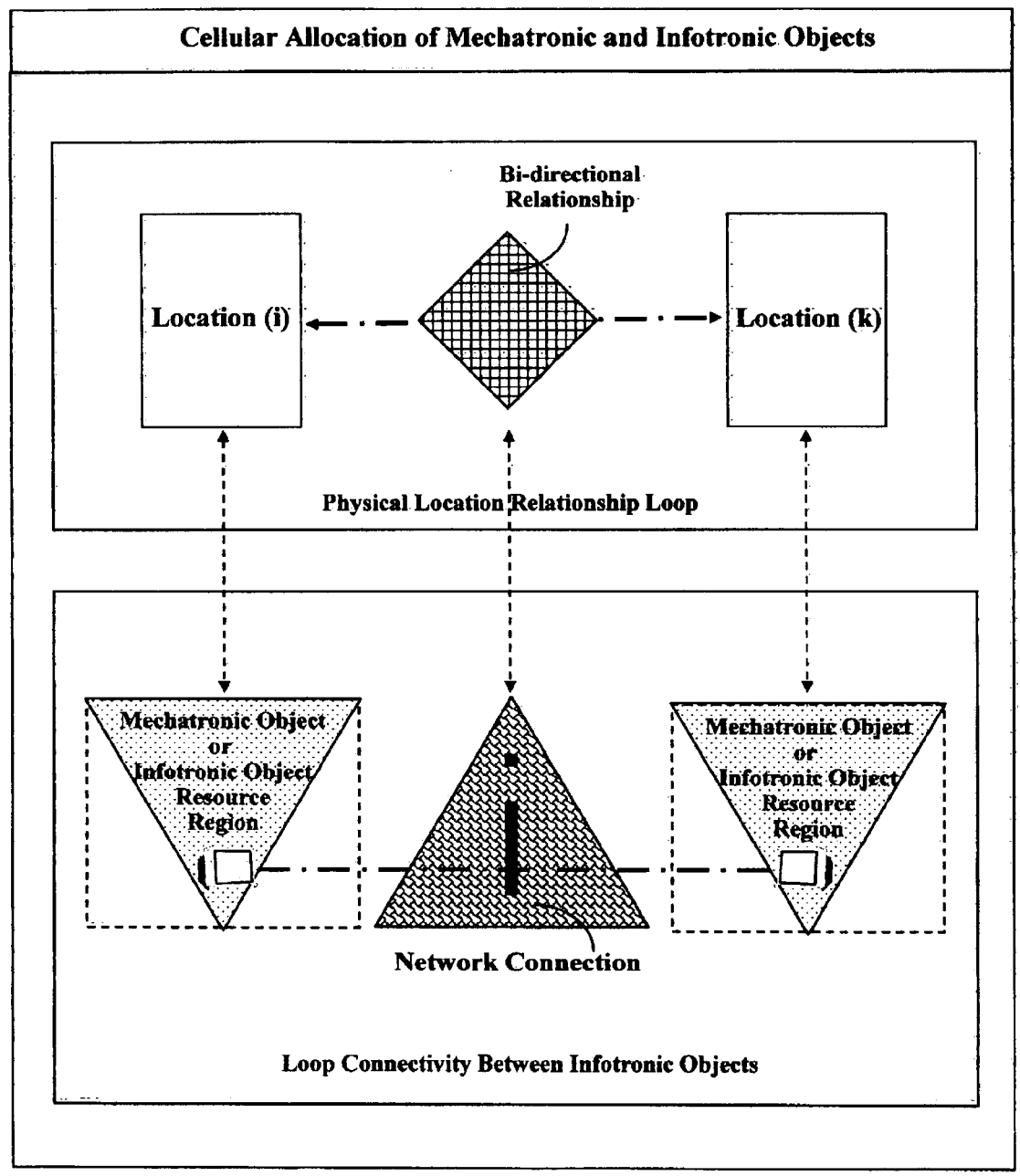
Figure 107: Cellular Allocation of Mechatronic and Infotronic Objects

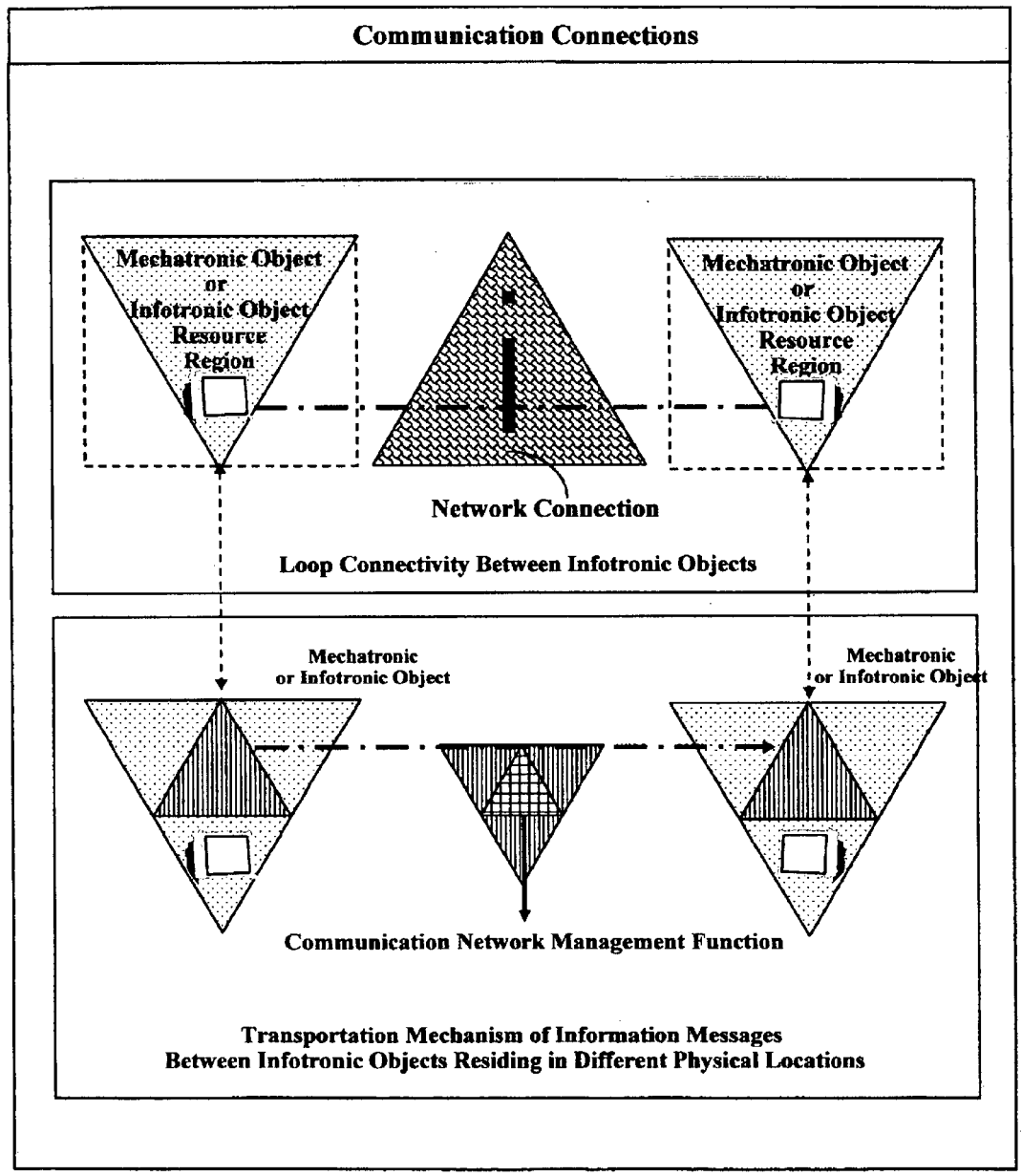
Figure 108: Communication Connections

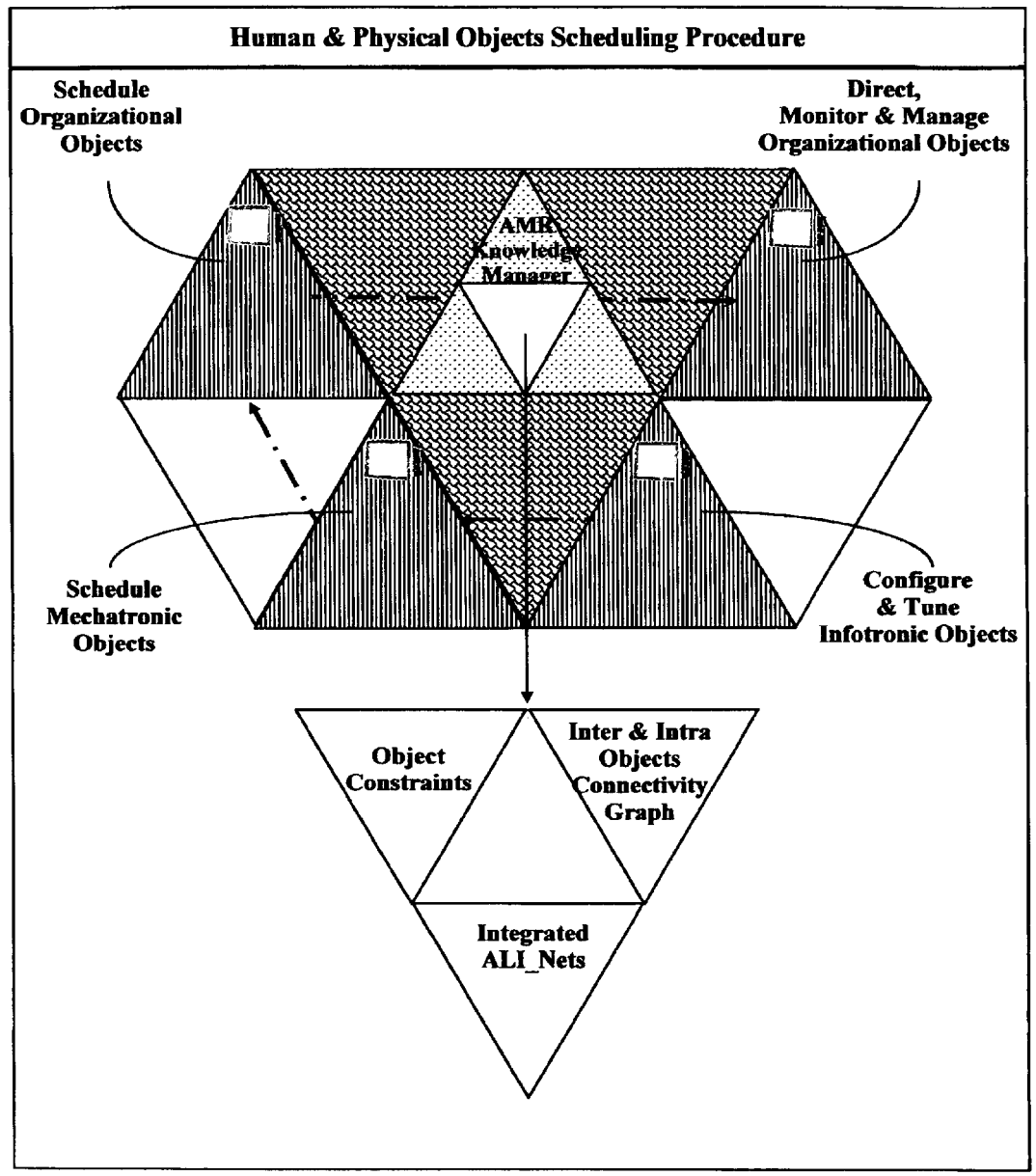
Figure 109: Human & Physical Objects Scheduling Procedure

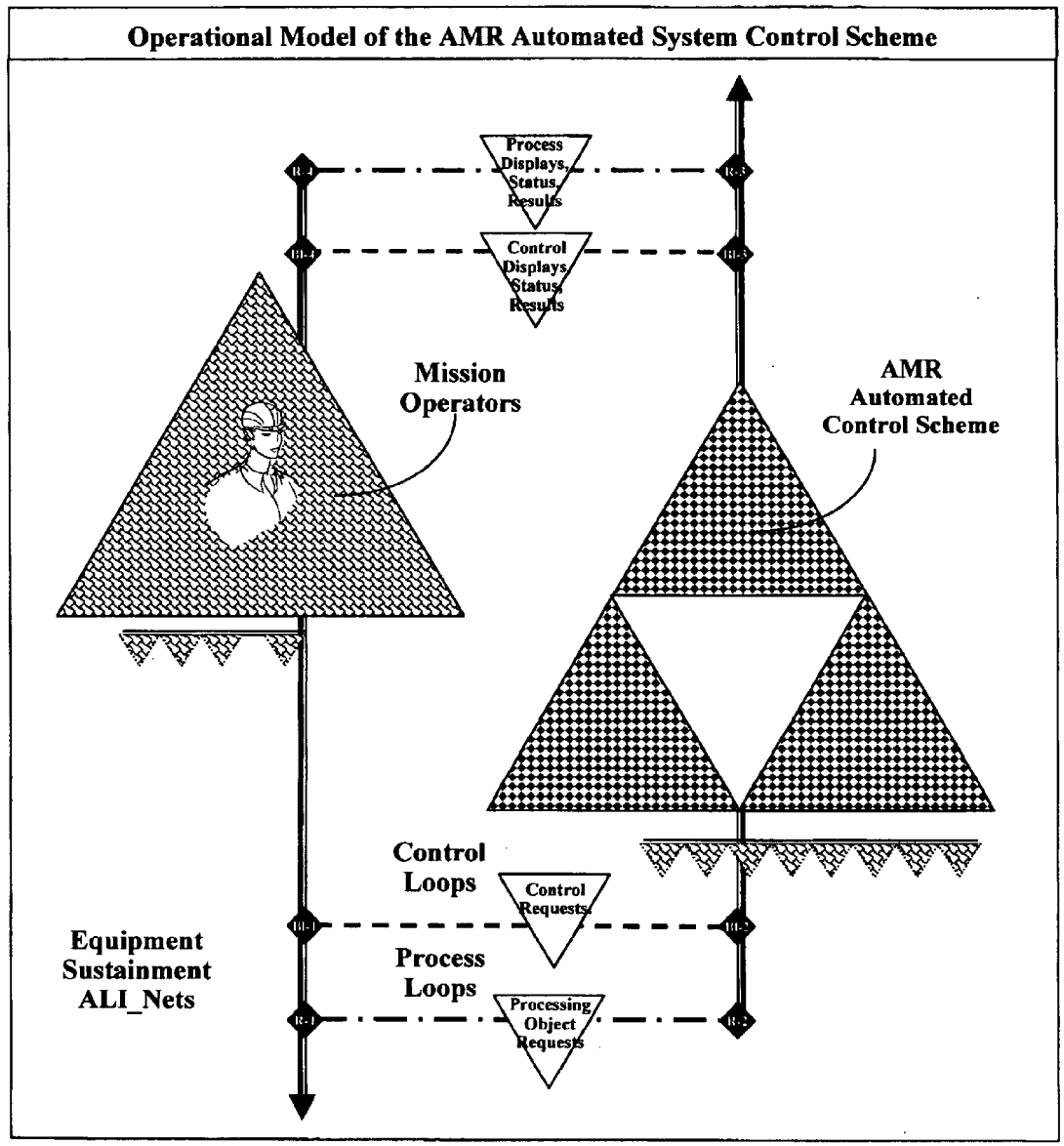
Figure 110: Operational Model of the AMR Automated System Control Scheme

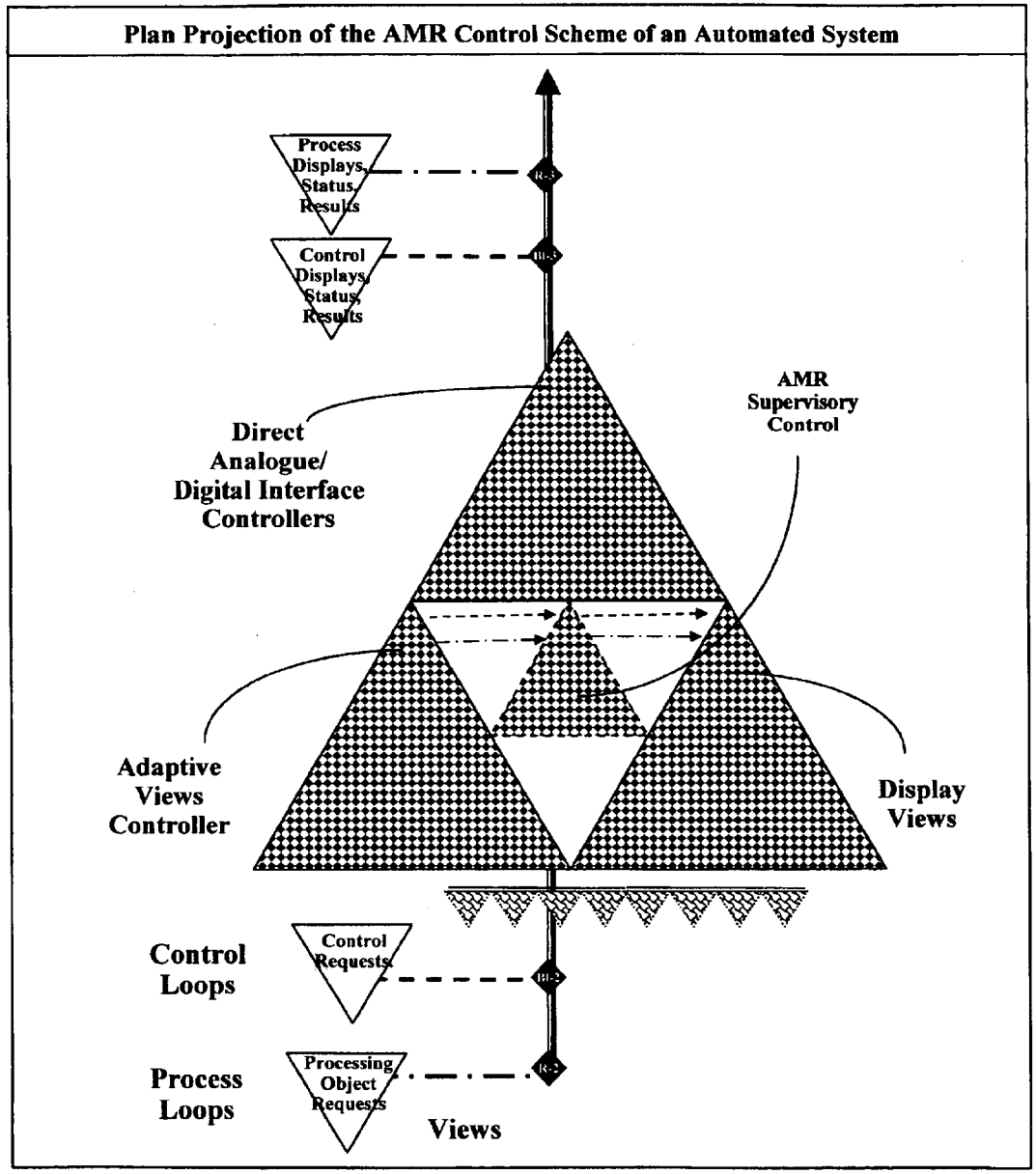
Figure 111: Plan Projection of the AMR Control Scheme of an Automated System

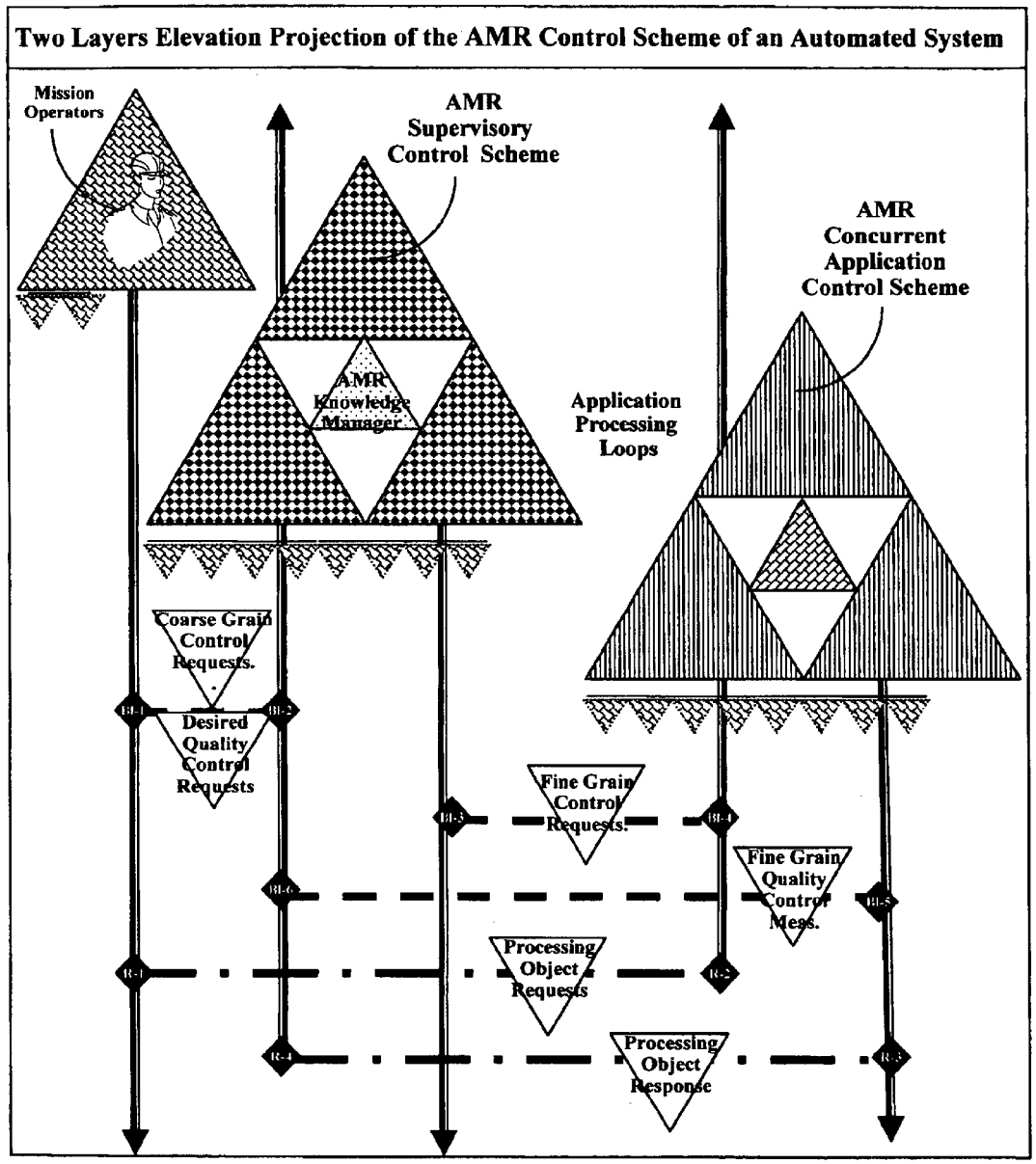
Figure 112: Two Layers Elevation Projection of the AMR Control Scheme of an Automated System

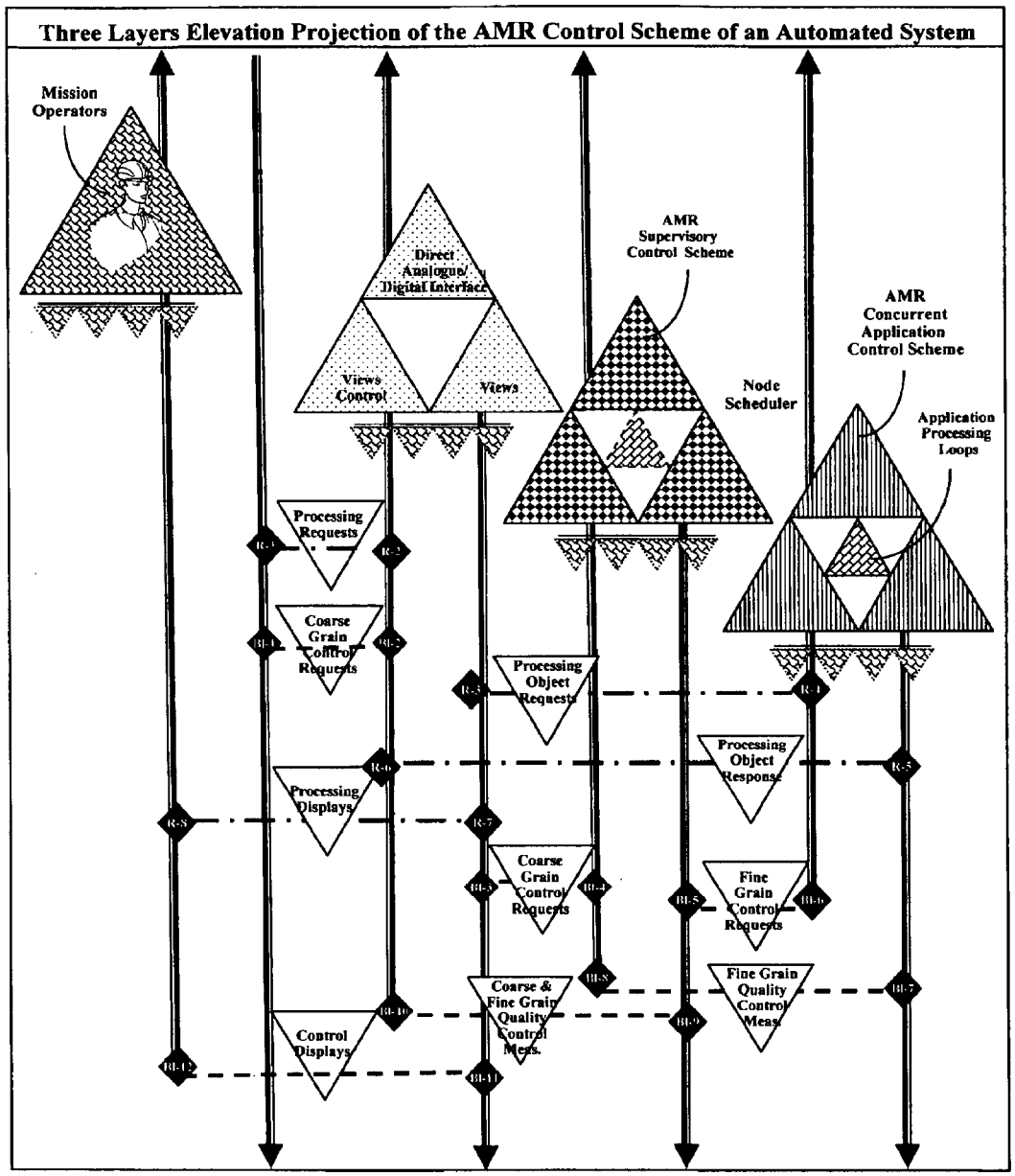
Figure 113: Three Layers Elevation Projection of the AMR Control Scheme of an Automated System

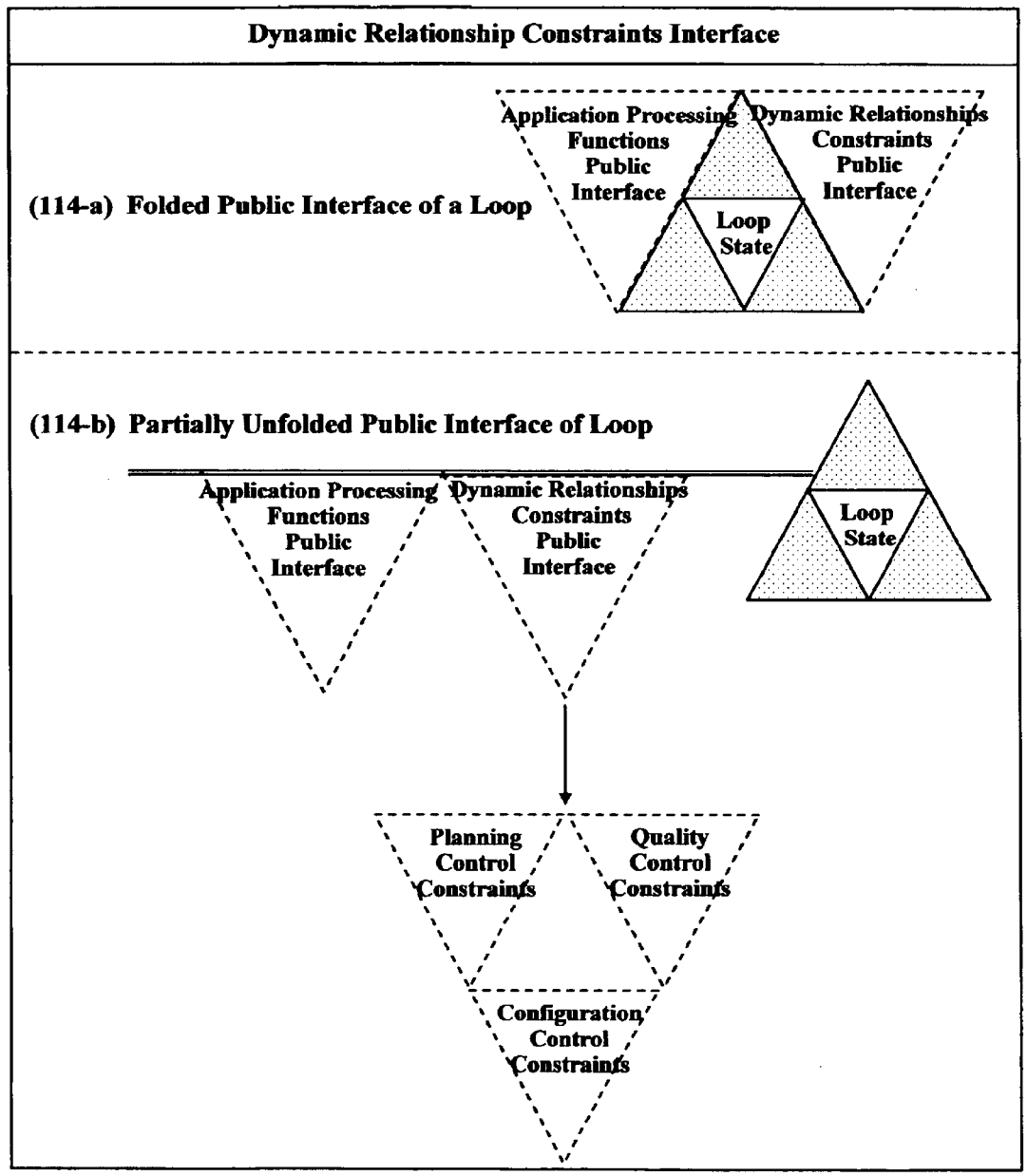
Figure 114: Dynamic Relationship Constraints Interface

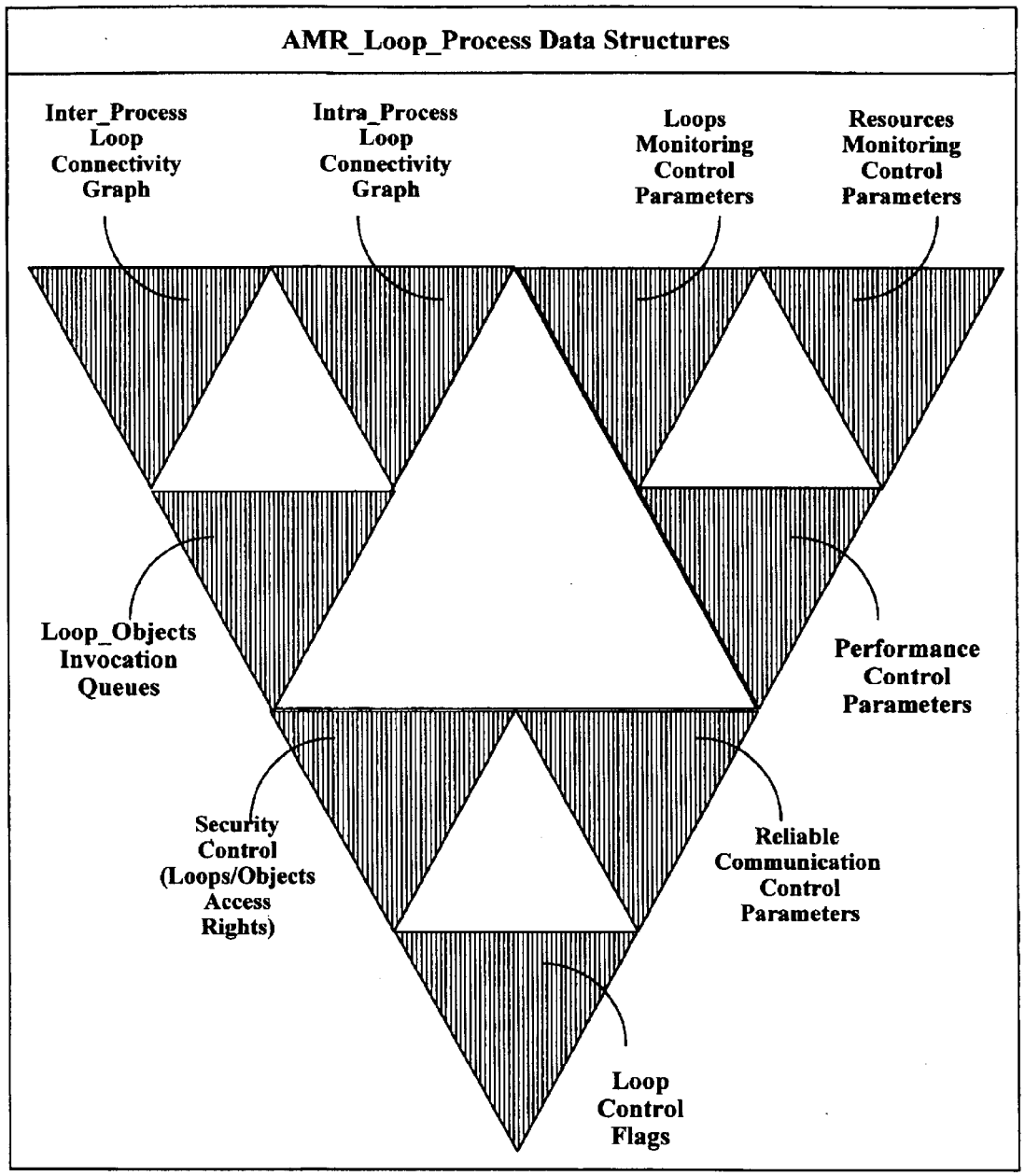
Figure 115: AMR_Loop_Process Data Structures

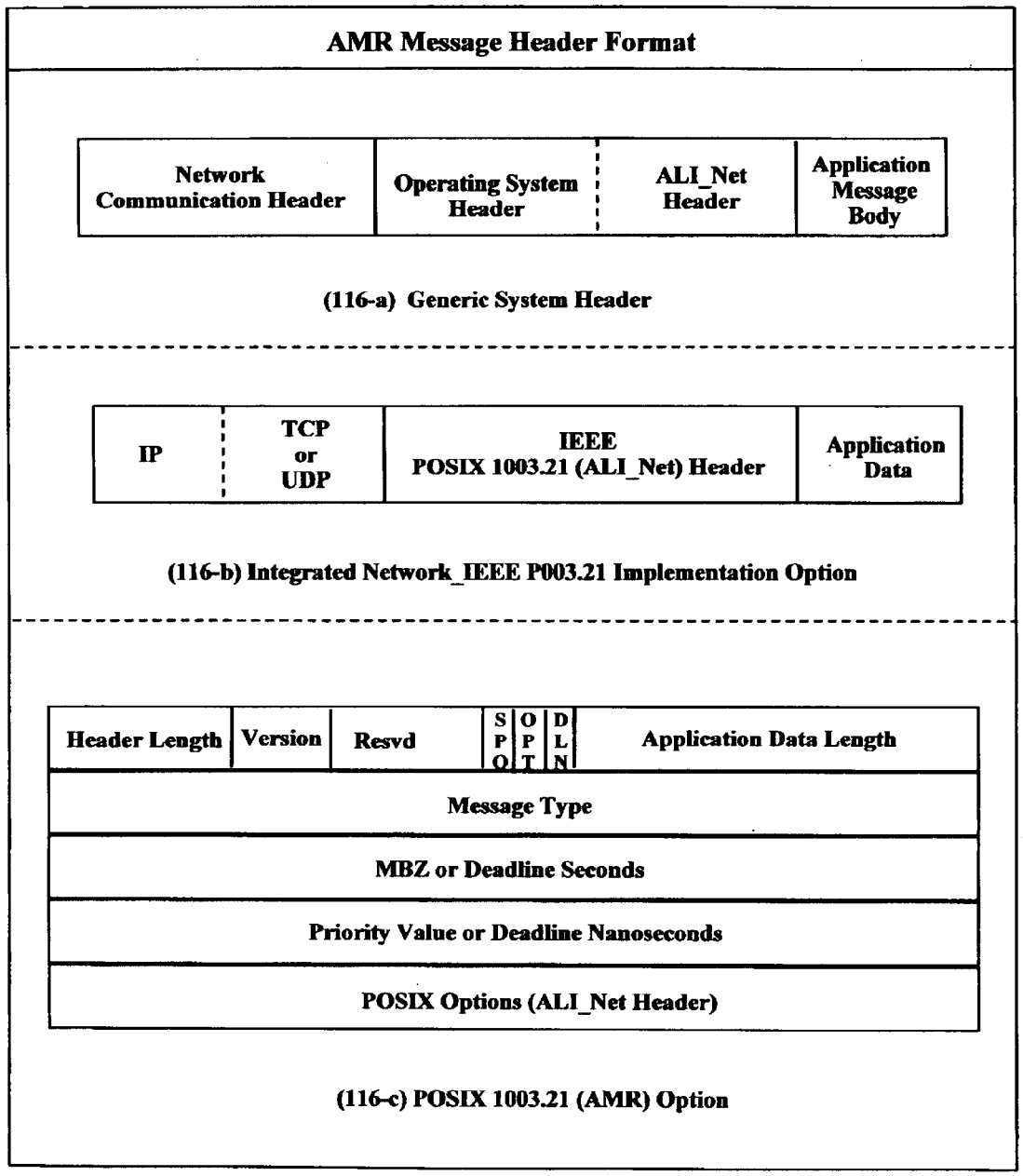
Figure 116: AMR Message Header Format

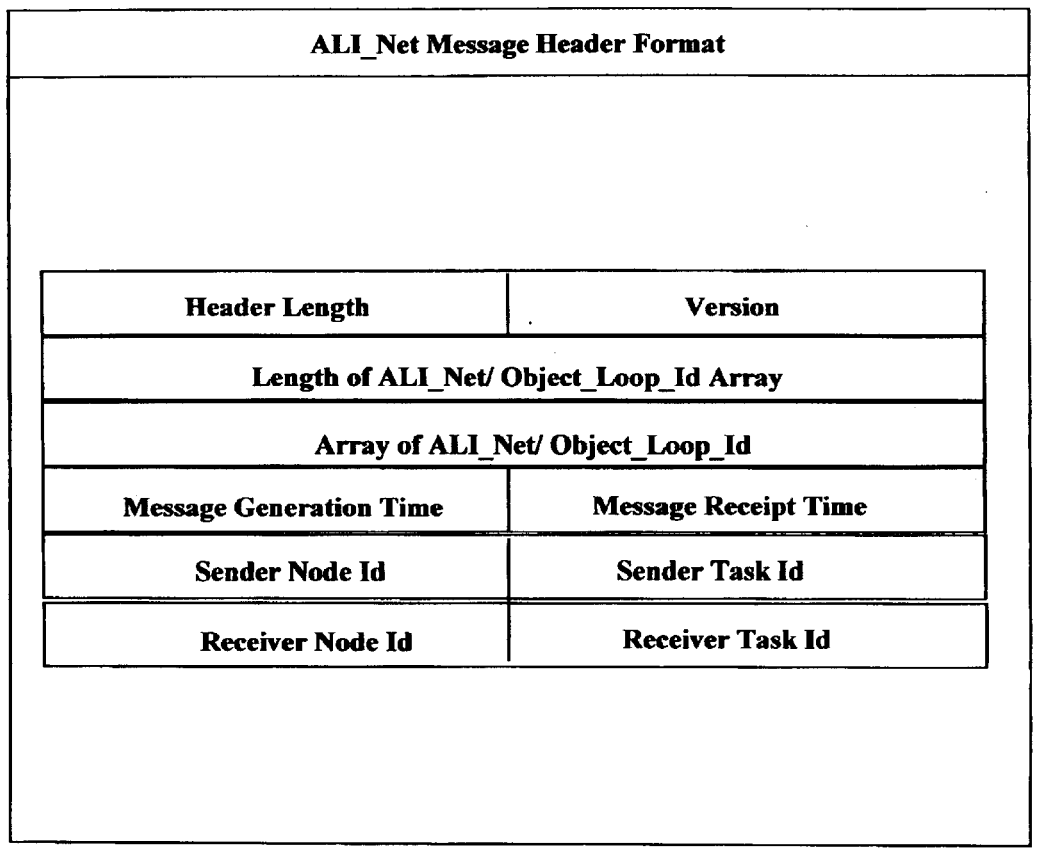
Figure 117: ALI_Net Message Header Format

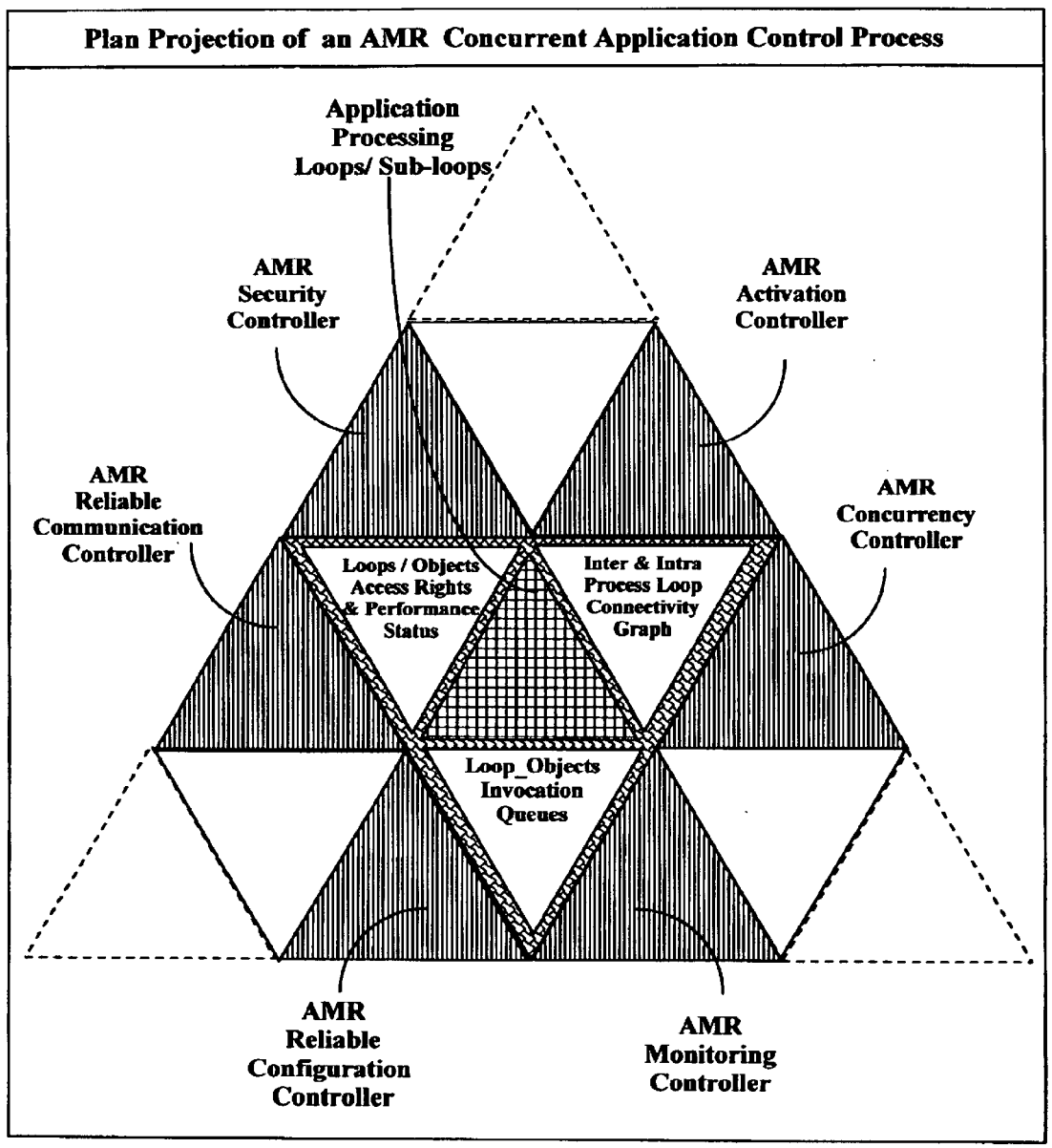
Figure 118: Plan Projection of an AMR Concurrent Application Control Process

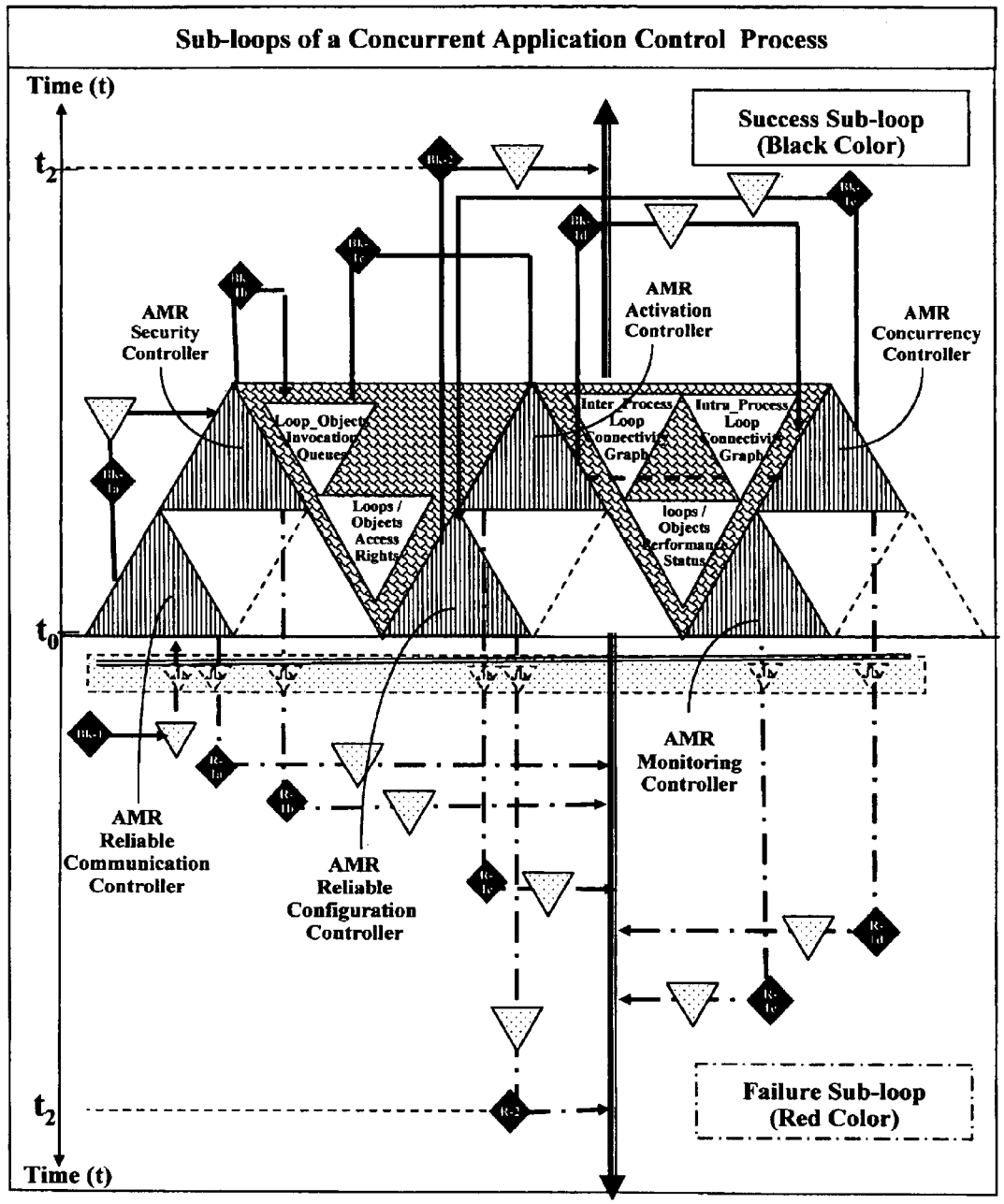
Figure 119: Sub-loops of a Concurrent Application Control Process

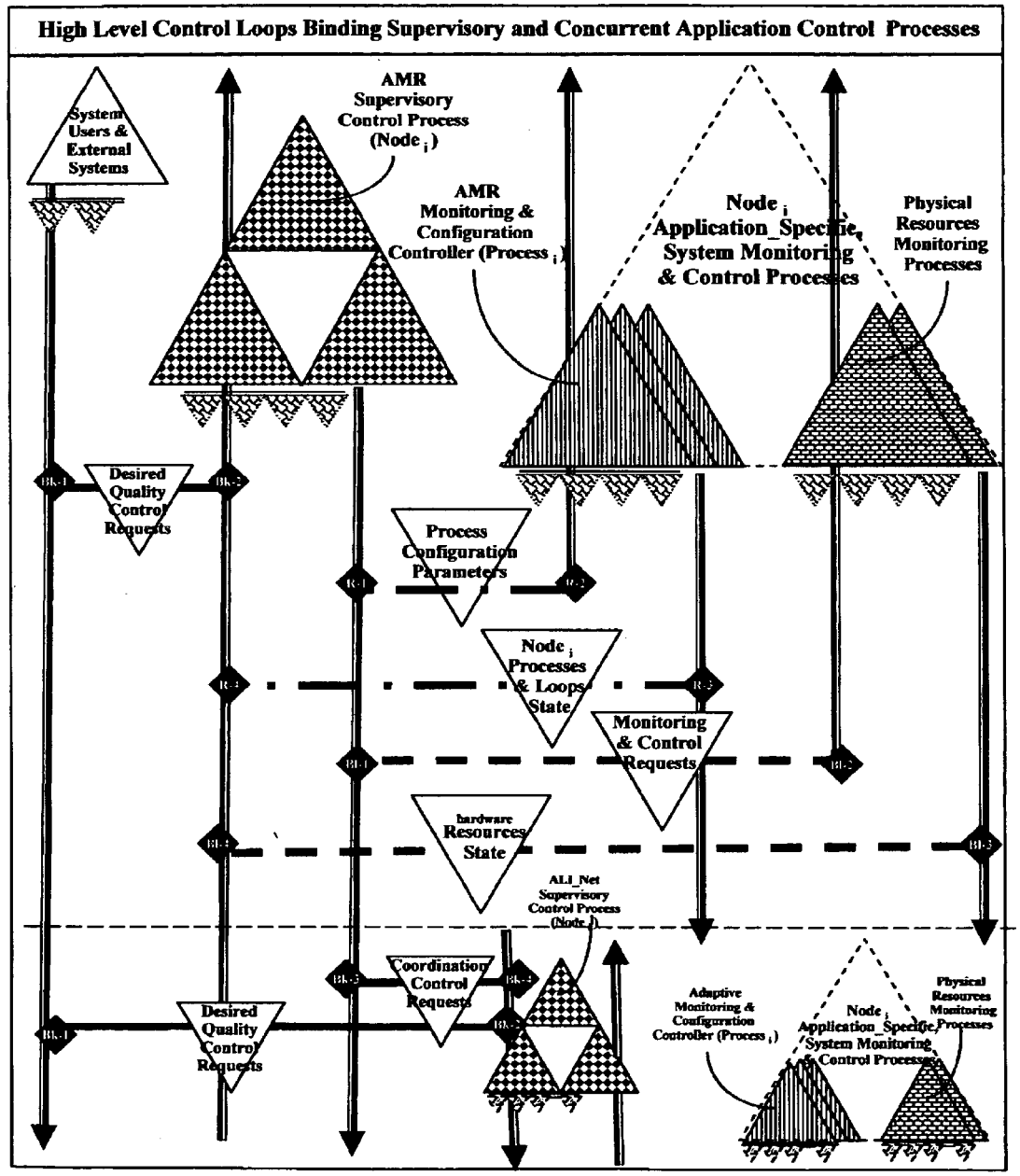
Figure 120: High Level Control Loops Binding Supervisory and Concurrent Application Control Processes

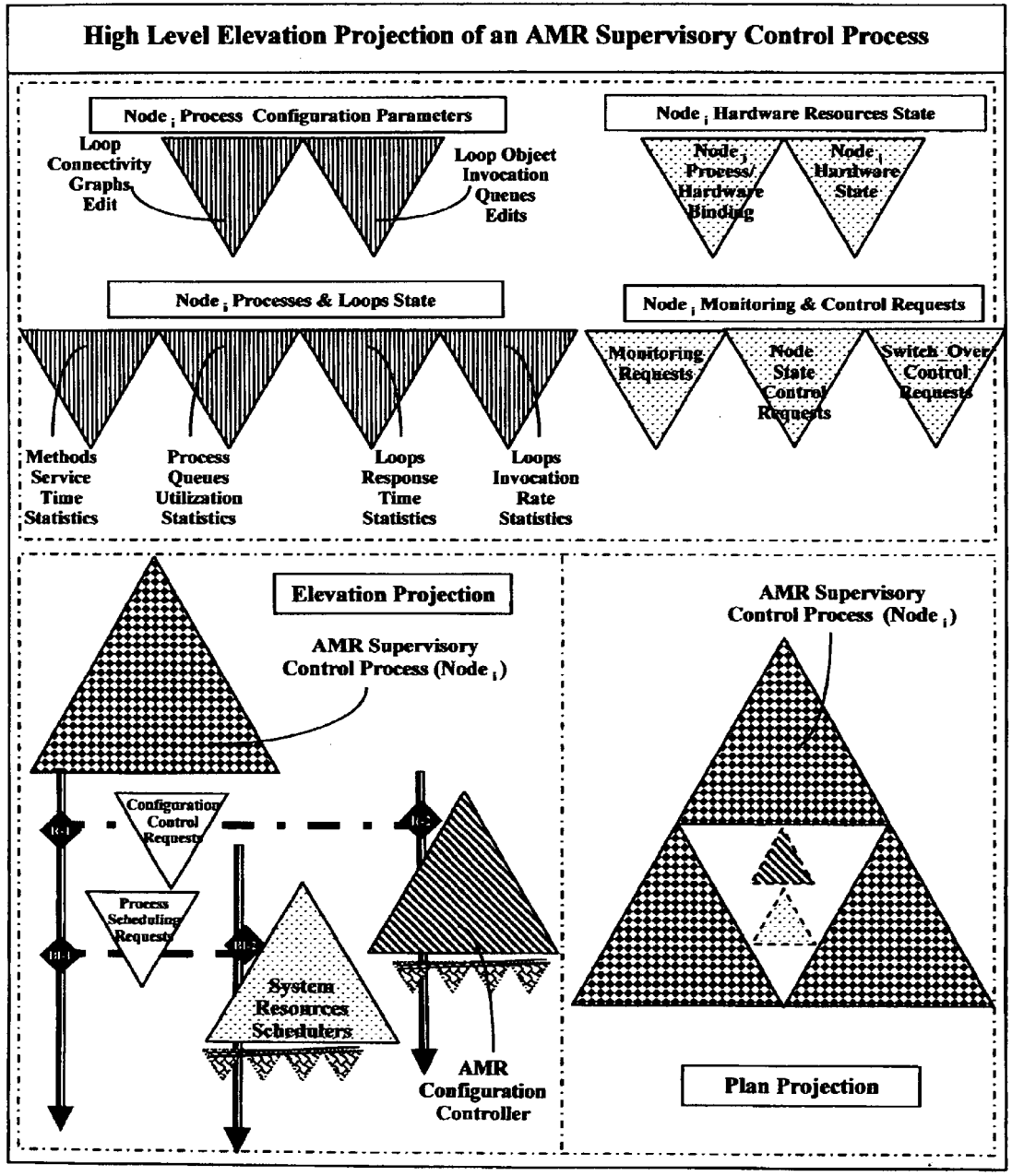
Figure 121: High Level Elevation Projection of an AMR Supervisory Control Process

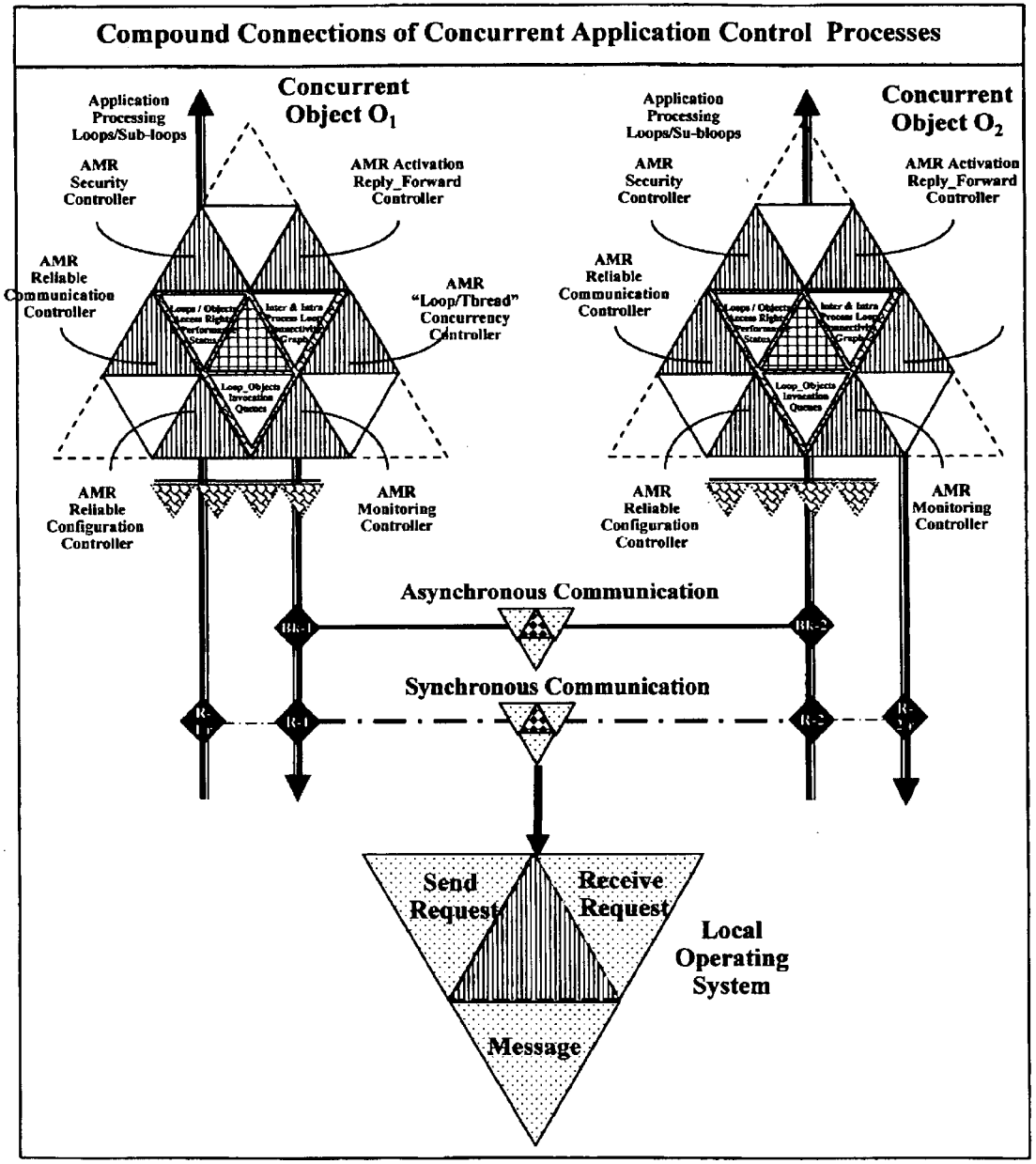
Figure 122: Compound Connections of Concurrent Application Control Processes

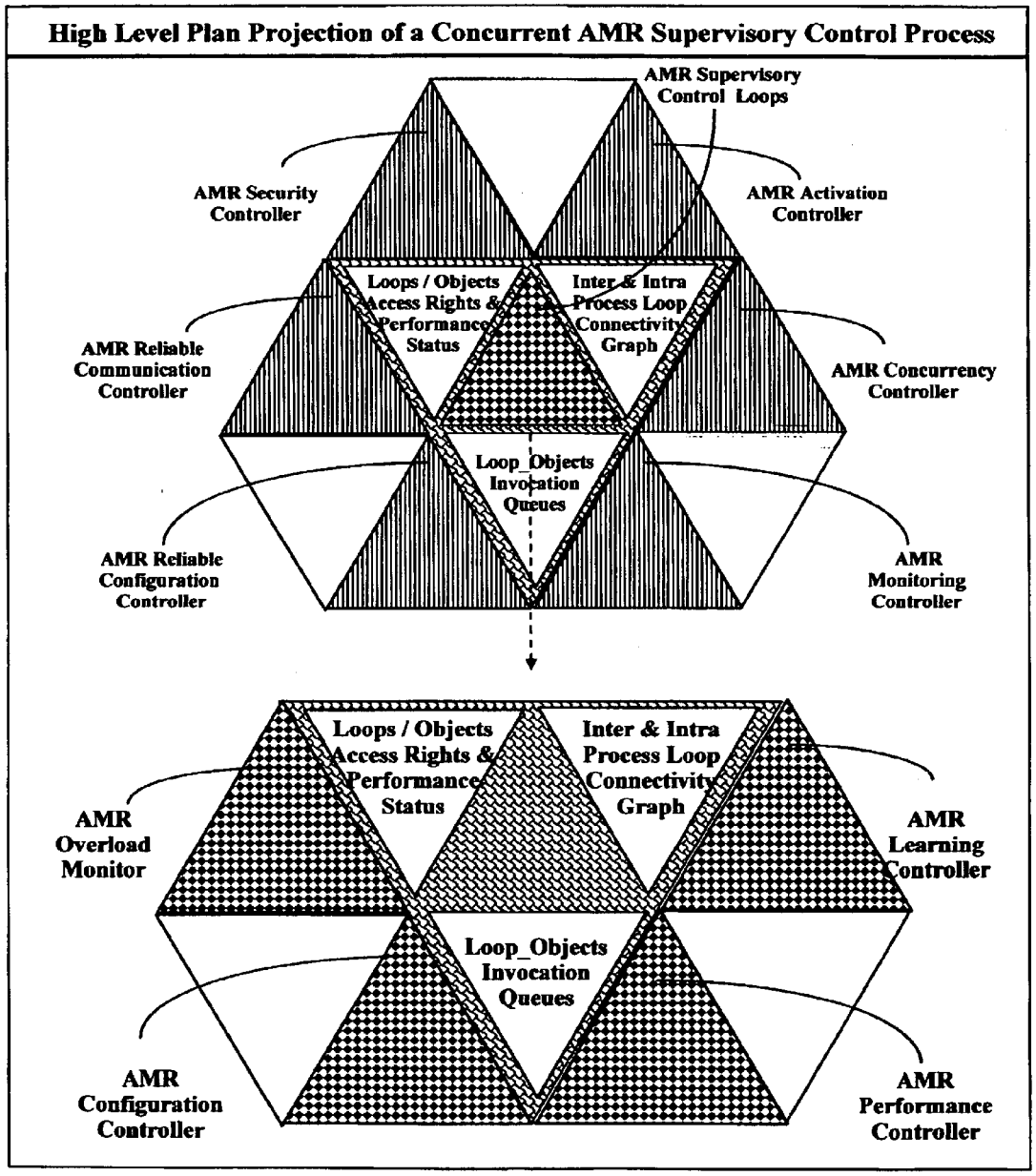
Figure 123: High Level Plan Projection of a Concurrent AMR Supervisory Control Process

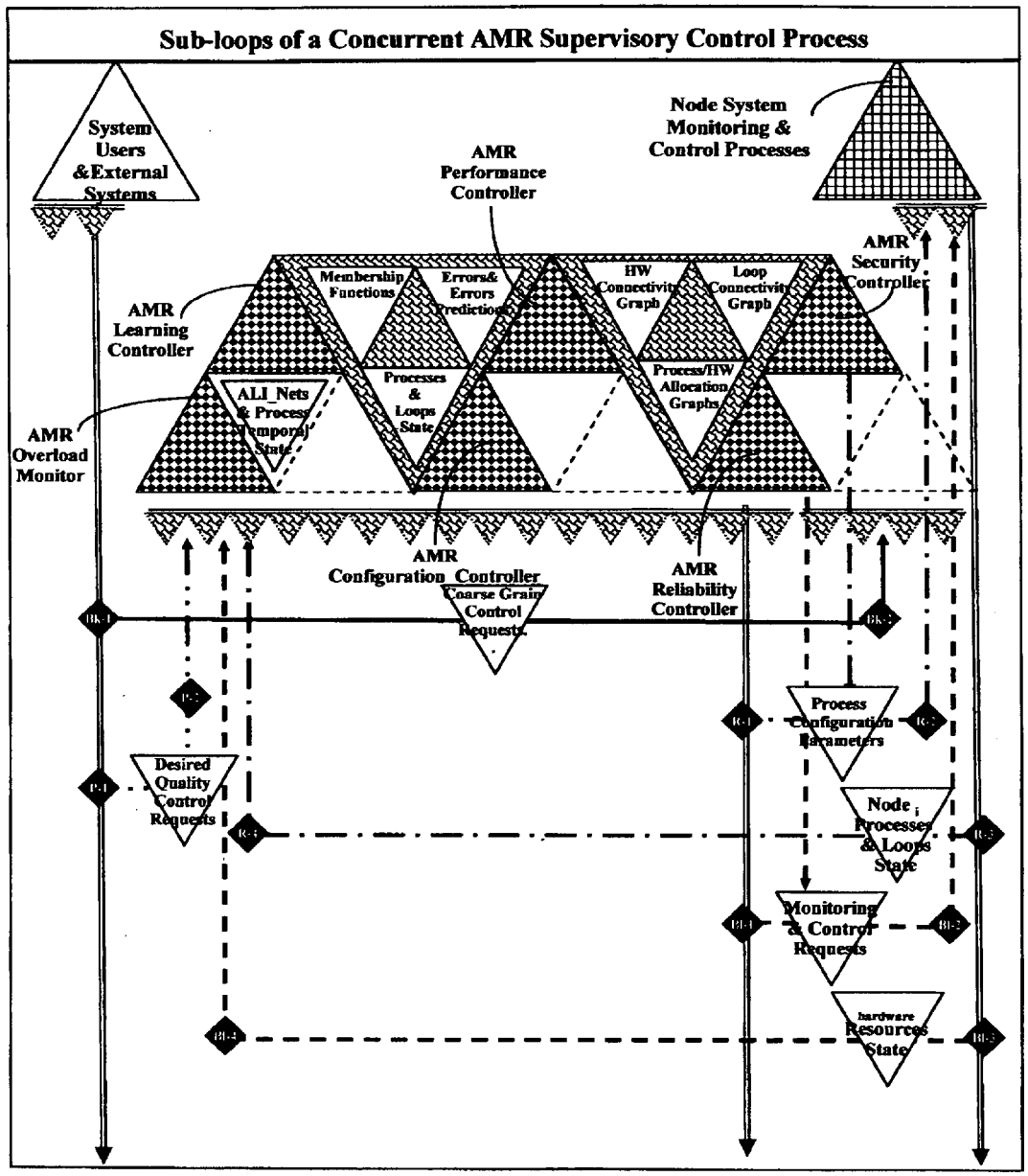
Figure 124: Sub-loops of a Concurrent AMR Supervisory Control Process

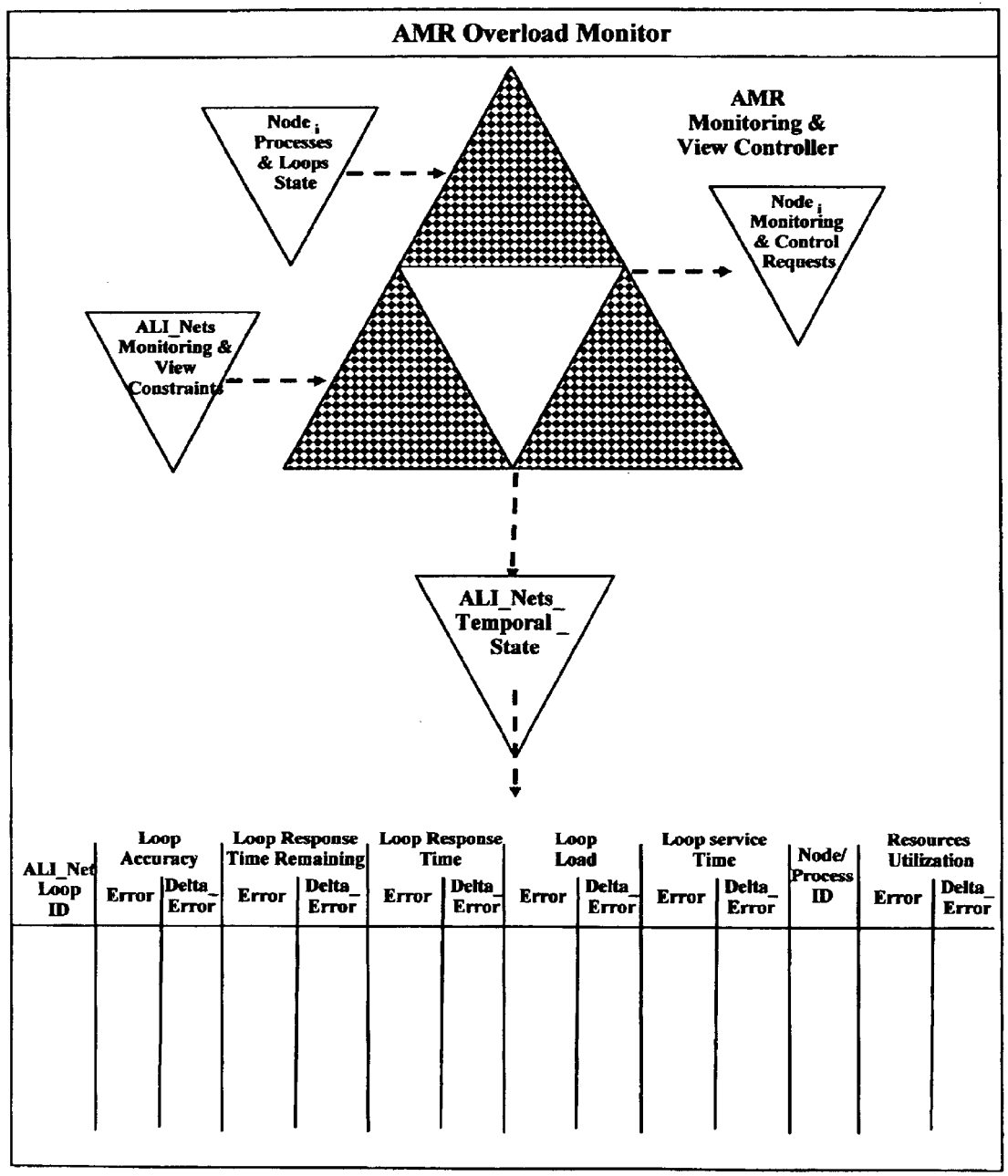
Figure 125: AMR Overload Monitor

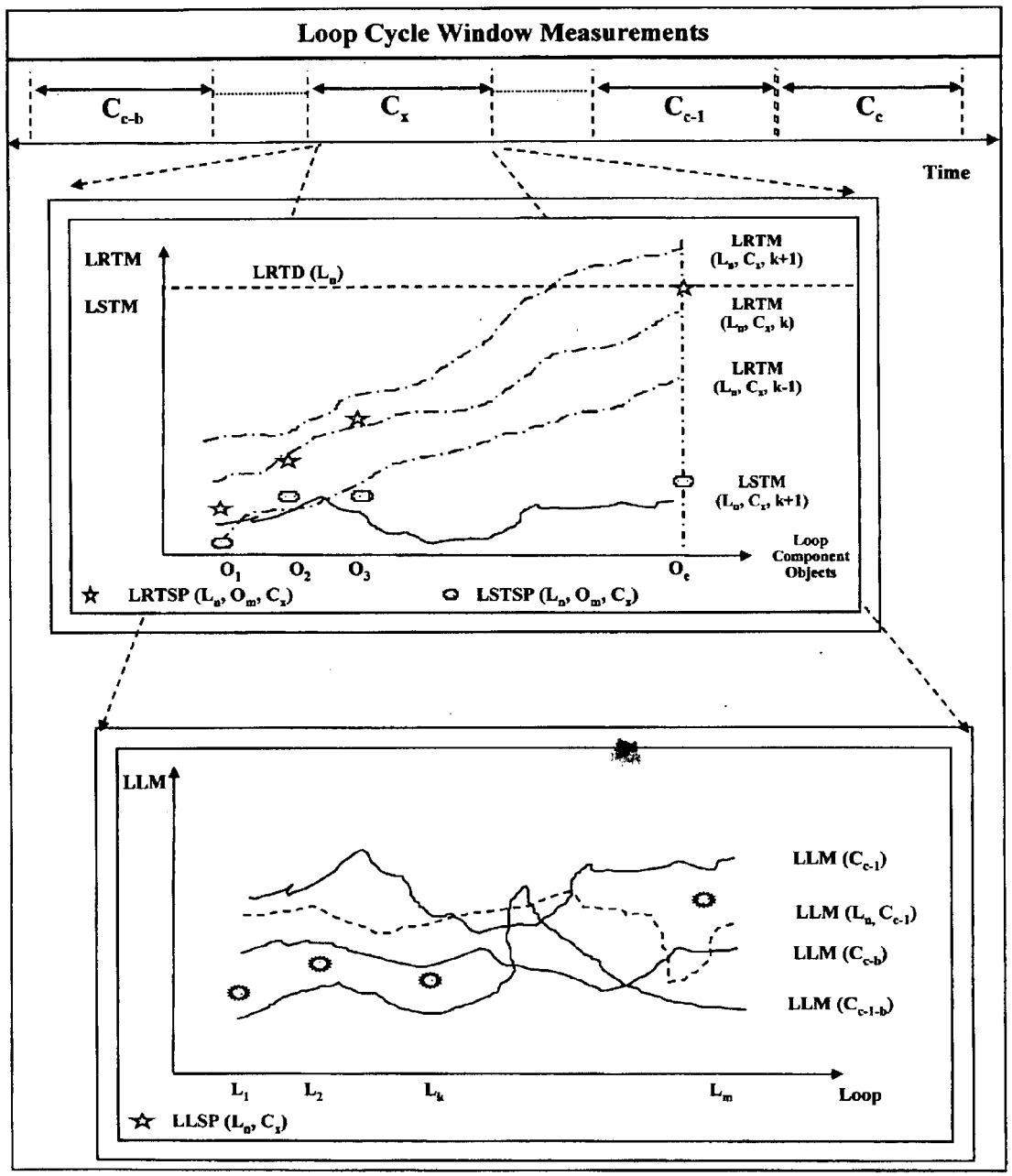
Figure 126: Loop Cycle Window Measurements

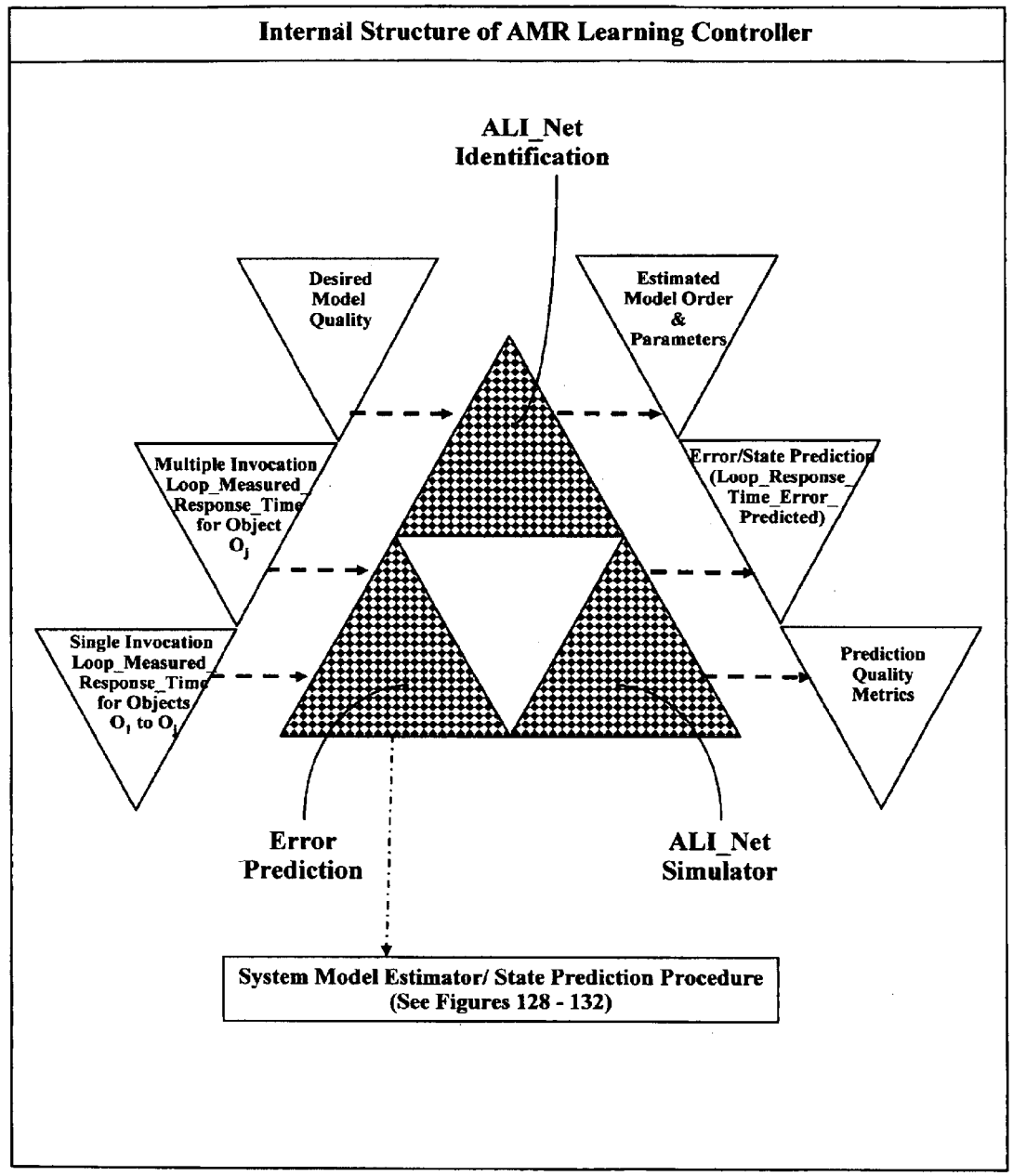
Figure 127: Internal structure of AMR Learning Controller

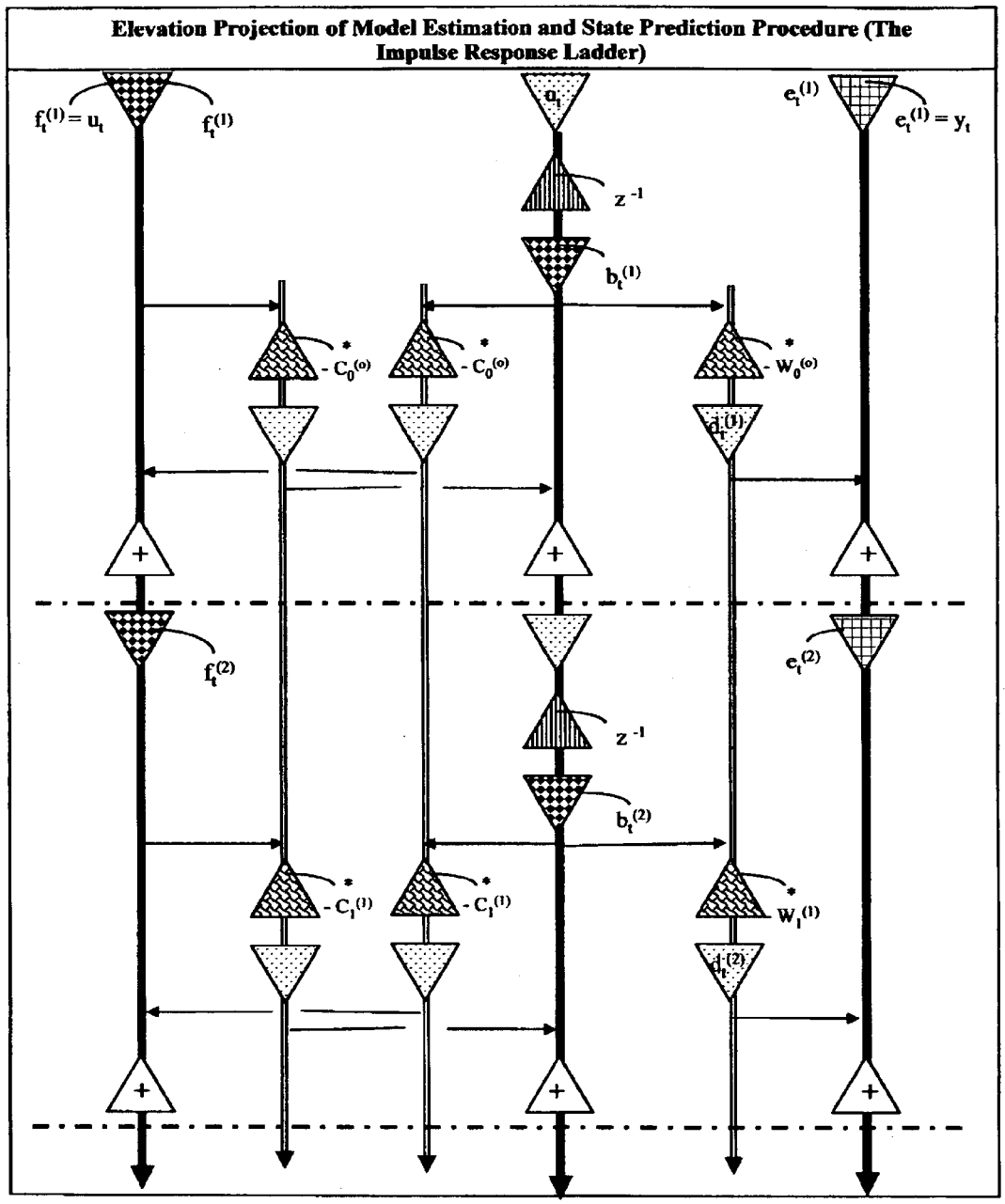
Figure 128: Elevation Projection of Model Estimation and State Prediction Procedure (The Impulse Response Ladder)

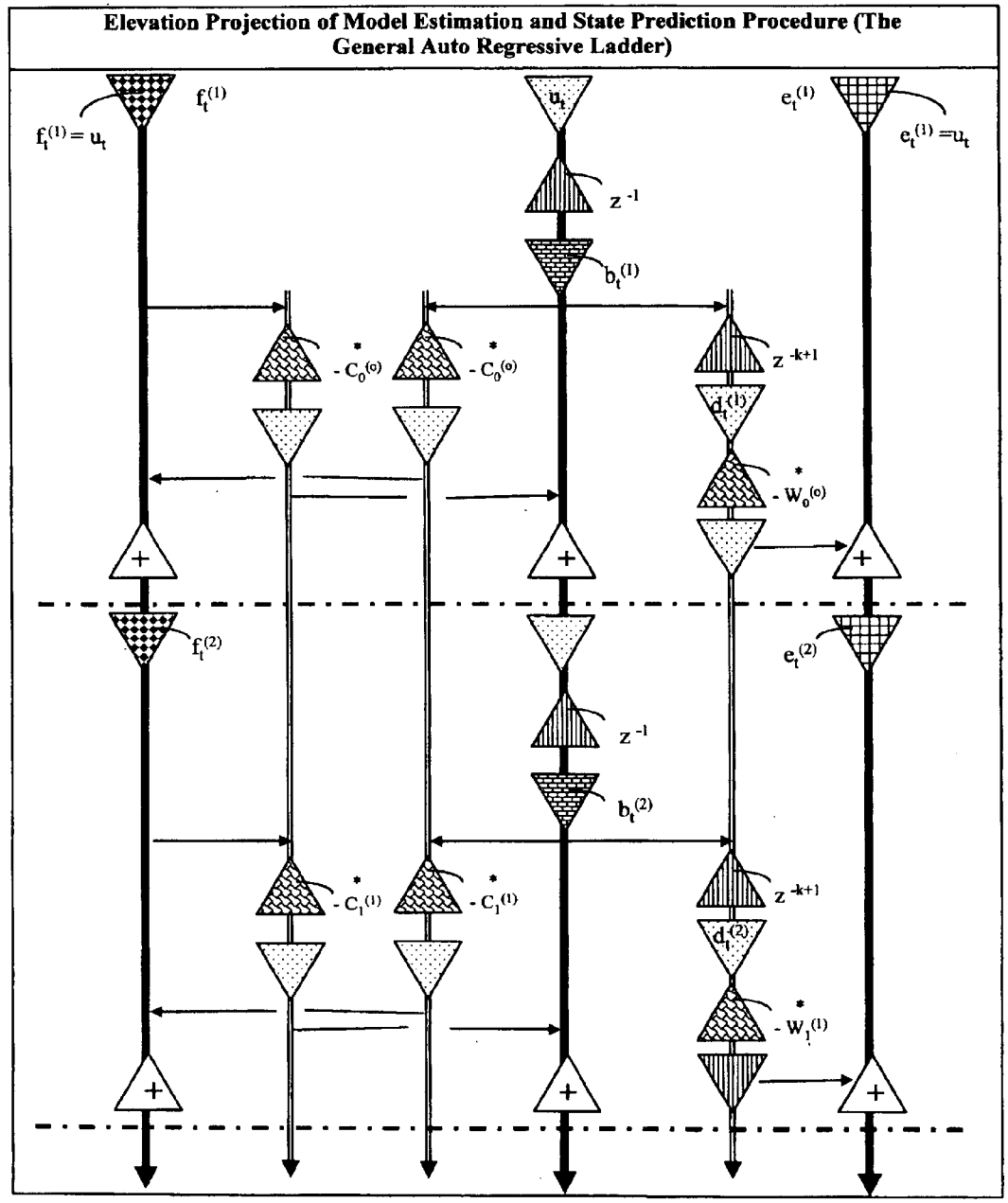
Figure 129: Elevation Projection of Model Estimation and State Prediction Procedure (The General Auto Regressive Ladder)

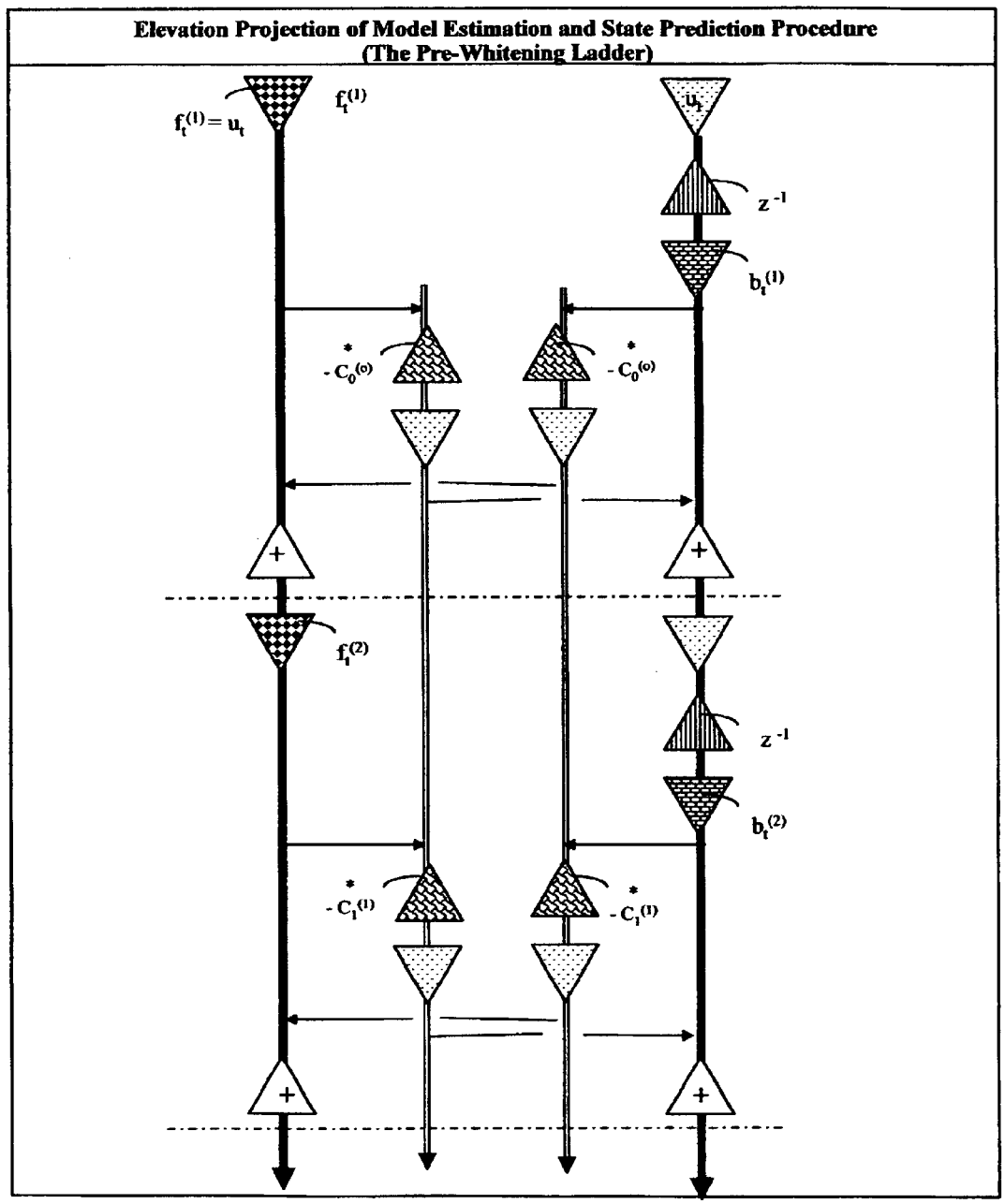
Figure 130: Elevation Projection of Model Estimation and State Prediction Procedure (The Pre-Whitening Ladder)

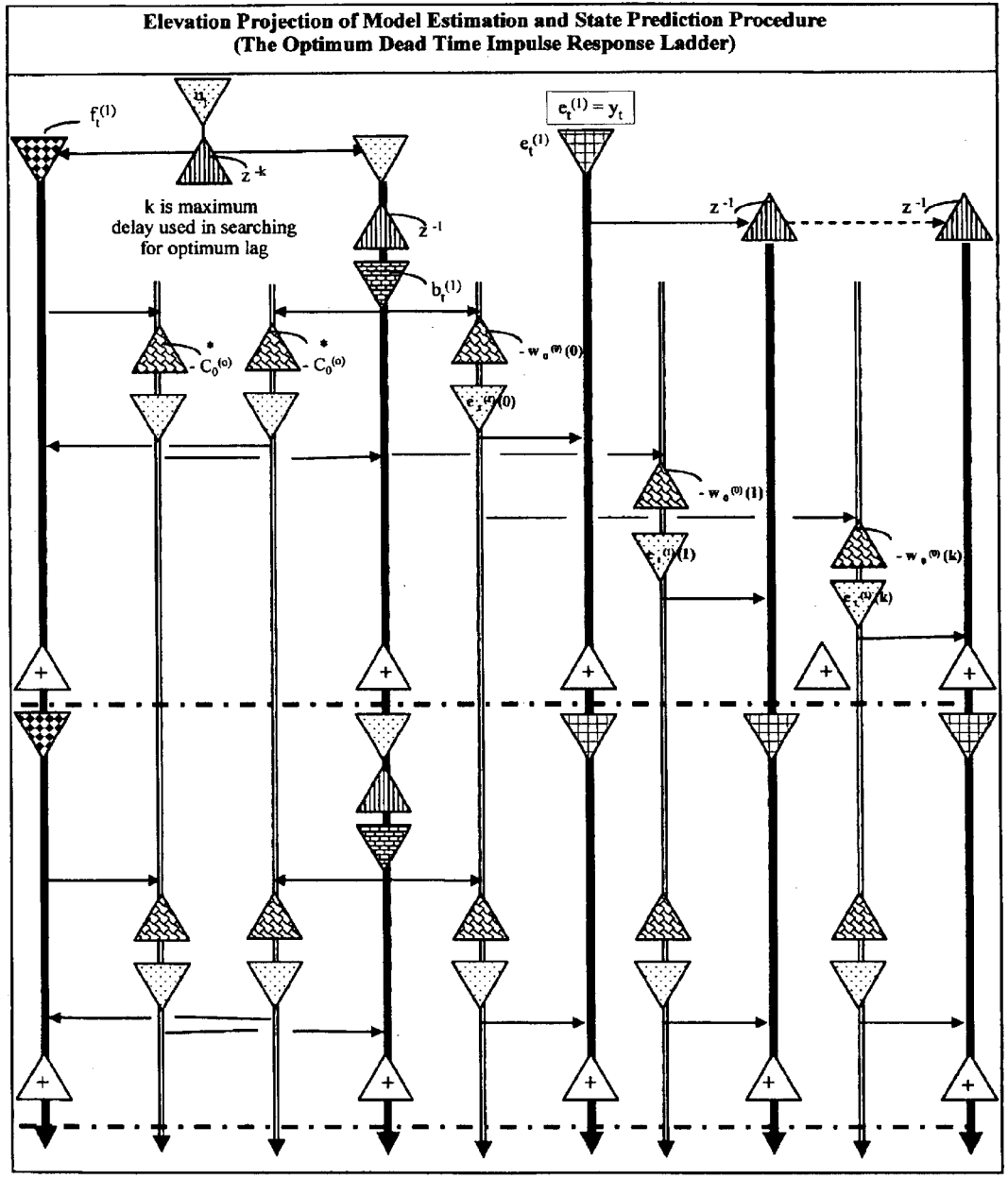
Figure 131: Elevation Projection of Model Estimation and State Prediction Procedure
(The Optimum Dead Time Impulse Response Ladder)

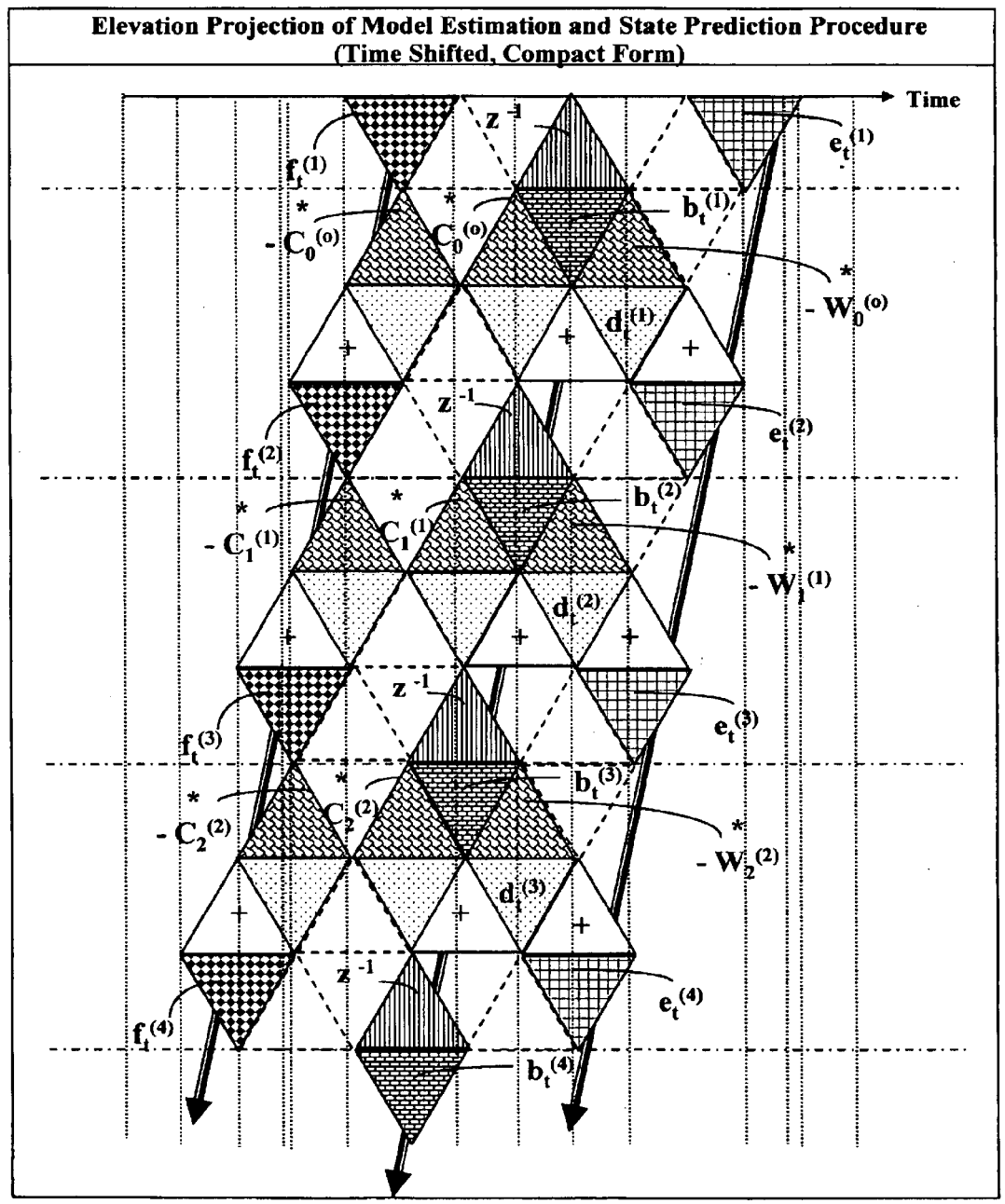
Figure 132: Elevation Projection of Model Estimation and State Prediction Procedure (Time Shifted, Compact Form)

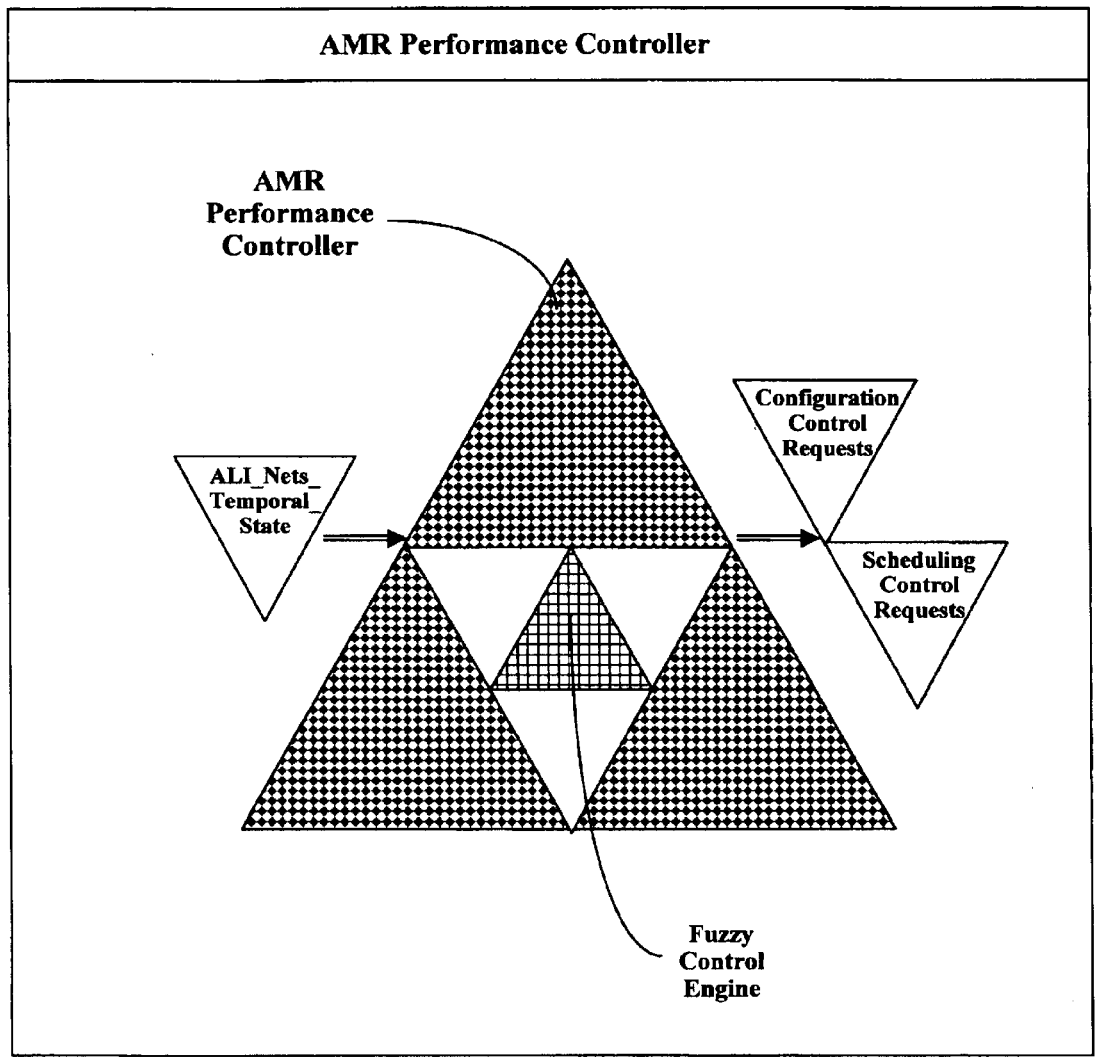
Figure 133: AMR Performance Controller

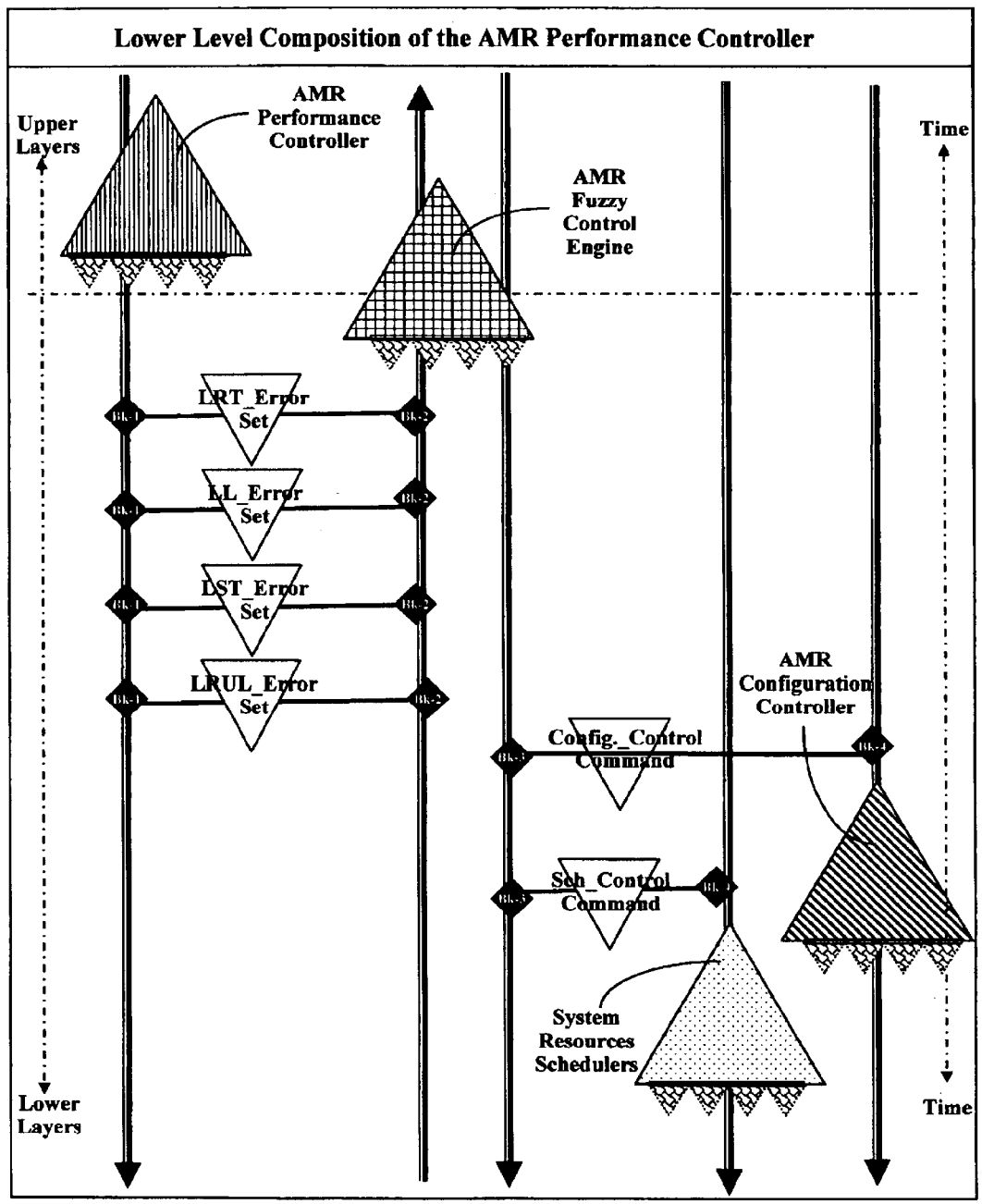
Figure 134: Lower Level Composition of the AMR Performance Controller

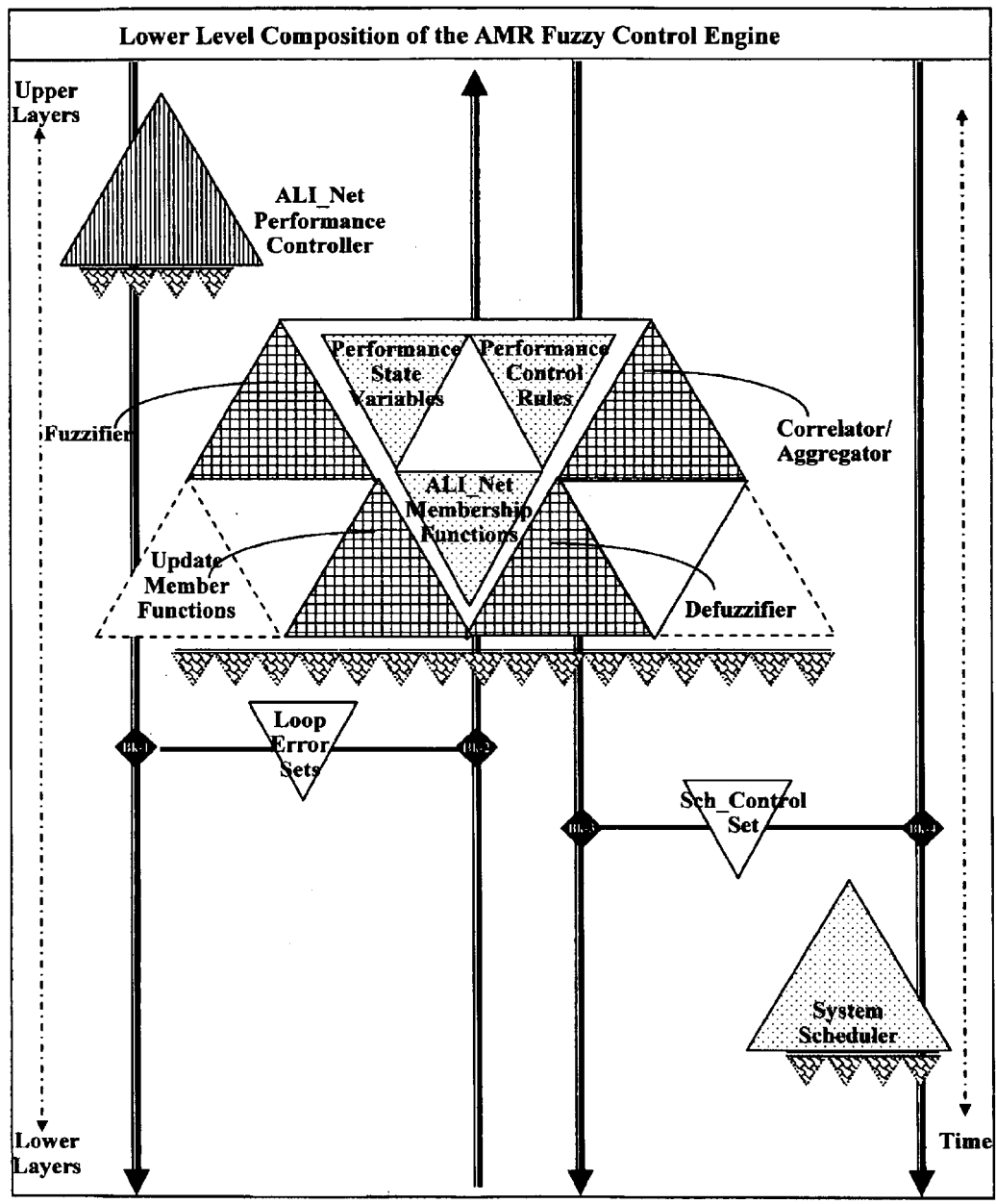
Figure 135: Lower Level Composition of the AMR Fuzzy Control Engine

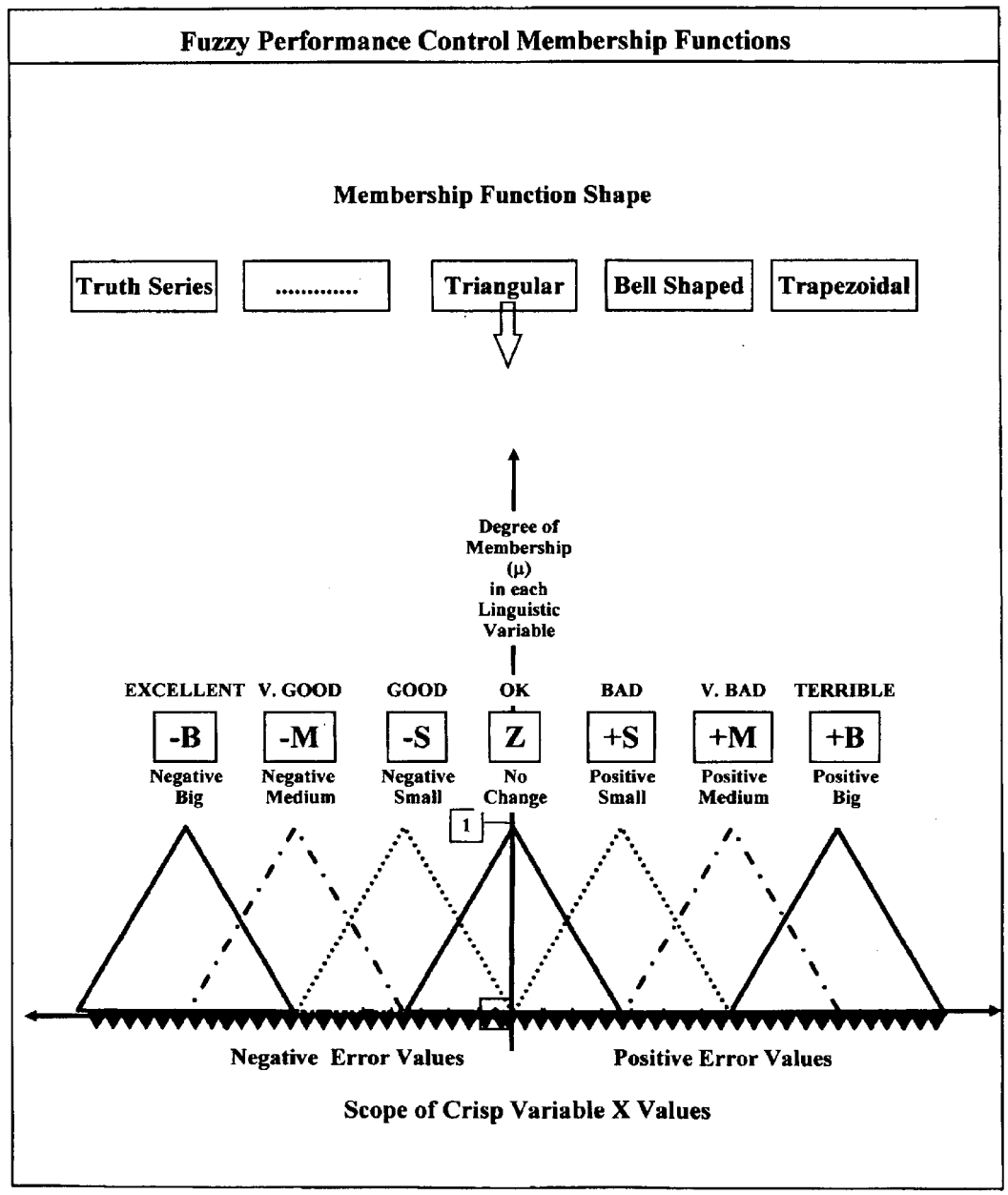
Figure 136: Fuzzy Performance Control Membership Functions

| Control Rules of Loop_Response_Time (LRT) Measurements of Critical Loops ||||||||
|---|---|---|---|---|---|---|---|
| LRT_Diff_Error → <br> LRT Error ↓ | -B | -M | -S | Z | +S | +M | +B |
| -B | SCL(-B) <br> CCL(-B) | SCL(-B) <br> CCL(-B) | SCL(-M) <br> CCL(-M) | SCL(-M) <br> CCL(-M) | SCL(Z) <br> CCL(Z) | SCL(Z) <br> CCL(Z) | SCL(Z) <br> CCL(Z) |
| -M | SCL(-M) <br> CCL(-M) | SCL(-M) <br> CCL(-M) | SCL(-S) <br> CCL(-S) | SCL(-S) <br> CCL(-S) | SCL(Z) <br> CCL(Z) | SCL(Z) <br> CCL(Z) | SCL(+S) <br> CCL(+S) |
| -S | SCL(-S) <br> CCL(-S) | SCL(-S) <br> CCL(-S) | SCL(-S) <br> CCL(-S) | SCL(Z) <br> CCL(Z) | SCL(Z) <br> CCL(Z) | SCL(+S) <br> CCL(+S) | SCL(+S) <br> CCL(+S) |
| Z | SCL(Z) <br> CCL(Z) | SCL(Z) <br> CCL(Z) | SCL(Z) <br> CCL(Z) | SCL(Z) <br> CCL(Z) | SCL(+S) <br> CCL(+S) | SCL(+M) <br> CCL(+M) | SCL(+M) <br> CCL(+M) |
| +S | SCL(+S) <br> CCL(+S) | SCL(+S) <br> CCL(+S) | SCL(+S) <br> CCL(+S) | SCL(+S) <br> CCL(+S) | SCL(+M) <br> CCL(+M) | SCL(+M) <br> CCL(+M) | SCL(+B) <br> CCL(+B) |
| +M | SCL(+M) <br> CCL(+M) | SCL(+M) <br> CCL(+M) | SCL(+B) <br> CCL(+B) | SCL(+B) <br> CCL(+B) | SCL(+B) <br> CCL(+B) | SCL(+B) <br> CCL(+B) | SCL(+B) <br> CCL(+B) |
| +B | SCL(+B) <br> CCL(+B) | SCL(+B) <br> CCL(+B) | SCL(+B) <br> CCL(+B) | SCL(+B) <br> CCL(+B) | SCL(+B) <br> CCL(+B) | SCL(+B) <br> CCL(+B) | SCL(+B) <br> CCL(+B) |

Abbreviations

SCL : Scheduling_Control_Level
CCL : Configuration_Control_Level

-B : Negative_Big
-M : Negative_Medium
-S : Negative_Small

Z : No_Change
+B : Positive_Big
+M : Positive_Medium
+S : Positive_Small

Figure 137: Control Rules of Loop_Response_Time (LRT) Measurements of Critical Loops

| Control Rules of Predicted Loop_Response_Time (LRT) Measurements of Critical Loops |||||||||
|---|---|---|---|---|---|---|---|
| LRT_Predicted_Error → <br> LRT_Error ↓ | -B | -M | -S | Z | +S | +M | +B |
| -B | SCL(-B) <br> CCL(-B) | SCL(-B) <br> CCL(-B) | SCL(-M) <br> CCL(-M) | SCL(-M) <br> CCL(-M) | SCL(Z) <br> CCL(Z) | SCL(Z) <br> CCL(Z) | SCL(Z) <br> CCL(Z) |
| -M | SCL(-M) <br> CCL(-M) | SCL(-M) <br> CCL(-M) | SCL(-S) <br> CCL(-S) | SCL(-S) <br> CCL(-S) | SCL(Z) <br> CCL(Z) | SCL(Z) <br> CCL(Z) | SCL(+S) <br> CCL(+S) |
| -S | SCL(-S) <br> CCL(-S) | SCL(-S) <br> CCL(-S) | SCL(-S) <br> CCL(-S) | SCL(Z) <br> CCL(Z) | SCL(Z) <br> CCL(Z) | SCL(+S) <br> CCL(+S) | SCL(+S) <br> CCL(+S) |
| Z | SCL(Z) <br> CCL(Z) | SCL(Z) <br> CCL(Z) | SCL(Z) <br> CCL(Z) | SCL(Z) <br> CCL(Z) | SCL(Z) <br> CCL(Z) | SCL(+M) <br> CCL(+M) | SCL(+M) <br> CCL(+M) |
| +S | SCL(Z) <br> CCL(Z) | SCL(Z) <br> CCL(Z) | SCL(Z) <br> CCL(Z) | SCL(Z) <br> CCL(Z) | SCL(Z) <br> CCL(Z) | SCL(+M) <br> CCL(+M) | SCL(+B) <br> CCL(+B) |
| +M | SCL(+M) <br> CCL(+M) | SCL(+M) <br> CCL(+M) | SCL(+M) <br> CCL(+M) | SCL(+M) <br> CCL(+M) | SCL(+M) <br> CCL(+M) | SCL(+M) <br> CCL(+M) | SCL(+B) <br> CCL(+B) |
| +B | SCL(+B) <br> CCL(+B) | SCL(+B) <br> CCL(+B) | SCL(+B) <br> CCL(+B) | SCL(+B) <br> CCL(+B) | SCL(+B) <br> CCL(+B) | SCL(+B) <br> CCL(+B) | SCL(+B) <br> CCL(+B) |

Abbreviations

SCL : Scheduling_Control_Level
CCL : Configuration_Control_Level

-B : Negative_Big
-M : Negative_Medium
-S : Negative_Small

Z : No_Change
+B : Positive_Big
+M : Positive_Medium
+S : Positive_Small

Figure 138: Control Rules of Predicted Loop_Response_Time (LRT) Measurements of Critical Loops

Control Rules of Loop_Load (LL) Measurements of Critical Loops

| LL_Diff_Error / LL_Error | -B | -M | -S | Z | +S | +M | +B |
|---|---|---|---|---|---|---|---|
| -B | SCL(-B) CCL(-B) | SCL(-B) CCL(-B) | SCL(-M) CCL(-M) | SCL(-M) CCL(-M) | SCL(Z) CCL(Z) | SCL(Z) CCL(Z) | SCL(Z) CCL(Z) |
| -M | SCL(-M) CCL(-M) | SCL(-M) CCL(-M) | SCL(-S) CCL(-S) | SCL(-S) CCL(-S) | SCL(Z) CCL(Z) | SCL(Z) CCL(Z) | SCL(+S) CCL(+S) |
| -S | SCL(-S) CCL(-S) | SCL(-S) CCL(-S) | SCL(-S) CCL(-S) | SCL(Z) CCL(Z) | SCL(Z) CCL(Z) | SCL(+S) CCL(+S) | SCL(+S) CCL(+S) |
| Z | SCL(Z) CCL(Z) | SCL(Z) CCL(Z) | SCL(Z) CCL(Z) | SCL(Z) CCL(Z) | SCL(+S) CCL(+S) | SCL(+M) CCL(+M) | SCL(+M) CCL(+M) |
| +S | SCL(+S) CCL(+S) | SCL(+S) CCL(+S) | SCL(+S) CCL(+S) | SCL(+S) CCL(+S) | SCL(+M) CCL(+M) | SCL(+M) CCL(+M) | SCL(+B) CCL(+B) |
| +M | SCL(+M) CCL(+M) | SCL(+M) CCL(+M) | SCL(+B) CCL(+B) | SCL(+B) CCL(+B) | SCL(+B) CCL(+B) | SCL(+B) CCL(+B) | SCL(+B) CCL(+B) |
| +B | SCL(+B) CCL(+B) | SCL(+B) CCL(+B) | SCL(+B) CCL(+B) | SCL(+B) CCL(+B) | SCL(+B) CCL(+B) | SCL(+B) CCL(+B) | SCL(+B) CCL(+B) |

Abbreviations

SCL : Scheduling_Control_Level
CCL : Configuration_Control_Level

-B : Negative_Big
-M : Negative_Medium
-S : Negative_Small

Z : No_Change
+B : Positive_Big
+M : Positive_Medium
+S : Positive_Small

Figure 139: Control Rules of Loop_Load (LL) Measurements of Critical Loops

| Control Rules of Predicted Loop_Load (LL) Measurements of Critical Loops |||||||||
|---|---|---|---|---|---|---|---|
| LL_Predicted_Error →<br>LL_Error ↓ | -B | -M | -S | Z | +S | +M | +B |
| -B | SCL(-B)<br>CCL(-B) | SCL(-B)<br>CCL(-B) | SCL(-M)<br>CCL(-M) | SCL(-M)<br>CCL(-M) | SCL(Z)<br>CCL(Z) | SCL(Z)<br>CCL(Z) | SCL(Z)<br>CCL(Z) |
| -M | SCL(-M)<br>CCL(-M) | SCL(-M)<br>CCL(-M) | SCL(-S)<br>CCL(-S) | SCL(-S)<br>CCL(-S) | SCL(Z)<br>CCL(Z) | SCL(Z)<br>CCL(Z) | SCL(+S)<br>CCL(+S) |
| -S | SCL(-S)<br>CCL(-S) | SCL(-S)<br>CCL(-S) | SCL(-S)<br>CCL(-S) | SCL(Z)<br>CCL(Z) | SCL(Z)<br>CCL(Z) | SCL(+S)<br>CCL(+S) | SCL(+S)<br>CCL(+S) |
| Z | SCL(Z)<br>CCL(Z) | SCL(Z)<br>CCL(Z) | SCL(Z)<br>CCL(Z) | SCL(Z)<br>CCL(Z) | SCL(Z)<br>CCL(Z) | SCL(+M)<br>CCL(+M) | SCL(+M)<br>CCL(+M) |
| +S | SCL(Z)<br>CCL(Z) | SCL(Z)<br>CCL(Z) | SCL(Z)<br>CCL(Z) | SCL(Z)<br>CCL(Z) | SCL(Z)<br>CCL(Z) | SCL(+M)<br>CCL(+M) | SCL(+B)<br>CCL(+B) |
| +M | SCL(+M)<br>CCL(+M) | SCL(+M)<br>CCL(+M) | SCL(+M)<br>CCL(+M) | SCL(+M)<br>CCL(+M) | SCL(+M)<br>CCL(+M) | SCL(+M)<br>CCL(+M) | SCL(+B)<br>CCL(+B) |
| +B | SCL(+B)<br>CCL(+B) | SCL(+B)<br>CCL(+B) | SCL(+B)<br>CCL(+B) | SCL(+B)<br>CCL(+B) | SCL(+B)<br>CCL(+B) | SCL(+B)<br>CCL(+B) | SCL(+B)<br>CCL(+B) |

Abbreviations

SCL : Scheduling_Control_Level
CCL : Configuration_Control_Level

-B : Negative_Big
-M : Negative_Medium
-S : Negative_Small

Z : No_Change
+B : Positive_Big
+M : Positive_Medium
+S : Positive_Small

Figure 140: Control Rules of Predicted Loop_Load (LL) Measurements of Critical Loops

| Control Rules of Loop_Service_Time (LST) Measurements of Critical Loops | | | | | | | |
|---|---|---|---|---|---|---|---|
| LST_Diff_Error \ LST_Error | -B | -M | -S | Z | +S | +M | +B |
| -B | SCL(-B) CCL(-B) | SCL(-B) CCL(-B) | SCL(-M) CCL(-M) | SCL(-M) CCL(-M) | SCL(Z) CCL(Z) | SCL(Z) CCL(Z) | SCL(Z) CCL(Z) |
| -M | SCL(-M) CCL(-M) | SCL(-M) CCL(-M) | SCL(-S) CCL(-S) | SCL(-S) CCL(-S) | SCL(Z) CCL(Z) | SCL(Z) CCL(Z) | SCL(+S) CCL(+S) |
| -S | SCL(-S) CCL(-S) | SCL(-S) CCL(-S) | SCL(-S) CCL(-S) | SCL(Z) CCL(Z) | SCL(Z) CCL(Z) | SCL(+S) CCL(+S) | SCL(+S) CCL(+S) |
| Z | SCL(Z) CCL(Z) | SCL(Z) CCL(Z) | SCL(Z) CCL(Z) | SCL(Z) CCL(Z) | SCL(+S) CCL(+S) | SCL(+M) CCL(+M) | SCL(+M) CCL(+M) |
| +S | SCL(+S) CCL(+S) | SCL(+S) CCL(+S) | SCL(+S) CCL(+S) | SCL(+S) CCL(+S) | SCL(+M) CCL(+M) | SCL(+M) CCL(+M) | SCL(+B) CCL(+B) |
| +M | SCL(+M) CCL(+M) | SCL(+M) CCL(+M) | SCL(+B) CCL(+B) | SCL(+B) CCL(+B) | SCL(+B) CCL(+B) | SCL(+B) CCL(+B) | SCL(+B) CCL(+B) |
| +B | SCL(+B) CCL(+B) | SCL(+B) CCL(+B) | SCL(+B) CCL(+B) | SCL(+B) CCL(+B) | SCL(+B) CCL(+B) | SCL(+B) CCL(+B) | SCL(+B) CCL(+B) |

Abbreviations

SCL : Scheduling_Control_Level
CCL : Configuration_Control_Level

-B : Negative_Big
-M : Negative_Medium
-S : Negative_Small

Z : No_Change
+B : Positive_Big
+M : Positive_Medium
+S : Positive_Small

Figure 141: Control Rules of Loop_Service_Time (LST) Measurements of Critical Loops

Control Rules of Predicted Loop_Service_Time (LST) Measurements of Critical Loops

| LST_Error \ LST_Predicted_Error | -B | -M | -S | Z | +S | +M | +B |
|---|---|---|---|---|---|---|---|
| -B | SCL(-B)<br>CCL(-B) | SCL(-B)<br>CCL(-B) | SCL(-M)<br>CCL(-M) | SCL(-M)<br>CCL(-M) | SCL(Z)<br>CCL(Z) | SCL(Z)<br>CCL(Z) | SCL(Z)<br>CCL(Z) |
| -M | SCL(-M)<br>CCL(-M) | SCL(-M)<br>CCL(-M) | SCL(-S)<br>CCL(-S) | SCL(-S)<br>CCL(-S) | SCL(Z)<br>CCL(Z) | SCL(Z)<br>CCL(Z) | SCL(+S)<br>CCL(+S) |
| -S | SCL(-S)<br>CCL(-S) | SCL(-S)<br>CCL(-S) | SCL(-S)<br>CCL(-S) | SCL(Z)<br>CCL(Z) | SCL(Z)<br>CCL(Z) | SCL(Z)<br>CCL(Z) | SCL(+S)<br>CCL(+S) |
| Z | SCL(Z)<br>CCL(Z) | SCL(Z)<br>CCL(Z) | SCL(Z)<br>CCL(Z) | SCL(Z)<br>CCL(Z) | SCL(Z)<br>CCL(Z) | SCL(Z)<br>CCL(Z) | SCL(+M)<br>CCL(+M) |
| +S | SCL(Z)<br>CCL(Z) | SCL(Z)<br>CCL(Z) | SCL(Z)<br>CCL(Z) | SCL(Z)<br>CCL(Z) | SCL(Z)<br>CCL(Z) | SCL(Z)<br>CCL(Z) | SCL(+B)<br>CCL(+B) |
| +M | SCL(+M)<br>CCL(+M) | SCL(+M)<br>CCL(+M) | SCL(+M)<br>CCL(+M) | SCL(+M)<br>CCL(+M) | SCL(+M)<br>CCL(+M) | SCL(+M)<br>CCL(+M) | SCL(+B)<br>CCL(+B) |
| +B | SCL(+B)<br>CCL(+B) | SCL(+B)<br>CCL(+B) | SCL(+B)<br>CCL(+B) | SCL(+B)<br>CCL(+B) | SCL(+B)<br>CCL(+B) | SCL(+B)<br>CCL(+B) | SCL(+B)<br>CCL(+B) |

Abbreviations

SCL : Scheduling_Control_Level
CCL : Configuration_Control_Level

-B : Negative_Big
-M : Negative_Medium
-S : Negative_Small

Z : No_Change
+B : Positive_Big
+M : Positive_Medium
+S : Positive_Small

Figure 142: Control Rules of Predicted Loop_Service_Time (LST) Measurements of Critical Loops

| Control Rules of Loop_Resource_Utilization_Level (LRUL) Measurements of Critical Loops ||||||||
|---|---|---|---|---|---|---|---|
| LRUL_Diff_Error / LRUL_Error | -B | -M | -S | Z | +S | +M | +B |
| -B | SCL (-B) CCL (-B) | SCL(-B) CCL(-B) | SCL(-M) CCL(-M) | SCL(-M) CCL(-M) | SCL(Z) CCL(Z) | SCL(Z) CCL(Z) | SCL(Z) CCL(Z) |
| -M | SCL(-M) CCL (-M) | SCL(-M) CCL(-M) | SCL(-S) CCL(-S) | SCL(-S) CCL(-S) | SCL(Z) CCL(Z) | SCL(Z) CCL(Z) | SCL(+S) CCL(+S) |
| -S | SCL(-S) CCL(-S) | SCL(-S) CCL(-S) | SCL(-S) CCL (-S) | SCL(Z) CCL(Z) | SCL(Z) CCL(Z) | SCL(+S) CCL(+S) | SCL(+S) CCL(+S) |
| Z | SCL(Z) CCL (Z) | SCL(Z) CCL(Z) | SCL(Z) CCL (Z) | SCL(Z) CCL(Z) | SCL(+S) CCL(+S) | SCL(+M) CCL (+M) | SCL(+M) CCL(+M) |
| +S | SCL(+S) CCL(+S) | SCL(+S) CCL (+S) | SCL(+S) CCL(+S) | SCL(+S) CCL(+S) | SCL (+M) CCL (+M) | SCL(+M) CCL(+M) | SCL(+B) CCL(+B) |
| +M | SCL(+M) CCL (+M) | SCL(+M) CCL(+M) | SCL(+B) CCL(+B) | SCL(+B) CCL(+B) | SCL(+B) CCL(+B) | SCL (+B) CCL (+B) | SCL(+B) CCL (+B) |
| +B | SCL(+B) CCL(+B) | SCL(+B) CCL(+B) | SCL(+B) CCL (+B) | SCL(+B) CCL(+B) | SCL(+B) CCL(+B) | SCL (+B) CCL(+B) | SCL(+B) CCL(+B) |

Abbreviations

SCL : Scheduling_Control_Level

CCL : Configuration_Control_Level

-B : Negative_Big
-M : Negative_Medium
-S : Negative_Small

Z : No_Change
+B : Positive_Big
+M : Positive_Medium
+S : Positive_Small

Figure 143: Control Rules of Loop_Resource_Utilization_Level (LRUL) Measurements of Critical Loops

Control Rules of Predicted Loop_Resource_Utilization_Level (LRUL) Measurements of Critical Loops

| LRUL_Error \ LRUL_Predicted_Error | -B | -M | -S | Z | +S | +M | +B |
|---|---|---|---|---|---|---|---|
| -B | SCL(-B) CCL(-B) | SCL(-B) CCL(-B) | SCL(-M) CCL(-M) | SCL(-M) CCL(-M) | SCL(Z) CCL(Z) | SCL(Z) CCL(Z) | SCL(Z) CCL(Z) |
| -M | SCL(-M) CCL(-M) | SCL(-M) CCL(-M) | SCL(-S) CCL(-S) | SCL(-S) CCL(-S) | SCL(Z) CCL(Z) | SCL(Z) CCL(Z) | SCL(+S) CCL(+S) |
| -S | SCL(-S) CCL(-S) | SCL(-S) CCL(-S) | SCL(-S) CCL(-S) | SCL(Z) CCL(Z) | SCL(Z) CCL(Z) | SCL(Z) CCL(Z) | SCL(+S) CCL(+S) |
| Z | SCL(Z) CCL(Z) | SCL(Z) CCL(Z) | SCL(Z) CCL(Z) | SCL(Z) CCL(Z) | SCL(Z) CCL(Z) | SCL(Z) CCL(Z) | SCL(+M) CCL(+M) |
| +S | SCL(Z) CCL(Z) | SCL(Z) CCL(Z) | SCL(Z) CCL(Z) | SCL(Z) CCL(Z) | SCL(Z) CCL(Z) | SCL(Z) CCL(Z) | SCL(+B) CCL(+B) |
| +M | SCL(+M) CCL(+M) | SCL(+M) CCL(+M) | SCL(+M) CCL(+M) | SCL(+M) CCL(+M) | SCL(+M) CCL(+M) | SCL(+M) CCL(+M) | SCL(+B) CCL(+B) |
| +B | SCL(+B) CCL(+B) | SCL(+B) CCL(+B) | SCL(+B) CCL(+B) | SCL(+B) CCL(+B) | SCL(+B) CCL(+B) | SCL(+B) CCL(+B) | SCL(+B) CCL(+B) |

Abbreviations

SCL : Scheduling_Control_Level
CCL : Configuration_Control_Level

-B : Negative_Big
-M : Negative_Medium
-S : Negative_Small

Z : No_Change
+B : Positive_Big
+M : Positive_Medium
+S : Positive_Small

Figure 144: Control Rules of Predicted Loop_Resource_Utilization_Level (LRUL) Measurements of Critical Loops

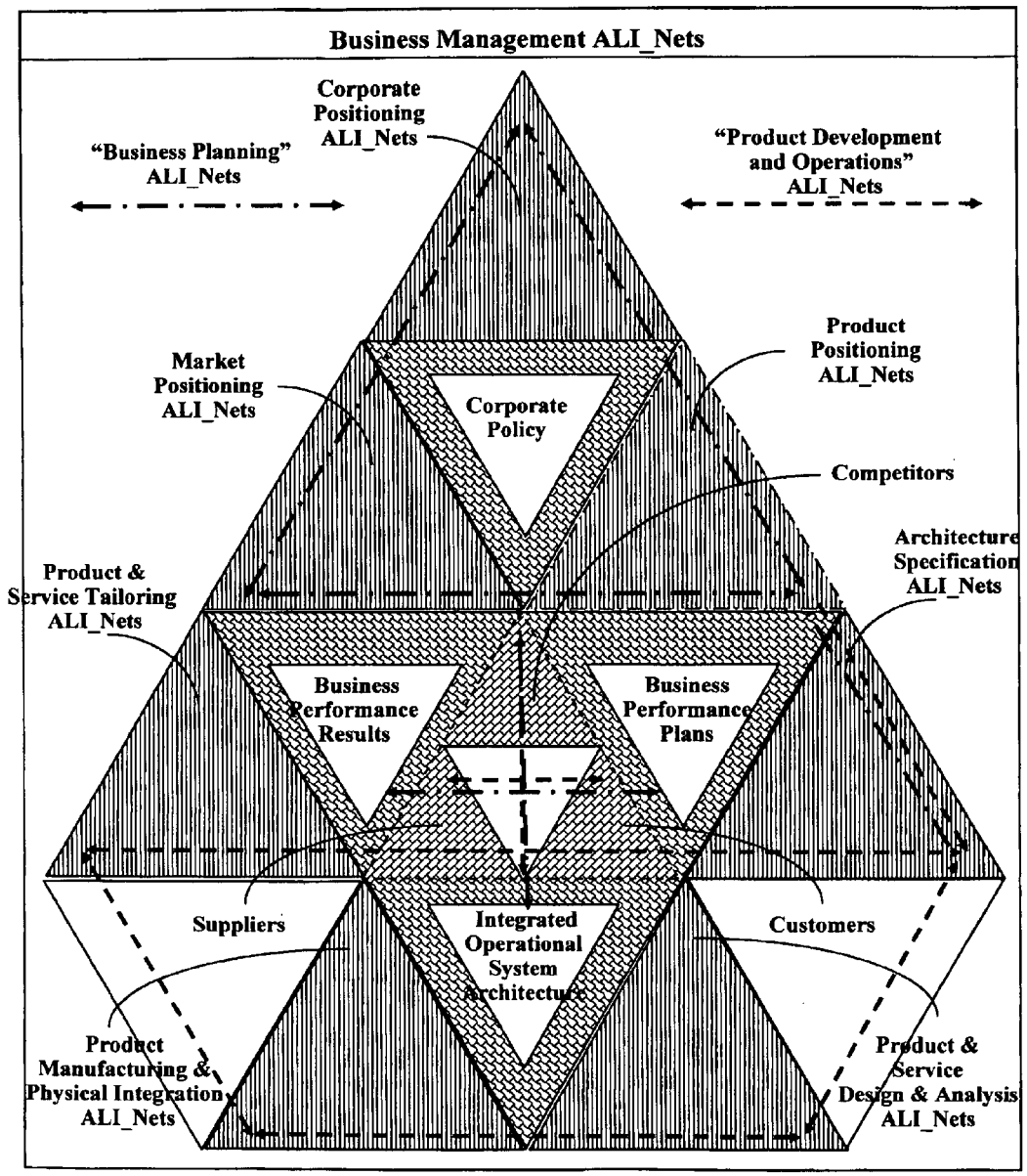
Figure 145: Business Management ALI_Nets

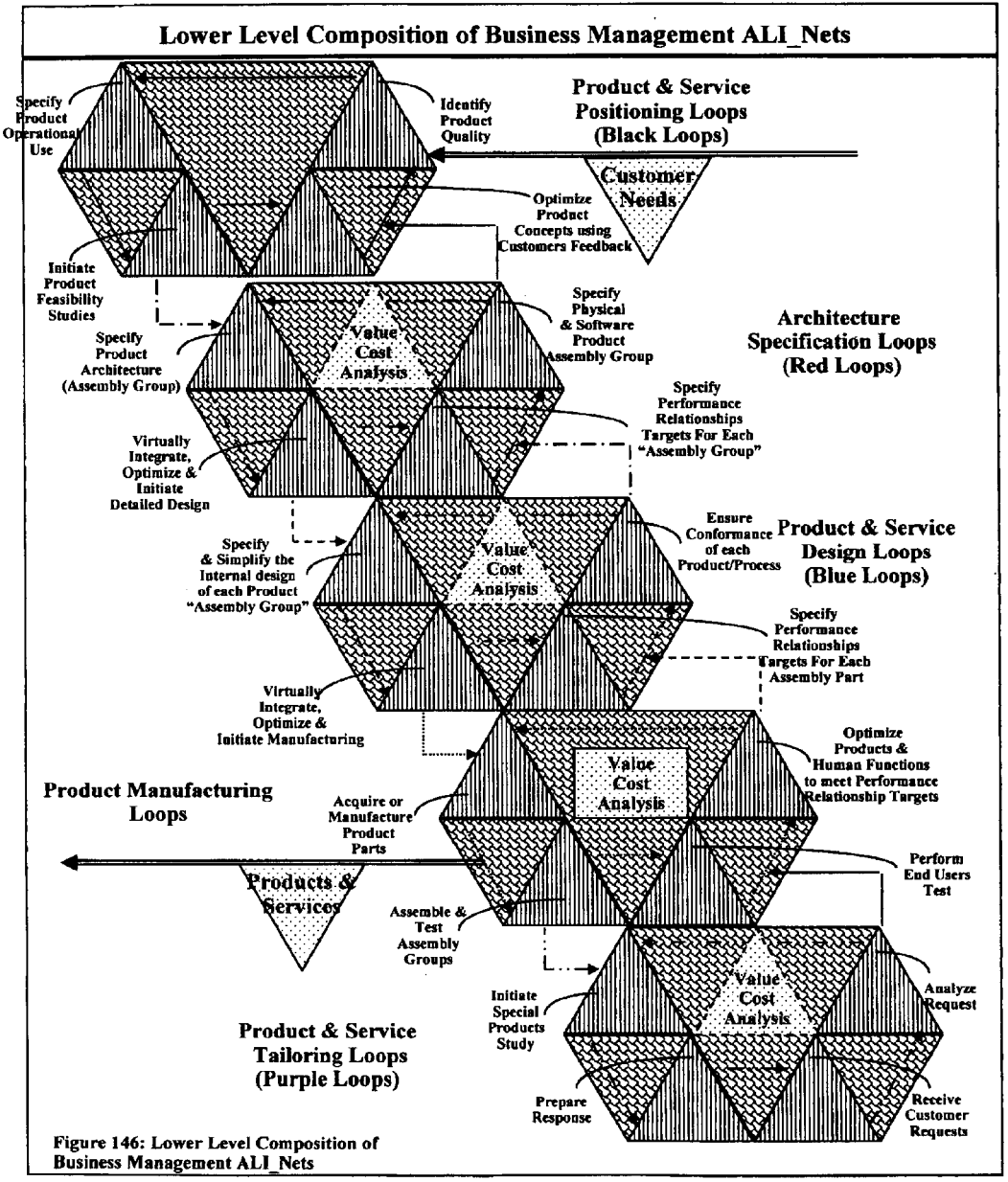
Figure 146: Lower Level Composition of Business Management ALI_Nets

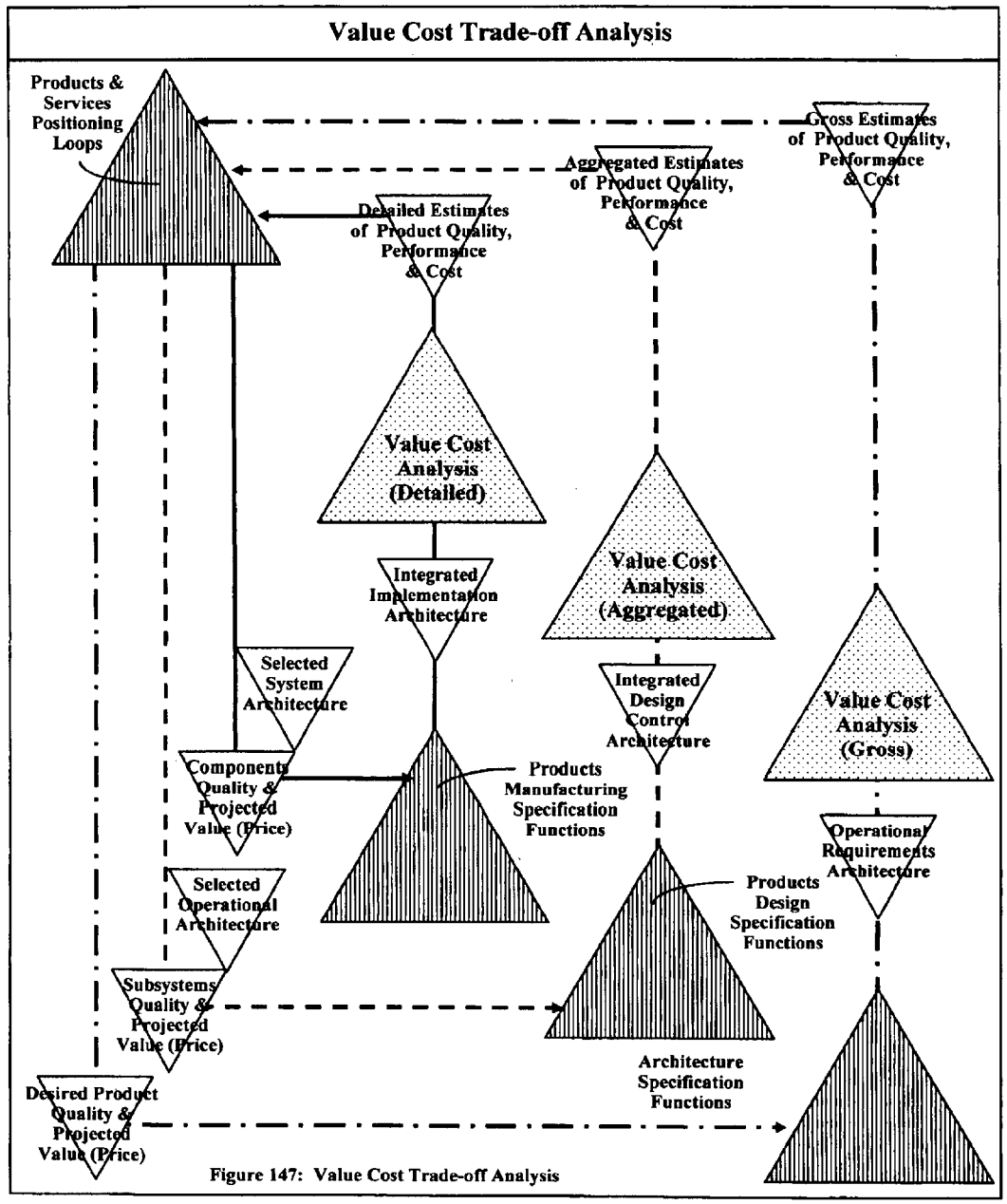
Figure 147: Value Cost Trade-off Analysis

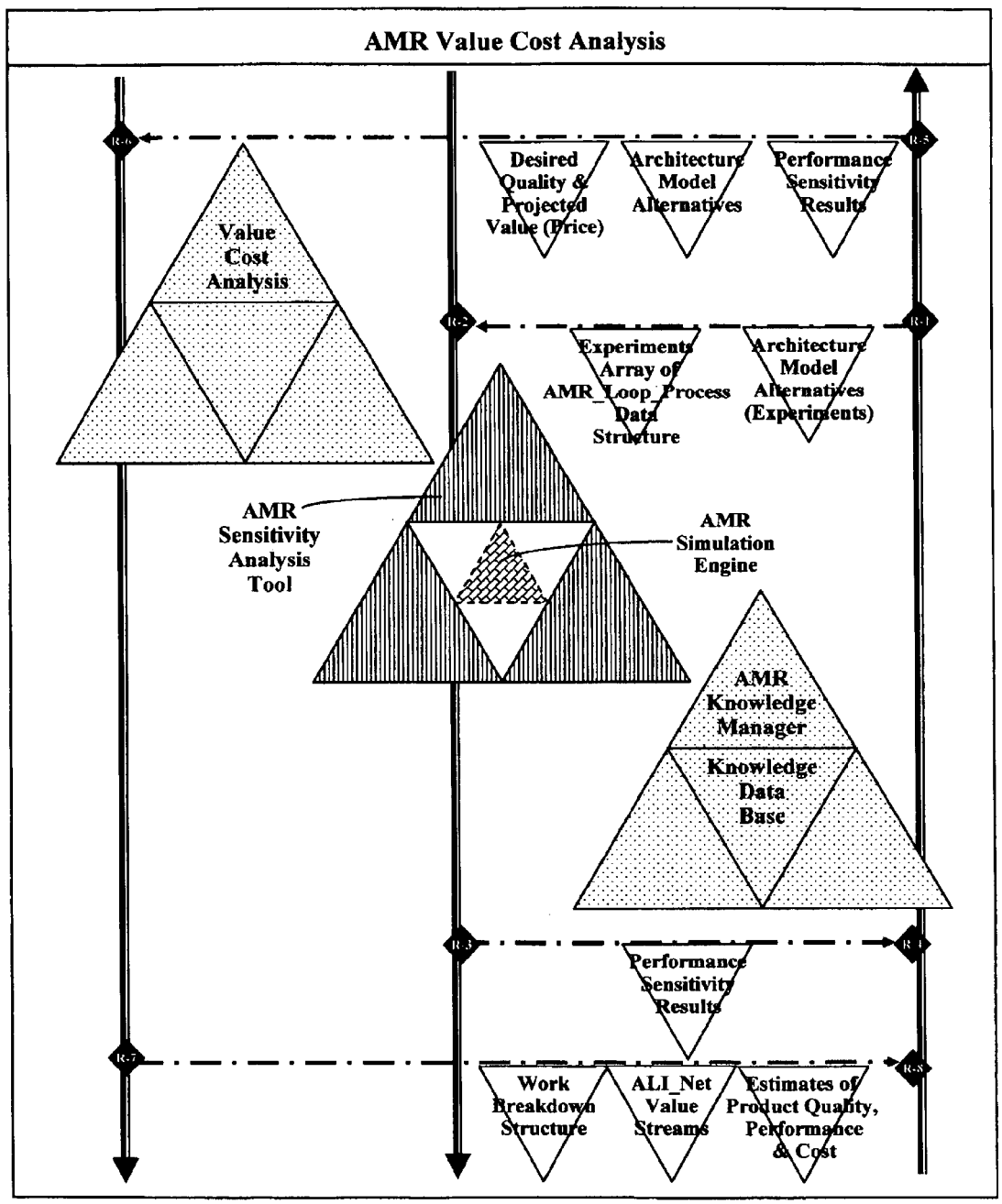
Figure 148: AMR Value Cost Analysis

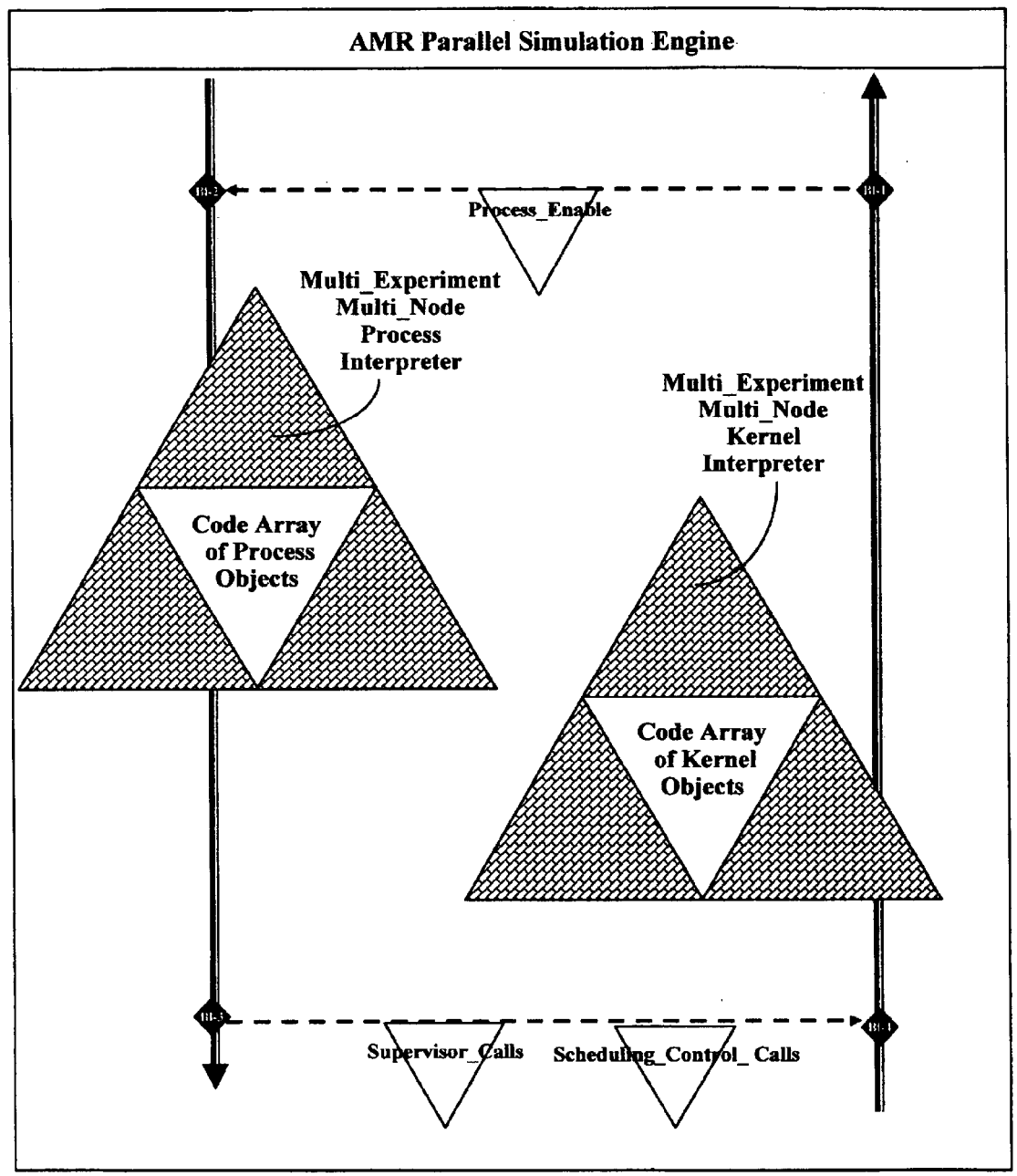
Figure 149: AMR Parallel Simulation Engine

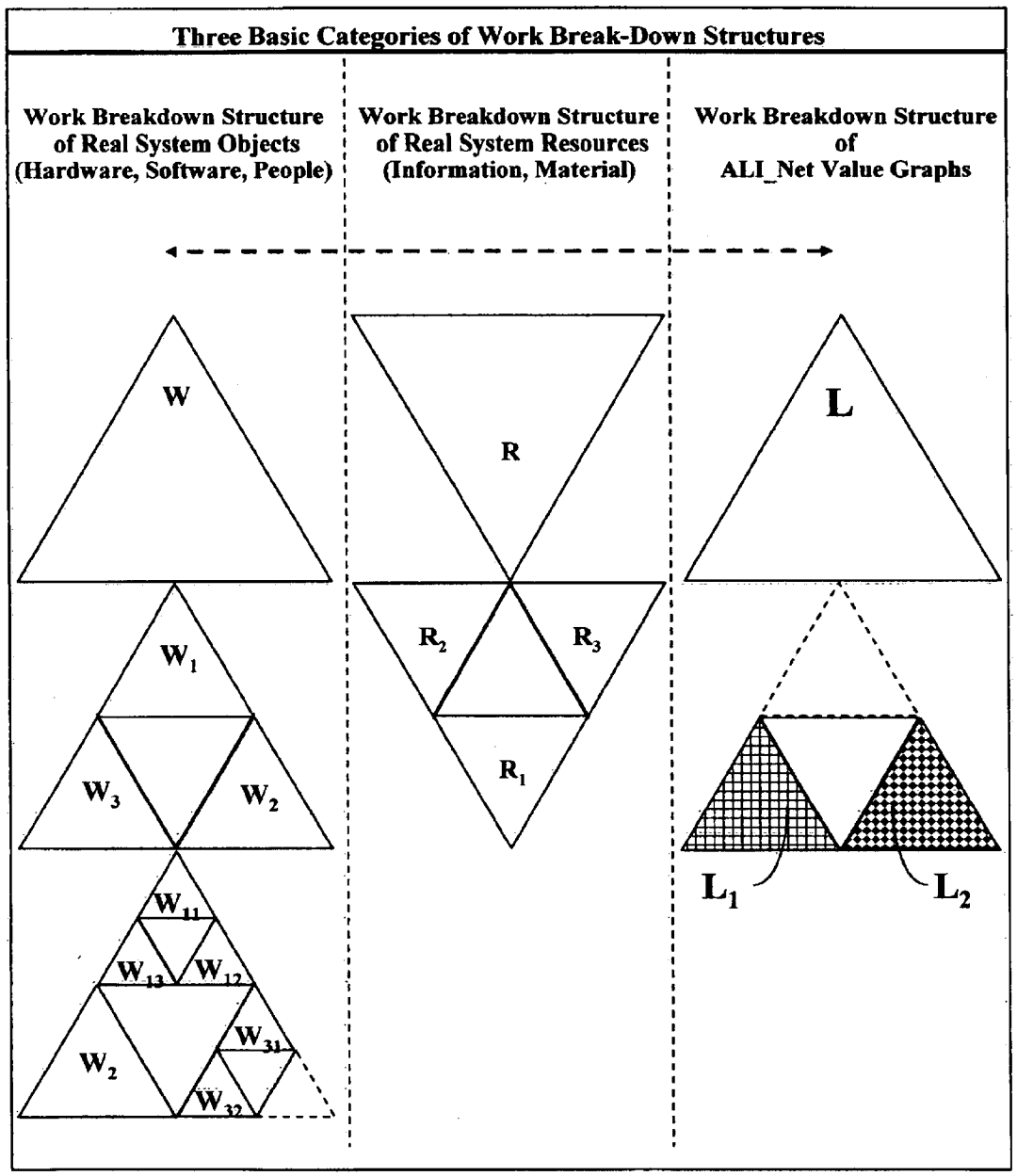
Figure 150: Three Basic Categories of Work Break-Down Structures

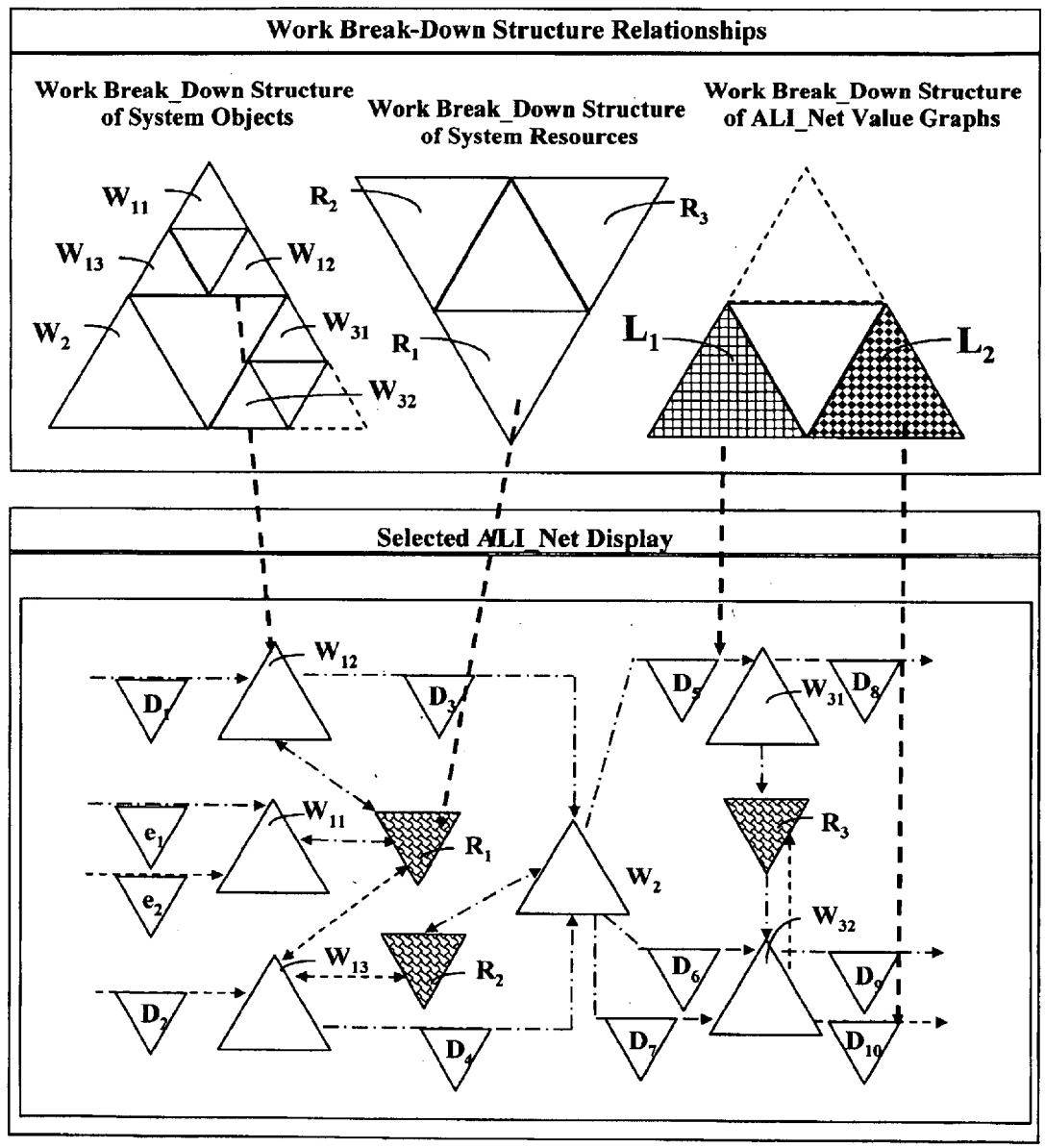
Figure 151: Work Break-Down Structure Relationships

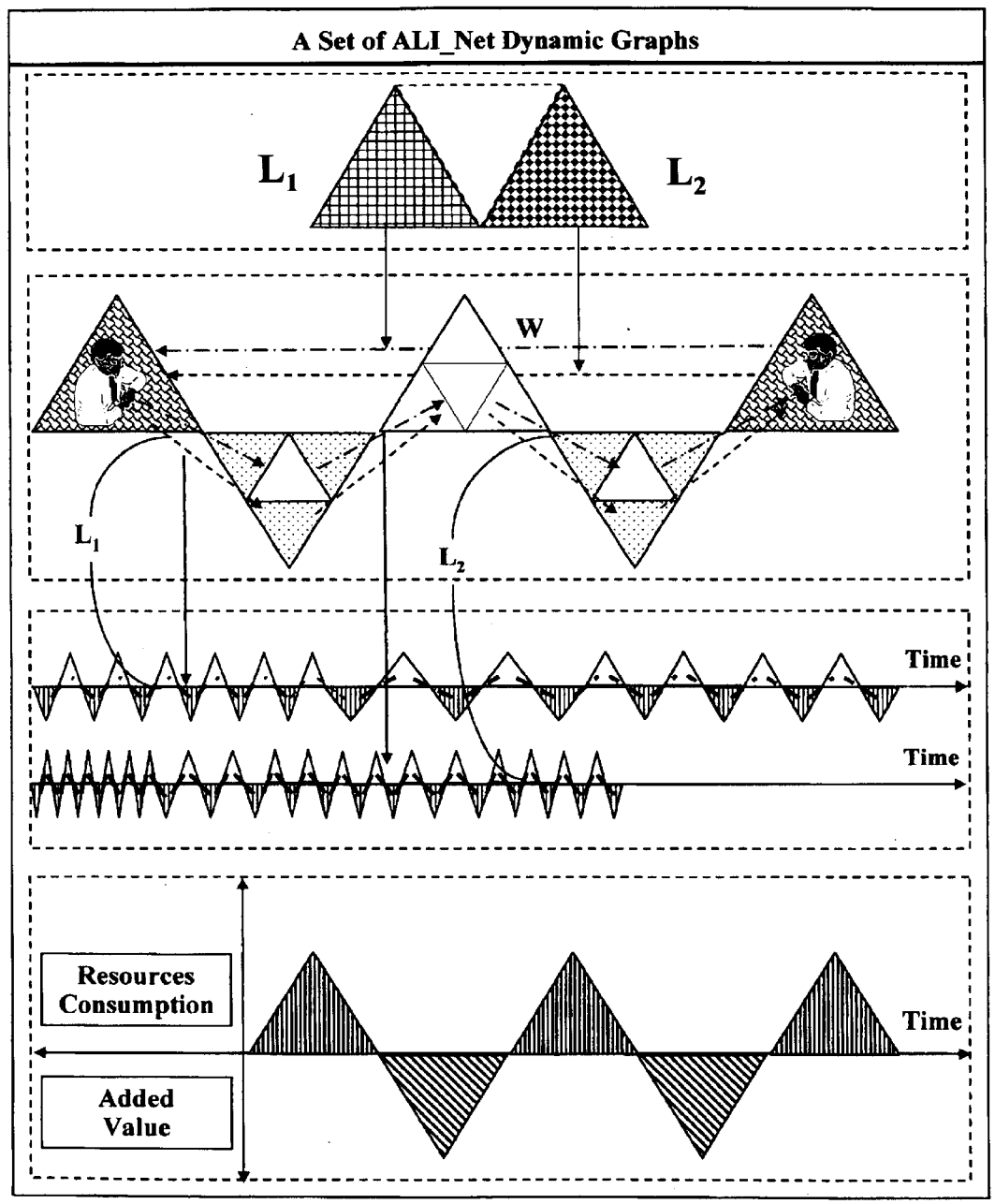
Figure 152: A Set of ALI_Net Dynamic Graphs

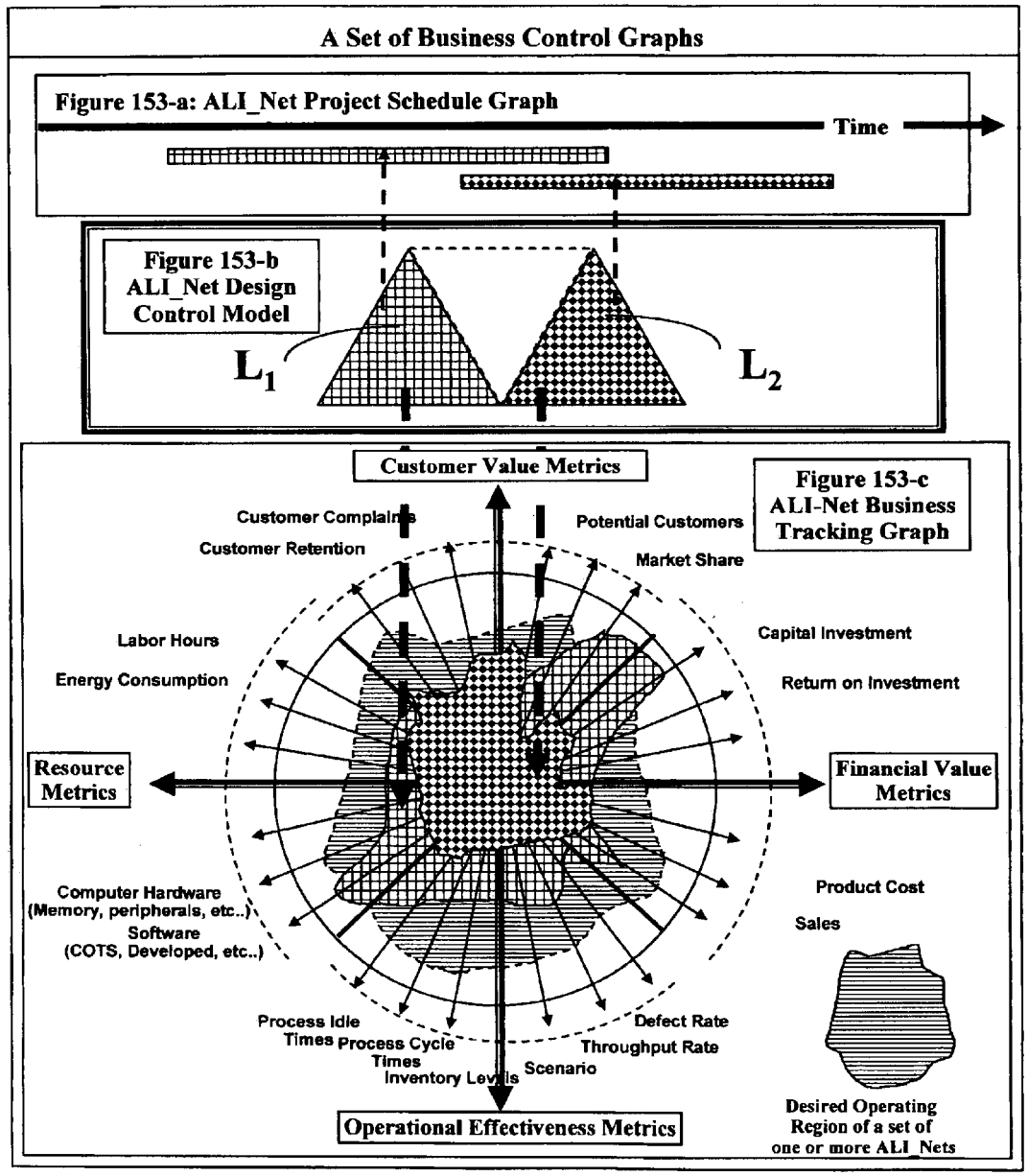
Figure 153: A Set of Business Control Graphs

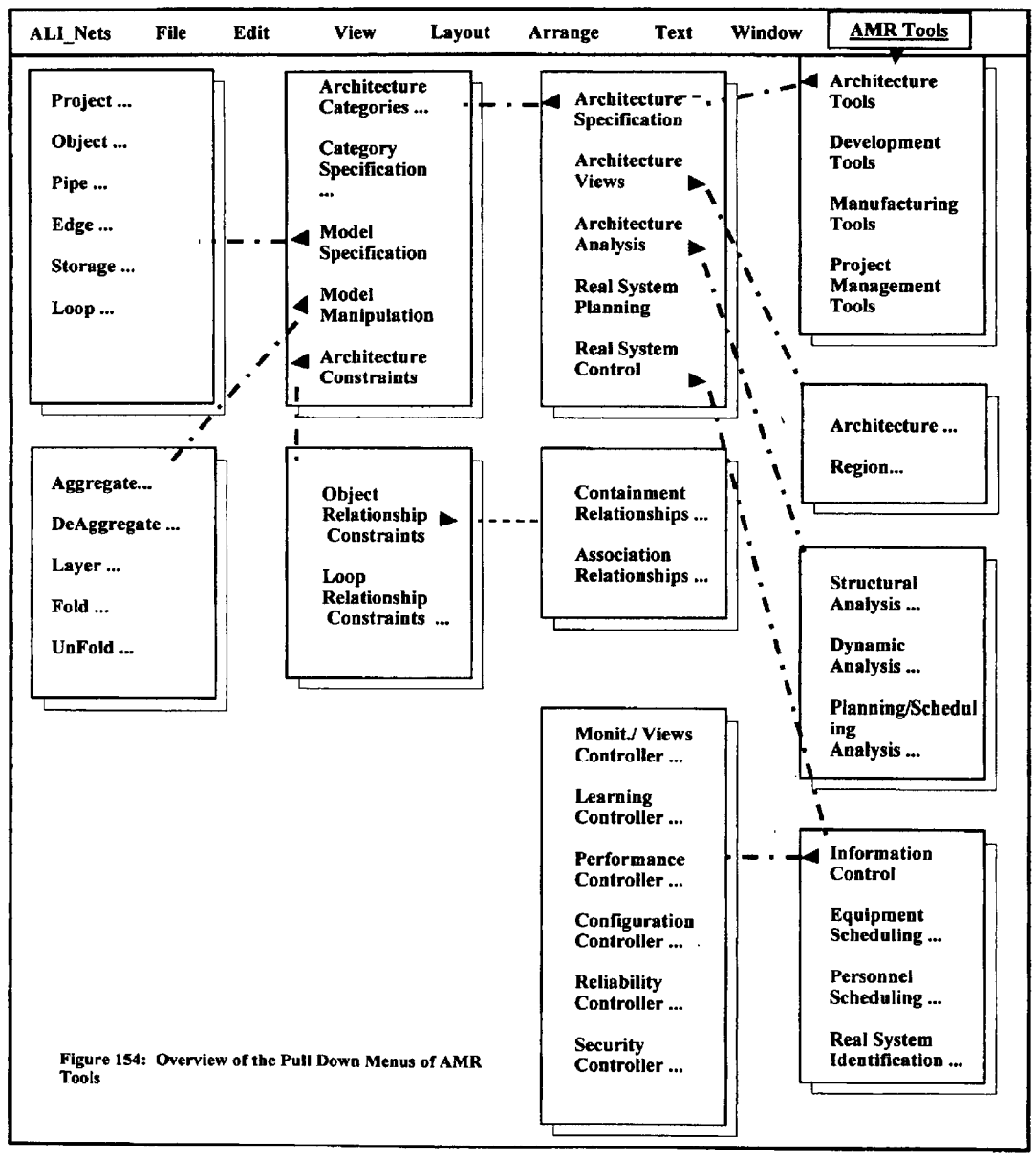
Figure 154: Overview of the Pull Down Menus of AMR Tools

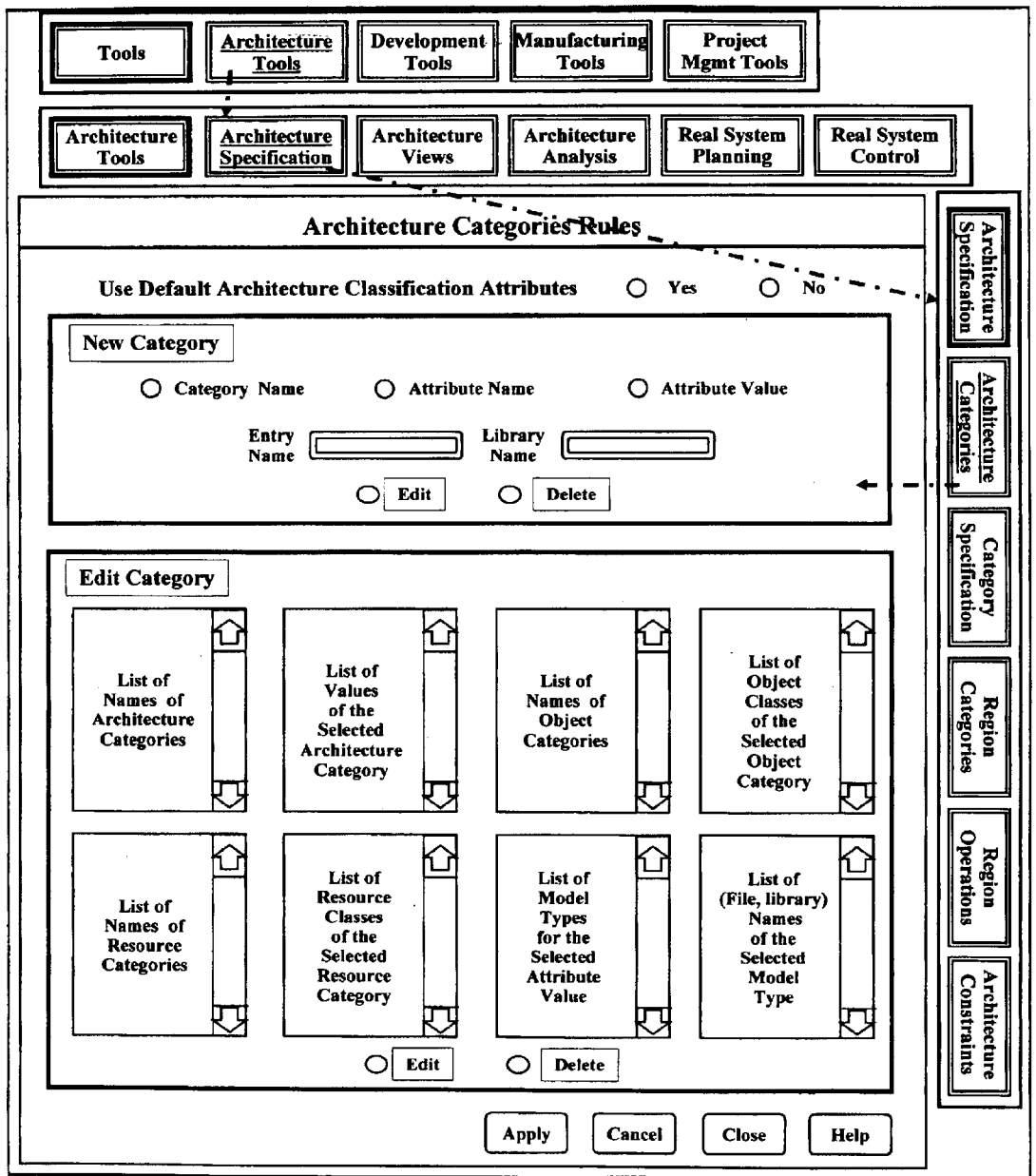
Figure 155: Architecture Categories Rules

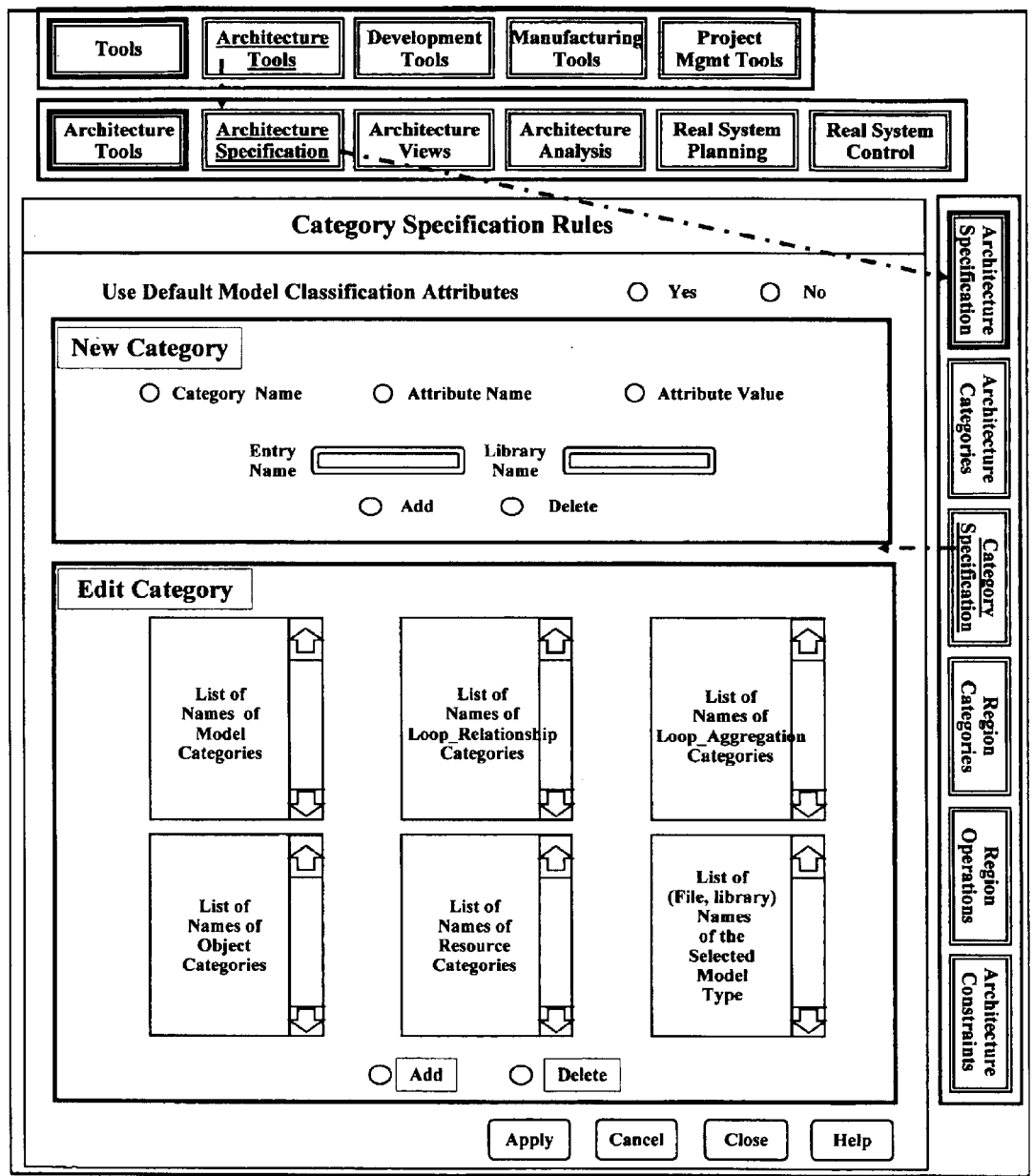
Figure 156: Category Specification Rules

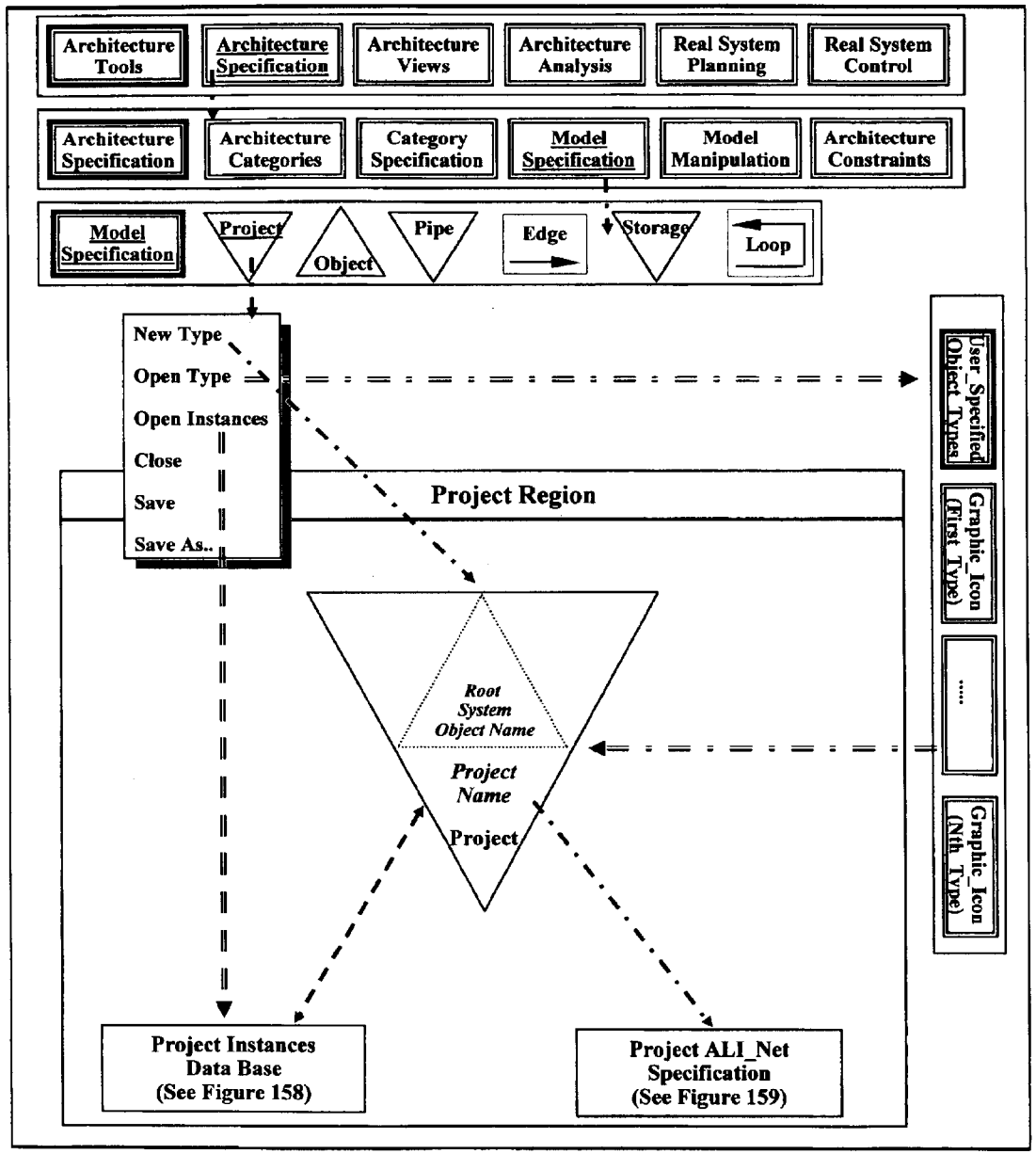
Figure 157: Project Region

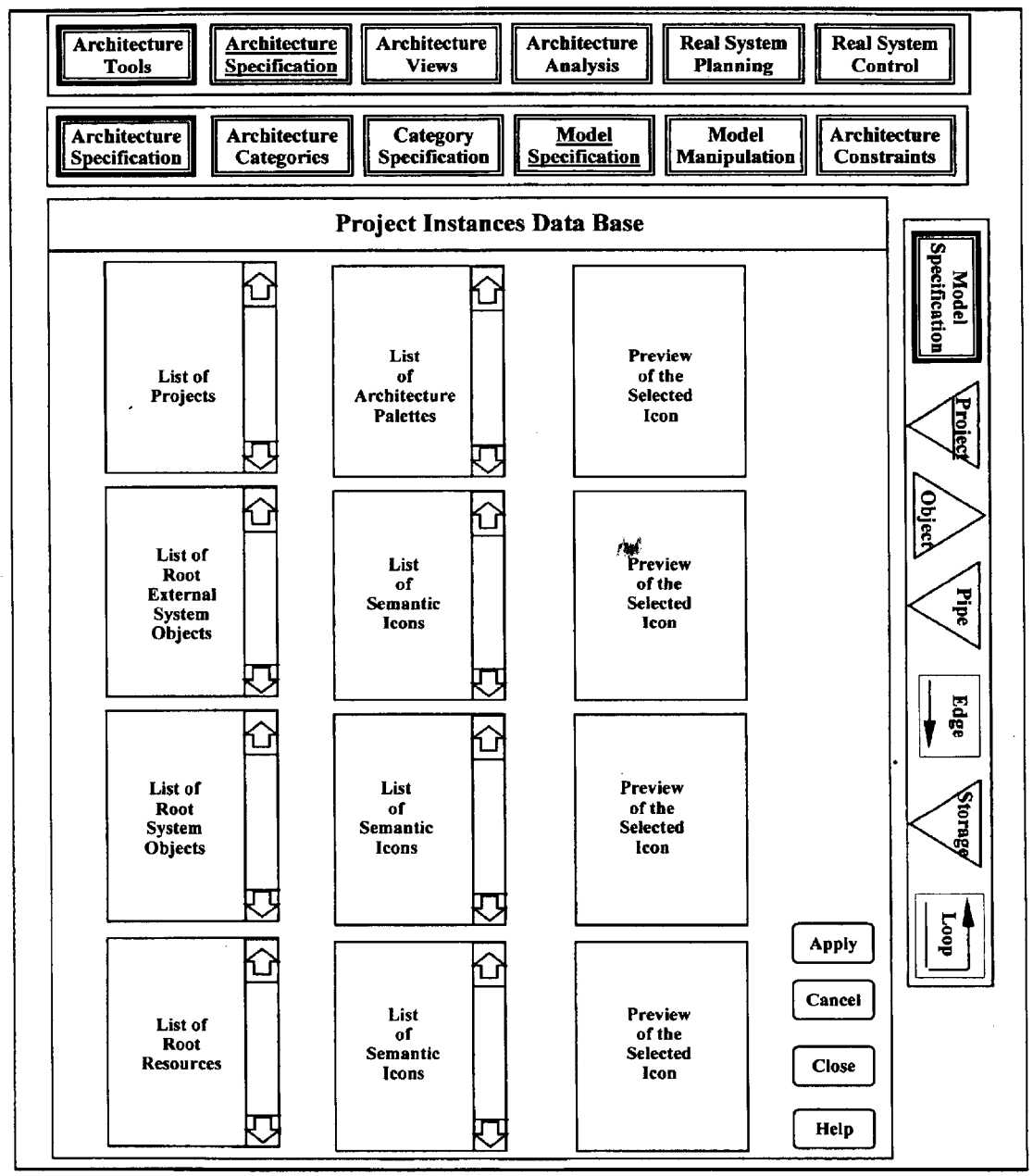
Figure 158: Project Instances Data Base

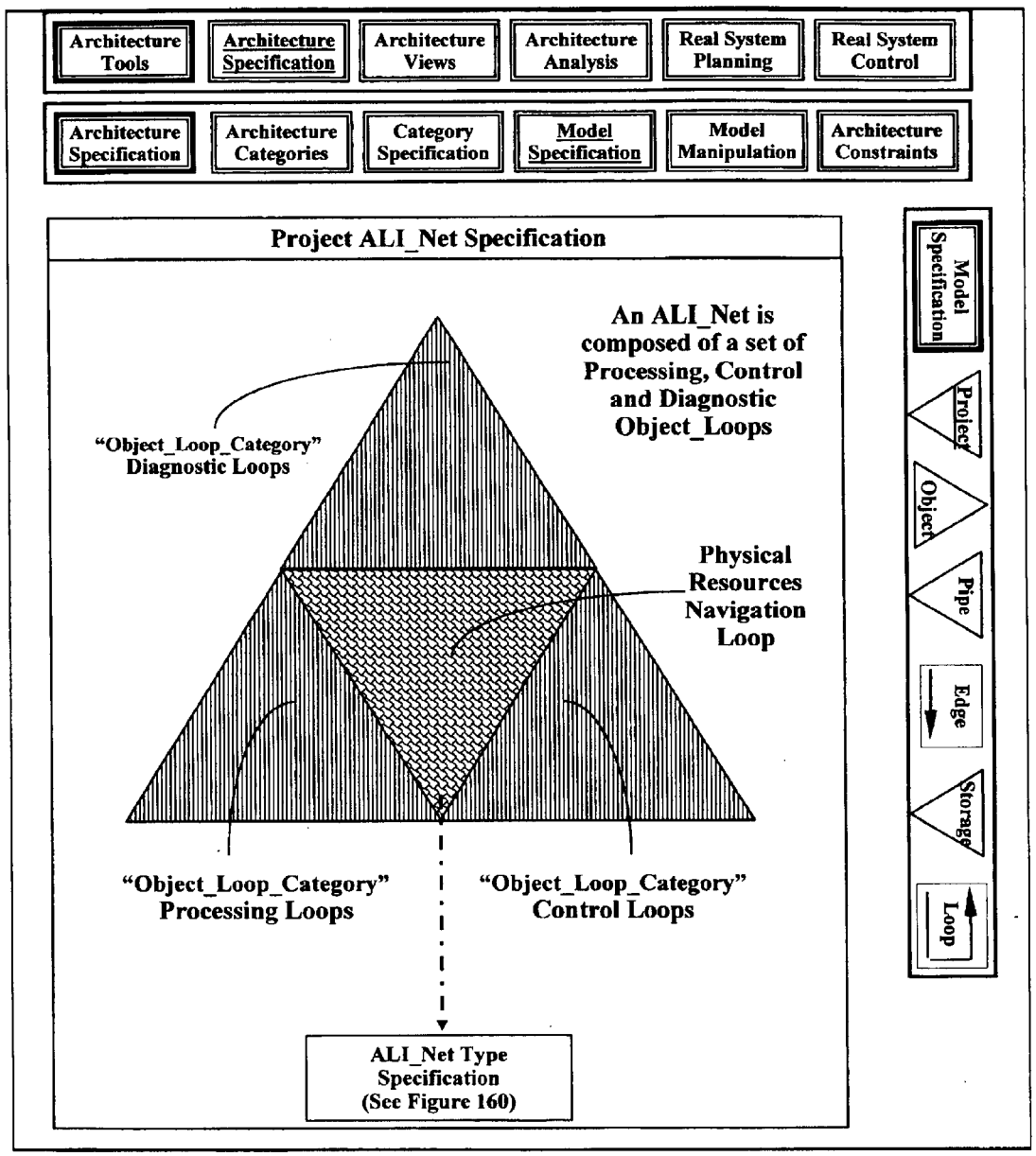
Figure 159: Project ALI_Net Specification

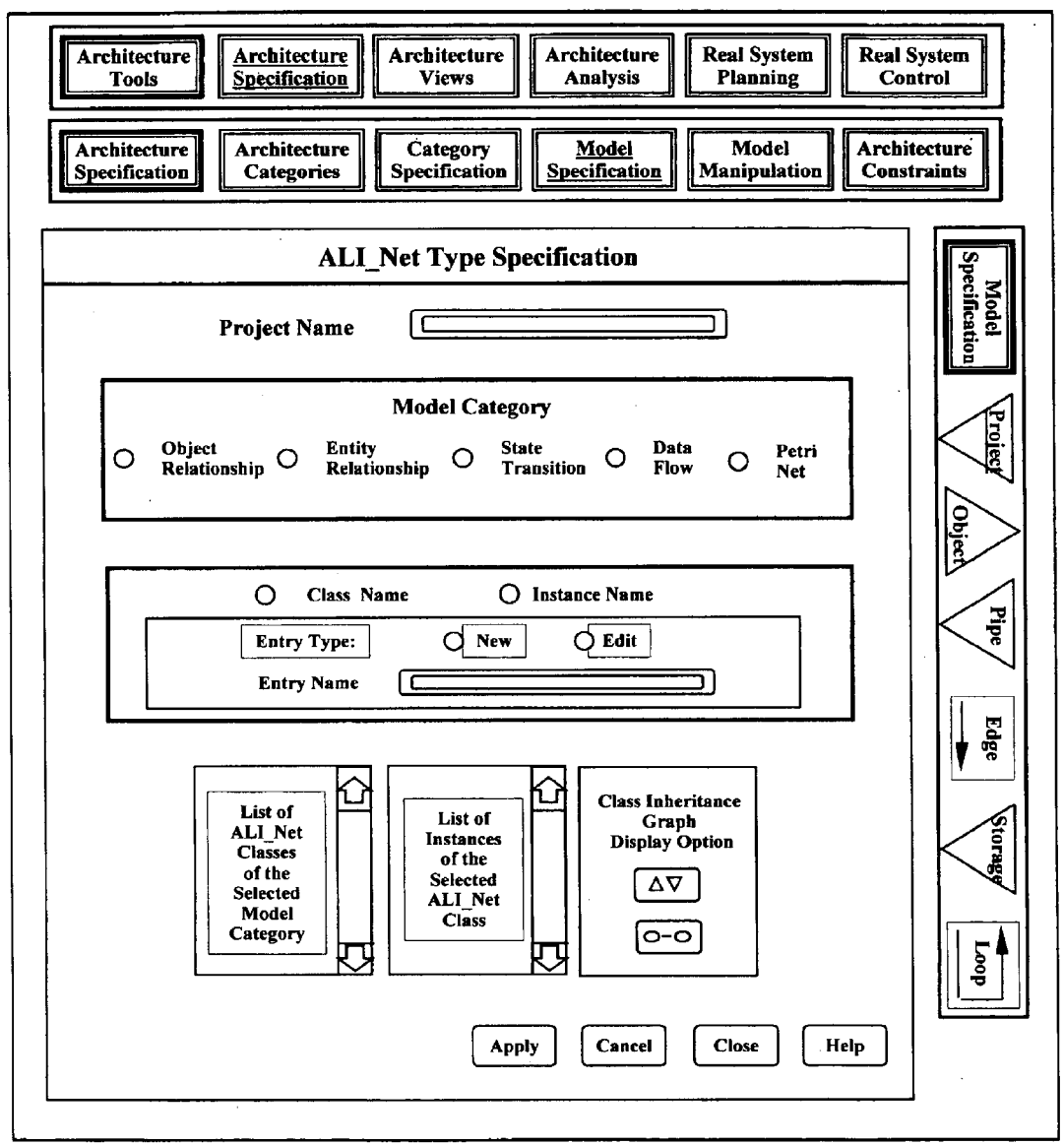
Figure 160: ALI_Net Type Specification

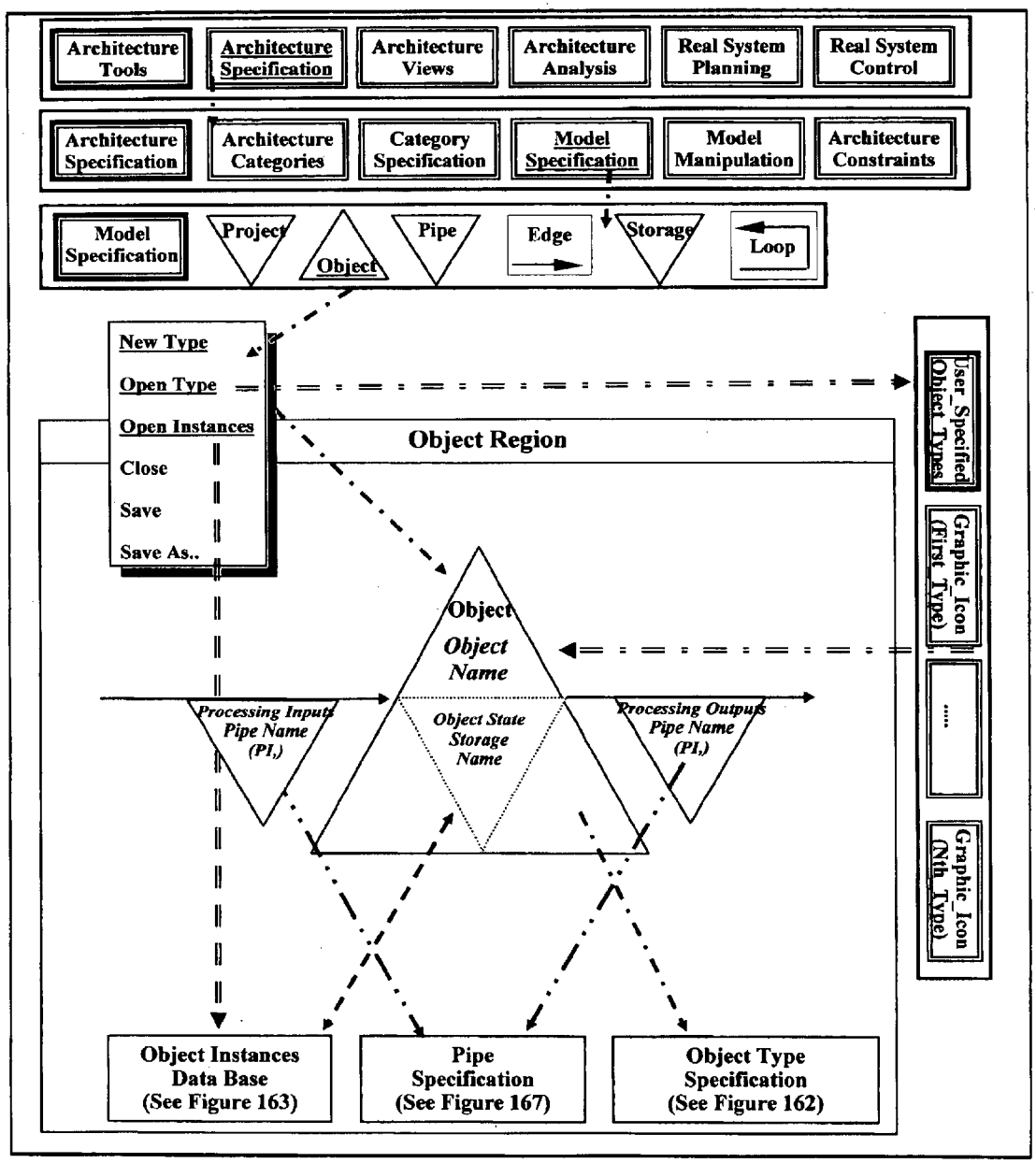
Figure 161: Object Region

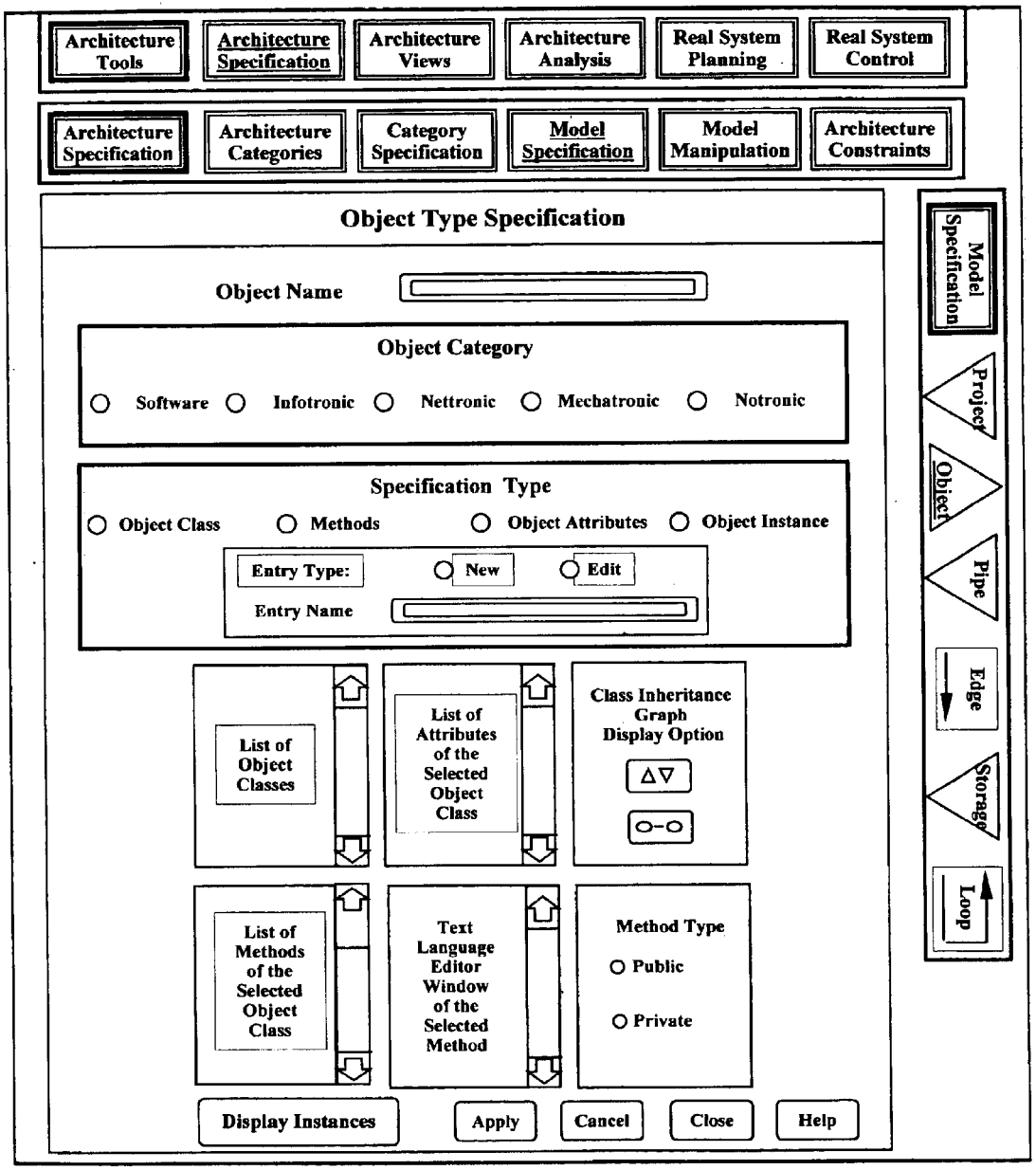
Figure 162: Object Type Specification

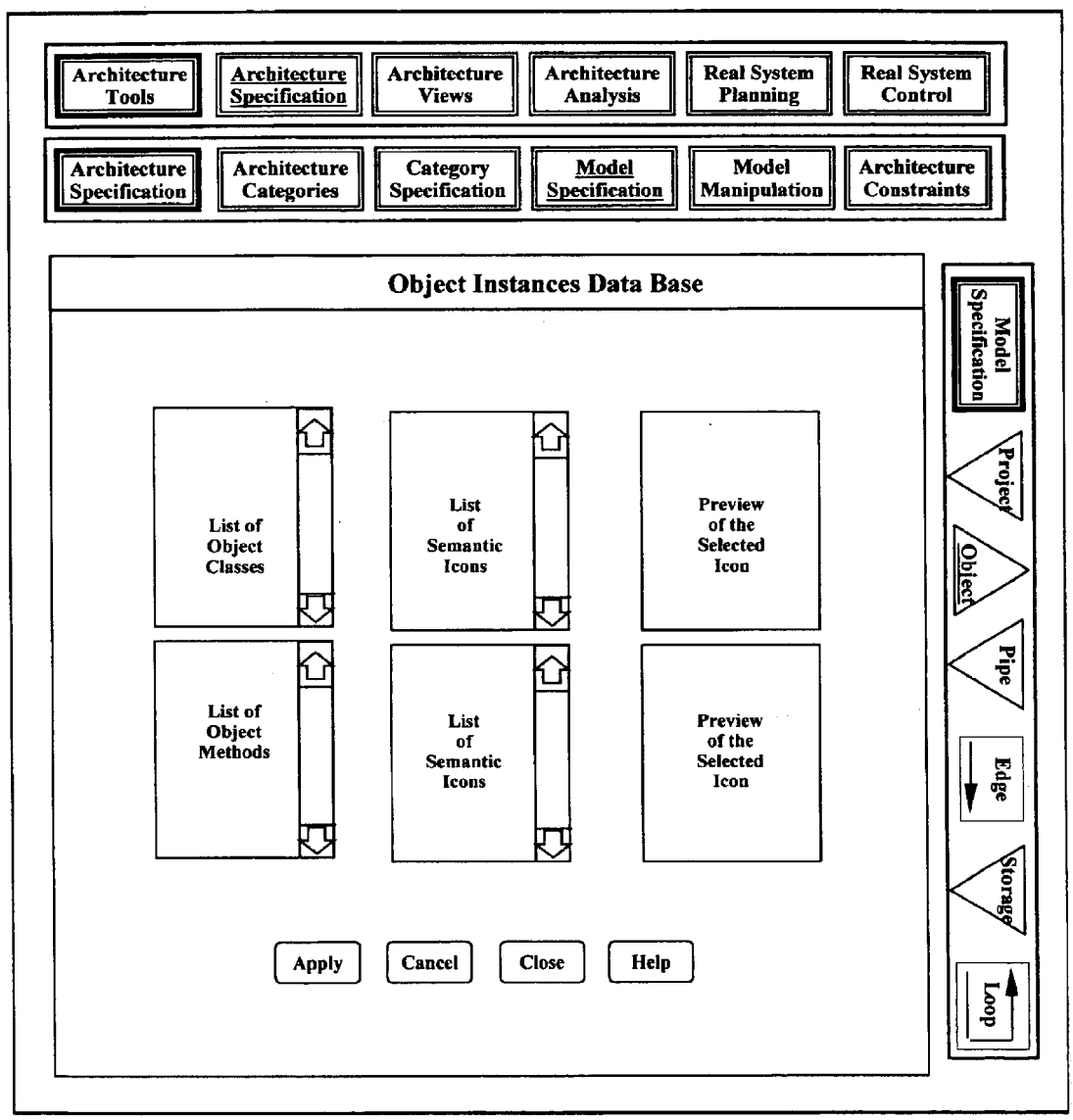
Figure 163: Object Instances Data Base

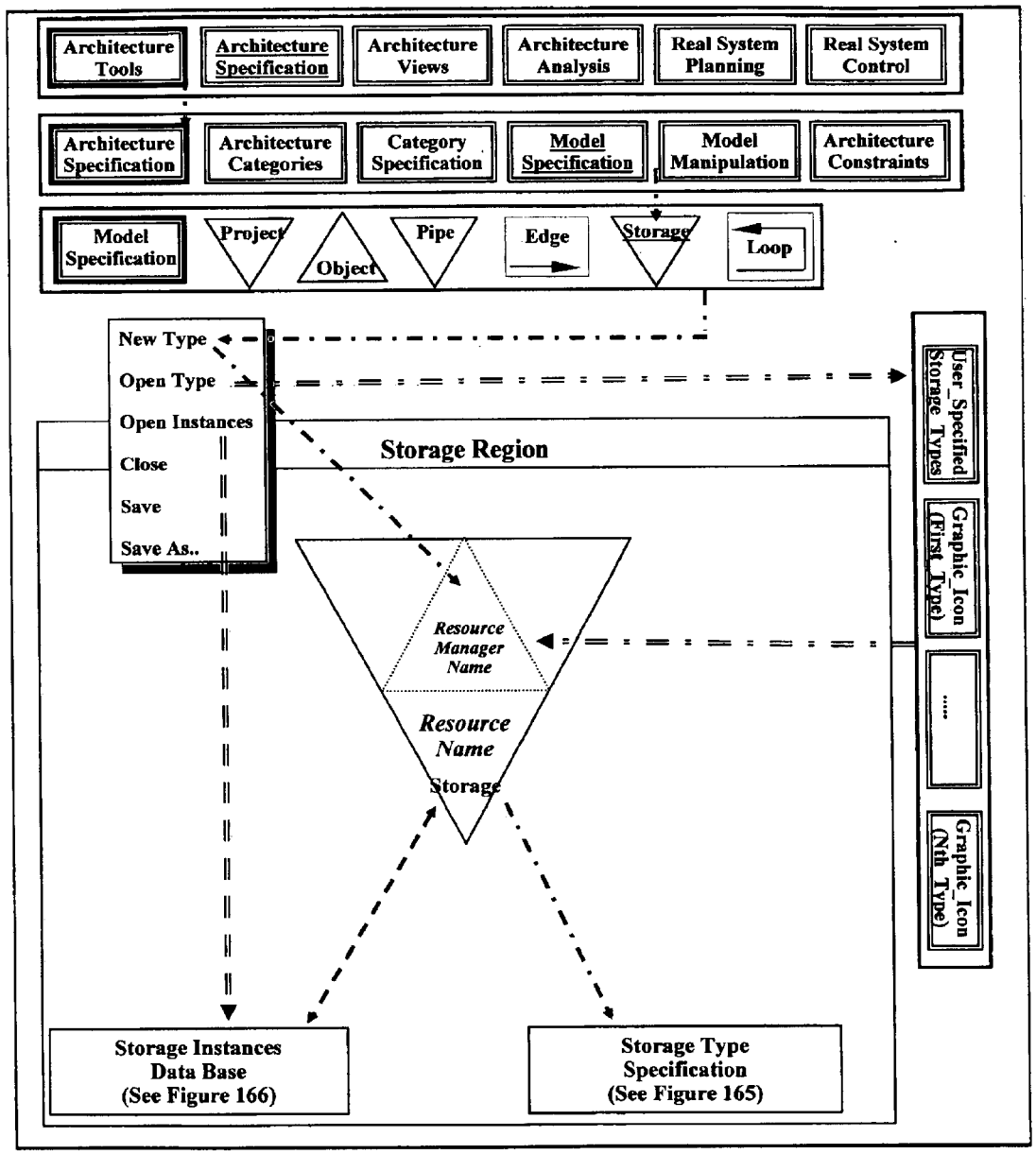
Figure 164: Storage Region

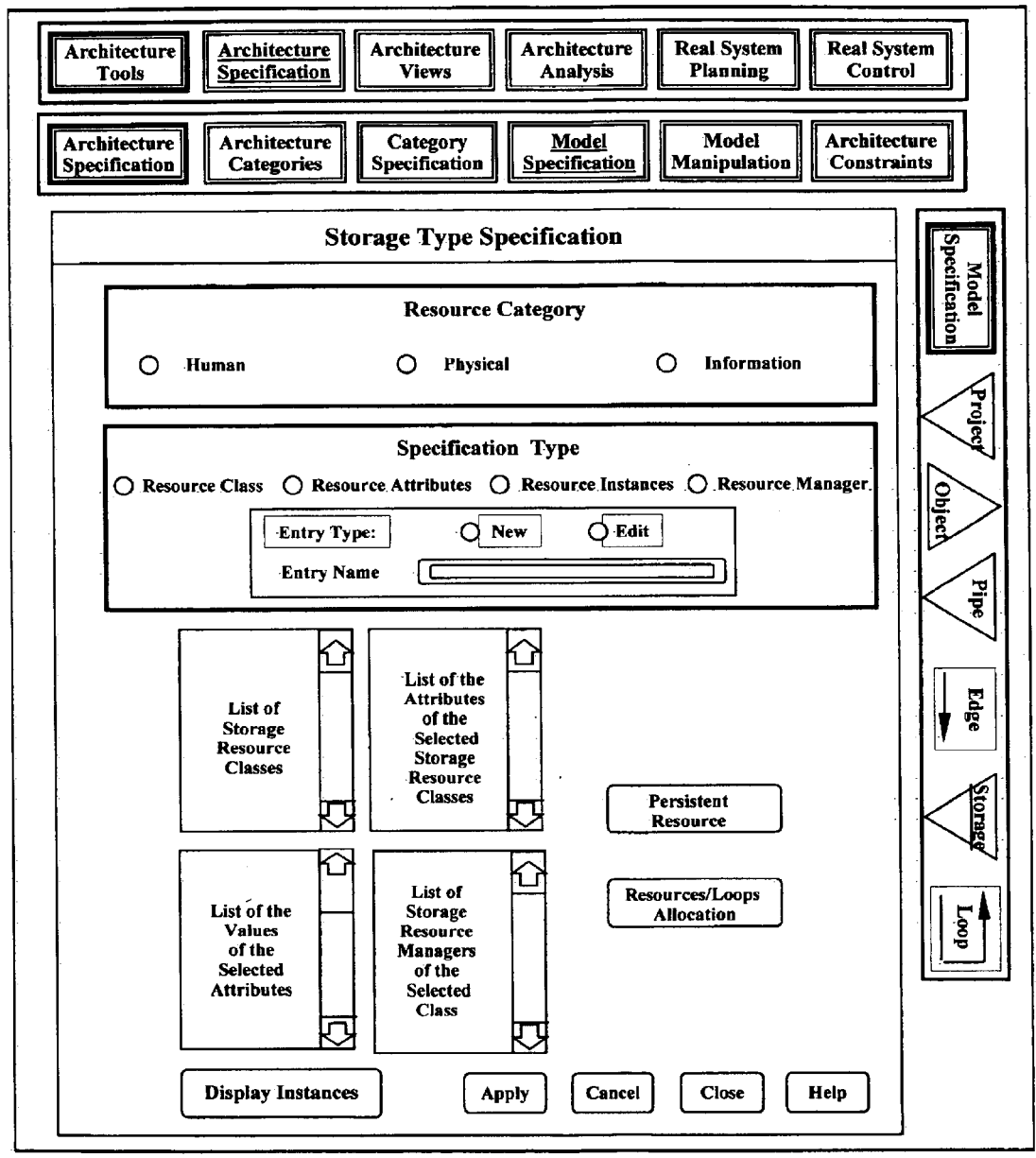
Figure 165: Storage Type Specification

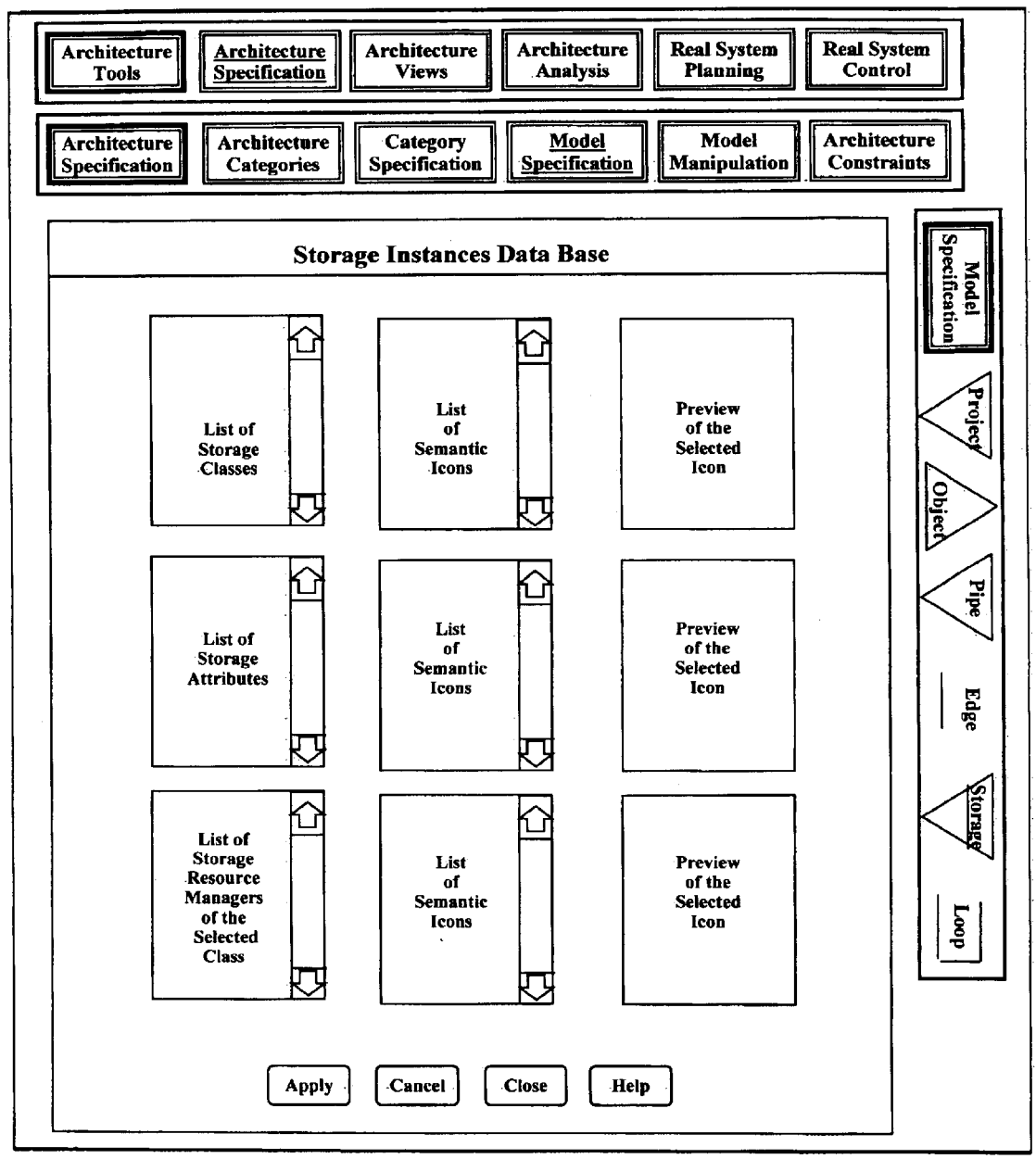
Figure 166: Storage Instances Data Base

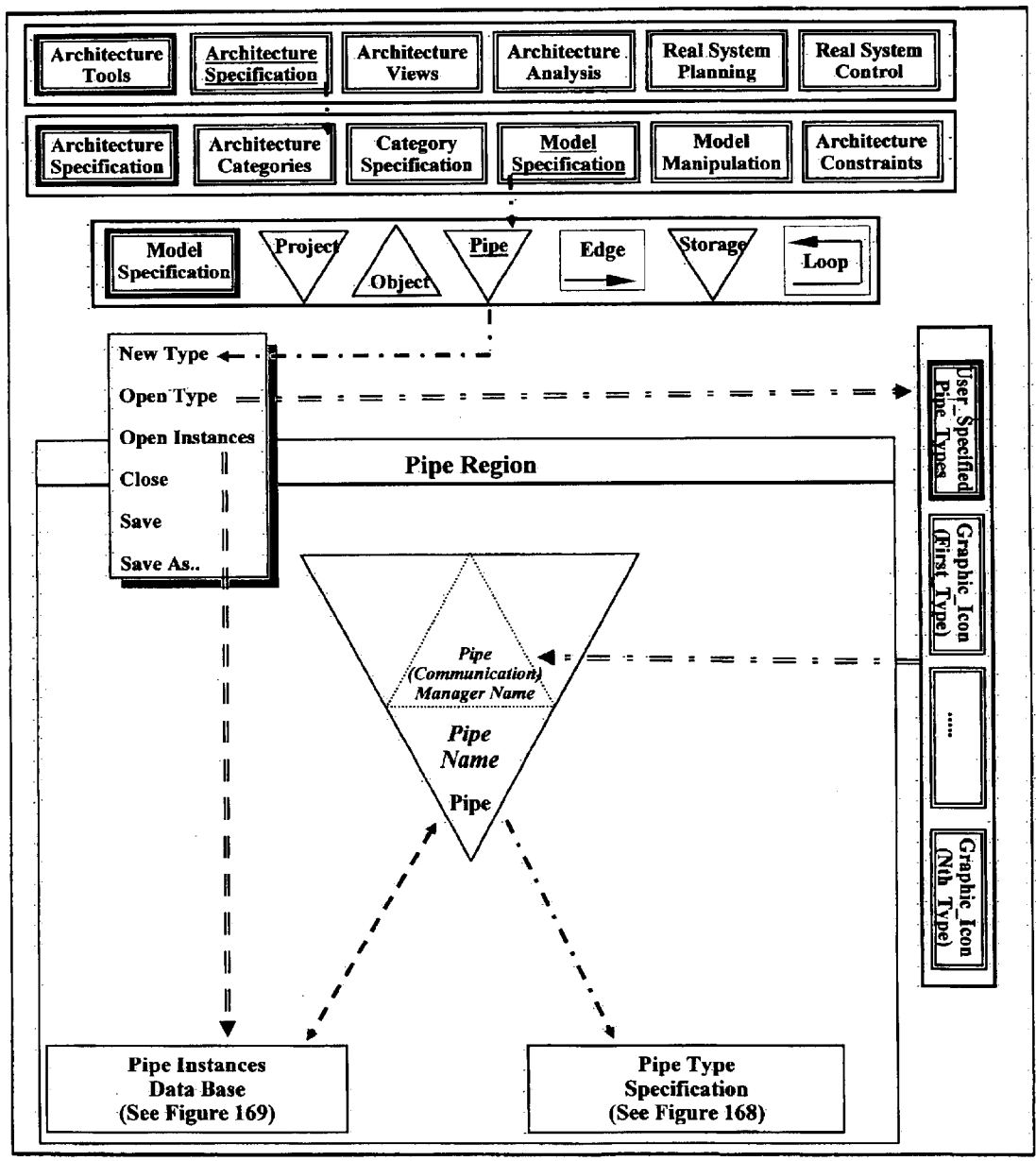
Figure 167: Pipe Region

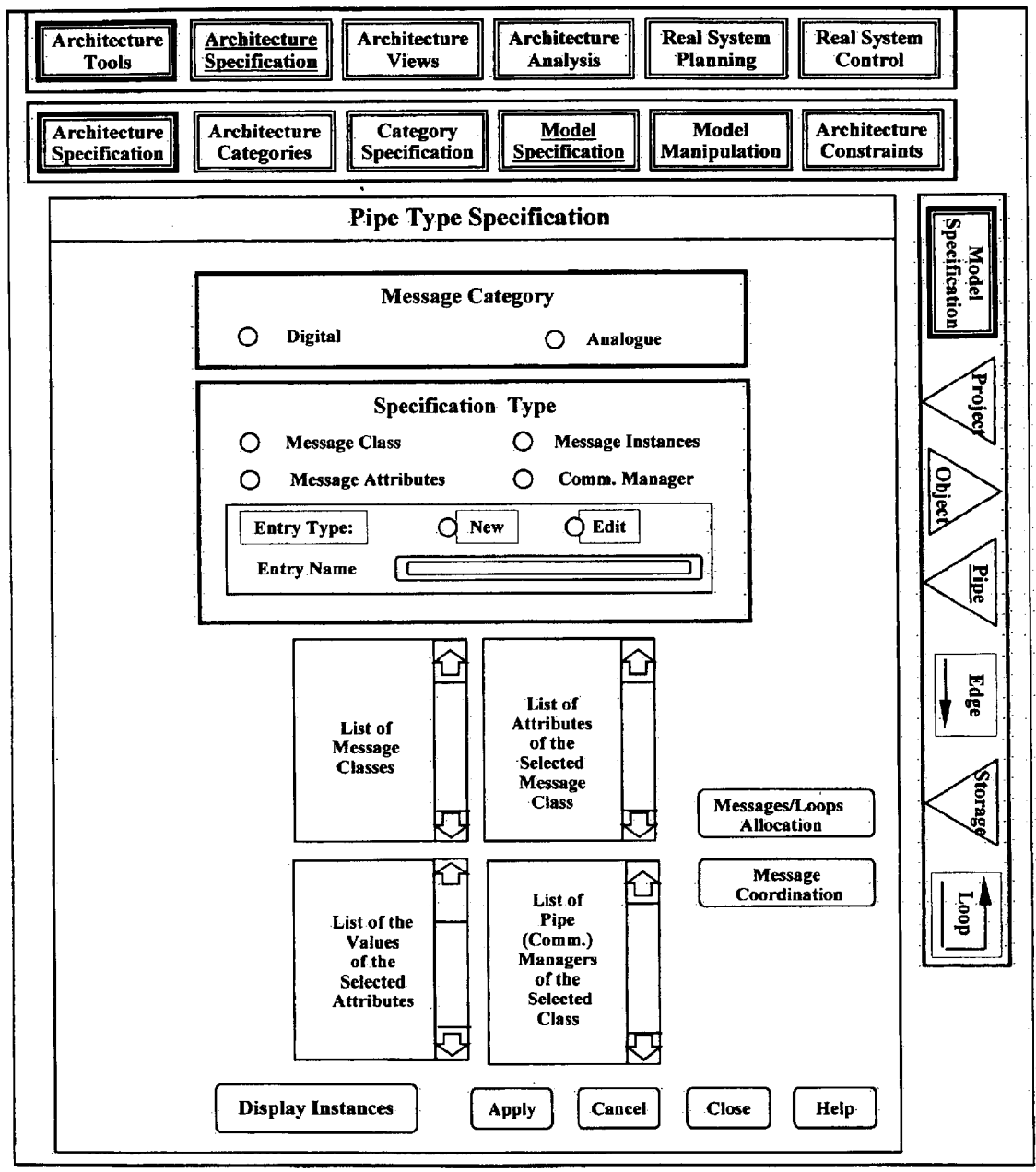
Figure 168: Pipe Type Specification

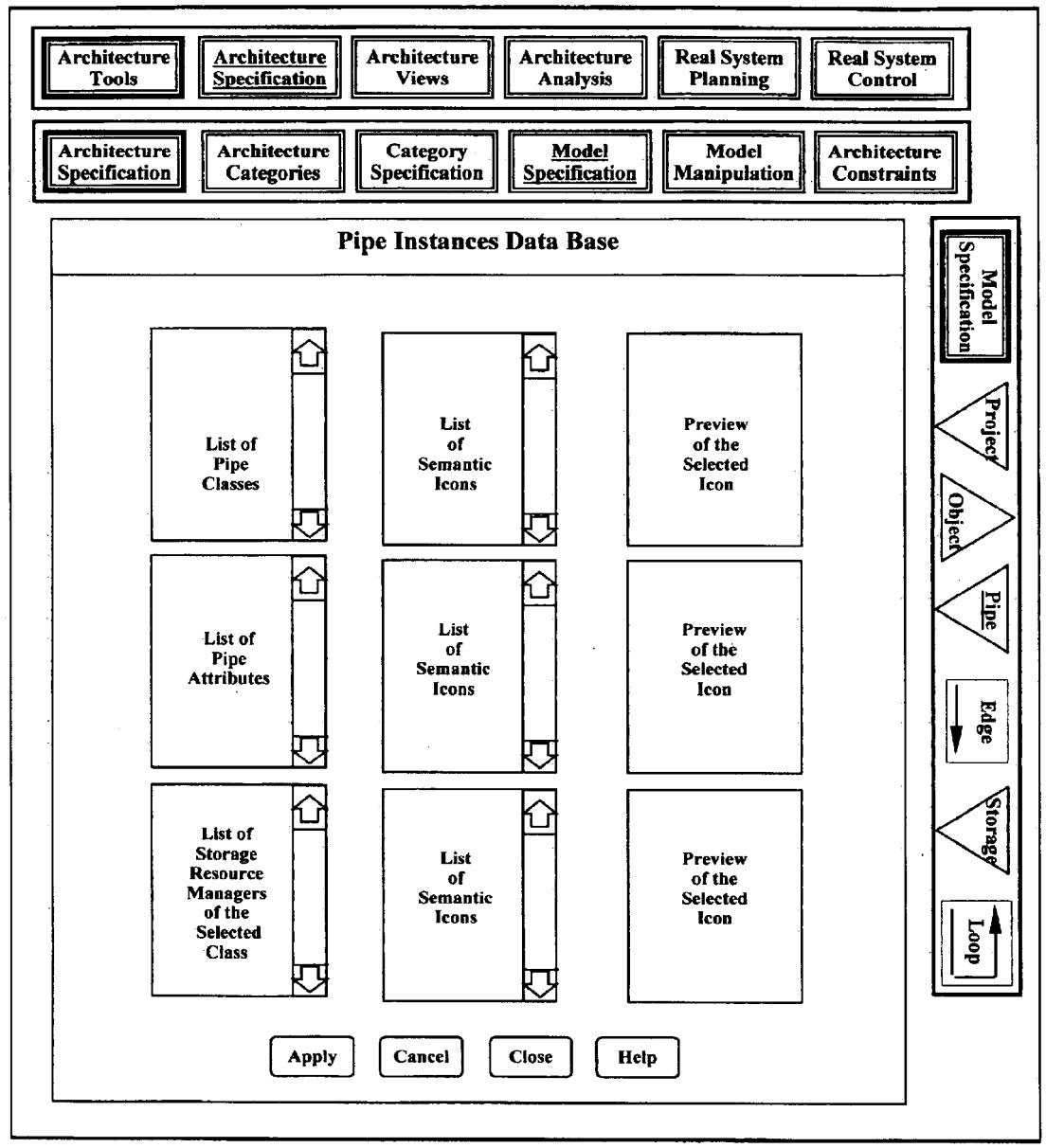
Figure 169: Pipe Instances Data Base

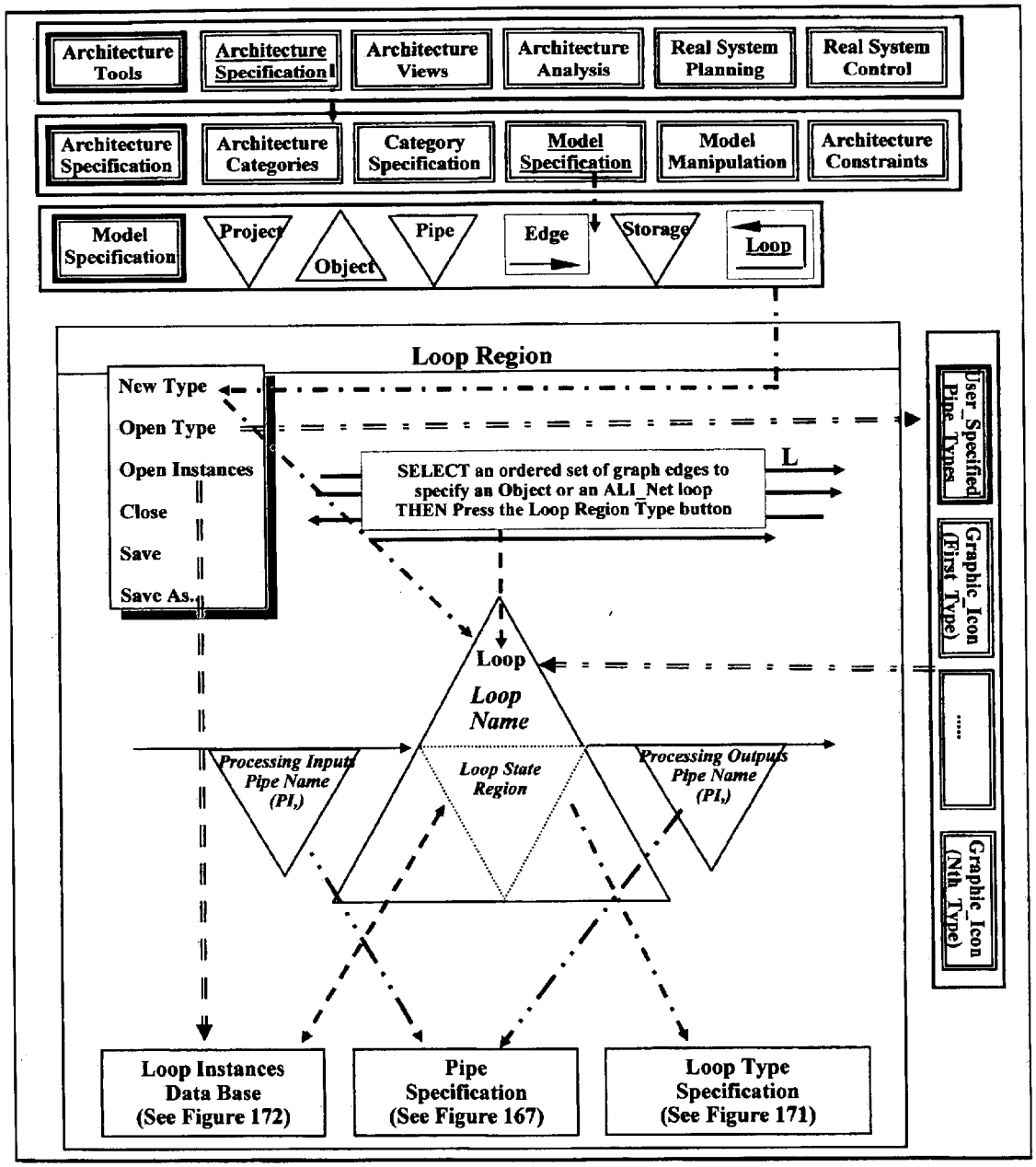
Figure 170: Loop Region

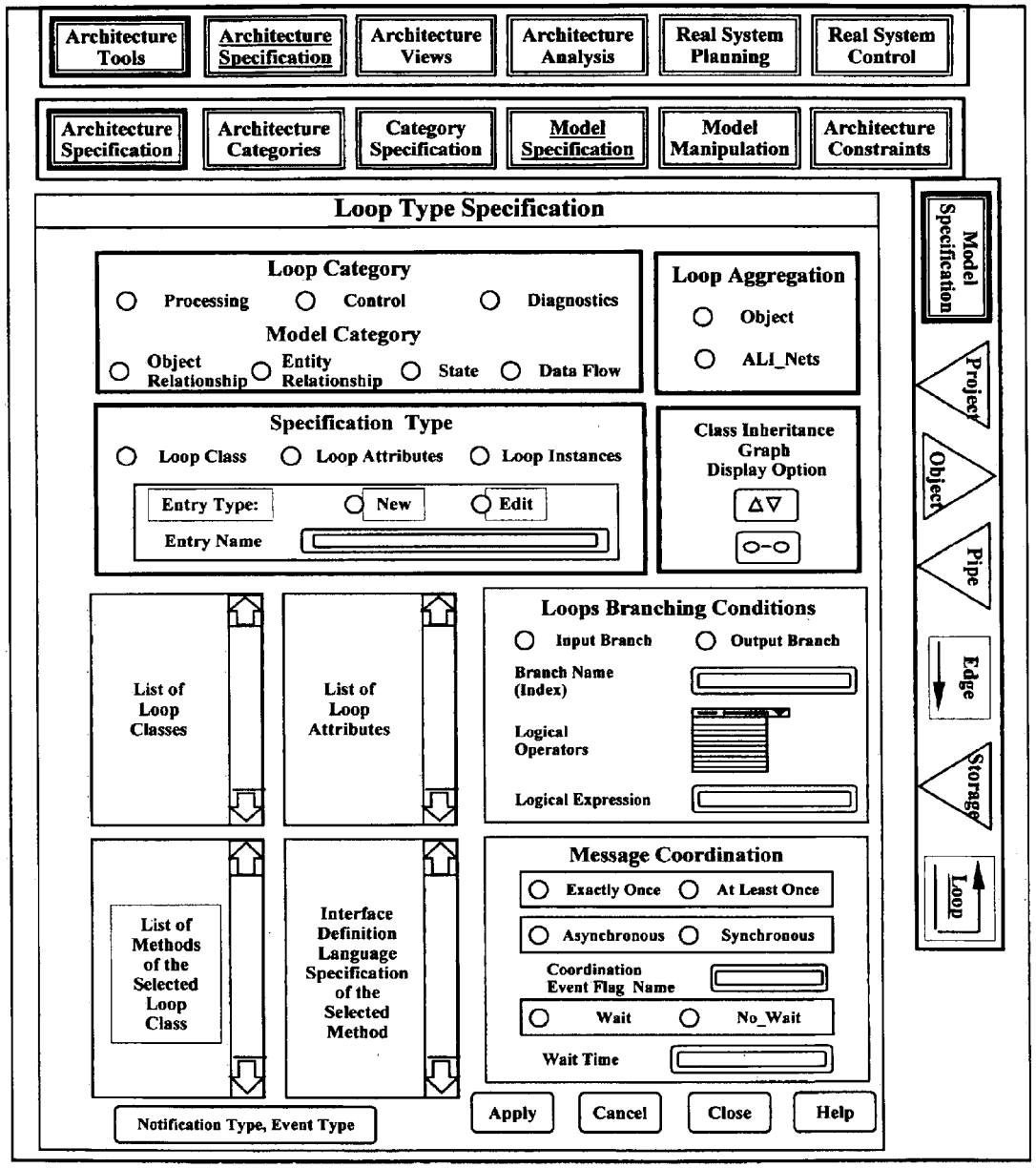
Figure 171: Loop Type Specification

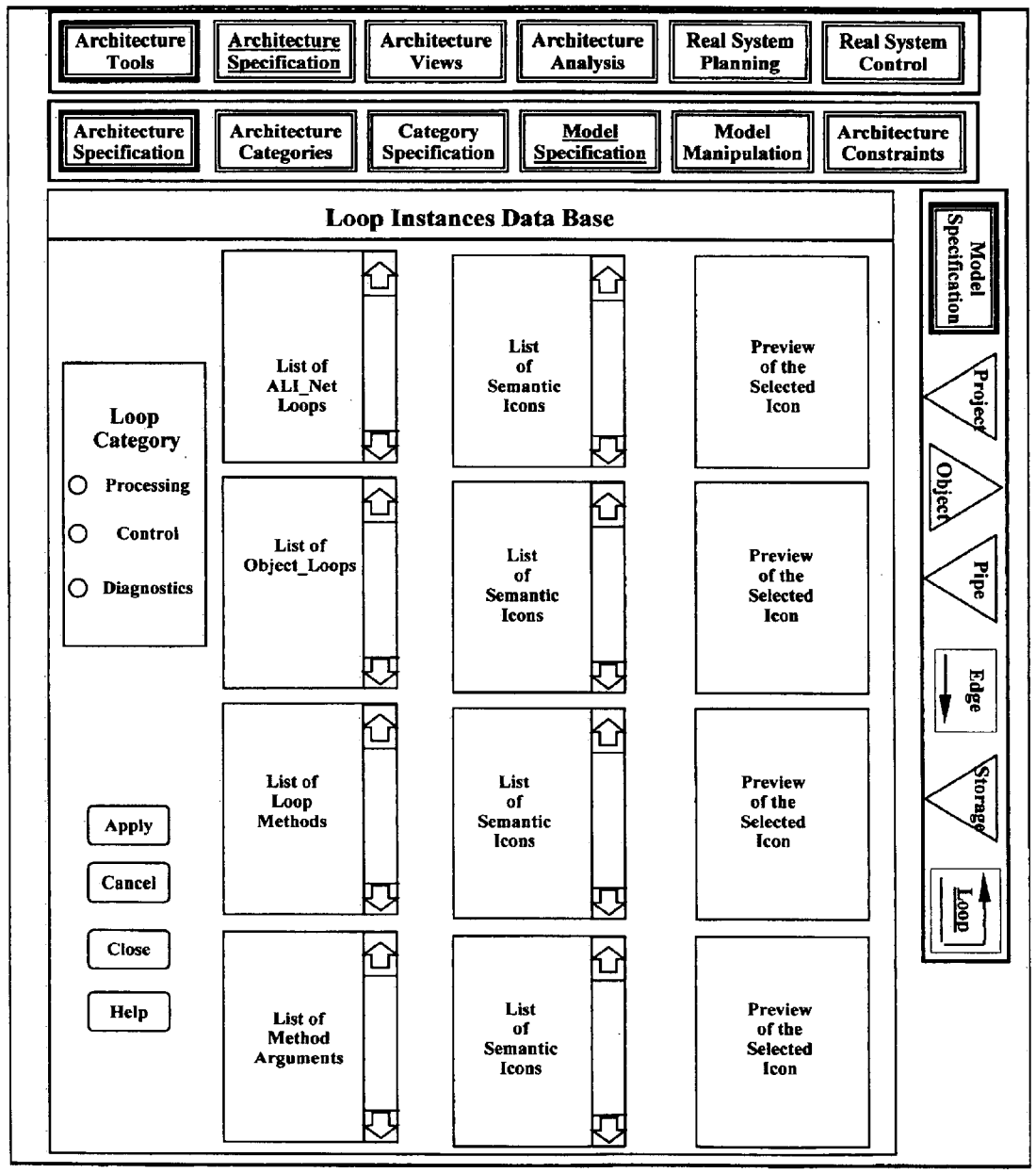
Figure 172: Loop Instances Data Base

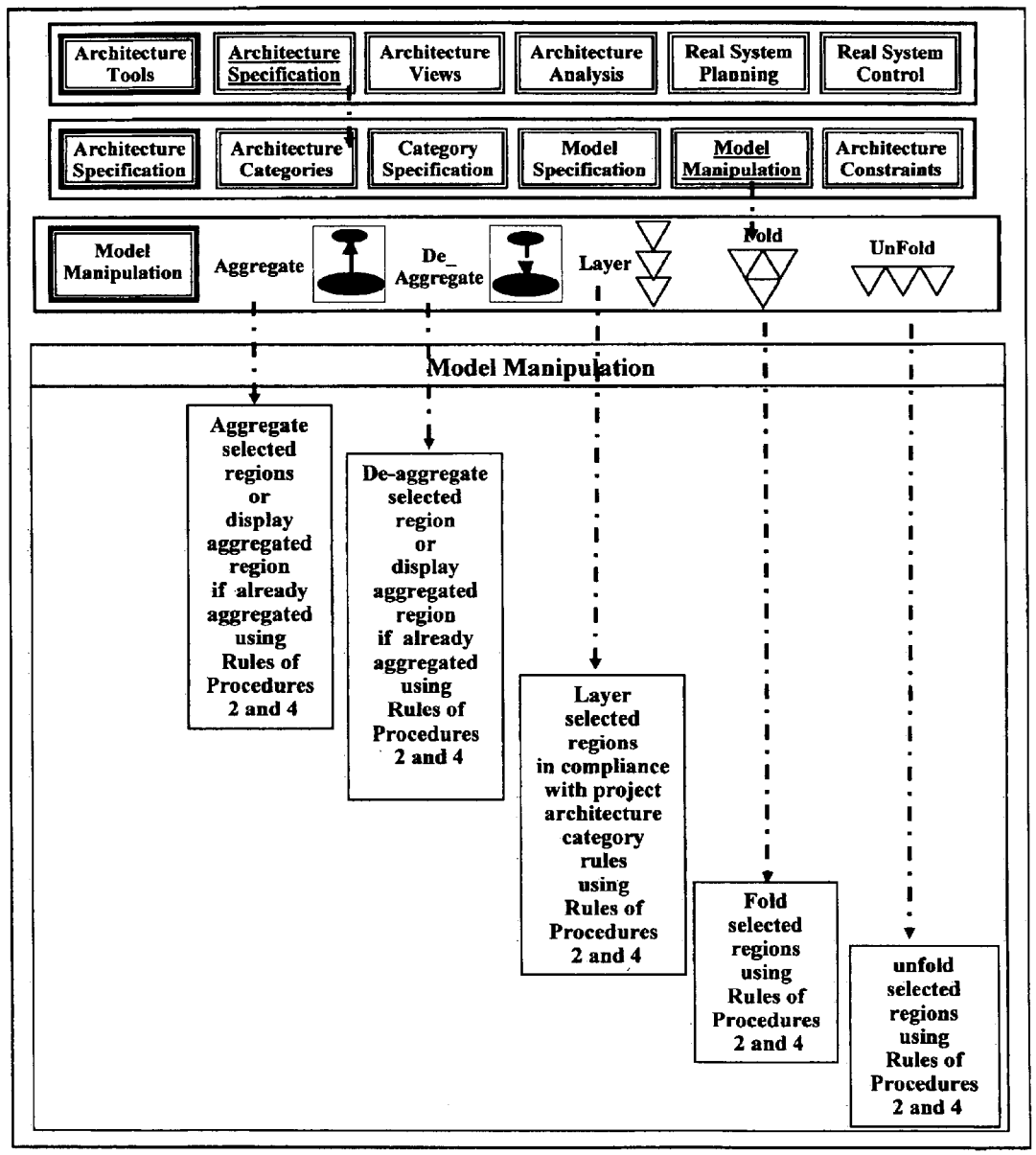
Figure 173: Model Manipulation

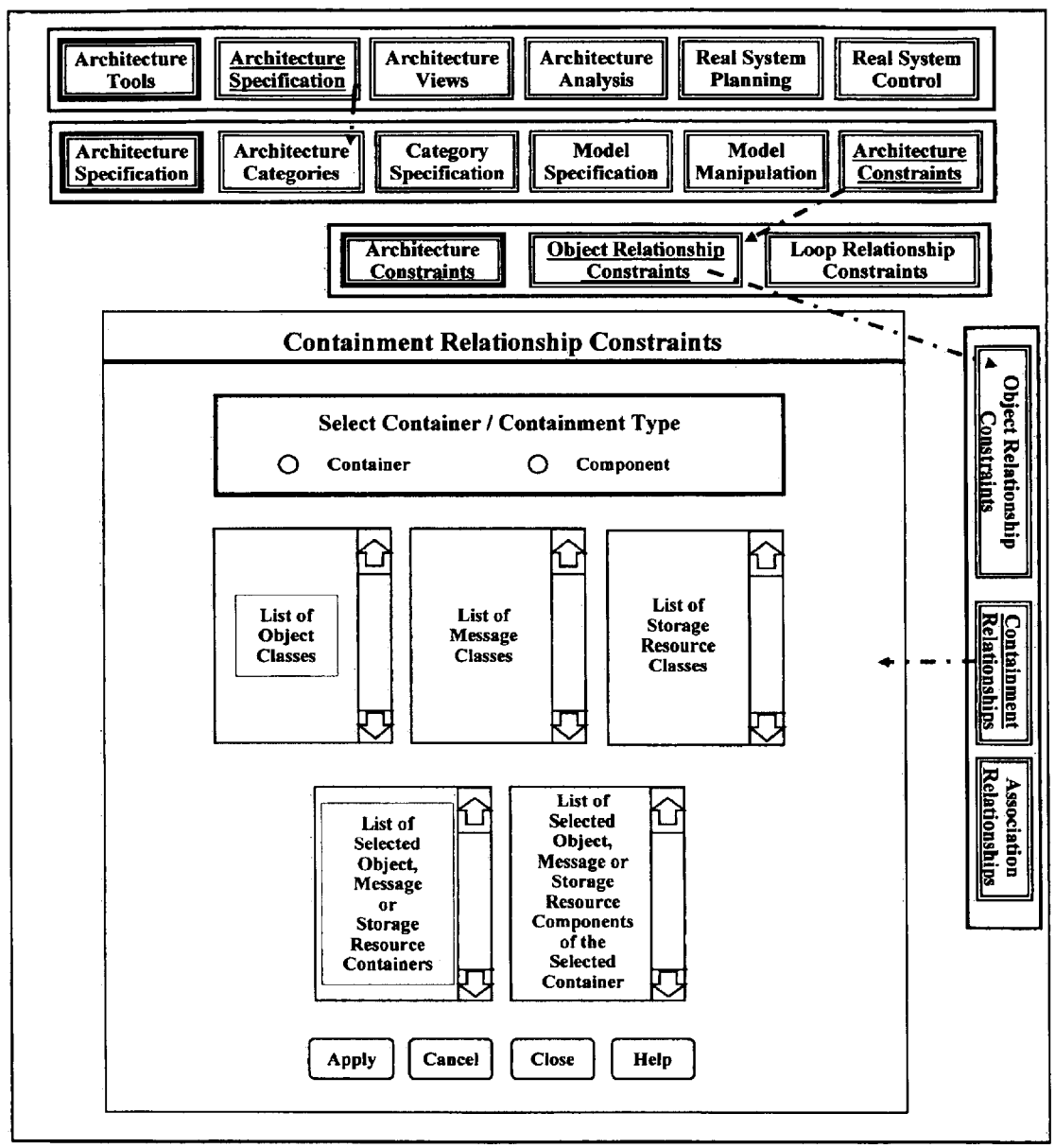
Figure 174: Containment Relationship Constraints

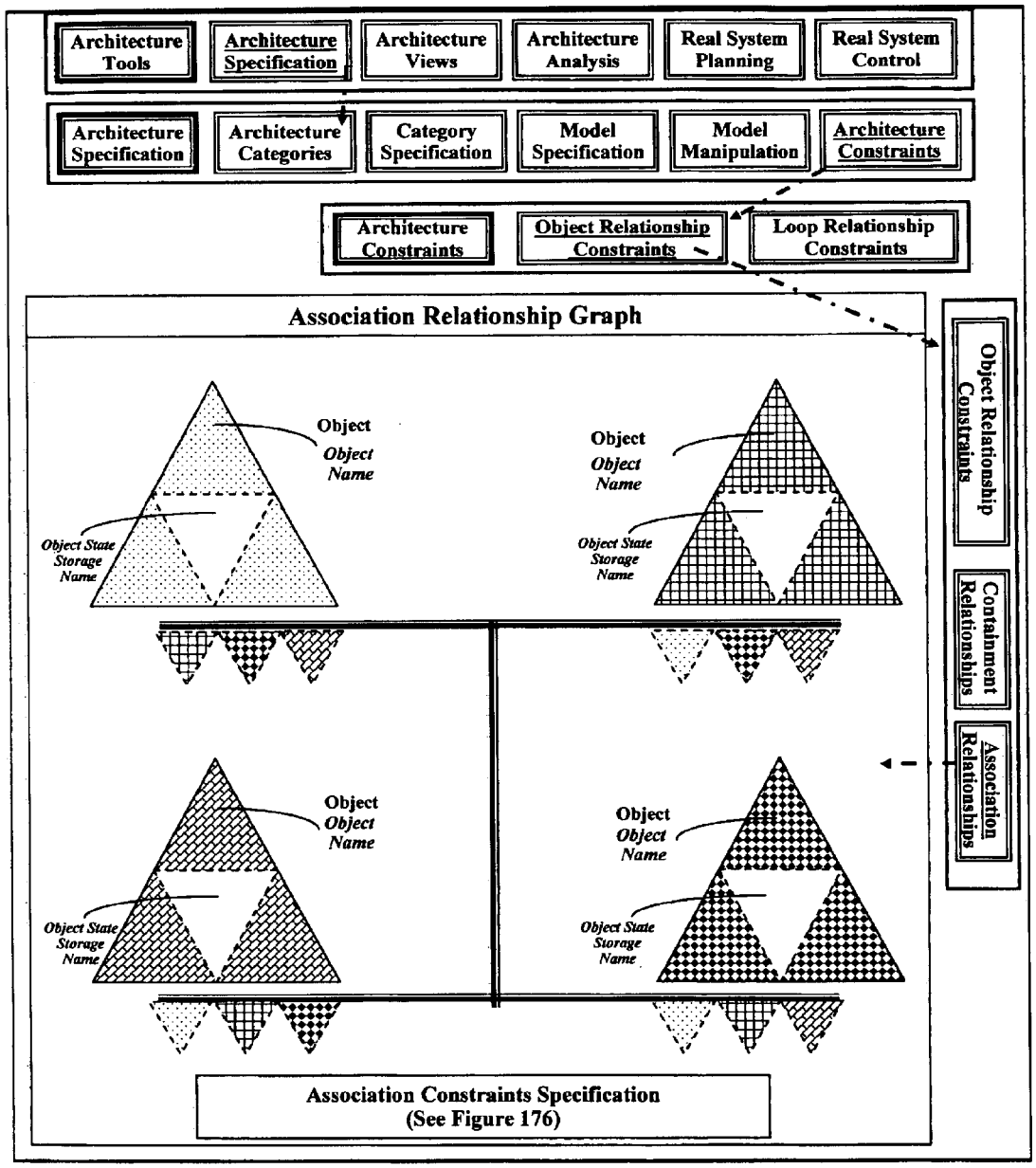
Figure 175: Association Relationship Graph

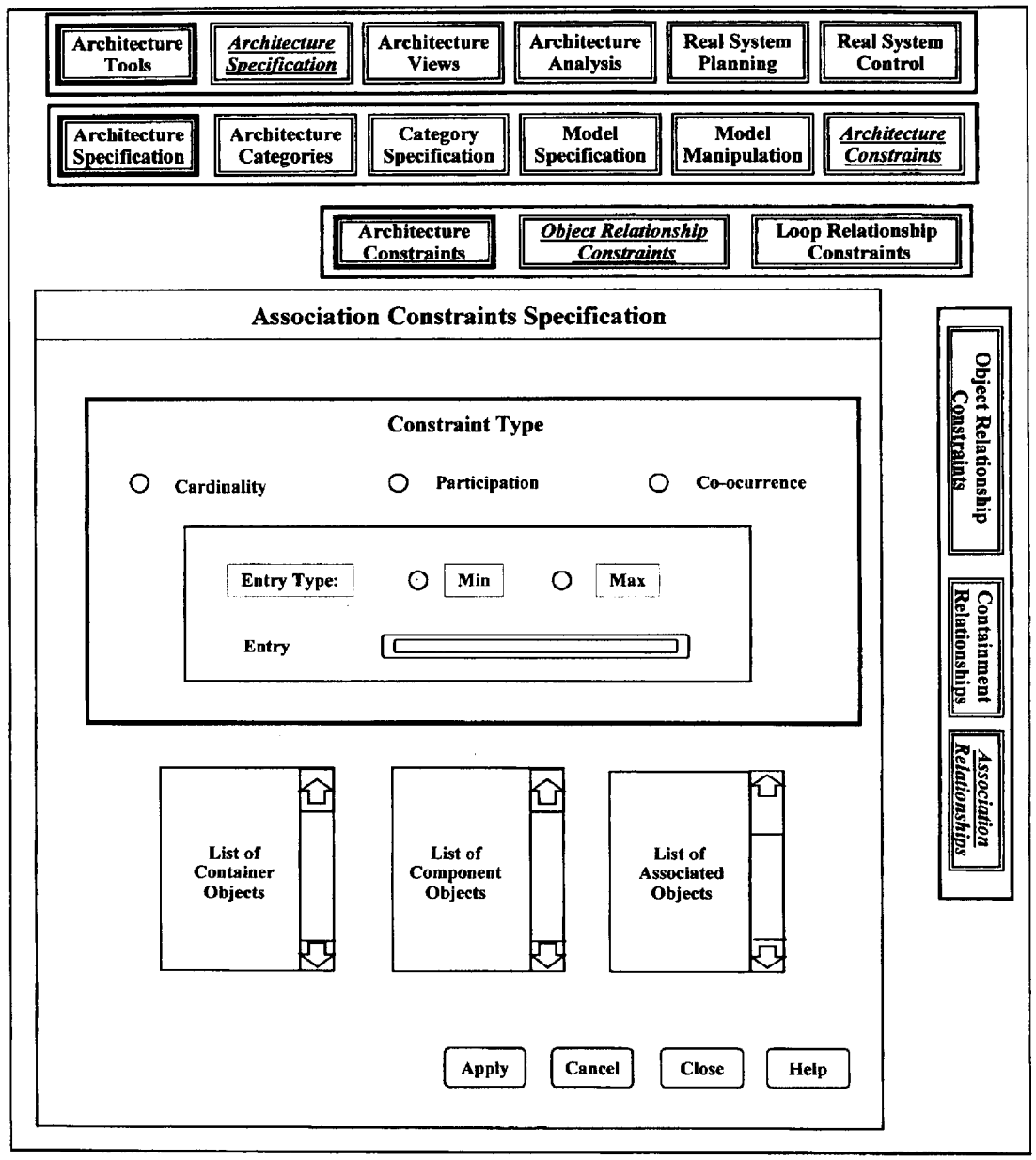
Figure 176: Association Constraints Specification

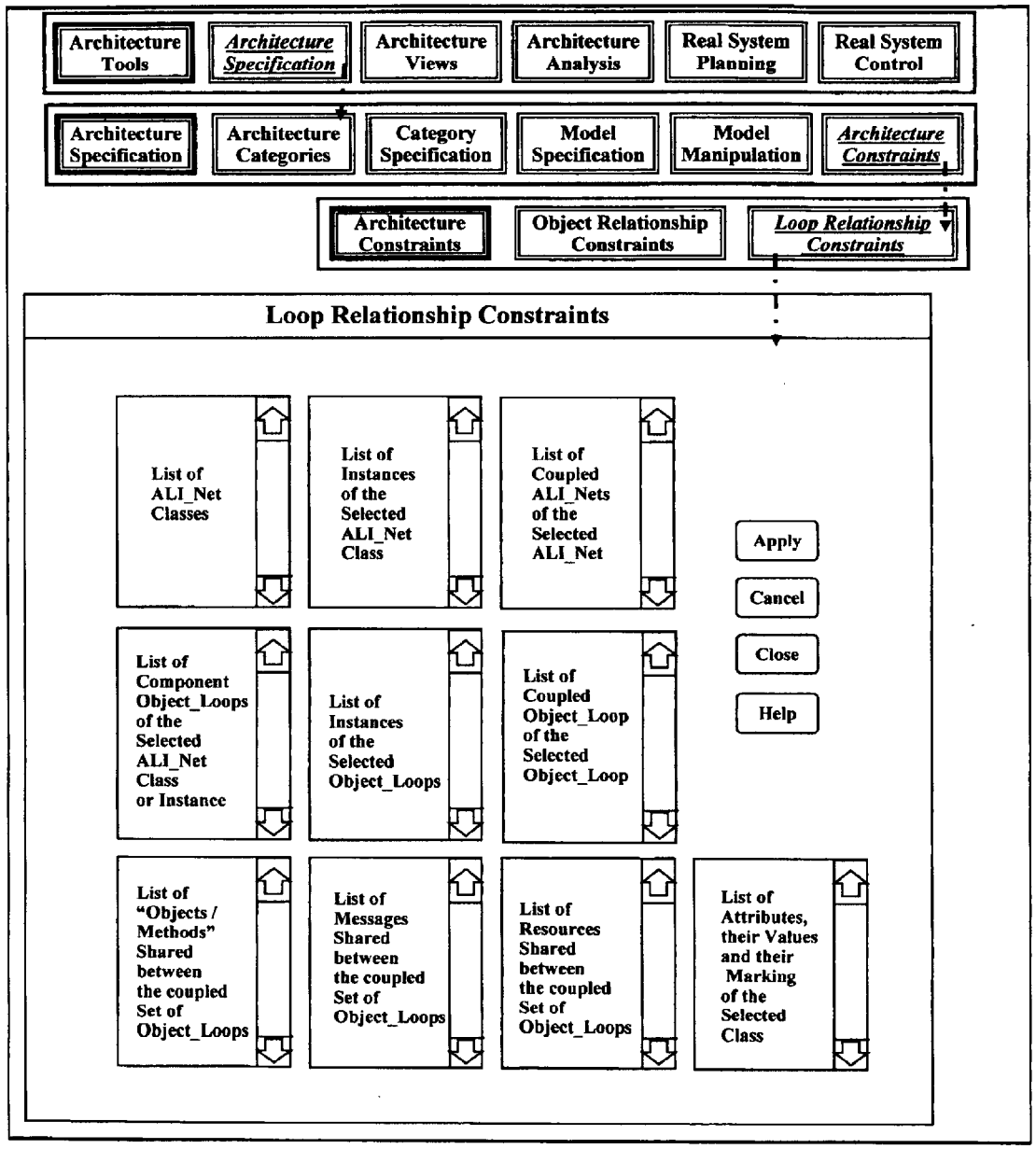
Figure 177: Loop Relationship Constraints

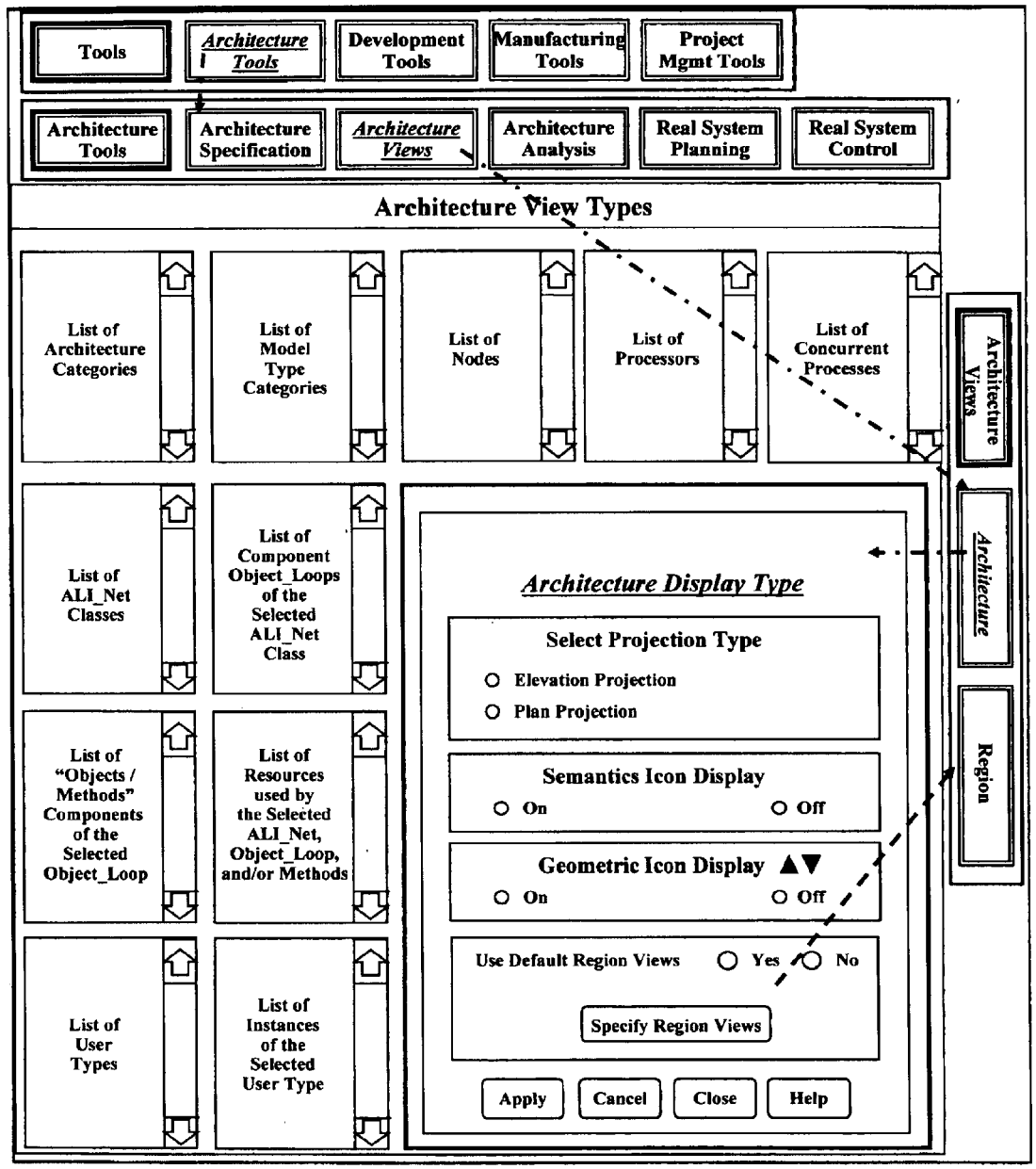
Figure 178: Architecture View Types

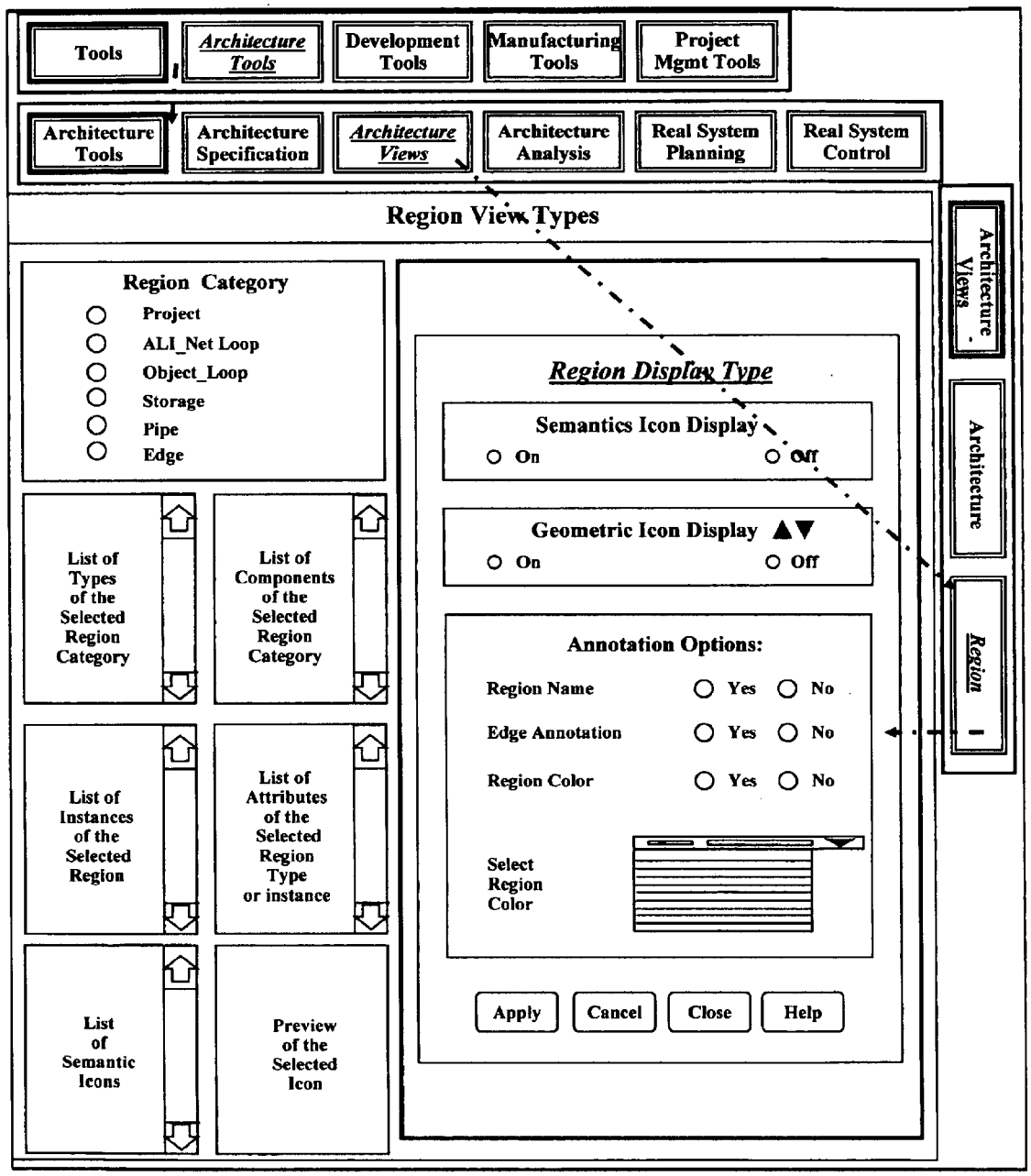
Figure 179: Region View Types

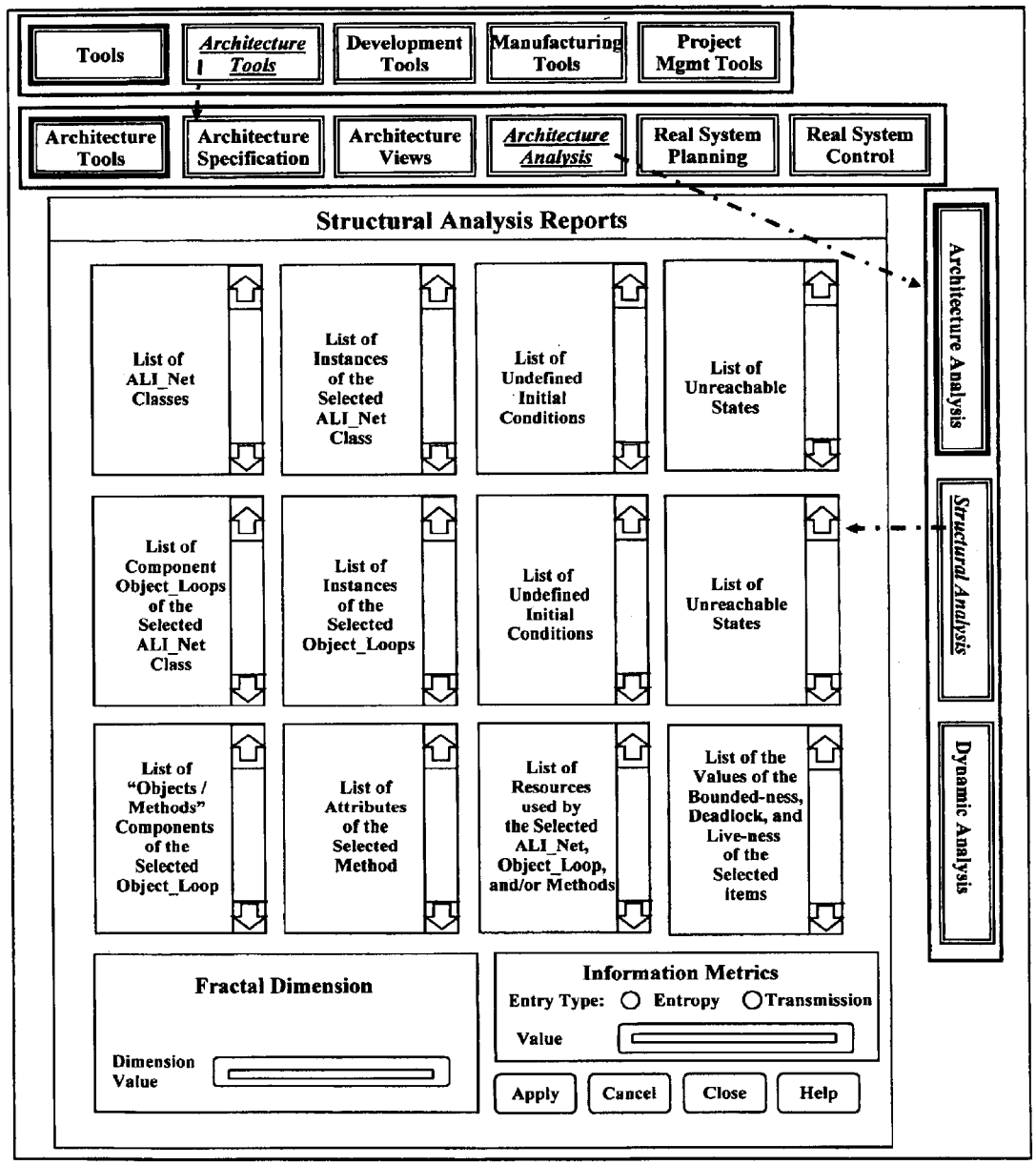
Figure 180: Structural Analysis Reports

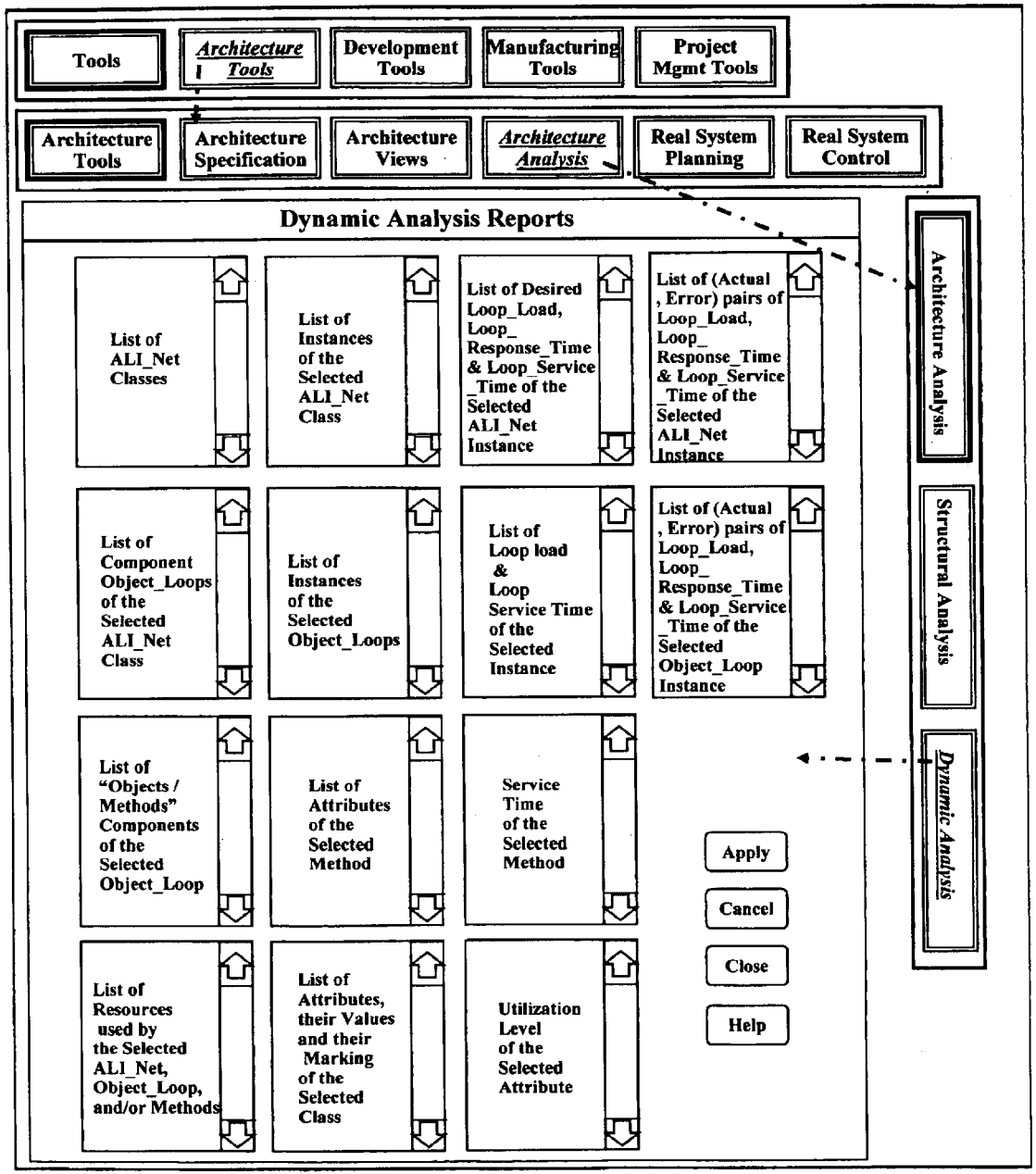
Figure 181: Dynamic Analysis Reports

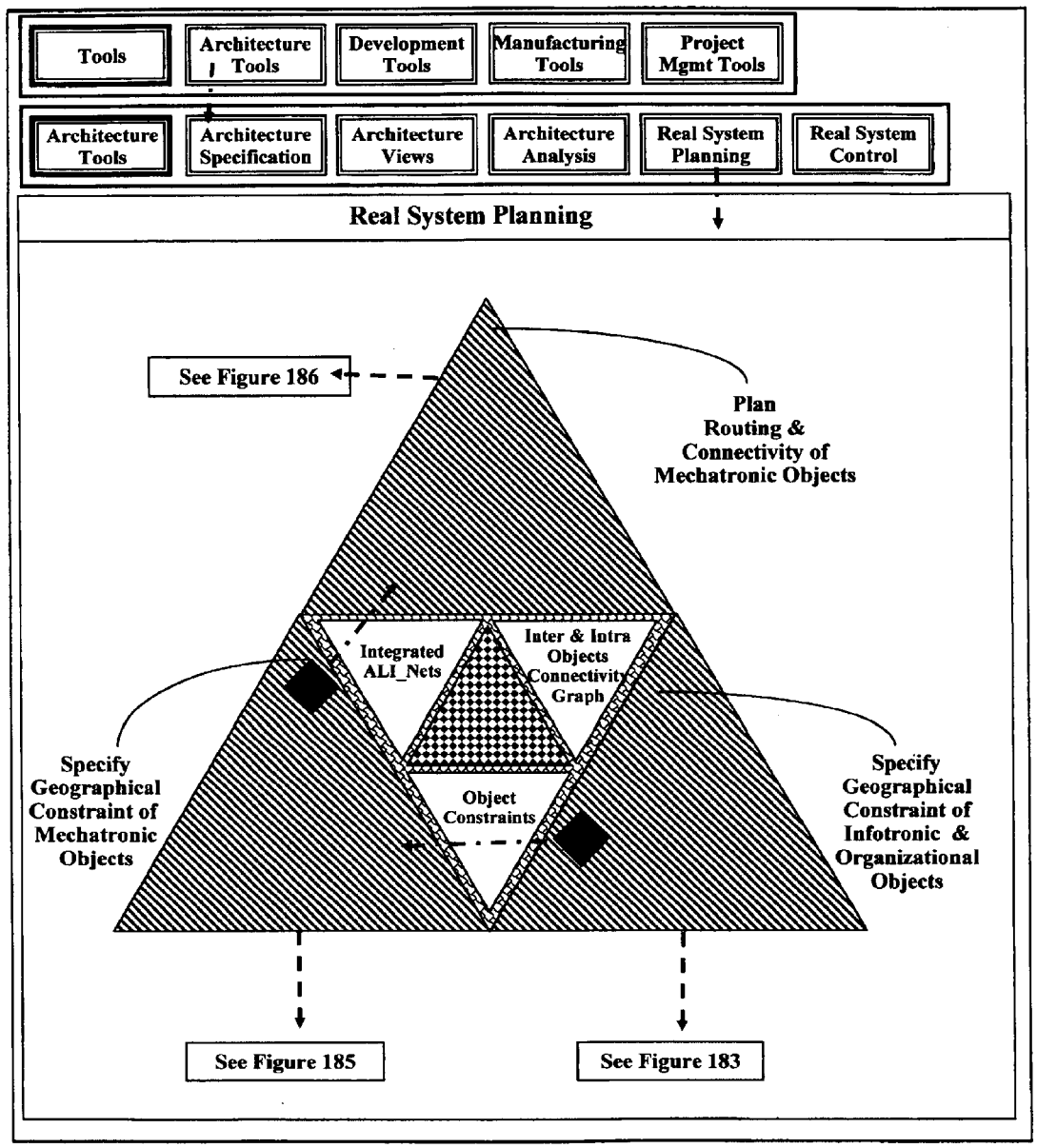
Figure 182: Real System Planning

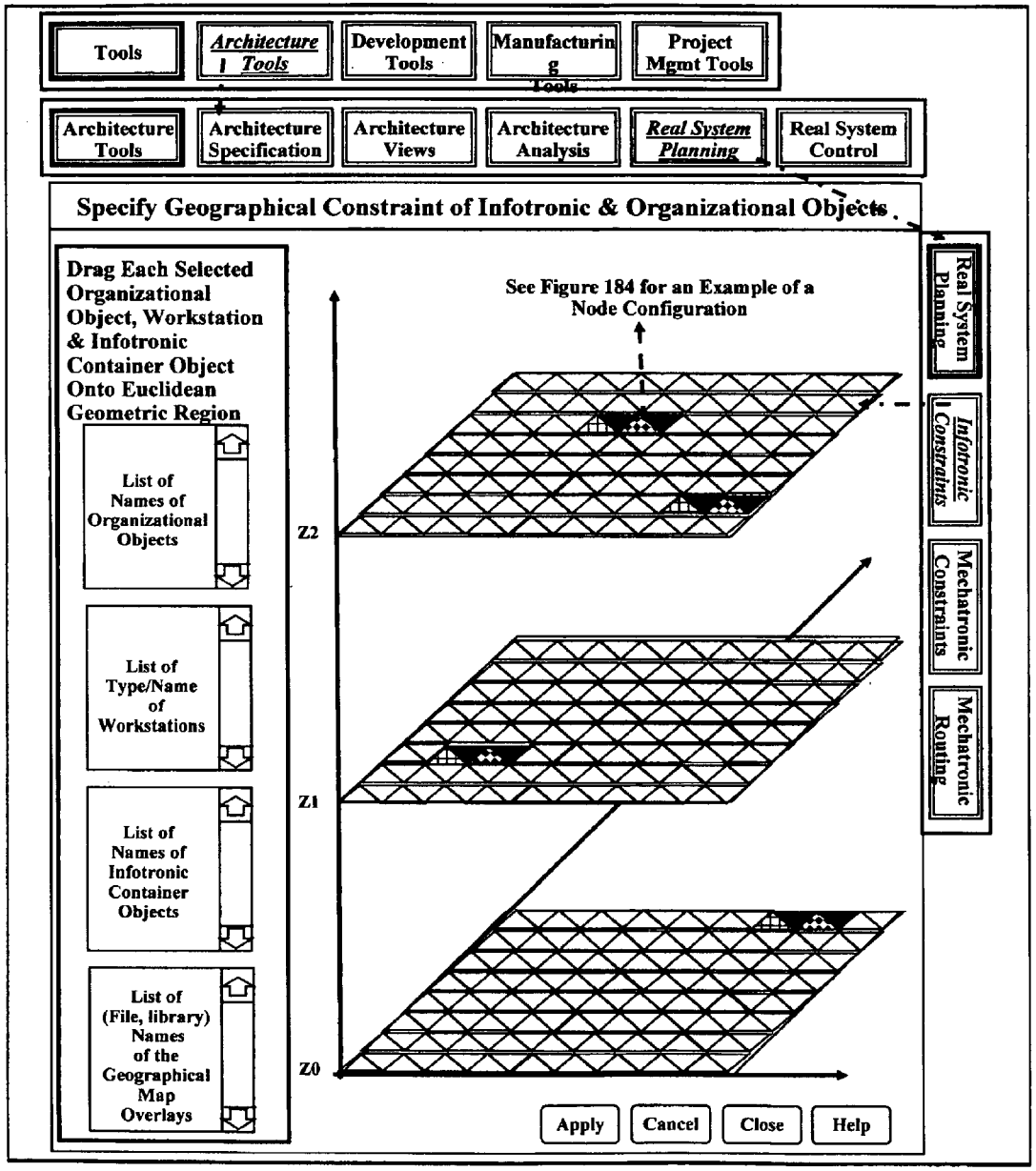
Figure 183: Specify Geographical Constraint of Infotronic & Organizational Objects

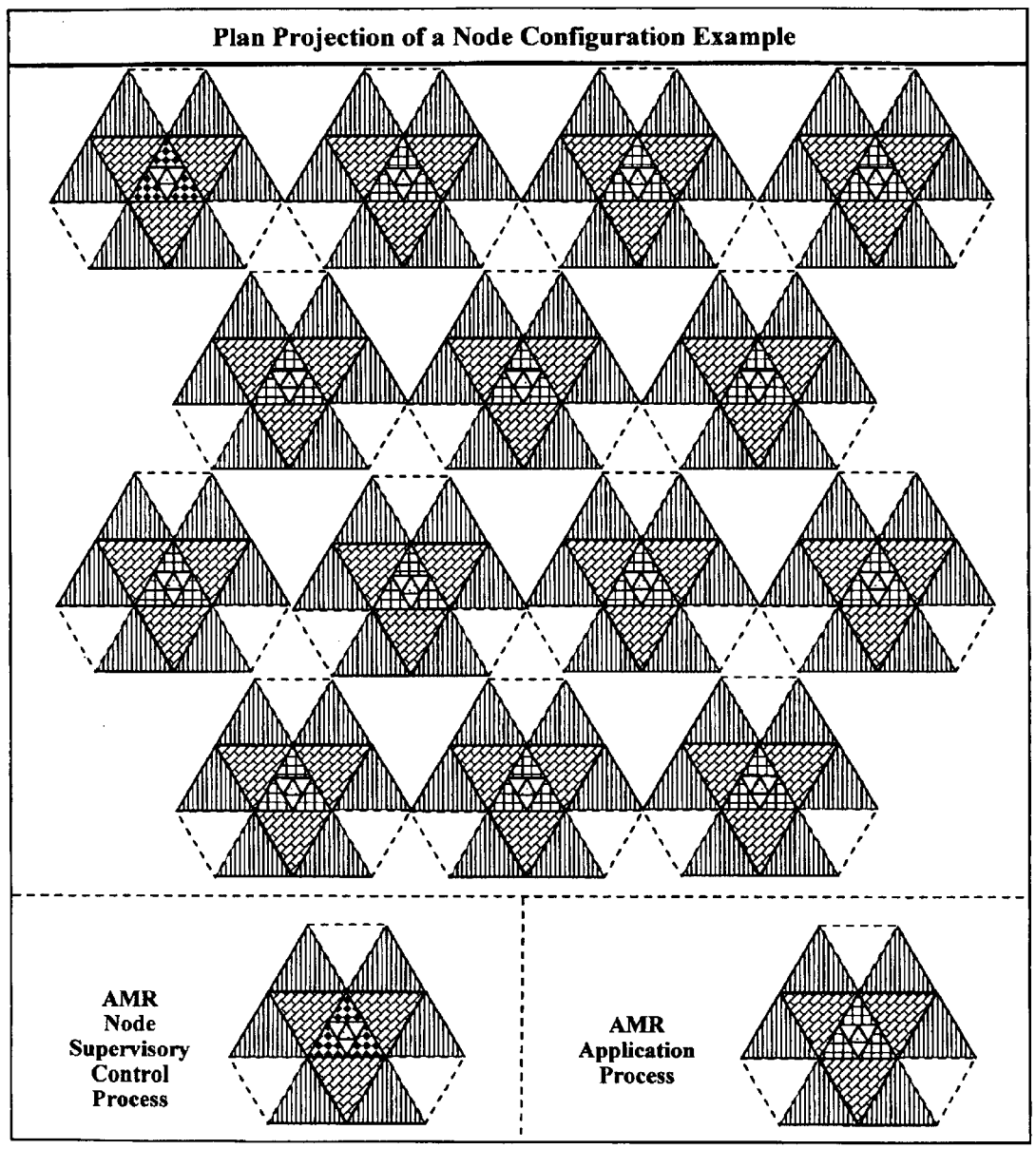
Figure 184: Plan Projection of a Node Configuration Example

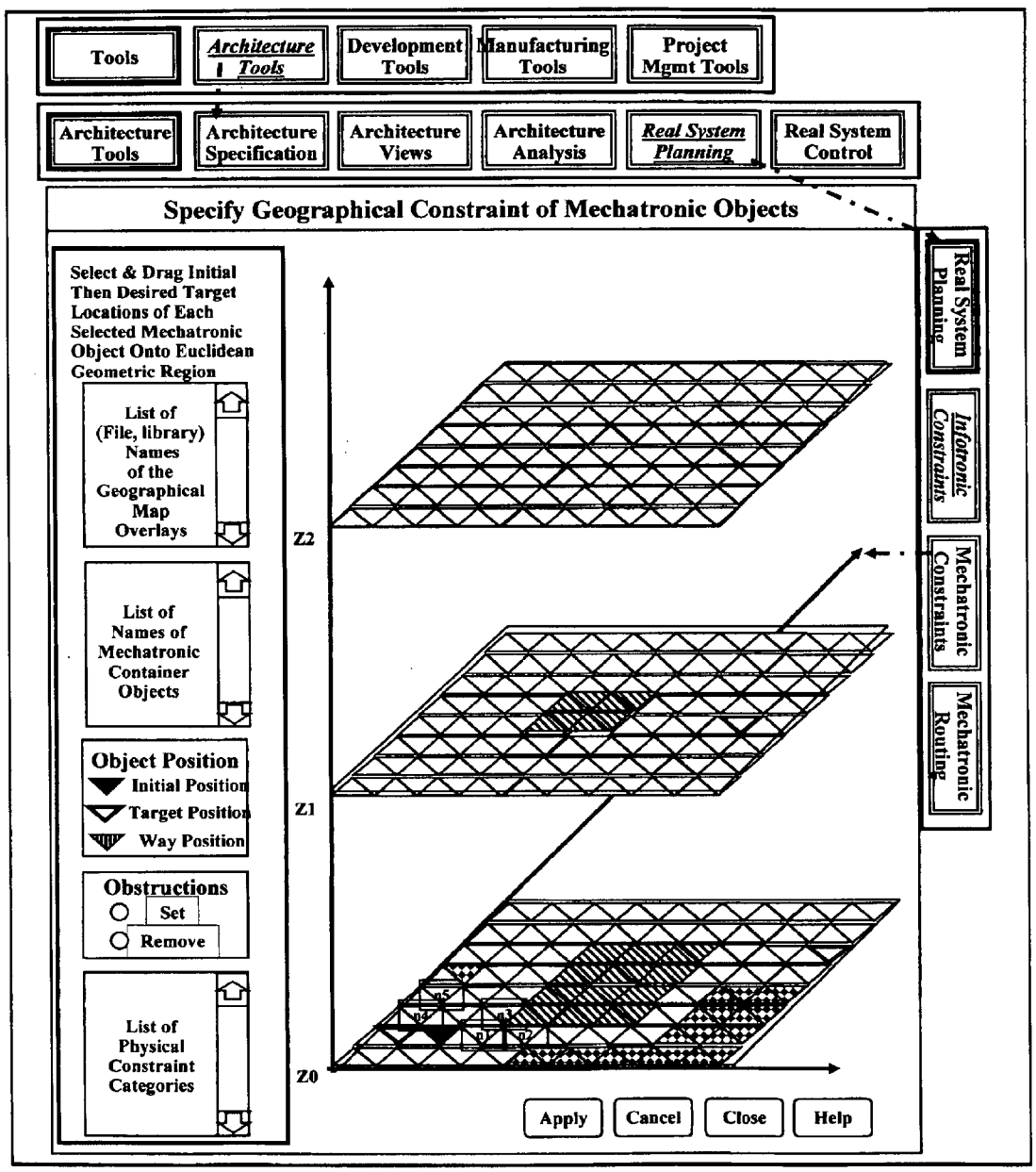
Figure 185: Specify Geographical Constraint of Mechatronic Objects

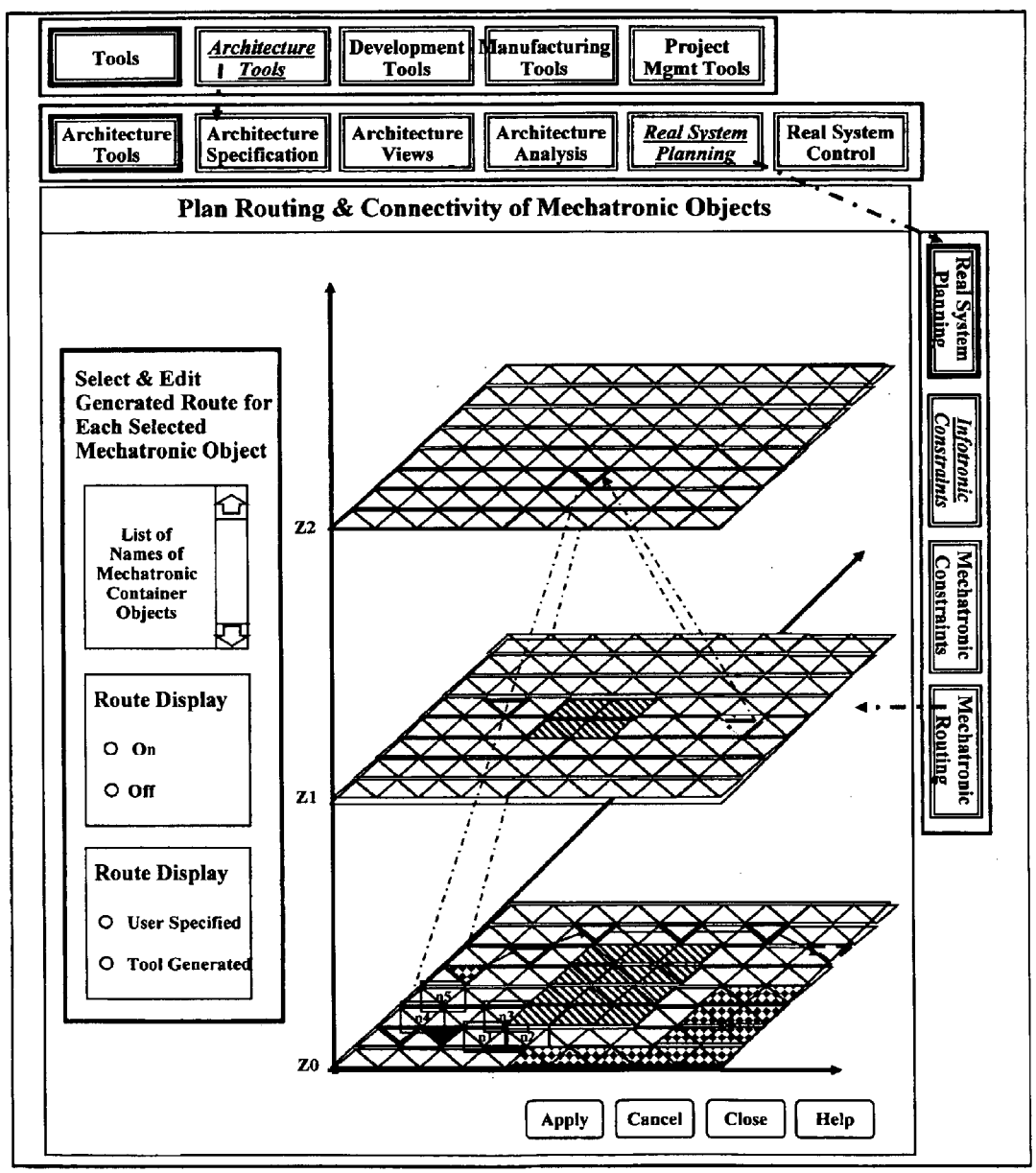
Figure 186: Plan Routing & Connectivity of Mechatronic Objects

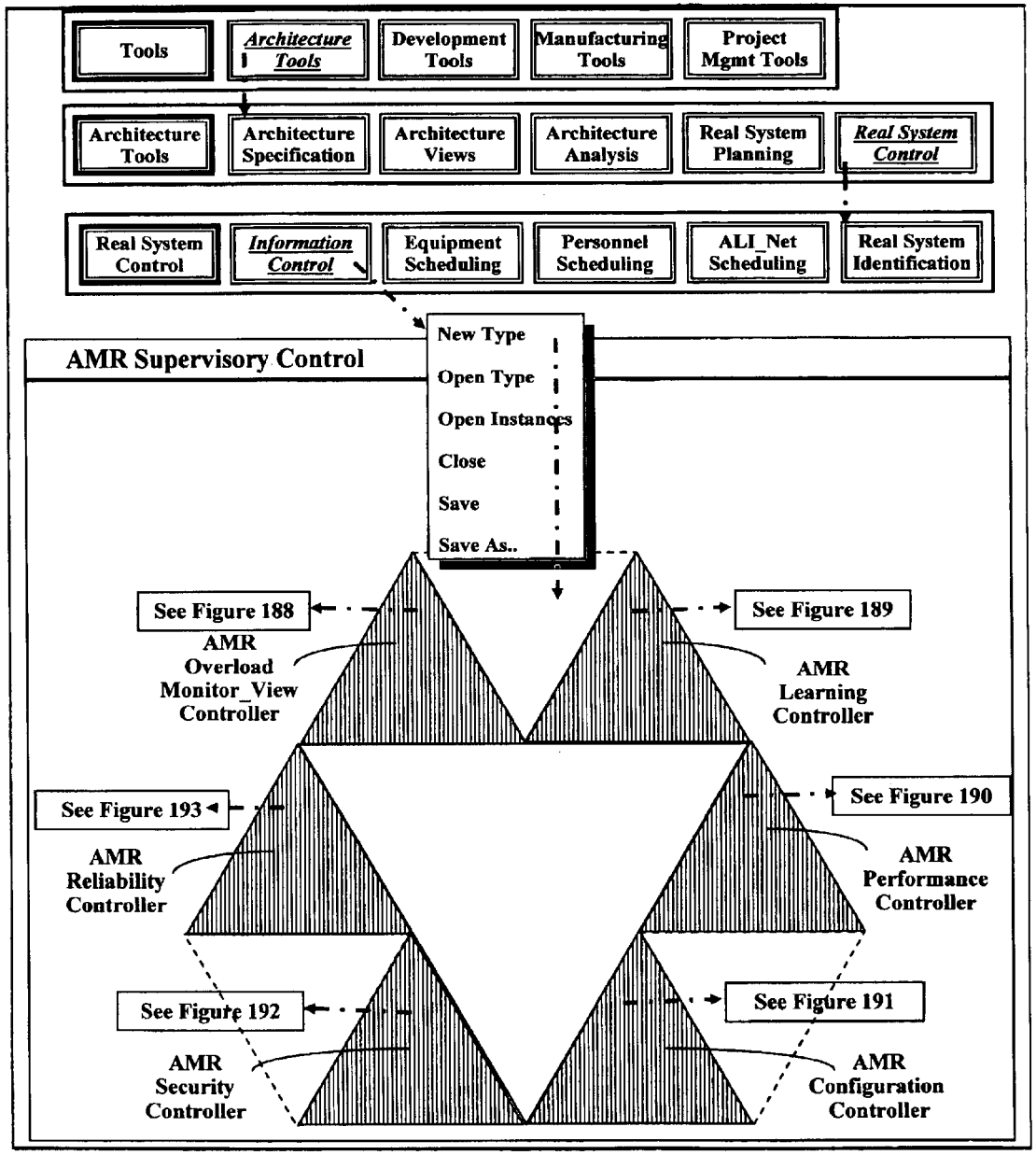
Figure 187: AMR Supervisory Control

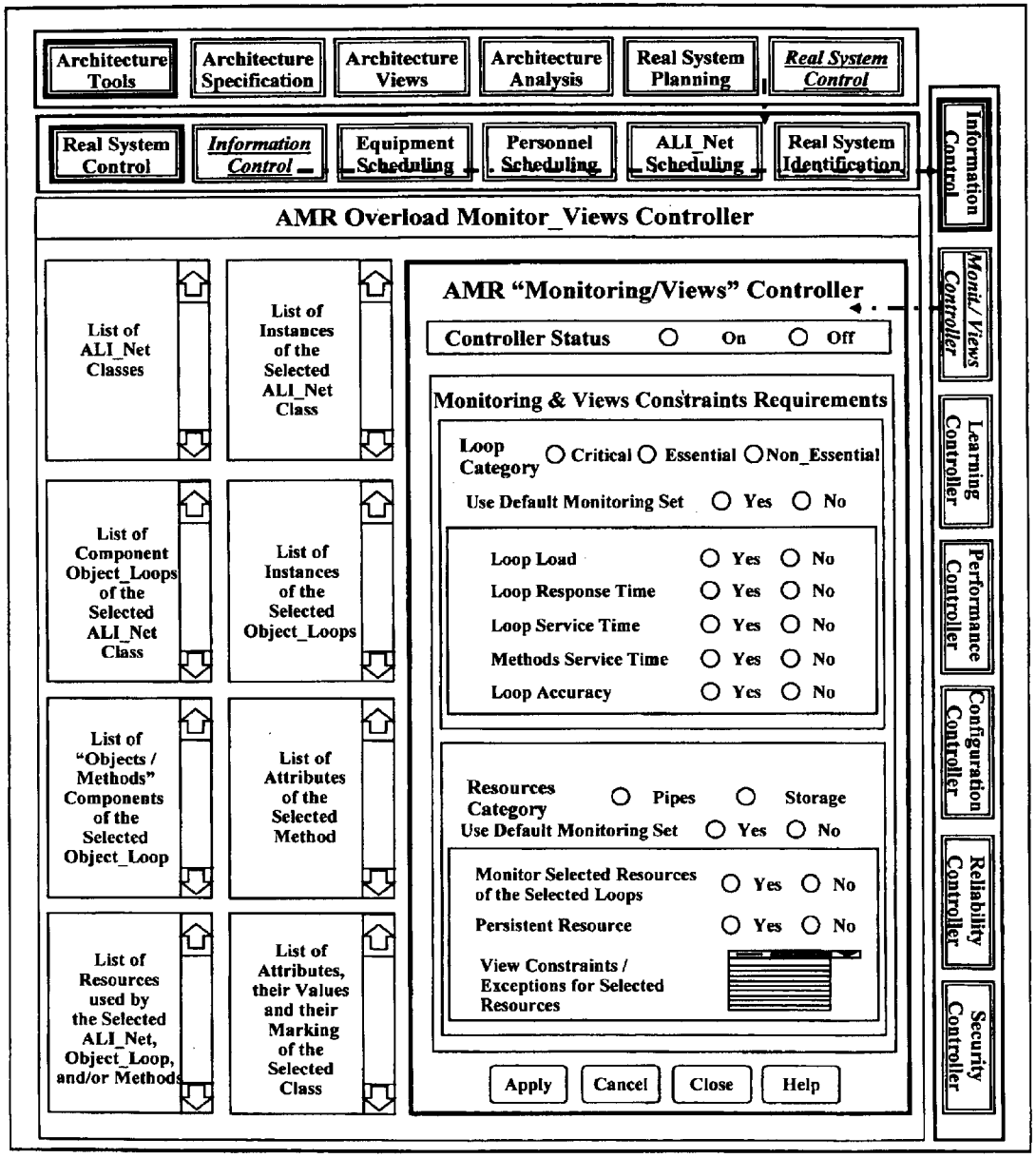
Figure 188: AMR Monitoring_Views Controller

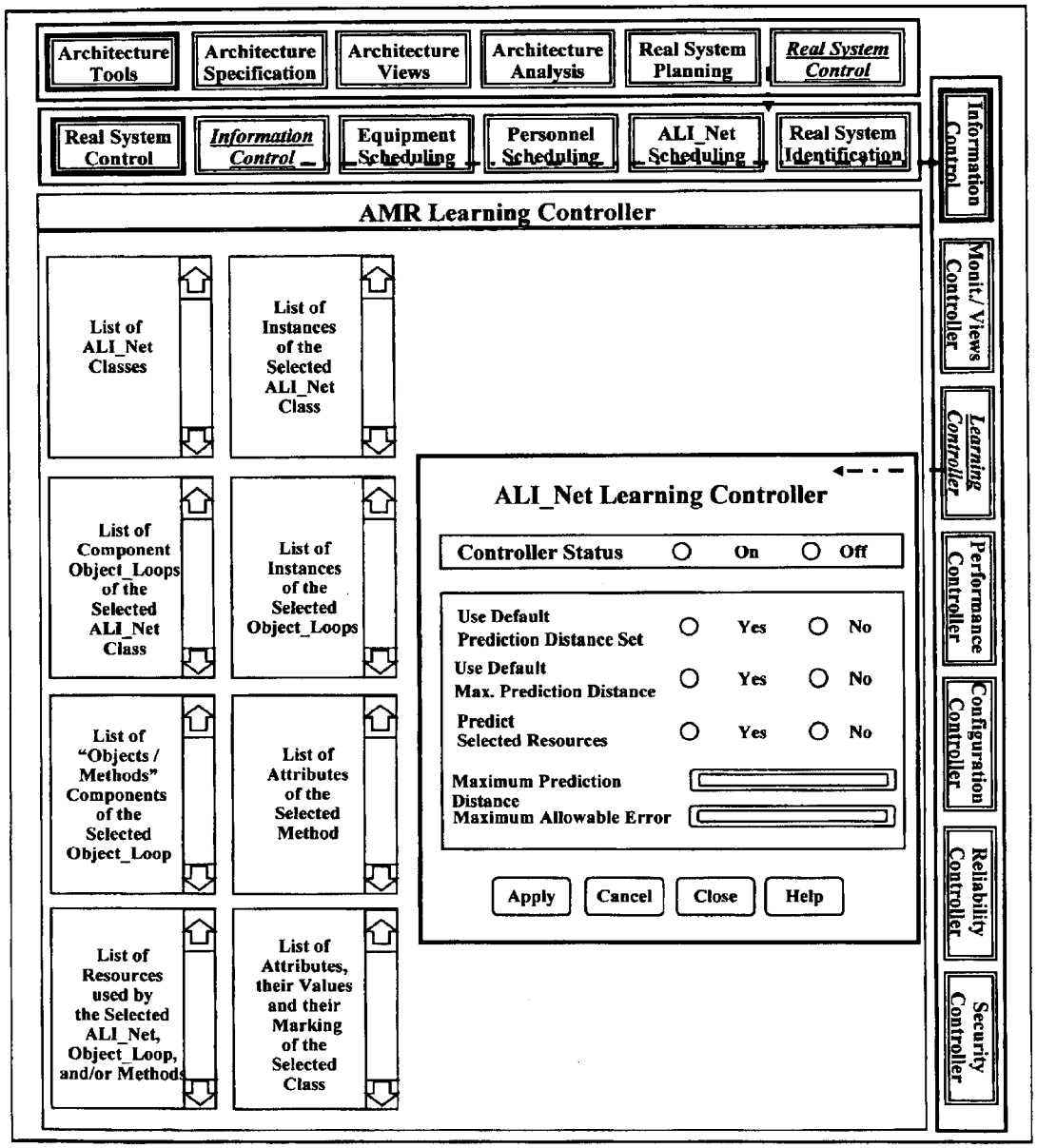
Figure 189: AMR Learning Controller

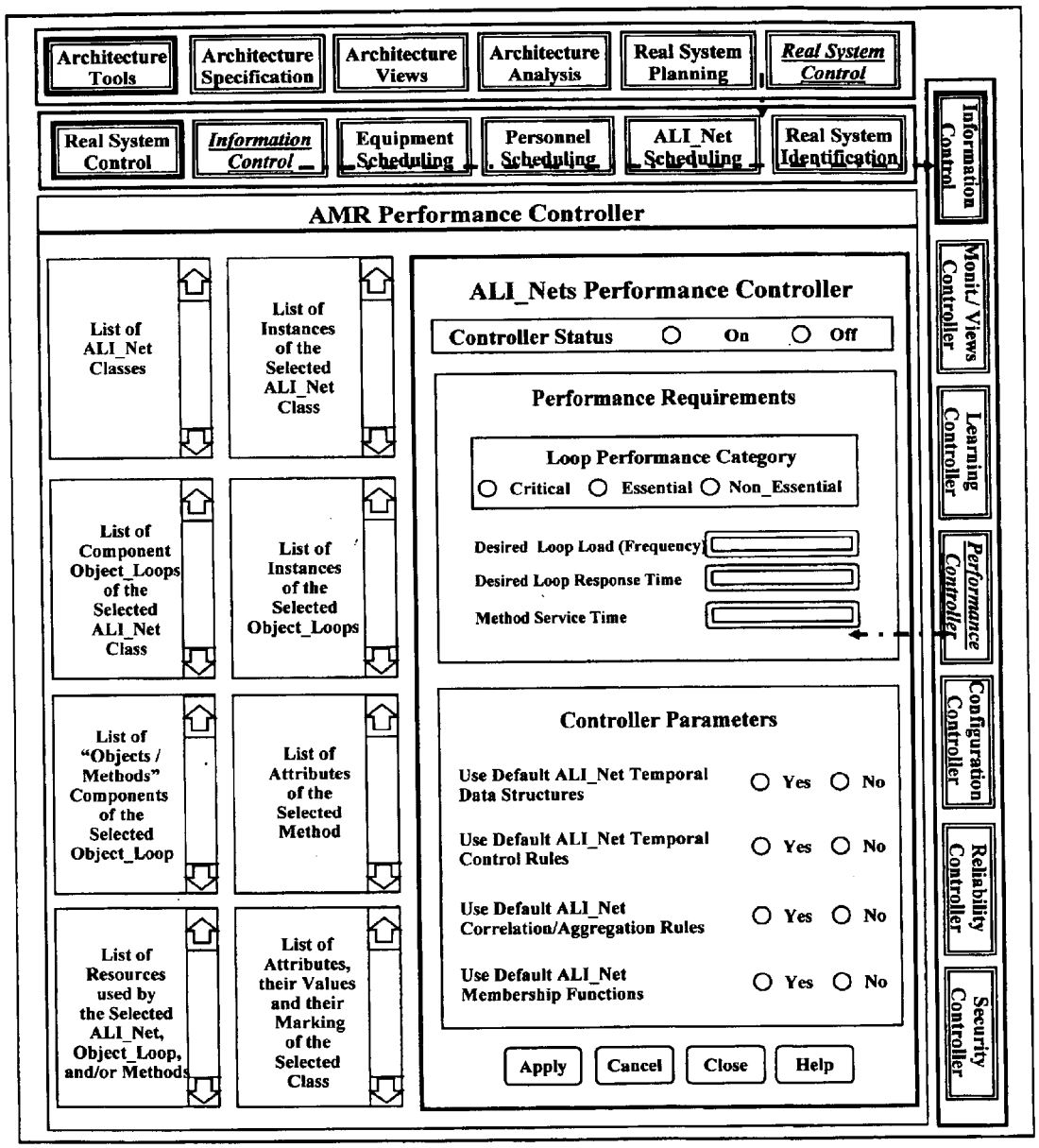
Figure 190: AMR Performance Controller

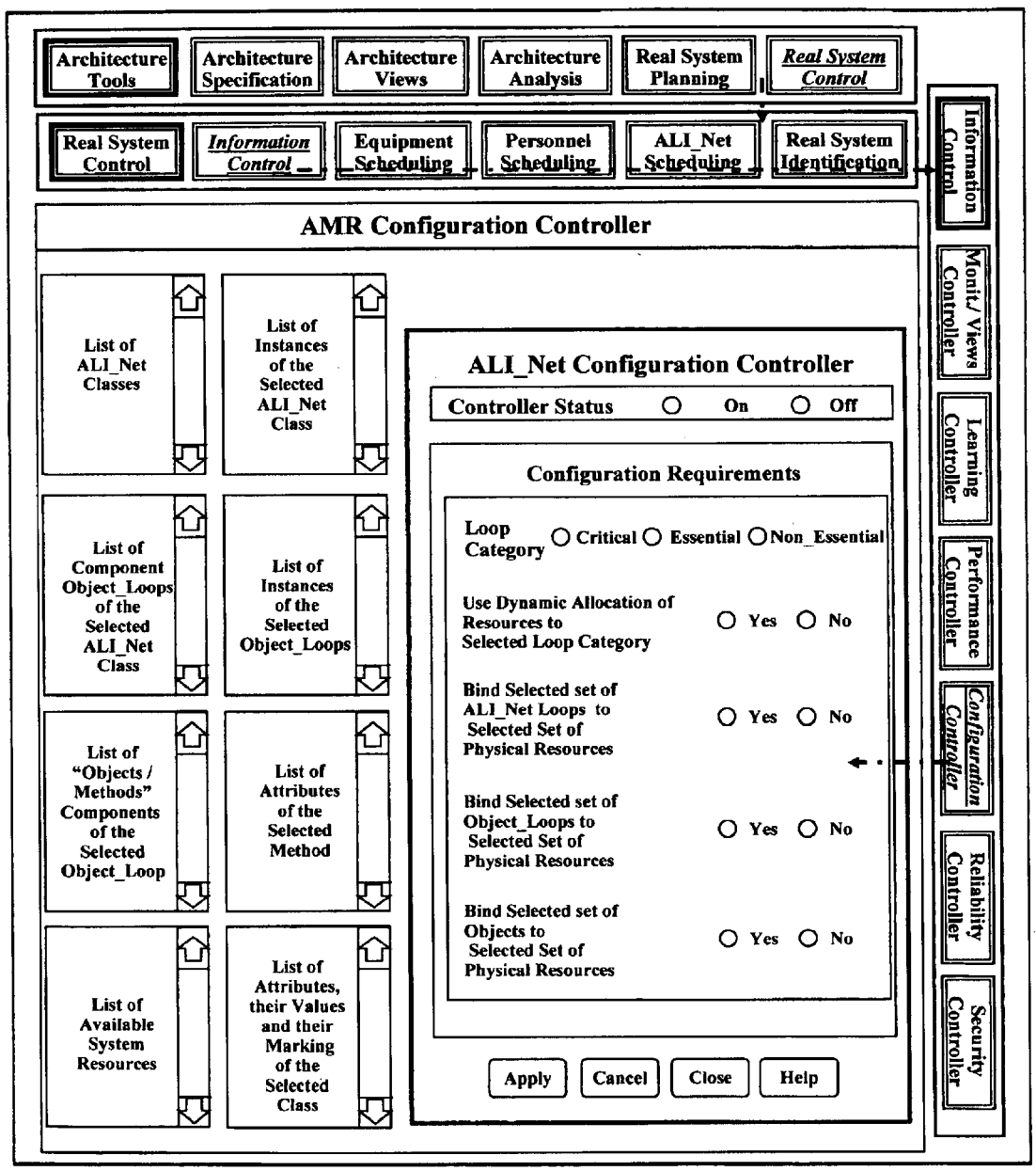
Figure 191: AMR Configuration Controller

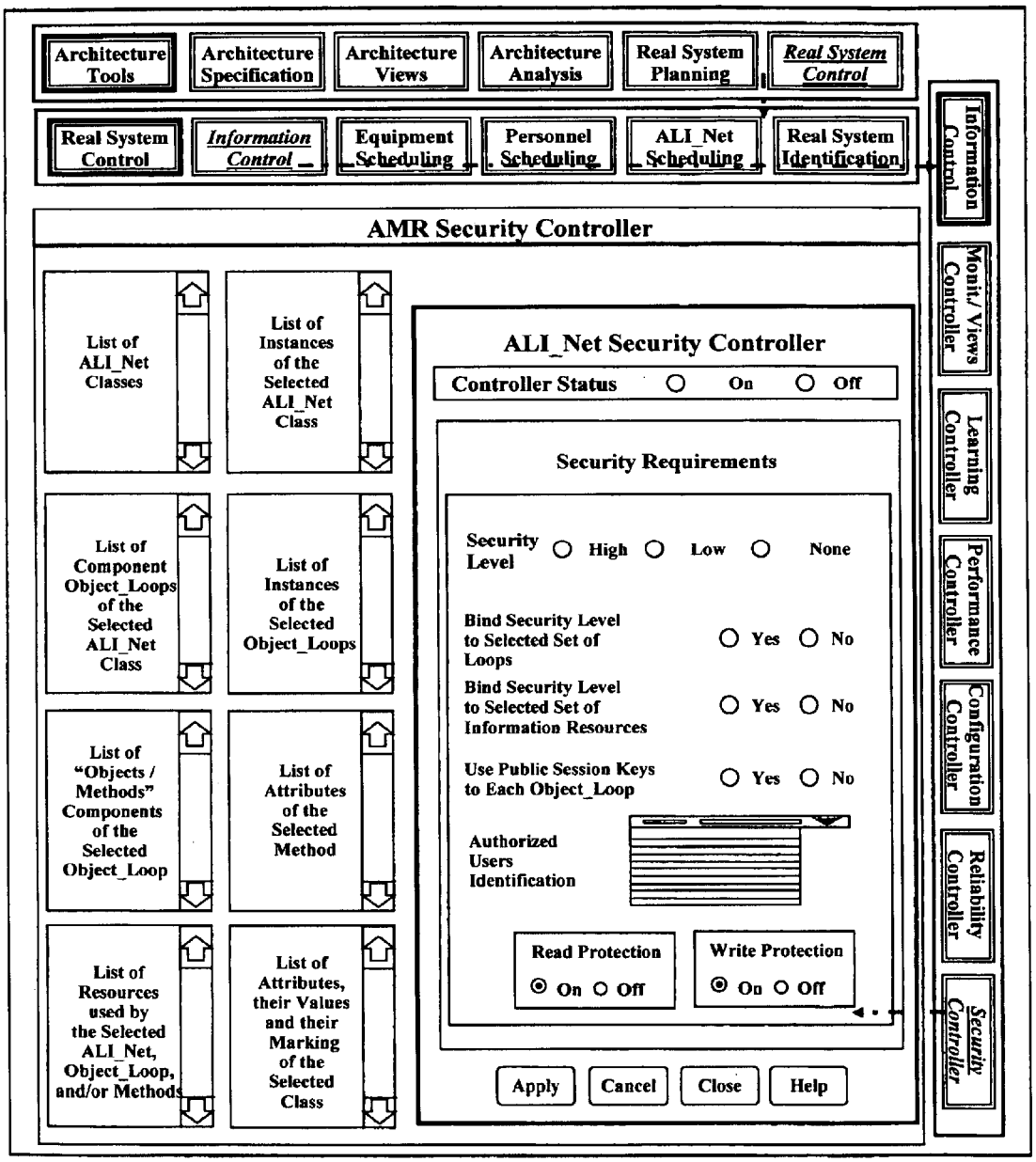
Figure 192: AMR Security Controller

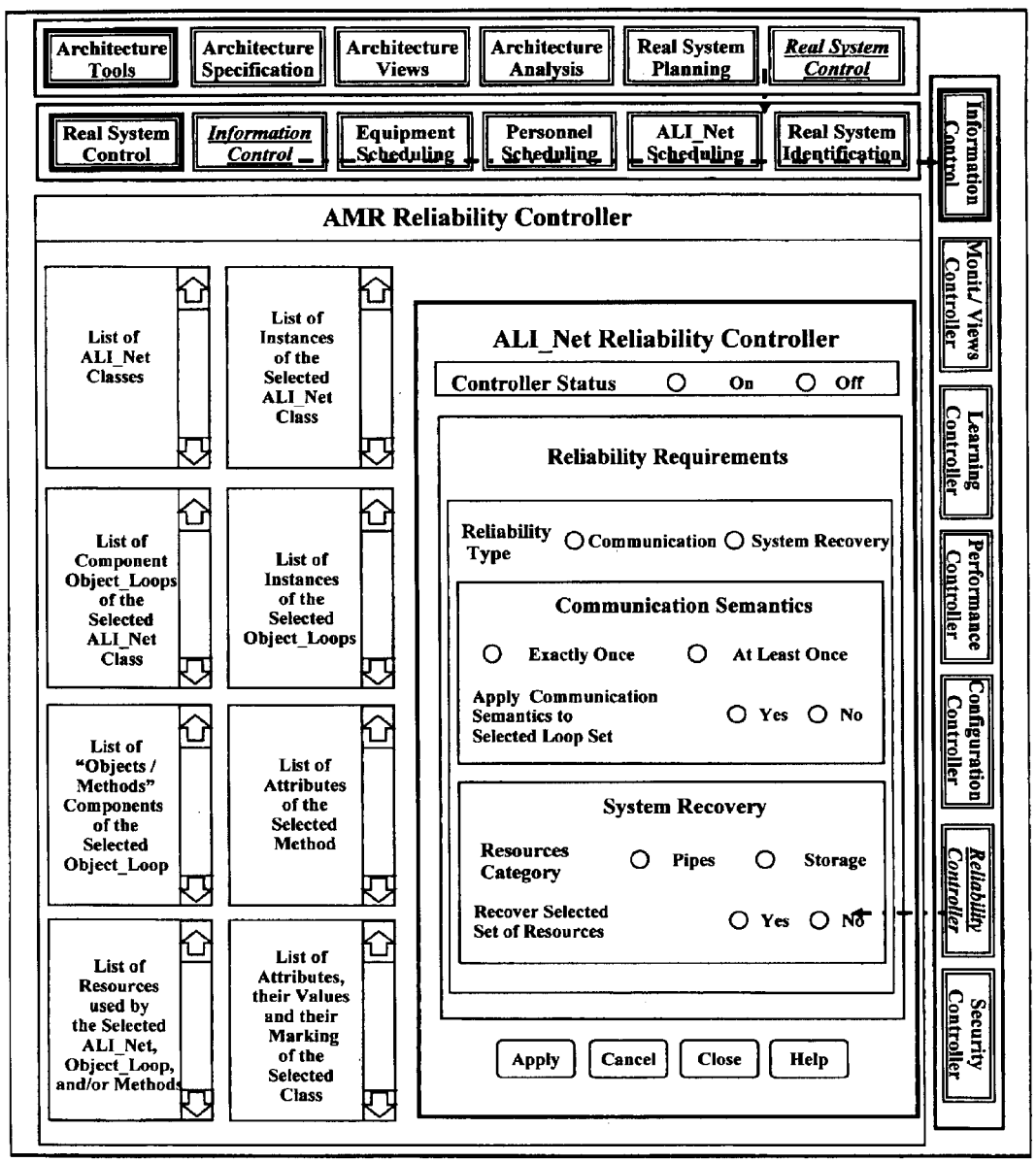
Figure 193: AMR Reliability Controller

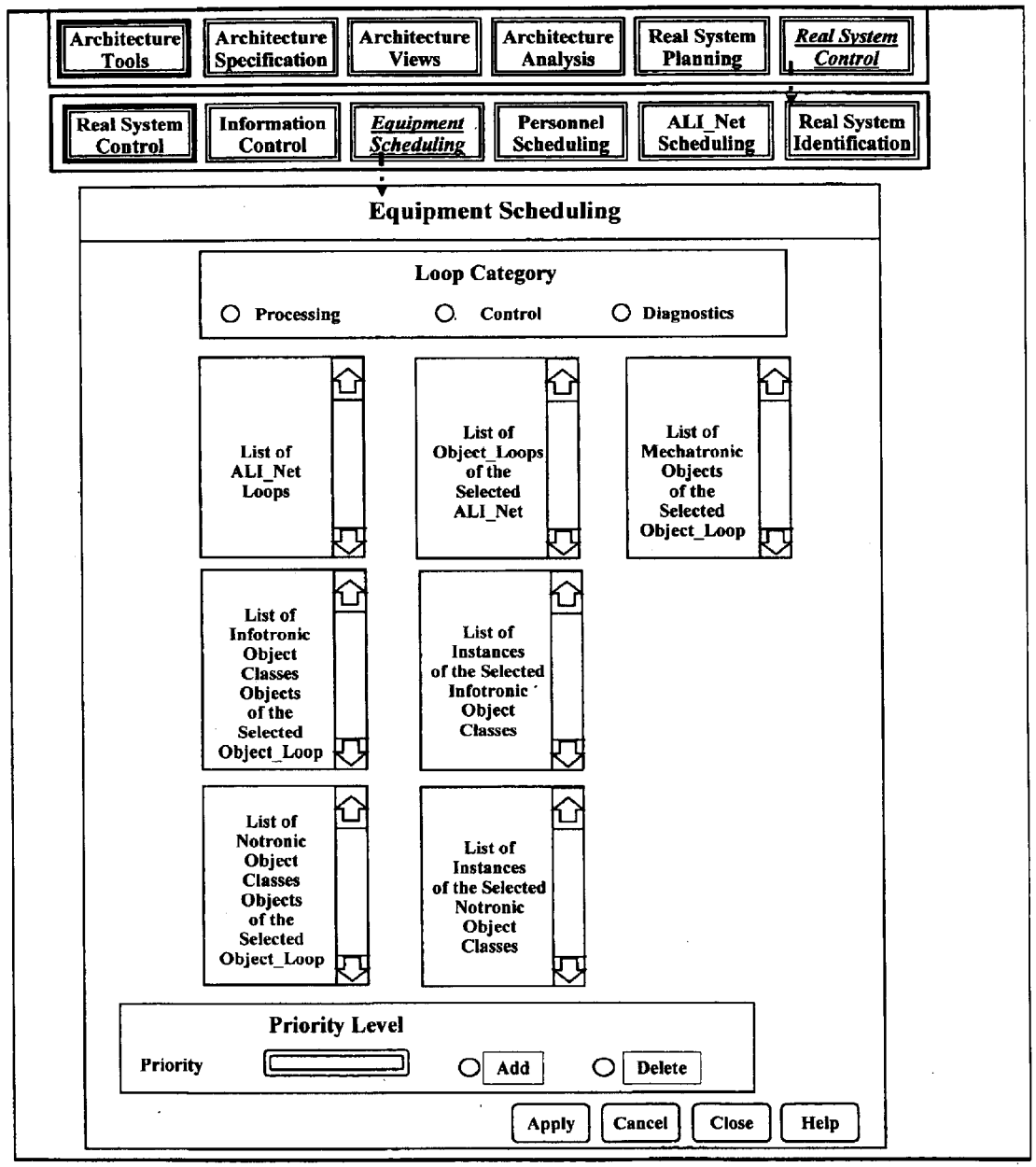
Figure 194: Equipment Scheduling

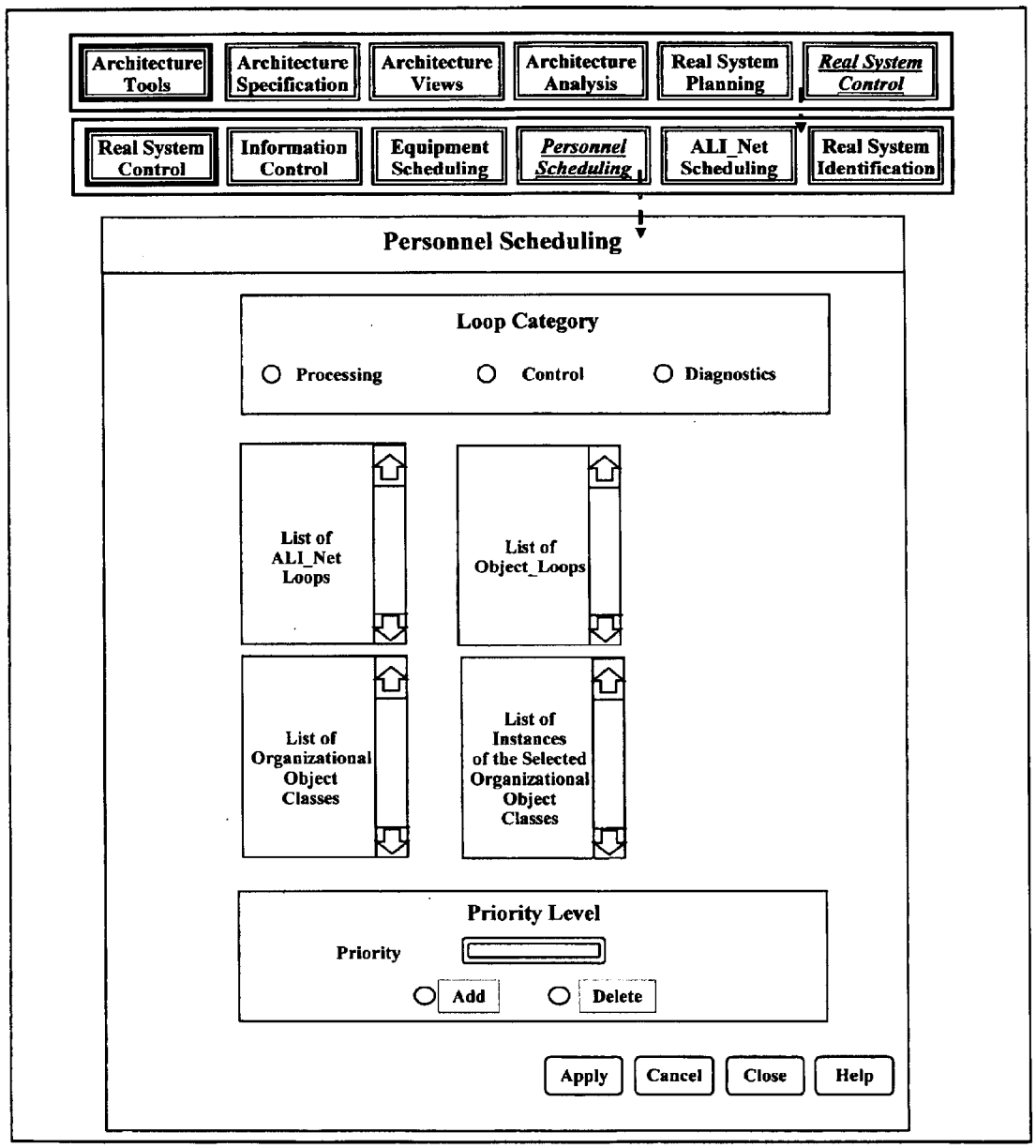
Figure 195: Personnel Scheduling

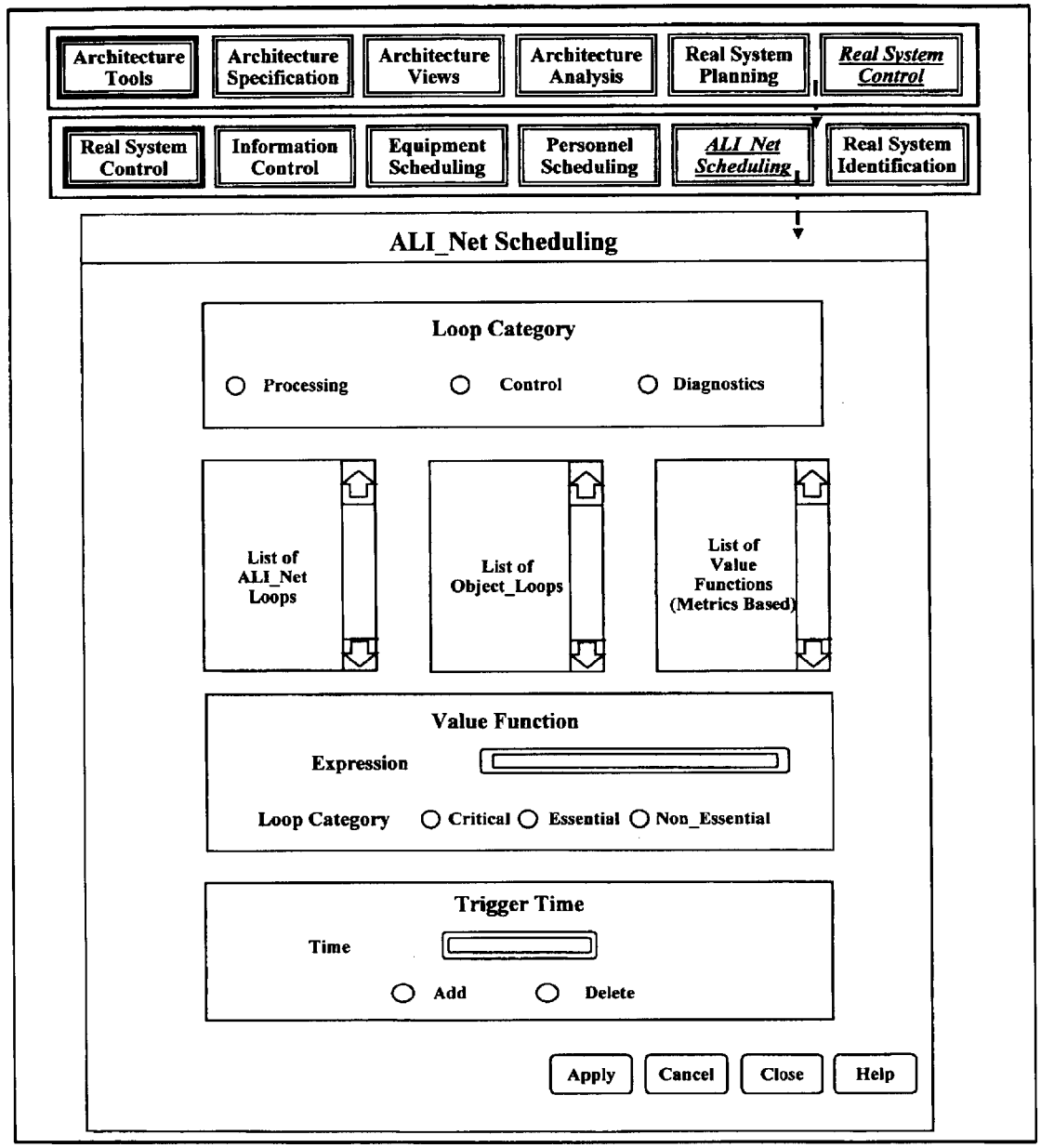
Figure 196: ALI_Net Scheduling

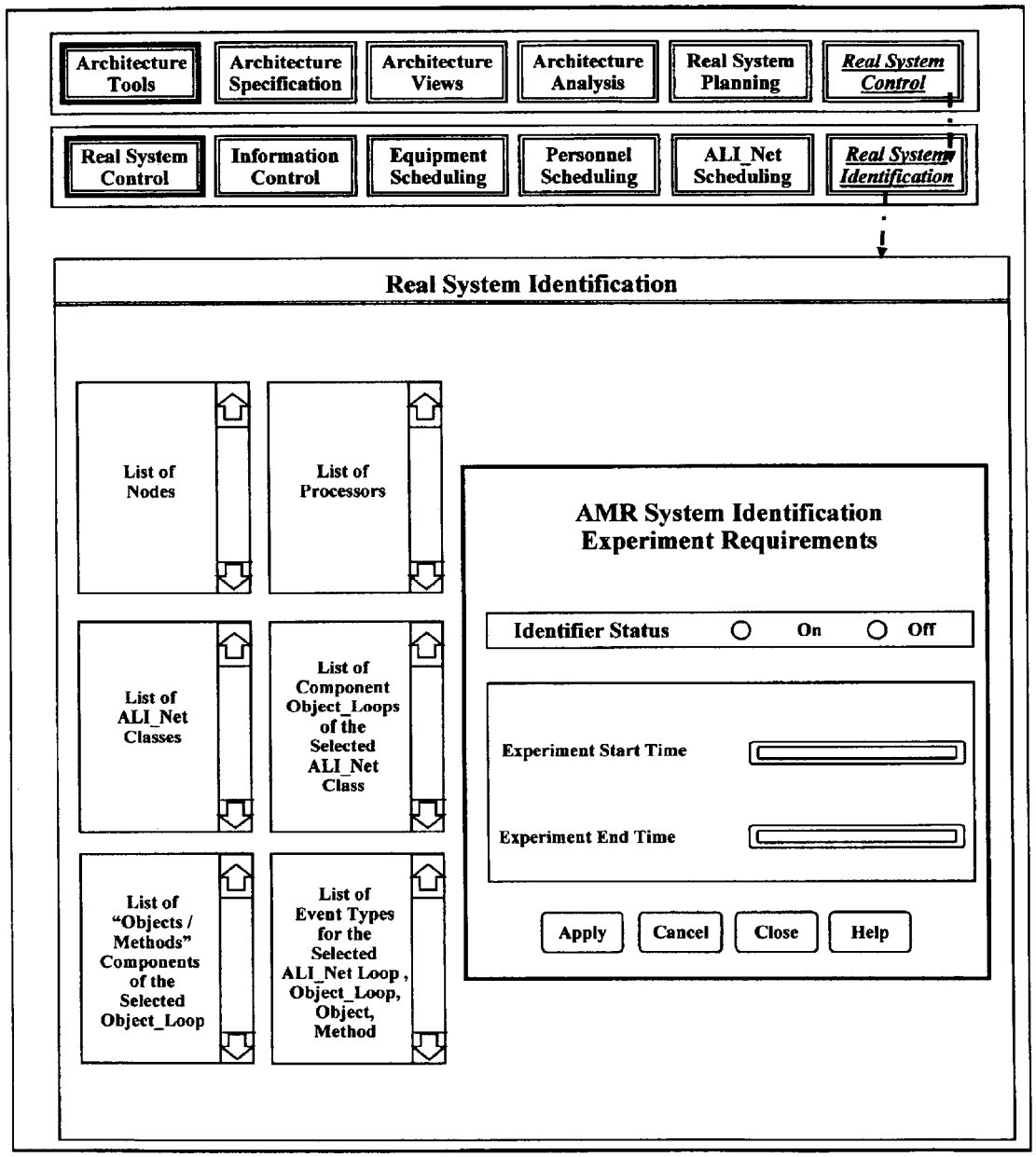
Figure 197: Real System Identification

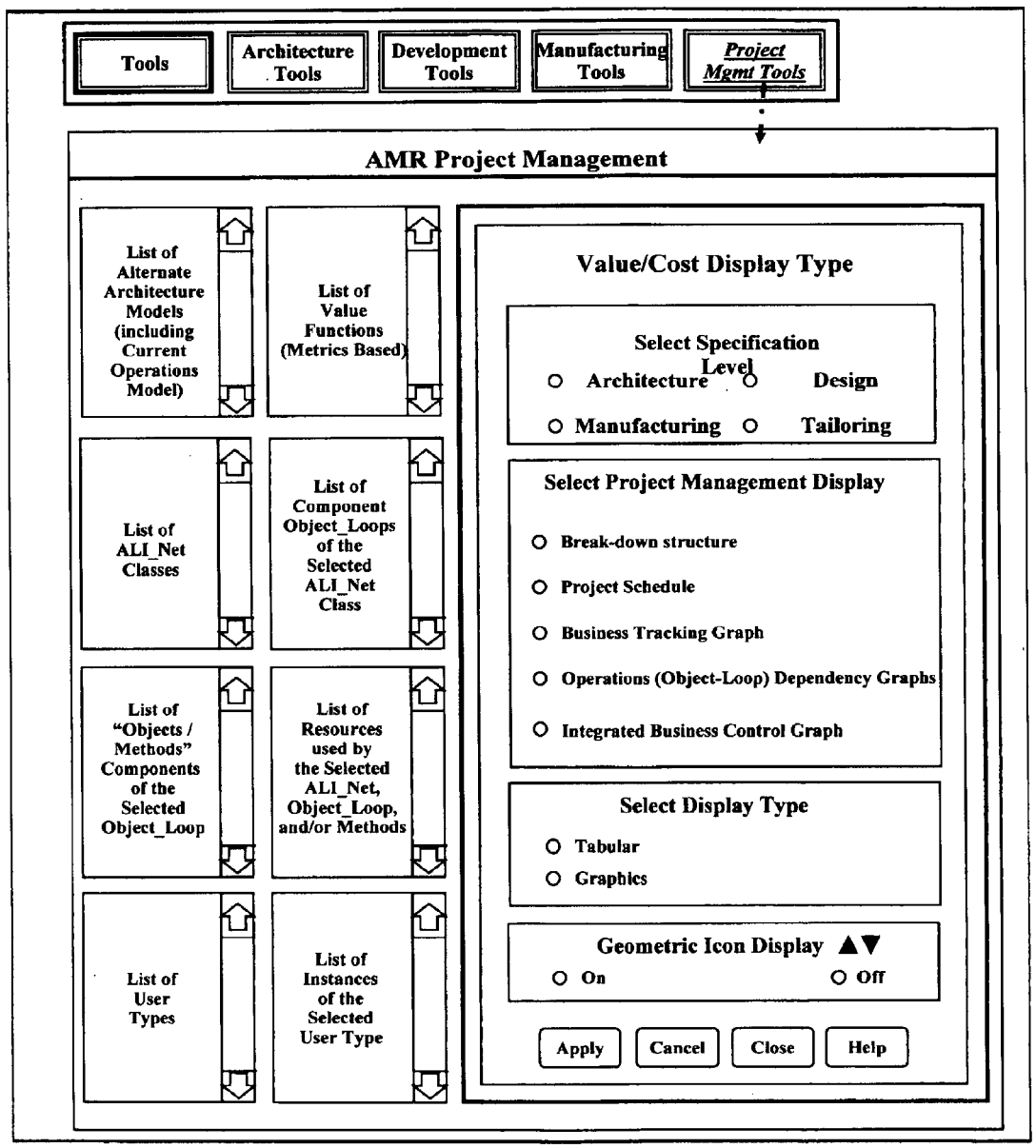
Figure 198: AMR Project Management

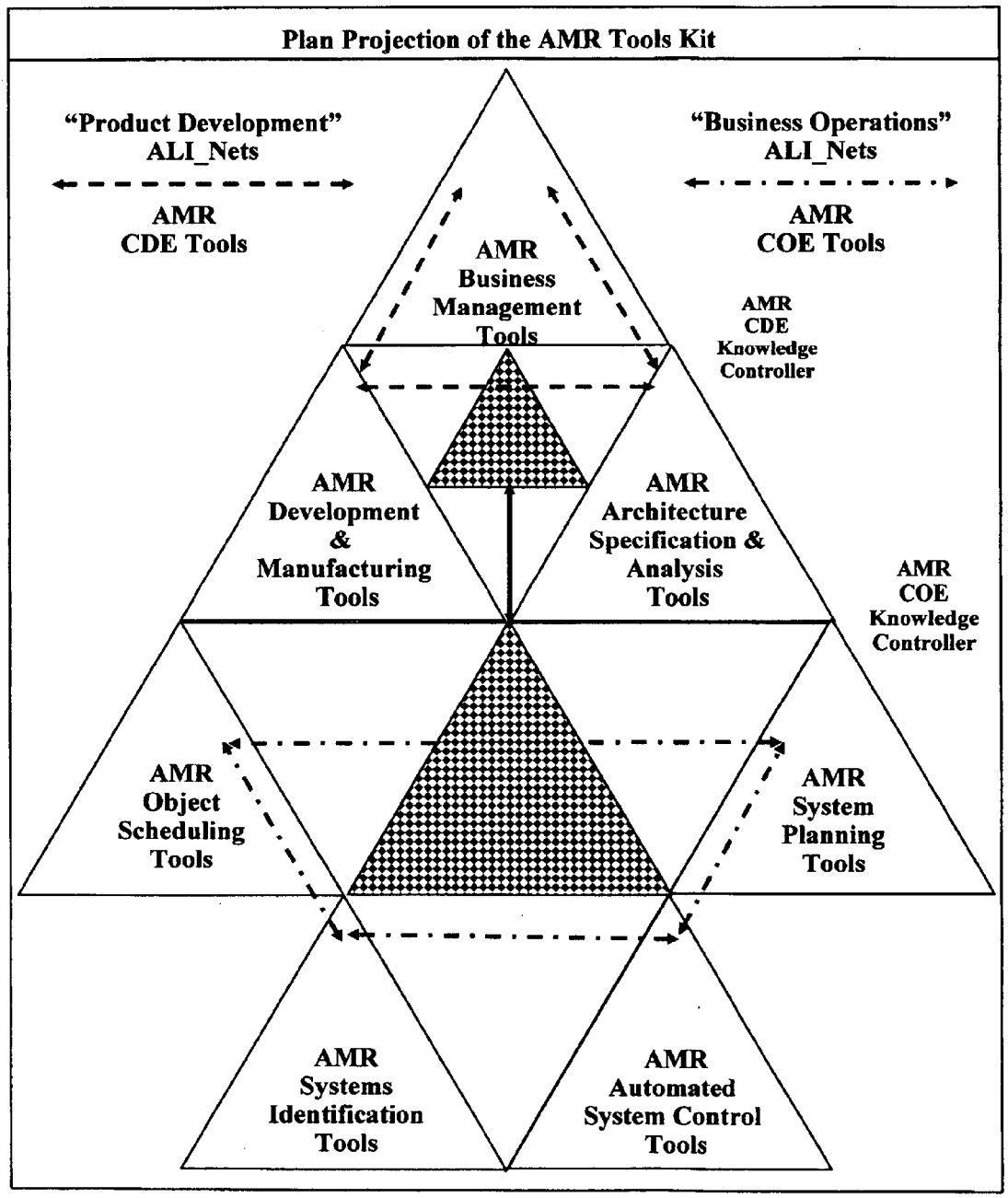
Figure 199: Plan Projection of the AMR Tools Kit

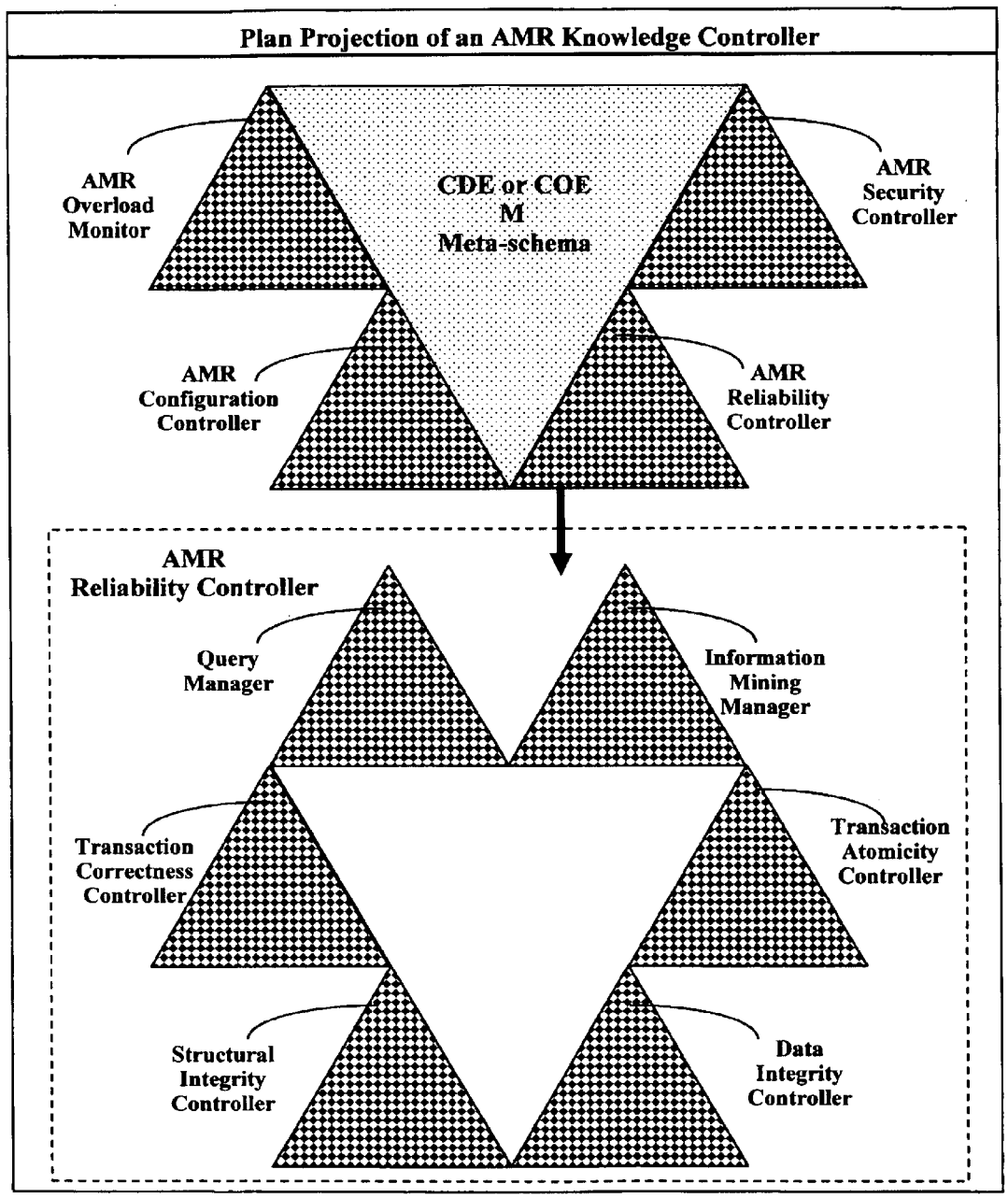
Figure 200: Plan Projection of an AMR Knowledge Controller

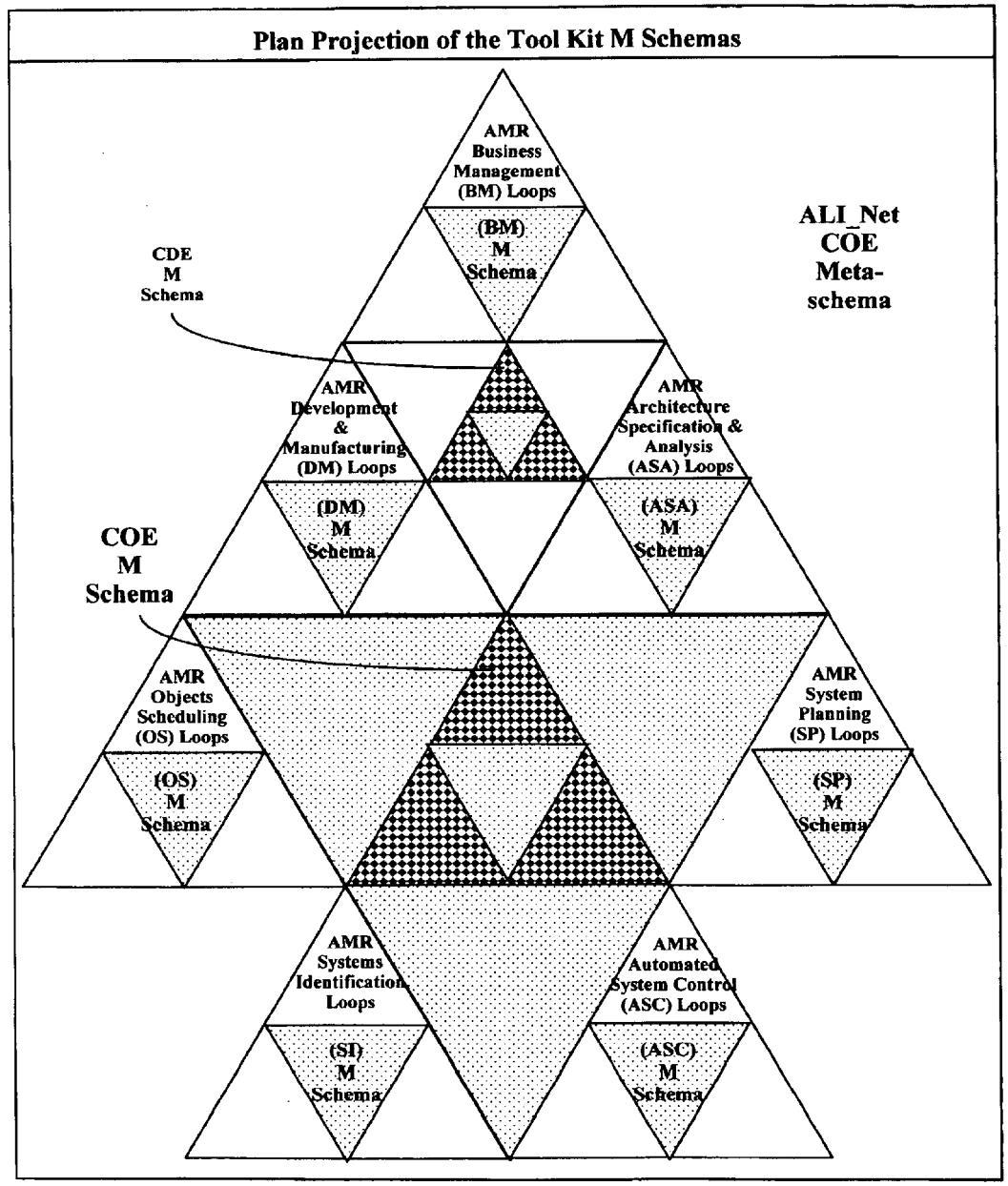
Figure 201: Plan Projection of the Tool Kit M Schemas

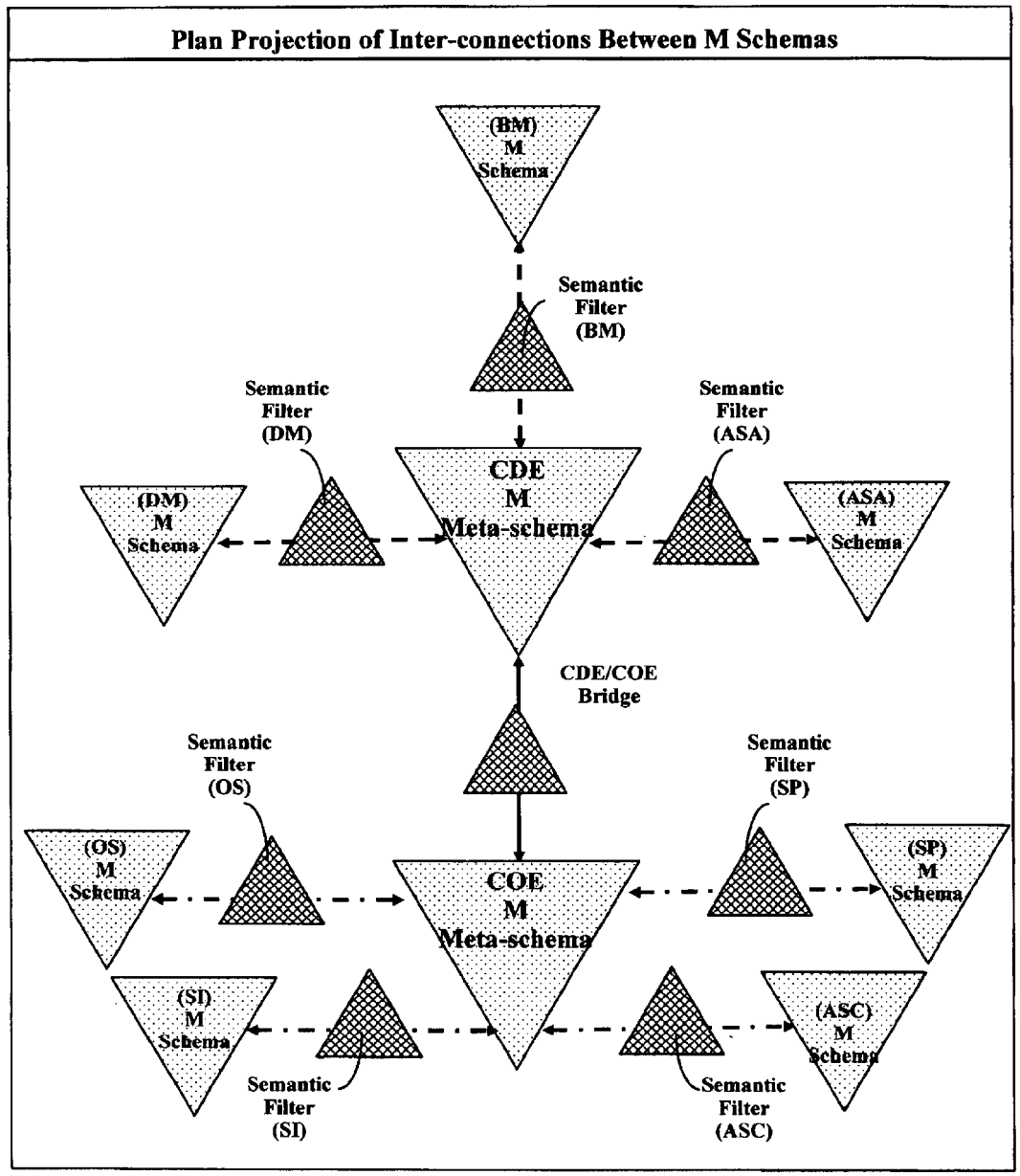
Figure 202: Plan Projection of Inter-connections Between M Schemas

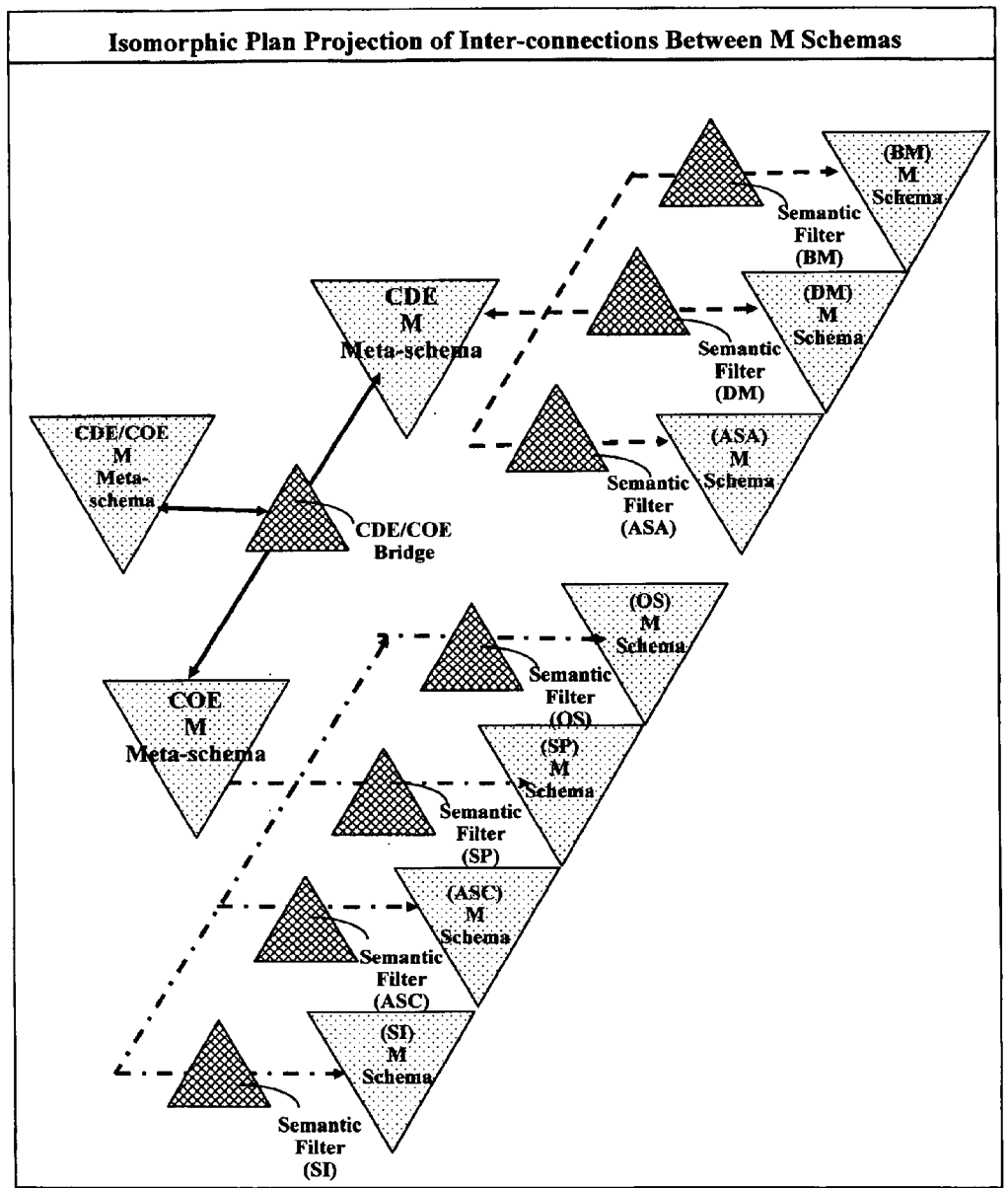
Figure 203: Isomorphic Plan Projection of Inter-connections Between M Schemas

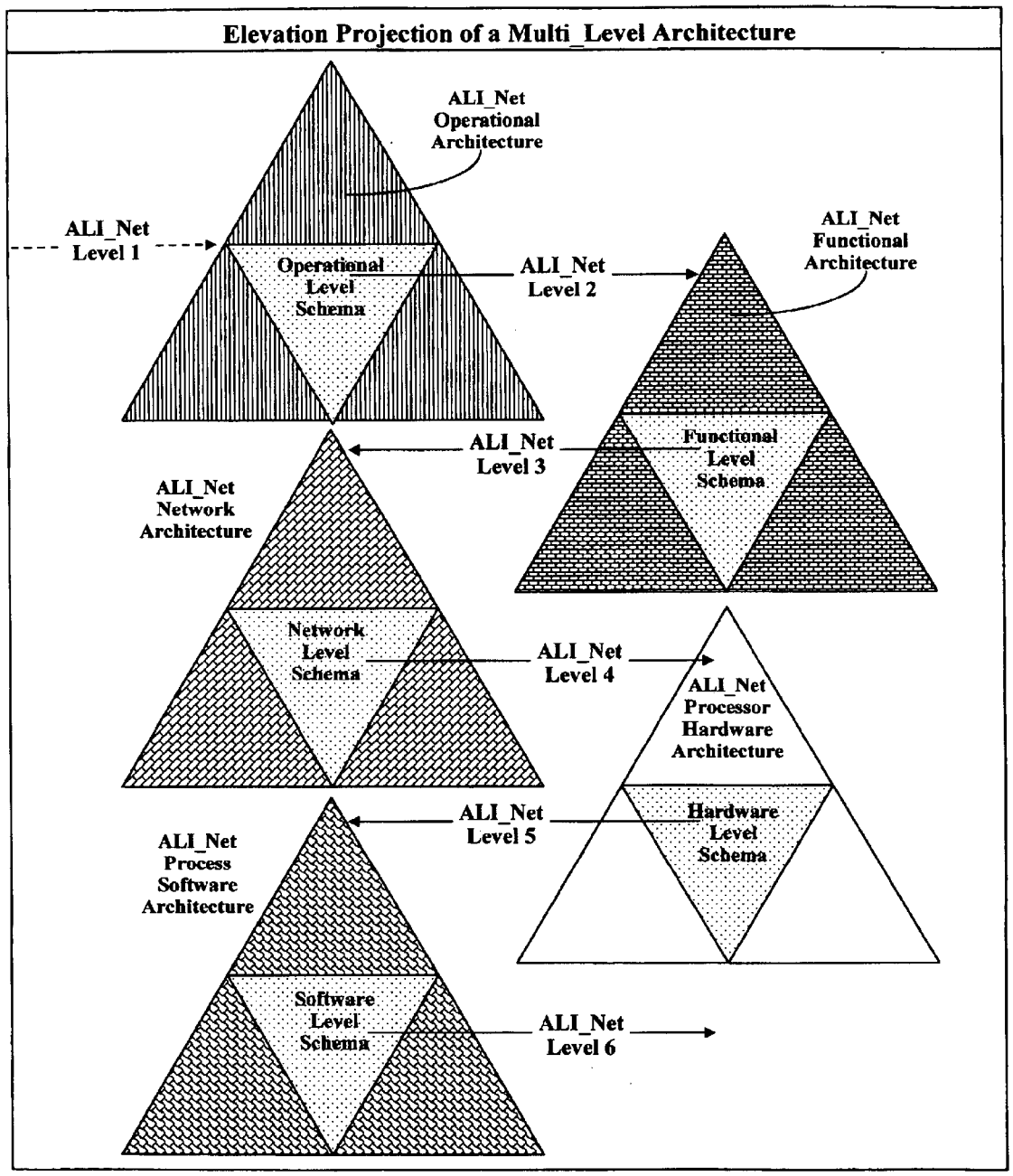
Figure 204: Elevation Projection of a Multi_Level Architecture

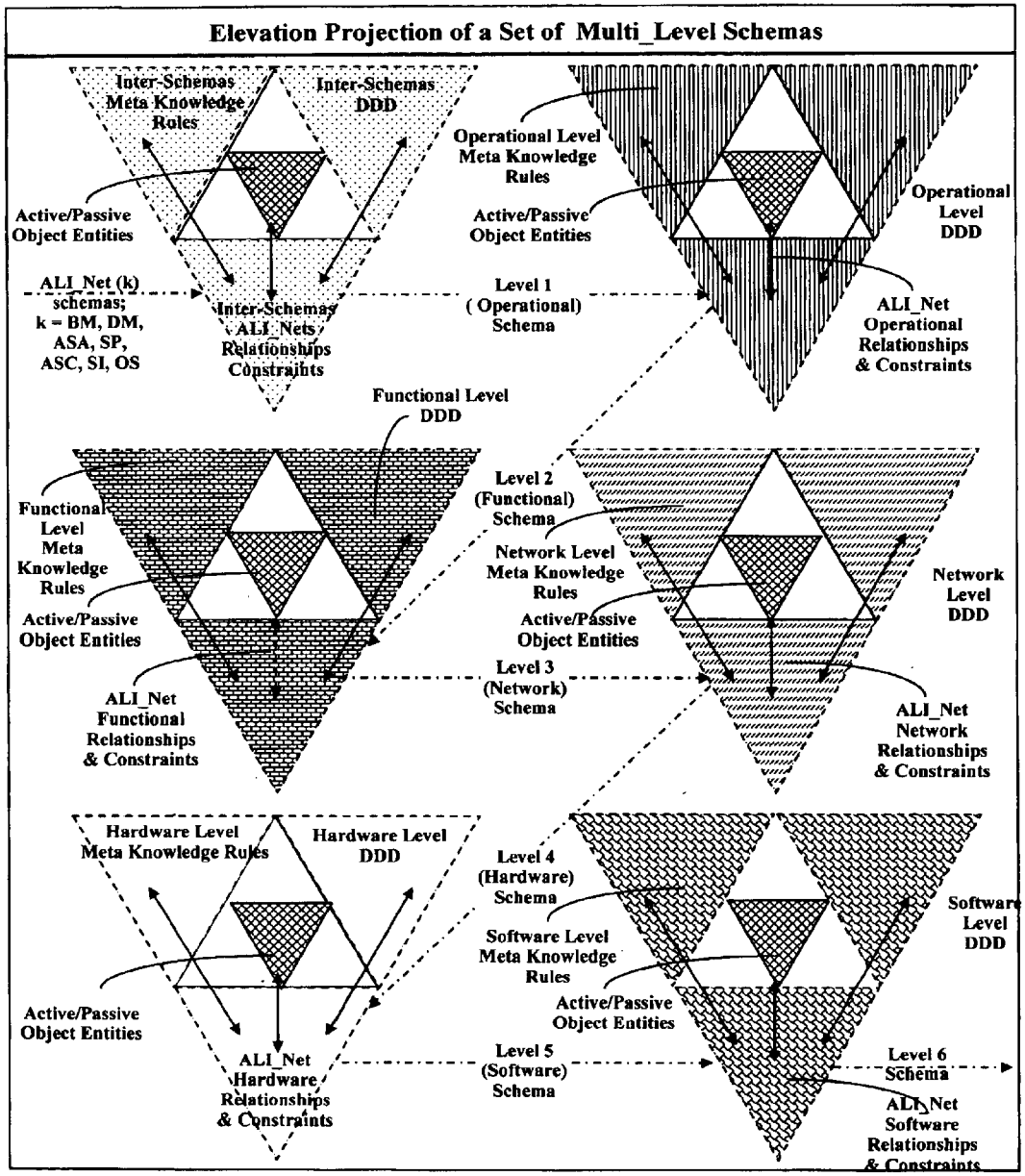
Figure 205: Elevation Projection of a Set of Multi_Level Schemas

| Components of a Multi_Level Schema |||||
|---|---|---|---|---|
| Architecture Level | Architecture Model Components ||||
| Operational Level Schema | ALI_Net Operational Relationships & Constraints | Active/Passive Object Entities | Operational Level Meta Knowledge Rules | Operational Level Data Definition Dictionary |
| Functional Level Schema | ALI_Net Functional Relationships & Constraints | Active/Passive Object Entities | Functional Level Meta Knowledge Rules | Functional Level Data Definition Dictionary |
| Network Level Schema | ALI_Net Network Relationships & Constraints | Active/Passive Object Entities | Network Level Meta Knowledge Rules | Network Level Data Definition Dictionary |
| Hardware Level Schema | ALI_Net Processor Hardware Relationships & Constraints | Active/Passive Object Entities | Hardware Level Meta Knowledge Rules | Hardware Level Data Definition Dictionary |
| Software Level Schema | ALI_Net Process Software Relationships & Constraints | Active/Passive Object Entities | Software Level Meta Knowledge Rules | Software Level Data Definition Dictionary |
| Multi_Level Meta-schema | Inter-Schemas ALI_Nets Relationships Constraints | Active/Passive Object Entities | Inter-Schemas Meta Knowledge Rules | Inter-Schemas Data Definition Dictionary |

Figure 206: Components of a Multi_Level Schema

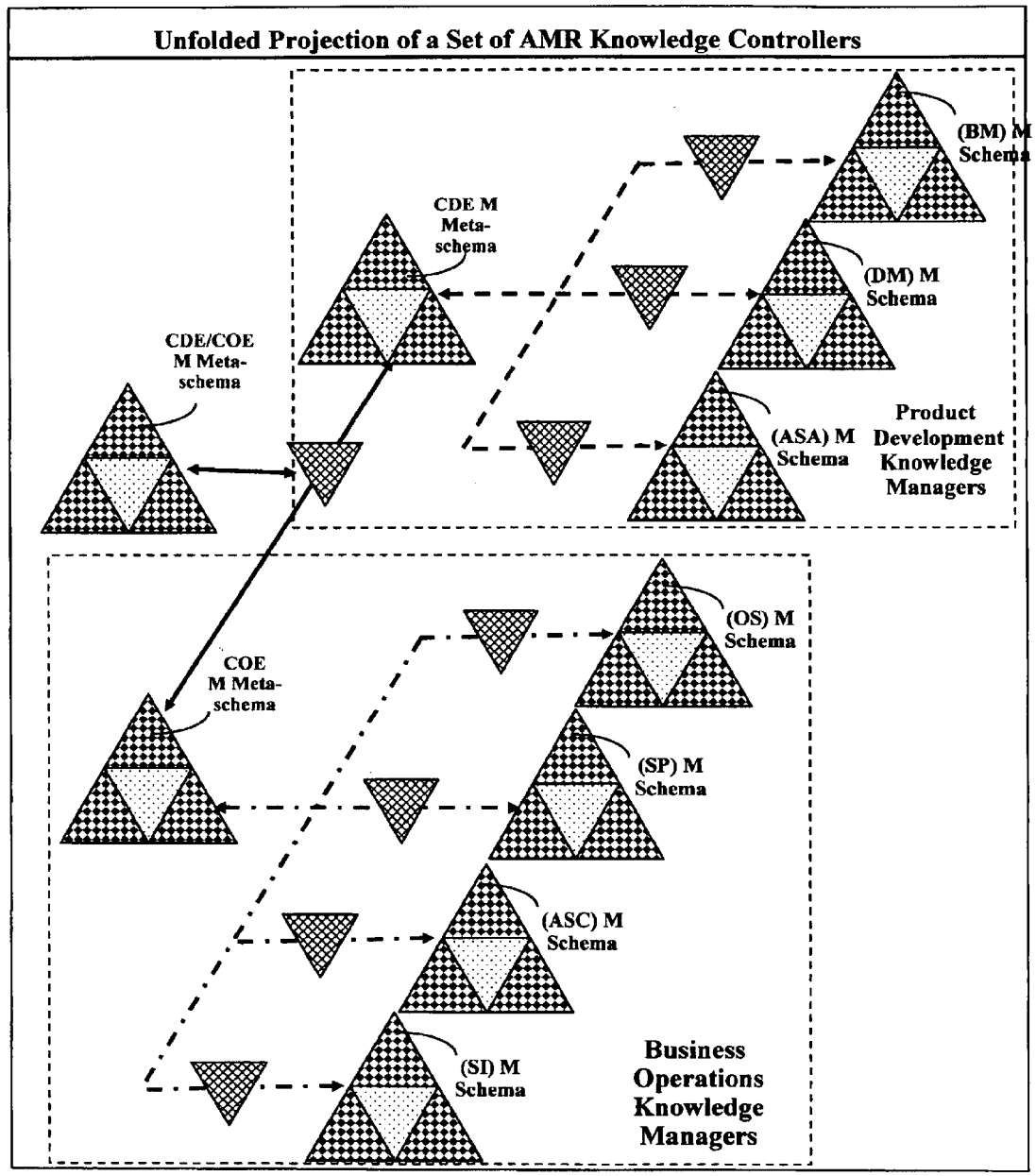
Figure 207: Unfolded Projection of a Set of AMR Knowledge Controllers

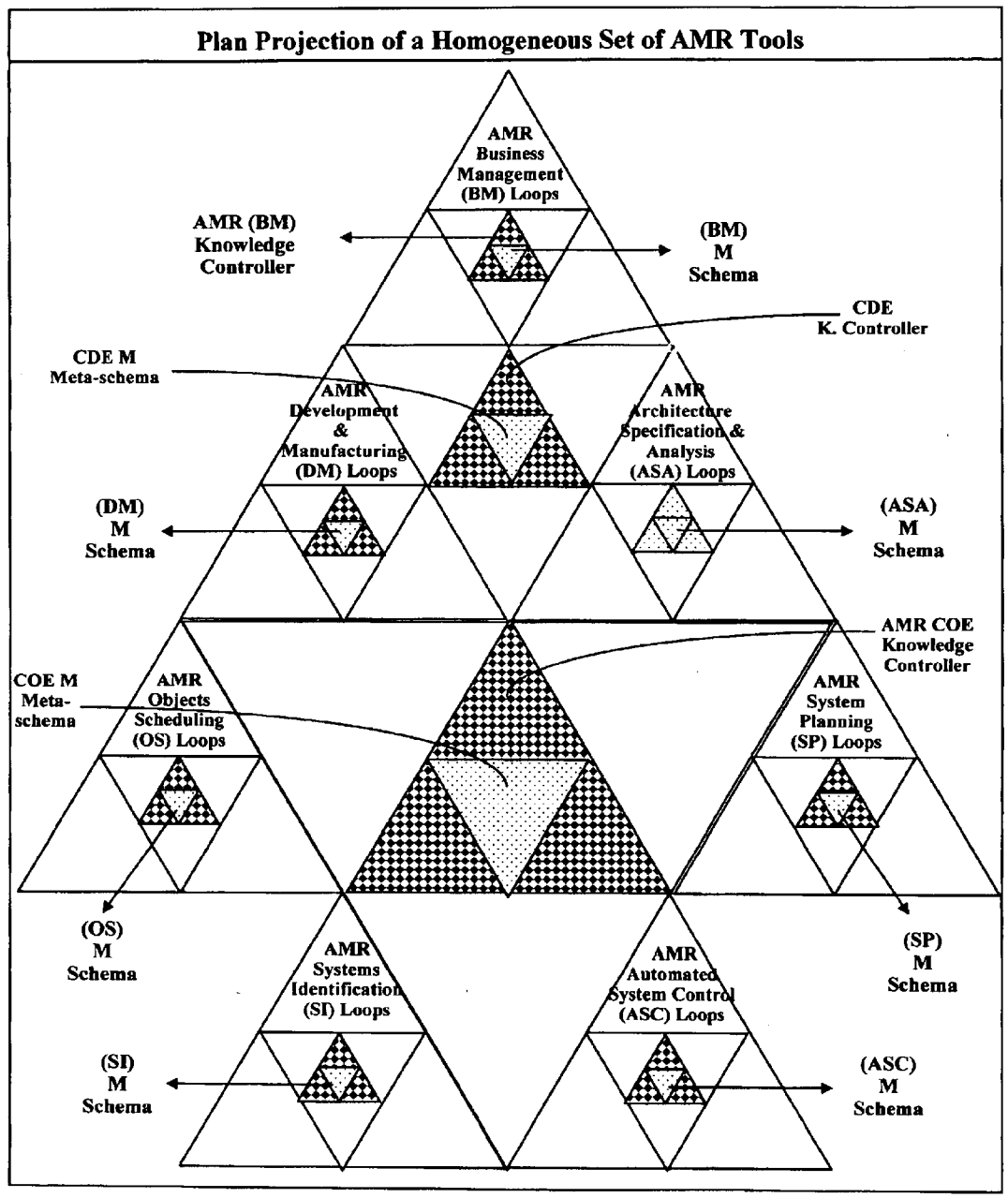
Figure 208: Plan Projection of a Homogeneous Set of AMR Tools

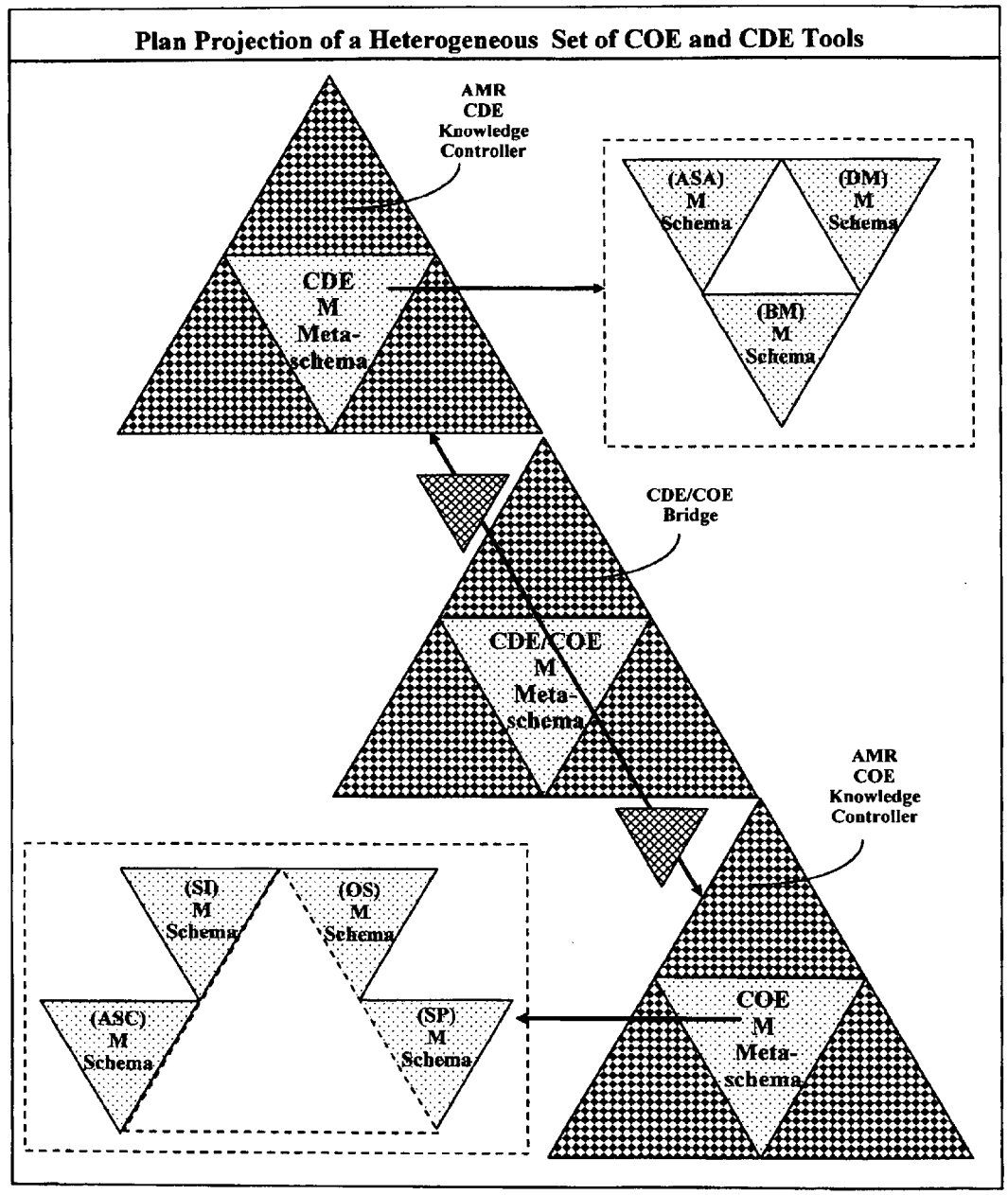
Figure 209: Plan Projection of the Partially Distributed Knowledge Controller Tools Kit

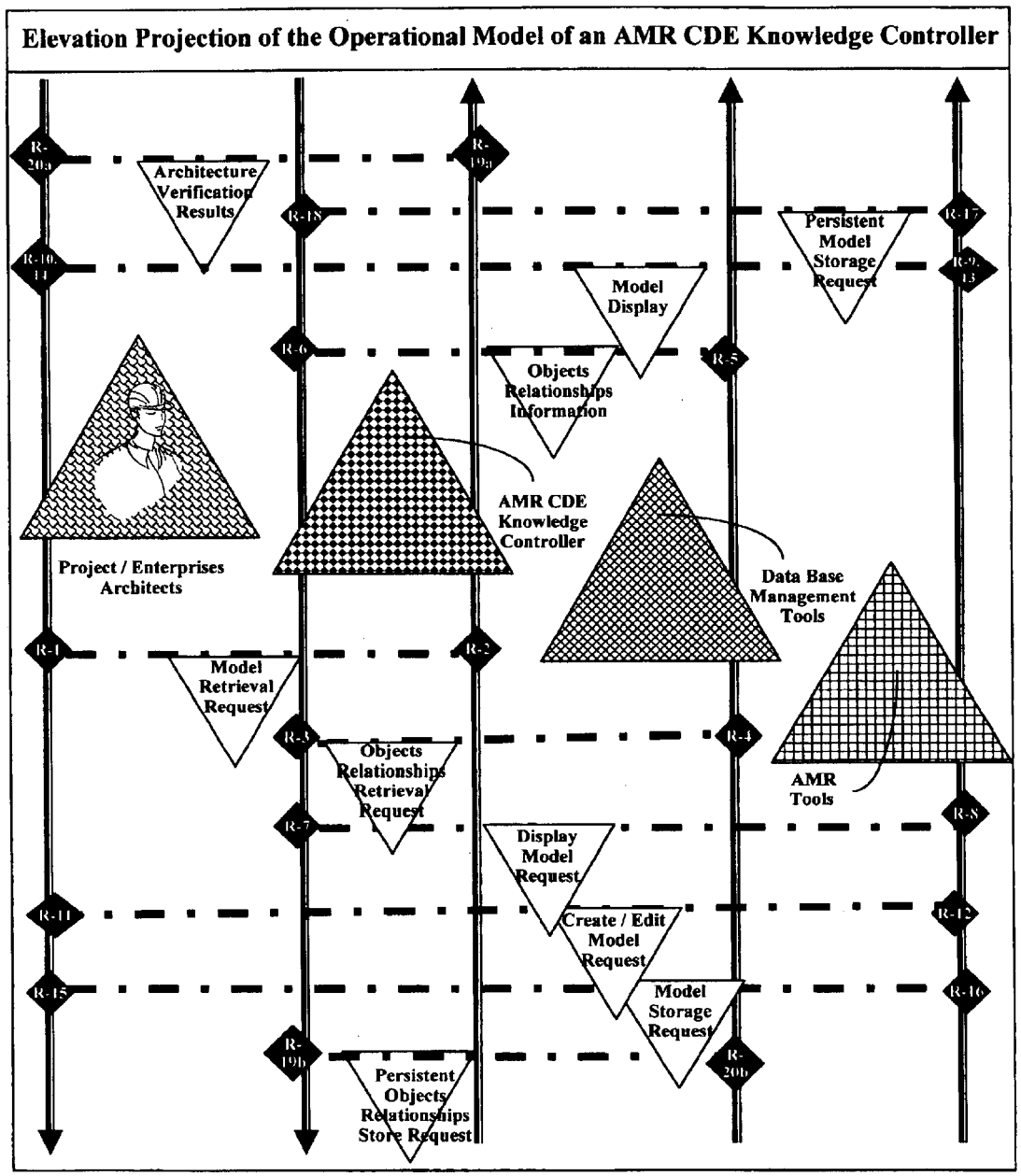
Figure 210: Elevation Projection of the Operational Model of an AMR CDE Knowledge Controller

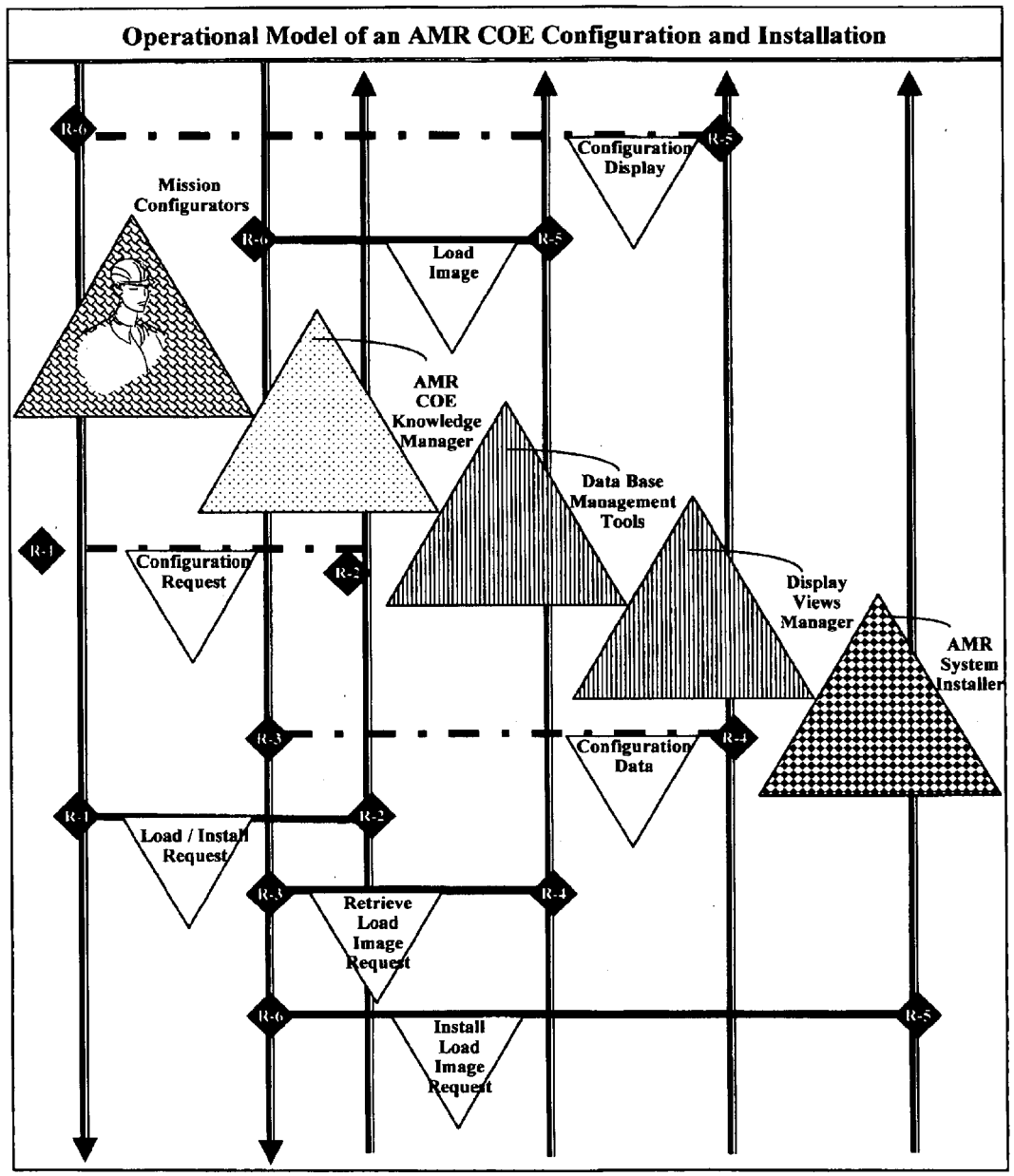
Figure 211: Operational Model of an AMR COE Configuration and Installation

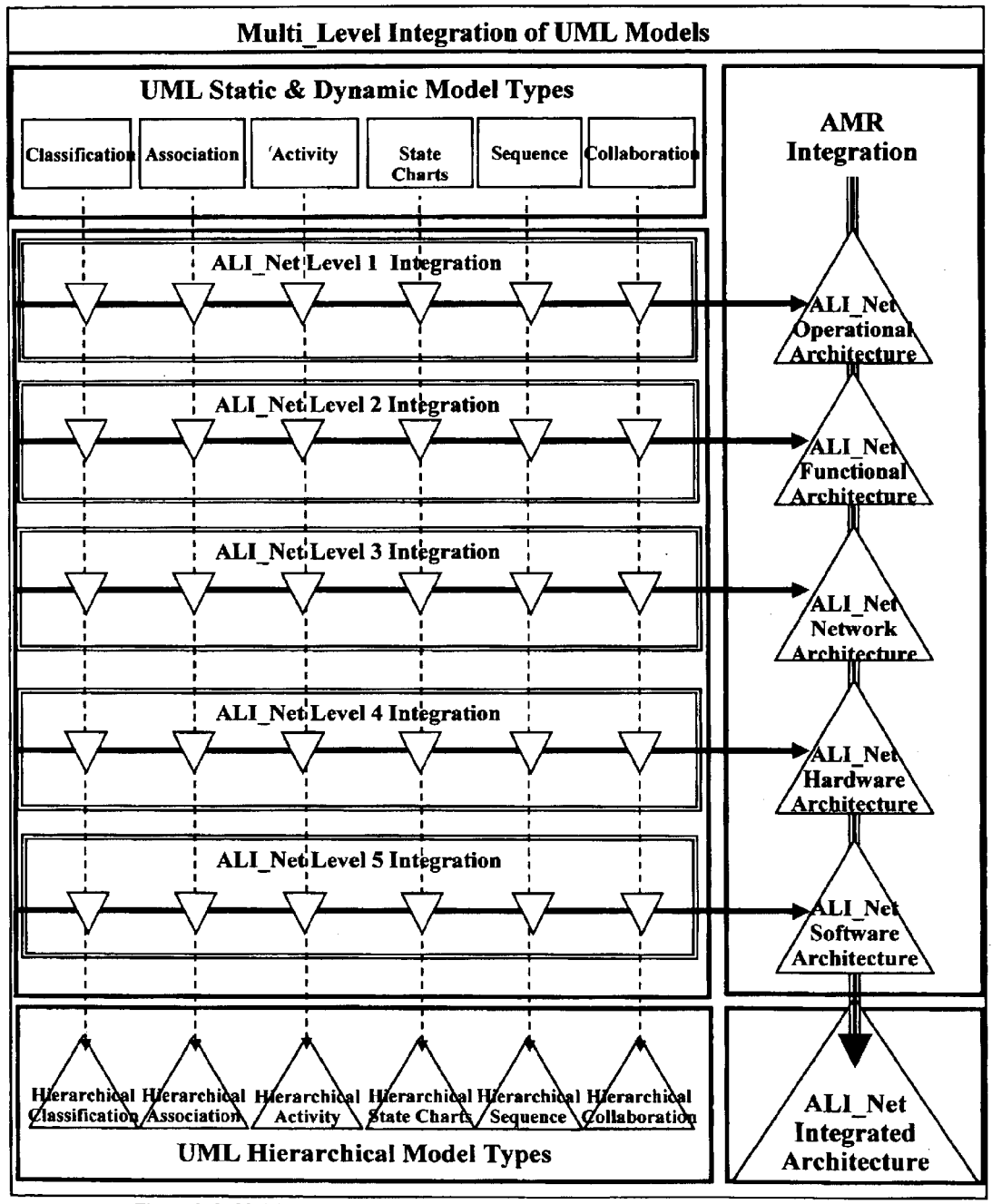
Figure 212: Multi_Level Integration of UML Models

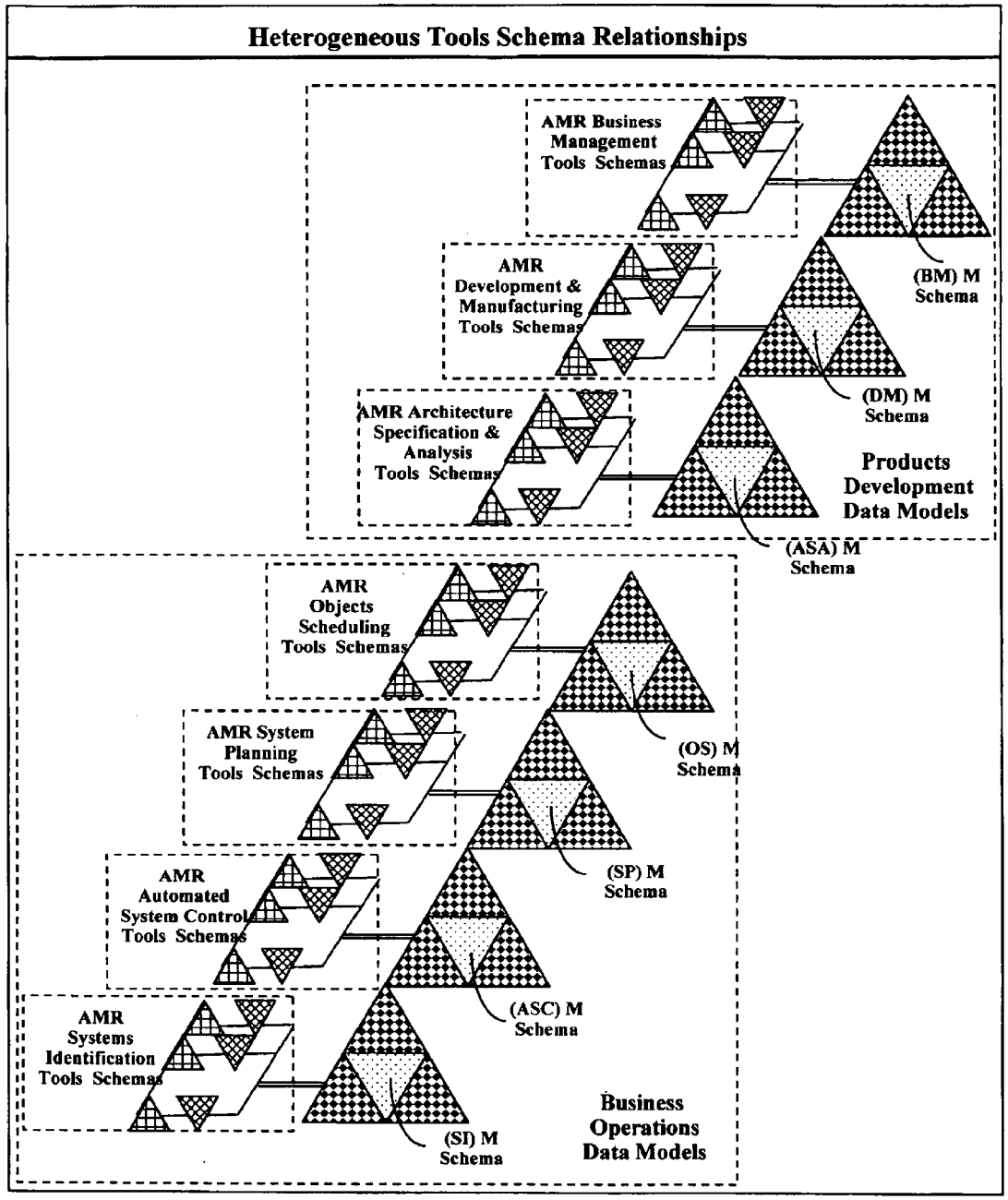
Figure 213: Heterogeneous Tools Schema Relationships

GEOMETRIC DISPLAY TOOLS AND METHODS FOR THE VISUAL SPECIFICATION, DESIGN AUTOMATION, AND CONTROL OF ADAPTIVE REAL SYSTEMS

CROSS-REFERENCE TO RELATED APPLICATIONS

This application does not claim the benefit of prior patent applications. Relevant prior art is referenced in the section "Background of the Invention".

BACKGROUND OF THE INVENTION

This invention relates to open development and run time environments of computer based systems, integrated system architectures, adaptive fuzzy systems, fractal geometry, and formal geometric computer languages.

In recent years, real time systems used in the services, process control, manufacturing, and military industries have grown into complex software-intensive systems composed of aggregates of physical processes, hardware processors, communication networks, software systems, human operators, and users. The following factors contribute to the inherent complexity of a complex system (Athans 1987, Varaiya 1993):

Distributed processing: A complex system requires a wide variety of physical communication interconnections. Distribution of its application functions is dictated by geographical distribution of user locations, economy of design, or high levels of processing loads.

Distributed databases: A complex system has many distributed databases which require stringent control algorithms for data integrity, transaction correctness, transaction atomicity, reconfiguration, and concurrency.

Real-time constraints: A complex system has real-time constraints which cannot be exceeded without causing severe system malfunctions. The vulnerability of real-time systems imposes adaptability requirements on their design and run time operation where system functions may be dedicated to a processor or allowed to migrate among different processors. This entails trade-off analysis of software complexity, reliability, and dynamic load balancing.

Large number of sensors: A complex system may be monitoring thousands or millions of distributed sensors with distributed functions for fail-soft operation, self-diagnosis, self-simulation, and self-correction. The time evolution of these sensors is subject to input/output timing and synchronization problems within the physical processes and their environment.

Large number of variables: A complex system is a strongly interacting multivariable system where a change in one input variable produces a change in many other variables. Input variables are almost always statistical and time variant.

Malicious and accidental interruptions: A complex system may be subjected to criminal activities, jamming of communication lines, or the partial destruction of any of their elements. Significant loss of human life, destruction of equipment, and loss of valuable information may result from malfunction of the sensor instrumentation, the processor hardware, or software.

Human-machine interactions: A complex system performance depends on the interaction between humans and machines performing together. Determination of the proper boundaries separating machines from human functions in a hazardous system environment does not remain static during the system life cycle.

Since the functional performance and reliability of complex systems depends strongly on their software design, major intellectual and financial investment has been directed to the development of tools including object-oriented methods, open programming environments, and life cycle development processes. Effective application of these tools to develop and sustain complex systems is limited by the lack of display methods and tools for the geometric specification and design automation of software systems. In the software world, it is generally acknowledged that the difficult part of building software intensive systems is in the requirements specification, design and testing of the conceptual construct underlying the system, and not in the labor of coding it and testing the fidelity of the generated code (Brooks 1987). This conceptual construct is the set of interlocking concepts: data sets, static and dynamic relationships among data items, algorithms, and invocation of system functions. Major causes of these difficulties are:

Invisibility and unvisualizability problems of software. These problems arise because it is currently perceived that software is not inherently embedded in space and as such has no ready geometric representation in the way that land has maps, a three dimensional physical object has an elevation, plan and side view projections, or a mechanical part has a scale drawing. The unvisuability of the software impedes the process of design within one mind and severely hinders communication among minds.

Complexity problems of software. These problems arise because of the very large number of software elements, states assumed by these elements and the nonlinear interaction between these elements. Technical complexity gives rise to communication problems among team members, which lead to product flaws, cost overruns, and schedule delays.

Changeability problems of software. These problems arise because the software product is embedded in a cultural matrix of applications, users, laws, etc. These may change continually and their changes force change upon the software product.

Conformity problems of software. These problems arise because of the many arbitrary human institutions and systems to which the software interfaces must conform.

The above problems are not resolved by traditional structured design tools or state of the art object oriented tools (Champeaux 1992, Desmond 1999). Both sets of tools fail to provide the necessary mechanisms for the specification, design automation, and test of the conceptual construct of real systems. When functional decomposition and structured design tools are employed several graphs are used to represent data and program hierarchical structures, data flow, control flow, and system state transition. When object oriented tools are employed several graphs, such as Class, Use case, Sequence, Collaboration, and State diagrams, are used to represent object inheritance, object relationships, flow of data, flow of control, patterns of dependency, time sequence, and data base structure. The current generation of both structured design and object oriented design tools suffers from a number of disadvantages:

They do not provide mechanisms for the visual integration of the different types of graphs used to specify object inheritance, object relationships, flow of data, flow of control, patterns of dependency, time sequence, and data base structure. Each of these graphs has different syntax and semantics. For any real system of a significant size, the lack of visual integration mechanisms hinders human assimilation, inspection and analysis of the logical construct underlying multiple views of a specified system.

Syntax and semantics of their graphs do not capture critical aspects of the system operational constructs such as system performance constraints, system security constraints, system reliability constraints, and system fault tolerant constraints.

Syntax and semantics of their graphs do not capture critical aspects of the system static and dynamic configuration constructs such as the geographical allocation of system resources to system nodes, and scheduling of system resources to meet evolving operational system requirements.

Their graphs do not provide visual geometric enforcement of system design semantics such as the spatial containment of system layered structure or its component objects within the geometric region of their container object Their tools fail to provide an integrated geometric specification of the system logical construct. Their tools are not able to enact and adapt the system design to meet changing operational requirements.

The current generation of open programming environments and object oriented object design tools fails to create adaptive systems engineering tools. They fail to resolve invisibility, unvisualizability, complexity, changeability, resource constraints, dynamic scheduling, and spatial semantic problems of software intensive systems. Without a capability to create and capture unambiguous integrated geometric specifications of software intensive systems, current state of the art tools are not enabled with design automation methods. These methods would be used to synthesize, assess and enact planned software intensive products before significant development, integration and test cost are incurred.

References

Alam, M. A., 1977, "Adaptive Spectral Estimation", Joint Automatic Control Conference, Vol. 1, pp. 105–122

Athans, M., April 1987, "Command and Control Theory: A Challenge to Control Science", IEEE Transactions on Automatic Control, Vol. 32, No 4

Bailin, S. C., 1989, "An Object-Oriented Requirements Specification Method", CACM 32, 5

Box, G. E. and G. M. Jenkins, 1976, "Time Series Analysis, Forecasting and Control", Holden Day Brooks, F. P., 1987, "Essence and Accidents of Software Engineering", Computer Champeaux, D., Faure, P., 1992, "A comparative study of Object-Oriented Analysis Methods", JOOP Clarke, D. W., 1969, "Generalized Least Square Estimation of the Parameters of a Dynamic Model", National Physics Laboratory, Report AUTO 26

Coad, P. and E. Yourdon, 1990, "Object-Oriented Analysis", Yourdon Press, Prentice Hall, Englewood Cliffs, N.J.

Desmond, J. P., 1999, "Modeling for The Masses", Component Strategies

Godfrey, K. R., 1969, "Dynamic Analysis of an Oil Refinery Unit under Normal Operating Conditions", Proc. IEEE, 116, pp. 879–892

Jacobson, I., 1987, "Object-Oriented Development in an Industrial Environment", OOP-SLA '87 Conference proceedings, Orlando, Fla.

Makhoul, J., April 1975, "Linear Prediction, A Tutorial Review", Proc. IEEE, vol. 63, no. 4, pp. 561–580

Makhoul, J., October 1977, "Stable and Efficient Lattice Methods for Linear Prediction", IEEE Transactions on Accoustics, Speech and Signal Processing, vol. ASSP-26, pp. 423–428

Makhoul, J., August 1978, "A Class of All Zero Lattice Digital Filters: Properties and Applications", IEEE Transactions on Accoustics, Speech and Signal Processing, vol. ASSP-26, no. 4, pp. 304–314

Messershmitt, D. G., April 1980, "A Class of Generalized Lattice Filters", IEEE Transactions on Accoustics, Speech and Signal Processing, vol. ASSP-28, no. 2, pp. 198–204

O'Dell, J. and J. Martin, "Object-Oriented Analysis and Design", Prentice Hall, Englewood Cliffs, N.J.

Riley, D. and J. P. Burg, 1972, "Time and Space Deconvolution Filters", SEG Convention, Anaheim, Calif.

Rumbaugh, J. et al, 1991, "Object-Oriented Modeling and Design", Prentice Hall, Englewood Cliffs, N.J.

Shaler, S. and S. J. Mellor, 1988 "Object-Oriented Systems Analysis", Yourdon Press, Englewood Cliffs, N.J.

Varaiya, P., February 1993, "Smart Cars on Smart Roads: Problems of Control", IEEE Transactions on Automatic Control, Vol. 38, No 2

BRIEF SUMMARY OF THE INVENTION

This invention provides new, physics-like computational models, called M computational models, which are used to capture and integrate the static and dynamic architecture of a real system. An M model is specified using a formal geometric language called the M Language. Design automation of an M model is carried out using a set of tools called Adaptive Model Reference (AMR) tools. These tools automate the integration of system components into operational systems that can be adapted during run time to meet end users' functional and system performance requirements. Several objects and advantages of the present invention are:

To provide a formal geometric language called the "M Language" supported by automated tools. This language provides syntactically valid visual sentences, and provides semantic and mathematical interpretation of these sentences. The M language provides generalized icons for annotating system objects, and associates a geometric region with each object. These regions are geometrically arranged to specify geometric plan and elevation projections of the static and dynamic structure of a real system. The M language is diagram-based, and is generalized icon-based where the icon of each region provides the dual representation of a physical part (the pictorial image) and a logical part (the meaning).

To provide expert rules and tools used to construct M models. These models are geometric, bipartite, directed, token based models specified using the M language. M models capture in a single geometric graph type the information now typically specified by a set of graph types such as tree graphs, inheritance graphs, state transition graphs, data flow graphs, control flow graphs, and Petri Net graphs.

To provide expert rules and tools used to construct a static architecture of a real system called the "M static architecture". This architecture provides an integrated geometric specification of object classification, association, and composition relationships between the component objects of a real system.

To provide expert rules and tools used to construct a dynamic architecture of a real system called the "M dynamic architecture". This architecture provides a geometric specification of the constrained behavior of a real system. An M dynamic architecture is specified using a new type of networks called "Adaptive Loop Information Nets" (ALI_Nets). Each ALI_Net specifies behavior and functional performance goals of a semantic system partition which is observable, controllable, and configurable.

To provide expert rules and tools used to construct an integrated architecture of a real system, called an "M Integrated Architecture". This architecture integrates into a single geometric graph the operational requirements architecture, which specifies performance constrained interactions between external system objects, and the design control architecture which specifies performance constrained interactions between internal system objects.

To provide expert rules and tools used to bind component objects of a real system into an integrated architecture that can be controlled and adapted to evolving users requirements. The term control is used to mean all aspects of decision making that are applied to adapt a system during its development to compensate for requirement changes and design errors, and during run time operation to compensate for unanticipated operational system conditions.

To provide expert rules and tools used to construct an adaptive multi-level design control scheme which monitors, controls and adapts the behavior of the multilayer integrated architecture of a real system. This scheme is composed of a set of concurrent control processes which are supervised by a set of adaptive supervisory control processes. Lower levels of the adaptive scheme regulate physical resources of a real system. Higher levels control and adapt distributed information processing functions.

To provide expert rules and tools used to specify a group of one or more design control architectures for each operational requirements architecture and specify a group of one or more implementation architectures for each design control architecture.

To provide expert rules and tools used to evaluate static structure metrics and dynamic structure metrics of the integrated architecture of a real system. Static structure metrics include fractal dimension, entropy coupling, and deadlock metrics. Dynamic structure metrics include load, service time, response time, and utilization level metrics.

To provide expert rules and tools used to evaluate cost, value, and performance sensitivity of current and proposed business operations of a real system.

BRIEF DESCRIPTION OF THE DRAWINGS

FIG. 0: Coloring Scheme Legend

FIG. 1: Adaptive Model Reference Procedures

FIG. 2: M Cellular Display

FIG. 3: Geometric Encapsulation of Object Resources

FIG. 4: Geometric Composition of an Object Region

FIG. 5: Geometric Composition of a Resource Region

FIG. 6: Folded and Unfolded Object Regions with an Internal Shared Resource Region FIG. 7: Folded and Unfolded Object Regions with an Internal Private Resource Region FIG. 8: Folded and Unfolded Resource Region FIG. 9: Folded and Unfolded Public Interface Region of an Object FIG. 10: Isomorphic Projections of an Unfolded Region FIG. 11: Folding and Unfolding Rules of the Real Numbers Set FIG. 12: Geometric Composition of an M Atomic Connection FIG. 13: Geometric Projections of a Multi-layer Stack of Objects FIG. 14: Encapsulation of a Resource Region FIG. 15: Geometric Projection Rules of Multiple Stacks of Layered Objects FIG. 16: Features Table of Various Object Oriented Design Methods FIG. 17: Static Models used by Object Oriented Design Methods FIG. 18: Dynamic Models used by Object Oriented Analysis Methods FIG. 19: The Not-integrated Set of Dynamic and Static Models used by Object Oriented Design Methods FIG. 20: Geometric Representation Rules of Hierarchical Data Structures FIG. 21: Geometric Representation Rules of Hierarchical Function Structures FIG. 22: Geometric Representation Rules of State Transition Graphs FIG. 23: Geometric Representation Rules of Data Flow Graphs FIG. 24: Geometric Representation of Mode B Data Flow Graphs FIG. 25: Geometric Representation of Petri Net Token Based Graphs FIG. 26: Folded Geometric Representation of an M Model FIG. 27: Geometric Representation of Logic Primitives FIG. 28: A Program Fragment Represented Using Geometric Primitives FIG. 29: Plan Projection of AMR Construction Procedures and Tools FIG. 30: Plan Projection of AMR Procedures and Tools FIG. 31: Plan Projection of AMR Knowledge Controller FIG. 32: Elevation Projection of AMR Tool-Supported Procedures FIG. 33: Plan Projection of a Real System FIG. 34: Elevation Projection of a Real System FIG. 35: Elevation Projection of an M Iterative Map of a Real System FIG. 36: Plan Projection of an M Iterative Map of a Real System FIG. 37: Time-Space Evolution Grid FIG. 38: Operational Model of AMR Architecture Specification & Analysis Tools FIG. 39: AMR Architecture Specification Procedure FIG. 40: Lower Level Composition of AMR Architecture Specification Procedures FIG. 41: Geometric Representation of Object Association Models FIG. 42: Geometric Interface of Object Association Models FIG. 43: Types of Object Constraints FIG. 44: Geometric Representation of an Object Classification Model FIG. 45: Geometric Representation of a Multiple Inheritance Model FIG. 46: Fractal Representation of a "Part_Of" Relationship FIG. 47: Fractal Representation of a "Has_A" Object Relationship FIG. 48: Fractal Representation of a "Knows_A" Object Relationship FIG. 49: Fractal Representation of a Multiple Object Attribution Relationship FIG. 50: Plan Projection of an Integrated Static Object Model FIG. 51: Fractal Composition of a System FIG. 52: Fractal Composition of Object Attributes FIG. 53: Attribute Sets of an Object FIG. 54: Orthogonal Projection of an Object FIG. 55: Object/Loop State Graphs FIG. 56: Geometric Representation of a Fuzzy Object FIG. 57: Multi-value Logic Representation FIG. 58: Orthogonal Projection of Aggregated Objects FIG. 59: Dynamic Architecture Model FIG. 60: ALI_Net Loop Composition FIG. 61: Plan Projection of an ALI_Net Composition Model FIG. 62: Plan Projection of an Aggregated Set of ALI_Nets FIG. 63: Open/Closed Designation of a Set of Object Loops FIG. 64: Cascade Aggregation Structures of a Set of Object Loops FIG. 65: Elevation Projection of Cascade Aggregation Structures of a Set of Object Loops FIG. 66: Parallel Aggregation Structures of a Set of Object_Loops FIG. 67: Elevation Projection of Parallel Aggregation Structures of a Set of Object_Loops FIG. 68: Multi-layer ALI_Net Composition of an Integrated Architecture FIG. 69: Elevation Projection of a Layered Object Loop FIG. 70: Fractal Representation of a Corba and a COM Object FIG. 71: Fractal Representation of an Interface Message Set FIG. 72: An Example of Two Connected Loops FIG. 73: An M Compound Connection FIG. 74: Basic Two Sided Communication Construct FIG. 75: Loop_Fork_Communication Construct FIG. 76: Loop_Branch_Communication Construct FIG. 77: Loop_Join_Communication Construct FIG. 78: Elevation Projection of the Connected Two Loop Example FIG. 79: High Level Plan Projection of the Connected Two Loop System Example FIG. 80: Lower Level Plan Projection of the Connected Two Loop System Example FIG. 81: "Message/Data/objects" Wiring Diagram, The Two Loop System Example FIG. 82: Multi Level Wiring Diagrams of Container and Contained Objects FIG. 83: Layered Composition of an ALI_Net Dynamic Graph FIG. 84: An ALI_Net Business Tracking Graph FIG. 85: An Aggregated ALI_Net Business Tracking Graph FIG. 86: Categories of Cognitive Models FIG. 87: Fuzzy Linguistic Models FIG. 88: The Two Design Space Models FIG. 89: Elevation Projection of the Object Loops of an Integrated Architecture FIG. 90: Geometric Representation of an Information Access Loop FIG. 91: ALI_Net Components of an Integrated Architecture FIG. 92: Layered structure of Nettronic, Infotronic and Mechatronic Container Objects FIG. 93: Elevation Projection of Nettronic, Infotronic and Mechatronic Object Stacks FIG. 94: Plan Projection of Nettronic, Infotronic and Mechatronic Object Stacks FIG. 95: Cellular Projections of a Set of Infotronic and Mechatronic Objects FIG. 96: Plan Projection of an Infotronic Object FIG. 97: Elevation Projection of a Two Node Architecture FIG. 98: Geometric Projection of a Cellular System Architecture FIG. 99: Multi-Dimensional Folding of an Object Region FIG. 100: Mapping of Virtual State Space Grid to Physical Space Grid FIG. 101: Euclidean Physical Space Grid FIG. 102: Operational Model of AMR Planning, Scheduling and Control Tools FIG. 103: AMR Planning Procedure FIG. 104: Geographical Configuration of System Objects FIG. 105: Specification of Geographical Constraints FIG. 106: Mechatronic Object Navigation Mechanisms FIG. 107: Cellular Allocation of Mechatronic and Infotronic Objects FIG. 108: Communication Connections FIG. 109: Human & Physical Objects Scheduling Procedure FIG. 110: Operational Model of the AMR Automated System Control Scheme FIG. 111: Plan Projection of the AMR Control Scheme of an Automated System FIG. 112: Two Layers Elevation Projection of the AMR Control Scheme of an Automated System FIG. 113: Three Layers Elevation Projection of the AMR Control Scheme of an Automated System FIG. 114: Dynamic Relationship Constraints Interface FIG. 115: AMR_Loop_Process Data Structures FIG. 116: AMR Message Header Format FIG. 117: ALI_Net Message Header Format FIG. 118: Plan Projection of an AMR Concurrent Application Control Process FIG. 119: Subloops of a Concurrent Application Control Process FIG. 120: High Level Control Loops Binding Supervisory and Concurrent Application Control Processes FIG. 121: High Level Elevation Projection of an AMR Supervisory Control Process FIG. 122: Compound Connections of Concurrent Application Control Processes FIG. 123: High Level Plan Projection of a Concurrent AMR Supervisory Control Process FIG. 124: Subloops of a Concurrent AMR Supervisory Control Process FIG. 125: AMR Overload Monitor FIG. 126: Loop Cycle Window Measurements FIG. 127: Internal structure of AMR Learning Controller FIG. 128: Elevation Projection of Model Estimation and State Prediction Procedure (The Impulse Response Ladder)

FIG. 129: Elevation Projection of Model Estimation and State Prediction Procedure (The General Auto Regressive Ladder)

FIG. 130: Elevation Projection of Model Estimation and State Prediction Procedure (The PreWhitening Ladder)

FIG. 131: Elevation Projection of Model Estimation and State Prediction Procedure (The Optimum Dead Time Impulse Response Ladder)

FIG. 132: Elevation Projection of Model Estimation and State Prediction Procedure (The Time Shifted, Compact Form Ladder)

FIG. 133: AMR Performance Controller

FIG. 134: Lower Level Composition of the AMR Performance Controller

FIG. 135: Lower Level Composition of the AMR Fuzzy Control Engine

FIG. 136: Fuzzy Performance Control Membership Functions

FIG. 137: Control Rules of Loop_Response_Time (LRT) Measurements of Critical Loops FIG. 138: Control Rules of Predicted Loop_Response_Time (LRT) Measurements of Critical Loops FIG. 139: Control Rules of Loop_Load (LL) Measurements of Critical Loops FIG. 140: Control Rules of Predicted Loop_Load (LL) Measurements of Critical Loops FIG. 141: Control Rules of Loop_Service_Time (LST) Measurements of Critical Loops FIG. 142: Control Rules of Predicted Loop_Service_Time (LST) Measurements of Critical Loops FIG. 143: Control Rules of Loop_Resource_Utilization_Level (LRUL) Measurements of Critical Loops FIG. 144: Control Rules of Predicted Loop_Resource_Utilization_Level (LRUL) Measurements of Critical Loops FIG. 145: Business Management ALI_Nets FIG. 146: Lower Level Composition of Business Management ALI_Nets FIG. 147: Value Cost Trade-off Analysis FIG. 148: AMR Value Cost Analysis FIG. 149: AMR Parallel Simulation Engine FIG. 150: Three Basic Categories of Work Break-Down Structures FIG. 151: Work Break-Down Structure Relationships FIG. 152: A Set of ALI_Net Dynamic Graphs FIG. 153: A Set of Business Control Graphs FIG. 154: Overview of the Pull Down Menus of AMR Tools FIG. 155: Architecture Categories Rules FIG. 156: Category Specification Rules FIG. 157: Project Region FIG. 158: Project Instances Data Base FIG. 159: Project ALI_Net Specification FIG. 160: ALI_Net Type Specification FIG. 161: Object Region FIG. 162: Object Type Specification FIG. 163: Object Instances Data Base FIG. 164: Storage Region FIG. 165: Storage Type Specification FIG. 166: Storage Instances Data Base FIG. 167: Pipe Region FIG. 168: Pipe Type Specification FIG. 169: Pipe Instances Data Base FIG. 170: Loop Region FIG. 171: Loop Type Specification FIG. 172: Loop Instances Data Base FIG. 173: Model Manipulation FIG. 174: Containment Relationship Constraints FIG. 175: Association Relationship Graph FIG. 176: Association Constraints Specification FIG. 177: Loop Relationship Constraints FIG. 178: Architecture View Types FIG. 179: Region View Types FIG. 180: Structural Analysis Reports FIG. 181: Dynamic Analysis Reports FIG. 182: Real System Planning FIG. 183: Specify Geographical Constraint of Infotronic & Organizational Objects FIG. 184: Plan Projection of a Node Configuration Example FIG. 185: Specify Geographical Constraint of Mechatronic Objects FIG. 186: Plan Routing & Connectivity of Mechatronic Objects FIG. 187: AMR Supervisory Control FIG. 188: AMR Monitoring_Views Controller FIG. 189: AMR Learning Controller FIG. 190: AMR Performance Controller FIG. 191: AMR Configuration Controller FIG. 192: AMR Security Controller FIG. 193: AMR Reliability Controller FIG. 194: Equipment Scheduling FIG. 195: Personnel Scheduling FIG. 196: ALI_Net Scheduling FIG. 197: Real System Identification FIG. 198: AMR Project Management FIG. 199: Plan Projection of the AMR Tools Kit FIG. 200: Plan Projection of an AMR Knowledge Controller FIG. 201: Plan Projection of the Tool Kit M Schemas FIG. 202: Plan Projection of Inter-connections Between M Schemas FIG. 203: Isomorphic Plan Projection of Inter-connections Between M Schemas FIG. 204: Elevation Projection of a Multi_Level Architecture FIG. 205: Elevation Projection of a Set of Multi_Level Schemas FIG. 206: Components of a Multi_Level Schema FIG. 207: Unfolded Projection of a Set of AMR Knowledge Controllers FIG. 208: Plan Projection of a Homogeneous Set of AMR Tools FIG. 209: Plan Projection of the Partially Distributed Knowledge Controller Tools Kit FIG. 210: Elevation Projection of the Operational Model of an AMR CDE Knowledge Controller FIG. 211: Operational Model of an AMR COE Configuration and Installation FIG. 212: Multi_Level Integration of UML Models FIG. 213: Heterogeneous Tools Schema Relationships

DETAILED DESCRIPTION OF THE INVENTION

In this invention a tools-supported formal geometric visual language called the M Language is specified where:

Formal language means that the language not only specifies syntactically valid visual sentences, but also provides semantic and mathematical interpretation of these sentences. This interpretation is used to analyze, verify, validate, control, and adapt the run time behavior of the developed system.

Geometric language means that the language not only provides generalized icons for annotating system objects, but also associates a geometric region with each object. These regions are geometrically arranged to specify the spatial elevation and plan projections of 1) static system structure constraints such as containment, association and connection relationships of the system components, 2) dynamic system structure constraints such as performance, reliability, and security constraints of the interconnected system components, and 3) the implications of static and dynamic system constraints on the system data flow, control flow, and state transition relationships.

Visual language means that the language is not only diagram-based, but is also generalized icon-based. By generalized icon, we mean that the icon of each region provides the dual representation of a physical part (the pictorial image) and a logical part (the meaning).

The M language is used to specify a new class of systems engineering tools called Adaptive Model-Reference (AMR) tools. These tools are specified using the following four sets of procedures as shown in FIG. 1:

AMR Architecture Specification and Analysis Procedures. These procedures provide rules used by system architects and designers to construct, adapt, and verify the blue prints of the integrated system design using the geometric language of this invention as shown in procedures 1–5, and 9–10.

AMR Development and Manufacturing Procedures. These procedures are used by developers of information objects and fabricators of physical objects to create objects specified in the blue prints of the system architecture design.

AMR Planning, Scheduling, and Enactment Procedures. These procedures provide rules used by business managers and system operators to plan business operations, schedule resources, enact, control and sustain the run time behavior of systems specified using the geometric language of this invention as shown in procedures 5, 7, 8, 9, and 10.

AMR Business Management Procedures. These procedures provide rules used by project managers to construct, adapt, and verify the blue prints of the business missions performed by real system operations as shown in procedure 6.

Procedure 1: Tessellation Rules of an M Cellular Display

Geometric models of this invention are constructed using a cellular display called the M cellular display. This display is virtual, tessellated, and wraparound. It is virtual and tessellated using equilateral triangle tiles such that there are no gaps and no tiles overlap as shown in FIG. 2. The wraparound requirement implies that the display is tiled such that when a point is guided off the left side of the display, it appears at the same height on the right side. Similarly when a point moves off the top of the display area, it reappears at the corresponding position on the bottom. The virtual cellular requirements imply that the display is partitioned into cells where each cell is composed of two adjacent triangular display tiles as shown in FIG. 2, and each cell represents a unique segment in the system spatial state grid. A set of one or more triangular display tiles are used, in the following procedures, to construct primitives of the formal geometric visual language of this invention.

Procedure 2: Geometric Production Rules of Object Regions

Geometric representation of systems is carried out using the following five steps procedure:

First, the symbol Δ is used to define the geometric region of an abstract or a real system, its named mechatronic or infotronic component objects, or the named transformation functions performed by the component objects. A real system is defined as a set of one or more physical processes, such as sensors, energy transformation, material and information transfer equipment; data processors and their associated software; and human operators and system users. The system region Δ, specifies the boundaries of a geometric area which contains the set of geometric regions of all of it's component objects. It follows that the system geometric root region Δ is a container of a set of object regions Δ where system component objects reside. An object, whose region consists of a single tile, is called a visually atomic object if it's internal structure is not visually specified. An object which is not visually atomic is called a visually compound object.

Second, as shown in FIG. (3-c), an object region Δ, of each visually specified object, is composed using four special types of geometric regions called atomic regions. These regions are called an operation region; an attribute or a resource region; a referential attribute region; and a public interface region where, as shown in FIG. 3:

An operation region Δ is an active geometric region used to specify the set of object operations called methods or member functions required to access object variables. The set of operations performed by an object defines the operational interface or message protocol of the object.

An attribute or a resource region ▽ is a passive geometric region used to specify the set of attribute types (or variables), attribute values of a place, such as computer memory, where these attributes reside, or physical resources, such as an operational facility or a hardware processor, required to house and execute object functions.

A referential attribute region ▽ is a passive geometric region used to specify the set of referential attributes which specify linking, embedding, and containment relationships with other objects.

A public interface region ▽ is a passive geometric region used to export the named object message protocol. In other words define the list of the named object operations, their signature and type of attributes provided by the container object and its contained objects.

A loop connections duct, a tube  used to house, represent, the set of loop connections supported by an object.

Third, each object region is composed of a set of one or more method regions as shown in FIG. 4. In this figure each composition pattern resides within the minimum containing rectangle allocated to the root object region, called the initiator object region. Furthermore, if all methods share the same set of object attributes then all method regions are adjacent to a single object resource region as shown in FIG. 4. Similarly, each resource region can be decomposed into a set of one or more resource regions as shown in FIG. 5. In this figure each composition pattern resides within the minimum containing rectangle allocated to the root resource region, sometimes called the initiator resource region. To create planar displays of connections between various method regions, method regions may be folded or unfolded. By applying the tessellated wraparound requirements of the virtual display area, as specified in procedure 2, isomorphic geometric representations of folded/unfolded method regions are constructed as specified in FIGS. 6 and 7. Similarly FIG. 8 illustrates the folding/unfolding rules of the resource regions of an object and FIG. 9 illustrates the folding/unfolding rules of the resource regions of the public interface of an object. The unfolded patterns of FIGS. 6 to 9 can be equally represented by the unfolded pattern shown in FIG. 10. Application of these rules to the folding and unfolding of the real numbers set is shown in FIG. 11.

Fourth, various geometric regions are connected to form an atomic connection which is bipartite, directed, and token based as shown in FIG. 12. These connections are constructed using the Edge symbol →. The bipartite requirement disallows the connection between two regions of the same type i.e. only a $\Delta$ region can only be connected to a $\nabla$ region and vice versa. Two basic types of atomic connections are defined. The first type of connection, called staged connection as shown in FIG. (12-$a$), is normally used to specify the flow of material or energy resources consumed or generated by system physical objects where the outputs of the producer object are deposited into a shared storage resource region where they are subsequently used by the consumer object. The second type of connection, called pipe connection as shown in FIG. (12-$b$), is used to specify the communication between a set of collaborating objects. Pipe connections are established using public interfaces of producer objects. These connections are used to represent push and pull communication models as shown in procedure 5.2.1. As shown in FIG. (12-$c$), an equivalent Petri Net can be created for FIGS. (12-$a$) and (12-$b$). FIG. (12-$c$) lacks an explicit representation of different communication semantics captured in FIGS. (12-$a$), (12-$b$), and (73). See procedure 5.2.1 for further details.

Fifth, two types of geometric projections, called plan projection and elevation projection, are constructed for a multilayered stack of objects as follows:

The elevation projection is constructed by assigning, for each layered object, FIG. (13-$a$), an object region $\Delta$ and an interface region $\nabla$ as shown in FIG. (13-$b$).

Each object region is recursively contained within the geometric region of the higher level container object as shown in FIG. (13-$c$). For a set of n layered objects, this process is repeated n times.

The resource region of each object, including abstract data types, may be encapsulated as shown in FIG. 14. This process can be recursively applied until each resource region represents passive data structures, i.e. not abstract data structures which are not encapsulated by an object.

The above procedure can be applied to construct container objects containing a set of co-centric regions where the order of region containment is the same as the order of layering of system objects. This implies that the most inner object region represents the lowest layered object. Plan projections generated by this procedure provide an intrinsic means for preserving the integrity of the designed system layered structure where objects cannot be connected to objects belonging to non-adjacent layers. As shown in FIG. 15, geometric projections of multiple stacks of layered objects can be constructed by the above procedure. FIGS. 13 and 14 provide visual representation of containment relationship constraints between layered objects. Other types of constraints such as association and value constraints are further incorporated in the system visual specification as shown in FIGS. 43 and 114

Procedure 3: Geometric Production Rules of an M Model

System specifications are usually developed using traditional functional decomposition and structured design methods or state of the art object oriented methods listed in FIG. 16. These methods provide procedures for the specification of a system's underlying static and dynamic models as shown in FIGS. 17, 18 and 19. At least four types of graphs are used by structured design and object oriented methods. The first type, called a tree graph, is used to specify the hierarchical function and data structures of the designed system. The second type, called a state transition graph, is used to specify various system states (operating modes) and state transitions triggered by internal and external events handled by the system. For each of the system modes, the third type, called a data and a control flow graph, is used to specify the input/output data and control flow relationships between the system transformation functions. The fourth type, a Petri Net graph, has a syntax which enables system designers to capture, in the same graph, both state and data flow system specifications. In this invention information provided by the above four types of graphs are captured into a single geometric graph, called an M model, using the following seven step procedure:

First, a resource region $\nabla$ is allocated to each child vertex, at each level, of the hierarchical data structure tree graph. As shown in FIG. (20-$a$) example, an optional generalized icon may be associated with the geometric region. Child regions, at each level, are aggregated into a parent compound data structure resource region. These rules generate the folded geometric representation of the hierarchical data structure graph as shown in FIG. (20-$b$).

Second, a function region $\Delta$ is allocated to each child vertex, at each level, of the hierarchical function structure tree graph. As shown in FIG. (21-$a$) example, an optional generalized icon may be associated with the geometric region. Child regions, at each level, are aggregated into a parent compound function region. These rules generate the folded geometric representation of the hierarchical function graph as shown in FIG. (21-$b$).

Third, a resource region $\nabla$ is allocated to each event $e_i$ in the state transition graph and a function region $\Delta$ is allocated to each action. As shown in FIG. (22-$a$) an optional generalized icon may be associated with the different types of geometric regions. These rules generate the unfolded geometric representation of the state transition graph as shown in FIG. (22-$b$).

Fourth, a resource region $\nabla$ is allocated to each data flow $D_i$ in the data flow graph and a function region $\Delta$ is allocated to each function $F_i$. This rule, in conjunction with procedure 2 rules, are applied to the data flow graph associated with each system mode. As shown in FIGS. (23-$a$) and (24-$a$) an optional generalized icon may be associated with the different types of geometric regions. These rules generate the unfolded geometric representation of the data flow graphs of each system mode as shown in FIG. (23-b) and (24-b).

Fifth, the data flow graphs of each system mode can be combined in a single token based Petri Net graph as shown in FIG. (25-a). This figure assimilates information provided in FIGS. (23-a) and (24-a). Similarly FIGS. (23-b) and (24-b) can be assimilated to generate FIG. (25-b). This figure provides an unfolded geometric representation of data flow information for both system modes.

Sixth, procedure 2 rules are used to generate a single integrated geometric graph as shown in FIG. 26. This graph integrates the folded geometric representation of all information provided in FIGS. (20–25). FIG. 26 provides visual integrated view of static and dynamic system structures.

Seventh, processing logic of each function, or object method can be specified using the set of logic primitives shown in FIG. 27. Each generalized icon of these primitives has the trio representation of a physical part (the pictorial image), a logical part (the meaning) and a process part (the computation). FIG. (28-b) illustrates how FIG. 27 primitives can be used to generate geometric representation of the program fragment shown in FIG. (28-a).

Procedure 2 and 3 rules are used to develop the geometric plan and elevation projections shown in FIGS. (29–32) respectively. FIG. 29 provides a plan projection of the set of AMR procedures and tools presented in this invention. Plan projection of these procedures and tools is shown in FIG. 30. These tools are supported by two knowledge controllers whose plan projections are shown in FIG. 31. Plan projections of FIGS. (29–31) are complemented with the elevation projection shown in FIG. 32.

These projections illustrate how the "tools-supported" procedures of this invention can be used by project managers, system architects, designers, developers, fabricators and operators to manage, specify, analyze, and create adaptive computer based systems as shown in the following procedures.

Procedure 4: Geometric Production Rules of an M Iterative Map

This procedure provides the framework used for the geometric specification of the internal design structure of a real system and its dynamic interaction with its external environment as follows:

First, the plan and elevation projections of a real system and its outer environment are outlined as shown in FIGS. 33 and 34. In these projections:

An External System region Δ, named XS, is defined. This region contains all automated systems, physical processes, and organizations that are not included within the boundary of a real system under investigation. As shown in procedure 5.2.2, the XS region to construct the external design control model, called the operational requirements architecture model of a real system as described in procedure 5. This model specifies and controls the behavior of business operational activities performed by external human objects. These activities provide a framework for specifying the desired functional and behavioral specification of the operational requirements of a distributed real system RS under investigation. Objects contained within the external system region are called external system objects. The multi-layered plan and elevation projections of these objects can be generated using procedure 2 rules.

A Real System region Δ, named RS, is defined. This region contains all objects, within the stated system boundary, that function to satisfy the desired system behavior. This region is used to construct an internal system design control model, called the design control architecture model as described in procedure 5. This model is used to specify and control the behavior of activities performed by various real system objects. Objects contained within the internal system region are called internal system objects. The multi-layered plan and elevation projections of these objects can be generated using procedure 2

The resource regions, named XSS and SS, contain all the state variables, and resources, of the XS and S regions respectively.

All interactions between external and internal system communicating objects are specified using pipe connections of the type shown in FIG. 12-b. These connections are established using the pull and push public interfaces of both external and internal system objects.

Second, an integrated system evolution model is specified using an iterative system map called the M iterative map as shown in FIGS. 35 and 36. By an integrated model, we mean that the model can be applied to represent the evolution of both the container and contained system objects at all levels of system aggregation and abstraction. System evolution is defined as both spatial and time evolution of systems. Spatial evolution means that, at each point of time t, a system has a geometric design structure which records the evolutionary processes used to create the observed physical state and information state structure at time t. Time evolution means that evolution of the system state, its static and dynamic design structure during development, maintenance and run time operations. As shown in FIGS. 35 and 36:

Spatial evolution of the system at the event time k is captured by the kth element of the "Spatial Evolution Array" SEA (k)=[XS($t_k$), S($t_{k-1}$)] where:

$$S(t_{k-1})=[F(t_{k-1}), G(t_{k-1})]$$

In the above equation, the system operations F and G specify mapping of system inputs into outputs where ss($t_{k+1}$)=F(ss($t_{k-1}$), i($t_k$)) and o($t_{k+1}$)=G(ss($t_{k+1}$)). In this formula i($t_i$) and o($t_{i+1}$) specify the values of the system input and output variables at event times $t_i$ and $t_{i+1}$ respectively.

Time evolution of the system at the event time k is captured by the sequence of all elements of the "Time Evolution Array" TEA (i) where i=0, k and TEA (i)=[XS($t_i$), xss($t_i$), o($t_{i+1}$), S($t_{i-1}$), ss($t_{i-1}$), i($t_i$)].

For most systems of practical importance, the set of system operations F and G, are specified using a mixture of discrete event and discrete time dynamical system models. For many application systems these operations are usually time variant, nonlinear and distributed which gives rise to complex system behavior. Adding to these complexities, these systems are often subject to a sequence of events that contains surprises and unpredictabilities such as variations in system loads and equipment aging. These events result in unexpected failures, not to mention hidden system design and software implementation errors. All these factors combined lead to failure to control the system design, it's development, and it's run time behavior. To help management of system complexities, the core subject of this invention is to provide system designers and users with analysis, display, design control, and run time tools that enable the design of systems that can be adapted to meet their desired system requirements (see procedures 5, 6 and 7).

Third, to untangle spatial and time system complexities, the space-time grid shown in FIG. 37 is used to specify the design control architecture of a real system as shown in FIGS. 38, 39 and 40 where:

The spatial and time evolution of the system design structure is specified using a sequence of time indexed instances of the system model where each element in this sequence is a snapshot of the system state space structure at a specified time instant.

The spatial "state space" projection of each element in the sequence is specified using the following three types of models as shown in FIGS. 39 and 40:

A minimum static architecture model. This is an M model which provides an integrated geometric representation of classification, association and aggregation relationships between system objects. A minimum static architecture model is created using procedure 5.1.

An integrated architecture model. This is an M model which is used to partition a system dynamic architecture into a minimal set of independent, observable, controllable subsystems called Adaptive Loop Information Nets (ALI_Nets). An integrated architecture model is created using procedure 5.2.

An AMR design control scheme. This scheme is used to adapt behavior of a real system ALI_Nets to meet desired behavior as specified in the operational requirements architecture model. The real system AMR design control scheme is created using procedure 5.3.

Fourth, the sequence of time indexed M models, shown in FIGS. (35–37), are used to specify the time evolution of the system during all phases of the system life cycle. Two types of time dependent changes are captured by the system time projection: system structure changes and changes in the values of system state variables specified by the system design structures. The time projection of the latter type of changes is specified using the ALI_Net state graphs described in procedure 5.1.2. Information captured by these diagrams is used in procedure 5.3.3.2 to control the system run time behavior.

Procedure 5: Control Oriented Production Rules of Adaptive Integrated Architectures Control oriented design of adaptive integrated architectures is carried out using procedures 5.1 to 5.3.

Procedure 5.1: Geometric Specification of a Minimum Static Architecture

This procedure consists of two methods. The first method, described in procedure 5.1.1, is used to construct M models of the static semantic primitives of objects. These primitives are aggregated to specify an integrated static architecture model. The second method, described in procedure 5.1.2, uses the aforementioned model to specify the minimum static architecture model.

Procedure 5.1.1: Geometric Specification of a Static Architecture

System designers use object classification, association, and composition models to specify the system static type structure. Geometric representation of these models is carried out using the following five step procedure:

First, a $\Delta$ geometric region is allocated for each object type depicted on the object relationship model by a rectangle as shown in FIG. (41-*a*).

Second, a $\nabla$ geometric region is allocated for each set of one or more directional object type relationships (role or associations). Each relationship is depicted on the object relationship diagram example by the symbol ▶ as shown in FIG. (41-*b*).

Third, for each association object, which contains references to the identifiers of each of the objects participating in the relationship, an association object region $\Delta$ is embedded within the $\nabla$ relationship region as shown in FIG. (41-*c*).

Fourth, an optional generalized icon is associated with each geometric region. This icon is used to associate the geometric region with the original graph type semantics as shown in FIG. (41-*c*).

Fifth, three types of attribute sets are specified for each object namely: application function invocation attributes, object's attribute value constraints and object's association constraints. Each attribute set is encapsulated by a set of object methods. It follows that the public interface of each object can be partitioned into three sub-regions called the application function interface, the attribute value constraints interface, and the association relationship constraints interface. These regions are used to invoke object methods responsible for the specification and enforcement of system constraints, see FIG. (42*a–c*). As shown in FIG. (43-*a*), three types of object attribute value constraints are defined: range constraints which are statements used to specify the lower and upper bound of the values of object variables, enumeration constraints which define the enumerated list of allowed values and their number, and relationship constraints which define the correct relationship between two or more object attributes. As shown in FIG. (43-*b*), three types of object association relationship constraints are defined: participation constraints which define the number of times an object instance of an object class can participate in a connected relationship, co-occurrence constraints which define the number of instances of different objects that can exist together in a relationship, and cardinality constraints which define the maximum number of instances of an object class.

The above procedure is used to develop the geometric representation for two special categories of object association models as follows:

The first category of models are object classification models based on the semantic primitives "Kind_Of" or "Is_A" object relationships. These relationships are used to specify class inheritance relationships. Geometric representation of these models is carried out using the following procedure:

First, for each branch of the inheritance tree graph, a $\Delta$ geometric region is assigned to each method of the derived class shown in FIG. (44-*a*).

Second, the region of each inherited method is embedded within a dashed $\nabla$ geometric resource region. Subsequently this dashed resource region is embedded within the derived class regions as shown in FIG. (44-*b*). The use of a dashed line indicates that the method region is visually atomic and not partitioned into lower level methods.

Third, for each method a dashed $\nabla$ inherited attributes region is embedded in the derived class resources region.

Fourth, the geometric representation of the multiple inheritance models, depicted in FIG. (44-*a*), is generated as shown in the example in FIG. 45.

The second category of models are hierarchical models based on the semantic primitives "Part_Of", "Has_A", and Knows_A" object relationships. These relationships are used to specify the aggregation and composition of objects using a set of component objects.

Given a "Part_Of" relationship, a geometric representation is developed as follows:

First, for each branch of the "Part_Of" relationship tree, a $\Delta$ geometric region, defined by a single triangular display tile, is allocated to each lowest level leaf of each tree branch shown in FIG. (46-*a*).

Second, the lower level object component regions are aggregated to form the geometric region of the higher level aggregated object as shown in FIG. (46-*b*). The compound object region is defined by the smallest equilateral containing triangle of its component regions.

As shown in FIG. (46-*b*), the above process may be reversed to decompose each compound object region into its component object regions.

Given a "Has_A" or a "Knows_A" attribution or association class relationship such as the relationships "$O_2$ Has_A $O_4$ and "$O_3$ Knows_A $O_5$", a geometric representation is developed as follows:

First, for each component object, a geometric region is allocated. This region may consist of a single display tile for visually atomic objects and multiple display tiles for visually compound objects as specified in procedure 2.

Second, the component object regions are dragged to be totally embedded within the internal attributes region of the container object as shown in FIGS. (47 and 48). Since "Has_A" and "Knows_A" represent attribution types of class relationships between containers and component objects, their regions are geometrically contained within the attributes region of the container object. To demonstrate that component objects in "Knows_A" relationships have different life cycles from their containers, geometric projection of component objects are displayed with dashed lines as shown in FIG. 48.

Third, when multiple attribution relationships of different types are specified, their container plan projection is generated as shown in FIG. 49.

Object association, classification and composition geometric primitives, shown in FIGS. (41–49), are combined to enable the specification of an integrated static architecture of real system objects as shown in FIG. 50. The static architecture provides the necessary foundation for specifying the dynamic system design control scheme as shown in procedures 5.2 and 5.3.

Next, when system component objects are aggregated using "Part_Of" relationships, then the overall system is specified by a geometric fractal pattern as shown in FIG. 51. In this pattern, if the structure of the system at different levels of composition is self-similar, then when a portion of the geometric fractal is magnified it looks exactly like the higher level of system representation. Many systems cannot be represented by pure self-similar structures. Instead these systems can be represented by self-affine fractal structures. Self-affine structures are made of shrunken but distorted copies of the higher level structures. The fractal pattern representation of systems is a logical result of the bipartite containment constraints of each object region as specified in procedures 2 and 4. A similar pattern evolves when the same procedure is applied to specify the geometric structure of compound resource regions as shown in FIG. 52.

Finally various manipulations of the geometric displays specified in this invention are efficiently specified, stored and generated on computer display equipment using affine transformation with the following parameters R, S, Theta, Phi, E, F, Prob where:

R, S are scaling parameters along x and y coordinates

Theta, Phi are rotation parameters relative to x and y coordinates

E, F are translation parameters in the x and y directions

Prob is the probability of selecting an iterated function rule

Procedure 5.1.2: Geometric Specification of a Minimum Static Architecture

By a minimum static architecture model, we mean the composition of system objects using a minimal orthogonal set of Object Attributes Basis O(A_B) and a minimal orthogonal set of Object Function Basis O(F_B). The two sets are used to construct minimum object association, classification and composition geometric relationship models as follows:

First, three types of attribute sets are defined for each object namely: intrinsic attributes, referential attributes and object control attributes as shown in FIG. (53). Each set region can be further partitioned to specify sub-resource regions allocated to each attribute, some times called variables as shown in FIG. (54). If O(A) is the set of all object attributes, then O(A) can be partitioned into two subsets namely Primary_Attributes O(P_A) set and Derived_Attributes O(D_A) set such that:

If $(a_1, a_2, a_3, \ldots, a_z)$ are elements of the Primary Attributes set O(P_A) and, If $(g_1, g_2, g_3, \ldots g_k)$ are elements of the Derived_Attributes Generation rules set G(D_A), and, If $a_{n+1}=g_j(a_1, a_2, a_3, \ldots, a_z)$, then
$a_{n+1} \in O(D\_A)$ Consequently, the tuple [O(P_A), G(D_A)] defines for each object k, an orthogonal Attributes Basis O(A_B). This basis is a minimal attributes generator such that if an element is excluded from it, then the generated set of attributes will be a proper set of O(A). By applying the above rules, the minimum state of each object is defined by the set of values assumed by the orthogonal set of all object attributes O(P_A) at some instant of time t. These attributes specify the object state space vector O(S, t) where:

$$O(S,t)=[(a_1, a_2, a_3, \ldots, a_z), t]$$

As shown in FIG. 54, a unique axis is associated with each object attribute (variable). This construction creates a planner representation of n dimensional space models. Since each of these variables resides in a resource region of the object model, it follows that associated with each axis there is a unique resource region.

Second, the object state O(S, t) at a given instant of time $t_k$ can be specified by a directed polygon graph, called an Object State or Loop State graph, as shown in FIG. 55. This graph depicts the values of the state variables of an object or a loop, at any given instance of time t, by connecting the temporal values of object state variables displayed on the attributes axis sets as shown in FIGS. (55-*a*, *b*). Each of these axes may be scaled to display the values of numerical and/or linguistic variables. Temporal evolution of object state is represented using the time indexed object state graphs shown in FIG. (55-*b*). Each of these graphs displays the lower and upper alarm limits and out of control limits for each system loop as shown in FIG. (55-*c*). The state of each ALI_Net at a given instant of time is specified by a directed polygon graph, called an ALI_Net state graph. This graph specifies the directed interconnection between two main sets of variables (resource regions) namely input/output state variables observed by external systems and internal state variables. Loop state graphs may be aggregated to display the aggregated behavior of a set of ALI_Net loops. Overlay of the current and desired state graphs specifying desired and current performance states provides an effective visualization of any deviations of object behavior. This deviation can be automatically detected to initiate necessary notifications and corrective action as shown in procedure 7.5.

Third, object attributes may be specified as crisp variables, such as input numerical information from sensor measurements and output numerical information to device actuators, or fuzzy variables such as input/output linguistic information meaningful to humans. When fuzzy logic is used, the two types of information are combined into a common frame work where a given object attribute value may belong to one or more sets of linguistic variables as shown in FIG. (56-a, b). The degree of membership in each of these sets is determined using member functions. The values of each of these functions are real numbers in the interval [0. 1]. By way of example FIG. (57-a) illustrates three member functions used to map numerical values of a crisp variable, say temperature measurements, onto three linguistic variable, say Cool designated by the blue color, Warm designated by the black color, and Hot designated by the red color. This mapping calculates for each numerical value, its degree of membership in various member functions as shown in FIG. (57-b).

Fourth, Object functions are classified based on their role and how they were generated. Generation-based classification partitions object functions into an Inherited Functions O(Ih_F) set and an Intrinsic Functions O(In_F) set. Role based classification partitions object functions into two sets:

Control_Functions O(C_F) set. Each element of this set can:
Invoke its functions based on attribute values set by other functions within the object or by object invocations.
Invoke other objects.
Edit shared system attributes.
Schedule the sharing of resources among system elements.

Application_Processing_Functions O(A_P_F) set. Each element of this set can:
Perform an iterative application processing function. These functions are usually domain specific.
Calculate object attribute values. These attributes may be used by a control module or by other application process modules.

Fifth, the set of all object functions O(F) is partitioned into two subsets namely Primary_Functions O(P_F) set and Derived_Functions O(D_F) set such that:

If $(f_1, f_2, f_3, \ldots, f_z)$ are elements of the Primary Function set O(P_F) and, If $(g_1, g_2, g_3, \ldots g_k)$ are elements of the Derived_Functions Generation rules set G(D_F), and If $f_{n+1} = (f_1, f_2, f_3, \ldots, f_z)$, then
$f_{n+1} \in O(D\_F)$ Consequently, the tuple [O(P_F), G(D_F)] defines for each object k, an Object Function_Basis O(F_B). This basis is a minimal function generator where, if an element can be excluded from it, then the generated set of functions will be a proper set of O(F).

Sixth, a minimum set of static object relationship models is defined such that:

If $(O_1, O_2, O_3, \ldots O_n)$ are the elements of the system Static Object Basis where $O_k = [O_k(A\_B), O_k(F\_B)]$ and, If $(G_1, G_2, G_3)$ are the elements of the three set of rules used to generate the set of classification and aggregated association and composition objects and, If $O_{n+1} = G_i(O_1, O_2, O_3, \ldots O_n)$, where I=1, 3, then
$O_{n+1} \in O$ where O is the set of all static object basis.

The above formulation implies that since component objects are aggregated to construct multi-level geometric fractal patterns of the type shown in FIG. 51, it follows that the orthogonal attributes basis of an aggregated object is the union of the attributes basis of all of its component objects as shown in FIG. 58. In this figure we illustrate, by way of example, the orthogonal representation of an aggregated three object system. In this figure, the aggregated object attributes set specifies shared application function attributes, referential attributes and control attributes.

Procedure 5.2: Geometric Specification of an Integrated Architecture

This procedure consists of two methods. The first method, described in procedure 5.2.1, enables the specification of a minimum dynamic architecture structure using ALI_Nets. These nets are used, in the second method described in procedure 5.2.2, to specify an integrated architecture model of a real system.

Procedure 5.2.1: Geometric Specification of a Minimum Dynamic Architecture

Software designers use a variety of diagrams, e.g. diagrams mandated by the Universal Modeling Language (UML), to capture the time ordered execution of object oriented systems. These models include:

Use Case diagrams to specify or characterize the behavior of a whole application system together with one or more external actors that interact with the system.

Message Trace or Sequence diagrams to illustrate the interactions among a set of objects in temporal order, which is used to understand timing issues.

Object Message or Collaboration diagrams to illustrate the objects and links that exist just before an operation begins and also the objects and links created (and possibly destroyed) during the operation.

State diagrams to describe the temporal evolution of an object of a given class in response to interactions with other objects inside or outside the system.

Currently information captured by these models is used to gain insight into the emerging dynamic behavior of the designed software system. This understanding has to be further integrated, in the system designer's mind, with other information derived from static architecture models such as class inheritance graphs, object association and object containment graphs. Each of these models provides a single representation of a particular aspect of the system structure, called single view, such as the classification structure view and the state transition view. To convey the semantic meaning of the evolving system design, each of these views is augmented with additional information expressed using natural language text. This approach of modeling software intensive systems gives rise to four major, related difficulties:

Requirements representation difficulties: Requirements not explicitly captured by existing design and analysis methods include: real-time constraints, performance constraints; contextual constraints like the necessity to coexist with existing systems; resource constraints of target system; reliability constraints; integrity constraints; security constraints; and safety constraints. Without an integrated architecture model which captures and integrates how the system design will not violate these constraints, it is impossible to design adaptive systems which can meet their desired operational requirements.

Comprehension difficulties: It is not easy for system and software specifiers, designers, and implementers to integrate information provided by the many visually disconnected design views, each of which uses different syntax and different symbols to convey the semantic meaning of the evolving system design. Without an integrated architecture model which captures the aggregated semantics of the evolving system, it is very hard to verify that the meaning of the evolving system conceptual and implementation design structure can satisfy end users' requirements.

System analysis difficulties: Without an integrated architecture model that enables formal mathematical analysis of the evolving system "state space and temporal" design complexities, it is impossible to make any assertions about system correctness, lack of deadlocks, boundness, safety, etc.

Control of changes difficulties: Without an integrated architecture model that can be used to plan, predict, implement and control changes to the system, it is not only very hard to understand the side effects and the behavioral implications of making changes to the system but also it is practically impossible to adapt system structure or its parameters, during it's run time operation, to meet desired system behavior requirements.

To resolve the above difficulties, a new class of design control models called Adaptive Loop Information (ALI) Nets are defined in this invention. These nets are the fundamental structuring mechanism used to:

Integrate information provided by various dynamic and static object models, called views, into an integrated system graph that may be hierarchically organized. Each of the traditional system design views, used by structured design or object oriented tools, is specified as a separate geometric, blueprint, overlay. The geometric aggregation of these overlays defines the integrated system graph in a manner similar to that shown in FIG. 26. This process is carried out such that the geometry of system objects and their relationships, for each of the system views, maintains an invariant relationship to their spatial relationship on their parent integrated graph.

Create a dynamic architecture model which consists of an external system design control model and an internal system design control model as shown in FIG. 59. The latter model is composed of a set of proper subsystems called ALI_Nets. Each ALI_Net can be independently configured, tested, modified, maintained and controlled to meet changing system requirements where:

Each ALI_Net must satisfy the following conditions:

Goal seeking Condition: Each ALI_Net has explicit user (outer directed) goals clearly delineated in the system operational architecture model, and implied design (inner directed) goals. The two sets of goals should be clearly linked in the integrated architecture model. Furthermore, the architecture of each ALI_Net should contain the three essential elements of control, application processing functions, and information feedback.

Motion Condition: Each ALI_Net is dynamic where, through execution (motion), component objects of the ALI_Net become interrelated and can interact.

Control Condition: System dynamics are controlled using a set of one or more, interacting ALI_Nets loops. Each ALI_Net is specified using three types of object loops: Application Processing loops, Control loops, and Diagnostic loops as shown in FIGS. 60, 61 and 62. Application processing loops are triggered by event types generated by external systems including system users. Processing of these events will result in generating desired application system outputs. Each application processing loop specifies the sequence of information flows and state transitions required to generate application system products under normal operating conditions. Diagnostic loops recognize fault events, analyze these events to identify causes of malfunctions and necessary corrective action. Control loops monitor operational performance of application processing loops and diagnostic loop results to adapt system structure, its configuration and the scheduling of its resources to achieve desired operational objectives of the real system. Two basic categories of subsystem control loops are defined. The first category is called physical object control loops. These loops are the traditional automatic control loops used in the process control, sensors, and manufacturing industries to regulate the behavior of the subsystem physical objects (physical devices). The second category is called information object control loops. These loops are used to monitor and adapt the dynamic behavior of the subsystem information processing objects to changes caused by the system operational environment. Specification, design, and run time enactment of information subsystem loops is a principal objective of this invention.

Cycle Time Condition: Each object loop component of an ALI_Net is viable during an identifiable period of time, called the loop cycle time, as shown in FIG. 35. Viable implies that during the loop cycle time, loop operations can be performed without the need for exchanging information with the system outer environment.

Stability Condition: Each ALI_Net has a structure for patterned behavior such that it demonstrates stability and continuity. Stability means that the system attains steady state in its environmental field and internally. But, a steady state does not mean static.

Aggregate information usually documented with use case, message trace and object message diagrams into system structures called Application Processing loops. These loops are specified in a manner that can be used to satisfy the proper subsystem conditions and, as such, enable the design of the necessary diagnostics and control loops required to adapt system behavior.

Define the essential information required to control the run time behavior of each proper subsystem. In a control-oriented model of systems, specification of the desired behavioral requirements of the system provides the essential information required to regulate the system behavior and is also used for the on-line identification of the system design by tracing the code execution of an operational system as shown in procedure 7.

Specify, for each user type, an observation process used to monitor system aspects which are significant to the particular user type. Information exchange during the observation process provides the means by which the observer develops a better comprehension of the system. Various observation model types are further aggregated into a minimum observable and controllable model supported by a minimum static object model as shown in procedure 5.3.

Correlate all information associated with a named proper system across all phases of the system life cycle including requirements, design, implementation, and maintenance phases. In other words, at each phase of the life cycle, each ALI_Net associated with each proper subsystem provides a mechanism for capturing evolving design details of the static/dynamic relationships of the proper subsystem components. It follows that at each phase of the life cycle the components of each proper subsystem and their static/dynamic relationships, can be readily identified, visualized, tracked, and isolated from other proper subsystems.

The following procedure uses the above definition to specify the ALI_Net design control scheme of a multilayered distributed application systems:

First, for each two sets of "cyclic input and output" interactions between the system internal and external objects, see FIG. 62, a directed graph called an object_loop is specified where:

An object_loop specifies the interconnection between a set of one or more "loop terminal input" resource regions, and a set of one or more "loop terminal output" resource regions. These sets include the set of persistent internal system resources. These resources are maintained by the ALI_Net control modules to ensure the reliable fault tolerant operation of the specified subsystem. Input and output edges connecting loop body with its terminal resource regions are called external loop edges. All other loop edges are called internal loop edges. These edges are used to specify required connection between internal systems.

Cyclic input set implies that the set of all loop terminal inputs, specifying the external information required to perform loop functions, are input to the subsystem once at the beginning of a complete cycle. Two subsets of loop terminal inputs are specified: the first subset is the subset of inputs provided by external system objects and the second subset is retrieved from the system internal persistent data base.

Cyclic output set implies that a complete cycle of the system produces internal interactions and any element of the set of loop terminal outputs can be expressed as constants at the end of the loop cycle. Two subsets of loop terminal outputs are specified: the first subset is the subset of outputs transmitted to external system objects and the second subset is stored in the system internal persistent data base.

By satisfying the above conditions it follows that all occurrences within the boundaries of an automated subsystem are internal interactions with no external interactions, with its outer environment (both human operators and automated external systems), during one complete loop cycle.

As shown in FIG. 62, a set of coupled object loops are aggregated to form an ALI_Net. ALI_Nets are subsequently aggregated to compose the System Design Control Scheme. Aggregation operations are carried out using the cascade and parallel aggregation structures shown in FIGS. (64–67).

Second, each object_loop may be specified as a closed or an open loop; an object loop that begins and ends with the same region is called a closed loop; a loop which does not satisfy the closed loop condition is called an open loop, see FIG. 63. Furthermore, loop category is designated as an Application Processing loop, a Fault Diagnostic loop or a Control loop. An Application Processing loop or a Fault Diagnostic loop is determined by the presence or absence of control actions required to regulate the quality of system services provided by the system. As shown in FIGS. (63-a, b), $L_k$ and $L_{k\_d}$ are closed control loops because system operators and automated system control actions are dependent on measurements of system outputs. Although $L_k$ is a closed loop, it is not a control loop because the control action necessary to maintain the quality of the processing loop products/service is not dependent on loop $L_k$ outputs. Closed process loops provide the basic structure for the sequential nesting of a set of two or more object_loops (subsystem fragments) into subsystem_loops. On the other hand, $L_i$ is an open control loop, FIG. (63-c), because system operators and internal system control actions are independent of system output values.

Third, aggregate object_loops into one of the following three structures:

Cascade loop aggregation structures: These structures are used to specify the sequential nesting, loop chaining, of a set of two or more loops such that the terminal inputs of each loop, excluding the first loop, are set by external systems using values of the terminal outputs of the preceding loop as shown in FIGS. (64 and 65).

Parallel loop aggregation structures: These structures are used to specify a concurrent set of upstream subsystem loops, loop decomposition, triggered by a set of cyclic terminal inputs, with a down stream set of subsystem loops. The terminal inputs of the down stream fragments are set by external systems using the combined values of the terminal outputs of the upstream fragments as shown in FIGS. (66 and 67).

Mixed loop aggregation structures: These structures are used to specify the sequential nesting of a set of two or more loops where the internal structure of each of these loops may have a parallel aggregation structure.

Fourth, for each of the above loop aggregation structures, identify the type of coupling and interaction between the component objects of a named set of object loops. Four types of coupling may be identified:

Object Occurrence Coupling when the same object instance is invoked (i.e. shared) by multiple loops.

Message Coupling when the same event, or message instance is used to invoke objects of more than one loop.

Object Attributes Coupling when global variables, used in some object oriented programming languages, are shared among the object instances of more than one loop.

Physical objects coupling when information system objects of more than one loop share physical system objects such as memory processors.

Fifth, each set of coupled object_loops is aggregated into an ALI_Net structure. By coupled loops, we mean object loops whose components satisfy one or more of the above coupling conditions. The set of regions shared between the component loops of an ALI_Net specifies behavioral dependencies between the coupled set of object loops.

Sixth, compose each object loop $L_n$ as an ordered set of multilayer component loops where $L_{nj}$ designates the jth layer component of the loop $L_n$ as shown in FIGS. 68 and 69. Each layered component loop is triggered when the services of an object belonging to the designated layer are invoked. The annotation of various sub-loops of the multilayered distributed application systems is optionally displayed using the following convention:

<ALI_Net_Edge_Identifier>::=<ALI_Net_Identifier>
   {<Object_Loop_Identifier_List>}
<Object_Loop_Identifier_List>::=<Object_Loop_Identifier>
   <Layer_Identifier><Edge_Identifier_List>
<Edge_Identifier_List>::=<Edge_Identifier>{, <Edge_Identifier_List>}

<Edge_Identifier> is defined using loop communication constructs as shown in FIGS. (73–77). As shown in these figures, object_loops may fork or branch only at an object or a method region Δ. If the loop fork condition is an AND then all output edges are annotated with the identical loop Id name as the input edges of the loop. On the other hand if the loop branching condition is an OR then the loop ID name of each possible output edge is augmented with an additional unique sub-loop id name.

Seventh, specify each layered component loop by an ordered set of pipe connections between system objects allocated to the designated layer as shown in FIG. 69. Each of these system objects may be implemented using run time system environments such as Microsoft's COM objects or Object Management Group's CORBA objects. As shown in FIG. (70-*a, b*), each COM or SOM object is represented by a geometric region within which the component objects are embedded as shown in FIG. (70-*c*). An object public interface region contains a list of methods (e.g. vtable pointers) supported by the interface as shown in FIG. 71. In accordance with the CORBA or ActiveX rules, all interactions between the component objects of a loop occur only by invoking object operations, and objects execution only affect system resources allocated to the object. Two types of object interaction structures are defined:

Operation chaining structure occurs when an operation on one object triggers the invocation of an operation on another object This chained operation may in turn cause another operation to be invoked (see loop $L_n$ of FIG. 72).

Operation decomposition structure occurs when an operation on one object triggers multiple operations on other objects. The result is a hierarchical processing tree with the owner object performing the initial operation at the root of the tree; each subordinate operation must be completed before its superior operation can finish, and coordination among subordinate operations may be required (see loop $L_j$ of FIG. 72).

Eighth, bind system object components into object loop structures using a compound connection where the fractal structure of the pipe region is partitioned into one object region called the communication binding region and three resource regions called send request, receive request and message specification resource regions as shown in FIG. 73. Allowed interactions are specified by an object message protocol as specified in its message interface shown in FIG. (71-*a*). A message protocol specifies the syntax and semantic of object operations supported by the message interface. Behavior of the communication binding objects is a result of the supported loop communication semantics where the interactions between loop objects engaged in a pipe connection are regulated using:

Synchronous mode with the invoked object operation returns Result or Error.

Asynchronous mode with the invoked object operation returns Result or Error.

Synchronous mode with the invoked object operation returns Error (if any).

Asynchronous mode without return from the invoked object operation.

As shown in FIG. 73, asynchronous communication is represented by a directed edge from the invoking object to the object containing the invoked object operation where the sequenced symbols ♦ are used to specify communication and execution order. On the other hand synchronous communications are represented by a bi-directed edge which represents the synchronous return condition of Result or Error (if any). Asynchronous and synchronous pipe connections are specified using the following four basic communication constructs. These constructs provide visual geometric representation of loop communication semantics as follows:

Basic_Communication construct shown in FIG. (74-*d*) provides an aggregated geometric representation of the two basic interactions of the connected objects with the communication binding object.

Loop_Fork_Communication construct shown in FIG. (75-*d*): For a named loop, the Loop_Fork construct generates two or more concurrent computations as specified in the signature of the send request. As shown in FIG. (75-*d*), edges specifying the trigger of the two forked computations $O_q$ and $O_r$ are annotated with the identical loop annotation to the input edge to the $O_p$ computation.

Loop_Branch_Communication construct shown in FIG. (76-*d*): For a named loop, the Loop_Branch construct triggers only one of two or more concurrent computations. Selection of which computation to trigger is specified in the signature of the receive request. As shown in FIG. (76-*d*), the annotation of each output edge is concatenated with a sequential index number specifying the subloop name.

Loop_Join_Communication construct shown in FIG. (77-*d*): For a named loop, the Loop_Join construct is used to specify the combine of two or more upstream computations performed by concurrent system objects into one concurrent down stream computation. As shown in FIG. (77-*d*), the $O_d$ computation will halt until all input edges with the same loop annotation are enabled. This implies that the $O_d$ will not perform any loop $L_i$ functions until both $M_k$ and $M_s$ conditions are enabled. On the other hand the $L_m$ functions will be immediately triggered by the enabling of the $M_k$ condition.

Ninth, a multi-layer specification of system loops is generated by manual or automatic tools as shown in FIGS. (78–82) where:

The elevation and plan projections of the two object loops system of FIG. 72 example are shown in FIGS. (78–80).

The loop wiring diagram of the two object loops system of FIG. 72 is shown in FIG. 81. In this diagram, the sequence of loop connections is specified at the message invocation connection points and the list of component objects are monotonically sorted by their layered id.

A complete specification of system interconnection loops is carried out using the container objects interconnection diagram of FIG. 82 where the intra connections of the contained objects are specified using the lower level contained objects wiring diagrams Tenth, the multi-layered loops of each ALI_Net, shown in FIG. 69, can be arranged to display the isomorphic ALI_Net dynamic graph shown in FIG. 83. This new type of graphs enable the visualization and analysis of the subsystem dynamics specified by an ALI_Net. As shown in FIG. 83 loop harmonics at each layer are computed by the superposition of the harmonics of its component loops at the lower layer.

Eleventh, define for each ALI_Net the set of metrics used to measure the operational effectiveness of the proper subsystem represented by the ALI_Net, predict the impact of resources allocation or design changes on quality of service provided by the proper subsystem and its financial results. As shown in FIG. 84, four major categories of metrics are used:

Quality of Service/Customer Profile Metrics. These metrics measure customer satisfaction relative to competitors, customer retention, market share gain, customer complaints, etc. Products/services quality metrics measure compliance to industry standards, creation of innovative products, etc.

Financial Metrics. These metrics evaluate the cost/profit of delivering products or services created by the proper subsystem. Financial metrics include unit cost of each resource type.

Resource Utilization Metrics. These metrics include human resources metrics which measure human labor requirements and skills; equipment resources, computer hardware and software resources.

Operational Metrics. These metrics include process cycle time, idle time, wait time, throughput rates, work in progress, inventory levels, defect rate, error rates, resources levels. These metrics evaluate the efficiency of transforming process inputs (raw materials) into physical products. Other operational metrics include information metrics which evaluate the value of information generated by the proper subsystem.

The above metrics are used to construct an ALI_Net Business Tracking Graph as shown in FIG. 85. In this figure there is an overall system desired operating region and a set of ALI_Net actual performance regions. Each of the latter regions specifies the contribution of the specified net to the overall performance of a real system. For each type of variable, deviations of measured variables from desired system behavior can trigger automated run time system control actions of the AMR control schemes as shown in procedure 5.3 or system operator control actions. The latter type of control is facilitated by the business tracking control graphs. As shown in procedure 6, these graphs provide system operators and business managers with visual criteria for identifying and correlating the causes of both technical and/or financial performance problems.

Twelfth, use ALI_Nets to specify a minimum observable semantic model of the dynamic architecture of a real system where:

By a semantic model, we mean that the system model is specified and constructed such that: see FIG. 86

All ALI_Net model functions and input/output signals, represented by ALI_Net messages, have a meaning. This implies that the meaning of each aggregated message and each function should correlate in some sense with that which is within the cognitive models of the human sender and receiver.

By meaning, we mean that the ALI_Net operational requirements architecture model, should be consistent, i.e. match, the cognitive model of a class of human system users. By cognitive model, we mean an image of a segment of the real world which is of interest to the observer where all remaining segments are called the environment. This model consists of a set of assertions, that must be related to the real world where each assertion consists of a subject related to the matter of the statement, and a predicate which positively qualifies the subject.

By an observable model, we mean that a system is observed by one or more external user types. External users include all automated systems and human users that are not included within the system boundary. These users reside in the External System region named XS as shown in FIG. 34. Associated with each user object type, there exists a set of ALI_Net loops, each of which specifies a dynamic relation between an n-array of system objects ($O_m$, . . . , $O_z$) and the user object type. As shown in FIG. 87, each ALI_Net defines the observation process used to observe certain aspects of the system under investigation. During the observation process, the ALI_Net loop terminal input/output regions provides the means by which the observer develops a better comprehension of the system. As shown in FIG. 87, comprehension is developed using the external user's own semantic framework, as defined by his or her conceptual model, which acts as a substratum space for the information contents of the ALI_Net message flow between the system and a given user object type.

Since an ALI_Net is defined only with respect to a given user type, called an observer, who observes that part of the whole system which he/she wants to investigate and/or manipulate, then each part of a system may be observed by one or more user types. It follows that multiple ALI_Nets may be associated with the same dynamic segment of a given system. Each of these nets must be tailored to match the human conceptual model of a given user type as shown in FIG. 86.

The above definitions are used to specify minimum observable "semantic" object systems using a minimal set of loops, called System ALI_Net Basis S(A_B) and System Object_Loop Basis S(OL_B) such that: see FIG. 88

If ($L_1$, $L_2$, $L_3$, . . . $L_n$) are the elements of S(A_B) and,

If ($g_1$, $g_2$, $g_3$, . . . $g_k$) are the elements of the set of rules used to generate the set of aggregated ALI_Net loops. Each set of these aggregated loops, $L(u_k)$ is required to observe information which matches the conceptual model semantics of the user type $u_k$ and, If $L(u_k, n+1) = g_1(L_1, L_2, L_3, \ldots L_n)$, then
$L(u_k, n+1) \in L$
where L is the set of all ALI_Net loops required to observe the system under investigation Similarly each ALI_Net is generated using elements of the S(OL_B) basis.

Procedure 5.2.2: Geometric Specification of an Integrated Architecture

Since at the highest level of aggregation ALI_Nets specify system behavior, it follows that these nets provide an interpretive framework used to:

Elaborate system operational requirements architecture, design control architecture, and implementation architecture shown in FIG. (89-a)

Ensure that an evolving system design, with increasing levels of design and implementation details, complies with the intended operational requirement goals of a given ALI_Net. At various phases of the systems life cycle, an ALI_Net provides an invariant structure to evolving system design and implementation details.

Generate an integrated architecture of a real system using the following four step procedure:

First, use procedures 5.3 and 7 to specify and edit the semantics of each ALI_Net loop in a manner that matches the conceptual model of the system end users. The operational requirements model generated by this activity specifies the system operational requirements architecture. This architecture consists of the set of ALI_Nets, each of which specifies the highest level of system behavior required to realize business missions. Required system behavior is defined by the dynamic relationship constraints of each ALI_Net as shown in FIG. 114

Second, use procedures 5.3 and 7 to create the inner design specification of the system operational requirements architecture as shown in FIG. (89-b). The set of design control loops, required to realize the operational requirements of each ALI_Net, specifies the system design control architecture. Each design control loop is an object loop which:

specifies, the programming language independent, interconnection of internal system objects complies with ALI_Nets loop semantics and satisfies its dynamic relationship constraints encapsulates an information access loop as shown in the next step Third, the semantics of each ALI_Net loop, and its component object loops, is specified to match the conceptual model of a loop user type. Each conceptual model consists of a set of assertions. Each assertion consists of a subject and a predicate. Taken together, the "subject/predicate" provides a description of the data attributes of an object as it appears in reality. Relationships between these data entity types are captured by object relationship models, semantic network models or entity relationship models. Access to different types of information referenced by these models is specified using a special type of loops called Information Access Loops (IAL), see FIG. 90. These loops provide a visual specification of the query processing of data base systems as follows:

An information access loop consists of two loop segments called "Forward and Backward" loop segments. The forward segment is specified by a sequence of one or more functions (representing a connected set of entity relationships). The backward segment is specified by a sequence of one or more functions, each of which is an inverse of the forward loop functions.

The data base can be viewed as a set of stored functions where one function is defined for each entity attribute. Given an entity identifier as a parameter, each function returns the value of the appropriate attribute. Given a data base, with entity types $E_1, E_2, E_3, \ldots, E_n$, a relationship between $E_1$ and $E_2$ specifies a function which returns an entity occurrence of type $E_2$ when given the attribute value of an entity occurrence of type $E_1$.

Geometric representation of information access loops are constructed according to the following rules as shown in FIG. (90-c):

Entity types (data types), which are depicted, on the object relationship models, semantic network models or entity relationship models, by a rectangle, are represented by the geometric region symbol ▽. These regions can be hierarchically decomposed, into component regions representing lower level subtypes, using the construction rules of procedure 2.

Entity or object type relationships (or associations) depicted on the relationship diagrams by the symbol ◇ are represented by the geometric region symbols Δ.

An information access loop is specified by an ordered set of edges connecting a set of Δ geometric regions. These loops specify the relationship between an n-ary relationship describing the association among n set of entities.

The information access loops of an entity relationship model can be further encapsulated into an object relationship model as shown in procedure 3.

Fourth, generate design implementation loops code by binding design control loops to a programming language and a given object class library. Each design implementation loop is an object loop. The syntactic design/implementation specification of this loop is generated using a selected programming language grammar.

The integrated architecture specified using the above procedure defines two major categories of application objects namely Mechatronic objects and Infotronic objects as shown in FIG. 91. As shown in FIGS. (92–94), each of these objects is a container object whose structure is specified using "Has_A" and, or "Knows_A" relationships with a selected components of the three multi layer stacks of the system infrastructure objects. Infrastructure objects are specified, designed and manufactured in accordance with the selected open system interconnect reference model. This model, called the technical reference model architecture, defines the rules and regulations i.e. protocols that govern interconnection and interworking among layered system objects. As shown in FIG. 92, three categories of physical system resources are encapsulated by the three layered stacks of system information objects:

The first category of physical resources includes intra-node computer devices such as discs, displays, and tapes. These resources are managed by the multilevel stack of data processing controllers consisting of device controllers (e.g. disc controllers), device managers (e.g., file managers), and supervisory data processing managers (e.g. distributed data base managers).

The second category of physical resources includes inter-node communication devices such as communication channels. These resources are managed by the multi-level stack of controllers consisting of communication controllers, communication protocol control managers, and supervisory network managers.

The third category of physical resources includes material or energy transformation devices such as chemical reactors, heat exchangers or radar antennas. These resources are managed by the multilevel stack of plant controllers consisting of discrete time controllers such as proportional integral derivative algorithms, plant event managers which compensate for system nonlinearities and saturation effects, and supervisory equipment mangers.

It follows from FIG. 92 that the three stacks of infrastructure objects have a similar structure where:

Lower layer objects of each stack are used to regulate the dynamic behavior of the stack physical objects. Network and computer physical objects are managed using discrete event algorithms or protocols. On the other hand equipment physical objects are regulated using control algorithms of broad applicability such as a PID algorithm. The parameters of these algorithms are adjusted to values that will result in an optimum closed-loop response of the physical objects. This type of continuous control can be applied when environmental disturbances result in a small change of the value of the physical process parameters such as its energy. However, because of the non-linear and time varying nature of the plant entities, coupled with changes in the operating conditions (due to changes in set points, etc.), the performance of the controller will degrade with time. Therefore to maintain good performance, the controller parameters must be adjusted from time to time. When large soft and catastrophic failure disturbance events occur, the required corrective action can be beyond the control range of the continuous controller. As a consequence, the plant parameters will cross pre-specified limiting values. This results in switching off the process and execution of higher level discrete event control algorithms which manage the transitions between system states such as normal, emergency, off, etc.

Higher layer objects of each stack contain lower level objects and provide additional discrete event algorithms. For the network and computer stacks, discrete event algorithms are used to control startup, shutdown, and failure recovery of system physical and information processing objects. Other functions include control of the generation, dissemination, storage, and retrieval of distributed system information. For the equipment stack, discrete event algorithms are used to compensate for the non-linear and time varying nature of physical objects.

The multilayer design of each stack of objects induces an ordering with respect to the time scale; specifically, the statistical mean period of the control loop action tends to increase as we proceed from a lower to a higher level of the control system hierarchy.

By applying procedure 2 rules, elevation and plan projections of the three infra structure stacks can be developed as shown in FIGS. 93 and 94. Both projections can be integrated using the geometric cellular structure shown in FIG. 95.

By applying entity access construction rules to specify the connectivity of hardware resources, the fractal structure of the application processing scheme encapsulates the hardware resources as shown in FIG. 96. This figure provides an example of three concurrent user objects, executing on a two hardware processors system. As shown in FIG. (96a–c), the two hardware processors region is totally contained within the three objects resource region. Different views of the software/hardware processing scheme can be generated using the Region Display Setup options of procedure 7.

As shown in FIGS. 97 and 98 the above rules can be applied to generate a geometric representation of systems whose architecture is specified by a stack of layered objects at each node.

The geometric regions of the integrated system static/dynamic architecture at each time instant t are mapped on the physical space required to house system objects such as memory for computer implemented objects or the physical space occupied by physical objects such as sensors, or equipment. The physical space is represented by the Euclidean or Riemann geometry. This mapping is carried out as follows:

The state space structure of each object region is folded into a multi-dimensional tetrahedron, octahedron, dodecahedron, or icosahhedron structure which is mapped onto the Euclidean/Riemann "Multi_Node" physical space grid and the memory space grid within each node as shown in FIGS. 99 and 100. This mapping is carried out using procedure 2 folding/unfolding rules. Mapping operations are supported by tools specified in procedure 7. These tools enable system designers to allocate object instances to various system nodes where a node is defined as a shared set of physical memory regions. Code compilation tools assign memory regions to various elements of the virtual system grid.

The Euclidean three dimensional space represented by the Cartesian coordinate (x, y, z) is partitioned into a three dimensional set of cells as shown in FIGS. 100 and 101. In this representation each object may occupy a set of one or more cells in a single or multiple planes of the three dimensional physical space. Each of the physical space cells is identified by a unique set of latitude and longitude parameters.

Procedure 5.3: Geometric Specification of an AMR Control Scheme of a Real System In this procedure, infotronic and mechatronic objects models, created using procedures 5.1 and 5.2, are used by system planners, configurators and operators to: (see FIG. 102)

First, plan and schedule various operational missions supported by an operational system as shown in procedure 5.3.1.

Second, plan and schedule human and physical objects of a real system as shown in procedure 5.3.2.

Third, configure an automated system adaptive control scheme. This scheme is used to monitor, control, and sustain the run time behavior of an operational real system as shown in procedure 5.3.3.

Procedure 5.3.1: Geometric Specification of Real System Plans

Plans of a real system are constructed using the planning process shown in FIG. 103 where:

First, an ALI_Net operational architecture model of desired business missions is constructed using procedure 5.2 and procedure 7 tools. Instances of each ALI_Net specified in the operational architecture is created using tools described in procedure 7.

Second, the geographical allocation of mechatronic and infotronic objects, referenced by the operational architecture, is specified by dragging each object, and/or a specified set of its ALI_Net segments, onto the three dimensional cellular space as shown in FIG. 104. Routing, by Euclidean position, of each mechatronic object position is specified by an initial position, an end position, and an intermediate set of way points. Processing conditions of the specified ALI_Net segments at each routing point are monitored and used by the AMR scheduling algorithm to control the motion of the mechatronic object.

Third, specify geographical constraints associated with the routing of mechatronic objects using the three dimensional cellular space shown in FIG. 105. These constraints are used by the AMR scheduling algorithms to generate a pre-mission position routing plan such as those shown in FIG. 105 or use these constraints to automate and adapt the motion of the infotronic objects using run time sensor measurements. AMR algorithms associate with each cell a number which represents the time, distance or fuel cost associated with arriving to the end position from the referenced cell. During run time the AMR scheduler uses this information to invoke the movement of the object to the neighboring cell with the lowest value. This movement will be carried out if and only if the processing conditions of the object ALI_Net segments at the given set of cells are satisfied.

Fourth, procedure 7 tools use object transportation functions, shown in FIG. 106, to implement routing plans of mechatronic objects. Similarly routing of system messages between mechatronic and infotronic objects is realized using procedure 5.2.1 as shown in FIGS. 107 and 108.

Fifth, as shown in FIG. 103 all information required to perform the above steps are supported by the AMR knowledge manager specified in procedures 7 and 8

Procedure 5.3.2: Geometric Specification of Human & Physical Object Schedules of a Real System Scheduling of human and physical objects is carried out using the process shown in FIG. 109 where:

First, generate a set of ordered instances of organizational and mechatronic resource objects that may be used to execute specified functions/methods of each set of one or more instances of the ALI_Net.

Second, use procedure 7 tools to generate a prioritized list of human and mechatronic object instances to perform required business missions. Use this list to generate required schedules.

Third, created schedules can be directed, implemented, monitored, controlled and adapted by the run time tools of procedure 7.

Fourth, as shown in FIG. 109 all information required to perform the above steps is supported by the AMR knowledge manager specified in procedures 7 and 8.

Procedure 5.3.3: Geometric Specification of an AMR Control Scheme of a Real System An AMR control scheme of the automated information system components of a real system is constructed as follows: see FIGS. (110–112)

First, as shown in FIG. 111, an AMR control scheme of an automated information system is composed of a set of analogue/digital controllers which manage interfaces with external physical objects, a set of views each of which is tailored to the semantic requirements of a specific end users type, and adaptive view controllers which regulate the update of user type views using the AMR supervisory control model.

Second, as shown in FIG. 112 the AMR control scheme of the automated information system is constructed using two types of system control models: an AMR Concurrent Application Control Scheme, as shown in procedure 5.3.3.1, and an AMR Supervisory Control Scheme, as shown in procedure 5.3.3.2. The first scheme is constructed in the manner described in section 5.2.1. The second scheme is constructed using the distributed system ALI_Net Supervisory Control loops. The two schemes are embedded in FIG. 111 model to compose the automated system AMR control scheme as shown in FIG. 113.

Procedure 5.3.3.1: Geometric Specification of an AMR Concurrent Application Control Scheme An AMR Concurrent Application Control Scheme is constructed as follows:

First, specify the dynamic relationship constraints of each ALI_Net referenced in the integrated architecture model. Dynamic relationship constraints of this model are specified using the following set of attributes as shown in FIG. 114:

(a) Configuration Control attributes which consist of:
  Loop name.
  Software/Hardware allocation (e.g. node name, processor name, and concurrent process names allocated as resources required to execute the named loop). Values of these attributes may be set by a human operator or dynamically assigned by the AMR_Configuration_Controller during run time operation.

(b) Quality Control attributes which consist of:
  Security control attributes such as access rights for each user type and each instant of a user type. Access right values include No_Access or Access to a named ALI_Net, a component object loop, a named object_operation or a data structure. Access rights are further constrained to deny making any changes to the system configuration, quality and performance control parameters.

Reliability control attributes. Desired communication system semantics such as atomic broadcast, causal broadcast or group broadcast protocols. In this invention these protocols use the system ALI_Net graphs as the context graph required to preserve the partial ordering of messages exchanged among a collection of concurrent processes in the presence of communication and processor failures.

Accuracy control attributes (equality, inequality, and discrete optimization constraints).

Loop invariants which state common preconditions on all loop operations. Invariant conditions on the loop state are established by the object_initialisation operation and are preserved by subsequent loop operations including failure recovery operations.

Performance Control attributes. These attributes are used to specify the service time distribution of system component objects, the invocation frequency of each ALI_Net loop, each of its object loop components, and the desired response time distribution. Furthermore each loop can be classified by system configurators as critical, essential, or nonessential and each can be assigned a time based value function. Critical loops are those with hard response time deadlines which must be achieved under all operating conditions. Essential loops are those with soft response time deadlines, which if not achieved will not cause a catastrophic system failures. Non-essential loops are those with response time deadlines, which if missed will not affect the system in the near future such as long term data recording. A loop category determines its share of available system resources. For each category three types of performance control attribute values are defined: required, measured, and predicted. These attributes are measured, predicted and used to control quality of delivered products and services as shown in procedure 5.3.3.2 and procedure 7.

Second, loop parameters specified in the last step are accepted and used by the distributed set of the system AMR Supervisory controllers to create the AMR Loop_Process data structures shown in FIG. 115. These structures are used by the AMR controller objects of each concurrent application control process as shown in procedure 5.3.3.2.

Inter_Process_Loop_Connectivity_Graph: This graph specifies the "enable/disable" state of each ALI_Net as well as the interconnections between the terminal input/output regions of various ALI_Net_Process_Segments required to execute each object_loop of each ALI_Net. The Inter_Process_Loop_Connectivity_Graph is used by the AMR_Reliable_Communication controllers and the AMR_Activation_Reply_Forward controller.

Intra_Process_Loop_Connectivity_Graph: This graph specifies each subset of each ALI_Net graph (called ALI_Net_Process_Segment) allocated to the named process. This segment specifies interconnections between intra-process objects, some times called component objects of the container object i.e. process, required to execute each object_loop of each ALI_Net allocated to the named process. The Intra_Process_Loop_Connectivity_Graph is used by the AMR_Base_Scheme controller.

Loops/Objects_Invocation_Queues.

Loops_Monitoring_Control_Parameters.

Resources_Monitoring_Control_Parameters.

Performance_Control_Parameters.

Security_Control_Parameters (Loops/Objects_Access_Rights).

Reliable_Communication_Parameters. These parameters specify causal ordering options.

Loop_Control_Flags: Six AMR flags are defined:
   PR Indicates that Performance Control option is set
   RC Indicates that Security control option is set
   RC Indicates that Reliable Communication control option is set
   RM Indicates that Resource Monitoring control option is set
   LM Indicates that Loop Monitoring control option is set
   LS Indicates that Loop Scheduling control option is set Third, application processing objects are allocated to concurrent application control processes. This allocation can be dynamically changed by the AMR run time system environment. As shown in FIG. 118, each AMR concurrent application control process contains two sets of objects; concurrent controllers object set and application processing object set. As shown in FIG. 119, the following set of concurrent controllers objects use the AMR_Loop_Process data structures, shown in FIG. 115, and the AMR_Message_Header, shown in FIGS. 116 and 117, to interconnect and synchronize the application processing objects within each process as well as between concurrent processes.

AMR Reliable_Communication Controller: When an application processing object is invoked, this controller uses the AMR_Message_Header, the Inter_Process_Loop_Connectivity_Graph, and the Reliable_Communication_Parameters to check if processing of the received message can be handled by the process and that the message is received in compliance with the casual ordering specified in the Inter_Process_Loop_Connectivity_Graph. IF the received message was sent to the wrong process, THEN the requested invocation is rejected, red edge 1-*a* and the supervisory configuration and security controllers are notified ELSE transaction manager services, e.g. CORBA, COM/OLE, etc. services, are used to lock the application processing object. If the object is not locked then the invocation is handed over to the security controller, black edge 1-*a*. On the other hand if it is locked then, depending on selected configuration parameter options, the requested invocation is returned to the input process queue or is rejected, red edge 1-*a*.

AMR Security Controller: This controller uses the Security_Control (process Loop_Objects Access Right) data structure to determine if the invoker, at this stage of the aggregated ALI_Net loop, is authorized to invoke all object operations of the named loop or can only invoke a named subset of these operations. In addition this controller invokes the decryption functions using the private key assigned to the current session assigned to the current Object_Loop. If the request is authorized then the request is inserted in the process Loop_Object Invocation Queues, black edge 1-*b*, else the request is rejected, red edge 1-*a*.

AMR Activation Controller: This controller uses the Loop_Objects Invocation Queues and the Intra_Process Loop Connectivity graph to activate the thread manager to create a new thread and link it to the requested loop operation. After termination, the Reply_Forward function sends operation results to invoker in compliance with the invocation service protocol. On completion of the process thread operations, the Reply_Forward functions provide the necessary wrapper and invoke communication object, see FIG. 91, to route messages to other process objects in accordance with the Inter_Process Loop Connectivity graph. Invoked objects may reside on the same or different stations of the distributed system.

AMR Concurrency Controller: This controller manages the synchronization of shared resources and management of the process invocation queue. It creates, deletes, suspends, resumes, and schedules object threads. Scheduling of thread objects is determined using AMR message header, process state, and the set of object preconditions (predicates) specified in the Intra_Process Loop Connectivity graph AMR Reliable_Configuration Controller This controller accepts process configuration control parameters from the AMR supervisory controller and uses these parameters to set the AMR Loop_Process data structure parameters shown in FIG. 90. On a hot restart/resume of operations, following a system failure, the AMR Reliable_Configuration controller restores from secondary memory all process persistent data for each object loop allocated to the named process. During the normal processing of process functions, all edits to named persistent data used by various object loops are automatically stored on secondary memory by the object manager encapsulating the named persistent data. In addition an AMR configuration controller uses monitored ALI_Net communication loads to edit the AMR Loop_Process data structures. This is carried out such that processes with heavy message communication are automatically migrated to reside on the same hardware node. This will result in reducing loading of the communication network infrastructure.

AMR_Monitoring Controller: In accordance with the AMR Supervisory Controller Process requests, this controller collects and dispatches Process and Loop state information to the Supervisory Controller Process, see FIGS. 120 and 121. The AMR Monitoring Controller:

Monitors utilization of system hardware resources such as processor utilization and memory utilization by different concurrent objects.

Selectively records interactions between different concurrent objects. Recorded data includes invocation time of operating system services, attribute values of invoked services such as the identification name of sender or receiver object, service time used by the operating system to execute desired service and the program counter identifying the state of the concurrent object invoking the system service.

Use recorded data to identify the concurrent object automata, i.e. internal processing control loops of the concurrent object. This specification is derived at the granularity of interfaces of the concurrent object with the operating system. The object automata identification algorithm reduces recorded data to generate statistical estimates of the service times elapsed between each ordered pair of states of the concurrent object. These states are specified at the points of interactions with the operating system. The object automata identification algorithm may be invoked during run time when the operating system service calls are invoked. In this invention it is assumed that the necessary data required to identify the concurrent object automata will be collected using run time monitoring services provided by operating system vendors.

Create Performance Relationship Displays associated with different processing control loops as specified in procedure 5.1.2. This is carried out by invoking methods of the views object, shown in FIG. 111. These methods generate views of processing loop display outputs. These displays are tailored to specific user types.

Fourth, Pipe connections are used to bind distributed concurrent system objects into dynamic loop structures as shown in FIG. 122. In this figure the fractal structure of object communication model, see FIG. 73, is aggregated with the concurrent process structure to form the aggregated concurrent object communication model shown in FIG. 122.

Procedure 5.3.3.2: Geometric Specification of an AMR Supervisory Control Scheme

An AMR Supervisory Control scheme is constructed as follows:

First, three sets of supervisory control loops are specified as shown in FIGS. 120 and 121. The first set of loops, designated by the blue color, are used to monitor the system physical resources; configure and control the allocation of these resources to application concurrent processes. The second set of loops, designated by the red color, are used to monitor, configure and control the allocation of each application_specific processing loops to one or more concurrent processes. These processes may be allocated to one or more nodes of the distributed hardware system. The second set of loops control the scheduling of available system resources to serve the run time operational needs of monitored concurrent processes. The third set of loops, designated by the black color, are used to coordinate and synchronize the multi-node set of AMR supervisory control processes. These loops broadcast desired control requests, of a named set of ALI_Net loops, to all AMR supervisory control processes residing on each system node involved in the processing of the named loops. If a performance exception is raised about a named ALI_Net, then coordination control requests are exchanged between peer AMR supervisory control processes.

Second, each AMR supervisory control concurrent process has two sets objects, see FIG. 123, the concurrent controllers object set, as shown in FIGS. 118 and 119, and the supervisory controllers object set. Control roles played by the supervisory controller objects are shown in FIG. 124 as follows:

AMR Overload_Monitor. As shown in FIG. 125, this monitor uses the Node Process and Loops state data structure to update the AMR Temporal_State data structure. This data structure maintains state information about each ALI_Net loop and its implementation by the distributed system concurrent processes. Six major sets of variables are tracked by the monitor namely Loop_Response_Time, Loop_Response_Time_Remaining, Loop_Load, Loop_Service_Time, Resource_Utilization and Loop_Accuracy. The current value of the state variable and its estimated deviation, i.e. error, from a desired set point at the point of measurement is carried out using the Loop_Cycle time window specified in FIG. 126. The time Duration of Loop_Cycle_Window $C_x$ for all x is set equal to the maximum of the Loop_Response Time_Desired for all loops.

The first set of measurements, Loop_Response_Time (LRT), is used in the following procedure to compute the Loop_Response_Time_Set_Point for each loop_component_object $O_m$ of loop $L_n$ during the current Loop_Cycle $C_c$ Loop_Response_Time_Set_Point $(L_n, O_m, C_c)$=
Loop_Response_Time_Desired $(L_n, O_e)*[\Sigma_{x=c-1}^{x=c-1-b}$
$(\{\Sigma_{j=i-k(x)-1}^{j=i-1}$
[Loop_Response_Time_Measured $(L_n, O_m, C_x, j)$
/Loop_Response_Time_Measured $(L_n, O_e, C_x, j)]\}/$
$k(x))]/b$ Such that:

Loop_Response_Time_Measured $(L_n, O_e, C_x, j)$<=
Loop_Desired_Response_Time $(L_n, O_e)$ Where:

Loop_Response_Time_Measured $(L_n, O_m, C_x, j)$ is the measured response time for the $j^{th}$ invocation of loop $L_n$ after the execution of object $O_m$ during the $x^{th}$ Loop_Cycle $C_x$ k(x)=Number of invocations of loop $L_n$ during the $x^{th}$ Loop_Cycle $C_x$ $O_e$=End terminal component object of loop $L_n$ generating $L_n$ terminal outputs c=Current loop cycle b=Number of loop cycles included in the computation where each cycle x have the same set of loops that are invoked in the current cycle The above formula is used to compute the LRT_Error set:

Loop_Response_Time_Error $(L_n, O_m, C_c, i)$=
{Loop_Response_Time_Measured $(L_n, O_m, C_c, i)$−
Loop_Response_Time_Set_Point $(L_n, O_m, C_c)$}

Loop_Response_Time_Delta_Error $(L_n, O_m, C_c, i)$=
{Loop_Response_Time_Error $(L_n, O_m, C_c, i)$−
Loop_Response_Time_Error $(L_n, O_m, C_c, i-1)$}

Loop_Response_Time_Differential_Error $(L_n, O_m, C_c, i)$=
Loop_Response_Time_Delta_Error $(L_n, O_m, C_c, i)$/
Loop_Response_Time_Error $(L_n, O_m, C_c, i)$ Loop_Response_Time_Integral_Error $(L_n, O_m, C_c)$=
$\Sigma_{x=c-1}^{x=c-1-b}(\Sigma_{j=i-k(x)-1}^{j=i-1}$[Loop_Response_Time_Error $(L_n, O_m, C_c, j)$/d Where:

d=Number of loop cycles included in the integral error computation

Loop_Response_Time_Remaining_Error $(L_n, O_m, C_c, i)$=
{Loop_Response_Time_Measured $(L_n, O_m, C_c, i)$−
Loop_Response_Time_Desired $(L_n, O_e)$}

The second set of measurements, Loop_Load (LL), is used in the following procedure to compute the Loop_Load_Set_Point and Loop_Load_Measured for the current Loop_Cycle $C_c$:

Loop_Load_Set_Point $(L_n, C_c)$=$[\Sigma_{x=c-1}^{x=c-1-b}${Loop_Load_Measured $(L_n, C_x)$
/$\Sigma_{j=1}^{j=m(x)}$[Loop_Load_Measured $(L_j, C_x)]\}/b$ where Loop_Load_Measured $(L_j, C_x)$ (Total number of invocations of loop $L_j$ during the $x^{th}$ Loop_Cycle $C_x$/Loop_Cycle_Time)

m(x)=Number of loops used during the $x^{th}$ Loop_Cycle $C_x$

Furthermore,

Loop_Load_Current $(L_n, C_c)$=
{Loop_Load_Measured $(L_n, C_c)/\Sigma_{k=1}^{k=m(c)}$[Loop_Load_Measured $(L_k, C_c)]\}$ The above formula is used to compute the LL_Error set:

Loop_Load_Error $(L_n, C_c)$=
{Loop_Load_Current $(L_n, C_c)$−Loop_Load_Set_Point $(L_n, C_c)$}

Loop_Load_Delta_Error $(L_n, C_c)$=
  {Loop_Load_Current $(L_n, C_c)$−Loop_Load_Current $(L_n, C_{c-1})$}

Loop_Load_Differential_Error $(L_n, C_c)$=
  Loop_Load_Delta_Error $(L_n, C_c)$/
  Loop_Load_Error $(L_n, C_c)$ Loop_Load_Integral_Error $(L_n, C_c)$=
  $\Sigma_{x=c-1}^{x=c-1-b}(\Sigma_{j=i-k(x)-1}^{j=i-1}$[Loop_Response_Time_Error $(L_n, C_c, j)$]/d Where:
  d=Number of loop cycles included in the integral error computation The third set of measurements, Loop_Service_Time (LST), is used in the following procedure is used to compute the Loop_Service_Time_Set_Point for each loop_component_object $O_m$ of loop $L_n$ during the current Loop_Cycle $C_c$:

Loop_Service_Time_Set_Point $(L_n, O_m, C_c)$=
  $[\Sigma_{x=c-1}^{x=c-1-b}(\{\Sigma_{j=i-k(x)-1}^{j=i-1}$
  [Loop_Service_Time_Measured $(L_n, O_m, C_x, j)$/
  Loop_Service_Time_Measured $(L_n, O_e, C_x, j)$]}/k(x))]/b where
  Loop_Service_Time_Measured $(L_n, O_m, C_x, j)$ is the cumulative service time for the $j^{th}$ invocation of loop $L_n$ after the execution of object $O_m$ during the $x^{th}$ Loop_Cycle $C_x$. Cumulative service time does include any wait time for availability of required resources.
  k(x)=Number of invocations of loop $L_n$ during the $x^{th}$ Loop_Cycle $C_x$
  $O_e$=End terminal component object of loop $L_n$ generating $L_n$ terminal outputs
  c=Index of current loop cycle
  b=Number of loop cycles included in the computation. Each cycle have the set of loops that are incorporated in the current cycle The above formula is used to compute the LST_Error set:

Loop_Service_Time_Error $(L_n, O_m, C_c, i)$=
  {Loop_Service_Time_Measured $(L_n, O_m, C_c, i)$−
  Loop_Service_Time_Set_Point $(L_n, O_m, C_c)$}

Loop_Service_Time_Delta_Error $(L_n, O_m, C_c, i)$=
  {Loop_Service_Time_Measured $(L_n, O_m, C_c, i)$−
  Loop_Service_Time_Measured $(L_n, O_m, C_c, i-1)$}

Loop_Service_Time_Differential_Error $(L_n, O_m, C_c, i)$=
  Loop_Service_Time_Delta_Error $(L_n, O_m, C_c, i)$/
  Loop_Service_Time_Error $(L_n, O_m, C_c, i)$ Loop_Service Time_Integral_Error $(L_n, O_m, C_c)$=
  $\Sigma_{x=c-1}^{x=c-1-b}(\Sigma_{j=i-k(x)-1}^{j=i-1}$[Loop_Service_Time_Error $(L_n, O_m, C_c, j)$]/d Where:
  d=Number of loop cycles included in the integral error computation The fourth set of measurements, Loop_Resource_Utiliztion_Level (LRUL) such as Queue_Utilization, CPU_Utiliztion, Equipment_Utilization or Human_operator_Utilization levels is used in the following procedure to compute the Loop_Resource_Utiliztion_Set_Point $(L_n, R_j, G_k, C_c)$ of the resource $R_j$ allocated to the $G_k$ operational region to support the execution of loop $L_n$ during the current Loop_Cycle $C_c$ Loop_Resource_Utiliztion_Set_Point $(L_n, R_j, G_k, C_c)$=
  $\Sigma_{x=c-1}^{x=c-1-b}$
  [{Loop_Resource_Utiliztion_Measured $(L_n, R_j, G_k, C_x)$/
  $\Sigma_{i=1}^{i=m(x)}$[Loop_Resource_Utiliztion_Measured $(L_i, R_j, G_k, C_x)$]}/b where
  Loop_Resource_Utiliztion_Measured $(L_n, R_j, G_k, C_x)$=Maximum utilization level of Resource $R_j$ during loop cycle $C_x$
  m(x)=Number of loops used during the $x^{th}$ Loop_Cycle $C_x$ The above formula is used to compute the LRUL_Error set:

Loop_Resource_Utiliztion_Error $(L_n, R_j, G_k, C_c)$=
  {Loop_Resource_Utiliztion_Measured $(L_n, R_j, G_k, C_c)$−
  Loop_Resource_Utiliztion_Set_Point $(L_n, R_j, G_k, C_c)$}

Loop_Resource_Utiliztion_Delta_Error $(L_n, R_j, G_k, C_c)$=
  {Loop_Resource_Utiliztion_Measured $(L_n, R_j, G_k, C_c)$−
  Loop_Resource_Utiliztion_Measured $(L_n, R_j, G_k, C_{c-1})$}

Furthermore,

Available_Resource $(R_j, G_k, C_c)$=
  Allocated_Resource $(R_j, G_k, C_c)$−
  $\Sigma_{i=1}^{i=m(x)}$[Loop_Resource_Utiliztion_Measured $(L_i, R_j, G_k, C_c)$]

Loop_Resource_Utiliztion_Differential_Error $(L_n, R_j, G_k, C_c)$=
  Loop_Resource_Utiliztion_Delta_Error $(L_n, R_j, G_k, C_c)$/
  Loop_Resource_Utiliztion_Error $(L_n, R_j, G_k, C_c)$ Loop_Resource_Utiliztion_Integral_Error $(L_n, R_j, G_k, C_c)$=
  $\Sigma_{x=c-1}^{x=c-1-b}(\Sigma_{j=i-k(x)-1}^{j=i-1}$[Loop_Resource_Utiliztion_Error $(L_n, R_j, G_k, C_c, j)$]/d Where:
  d=Number of loop cycles included in the integral error computation AMR Learning Controller. As shown in FIG. 127, methods of this object accept as inputs time ordered crisp values of observed system state variables such as the four major set of variables tracked by the AMR_Overload_Monitor. For a given desired prediction distance, and the maximum prediction error which meet the desired quality metrics, the Model Estimation and State Prediction object estimate:
  Minimum order of the process model, underlying the observed state variables, which meets the desired maximum prediction error metric
  Process model coefficients including model delay
  Predicted value, % error, residual error energy at all future time instants from now until the maximum prediction distance, where
    Maximum_Prediction_Distance $(L_n, O_m, C_c, i)$=
      Loop_Response_Time_Desired $(L_n, O_e)$−
      Loop_Response_Time_Measured $(L_n, O_m, C_c, i)$ State prediction is carried out for measured variables, such as Loop_Response_Time_Measured, Loop_Load_Measured, Loop_Service_Time_Measured, Loop_Resource_Utiliztion_Measured. Loop measurements are collected from a single or multiple invocations of a given loop. In the single invocation case, at the end of execution of current object $O_m$ for the current invocation i of loop $L_x$, the error prediction algorithm accepts as input the response time series {Loop_Response_Time_Measured ($L_x$, $O_1$, i),
  Loop_Response_Time_Measured ($L_x$, $O_2$, i), ...,
  Loop_Response_Time_Measured ($L_x$, $O_m$, i)}
where
  {$O_1, O_2, O_3, O_4, ..., O_m$} is the set of all objects executed in the i th invocation of loop $L_x$ In the multiple invocation case, at the end of execution of current object $O_m$ for the current invocation i of loop $L_x$, the error prediction algorithm accepts as input the time series
{Loop_Response_Time_Measured ($L_n$, $O_m$, i-k),
  Loop_Response_Time_Measured ($L_x$, $O_m$, i-k-1), ...,
  Loop_Response_Time_Measured ($L_x$, $O_m$, I)}
where k is the last set of loop invocations of object $O_m$ used by the error prediction algorithm The AMR_Learning_Controller uses the dead time moving average ladder algorithm of this invention as specified in procedure 10. This algorithm enables the estimation of system model order and it's associated dead time parameters for non-linear systems with time varying properties. This means that the system delay can shift as a function of the system operating level. As shown in procedure 10, the powerful orthogonalization properties of the dead time moving average ladder algorithm enable the estimation of the probability limits associated with different prediction distances as well as the residual energy of the prediction error at different system orders. Under special conditions, shown in procedure 10, the dead time moving average ladder algorithm is reduced to the prewhitening ladder algorithm used in the seismic and speech recognition industries (Makhoul 1978, Riley 1972). Fractal representations of procedure 10 algorithms are shown in FIGS. 128 to 132.

AMR Performance Controller: as shown in FIG. 133, this object, uses the ALI_Nets_Temporal_State data structure to generate Configuration_Control_Requests and Scheduling_Control_Requests required to adapt system behavior to meet desired performance requirements. To perform this function the AMR performance controller object invokes the AMR Fuzzy Control Engine as shown in FIG. 134. This engine is aggregated using the following component objects as shown in FIG. 135:

Update membership Functions object which enables the specification, editing, normalization and storage of the member functions of each linguistic variable in the ALI_Nets_Temporal_State data structure. For each variable the seven fuzzy labels EXCELLENT, V. GOOD, GOOD, OK, BAD, V. BAD, TERRIBLE are provided as shown in FIG. 136. Shape, overlap, and number of membership functions can be overridden.

Fuzzifier object which uses the set of ALI_Net Member Functions to compute the degree of membership of each ALI_Nets_Temporal_State crisp value referenced in the antecedent propositions of the ALI_Net rules specified in FIGS. (137–144).

The ALI_Net_Correlator_Aggregator object which maps the fuzzy logic operations specified in the input fuzzy propositions of the ALI_Net performance control rules into output fuzzy propositions that are processed by the Defuzzifier object. The default set of the ALI_Net performance control rules are shown in FIGS. (137–144). This set is edited using information provided by the AMR overload monitor and the AMR learning controller. As selected by the system configurator, the ALI_Correlator_aggregator object uses:

Standard correlation minimum techniques to truncate the consequent fuzzy set, SCL and CCL, at the limit of the premise's truth value of the specified error sets; or the standard Correlation Product techniques to scale the consequent fuzzy set, SCL and CCL, by multiplying each truth membership by the premise truth.

Standard minimum/maximum aggregation techniques to compute the maximum of the consequent fuzzy set and the solution fuzzy set at each point along their mutual membership function. This is followed by aggregating the set of consequent fuzzy sets using the fuzzy union operation; or the standard Additive Aggregation techniques to add the correlated consequent fuzzy set to the contents of the solution variable's output fuzzy region.

Defuzzifier object, which uses the aggregated result of output fuzzy propositions to compute the crisp value of the scheduling priority request conveyed to a specified resource's scheduler object or the crisp value of the configuration load shedding request conveyed to the system configuration control processes.

AMR Configuration Controller: This object disables the execution of nonessential, essential, and critical ALI_Net loops, in this order. Loops to be disabled are those identified in received Configuration_Control_Requests from the AMR Performance Controller. Duration of the disable period is determined by the duration time of the overload or malfunction system conditions which gave rise to conditions detected or predicted by the AMR performance controller. Enabling and disabling commands are carried out by invoking the AMR_Reliable_Configuration_Controller of different concurrent processes.

Procedure 6: Control Oriented Specification of Business Management Activities of a Real System Failure to adapt products and services, which satisfy rapidly changing customer needs, are attributed primarily to management failure to:

Clearly delineate customer needs and how these needs are met by all business functions at all levels of the organization's work force.

Form business teams that can understand market trends and dynamics, target their products at specific audience, and adapt offered products to changing requirements of customers.

Integrate the customer into the design process to guarantee a product that is tailored not only to the customer's needs and desires but also to the customer's strategies and future goals Create new products quickly by doing development, manufacturing, and delivering customer satisfaction "right the first time".

Incorporate provisions for quantifying, measuring and evaluating the value of each product, service or business function.

Reduce all costs of production by enhancing labor productivity; reducing errors, defects, and waste; improving responsiveness and cycle time performance; improving productivity and effectiveness in the use of resources; reducing idle time; and speeding the flow of organized information.

Incorporate provisions for the monitoring and control of different interactions between product development and operational business functions. These interactions, individually and collectively, determine product quality requirements, and its development cost as well as the time and effort required to service customers. Without this analysis, all predictions of business value and its future viability are suspect.

Facilitate the free, but organized, flow of information between development functions responsible for the creation of new products and services, and operational business functions responsible for the day-to-day operation of business.

measure current business processes, predict the impact of business re-engineering changes on product quality and financial results, plan incremental implementation of changes, re measure the designed process against the original goals, evaluate effectiveness of changes and implement the necessary adjustments.

To resolve the above difficulties, the following procedure is used to plan, analyze and manage business operations:

First, the internal structure of an organization structure is specified using two major sets of workflow ALI_Nets as shown in FIG. 145. The purpose of the first set of ALI_Nets, called Business Planning ALI_Nets, is to integrate the customer into the design process of products and services. Product planning ALI_Nets involve three sets of functions: product positioning, market positioning, and corporate positioning. Design of these functions should be carried out using the Relationship Marketing approach advanced by Regis McKenna where:

Product positioning functions determine how the company wants its product to fit into the competitive market Market positioning functions determine early customer advocates, reseller networks, distributors, third party suppliers, and journalists who control the flow of information and opinion.

Corporate positioning functions validate the company market positioning and its product positioning. It is based on many factors, including corporate history, management strengths, and the selection of product mix. Usually product mix should include silver bullet products, required for future technological survival, and "plain vanilla" products, required for current financial success.

Second, the business planning ALI_Nets should be supported by the second set of ALI_Nets, called AMR Product Development and Operation ALI_Nets. These nets are composed using the following four sets of loops: architecture specification and analysis ALI_Nets; "product/service" design and analysis ALI_Nets; product manufacturing and physical integration ALI_Nets; and product/service tailoring ALI_Nets. As shown in FIGS. 146 and 147, a value cost trade-off analysis is embedded in the very internal operation of each product development loop. This analysis ensures that product development activities are formulated, elaborated, connected, and synchronized with the product planning loops as shown in FIG. 147. In this figure:

The outermost loop architecture specification functions are used to generate alternative operational requirement architecture models for a proposed product concept. These models are used to estimate the technical feasibility, cost, and business value of each operational architecture model as shown in the next step of this procedure. Results of the value cost analysis are used to select the set of one or more operational architecture models to be further investigated.

The middle loop product design functions use the selected operational architecture models to generate detailed integrated design control architecture models. These models are used to estimate the technical feasibility, cost and business value of each system design architecture model as shown in next step of this procedure. Results of the value cost analysis are used to select the set of one or more design control architecture models to be further investigated.

The inner loop product manufacturing functions use the selected design control architecture model to generate integrated implementation architecture models. These models are used to: 1) estimate the technical feasibility, cost and business value of each system implementation option as shown in next step of this procedure; 2) automate the manufacturing of products using design automation tools.

As shown in procedure 5.2, each of the above architecture models is specified by a set of ALI_Net loops such that each ALI_Net graph:

Specifies the set of end-to-end activities that create a valuable result for a customer (end user)

Specifies the business importance of system activities used to provide customers with the required service or product. Business importance is specified using value metrics agreed to by end users and system buyers. Examples of these metrics are shown in FIG. 153. Value metrics are used to resolve design trade off decisions. To achieve adaptive system goals, value metrics are used by the AMR system schedulers to manage the allocation of system resources to loop functions.

Provides system professionals with an invariant mechanism, across different phases of the system life cycle, for representing how system functions are glued to provide required end user functions. This enables the specification, design, implementation, tracking, comprehension, and documentation of the meaning of different levels of inter-connections required to deliver end user function. Levels of interconnections include those between users and external system objects, between concurrent system objects, or between methods of concurrent objects.

Third, as shown in FIG. 148, value cost analysis is carried out using the AMR Sensitivity Analysis tool. This tool is used to compute the operational performance of alternate architecture models. Using the AMR Sensitivity Analysis tool, enable the evaluation of the impact of changes in the system design structure parameters, or available resources, on the system performance metrics. Examples of system performance metrics are response time, throughput, resource utilization, and resource queue levels. Design parameter changes include or its workload characteristics:

Type of messages communicated between system objects, the execution logic of each object and type of synchronization mechanism used to synchronize the sharing of resources used by system objects.

Values of system design parameters for each architecture model under study. These parameters include invocation frequency and workload characteristics of ALI_Net loops and their priorities; processing budgets of object functions; resource size and their allocation strategy to system objects, and processors' ratings.

Scenario generators describing the system environment interactions and inputs workload characteristics.

As shown in FIG. 148, the AMR Sensitivity Analysis tools retrieve from the AMR Knowledge Manager the set of architecture model alternative and their associated AMR_

Loop_Process data structures. Each alternative is defined as a performance analysis experiment analyzed by the AMR Parallel Simulation Engine. As shown in FIG. 149, this engine is composed using two major objects, the Multi_Experiment Multi_Node Process Interpreter and the Multi_Experiment Multi_Node Kernel Interpreter.

Fourth, sensitivity analysis results for each ALI_Net of each product design alternative are displayed using ALI_Net Business Tracking graphs shown in FIG. 153. These graphs provide a comprehensive summary of the values of the set of metrics used to measure the operational effectiveness and value of the system design.

Fifth, use the ALI_Net business tracking graphs and their associated Object/loop state graphs to identify bottlenecks of current operations or proposed system designs and resolve design trade off decisions.

Sixth, generate incremental business development plans of proposed system development activities using ALI_Net Project Schedule graphs and their associated Work Breakdown Structure graphs as shown in FIGS. 150, 151 and 152. The spiral, incremental, business development plan is constructed using the following rules:

- All ALI_Nets can be built concurrently since no coupling between various ALI_Nets exist.
- Each ALI_Net has an operational integrity of its own. Hence it delivers to the end user a useful function without compromising the long-term integrity of the system architecture when subsequent builds are delivered.
- The Object_Loop precedence graph, of each ALI_Net, specifies coupling between system components and the order of integration of these components to create each Object_Loop and the set of coupled Object_Loops composing the designated ALI_Net. For the automated segments of the real system this integration may be carried out off-line by system developers or dynamically by the AMR run time systems.
- ALI_Net graphs are used to automate the generation of system integration and system acceptance tests. Each graph provides an operational definition of how system components should be assembled to meet different end user functional performance requirements.

Seventh, generate Integrated Business Dynamics and Business Control graphs. As shown in FIGS. 152 and 153, these graphs provide a seamless integration of information provided by the ALI_Net business tracking graphs of FIG. 85, and the ALI_Net project schedule graphs. As shown in FIG. 152, the geometric regions can be curved and stretched to represent their time duration, their resource consumption, and their added value metrics. These metrics are displayed in FIG. 152 by unfolding the ALI_Net Business Tracking Graph shown in FIGS. 153. Integrated business dynamics and business control graphs provide business executives with a comprehensive view of business performance, its operational value, its financial value measurement and how these measurements stack against the original goals. This information is used to make the necessary adjustments and upgrade of current business operations, and how these operations can be evolved to incorporate new products.

Procedure 7: Specification of Capabilities of the AMR Tools

In this procedure a user interface of the capabilities of AMR tools is presented. These tools enable the specification, analysis, synthesis, design automation, and sustainment of systems created using M computational models. FIG. 154 provides an overview of the pull-down menus supported by the following set of AMR tools:

Architecture Specification tools as shown in procedure 7.1

Architecture View tools as shown in procedure 7.2

Architecture Analysis tools as shown in procedure 7.3

Real System Planning tools as shown in procedure 7.4

Real System Control tools as shown in procedure 7.5

Project Management tools as shown in procedure 7.6

User Interface of the AMR tools utilize a mixed style of visual and text system specifications. The text specification is primarily used to specify the internal design of visually atomic objects. The visual specification makes extensive use of the M language of this invention to specify and enact the configuration of visually atomic objects into adaptive computer based systems. Although the specific user interface description provided in this procedure contains many specifies, these should not be construed as limiting the scope of the invention but as merely providing illustrations of some of the embodiments of this invention.

Procedure 7.1: Architecture Specification Tools

The following set of menus and dialogue boxes are provided to specify the architecture of real systems:

The "Architecture Categories Rules" dialogue box shown in FIG. 155, which provides users the capability to:

Specify a new architecture category, attributes of the named category and their values.

Display and edit an architecture category, its associated list of instances, allowed list of Object/Resource Categories used by the selected architecture instance, list of allowed Object/Resource Classes of the selected Object Category, and list of allowed Model_Types used to specify the selected architecture instance.

The "Category Specification Rules" dialogue box shown in FIG. 156, which provides users the capability to:

Specify categories of entities referenced by the system specifications.

Default category names supported by procedure 7 tools are:

Model category with default values {Entity_Relationship, State_Transition, Data_Flow, Colored_Petri_Net, Object_Relationship, Loop_Relationship}.

Loop_Relationship category with default values {Processing, Control, Diagnostics}.

Loop_Aggregation category with default values {Object, ALI_Net}.

Object category with default values {Software, Hardware, Infotronic, Netronic, Mechatronic, Notronic}.

Resource category with default values {Human, Physical, Material, Information}.

Signal category with default values {Analogue, Digital}.

Edit above default category names and their values.

The "Model Specification" menu shown in FIG. 157. This menu provides the following six dialogue boxes:

The "Project Region" dialogue box shown in FIG. 157, which provides users the capability to:

Create a project. Project name is used to label the geometric region allocated to the project.

Specify names of project root regions. A region is designated a "Root Region" if it is not contained within any other region of the same type. Four region types are identified: system, external systems, storage resource and pipe.

Display, edit and assign a palette specifying the generalized graphic icons of each entry in the list of projects, their associated list of root external system objects, root system objects, and root resources as shown in FIG. 158.

Specify and edit categories of Object_Loop components of an ALI_Net and their model category as shown in FIGS. (159 and 160). A list of ALI_Net classes and their instances for each selected model category is displayed as shown in FIG. 160.

The "Object Region" dialogue box shown in FIG. 161, which provides users the capability to:

Create an object class, an object instance, its attributes, and their values. Object name is used to label the geometric region allocated to the object If the object name was previously specified, then it will be automatically displayed in the Object region as shown in FIG. 161.

Specify input/output pipes names. These regions are specified using FIG. 167 dialogue box.

Specify Object name, its category, class, attributes and methods as shown in FIG. 162.

Display the system object inheritance tree. Two types of displays can be invoked by the "Class Inheritance Graph Display Option" button: a traditional class inheritance tree display or a geometric Class inheritance graph display as shown in FIG. 162. The latter display provides a geometric representation of different object classes of a given object inheritance tree using a fractal pattern of multilevel regions where the lowest region level represents the root of the inheritance tree.

View all system object classes of the selected category (object class window), attributes of each class (object attributes window) and its methods (Object methods window). These windows may display all object classes of the given project such that all list entries associated with the object region invoking the dialogue box are tagged when the dialogue box is opened. Or displayed lists may be limited to relevant information of the object region invoking the dialogue box as shown in FIG. 162.

Specify attributes and methods of object classes. For visually atomic objects create or edit the code of object classes, methods and their attributes using the textual natural or programming language editor window as shown in FIG. 162.

Display, edit, and assign a generalized graphic icon to each entry in the list of object classes and their methods as shown in FIG. 163.

Generate a lower level display of the component objects of a container object Δ by double clicking any way within the selected region as specified by procedure 2 rules.

The "Storage Region" dialogue box shown in FIG. 164, which provides users the capability to:

Create a storage type, storage instance, its attributes, and their values. Storage name is used to label the geometric region allocated to the storage resource If the storage resource name was previously specified, then it will be automatically displayed in the resource region allocated to the resource as shown in FIG. 164.

View system storage classes of the selected category, their attribute values and name of object managers of each resource class. These windows may display all storage resource classes of the given project such that all list entries associated with the storage resource region invoking the dialogue box are tagged when the dialogue box is opened. Or displayed lists may be limited to relevant information of the storage resource region invoking the dialogue box. If a resource manager is not specified then it is assumed that the named resource is directly manipulated and managed by the higher level container (parent) object. In this case methods of the parent object (the resource manager) are used to access the named resource as shown in FIG. 165.

Display, edit, and assign a generalized graphic icon to each entry in the list of storage resource classes, their attributes and their resource managers as shown in FIG. 166.

Create, edit, or save displayed resource types. Resource attributes can be defined using abstract data types such as a constant, a decision or a routing table, an attribute table, a logical relationship, a relational relationship, or a probabilistic relationship. These modifications can be saved in project libraries specified using the dialogue box of FIG. 155.

Designate resources that are persistently stored on secondary memory.

Specify the allocation of resources to different object loops as specified in the AMR configuration controller dialogue box, FIG. 191. This dialogue box enables viewing the list of loop names, and their types, associated with the named resource region.

Generate a lower level display of the component resources of a storage resource region ▽ by double clicking any way within the selected region as specified by procedure 2 rules.

The "Pipe Region" dialogue box shown in FIG. 167, which provides users the capability to:

Create a pipe type, pipe instance, its attributes, and their values. Pipe name is used to label the geometric region allocated to the pipe resource. If the pipe resource name was previously specified, then it will be automatically displayed in the pipe region allocated to the resource as shown in FIG. 168.

Specify message classes, their attributes and values handled by the pipe resource and their encapsulating communication manager. Message classes define the external interface of objects connected to the named pipe class. Message class definition include:

Application data entity subreference specifying message name and type.

Object subreference specifying names of message generator, senders and receivers objects.

Predicate subreference specifying one or more sets of the named message data entities.

Time subreference specifying message generation, send, and receive times.

Select and edit message classes and communication managers using lists of message classes and communication managers stored in the project data base.

Allocate selected message types to loops and message coordination by invoking the Loop Type Specification dialogue box as shown in FIGS. (168 and 169).

View pipe classes of the selected category, their attribute values and their communication managers as shown in FIG. 168.

Display, edit and assign a generalized graphic icon to each entry in the list of pipe classes, their attributes, and their communication managers. see FIG. 169.

Generate a lower level display of the component resources of a pipe resource region ▽ by double clicking any way within the selected region as specified by procedure 2 rules.

The "Loop Region" dialogue Box shown in FIG. 170, which, for a selected set of one or more edges, provides users the capability to:

Create a loop type, loop instance, its attributes, attribute values, and terminal loop methods. Loop name is used to label the geometric region allocated to the loop. If the loop resource name was previously specified, then it will be automatically displayed in the loop region allocated to the resource as shown in FIG. 170.

Designate the loop as a root loop. A loop is designated a "Root loop" if all of its edges are not a subset of the loop edges of another loop.

Display the inheritance tree of system loops.

View all system loop classes of the selected category, attributes of each class, their methods and the interface definition language specification of each component object performing loop functions. These windows may display all loop classes of the given project such that all list entries associated with the set of loops invoking the dialogue box are tagged when the dialogue box is opened. Or displayed lists may be limited to relevant information of the set of loops invoking the dialogue box. As shown in procedure 5.3.3.1, loop attributes include loop priority to specify the business criticality of a selected loop and the desired and actual performance parameters of the selected loop such as the loop execution frequency, loop response time, and loop throughput These parameters are used to generate display diagrams to visualize system dynamic evolution under different operating conditions as shown in FIG. 36. As shown in procedure 5.3 these parameters are also used by loop enactment tools to control system behavior to meet user specified loop performance parameters.

Specify the loop branching conditions executed by each component object of the selected loop. The loop branching conditions dialogue box, enables the display of loop lists for each object selected from the Loop Object window, resources consumed, generated, or shared by the selected object to perform loop functions and the attributes of each of these resources. Entries from these lists are selected and used to specify the logical expressions of both input, output conditions and the annotation of loop edges as shown in FIGS. (74–77.

Specify message coordination executed for each branch of the selected loop. The message coordination dialogue box of FIG. 171, enables:

Selection of message synchronization options such as synchronous or asynchronous.

Designation of a named event flag to indicate send or receive events of the named messages by the sender and receiver objects.

Attach a no wait or a specified wait condition to the loop branch communication request. If the requested message communication is not completed within the specified wait time, then the named event flag will be set.

Display, edit and assign a generalized graphic icon to each entry in the list of ALI_Net loops, Object loops, their methods and arguments as shown in FIG. 172.

Generate a lower level display of the component of a compound loop region Δ by double clicking any way within the selected region as specified by procedure 2 rules.

The "Model Manipulation" menu shown in FIG. 173. This menu enables tool functions providing Aggregate, De-aggregate, Layer, Fold, and Unfold operations on the selected set of geometric regions using drag and drop operations. These operations are carried out on the selected geometric regions using rules specified in procedures 2, 3, 4 and 5 and their supporting figures.

The "Architecture Constraints" menu which consists of the Object Relationship Constraint menu and the Loop Relationship Constraint menu as shown in FIG. 174 where:

The Object Relationship Constraint menu provides the following two dialogue boxes:

The "Containment Relationship Constraint menu" dialogue box, which provides users the capability to:

Configure a container object using a set of one or more component objects as shown in FIG. 174. This operation can be equally achieved by drag and drop operations on the geometric regions of the container and component objects using rules specified in procedures 1–6.

Display a list of message interface and storage resource classes encapsulated by the selected container or component objects as shown in FIG. 174.

The "Association Relationship Constraint menu" dialogue box, which for a selected one or more object regions provides users the capability to:

Display the association relationships between the selected set of objects using the coloring scheme shown in FIG. 175 or an equivalent form of relationship identification such as the associated object name.

Specify the Cardinality Constraints and the min. and max. parameters of the participation and the Co_Occurrence constraints for each selected association relationship using the dialogue box of FIG. 176.

The "Loop Relationship Constraint" menu dialogue box shown in FIG. 177, which provides users the capability to:

Display a list of ALI_Net classes and their instances; their component Object_loops and their instances.

Display a list of coupled ALI_Nets for a selected ALI_Net class or one of its instances.

Display a list of coupled object_loops for a selected object_loop class or one of its instances.

Procedure 7.2: Architecture Viewing Tools

The following set of dialogue boxes are provided to specify display views of a real system:

The "Architecture View Type" dialogue box, shown in FIG. 178, which provides users the capability to:

Specify the display type of the architecture views of a selected model type of a selected architecture category. This view may be restricted to a selected set of ALI_Net classes, and their component object_loops, executing on a selected set of nodes and processors.

Define the architecture view display type by selecting projection type and enabling/disabling the semantics and geometric icons of components referenced by the selected architecture.

The "Region View Type" dialogue box, shown in FIG. 179, which provides users the capability to:

Define the region display type by enabling/disabling the semantics and geometric icons of the selected region categories.

Define region annotation as shown in the annotation options dialogue box for the selected region type.

Procedure 7.3: Architecture Analysis Tools

The following set of dialogue boxes are provided to analyze the architecture of a real system:

The "Structural Analysis Reports" dialogue box shown in FIG. 180, which provides users the capability to:

Display a list of undefined initial condition resource regions and list of unreachable state regions for selected instances of a selected ALI_Net class or selected instances of a selected Object_loop class of the selected instances of the selected ALI_Net.

Display a list of boundedness, deadlock, and liveness metrics of the selected set of coupled ALI_Nets and their component object loops.

Display a tool computed fractal dimension of the selected set of coupled ALI_Nets and their component object_loops.

Display a tool computed entropy metric of each object_loop of a selected ALI_Net.

Display a tool computed entropy coupling transmission metric between selected object loops The "Dynamic Analysis Reports" dialogue box, shown in FIG. 181, which provides users the capability to:

Display a list of desired, actual, and error values of "Loop_Load, Loop_Response_Time & Loop_Service_Time" variables for selected instances of a selected ALI_Net class or the selected instances of a selected Object_loop class of the selected instances of the selected ALI_Net.

Display a list of desired, actual, and error values of "Loop_load & Loop_Service_Time" variables for the selected instances of selected Object_loop class of the selected instances of the selected ALI_Net.

Display a list of service times and utilization levels of methods and resources used to execute the selected ALI_Net loops and their component object_loops.

Procedure 7.4: Real System Planning Tools

The "Real System Planning" dialogue box shown in FIG. 182, enables users to plan the routing and connectivities between real system objects. To support these activities, three dialogue boxes are provided:

The "Specify Geographical Constraints of Infotronic and Organizational Objects" dialogue box shown in FIG. 183, which provides users the capability to:

Display lists of organizational objects, workstations, infotronic objects and geographical map overlays.

Display a three dimensional grid of the selected geographical area as shown in FIG. 183. Each cell in this display represents a geographical region in the Euclidean space of the physical grid and may contain a resource object or a container object.

Drag an entry into the above list and drop it in a cell on the three dimensional display. This action will be used by tool functions to allocate the selected object to the selected region. Lower level state space composition of the selected object will be contained within the Euclidean cell region allocated to the object.

Display the configuration of a node selected from the cellular structure as shown in FIG. 184.

The "Specify Geographical Constraints of Mechatronic Objects" dialogue box shown in FIG. 185, which provides users the capability to:

Display lists of mechatronic objects and geographical map overlays.

Display a three dimensional grid of the selected geographical area as shown in FIG. 185. Each cell in this display represents a geographical region in the Euclidean space of the physical grid and may contain a resource object or a container object as specified in procedure 5.2.

Drag an entry into the infotronic objects list and drop it in a cell on the three dimensional display as either an initial, way or target position. This action will be used by tool functions to allocate the selected object to the selected region. Lower level state space composition of the selected object will be contained within the Euclidean cell region allocated to the object.

Select a set of regions as obstructed by a selected type of physical constraint from the selected constraints category list.

The "Plan Routing and Connectivity of Mechatronic Objects" dialogue box, shown in FIG. 186, which provides users the capability to:

Specify route plan of the selected infotronic object.

Display a tool generated route for the selected infotronic object. This route can be edited by the user.

Procedure 7.5: Real System Control Tools

The following set of menus and dialogue boxes are provided:

The "Information Control" menu. This menu provides the following six dialogue boxes:

The "AMR Supervisory Control" dialogue box shown in FIG. 187, enables users to edit the configuration of the AMR supervisory controllers. To support these activities, six dialogue boxes are provided:

The "AMR Overload Monitor View Controller" dialogue box shown in FIG. 188, which provides users the capability to:

Display lists of ALI_Net loops; object loop components of the selected ALI_Net and their instances; component objects and their methods for selected object loop and their attributes, resources used by the above selected loops and methods; attribute names and their values for the selected resources.

Enable or Disable the monitoring views controller.

Declare a selected loop category as critical, essential or non-essential.

Select the default set of parameters monitored by the monitoring views controller for a selected set of loops. Default set consists of loop load, loop response time, loop service time, method service time, and loop accuracy.

Select a subset of the default set of performance parameters monitored by the monitoring views controller.

Monitor and persistently store a selected set of resources used by a selected set of one or more loops.

The "AMR Learning Controller" dialogue box shown in FIG. 189, which provides users the capability to:
  Display lists of ALI_Net loops; object loop components of the selected ALI_Net and their instances; component objects and their methods for selected object loop and their attributes, resources used by the above selected loops and methods; attribute names and their values for the selected resources.
  Enable or Disable the ALI_Net learning controller.
  Select the default prediction distance set and maximum prediction distance.
  Specify maximum prediction distance and maximum allowable prediction error.
  Predict the utilization levels of a selected set of resources.

The "AMR Performance Controller" dialogue box shown in FIG. 190, which provides users the capability to:
  Display lists of ALI_Net loops; object loop components of the selected ALI_Net and their instances; component objects and their methods for selected object loop and their attributes, resources used by the above selected loops and methods; attribute names and their values for the selected resources.
  Enable or Disable the ALI_Net performance controller.
  Declare a selected loop category as critical, essential, or non-essential.
  Specify desired load and response time of a selected set of one or more loops.
  Specify service time of a selected set of one or more methods.
  Select the default set of parameters used by the ALI_Net performance controller for the selected set of loops. Default set consists of temporal data structures, control rules, correlation/aggregation rules, and fuzzy control membership functions.
  Control the performance of ALI_Nets referenced by the above selections.

The "AMR Configuration Controller" dialogue box shown in FIG. 191, which provides users the capability to:
  Display lists of ALI_Net loops; object loop components of the selected ALI_Net and their instances; component objects and their methods for selected object loop and their attributes, resources used by the above selected loops and methods; attribute names and their values for the selected resources.
  Enable or Disable the ALI_Net configuration controller.
  Declare a selected loop category as critical, essential, or non-essential.
  Select dynamic allocation of resources to selected loop functions implemented by the ALI_Net performance controller.
  Bind the selected set of ALI_Net, object loops, and objects to the selected set of physical resources.

The "AMR Security Controller" dialogue box shown in FIG. 192, which provides users the capability to:
  Display lists of ALI_Net loops; object loop components of the selected ALI_Net and their instances; component objects and their methods for selected object loop and their attributes, resources used by the above selected loops and methods; attribute names and their values for the selected resources.
  Enable or Disable the ALI_Net security controller.
  Select security level for the selected set of loops, objects, and/or methods.
  Select the use of public session keys for a selected object loop.
  Specify authorized users for each security level associated with the selected loops.
  Select read/write options protections for the resources associated with the selected set of loops, objects, and/or methods.
  Enforce security requirements specified by the above selections.

The "AMR Reliability Controller" dialogue box shown in FIG. 193, which provides users the capability to:
  Display lists of ALI_Net loops; object loop components of the selected ALI_Net and their instances; component objects and their methods for selected object loop and their attributes, resources used by the above selected loops and methods; attribute names and their values for the selected resources.
  Enable or Disable the ALI_Net reliability controller.
  Select communication and or system recovery reliability functions implemented by the ALI_Net controllers.
  Select communication semantics as exactly once or at least once to the selected set of loops.
  Select resource categories recovered by the ALI_Net reliability controller.

The "Equipment Scheduling" dialogue box shown in FIGS. 194 which provides users the capability to:
  Select object loop category as processing, control, or diagnostics.
  Display lists of ALI_Net loops and object loop component of the selected ALI_Net.
  Display lists of candidate instances of the mechatronic, infotronic, and notronic component objects and their instances.
  Define a priority level for each object instance.
  Schedule objects referenced by the above selections.

The "Personnel Scheduling" dialogue box shown in FIGS. 195 which provides users the capability to:
  Select object loop category as processing, control, or diagnostics.
  Display lists of ALI_Net loops and object loop component of the selected ALI_Net.
  Display lists of candidate instances of organizational object classes.
  Define a priority level for each object instance.

The "ALI_Net Scheduling" dialogue box, shown in FIG. 196, which provides users the capability to:
  Select object loop category as processing, control, or diagnostics.
  Display lists of ALI_Net loops and object loop components of the selected ALI_Net.
  Select value function associated with the selected ALI_Net and/or Object_Loop. This function is used by the ALI_Net scheduler.
  Define new value functions.
  Define trigger timer of the selected loops.

The "Real System Identification" dialogue box, shown in FIG. 197, which provides users the capability to extract the dynamic behavior model for the selected set of ALI_Nets, Object_Loops, and their methods residing on a selected set of nodes and processors. This is carried out for the selected set of event types associated with the selected ALI_Nets.

Procedure 7.6: Project Management Tools

The "Project Management" dialogue box shown in FIG. 198, provides users the capability to:
  Select an architecture model from the list of alternate architecture models stored in the knowledge data base.

Each of these models defines the integrated operational/ system architecture model of the business operations under study. See procedure 6 for description of method used to generate alternate business architecture models.

Select the set of value functions/metrics used to evaluate the selected architecture model.

Display lists of ALI_Net loops; object loop components of the selected ALI_Net and their instances; component objects and their methods for selected object loop and their attributes, and resources used by the above selected loops.

Select required value/cost project management displays to incorporate break down structure, project schedule, business tracking, and operations dependencies information for the selected architecture specification level. The four level categories, operational architecture, design, manufacturing, and tailoring, are specified as shown in procedure 6.

Select display type as tabular or graphic. Graphic displays are generated for the selected information using displays of the type shown in FIGS. 150–153.

Procedure 8: Architecture of the AMR Tools Kit

Plan projection of the AMR tools kit is shown in FIG. 199. The AMR Common Development Environment (CDE) knowledge controller and the AMR Common Operating Environment (COE) knowledge controller knowledge controllers are used to specify, encapsulate and manage the integrated ALI_Net meta model which captures the static and dynamic object relationships of the enterprise during all phases of the real system life cycle.

Each AMR knowledge controller is created using the concurrent processing control objects set shown in FIG. 123. As shown in FIG. 200, each Reliability Controller is constructed using four set of objects: Data_Integrity_Controller, Transaction_Correctness_Controller, Transaction_Atomicity_Controller, and the AMR_Structural_Integrity_Controller. The latter controller verifies and validates the structural integrity of the evolving enterprise wide operational/system architectures and its compliance with declared constraints and rules provided in this invention including object attribute and association constraints as shown in FIGS. (42 and 43); and structural constraints as shown in FIGS. (68, 92, 112 and 113) and their associated construction procedures. For each enterprise these rules and constraints are captured by a layered set of distributed M data model schemas as shown in FIGS. 201 to 209 where:

Each of the M(k) schemas, where k is BM, DM, ASA, SP, ASC, SI and OS, provides data base administrators with defined views used to regulate their respective tools access to shared and protected data.

A semantic filter defined between each M(k) schema and its respective CDE or COE M metaschema as shown in the two isomorphic plan projections of FIGS. 202 and 203.

Each of the M(k) schemas is specified by a set of subschemas. Each M subschema specifies the M schema at a specified level of abstraction. The containment relationships between the different levels is shown in FIGS. 204 and 205.

Each of the M subschema is defined using the set of a data definition dictionary, meta knowledge rules and ALI_Nets as shown in FIGS. 205 and 206. This set, in accordance with procedure 5.2.2 rules, is defined at the given level of system abstraction over the shared set of active and passive object entities. Meta knowledge rules may restrict the allocation of the set of active/passive objects to a certain set of one or more architecture levels.

The above set of M schemas are implemented using a set of distributed cooperating servers residing on each node of different sites of the distributed development systems. Two basic types of configurations can be realized. The first fully distributed configuration has no semantic filters as shown in FIGS. 207 and 208. In this configuration each of the M schemas supporting BM, DM, ASA, SP, ASC, SI and OS loops categories is embedded within the boundary of tools supporting the specification, analysis, synthesis, design automation and sustainment of these loops. This implies a homogeneous design of the AMR tools kit where the underlying design of each tool is carried out using an M schema and its underlying M model design concepts. The second partially distributed configuration is shown in FIG. 209. In this configuration the tool kit is created using a heterogeneous set of tools whose interoperability is mediated using a set of semantic filters as shown in FIG. 213. These filters mediate the underlying semantics of each tool with the integrated semantics of the CDE M schema and COE M schema The CDE knowledge controller is implemented by a set of distributed cooperating servers residing on each node of different sites of the distributed operational systems. These servers provide the product development/acquisition loop tool set with the following set of service capabilities as shown in FIG. 210:

Declare the set of rules used to specify the enterprise integrated operational/system architecture using procedure 7 dialogue boxes. These rules enable project/enterprise architects to:

Define the number and user defined names of the set of architecture "integration level" models. As shown in FIG. 204, these models are used to specify business operations at different levels of abstraction from the specification of operational missions down to the blue print specification of the real system implementation and fabrication architectures. Examples of architecture "integration level" models are multi-site operational requirement architecture, multi-site functional architecture, multi-node network architecture, multi-processor hardware architecture, and multi-process software architecture.

Define the set of static and dynamic model types used to specify system architecture at each architecture integration level. As shown in FIG. 212, examples of UML static model types are classification, association, and aggregation, object relationship models. Examples of UML dynamic model types are sequence, collaboration, statechart, activity, and implementation diagrams.

Specify the integration level of each model type. Integration levels provide an ordered top-down hierarchical containment relationship between a given set of architecture models.

Associate with each architecture level the set of admissible objects and resource types. Each of these items is an element of the real system Entity Relationship or Object Relationship models. Objects and resource types of each level may be hierarchically ordered.

Visually Create, store, retrieve and edit static and dynamic model types.

Visually Create, store, retrieve and edit instances, i.e. occurrences, of static and dynamic model types.

Automatically integrate model types at each level to create single level and multi level integrated architecture models. Integration rules are dependent on the model type paradigm used such as UML, IDEF, etc. For the UML case, the formal geometric language of this invention enables: 1) integration of different UML static and dynamic model types into a single level integrated architecture, and 2) integration of different levels of system architectures into one unified AMR architecture.

Automatically generate model types tailored to the semantic requirements of a specific end user type or a specific tool type. Examples of user types are project managers, system architects, object developers, and system operators. Examples of tool types are project management, cost analysis, requirements analysis, architecture specification, capacity planning, design simulation, reverse engineering, code generation, and test automation.

Check, report, and enforce compliance of the architecture integration models and their component models, to project and/or enterprise wide architecture rules.

The AMR COE knowledge controller, is implemented by a set of distributed cooperating servers residing on each node of different sites of the distributed operational systems. These servers provide business operations with the following set of service capabilities as shown in FIG. 211:

Configure the real system integrated architecture at each node using architecture specification, planning, and scheduling procedures of this invention.

Use existing system loading and installation tools to load and install the configured architecture and its underlying AMR data structures at each node (site).

Support the run time operations of the AMR planning, scheduling, and system control as shown in procedure 5.3 and FIG. 100.

Two major types of AMR tool kits are specified. Whereas the first type of kit is created using a homogeneous set of tools, the second type of kit is created using a heterogeneous set of tools. By a homogeneous set of tools we mean that each tool is designed to implement the underlying semantics of the ALI_Nets as specified by the design concepts, data structures, and procedures of this invention. By a heterogeneous set of tools, we mean that each tool was not designed to implement the M model design concepts but nevertheless can provide some required system specification, analysis or implementation functions. As shown in FIG. 213, the second type of tools kit consists of a heterogeneous set of tools. Each of these tools can be an off-the-shelf commercial tool which can provide some of the functions required to implement the integrated design concepts, data structures, and procedures of this invention. Interoperability of these tools requires the specification of a semantic filter, i.e. information schema, for each tool.

Procedure 9: AMR Architecture Complexity Metrics

In procedures 4 and 5 it is shown that the integrated architecture of a real system is efficiently specified by the geometric system evolution map illustrated in FIGS. 35, 36, and 37. These figures describe the set of evolutionary processes used to specify the static and dynamic binding of system component objects into adaptive operational system architectures. The quality of an architecture is evaluated using two types of architecture complexity metrics. The first type of metrics, calculated using procedure 9.1, enables the evaluation of the packing efficiency of the system structure. The second type of metrics, calculated using procedure 9.2, enables the evaluation of system order, its structural partitioning and aggregation. Both types of metrics are applicable to a broad area of application systems and are independent of the implementation medium of the specified architecture. The implementation medium may be software, computer hardware, firmware, or metal.

Procedure 9.1: Fractal Dimension Metrics of System Complexity

An integrated architecture of real systems has a self-similar or a self-affine fractal design structure as shown in FIGS. 35, 36, 51, 52, 62, 94, and 97. This structure is used to specify: 1) the static and dynamic binding, i.e. integration, of system components to form Infotronic, Mechatronic and Netronic objects, and 2) the dynamic binding of these objects to create adaptive operational system architectures. A useful description of a given system architecture is the fractal dimension of the system's spatial structure. As introduced by Mandelbort, the key idea behind fractal dimension is that a rugged object can be described by extending the classical concept of dimensional analysis to include a fractional number that describes the ruggedness of the object in the space spanned by the whole number dimensions encompassing its fractional magnitude. This invention, provides a novel application of Mandelbort's ideas to evaluate the spatial structure of software intensive system architectures. Specifically this invention:

Recognizes that the dimensionality of a software intensive system depends on the operations performed on it either mentally during the concept exploration and analysis phases or physically during the development and sustainment phases of the system life cycle. This means that system geometric regions which may be smooth at the system functional architecture level can appear to be rugged, i.e. fractured, at the system implementation architecture level. This implies that the fractal dimension of the architecture of a real system is always associated with its specified resolution at various architecture levels.

Provides a set of architecture complexity metrics. These metrics are used to evaluate the fractal design structure of an evolving system architecture at the different levels of resolution. Each level is used to support specified system operations during a specified phase of the system life cycle.

Complexity metrics of system architectures are calculated using the following procedure where each category of the system architecture is specified at a given phase of the system life cycle:

First, compute:

$SON(L_n)$=number of self-affine component objects specified at the $n^{th}$ level of the fractal structure of the static architecture.

$SOS(L_n)$=scale factor used to generate SON $(L_n)$ components

Set Fractal_Dimension_Static_Structure $(L_n)$=log(SON$(L_n)$)/log(1/SOS$(L_n)$)

Second, compute:

$DON(L_n)$=number of self-affine ALI_Nets specified at the $n^{th}$ level of the fractal structure of the dynamic architecture.

$DOS(L_n)$=scale factor used to generate DON$(L_n)$ components

Set Fractal_Dimension_Dynamic_Structure $(L_n)$= log(DON$(L_n)$)/log(1/DOS$(L_n)$)

Third, plot:

log(SON$(L_n)$) vs log(1/SOS$(L_n)$)

Fourth, generate:

The best fit straight line for the log(SON$(L_n)$) vs log(1/SOS$(L_n)$) plot

And set:

Average_Fractal_Dimension_Static_Structure Slope of the generated best fit line.

Fifth, plot:

$\log(DON(L_n))$ vs $\log(1/DOS(L_n))$

Sixth, generate:

The best fit straight line for the $\log(DON(L_n))$ vs $\log(1/DOS(L_n))$ plot.

And set:

Average Fractal_Dimension_Dynamic_Structure= Slope of the generated best fit line In the above calculations it is assumed that 1) the mass of each component object is empirically specified as the number of lines of code used to specify the visually atomic component object at the specified resolution, and 2) all component objects have a unit mass. This latter assumption can be relaxed by modifying the above procedure where $SON(L_n)$ and $DON(L_n)$ are specified as follows:

$SON(L_n)=SOM(L_n)=$Average mass of the component objects specified at the $n^{th}$ layer of the fractal structure of the real system static object model.

$SOS(L_n)=SOL(L_n)=$Average length of geometric region of the component objects used to calculate $SOM(L_n)$ $DON(L_n)=DOM(L_n)=$Average mass of the concurrent object components of the ALI_Net specified at the $n^{th}$ level of the fractal structure of the dynamic architecture.

$DOS(L_n)=DOS(L_n)=$Average length of geometric region of the concurrent objects used to calculate $DOM(L_n)$ Procedure 9.2: Entropy Metrics of Systems Complexity As shown in procedure 4, the spatial and time evolution of the system design structure is specified using a geometric system iterative map as shown in FIGS. 35 and 36. This map specifies a time indexed sequence of instances of the system architecture model. Each element in this sequence is a snapshot of the system state space structure at a specified time instant and the state of the system at each time instants is specified by the values of an ordered set of variables xj which reside in various passive regions of the M model of a real system.

$$S(t)=[xj(t)|1 \leq j \leq n]=[x_1(t), x_2(t), \ldots x_n(t)]$$

In this invention an architecture complexity is measured using entropy metrics of the set of ALI_Nets used to compose a given architecture. Justifications for selecting entropy as an architecture metric are:

Each ALI_Net specifies an architecture partition which can be independently configured, tested, controlled, maintained and modified.

Each ALI_Net defines the set of relations between system elements that operate as a constraint on the behavior of the system variables.

Since the absence of relations or constraints is randomness, it is reasonable to use entropy as a measure of system order. By that we mean a measure of the degree of coupling and interaction between the component objects of each ALI_Net. This measure is calculated using the following procedure:

Given an architecture model of a real system S specified by the set of ALI_Nets where, $S=[AL(1), AL(2), \ldots, AL(m), \ldots, AL(n)]$ And each ALI_Net, AL(m), is specified by the aggregated set of object_loops $AL(m)=[OL(m, 1), OL(m, 2), \ldots, OL(m, j), \ldots, OL(m, k_m)]$ And the state of each object_loop, OL(m, j), is defined by the state vector, $OL(m,j)=[x(j, 1), x(j, 2), \ldots, x(j, n_j)]$.

First, compute the entropy $H[OL(m, j)]$ of each object_loop, OL(m, j), where $$H[OL(m,\ j)] = \log_2 N - \frac{1}{N}\sum_{i=1} n_i \log_2 n_i$$

where $n_i=$number of occurrences of the $i^{th}$ possible value of OL(m, j)

Second, compute the coupling $C(L_i, L_j)$ between each pair of system loops object_loop, OL(m, i), and object_loop, OL(m, j), provided by the transmission $T(S_i:S_j)$.

$$C(L_i,\ L_j)=H[OL(m,\ i)]+H[OL(m,\ j)]-H[(OL(m,\ i),\ OL(m,\ j)]$$

where $H[(OL(m, i), OL(m, j)]=$Entropy of the union of the two loops OL(m, i) and OL(m, j).

From the above equation it follows that:

$H[(OL(m, i), OL(m, j)]=0$ iff OL(m, i) and OL(m, j) are statistically independent and, $H[(OL(m, i), OL(m, j)]=$maximum if one loop is dependent upon the other loop.

Procedure 10: Error Prediction and Model Estimation Algorithms

Error Prediction and Model Estimation is carried out as follows:

Given an unknown single input-single output system and a pair of measurements $(u_t, y_t)$, estimation of system parameters can be carried out in terms of:

1. The impulse response (moving average, all zeros) model $$y_t=G(z^{-1})u_t+e_t \tag{1}$$

2. The Auto regressive-Moving average model $$y_t = z^{-k}\frac{B}{A}u_t + e_t \tag{2}$$

where A, B, and G are polynomials in $z^{-1}$ whose orders are $n_a$, $n_b$ and $n_g$ respectively.

From equation (2):

$$\Psi_{yu}=\Phi_{uu}G \tag{3}$$

where $\Psi_{yu}$, $\Phi_{uu}$ and G are the cross covariance and auto covariance functions.

Equation (3) does not, in general, provide efficient estimates for and requires knowledge of j beyond which $g_j$ is effectively zero. If variation in input is large compared to that due to noise and/or a large volume of data is available, then the impulse response can be directly estimated from the orthogonal set of equations defining the cross correlation function between the prewhitened input $u_t^1$ and the corresponding transformed output $y_t^1$, that is:

$$g_i=\Psi_{u_t^1 y_t^1}/T_{u_t^1}^2 \tag{4}$$

where $$u_t^1=W(z^{-1})X^{-1}(z^{-1})u_t \tag{5}$$

$$y_t^1=W(z^{-1})X^{-1}(z^{-1})y_t \tag{6}$$

By equating the coefficients of $z^{-1}$ of equations (1) and (2), we have:

$$g_i = 0 \text{ for } i < k$$

$$g_i = b_0 - \sum_{j=1}^{n_a} a_j w_{i-j} \text{ for } k \leq i \leq k + n_b$$

$$g_i = \sum_{j=1}^{n_a} a_j w_{i-j} \text{ for } i > k + n_b$$

Knowledge of the estimated cross correlation function $\psi_{u_t^1 y_t^1}$ and its standard error can be used for iteratively estimating k, A and B polynomials (Box 1976, Godfrey 1969, Clarke 1969)

Dead time estimation by this method depends on the inspection of the terms where in the presence of noise it may be hard to discriminate between zero and non-zero terms. In this invention, a ladder structure is developed which computes the optimum impulse response by minimizing the total square error.

$$I = E(e_t^2) = E\left[\left(y_t - \sum_{i=0}^{n_w-1} w_i^{(n_w)} u_{t-i}\right)^2\right] \quad (7)$$

where $$\lim_{m \to \infty} W^{(m)} = G$$

By setting $$\delta I / \delta w_i = 0 \text{ for } i = 0, 1, \ldots, n_w - 1 \quad (8)$$

$$\sum_{i=0}^{n_w-1} w_i E(u_{t-j} u_{t-i}) = E(y_t u_{t-j}), j = 0, 1, \ldots, n_w - 1$$

Computation of the expectation functions E of equation (8) depends on the statistical characteristics of the signal where it can be shown that if $u_t$ is stationary, then $E(u_{t-j} u_{t-i})$ is the auto correlation matrix $\Phi_{uu}(i, j)$ which is Symmetric Toeplitz. On the other hand, if $u_t$ is nonstationary, then the expectation function is the auto covariance matrix $\Phi_{uu}(i, j)$ which is Symmetric but non-Toeplitz.

Equation (8) can be solved in two stages using Levinson recursion whose derivation is based on the Toeplitz properties of the auto correlation matrix as follows: (Levinson 1947)

First, Compute the auxiliary sequence $C_j^{(m)}$ (where m defines the order of the filter) as follows:

$$C_0^{(0)} = \phi_{uu}(1) / \phi_{uu}(0) \quad (9)$$

$$C_i^{(m)} = \frac{\phi_{uu}(m+1) - \sum_{i=1}^{m} C_{i-1}^{(m-1)} \phi_{uu}(i)}{\phi_{uu}(0) - \sum_{i=0}^{m} C_i^{(m-1)} \phi_{uu}(m-i)} \quad (10)$$

$$C_i^{(m)} = C_{i-1}^{(m-i)} - C_o^{(m)} C_{m-i}^{(m-1)} \quad (11)$$

Second, Compute the impulse response coefficients as follows:

$$w_0^{(0)} = \phi_{yu}(0) / \phi_{uu}(0) \quad (12)$$

$$w_{m+1}^{(m+1)} = \frac{\phi_{yu}(m+1) - \sum_{i=0}^{m} w_i^{(m)} \phi_{uu}(m+1-i)}{\phi_{uu}(0) - \sum_{i=0}^{m} C_i^{(m-1)} \phi_{uu}(m-i)} \quad (13)$$

$$w_i^{(m+1)} = w_i^{(m)} - w_{m+1}^{(m+1)} C_i^{(m)} \quad (14)$$

Third, Estimate the adequacy of the predictor length from:

$$E_0 = \phi_{yu}^2(0) / \phi_{uu}(0) \quad (15)$$

$$E_{m+1} = E_m + w_{m+1}^{(m+1)} \left(\phi_{yu}(m+1) - \sum_{i=0}^{m} C_i^{(m)} \phi_{yu}(i)\right) \quad (16)$$

A moving average ladder can be built to implement equation (9) to (16) as follows:
Equations (11) and (14) can be rewritten in the form:

$$\begin{bmatrix} 1 \\ -C_m^{(m)} \\ -C_{m-1}^{(m)} \\ \cdot \\ \cdot \\ \cdot \\ -C_0^{(m)} \end{bmatrix} = \begin{bmatrix} 1 \\ -C_{m-1}^{(m-1)} \\ -C_{m-2}^{(m-1)} \\ \cdot \\ \cdot \\ -C_0^{(m-1)} \\ 0 \end{bmatrix} + (-C_0^{(m)}) \begin{bmatrix} 0 \\ -C_0^{(m-1)} \\ -C_0^{(m-1)} \\ \cdot \\ \cdot \\ -C_{m-1}^{(m-1)} \\ 1 \end{bmatrix} \quad (17)$$

$$\begin{bmatrix} -w_0^{(m)} \\ -w_1^{(m)} \\ \cdot \\ -w_m^{(m)} \end{bmatrix} = \begin{bmatrix} -w_0^{(m-1)} \\ -w_1^{(m-1)} \\ \cdot \\ -w_{m-1}^{(m-1)} \\ 0 \end{bmatrix} + (-w_m^{(m)}) \begin{bmatrix} -C_0^{(m-1)} \\ -C_1^{(m-1)} \\ \cdot \\ -C_{m-1}^{(m-1)} \\ 1 \end{bmatrix} \quad (18)$$

By defining:

$$P^{(m+1)} = 1 - C_{m-1}^{(m-1)} z^{-1} - C_{m-2}^{(m-1)} z^{-2} - \ldots - C_0^{(m-1)} z^{-m} \quad (19)$$

$$Q^{(m+1)} = -C_0^{(m-1)} - C_1^{(m-1)} z^{-1} - \ldots + z^{-m} \quad (20)$$

$$f_t^{(m+1)} = P^{(m+1)} u_t \quad (21)$$

$$b_t^{(m+1)} = z^{-1} d_t^{(m+1)} u_t = z^{-1} r_t^{(m+1)} \quad (22)$$

$$W^{(m+1)} = -w_0^{(m-1)} - w_1^{(m-1)} z^{-1} - \ldots - w_{m-1}^{(m-1)} z^{-m} \quad (23)$$

$$d_t^{(m)} = W^{(m+1)} u_{t-1} \quad (24)$$

Therefore, from equations (17) and (18):

$$W^{(m+2)} = W^{(m+1)} - w_m^{(m)} Q^{(m+1)} \quad (25)$$

$$d_t^{(m+2)} = d_t^{(m+1)} - w_m^{(m)} b_t^{(m+1)} \quad (26)$$

$$P^{(m+2)} = P^{(m+1)} - C_0^{(m)} z^{-1} Q^{(m+1)} \quad (27)$$

$$f_t^{(m+2)} = f_t^{(m+1)} - C_0^{(m)} b_t^{(m+1)} \quad (28)$$

$$Q^{(m+2)} = z^{-1} Q^{(m+1)} - C_0^{(m)} P^{(m+1)} \quad (29)$$

$$b_t^{(m+2)} = z^{-1} (b_t^{(m+1)} - C_0^{(m)} f_t^{(m+1)}) \quad (30)$$

and from equations (7) and (26):

$$e_t^{(m+2)} = y_t + d_t^{(m+1)} = e_t^{(m+1)} - w_m^{(m)} b_t^{(m+1)} \quad (31)$$

Equations (28), (30) and (31) can be represented by the Moving Average ladder shown in FIG. 128. The moving average ladder can be reduced as special cases to implement prediction filters with prediction distance k where from equations (7) and (8) for $y_t = u_{t+k}$.

$$I = E\left(u_{t+k} - \sum_{i=0}^{n_w-1} w_i^{(nw)} u_{t-i}\right) \tag{32}$$

$$\sum_{i=0}^{n_w-1} \phi_{uu}(j-i) w_i^{(nw)} = -\phi_{uu}(j+k) \text{ for } j = 0, 1, \ldots, n_w - 1$$

By defining:

$$d_t^{(m)} = z^{-k+1} b_t^{(m)} \tag{33}$$

$$S^{(m+1)} = 1 - w_0^{(m-1)} z^{-k} - w_1^{(m-1)} z^{-k-1} - \ldots - w_{m-1}^{(m-1)} z^{-k-m+1} \tag{34}$$

$$e_t^{(m+1)} = S^{(m+1)} u_t \tag{35}$$

it follows that:

$$S^{(m+2)} = S^{(m+1)} - w_m^{(m)} z^{-k+1} Q^{(m+1)} \tag{36}$$

$$e_t^{(m+2)} = e_t^{(m+1)} - w_m^{(m)} d_t^{(m+1)} \tag{37}$$

which results in the general auto regressive prediction ladder shown in FIG. 129.

The prewhitening filters used in the seismic and speech recognition industries (Riley 1972, Makhoul 1975, 1977, 1978, Messershmitt 1980) can be derived from the general prediction ladder for k=1.
If k=1, then from equations (10) to (14):

$$w_m^{(m)} = C_0^{(m)} \text{ for all } m \tag{38}$$

$$w_i^{(m)} = C_{m-i}^{(m)} \text{ for } i = 0, 1, \ldots, m-1 \tag{39}$$

and from equation (33), $$d_t^{(m)} = b_t^{(m)} \tag{40}$$

and from equations (19), (22) and (39), $$e_t^{(m)} = f_t^{(m)} \tag{41}$$

The above equations show that for the spiking ladder case, the right-hand side of FIG. 1 is the mirror image of the left-hand side. Furthermore, by defining the two-point vector $x_t = (u_t, y_t)^T$ and $f_t^{(2)} = (u_t - C_0^{(0)} u_{t-1}, y_t - C_0^{(0)} y_{t-1})^T$ where $C_0^{(0)}$ estimation is based on $u_t$ statistics only, then the whitened input, transformed output pair is defined by $x_t^1 = (u_t^1, y_t^1)$ as implied by the ladder shown in FIG. 130.

The residual error energy at different stages of single variable ladders is estimated as follows:
At the $(m+1)^{th}$ stage of the ladder, there are three residual error sequences whose energies are defined by:

$$E_f^{(m+2)} = \overline{f_t^{(m+2)} f_t^{(m+2)}} = \overline{(f_t^{(m+1)})^2} - 2 C_0^{(m)} \overline{f_t^{(m+1)} b_t^{(m+1)}} + (C_0^{(m)})^2 \overline{(b_t^{(m+1)})^2} \tag{42}$$

$$E_r^{(m+2)} = \overline{r_t^{(m+2)} r_t^{(m+2)}} = \overline{(b_t^{(m+1)})^2} - 2 C_0^{(m)} \overline{f_t^{(m+1)} b_t^{(m+1)}} + (C_0^{(m)})^2 \overline{(f_t^{(m+1)})^2} \tag{43}$$

$$E_e^{(m+2)} = \overline{e_t^{(m+2)} e_t^{(m+2)}} = \overline{(e_t^{(m+1)})^2} - 2 w_m^{(m)} \overline{e_t^{(m+1)} b_t^{(m+1)}} + (w_m^{(m)})^2 \overline{(b_t^{(m+1)})^2} \tag{44}$$

For weakly stationary signals, from equations (19) and (20):

$$E_f^{(m+2)} = E_r^{(m+2)} = E^{(m+2)}$$

From equations (92) and (95), it is shown that:

$$w_m^{(m)} = \overline{e_t^{(m+1)} b_t^{(m+1)}} / E^{(m+1)} \tag{45}$$

$$C_0^{(m)} = \overline{f_t^{(m+1)} b_t^{(m+1)}} / E^{(m+1)} \tag{46}$$

Therefore, from equations (44) to (46):

$$E_e^{(m+2)} = E_e^{(m+1)} - (w_m^{(m)})^2 E^{(m+1)} \tag{47}$$

$$E^{(m+2)} = E^{(m+1)} (1 - (C_0^{(m)})^2) \tag{48}$$

where:

$$E_e^{(1)} \phi_{yy}^{(0)} \tag{49}$$

$$E^{(1)} \phi_{uu}^{(0)} \tag{50}$$

Therefore:

$$E^{(m+2)} = \phi_{uu}^{(0)} \prod_{i=0}^{m} \left(1 - (C_0^{(i)})^2\right) \tag{51}$$

and $$E_e^{(m+2)} = \phi_{yy}^{(0)} - \phi_{uu}^{(0)} \sum_{i=0}^{m} (w_i^{(i)})^2 \prod_{j=0}^{m-1} \left(1 - (C_0^{(i)})^2\right) \tag{52}$$

For the general auto regressive ladder, from equations (33), (35), (37) and (94), it follows that:

$$E_e^{(m+2)} = \phi_{uu}(0) \prod_{i=0}^{m-1} \left(1 - (w_i^{(i)})^2\right) - (w_m^{(m)})^2 E^{(m+1)} \tag{53}$$

Therefore, the goodness of the prediction as a function of the prediction distance k can be computed from equations (51) and (53):

$$\frac{E_e^{(m+2)}}{E^{(m+2)}} = \frac{\prod_{l=0}^{m-1} \left(1 - (w_l^{(i)})^2\right)}{\prod_{l=0}^{m-1} \left(1 - (C_0^{(i)})^2\right)} - \frac{(w_m^{(m)})^2}{\left(1 - (C_0^{(m)})^2\right)} \tag{54}$$

which is a function of the pivotal elements of the ladder $w_i^{(i)}$ and $C_0^{(i)}$ only.
Another measure about the adequacy of the length of the prediction filter which is independent of the energy of the input time series is given by:

$$\frac{E_e^{(m+2)}}{E_e^{(1)}} = \prod_{i=0}^{m-1} \left(1 - (w_i^{(i)})^2\right) - w_m^{(m)} \prod_{i=0}^{m-1} \left(1 - (C_0^i)^2\right) \tag{55}$$

$$\frac{E^{(m+2)}}{E^{(1)}} = \prod_{i=0}^{m-1} \left(1 - (C_0^i)^2\right) \tag{56}$$

The structural properties of single variable ladders are evaluated as follows:
By defining the polynomial:

$$(T^{(m+1)})^T = (1, -w_0^{(m-1)}, -w_1^{(m-1)}, \ldots, -w_{m-1}^{(m-1)}) \tag{57}$$

then from equations (26) and (31):

$$e_t^{(m+1)} = (T^{(m+1)})^T V_t \tag{58}$$

where:

$$V_t = (y_t, u_{t-1}, u_{t-2}, \ldots, u_{t-m-1}) \tag{59}$$

It can be shown that minimization of:

$$E_e^{(m+1)}(0) = \phi_{yy}(0) - 2\sum_{i=0}^{m-1} \phi_{yu}(i+1) + \sum_{j=0}^{m-1}\sum_{i=0}^{m-1} w_j^{m-1} \phi_{uu}(i-j) w_i^{(m-1)}$$

will result in the normal equations:

$$\sum_{i=0}^{m-1} \phi_{uu}(i-l) w_i^{(m-1)} = \phi_{yu}(l+i) \text{ for } l = 0, 1, \ldots, m-1 \tag{60}$$

and the residual error energy of:

$$E_e^{(m+1)}(0) = \phi_{yy}(0) - \sum_{i=0}^{m-1} \phi_{yu}(i+1) w_i^{(m-1)} \tag{61}$$

By augmenting equations (60) and (61), we have:

$$\begin{bmatrix} \phi_{yy}(0) & \phi_{yu}(1) & \ldots & \phi_{yu}(m+1) \\ \phi_{yu}(1) & \phi_{uu}(0) & \phi_{uu}(1) & \phi_{uu}(m) \\ \phi_{yu}(2) & \phi_{uu}(1) & \phi_{uu}(0) & \cdot \\ & & \ddots & \vdots \\ \phi_{yu}(m+1) & \phi_{uu}(m) & & \phi_{uu}(0) \end{bmatrix} \begin{bmatrix} 1 \\ -w_0^{(m-1)} \\ -w_1^{(m-1)} \\ \cdot \\ \cdot \\ -w_{m-1}^{(m-1)} \end{bmatrix} = \begin{bmatrix} E_e^{(m+1)} \\ 0 \\ 0 \\ \cdot \\ \cdot \\ 0 \end{bmatrix} \tag{62}$$

The above matrix is symmetric but non-Toeplitz.

From equation (58), we can define the matrix S $$e = S_v$$

which can be expanded as follows:

$$\begin{bmatrix} e_t^{(1)} \\ e_t^{(2)} \\ e_t^{(3)} \\ \vdots \\ e_t^{(m+1)} \end{bmatrix} \begin{bmatrix} 1 & 0 & 0 & \ldots & 0 \\ 1 & -w_0^{(0)} & 0 & & 0 \\ 1 & -w_0^{(1)} & -w_1^{(1)} & & 0 \\ \vdots & \vdots & & \ddots & \vdots \\ 1 & -w_0^{(m-1)} & -w_1^{(m-1)} & & -w_{m-1}^{(m-1)} \end{bmatrix} \begin{bmatrix} y_t \\ u_{t-1} \\ u_{t-2} \\ \vdots \\ u_{t-m-1} \end{bmatrix} \tag{63}$$

Therefore:

$$\Phi_{ee} = \overline{ee^T} = \sum_{t=-\infty}^{\infty} S V V^T S^T = S \Phi_{vv} S^T \tag{64}$$

From equations (62) and (64), it can be shown that:

$$S\Phi_{vv}S^T = \begin{bmatrix} E_e^{(1)}(0) & E_e^{(2)}(0) & E_e^{(3)}(0) & \ldots & E_e^{(m+1)}(0) \\ E_e^{(2)}(0) & E_e^{(2)}(0) & E_e^{(3)}(0) & & \cdot \\ E_e^{(3)}(0) & E_e^{(3)}(0) & E_e^{(3)}(0) & & \cdot \\ \cdot & & & & E_e^{(m+1)}(0) \\ \cdot & & & & \cdot \\ \cdot & & & & \cdot \\ E_e^{(m+1)}(0) & \ldots & E_e^{(m+1)}(0) & \ldots & E_e^{(m+1)}(0) \end{bmatrix} \tag{65}$$

Therefore, the determinant of $S\Phi_{vv}S^T$ is given by:

$$det(S\Phi_{vv}S^T) = E_e^{(m+1)}(0) \prod_{i=1}^{m-1} (E_e^{(i)}(0) - E_e^{(i+1)}(0)) \tag{66}$$

Since from equation (63), determinant of S is given by:

$$det(S) = \prod_{i=0}^{m-1} w_i^{(i)} \tag{67}$$

it follows that determinant of $\Phi_{vv}$ is given by:

$$det(\Phi_{vv}) = E_e^{(m+1)}(0) \prod_{i=1}^{m-1} (E_e^{(i)}(0) - E_e^{(i+1)}(0)) \Big/ \prod_{i=1}^{m-1} (w_i^{(i)})^2 \tag{68}$$

Since $$\prod_{i=1}^{m} \lambda_i^{(m+1)} = E_e^{(m+1)}(0) \prod_{i=0}^{m-1} (E_e^{(i)}(0) - E_e^{(i+1)}(0)) \Big/ \prod_{i=1}^{m-1} (w_i^{(i)})^2$$

where $\lambda_i^{(m-1)}$ are the eigen values associated with $\Phi_{vv}$, and since a positive definite real symmetric matrix has only positive eigen values, it follows from equation (52) and (77) that the positive definite conditions of $\Phi_{vv}$ is guaranteed if all $E_e^{(i)}(0)$ are positive and monotonically decreasing which implies that the modulus of $C_0^{(i)}$ and $w_t^{(i)}$ for all i is less than one and are monotonically decreasing.

Next for the general prediction ladder from equations (34), (35) and (37), it can be shown that the normal equations are:

$$\sum_{i=0}^{m-1} \phi_{uu}(i-l) w_i^{(m-1)} = \phi_{uu}(l+k) \text{ for } l = 0, 1, \ldots, m-1 \tag{69}$$

with an associated residual error energy of:

$$E_e^{(m+1)}(0) = \phi_{uu}(0) - \sum_{i=0}^{m-1} \phi_{uu}(k+i) w_i^{(m-1)} \tag{70}$$

Furthermore:

$$\Phi_{u,u_t} S^{(i+1)} = \Psi_{u,u_t+k} \tag{71}$$

where $\Psi_{u,u_t+k}$ is the cross correlation function of the input and desired time functions.

From equations (69) to (71), it follows that:

$$\begin{bmatrix} \phi_{uu}(0) & \phi_{uu}(1) & \ldots & \phi_{uu}(k+i-1) & \ldots & \phi_{uu}(l) \\ \phi_{uu}(1) & \phi_{uu}(0) & \ldots & \phi_{uu}(k+i-2) & \ldots & \phi_{uu}(l-1) \\ \vdots & & \ddots & & & \vdots \\ \varphi_{uu}(k+1) & \phi_{uu}(0) & & & & \vdots \\ \vdots & & \ddots & \ddots & \ddots & \vdots \\ \phi_{uu}(l) & \ldots & \ldots & \ldots & \ldots & \phi_{uu}(0) \end{bmatrix} \begin{bmatrix} 1 \\ 0_{k-1} \\ -w_0^{(i-1)} \\ -w_1^{(i-1)} \\ \vdots \\ -w_{i-1}^{(i-1)} \\ 0_{l-k-i+1} \end{bmatrix} = \begin{bmatrix} E_e^{(i+1)}(0) \\ \psi^{(i+1)}(1) \\ \vdots \\ 0 \\ 0 \\ 0 \\ \psi^{(i+1)}(k+i) \\ \psi^{(i+1)}(l) \end{bmatrix} \quad (72)$$

where $0_{k-1}$ is the null array of dimension k−1 and where $\psi^{(i+1)}(j)$ is the $j^{th}$ lag cross correlation function associated with the $i^{th}$ order filter $$\psi^{(i+1)}(j) = \phi_{uu}(j) - \sum_{n=0}^{i-1} w_n^{(i-1)} \phi_{uu}(j-k-n)$$

The high order lags of the cross correlation function will disappear when the optimum length of the filter is set equal to the length of the auto correlation vector. Furthermore, from equation (69), the zero lag auto correlation function of the residual error $E^{(i+1)}(0)$ is equal to the zero lag cross correlation function $\psi^{(i+1)}(0)$. In this case, the prediction error filter $S^{(m+1)}$ shortens the input wavelet $u_t$ of length k+i to an output wavelet of length k. Because k is user defined, the user has a means for controlling the desired degree of wavelet contraction.(Alam 1977)

By reversing $S^{(m+1)}$, equation (72) can be rewritten in the form:

$$\begin{bmatrix} \phi_{uu}(0) & & \phi_{uu}(l) & \phi_{uu}(l) \\ \phi_{uu}(1) & & \phi_{uu}(l-1) & \phi_{uu}(l-1) \\ & & & \\ & & & \\ \phi_{uu}(k+i-1) & & \phi_{uu}(0) & \\ \phi_{uu}(l) & & & \phi_{uu}(0) \end{bmatrix} \begin{bmatrix} 1 \\ 0_{l-k+i} \\ -w_{i-1}^{(i-1)} \\ -w_{i-2}^{(i-1)} \\ \vdots \\ -w_0^{(i-1)} \\ 0_{\alpha-1} \\ 1 \end{bmatrix} = \begin{bmatrix} \psi^{(i+1)}(l) \\ \ldots \\ \ldots \\ \psi^{(i+1)}(k+1) \\ 0_{i-1} \\ \psi^{(i+1)}(k-1) \\ \psi^{(i+1)}(l) \\ E_e^{(i+1)}(0) \end{bmatrix} \quad (73)$$

From equation (34), we define the matrix S such that:

$$e = S\ u \quad (74)$$

Equation (73) can be expanded as:

$$\begin{bmatrix} e_t^{(2)} \\ e_t^{(3)} \\ \vdots \\ e_t^{(m+1)} \end{bmatrix} = \begin{bmatrix} 0_{m-1} & & -w_0^{(0)} & 0_{\alpha-1} & 1 \\ 0_{m-2} & -w_1^{(1)} & -w_0^{(1)} & 0_{\alpha-1} & 1 \\ & & & & \\ -w_{m-1}^{(m-1)} & -w_1^{(m-1)} & -w_0^{(m-1)} & 0_{\alpha-1} & 1 \end{bmatrix} \begin{bmatrix} u_{t-k-m} \\ u_{t-k-m+1} \\ \vdots \\ u_{t-1} \\ u_t \end{bmatrix} \quad (75)$$

hence:

$$\Phi_{ee} = ee^T = Suu^T S^T = S\Phi_{uu} S^T =$$

$$\begin{bmatrix} E_e^{(1)}(0) & E_e^{(2)}(0) & E_e^{(3)}(0) & & E_e^{(m)}(0) \\ E_e^{(2)}(0) & E_e^{(2)}(0) & E_e^{(3)}(0) & & \\ E_e^{(3)}(0) & E_e^{(3)}(0) & E_e^{(3)}(0) & & E_e^{(m)}(0) \\ & & & & \\ E_e^{(m)}(0) & & E_e^{(m)}(0) & & E_e^{(m)}(0) \end{bmatrix} \quad (76)$$

$$det(S\ \Phi_{uu}\ S^T) = E_e^{(m)}(0) \prod_{i=1}^{m-2}(E_e^{(i)}(0) - E_e^{(i+1)}(0)) \quad (77)$$

Since $det(S\Phi_{uu}S^T) = det(\Phi_{uu}) det(det(S))^2$, it follows that if $det\ \Phi_{ee}$ is negative, then $det\ \Phi_{uu}$ is negative. Equation (77) implies that existence of the inverse of S depends only on the zero lag autocorrelation of the error sequence at different filter orders, and it exists if:

1. All zero lag auto correlation functions $E_e^{(i)}(0)$ are positive
2. $E_e^{(i)}(0)$ where i=1, 2, . . . , m; is monotonically decreasing Since $E_e^{(i)}(0)$ is a function of $C_0^{(j)}$ and $w_j^{(i)}$ for j=0, 1, . . . , i−1, it follows from equation (52) that the above conditions are satisfied if $|w_i^{(i)}| < |C_0^{(i)}| < 1$ for all i and all elements $w_i^{(i)}$ are monotonically decreasing.

Finally, by analyzing the left hand side of the ladder for k=1, from equation (69) and (70):

$$\sum_{i=0}^{m-1} \phi_{uu}(i-1) w_i^{(m-1)} = \phi_{uu}(l+1) \quad \text{where } l = 0, 1, \ldots, m-1$$

$$E^{(m+1)}(0) = \phi_{uu}(0) - \sum_{i=0}^{m-1} \phi_{uu}(i+1) w_i^{(m-1)}$$

Augmenting the last two equations results in the matrix equation:

$$\Phi_{uu} Q^{(m+1)} = \begin{bmatrix} 0_{m+1} \\ E^{(m+1)} \end{bmatrix}$$

which is expanded as follows:

$$\begin{bmatrix} \phi_{uu}(0) & \phi_{uu}(1) & & \phi_{uu}(m) \\ \phi_{uu}(1) & \phi_{uu}(0) & & \phi_{uu}(m-1) \\ & & & \\ & & & \\ \phi_{uu}(m) & \phi_{uu}(m-1) & & \phi_{uu}(0) \end{bmatrix} \begin{bmatrix} -C_0^{(m-1)} \\ -C_1^{(m-1)} \\ \vdots \\ -C_{m-1}^{(m-1)} \\ 1 \end{bmatrix} = \begin{bmatrix} 0 \\ 0 \\ 0 \\ 0 \\ E^{(m+1)} \end{bmatrix} \quad (78)$$

Therefore, from equation (22):
R=Q uwhich is defined by:

$$\begin{bmatrix} r_t^{(1)} \\ r_t^{(2)} \\ r_t^{(3)} \\ \vdots \\ r_t^{(m-1)} \end{bmatrix} = \begin{bmatrix} 1 & 0 & 0 & 0 & 0 \\ -C_0^{(0)} & 1 & 0 & 0 & 0 \\ -C_0^{(1)} & -C_0^{(1)} & 1 & 0 & 0 \\ \vdots & & & & \\ -C_0^{(m-1)} & -C_0^{(m-1)} & & -C_{m-1}^{(m-1)} & 1 \end{bmatrix} \begin{bmatrix} u_t \\ 0_{t-1} \\ \vdots \\ u_{t-m} \\ u_{t-m-1} \end{bmatrix} \quad (79)$$

Therefore, it can be shown that:

$$\Phi_{rr} = rr^T = P\Phi_{uu}Q = Q\Phi_{uu}P = E \quad (80)$$

where E is defined by the diagonal matrix $$E = \begin{bmatrix} E^{(1)}(0) & 0 & 0 & 0 \\ 0 & E^{(2)}(0) & 0 & 0 \\ 0 & 0 & E_e^{(3)}(0) & 0 \\ 0 & 0 & 0 & E_e^{(m-1)}(0) \end{bmatrix} \quad (81)$$

Equation (80) shows that residual energies at different stages of the left hand-side of the ladder, the spiking side, are orthogonal to each other which implies that different stages of the spiking side are decoupled from each other. Furthermore, the diagonal elements of E are the eigen values of the covariance matrix $\Phi_{uu}$ and can be computed directly from the reflection coefficients $C_0^{(i)}$ using equation (51). Since a positive definite real symmetric matrix has only positive eigen values, it follows that the conditions for positive definiteness of $\Phi_{uu}$ are satisfied if $E^{(i)}$ is positive for all i. From equation (51), this condition is satisfied if and only if $|C_0^{(i)}|<1$ for all i. This condition guarantees that $P^{(m+1)}$ is minimum phase.

For the moving average ladder, the transfer coefficients, $w_i^{(i)}$ and the reflection coefficients $C_0^{(i)}$ for all I can be estimated as follows:
From equations (7) and (31)

$$I = E\left((e_t^{(m+1)})^2\right) = \sum_{k=1}^{t} \beta_k (e_k^{(m+1)} - w_m^{(m)}(t) b_k^{(m+1)})^2$$

where $\beta_k$ is the time varying forgetting factor.
By setting $\delta I/\delta w_m^{(m)}=0$ we have $$w_m^{(m)}(t) = \left(\sum_{k=1}^{t} \beta_k e_k^{(m+1)} b_k^{(m+1)}\right) / \left(\sum_{k=1}^{t} \beta_k (b_k^{(m+1)})^2\right) \quad (82)$$

and it follows that:

$$w_m^{(m)}(t+1) = \left(\sum_{k=1}^{t+1} \beta_k e_k^{(m+1)} b_k^{(m+1)}\right) / \left(\sum_{k=1}^{t+1} \beta_k (b_k^{(m+1)})^2\right) \quad (83)$$

since from equations (31), (82) and (83)

$$\sum_{k=1}^{t+1} \beta_k e_k^{(m+1)} b_k^{(m+1)} = w_m^{(m)}(t) \sum_{k=1}^{t+1} \beta_k (b_k^{(m+1)})^2 + \beta_{t+1} b_{t+1}^{(m+1)} e_{t+1}^{(m+2)} \quad (83)$$

Therefore:

$$w_m^{(m)}(t+1) = w_m^{(m)}(t) + \gamma_{t+1} e_{t+1}^{(m+2)} \quad (84)$$

where:

$$\gamma_{t+1} = (\beta_{t+1} b_{t+1}^{(m+1)}) / \left(\phi_{uu}(0) \prod_{i=0}^{m-1} \left(1 - (C_0^{(i)}(t))^2\right)\right) \quad (85)$$

For the general prediction ladder, it can be shown that equation (85) is true where $\gamma_{t+1}$ is defined by:

$$\gamma_{t+1} = (\beta_{t+1} d_{t+1}^{(m+1)}) / \left(\phi_{uu}(0) \prod_{i=0}^{m-1} \left(1 - (C_0^{(i)}(t))^2\right)\right) \quad (86)$$

Estimation of the $C_0^{(i)}$ parameters may be carried out by minimizing the performance index:

$$I = E(r_t^2 + f_t^2) = E((r_t^{(m+2)})^2 + (f_t^{(m+2)})^2)$$

where from equations (22), (28), and (30), it can be shown that $\delta I/\delta C_0^{(m)}(t)=0$ results in:

$$C_0^{(m)}(t) = \left(2\sum_{k=1}^{t} \beta_k b_k^{(m+1)} f_k^{(m+1)}\right) / \left(\sum_{k=1}^{t} \beta_k \left((b_k^{(m+1)})^2 + (f_k^{(m+1)})^2\right)\right) \quad (87)$$

Since:

$$2\sum_{k=1}^{t+1} \beta_k b_k^{(m+1)} f_k^{(m+1)} =$$

$$C_0^{(m)}(t)\left(\sum_{k=1}^{t+1} \beta_k \left((b_k^{(m+1)})^2 + (f_k^{(m+1)})^2\right) + (b_{t+1}^{(m+1)} f_t^{(m+2)} + f_t^{(m+1)} r_{t+1}^{(m+2)})\right)$$

it follows that:

$$C_0^{(m)}(t+1) = C_0^{(m)}(t) - \gamma_{t+1}(b_{t+1}^{(m+1)} f_{t+1}^{(m+2)} + f_{t+1}^{(m+1)} r_{t+1}^{(m+2)}) \quad (88)$$

$$\gamma_{t+1} = \beta_{t+1} / \left(2\phi_{uu}(0) \prod_{i=0}^{m-1} \left(1 - (C_0^{(i)}(t))^2\right)\right) \quad (89)$$

Finally the optimum dead time impulse response ladder, shown in FIG. (131), is used to estimate the optimum lag between the system input and its desired output. This ladder enables the generation of performance index contour maps as a function of filter memory length and a range of lags or prediction distances.

Conclusions, Ramifications, and Scope

Accordingly, the geometric display tools, methods, and adaptive model reference tools of this invention enable the specification, analysis, synthesis, and design automation of an adaptive integrated architecture of a real system. These systems can be adapted during system development to compensate for requirement changes and design errors, and during run time operation to compensate for unanticipated operational system conditions. AMR tools enable the verification and validation of adaptive real system designs built in compliance with a declared enterprise wide technical architecture. Architecture components can be specified using AMR tools or can be imported into the AMR tool set. Although the description above contains many specifics, these should not be construed as limiting the scope of the invention but as merely providing illustrations of some of the embodiments of this invention. For example the user interface description provided in procedure 7 should be viewed as one of many different ways used to describe the look and feel of the user interface required to enable the specification, analysis, synthesis and enactment of this invention. Thus the scope of the invention should be determined by the appended claims and their legal equivalents, rather than by the examples given.

I claim:

1. A computer-program method embodied on a computer-readable medium and comprising code containing one or more software objects representing real objects comprised within a real-world system, said real-world system comprising one or more members of the group consisting of physical processes, information transfer equipment, data processors, associated software, human operators, and systems users, so that the code, when executed in response to human input, causes the computer to perform functions comprising generating a fractal geometric display representing the real objects, and further comprising:

(a) constructing a dynamic architecture model of said real-world system, wherein the model is geometric and is fractal;

(b) providing a data and process information specified from a user-selected set of universal modeling language graph types further comprising classification, association, aggregation, object relationship, sequence, collaboration, state-chart, activity, and implementation graphs;

(c) fusing said data and process information;thereby generating an integrated visual representation of the fused data and process model information;

(d) constructing an atomic connection, defining communication protocols used to connect a set of component objects wherein said atomic connection is token based and is geometric and fractal and the geometric region of said atomic connection does not contain models of structure objects used to implement connections between said component objects;

(e) constructing a compound connection, defining communication protocols used to connect said set of component objects wherein said compound connection is token based and is geometric and the geometric region of said compound connection contains a plurality of models of infrastructure object, comprising an integrated model, used to implement connections between said component objects;

(f) constructing an object loop of said integrated model wherein said object loop is specified using a set of said atomic connections and of said compound connections, wherein said object loop specifies cyclic performance constrained interactions between said set of component objects wherein all interactions within the boundaries of said component objects are internal interactions during one complete loop cycle;

(g) constructing an adaptive loop information network, comprising a plurality of object loops, wherein said adaptive loop information network is specified using a group of said object loops, wherein each said adaptive loop information network specifies a proper partition of a set of component objects which is observable and controllable and configurable and whose semantics match a conceptual model of external objects invoking services of said adaptive loop information networks; and (h) constructing said dynamic architecture model using a set of said adaptive loop information networks, thus providing the user with an architectural specification model of the real-world system.

2. The method of claim 1, further comprising code that, when executed, in response to an human input and an automated system measurement, further comprises constructing a plan projection which is geometric and is fractal and an elevation projection which is geometric and is fractal.

3. A computer-program method embodied on a computer-readable medium and comprising code containing one or more software objects representing system objects and real objects comprised within a real-world system, said real-world system comprising one or more members of the group consisting of physical processes, information transfer equipment, data processors, associated software, human operators, and systems users, so that the code, when executed in response to human input, causes the computer to perform functions comprising:

(a) generating a fractal geometric display representing the real objects;

(b) constructing a dynamic architecture model of internal system objects and external system objects;

(c) constructing an operational requirements architecture model which is geometric and fractal, wherein the model is a dynamic architecture model; and (d) specifying performance constrained interactions between said external system objects and said real-world system;

thus providing the user with an architectural specification model of the real-world system.

4. The method of claim 3, wherein the real-world system further comprises internal system objects, the method further comprising using an operational requirements architecture model to construct a design control architecture model, wherein the model is a dynamic architecture model which specifies performance constrained interactions between said internal system objects, whereby a group of one or more said design control architecture models can be specified for each said operational requirements architecture model.

5. The method of claim 4, further comprising using said design control architecture model to construct an implementation architecture model, wherein the model is a dynamic architecture model, which binds design control loops, of said design control architecture model to a programing language and a given object class library, whereby a group of one or more said implementation architectures models can be specified for each said design control architecture model.

6. The method of claim 5, further comprising integrating said operational requirements architecture model, said design control architecture model and said implementation architecture model, constructing an integrated architecture model thereby.

7. A computer-program method embodied on a computer-readable medium and comprising code containing one or more software objects representing real objects comprised within a real-world system, said real-world system comprising one or more members of the group consisting of physical processes, information transfer equipment, data processors, associated software, human operators, and systems users, and further comprising component objects, so that the code, when executed in response to human input, causes the computer to perform functions, comprising:

(a) generating a fractal geometric display representing the real objects;

(b) constructing an operational plan and a schedule of said component objects;

(c) housing a set of said component objects in one or more physical space regions;

(d) constructing a plurality of information state space regions which specify a static structure and a dynamic behavior of said component objects;

(e) constructing an integrated space grid of said real-world system which comprises cells, is geometric and is fractal and is multi-layered wherein said cells fuse the physical space regions and the information state space regions;

(f) constructing one or more adaptive loop information networks, each comprising a plurality of object loops, and each comprising a set of said component objects;

(g) constructing an instance of each said adaptive loop information network, (h) specifying initial configuration and physical space constraints of said adaptive loop information network instance;

(i) constructing a plan which specifies the routing and connection of the component objects of said instance of adaptive loop information network; and (j) scheduling, directing, monitoring, and adapting said components objects specified in said plan, thus providing the user with an architectural specification model of the real-world system.

8. A computer-program method embodied on a computer-readable medium and comprising code containing one or more software objects representing real objects comprised within a real-world system, said real-world system comprising one or more members of the group consisting of physical processes, information transfer equipment, data processors, associated software, human operators, and systems users, so that the code, when executed in response to human input, causes the computer to perform functions comprising generating a fractal geometric display representing the real objects, further comprising:

(a) constructing a software concurrent application control process, which is a set of said component objects said real-world system, further comprising:

(b) constructing a user-selected set comprising a reliable communication controller, a security controller, an activation controller, a reliable configuration controller, a concurrency controller, and a monitoring controller whereby controller components of said software concurrent application control process further comprise enforcing static and dynamic constraints associated with segments of said instances of adaptive loop information network instances upon said software concurrent application control process;

(c) configuring and executing segments of said instances of adaptive loop information network, which are allocated to said software concurrent application control process; and (d) enabling interactions between said software concurrent control processes using run time system environments, thus providing the user with an architectural specification model of the real-world system.

9. A computer-program method embodied on a computer-readable medium and comprising code containing one or more software objects representing real objects comprised within a real-world system, said real-world system comprising one or more members of the group consisting of physical processes, information transfer equipment, data processors, associated software, human operators, and systems users, so that the code, when executed in response to human input, causes the computer to perform functions comprising:

(a) generating a fractal geometric display representing the real objects, (b) constructing an adaptive supervisory application control process;

(c) constructing a user-selected set comprising an overload monitor controller and a learning controller and a performance controller and a configuration controller;

(d) coordinating a group of adaptive supervisory control processes to implement and adapt a functional performance behavior of an integrated architecture model;

(e) including one or more adaptive loop information networks, each further comprising segments;

(f) configuring and executing said segments; and (g) estimating a system model order and an associated dead time; parameters for a system with time varying properties, whereby said adaptive supervisory design control scheme enables the run time monitoring, control and adaptation of the behavior of an automated operational system, thus providing the user with an architectural specification model of the real-world system.

10. A computer-program method embodied on a computer-readable medium and comprising code containing one or more software objects representing real objects comprised within a real-world system, said real-world system comprising one or more members of the group consisting of physical processes, information transfer equipment, data processors, associated software, human operators, and systems users comprising current and proposed business operations, so that the code, when executed in response to human input, causes the computer to perform functions comprising:

(a) generating a fractal geometric display representing the real objects;

(b) activating the computer to evaluate a cost and a value of said real-world system;

(c) configuring one or more adaptive loop information networks, further comprising specifying business operations of said real-world system;

(d) constructing a dynamic architecture model of said real-world system, wherein the model is geometric and is fractal;

(e) constructing an adaptive simulator further comprising incorporating a simulation engine to implement said dynamic architecture models; and (f) computing performance sensitivity metrics of an adaptive loop information networks specification of current and proposed business operations, thus providing the user with an architectural specification model of the real-world system.

11. The method of claim 10, further comprising generating architecture projection displays of said static architecture model and said dynamic architecture model and said integrated architecture model, wherein said displays are created in compliance with static and dynamic constraints associated with said adaptive loop information networks and said adaptive loop information network instances, and further comprising generating a user-selected group comprising an object state display, a dynamic graph display, a business tracking graph display, and a business control graph.

12. A computer-program method embodied on a computer-readable medium and comprising code containing one or more software objects representing real objects comprised within a real-world system, said real-world system comprising one or more members of the group consisting of physical processes, information transfer equipment, data processors, associated software, human operators, and systems users, so that the code, when executed in response to human input, causes the computer to perform functions comprising:
  (a) generating a fractal geometric display representing the real objects;
  (b) constructing a knowledge controller which further comprises a group of objects within an integrated architecture model;
  (c) constructing a multilevel schema wherein a schema level is defined for each level of an abstraction of an adaptive loop information network;
  (d) using said multilevel schema to construct a plurality of semantic filters wherein a group of said semantic filters are used to regulate access to data managed by said knowledge controller; and
  (e) constructing said knowledge controller using an overload controller, a learning controller, a performance controller, and a configuration controller, thus providing the user with an architectural specification model of the real-world system.

13. A computer-program method embodied on a computer-readable medium and comprising code containing one or more software objects representing real objects comprised within a real-world system, wherein the real objects are members of the group which consists of mechatronic objects, infotronic objects, human objects, and human organization objects, the real-world system further comprising a multiplicity of unique segments in a spatial state time grid comprising an evolution structure, so that the code, when executed in response to human input, causes the computer to perform functions comprising:
  (a) generating a fractal geometric display representing the real objects;
  (b) configuring said display as a multiplicity of cells,
  (c) configuring said display to be virtual and wrap-around;
  (d) representing each unique segment by one of the cells, wherein a representation of the evolution structure is contained within said cell; and
  (e) representing each cell by two adjacent triangular display tiles, thus providing the user with a specification model of the real-world system.

14. The method of claim 13, wherein each of the cells further comprises subdividing each cell into a multiplicity of atomic regions further comprising operation regions, resource regions, referential attribute regions, and public interface regions.

15. The method of claim 14, further comprising folding and unfolding said regions.

16. The method of claim 15, further comprising fractally and geometrically displaying a multi-layered stack of components representing real objects, wherein said stack of components further comprises a plan projection and an elevation projection.

17. A computer-program method embodied on a computer-readable medium and comprising code containing one or more software objects representing real objects comprised within a real-world system, so that the code, when executed in response to human input, causes the computer to perform functions comprising generating a fractal geometric display representing the real objects, and further comprising:
  (a) constructing a dynamic architecture model of said real-world system, wherein the model is geometric and is fractal;
  (b) providing a data and process information specified from a user-selected set of universal modeling language graph types further comprising classification, association, aggregation, object relationship, sequence, collaboration, state-chart, activity, and implementation graphs;
  (c) fusing said data and process information; thereby generating an integrated visual representation of the fused data and process model information;
  (d) constructing an atomic connection, defining communication protocols used to connect a set of component objects wherein said atomic connection is token based and is geometric and fractal and the geometric region of said atomic connection does not contain models of infrastructure objects used to implement connections between said component objects;
  (e) constructing a compound connection, defining communication protocols used to connect said set of component objects wherein said compound connection is token based and is geometric and the geometric region of said compound connection contains a plurality of models of infrastructure object, comprising an integrated model, used to implement connections between said component objects;
  (f) constructing an object loop of said integrated model wherein said object loop is specified using a set of said atomic connections and of said compound connections, wherein said object loop specifies cyclic performance constrained interactions between said set of component objects wherein all interactions within the boundaries of said component objects are internal interactions during one complete loop cycle;
  (g) constructing an adaptive loop information network, comprising a plurality of object loops, wherein said adaptive loop information network is specified using a group of said object loops, wherein each said adaptive loop information network specifies a proper partition of a set of component objects which is observable and controllable and configurable and whose semantics match a conceptual model of external objects invoking services of said adaptive loop information networks;
  (h) constructing said dynamic architecture model using a set of said adaptive loop information networks; and
  (i) constructing
    (I) a plan projection which is geometric and is fractal; and
    (II) an elevation projection which is geometric and is fractal,
  when the code is executed in response to an human input and an automated system measurement, thus providing the user with a specification model of the real-world system.

18. The method of claim 17, further comprising constructing a minimum dynamic architecture model of said dynamic architecture model.

19. A computer-program method embodied on a computer-readable medium and comprising code containing one or more software objects representing real objects comprised within a real-world system comprising current and proposed business operations, so that the code, when executed in response to human input, causes the computer to perform functions comprising:
  (a) generating a fractal geometric display representing the real objects;
  (b) activating the computer to evaluate a cost and a value of said real-world system;

(c) configuring one or more adaptive loop information networks, further comprising specifying business operations of said real-world system;

(d) constructing a dynamic architecture model of said real-world system, wherein the model is geometric and is fractal;

(e) constructing an adaptive simulator further comprising incorporating a simulation engine to implement said dynamic architecture models;

(f) computing performance sensitivity metrics of an adaptive loop information networks specification of current and proposed business operations, (g) generating architecture projection displays of said static architecture model, said dynamic architecture model, and said integrated architecture model, wherein said displays are created in compliance with static and dynamic constraints associated with said adaptive loop information networks and said adaptive loop information network instances, and (h) further comprising generating a user-selected group comprising an object state display, a dynamic graph display, a business tracking graph display, and a business control graph, thus providing the user with a specification model of the real-world system.

20. The method of claim 19, further comprising evaluating a user-selected set of static structure metrics of said adaptive loop information networks, wherein said static structure metrics further comprise fractal dimension metrics, entropy coupling metrics, boundedness metrics, deadlock metrics, and liveness metrics.

21. The method of claim 20, further comprising an automated system measuring, and an evaluating of a user-selected set of dynamic structure metrics of said adaptive loop information networks of said integrated architecture model using data collected by a set of software concurrent application control processes, wherein said dynamic structure metrics further comprise load metrics, service time metrics, response time metrics, and utilization level metrics.

22. A computer-program method embodied on a computer-readable medium and comprising code containing one or more software objects representing real objects comprised within a real-world system, said real-world system comprising one or more members of the group consisting of physical processes, information transfer equipment, data processors, associated software, human operators, and systems users, so that the code, when executed in response to human input, causes the computer to perform functions comprising generating a fractal geometric display representing the real objects; thus providing the user with an architectural specification model of the real-world system.

23. The method of claim 22, wherein each real object further comprises an entity with a well-defined boundary and identity that encapsulates state and behavior, wherein state comprises a representation of one or more data attributes and one or more relationships, and wherein behavior comprises a representation of one or more operations, one or more methods, and one or more state machines.

24. The method of claim 22, further comprising configuring said display as a multiplicity of cells.

25. The method of claim 24, wherein said fractal geometric display is virtual and wraparound.

26. The method of claim 25, wherein said real-world system further comprises a multiplicity of unique segments in a spatial state time grid comprising an evolution structure, the method further comprising representing each unique segment by one of the cells, wherein a representation of the evolution structure is contained within said cell.

27. The method of claim 26, further comprising representing each cell by two adjacent triangular display tiles.

28. The method of claim 27, wherein the real objects are members of the group which consists of mechatronic objects, infotronic objects, human objects, and human organization objects.

29. The method of claim 28, further comprising:

(a) constructing a fractal geometric model of a classification relationship between said real objects;

(b) constructing a fractal geometric model of an association relationship between said real objects;

(c) constructing a fractal geometric model of a composition relationship between said real objects;

(d) constructing a static architecture model using fractal geometric models of said classification relationship, said association relationship, and said composition relationship.

30. The method of claim 29, further comprising constructing a minimum static architecture model version of said static architecture model, using a minimal orthogonal set of object attributes and a minimal orthogonal set of functions operating on said software objects.

31. The method of claims 1, 3, 7, 8, 9, 10, or 12, further comprising using an automated system measurement, providing an integrated architecture model, and constructing an iterative map of the integrated architecture model thereby.

* * * * *